(12) United States Patent
Connor

(10) Patent No.: US 10,338,400 B2
(45) Date of Patent: Jul. 2, 2019

(54) AUGMENTED REALITY EYEWEAR WITH VAPE OR WEAR TECHNOLOGY

(71) Applicant: Robert A. Connor, St. Paul, MN (US)

(72) Inventor: Robert A. Connor, St. Paul, MN (US)

(73) Assignee: Holovisions LLC, St. Paul, MN (US)

( * ) Notice: Subject to any disclaimer, the term of this patent is extended or adjusted under 35 U.S.C. 154(b) by 0 days.

(21) Appl. No.: 15/942,498

(22) Filed: Mar. 31, 2018

(65) Prior Publication Data

US 2019/0004325 A1 Jan. 3, 2019

Related U.S. Application Data

(60) Provisional application No. 62/646,856, filed on Mar. 22, 2018, provisional application No. 62/638,087, filed on Mar. 3, 2018, provisional application No. 62/624,699, filed on Jan. 31, 2018, provisional application No. 62/572,328, filed on Oct. 13, 2017, provisional application No. 62/563,798, filed on Sep. 27, 2017, provisional application No. 62/561,834, filed on Sep. 22, 2017, provisional application No. 62/528,331, filed on Jul. 3, 2017.

(51) Int. Cl.
*G02B 27/22* (2018.01)
*G02B 27/01* (2006.01)
*G06T 19/00* (2011.01)
*G02B 27/09* (2006.01)

(52) U.S. Cl.
CPC ..... *G02B 27/2278* (2013.01); *G02B 27/0172* (2013.01); *G02B 27/0961* (2013.01); *G02B 27/2235* (2013.01); *G06T 19/006* (2013.01)

(58) Field of Classification Search
CPC ............ G02B 27/2278; G02B 27/0172; G02B 27/0961; G02B 27/2235; G06T 19/006
See application file for complete search history.

(56) References Cited

U.S. PATENT DOCUMENTS

| | | |
|---|---|---|
| 4,026,641 A | 5/1977 | Bosserman et al. |
| 5,696,521 A | 12/1997 | Robinson et al. |
| 5,699,194 A | 12/1997 | Takahashi |
| 5,715,337 A | 2/1998 | Spitzer et al. |
| 5,724,463 A | 3/1998 | Deacon et al. |
| 5,854,697 A | 12/1998 | Caulfield et al. |
| 5,883,606 A | 3/1999 | Smoot |
| 5,886,822 A | 3/1999 | Spitzer |
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |
| 6,201,629 B1 | 3/2001 | McClelland et al. |
| 6,204,974 B1 | 3/2001 | Spitzer |

(Continued)

*Primary Examiner* — Wen Huang

(57) ABSTRACT

This invention is augmented reality eyewear with Volumetric Annular Photon Emission (VAPE) technology comprising: an annular light projector; an annular light reflector/refractor which redirects light rays from the annular light projector away from the person's eye; and a semi-reflective eyewear lens which reflects light rays from the projector back toward the person's eye and also transmits light rays from the environment toward the person's eye. This technology can enable a person to see their environment with minimal vision impairment while simultaneously displaying virtual objects with minimal light loss.

20 Claims, 45 Drawing Sheets

(56) References Cited

U.S. PATENT DOCUMENTS

| | | |
|---|---|---|
| 6,222,677 B1 | 4/2001 | Budd et al. |
| 6,349,001 B1 | 2/2002 | Spitzer |
| 6,353,503 B1 | 3/2002 | Spitzer et al. |
| 6,356,392 B1 | 3/2002 | Spitzer |
| 6,384,982 B1 | 5/2002 | Spitzer |
| 6,396,639 B1 | 5/2002 | Togino et al. |
| 6,483,483 B2 | 11/2002 | Kosugi et al. |
| 6,522,794 B1 | 2/2003 | Bischel et al. |
| 6,538,799 B2 | 3/2003 | McClelland et al. |
| 6,559,813 B1 | 5/2003 | DeLuca et al. |
| 6,690,516 B2 | 2/2004 | Aritake et al. |
| 6,710,902 B2 | 3/2004 | Takeyama |
| 6,724,354 B1 | 4/2004 | Spitzer et al. |
| 6,829,095 B2 | 12/2004 | Amitai |
| 6,879,443 B2 | 4/2005 | Spitzer et al. |
| 6,999,238 B2 | 2/2006 | Glebov et al. |
| 7,009,757 B2 | 3/2006 | Nishioka et al. |
| 7,158,096 B1 | 1/2007 | Spitzer |
| 7,242,527 B2 | 7/2007 | Spitzer et al. |
| 7,245,440 B2 | 7/2007 | Peseux |
| 7,359,564 B2 | 4/2008 | Keam et al. |
| 7,391,573 B2 | 6/2008 | Amitai |
| 7,457,040 B2 | 11/2008 | Amitai |
| 7,542,209 B2 | 6/2009 | McGuire |
| 7,576,916 B2 | 8/2009 | Amitai |
| 7,577,326 B2 | 8/2009 | Amitai |
| 7,643,214 B2 | 1/2010 | Amitai |
| 7,672,055 B2 | 3/2010 | Amitai |
| 7,724,441 B2 | 5/2010 | Amitai |
| 7,724,442 B2 | 5/2010 | Amitai |
| 7,843,403 B2 | 11/2010 | Spitzer |
| 7,864,440 B2 | 1/2011 | Berge |
| 8,004,765 B2 | 8/2011 | Amitai |
| 8,189,263 B1 | 5/2012 | Wang et al. |
| 8,467,133 B2 | 6/2013 | Miller |
| 8,472,120 B2 | 6/2013 | Border et al. |
| 8,477,425 B2 | 7/2013 | Border et al. |
| 8,482,859 B2 | 7/2013 | Border et al. |
| 8,488,246 B2 | 7/2013 | Border et al. |
| 8,665,178 B1 | 3/2014 | Wang |
| 8,743,464 B1 | 6/2014 | Amirparviz |
| 8,760,762 B1 | 6/2014 | Kelly et al. |
| 8,848,289 B2 | 9/2014 | Amirparviz et al. |
| 8,873,148 B1 | 10/2014 | Gupta et al. |
| 8,917,453 B2 | 12/2014 | Bohn |
| 8,928,558 B2 | 1/2015 | Lewis et al. |
| 8,941,559 B2 | 1/2015 | Bar-Zeev et al. |
| 8,950,867 B2 | 2/2015 | MacNamara |
| 8,989,535 B2 | 3/2015 | Robbins |
| 9,057,826 B2 | 6/2015 | Gupta et al. |
| 9,091,850 B2 | 7/2015 | Miao et al. |
| 9,097,890 B2 | 8/2015 | Miller et al. |
| 9,097,891 B2 | 8/2015 | Border et al. |
| 9,110,504 B2 | 8/2015 | Lewis et al. |
| 9,116,337 B1 | 8/2015 | Miao |
| 9,122,053 B2 | 9/2015 | Geisner et al. |
| 9,128,281 B2 | 9/2015 | Osterhout et al. |
| 9,129,295 B2 | 9/2015 | Border et al. |
| 9,134,534 B2 | 9/2015 | Border et al. |
| 9,134,535 B2 | 9/2015 | Dobschal et al. |
| 9,182,596 B2 | 11/2015 | Border et al. |
| 9,223,134 B2 | 12/2015 | Miller et al. |
| 9,223,138 B2 | 12/2015 | Bohn |
| 9,229,227 B2 | 1/2016 | Border et al. |
| 9,244,277 B2 | 1/2016 | Cheng et al. |
| 9,274,338 B2 | 3/2016 | Robbins et al. |
| 9,285,591 B1 | 3/2016 | Gupta et al. |
| 9,286,730 B2 | 3/2016 | Bar-Zeev et al. |
| 9,292,973 B2 | 3/2016 | Bar-Zeev et al. |
| 9,304,003 B1 | 4/2016 | Ashman et al. |
| 9,304,319 B2 | 4/2016 | Bar-Zeev et al. |
| 9,310,559 B2 | 4/2016 | MacNamara |
| 9,323,325 B2 | 4/2016 | Perez et al. |
| 9,348,143 B2 | 5/2016 | Gao et al. |
| 9,368,546 B2 | 6/2016 | Fleck et al. |
| 9,372,347 B1 | 6/2016 | Levola et al. |
| 9,389,423 B2 | 7/2016 | Bhardwaj et al. |
| 9,417,452 B2 | 8/2016 | Schowengerdt et al. |
| 9,436,980 B2 | 9/2016 | Powell |
| 9,470,906 B2 | 10/2016 | Kaji et al. |
| 9,495,801 B2 | 11/2016 | Ebstyne et al. |
| 9,507,174 B2 | 11/2016 | Qin |
| 9,513,480 B2 | 12/2016 | Saarikko et al. |
| 9,515,238 B2 | 12/2016 | Maaskant et al. |
| 9,519,084 B1 | 12/2016 | Thomas |
| 9,535,253 B2 | 1/2017 | Levola et al. |
| 9,541,383 B2 | 1/2017 | Abovitz et al. |
| 9,547,174 B2 | 1/2017 | Gao et al. |
| 9,568,603 B2 | 2/2017 | Yahav et al. |
| 9,581,820 B2 | 2/2017 | Robbins |
| 9,588,341 B2 | 3/2017 | Bar-Zeev et al. |
| 9,612,403 B2 | 4/2017 | Abovitz et al. |
| 9,626,936 B2 | 4/2017 | Bell |
| 9,632,315 B2 | 4/2017 | Smith et al. |
| 9,651,368 B2 | 5/2017 | Abovitz et al. |
| 9,671,566 B2 | 6/2017 | Abovitz et al. |
| 9,671,615 B1 | 6/2017 | Vallius et al. |
| 9,684,174 B2 | 6/2017 | Fleck et al. |
| 9,690,099 B2 | 6/2017 | Bar-Zeev et al. |
| 9,720,228 B2 | 8/2017 | Harrison et al. |
| 9,726,891 B2 | 8/2017 | Webster et al. |
| 9,726,893 B2 | 8/2017 | Gao et al. |
| 9,727,132 B2 | 8/2017 | Liu et al. |
| 9,740,006 B2 | 8/2017 | Gao |
| 9,753,286 B2 | 9/2017 | Gao et al. |
| 9,766,464 B2 | 9/2017 | Poon et al. |
| 9,778,414 B2 | 10/2017 | Richards |
| 9,791,696 B2 | 10/2017 | Woltman et al. |
| 9,791,700 B2 | 10/2017 | Schowengerdt |
| 9,791,703 B1 | 10/2017 | Vallius et al. |
| 9,804,397 B2 | 10/2017 | Schowengerdt et al. |
| 9,823,474 B2 | 11/2017 | Evans et al. |
| 9,841,537 B2 | 12/2017 | Luebke et al. |
| 9,841,598 B2 | 12/2017 | Ouderkirk et al. |
| 9,841,601 B2 | 12/2017 | Schowengerdt |
| 9,846,306 B2 | 12/2017 | Schowengerdt |
| 9,846,967 B2 | 12/2017 | Schowengerdt |
| 9,851,478 B2 | 12/2017 | Price et al. |
| 9,857,170 B2 | 1/2018 | Abovitz et al. |
| 9,857,591 B2 | 1/2018 | Welch et al. |
| 9,885,870 B2 | 2/2018 | Stenberg et al. |
| 9,891,436 B2 | 2/2018 | Wall et al. |
| 9,897,811 B2 | 2/2018 | Martinez et al. |
| 9,904,058 B2 | 2/2018 | Yeoh et al. |
| 9,915,824 B2 | 3/2018 | Schowengerdt et al. |
| 9,915,825 B2 | 3/2018 | Robbins et al. |
| 9,915,826 B2 | 3/2018 | Tekolste et al. |
| 2001/0010598 A1 | 8/2001 | Aritake et al. |
| 2002/0167536 A1 | 11/2002 | Valdes et al. |
| 2003/0090439 A1 | 5/2003 | Spitzer et al. |
| 2004/0174610 A1 | 9/2004 | Aizenberg et al. |
| 2005/0174651 A1 | 8/2005 | Spitzer et al. |
| 2005/0248852 A1 | 11/2005 | Yamasaki |
| 2007/0103388 A1 | 5/2007 | Spitzer |
| 2008/0117341 A1 | 5/2008 | McGrew |
| 2008/0247722 A1 | 10/2008 | Van Gorkom et al. |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0161383 A1 | 6/2009 | Meir et al. |
| 2009/0213321 A1 | 8/2009 | Galstian et al. |
| 2010/0046070 A1 | 2/2010 | Mukawa |
| 2010/0149073 A1 | 6/2010 | Chaum et al. |
| 2010/0295987 A1 | 11/2010 | Berge |
| 2011/0221656 A1 | 9/2011 | Haddick et al. |
| 2011/0221657 A1 | 9/2011 | Haddick et al. |
| 2011/0221659 A1 | 9/2011 | King et al. |
| 2011/0221793 A1 | 9/2011 | King et al. |
| 2011/0227813 A1 | 9/2011 | Haddick et al. |
| 2012/0113092 A1 | 5/2012 | Bar-Zeev et al. |
| 2012/0162549 A1 | 6/2012 | Gao et al. |
| 2012/0200499 A1 | 8/2012 | Osterhout et al. |

(56) References Cited

U.S. PATENT DOCUMENTS

| | | |
|---|---|---|
| 2012/0200601 A1 | 8/2012 | Osterhout et al. |
| 2012/0212398 A1 | 8/2012 | Border et al. |
| 2012/0212399 A1 | 8/2012 | Border et al. |
| 2012/0212400 A1 | 8/2012 | Border et al. |
| 2012/0218172 A1 | 8/2012 | Border et al. |
| 2012/0218301 A1 | 8/2012 | Miller |
| 2012/0235883 A1 | 9/2012 | Border et al. |
| 2012/0235884 A1 | 9/2012 | Miller et al. |
| 2012/0235885 A1 | 9/2012 | Miller et al. |
| 2012/0235887 A1 | 9/2012 | Border et al. |
| 2012/0235900 A1 | 9/2012 | Border et al. |
| 2012/0236030 A1 | 9/2012 | Border et al. |
| 2012/0236031 A1 | 9/2012 | Haddick et al. |
| 2012/0242678 A1 | 9/2012 | Border et al. |
| 2012/0242697 A1 | 9/2012 | Border et al. |
| 2012/0242698 A1 | 9/2012 | Haddick et al. |
| 2012/0249797 A1 | 10/2012 | Haddick et al. |
| 2012/0326948 A1 | 12/2012 | Crocco et al. |
| 2013/0314793 A1 | 11/2013 | Robbins et al. |
| 2014/0003762 A1 | 1/2014 | MacNamara |
| 2014/0071539 A1 | 3/2014 | Gao |
| 2014/0098245 A1 | 4/2014 | Powell |
| 2014/0176528 A1 | 6/2014 | Robbins |
| 2014/0267420 A1 | 9/2014 | Schowengerdt et al. |
| 2015/0015814 A1 | 1/2015 | Qin |
| 2015/0016777 A1 | 1/2015 | Abovitz et al. |
| 2015/0103152 A1 | 4/2015 | Qin |
| 2015/0103306 A1 | 4/2015 | Kaji et al. |
| 2015/0124317 A1 | 5/2015 | MacNamara |
| 2015/0125109 A1 | 5/2015 | Robbins et al. |
| 2015/0177519 A1 | 6/2015 | Cakmakci et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0234184 A1 | 8/2015 | Schowengerdt et al. |
| 2015/0234190 A1 | 8/2015 | Schowengerdt |
| 2015/0234191 A1 | 8/2015 | Schowengerdt |
| 2015/0234205 A1 | 8/2015 | Schowengerdt |
| 2015/0234254 A1 | 8/2015 | Schowengerdt |
| 2015/0234476 A1 | 8/2015 | Schowengerdt et al. |
| 2015/0234477 A1 | 8/2015 | Abovitz et al. |
| 2015/0235088 A1 | 8/2015 | Abovitz et al. |
| 2015/0235370 A1 | 8/2015 | Abovitz et al. |
| 2015/0235417 A1 | 8/2015 | Schowengerdt et al. |
| 2015/0235418 A1 | 8/2015 | Schowengerdt |
| 2015/0235419 A1 | 8/2015 | Schowengerdt |
| 2015/0235420 A1 | 8/2015 | Schowengerdt |
| 2015/0235421 A1 | 8/2015 | Schowengerdt |
| 2015/0235430 A1 | 8/2015 | Schowengerdt et al. |
| 2015/0235431 A1 | 8/2015 | Schowengerdt |
| 2015/0235436 A1 | 8/2015 | Schowengerdt |
| 2015/0235437 A1 | 8/2015 | Schowengerdt |
| 2015/0235438 A1 | 8/2015 | Schowengerdt |
| 2015/0235439 A1 | 8/2015 | Schowengerdt |
| 2015/0235440 A1 | 8/2015 | Schowengerdt |
| 2015/0235441 A1 | 8/2015 | Abovitz et al. |
| 2015/0235442 A1 | 8/2015 | Schowengerdt |
| 2015/0235443 A1 | 8/2015 | Schowengerdt |
| 2015/0235444 A1 | 8/2015 | Schowengerdt |
| 2015/0235445 A1 | 8/2015 | Schowengerdt |
| 2015/0235446 A1 | 8/2015 | Schowengerdt |
| 2015/0235447 A1 | 8/2015 | Abovitz et al. |
| 2015/0235448 A1 | 8/2015 | Schowengerdt |
| 2015/0235449 A1 | 8/2015 | Schowengerdt et al. |
| 2015/0235450 A1 | 8/2015 | Schowengerdt et al. |
| 2015/0235451 A1 | 8/2015 | Schowengerdt et al. |
| 2015/0235452 A1 | 8/2015 | Schowengerdt et al. |
| 2015/0235453 A1 | 8/2015 | Schowengerdt et al. |
| 2015/0235454 A1 | 8/2015 | Schowengerdt |
| 2015/0235455 A1 | 8/2015 | Schowengerdt |
| 2015/0235456 A1 | 8/2015 | Schowengerdt |
| 2015/0235457 A1 | 8/2015 | Schowengerdt |
| 2015/0235458 A1 | 8/2015 | Schowengerdt et al. |
| 2015/0235459 A1 | 8/2015 | Schowengerdt |
| 2015/0235460 A1 | 8/2015 | Schowengerdt et al. |
| 2015/0235461 A1 | 8/2015 | Schowengerdt |
| 2015/0235462 A1 | 8/2015 | Schowengerdt |
| 2015/0235463 A1 | 8/2015 | Schowengerdt |
| 2015/0235464 A1 | 8/2015 | Schowengerdt |
| 2015/0235465 A1 | 8/2015 | Schowengerdt |
| 2015/0235466 A1 | 8/2015 | Schowengerdt |
| 2015/0235467 A1 | 8/2015 | Schowengerdt et al. |
| 2015/0235468 A1 | 8/2015 | Schowengerdt |
| 2015/0235469 A1 | 8/2015 | Schowengerdt |
| 2015/0235470 A1 | 8/2015 | Schowengerdt |
| 2015/0235471 A1 | 8/2015 | Schowengerdt |
| 2015/0235472 A1 | 8/2015 | Schowengerdt |
| 2015/0235473 A1 | 8/2015 | Schowengerdt |
| 2015/0235583 A1 | 8/2015 | Schowengerdt et al. |
| 2015/0241696 A1 | 8/2015 | Schowengerdt et al. |
| 2015/0241697 A1 | 8/2015 | Schowengerdt |
| 2015/0241698 A1 | 8/2015 | Schowengerdt |
| 2015/0241699 A1 | 8/2015 | Schowengerdt |
| 2015/0241700 A1 | 8/2015 | Schowengerdt |
| 2015/0241701 A1 | 8/2015 | Schowengerdt |
| 2015/0241702 A1 | 8/2015 | Schowengerdt |
| 2015/0241703 A1 | 8/2015 | Schowengerdt |
| 2015/0241704 A1 | 8/2015 | Schowengerdt et al. |
| 2015/0241705 A1 | 8/2015 | Abovitz et al. |
| 2015/0241706 A1 | 8/2015 | Schowengerdt |
| 2015/0241707 A1 | 8/2015 | Schowengerdt |
| 2015/0241959 A1 | 8/2015 | Abovitz et al. |
| 2015/0242575 A1 | 8/2015 | Abovitz et al. |
| 2015/0242943 A1 | 8/2015 | Abovitz et al. |
| 2015/0243088 A1 | 8/2015 | Schowengerdt et al. |
| 2015/0243089 A1 | 8/2015 | Schowengerdt |
| 2015/0243090 A1 | 8/2015 | Schowengerdt |
| 2015/0243091 A1 | 8/2015 | Schowengerdt |
| 2015/0243092 A1 | 8/2015 | Schowengerdt |
| 2015/0243093 A1 | 8/2015 | Schowengerdt |
| 2015/0243094 A1 | 8/2015 | Schowengerdt et al. |
| 2015/0243095 A1 | 8/2015 | Schowengerdt |
| 2015/0243096 A1 | 8/2015 | Schowengerdt |
| 2015/0243097 A1 | 8/2015 | Schowengerdt |
| 2015/0243098 A1 | 8/2015 | Schowengerdt |
| 2015/0243099 A1 | 8/2015 | Schowengerdt |
| 2015/0243100 A1 | 8/2015 | Abovitz et al. |
| 2015/0243101 A1 | 8/2015 | Schowengerdt et al. |
| 2015/0243102 A1 | 8/2015 | Schowengerdt |
| 2015/0243103 A1 | 8/2015 | Schowengerdt |
| 2015/0243104 A1 | 8/2015 | Schowengerdt |
| 2015/0243105 A1 | 8/2015 | Abovitz et al. |
| 2015/0243106 A1 | 8/2015 | Abovitz et al. |
| 2015/0243107 A1 | 8/2015 | Schowengerdt |
| 2015/0247723 A1 | 9/2015 | Abovitz et al. |
| 2015/0247975 A1 | 9/2015 | Abovitz et al. |
| 2015/0247976 A1 | 9/2015 | Abovitz et al. |
| 2015/0248006 A1 | 9/2015 | Schowengerdt |
| 2015/0248010 A1 | 9/2015 | Schowengerdt |
| 2015/0248011 A1 | 9/2015 | Schowengerdt |
| 2015/0248012 A1 | 9/2015 | Schowengerdt |
| 2015/0248046 A1 | 9/2015 | Schowengerdt |
| 2015/0248158 A1 | 9/2015 | Schowengerdt |
| 2015/0248169 A1 | 9/2015 | Abovitz et al. |
| 2015/0248170 A1 | 9/2015 | Abovitz et al. |
| 2015/0248786 A1 | 9/2015 | Schowengerdt |
| 2015/0248787 A1 | 9/2015 | Abovitz et al. |
| 2015/0248788 A1 | 9/2015 | Abovitz et al. |
| 2015/0248789 A1 | 9/2015 | Abovitz et al. |
| 2015/0248790 A1 | 9/2015 | Schowengerdt |
| 2015/0248791 A1 | 9/2015 | Abovitz et al. |
| 2015/0248792 A1 | 9/2015 | Abovitz et al. |
| 2015/0248793 A1 | 9/2015 | Abovitz et al. |
| 2015/0260992 A1 | 9/2015 | Luttmann et al. |
| 2015/0268415 A1 | 9/2015 | Schowengerdt et al. |
| 2015/0277123 A1 | 10/2015 | Chaum et al. |
| 2015/0301599 A1 | 10/2015 | Miller |
| 2015/0302658 A1 | 10/2015 | O'Connor et al. |
| 2015/0309263 A2 | 10/2015 | Abovitz et al. |
| 2015/0309264 A1 | 10/2015 | Abovitz et al. |
| 2015/0309315 A1 | 10/2015 | Schowengerdt |
| 2015/0309316 A1 | 10/2015 | Osterhout et al. |
| 2015/0316982 A1 | 11/2015 | Miller |
| 2015/0319342 A1 | 11/2015 | Schowengerdt |

(56) References Cited

U.S. PATENT DOCUMENTS

| | | |
|---|---|---|
| 2015/0346490 A1 | 12/2015 | Tekolste et al. |
| 2015/0346495 A1 | 12/2015 | Welch et al. |
| 2016/0011419 A1 | 1/2016 | Gao |
| 2016/0109652 A1 | 4/2016 | Schowengerdt |
| 2016/0109705 A1 | 4/2016 | Schowengerdt |
| 2016/0109706 A1 | 4/2016 | Schowengerdt et al. |
| 2016/0109707 A1 | 4/2016 | Schowengerdt et al. |
| 2016/0109708 A1 | 4/2016 | Schowengerdt |
| 2016/0110912 A1 | 4/2016 | Schowengerdt |
| 2016/0110920 A1 | 4/2016 | Schowengerdt |
| 2016/0116739 A1 | 4/2016 | TeKolste et al. |
| 2016/0154245 A1 | 6/2016 | Gao et al. |
| 2016/0187654 A1 | 6/2016 | Border et al. |
| 2016/0219269 A1 | 7/2016 | Tekolste |
| 2016/0266387 A1 | 9/2016 | Tekolste et al. |
| 2016/0274362 A1 | 9/2016 | Tinch |
| 2016/0282625 A1 | 9/2016 | Fleck et al. |
| 2016/0286204 A1 | 9/2016 | Grata et al. |
| 2016/0291326 A1 | 10/2016 | Evans et al. |
| 2016/0292921 A1 | 10/2016 | Evans et al. |
| 2016/0295202 A1 | 10/2016 | Evans et al. |
| 2016/0320559 A1 | 11/2016 | Richards |
| 2016/0327789 A1 | 11/2016 | Klug et al. |
| 2016/0341575 A1 | 11/2016 | Kaehler |
| 2016/0341873 A1 | 11/2016 | Kaehler |
| 2016/0341967 A1 | 11/2016 | Kaji et al. |
| 2016/0370510 A1 | 12/2016 | Thomas |
| 2017/0010466 A1 | 1/2017 | Klug et al. |
| 2017/0010488 A1 | 1/2017 | Klug et al. |
| 2017/0023794 A1 | 1/2017 | MacNamara |
| 2017/0031163 A1 | 2/2017 | Gao et al. |
| 2017/0038579 A1 | 2/2017 | Yeoh et al. |
| 2017/0038589 A1 | 2/2017 | Jepsen |
| 2017/0038590 A1 | 2/2017 | Jepsen |
| 2017/0038591 A1 | 2/2017 | Jepsen |
| 2017/0038836 A1 | 2/2017 | Jepsen et al. |
| 2017/0039904 A1 | 2/2017 | Jepsen |
| 2017/0039905 A1 | 2/2017 | Jepsen et al. |
| 2017/0039907 A1 | 2/2017 | Jepsen |
| 2017/0053450 A1 | 2/2017 | Rodriguez et al. |
| 2017/0075110 A1 | 3/2017 | Thomas |
| 2017/0090194 A1 | 3/2017 | Hayes |
| 2017/0094265 A1 | 3/2017 | Mullins et al. |
| 2017/0097506 A1 | 4/2017 | Schowengerdt et al. |
| 2017/0097507 A1 | 4/2017 | Yeoh et al. |
| 2017/0102546 A1 | 4/2017 | Tempel et al. |
| 2017/0108697 A1 | 4/2017 | El-Ghoroury et al. |
| 2017/0115432 A1 | 4/2017 | Schmidtlin |
| 2017/0115491 A1 | 4/2017 | Shi et al. |
| 2017/0115689 A1 | 4/2017 | Liu |
| 2017/0116897 A1 | 4/2017 | Ahn et al. |
| 2017/0131460 A1 | 5/2017 | Lin et al. |
| 2017/0139209 A9 | 5/2017 | Evans et al. |
| 2017/0139211 A1 | 5/2017 | Trail |
| 2017/0139213 A1 | 5/2017 | Schmidtlin |
| 2017/0148215 A1 | 5/2017 | Aksoy et al. |
| 2017/0168302 A1 | 6/2017 | McDowall et al. |
| 2017/0168566 A1 | 6/2017 | Osterhout et al. |
| 2017/0171533 A1 | 6/2017 | Benitez et al. |
| 2017/0176753 A1 | 6/2017 | Shi et al. |
| 2017/0176755 A1 | 6/2017 | Cai et al. |
| 2017/0176818 A1 | 6/2017 | Shi et al. |
| 2017/0184776 A1 | 6/2017 | El-Ghoroury et al. |
| 2017/0184848 A1 | 6/2017 | Vallius |
| 2017/0185037 A1 | 6/2017 | Lee et al. |
| 2017/0192198 A1 | 7/2017 | Bristol et al. |
| 2017/0192240 A1 | 7/2017 | Drinkwater et al. |
| 2017/0199384 A1 | 7/2017 | Yeoh et al. |
| 2017/0199496 A1 | 7/2017 | Grata et al. |
| 2017/0205877 A1 | 7/2017 | Qin |
| 2017/0208297 A1 | 7/2017 | Yeoh et al. |
| 2017/0212351 A1 | 7/2017 | Schowengerdt et al. |
| 2017/0223344 A1 | 8/2017 | Kaehler |
| 2017/0227771 A1 | 8/2017 | Sverdrup |
| 2017/0235126 A1 | 8/2017 | DiDomenico |
| 2017/0235143 A1 | 8/2017 | Chi et al. |
| 2017/0236463 A1 | 8/2017 | Chi et al. |
| 2017/0237974 A1 | 8/2017 | Samec et al. |
| 2017/0242255 A1 | 8/2017 | Border et al. |
| 2017/0248750 A1 | 8/2017 | Curtis et al. |
| 2017/0248790 A1 | 8/2017 | Cheng |
| 2017/0251201 A1 | 8/2017 | Sissom et al. |
| 2017/0255015 A1 | 9/2017 | Geng et al. |
| 2017/0255016 A1 | 9/2017 | Tinch et al. |
| 2017/0264879 A1 | 9/2017 | Zhou |
| 2017/0269367 A1 | 9/2017 | Qin |
| 2017/0269368 A1 | 9/2017 | Yun et al. |
| 2017/0269369 A1 | 9/2017 | Qin |
| 2017/0270707 A1 | 9/2017 | Kass |
| 2017/0276948 A1 | 9/2017 | Welch et al. |
| 2017/0285347 A1 | 10/2017 | Cai et al. |
| 2017/0293141 A1 | 10/2017 | Schowengerdt et al. |
| 2017/0293145 A1 | 10/2017 | Miller et al. |
| 2017/0299864 A1 | 10/2017 | Vallius et al. |
| 2017/0307891 A1 | 10/2017 | Bucknor et al. |
| 2017/0316736 A1 | 11/2017 | Hughes et al. |
| 2017/0322419 A1 | 11/2017 | TeKolste et al. |
| 2017/0323615 A1 | 11/2017 | Hazra et al. |
| 2017/0329075 A1 | 11/2017 | Yeoh et al. |
| 2017/0329140 A1 | 11/2017 | Yeoh et al. |
| 2017/0336639 A1 | 11/2017 | Gao et al. |
| 2017/0343732 A1 | 11/2017 | Richards |
| 2017/0343820 A1 | 11/2017 | Osterhout |
| 2017/0344114 A1 | 11/2017 | Osterhout et al. |
| 2017/0358136 A1 | 12/2017 | Gollier et al. |
| 2017/0371159 A1 | 12/2017 | Yoon |
| 2017/0371184 A1 | 12/2017 | Shtukater |
| 2018/0039083 A1 | 2/2018 | Miller et al. |
| 2018/0039084 A1 | 2/2018 | Schowengerdt |
| 2018/0039106 A1 | 2/2018 | Alonso |
| 2018/0045965 A1 | 2/2018 | Schowengerdt |
| 2018/0045973 A1 | 2/2018 | Evans et al. |
| 2018/0045974 A1 | 2/2018 | Eash et al. |
| 2018/0045984 A1 | 2/2018 | Evans et al. |
| 2018/0045985 A1 | 2/2018 | Eash et al. |
| 2018/0048814 A1 | 2/2018 | Evans et al. |
| 2018/0048881 A1 | 2/2018 | Eash et al. |
| 2018/0048882 A1 | 2/2018 | Eash et al. |
| 2018/0052276 A1 | 2/2018 | Klienman et al. |
| 2018/0052277 A1 | 2/2018 | Schowengerdt et al. |
| 2018/0053284 A1 | 2/2018 | Rodriguez et al. |
| 2018/0061121 A1 | 3/2018 | Yeoh et al. |
| 2018/0061139 A1 | 3/2018 | Rodriguez et al. |
| 2018/0067318 A1 | 3/2018 | St. Hilaire |
| 2018/0067319 A1 | 3/2018 | Border et al. |
| 2018/0074318 A1 | 3/2018 | Wheelwright et al. |
| 2018/0074319 A1 | 3/2018 | Wheelwright et al. |
| 2018/0074320 A1 | 3/2018 | Wheelwright et al. |
| 2018/0074323 A1 | 3/2018 | Wheelwright et al. |
| 2018/0074324 A1 | 3/2018 | Wheelwright et al. |
| 2018/0074325 A1 | 3/2018 | Wheelwright et al. |
| 2018/0074340 A1 | 3/2018 | Robbins et al. |
| 2018/0080803 A1 | 3/2018 | Kaehler |
| 2018/0082644 A1 | 3/2018 | Bohn |
| 2018/0367769 A1* | 12/2018 | Greenberg .......... G02B 27/0172 |

\* cited by examiner

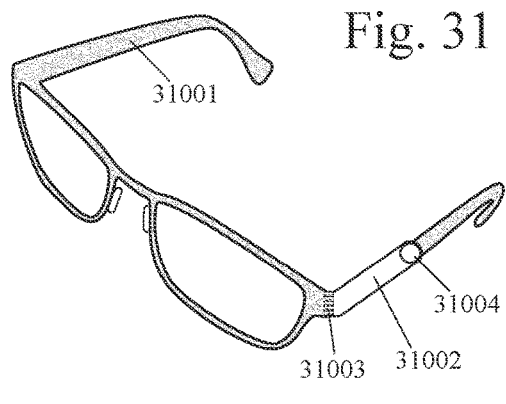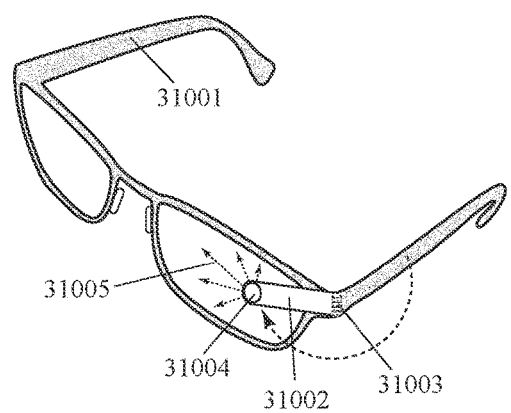
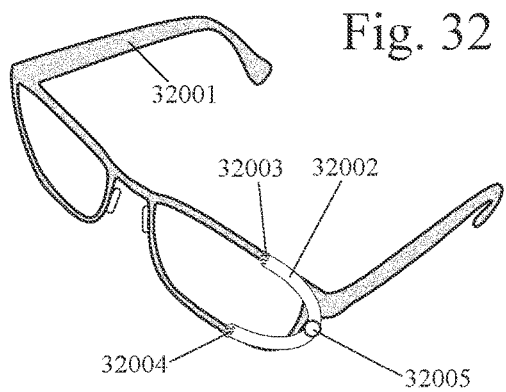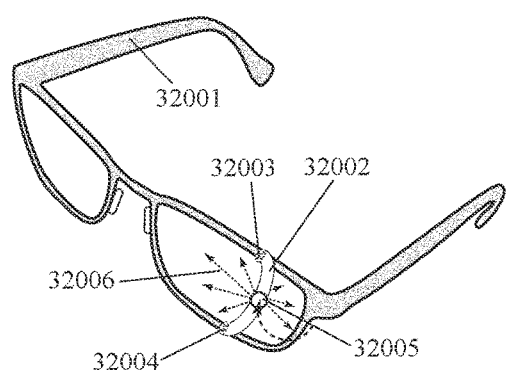
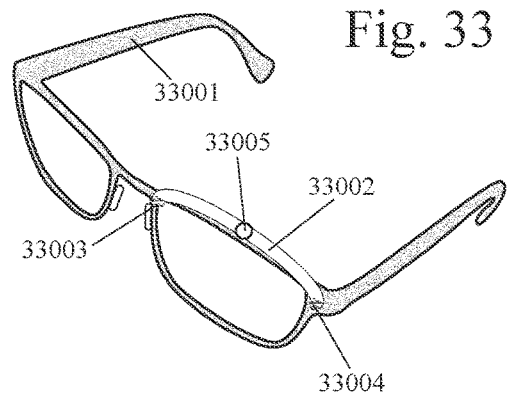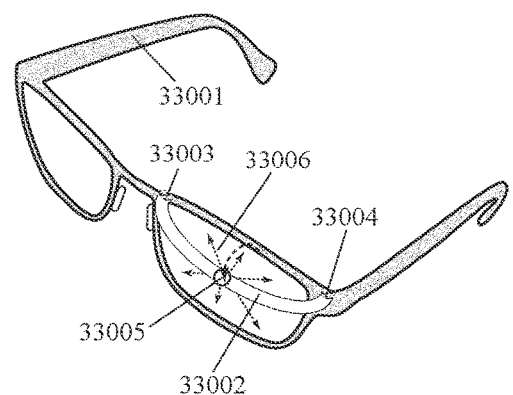

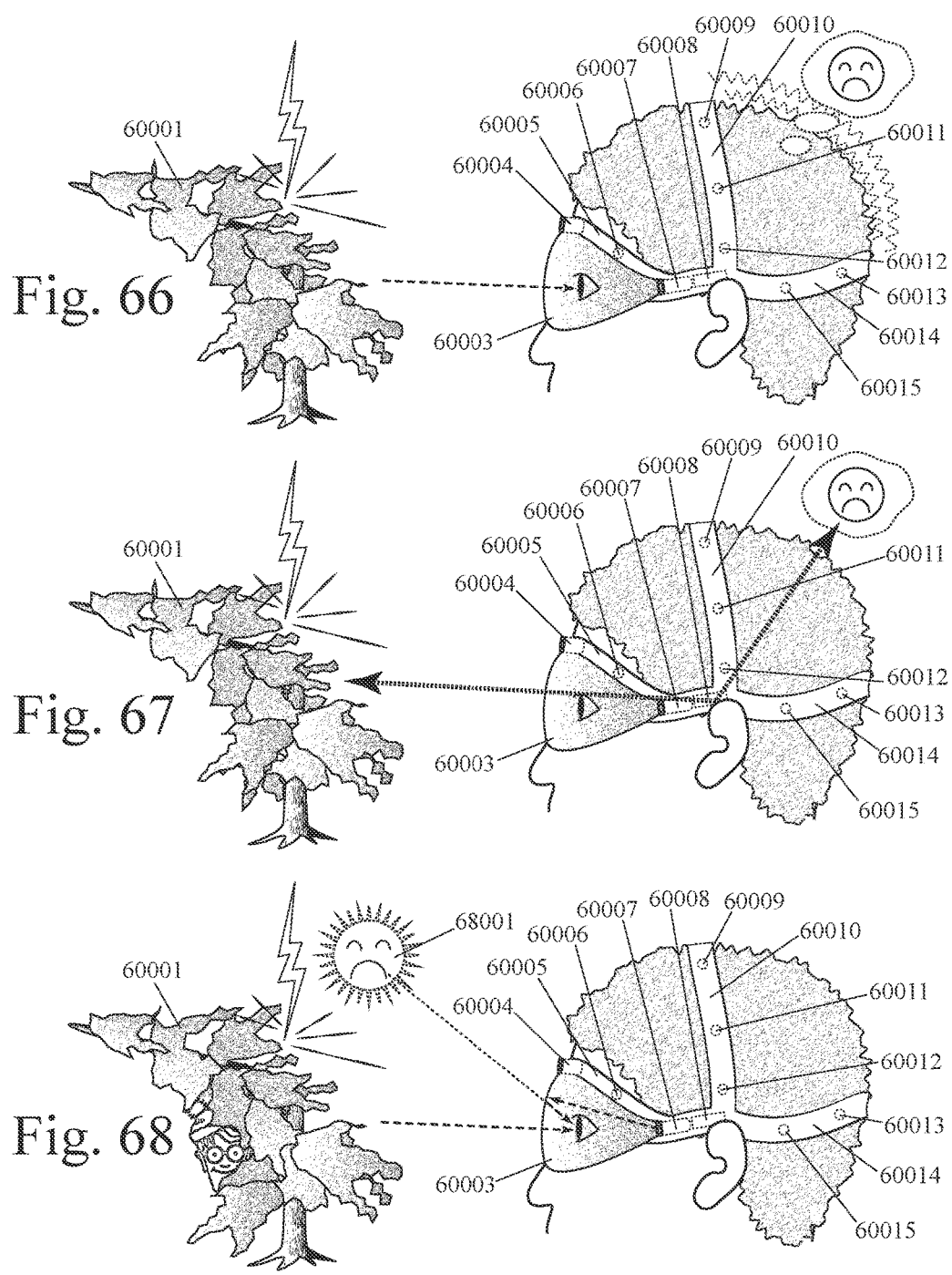

AUGMENTED REALITY EYEWEAR WITH VAPE OR WEAR TECHNOLOGY

CROSS-REFERENCE TO RELATED APPLICATIONS

This patent application:

claims the priority benefit of U.S. provisional patent application 62/646,856 by Robert A. Connor entitled "Augmented Reality Eyewear with a Ventral-to-Dorsal Array of Light Emitters along an Eyewear Side Piece" filed on Mar. 22, 2018;

claims the priority benefit of U.S. provisional patent application 62/638,087 by Robert A. Connor entitled "Augmented Reality Eyewear with Volumetric Annular Photon Emission (VAPE) or Wear Technology" filed on Mar. 3, 2018;

claims the priority benefit of U.S. provisional patent application 62/624,699 by Robert A. Connor entitled "Augmented Reality Optics with Volumetric Annular Photon Emission (VAPE) or Wear Technology including a Fresnel Lens" filed on Jan. 31, 2018;

claims the priority benefit of U.S. provisional patent application 62/572,328 by Robert A. Connor entitled "Augmented Reality Eyewear with a Plurality of Reflective Moving Louvers" filed on Oct. 13, 2017;

claims the priority benefit of U.S. provisional patent application 62/563,798 by Robert A. Connor entitled "Augmented Reality Eyewear with VAPE or Wear Technology" filed on Sep. 27, 2017;

claims the priority benefit of U.S. provisional patent application 62/561,834 by Robert A. Connor entitled "Augmented Reality Eyewear with Electromagnetic Perturbation of a Flexible Optical Layer for Localized Occlusion of Environmental Light Rays" filed on Sep. 22, 2017; and claims the priority benefit of U.S. provisional patent application 62/528,331 by Robert A. Connor entitled "Brainwave-Controlled Augmented Reality Eyewear" filed on Jul. 3, 2017.

The entire contents of these related applications are incorporated herein by reference.

FEDERALLY SPONSORED RESEARCH

Not Applicable

SEQUENCE LISTING OR PROGRAM

Not Applicable

BACKGROUND

Field of Invention

This invention relates to augmented reality eyewear with Volumetric Annular Photon Emission (VAPE) technology.

Introduction

Augmented Reality (AR) can allow a person to simultaneously see their environment and virtual objects displayed in their field of vision. Augmented reality can include simulated interactions between real objects in the environment and virtual objects. It can also include interactions between a person and virtual objects. Augmented reality has numerous potential applications in the fields of commerce and shopping, defense, diet and nutritional improvement, education, engineering, entertainment, exploration, gaming, interior design, maintenance, manufacturing, medicine, movies, navigation and transportation, public safety, socializing, and sports.

There has been considerable progress toward the creation of Augmented Reality (AR) eyewear which allows a person to see their environment and virtual objects displayed in their field of vision. However, challenges remain. A first challenge is the lack of brightness of virtual objects. In most, if not all, AR eyewear designs, beams of light from virtual image projectors must interact with multiple semi-reflective surfaces, losing intensity with each such interaction. As a result, a virtual image may be seen with only a fraction of the original intensity of light from an image projector. A second challenge is the bulky and obtrusive appearance of AR designs. Many AR designs require large headsets which would be obtrusive to wear in public or projections which stick out a considerable distance from the front of eyewear. There remains a need for Augmented Reality (AR) eyewear which can project virtual objects with minimal light loss in transmission and which is relatively unobtrusive in appearance.

Review of the Prior Art

It can be challenging trying to classify prior art in this field into discrete categories. There is overlap and some prior art could be classified in multiple categories. However, classification of the prior art into discrete categories, even if imperfect, can be an invaluable part of reviewing the prior art. Towards this end, 25 categories of prior art related to augmented reality eyewear are identified and briefly discussed herein. For each category, specific examples of prior art (including patent or patent application number, inventor, publication date, and title) are provided. It is hoped that the reader will find this categorization and review of the prior art to be useful.

The 25 categories of art which are used for this review are as follows: 1) curved mirror, 2) mirror array, 3) beamsplitter, 4) selective environmental light blocking, 5) microprojector array, 6) pixel size variation, 7) multiple display areas, 8) scanning (moving) optical beam, 9) wedge-shaped optics, 10) microlens array, 11) Fresnel lens, 12) freeform optics, 13) waveguides with different beam angles, 14) waveguides with different wavelengths, 15) (total) internal reflection waveguide, 16) liquid crystal, 17) optical fiber, 18) variable-focus lens, 19) multiple focal planes, 20) polarized light, 21) collimated light, 22) holographic projection, 23) adjustable interpupillary distance, 24) eye/head movement tracking, and 25) other relevant technology.

1. Curved Mirror:

Light beams from one or more light emitters can be redirected by a curved mirror in order to create virtual objects in a person's field of vision. Augmented reality eyewear in the prior art which uses curved mirrors includes: U.S. Pat. No. 6,690,516 (Aritake et al., Feb. 10, 2004) and 20010010598 (Aritake et al., Aug. 2, 2001) "Head Mount Type Display Device"; 20180067319 (Border et al., Mar. 8, 2018) "Optical Configurations for Head-Worn See-Through Displays"; 20170242255 (Border et al., Aug. 24, 2017) "See-Through Computer Display Systems"; U.S. Pat. No. 9,134,534 (Border et al., Sep. 15, 2015) and 20120236030 (Border et al., Sep. 20, 2012) "See-Through Near-Eye Display Glasses Including a Modular Image Source"; 20120235887 (Border et al., Sep. 20, 2012) "See-Through Near-Eye Display Glasses Including a Partially Reflective, Partially Transmitting Optical Element and an Optically Flat Film"; and U.S. Pat. No. 4,026,641 (Bosserman et al., May 31, 1977) "Toric Reflector Display."

2. Mirror Array:

Light beams from one or more light emitters can be redirected by a mirror array (e.g. a moving micromirror array) in order to create virtual objects in a person's field of vision. Augmented reality eyewear in the prior art which uses mirror arrays includes: 20150248006 (Schowengerdt, Sep. 3, 2015) "Circular Diffractive Optical Elements for Augmented or Virtual Reality"; 20150235439 (Schowengerdt, Aug. 20, 2015) "Combining Display Elements Having Different Frame Rates and Bit Depths for Augmented or Virtual Reality"; 20150248046 (Schowengerdt, Sep. 3, 2015) "Controlling Diffractive Optical Elements for Augmented or Virtual Reality"; 20150235470 (Schowengerdt, Aug. 20, 2015) "Coupling a Plurality of Multicore Assemblies Polished at an Angle for Augmented or Virtual Reality"; 20150235472 (Schowengerdt, Aug. 20, 2015) "Delivering Light Beams at a Plurality of Angles for Augmented or Virtual Reality"; U.S. Pat. No. 9,841,601 (Schowengerdt, Dec. 12, 2017) and 20160110912 (Schowengerdt, Apr. 21, 2016) "Delivering Viewing Zones Associated with Portions of an Image for Augmented or Virtual Reality"; 20150243104 (Schowengerdt, Aug. 27, 2015) "Delivering Virtual Image Slices At Different Depth Planes for Augmented or Virtual Reality"; 20150235460 (Schowengerdt et al., Aug. 20, 2015) "Diffractive Optical Elements Used for Augmented or Virtual Reality"; 20180082644 (Bohn, Mar. 22, 2018) "Display Engines for Use with Optical Waveguides"; and 20150235473 (Schowengerdt, Aug. 20, 2015) "Displaying Augmented Reality or Virtual Reality Through a Substrate Coupled to the User's Eye."

Augmented reality eyewear with a mirror array also includes: 20150235457 (Schowengerdt, Aug. 20, 2015) "Driving Light Patterns to Exit Pupils for Augmented or Virtual Reality"; U.S. Pat. No. 8,189,263 (Wang et al., May 29, 2012) "Image Waveguide with Mirror Arrays"; 20150248010 (Schowengerdt, Sep. 3, 2015) "Inducing Phase Delays in a Multicore Assembly for Augmented or Virtual Reality"; 20150241696 (Schowengerdt et al., Aug. 27, 2015) "Inducing Phase Delays to Vary an Aggregate Wavefront for Augmented or Virtual Reality"; U.S. Pat. No. 6,538,799 (McClelland et al., Mar. 25, 2003) "Magnetically Actuated Torsional Micro-Mechanical Mirror System"; U.S. Pat. No. 9,310,559 (MacNamara, Apr. 12, 2016) and 20140003762 (MacNamara, Jan. 2, 2014) "Multiple Depth Plane Three-Dimensional Display Using a Wave Guide Reflector Array Projector"; 20150243094 (Schowengerdt et al., Aug. 27, 2015) "Producing an Aggregate Wavefront for Augmented or Virtual Reality"; U.S. Pat. No. 8,917,453 (Bohn, Dec. 23, 2014) "Reflective Array Waveguide"; 20150234254 (Schowengerdt, Aug. 20, 2015) "Separately Addressable Diffractive Optical Elements for Augmented or Virtual Reality"; U.S. Pat. No. 6,201,629 (McClelland et al., Mar. 13, 2001) "Torsional Micro-Mechanical Mirror System"; 20150235459 (Schowengerdt, Aug. 20, 2015) "Using an Eye Box for Augmented or Virtual Reality"; 20150248790 (Schowengerdt, Sep. 3, 2015) "Using Circularly-Symmetric Diffractive Optical Elements for Augmented or Virtual Reality"; 20150235421 (Schowengerdt, Aug. 20, 2015) "Using MEMS Louvers to Change an Angle of Light for Augmented or Virtual Reality"; and U.S. Pat. No. 8,743,464 (Amirparviz, Jun. 3, 2014) "Waveguide with Embedded Mirrors."

3. Beamsplitter:

A beamsplitter (or other semi-reflective surface) can be used to make light rays from an environmental object and light rays comprising a virtual object appear to come from the same location in a person's field of vision. Augmented reality eyewear in the prior art with a beamsplitter (or other semi-reflective surface) includes: 20120200499 (Osterhout et al., Aug. 9, 2012) "AR Glasses with Event, Sensor, and User Action Based Control of Applications Resident on External Devices with Feedback"; 20150309316 (Osterhout et al., Oct. 29, 2015), 20170168566 (Osterhout et al., Jun. 15, 2017) and 20170344114 (Osterhout et al., Nov. 30, 2017) "AR Glasses with Predictive Control of External Device Based on Event Input"; 20120200601 (Osterhout et al., Aug. 9, 2012) "AR Glasses with State Triggered Eye Control Interaction with Advertising Facility"; 20170285347 (Cai et al., Oct. 5, 2017) "Augmented/Virtual Reality Near-Eye Displays with Edge Imaging Lens Comprising a Plurality of Display Devices"; U.S. Pat. No. 9,285,591 (Gupta et al., Mar. 15, 2016) "Compact Architecture for Near-To-Eye Display System"; U.S. Pat. No. 7,542,209 (McGuire, Jun. 2, 2009) "Compact Head Mounted Display Devices with Tilted/Decentered Lens Element"; U.S. Pat. No. 9,091,850 (Miao et al., Jul. 28, 2015) "Compact See-Through Display System"; U.S. Pat. No. 6,483,483 (Kosugi et al., Nov. 19, 2002) "Eyeglasses Type Image Display Apparatus"; and U.S. Pat. No. 9,128,281 (Osterhout et al., Sep. 8, 2015) "Eyepiece with Uniformly Illuminated Reflective Display."

Augmented reality eyewear with a beamsplitter (or other semi-reflective surface) also includes: U.S. Pat. No. 5,886,822 (Spitzer, Mar. 23, 1999) "Image Combining System for Eyeglasses and Face Masks"; U.S. Pat. No. 9,726.891 (Webster et al., Aug. 8, 2017) "Left and Right Eye Optical Paths with Shared Optical Element for Head-Mounted Display Device"; 20020167536 (Valdes et al., Nov. 14, 2002) "Method, System and Device for Augmented Reality"; 20150235454 (Schowengerdt, Aug. 20, 2015) "Providing Augmented or Virtual Reality Using Transmissive Beamsplitters"; 20150177519 (Cakmakci et al., Jun. 25, 2015) "See-Through Eyepiece for Head Wearable Display"; U.S. Pat. No. 8,477,425 (Border et al., Jul. 2, 2013) and 20120212398 (Border et al., Aug. 8,23 2012) "See-Through Near-Eye Display Glasses Including a Partially Reflective, Partially Transmitting Optical Element"; U.S. Pat. No. 8,482,859 (Border et al., Jul. 9, 2013) and 20120212399 (Border et al., Aug. 23, 2012) "See-Through Near-Eye Display Glasses Wherein Image Light Is Transmitted to and Reflected from an Optically Flat Film"; and U.S. Pat. No. 9,057,826 (Gupta et al., Jun. 16, 2015) "See-Through Near-To-Eye Display with Eye Prescription."

4. Selective Environmental Light Blocking:

One of the challenges in augmented reality is that projected virtual objects generally appear dim and transparent relative to environmental objects. This can be addressed by blocking or otherwise modifying light from the environment in a person's field of vision in the area where a virtual object is projected. Methods to address this include selectively-blocking environmental light in the area of a projected virtual object or surrounding a virtual object with a virtual "halo." Augmented reality eyewear with selective blocking or other modification of environmental light (in the area of a projected virtual object) includes: 20110221793 (King et al., Sep. 15, 2011) "Adjustable Display Characteristics in an Augmented Reality Eyepiece"; U.S. Pat. No. 9,547,174 (Gao et al., Jan. 17, 2017), U.S Pat. No. 9,726.893 (Gao et al., Aug. 8, 2017) and 20170031163 (Gao et al., Feb. 2, 2017) "Apparatus for Optical See-Through Head Mounted Display with Mutual Occlusion and Opaqueness Control Capability"; 20150241700 (Schowengerdt, Aug. 27, 2015) "Attenuating Outside Light for Augmented or Virtual Reality"; 20110227813 (Haddick et al., Sep. 22, 2011) "Augmented Reality Eyepiece with Secondary Attached Optic for Surroundings Environment Vision Correction"; 20150302658 (O'Connor et al., Oct. 22, 2015) "Compensating for Ambient Light in Augmented or Virtual Reality Systems"; U.S. Pat. No. 9,626,936 (Bell, Apr. 18, 2017) "Dimming Module for Augmented and Virtual Reality"; 20170270707 (Kass, Sep. 21, 2017) "Direct Light Compensation Technique for Augmented Reality System"; 20170039907 (Jepsen, Feb. 9, 2017) "Display with a Tunable Mask for Augmented Reality"; U.S. Pat. No. 9,904,058 (Yeoh et al., Feb. 27, 2018) and 20170329140 (Yeoh et al., Nov. 16, 2017) "Distributed Light Manipulation Over Imaging Waveguide"; 20120326948 (Crocco et al., Dec. 27, 2012) "Environmental-Light Filter for See-Through Head-Mounted Display Device"; U.S. Pat. No. 5,943,171 (Budd et al., Aug. 24, 1999) "Head Mounted Displays Utilizing Reflection Light Valves"; and U.S. Pat. No. 9,389,423 (Bhardwaj et al., Jul. 12, 2016) "Head Wearable Display with Adjustable Transparency."

Augmented reality eyewear with selective modification of environmental light also includes: 20170168302 (McDowall et al., Jun. 15, 2017) "Head-Mounted Augmented Reality Display"; 20150241702 (Schowengerdt, Aug. 27, 2015) "Lens Array Operatively Coupled to a Spatial Light Modulator for Augmented or Virtual Reality"; U.S. Pat. No. 7,359,564 (Keam et al., Apr. 15, 2008) "Method and System for Cancellation of Ambient Light Using Light Frequency"; 20170323615 (Hazra et al., Nov. 9, 2017) "Methods and Apparatus for Active Transparency Modulation"; 20160109652 (Schowengerdt, Apr. 21, 2016) "Modifying Light of a Multicore Assembly to Produce a Plurality of Viewing Zones"; 20150248786 (Schowengerdt, Sep. 3, 2015) "Modulating Light Intensity to Enable Viewing of Dark Virtual Objects"; U.S. Pat. No. 8,941,559 (Bar-Zeev et al., Jan. 27, 2015) and U.S. Pat. No. 9,286,730 (Bar-Zeev et al., Mar. 15, 2016) "Opacity Filter for Display Device"; U.S. Pat. No. 9,851,478 (Price et al., Dec. 26, 2017) "Optical Cross Talk Mitigation for Optical Device Having Disrupting Features Formed on a Shield"; U.S. Pat. No. 9,223,138 (Bohn, Dec. 29, 2015) "Pixel Opacity for Augmented Reality"; U.S. Pat. No. 9,122,053 (Geisner et al., Sep. 1, 2015) "Realistic Occlusion for a Head Mounted Augmented Reality Display"; 20150243099 (Schowengerdt, Aug. 27, 2015) "Rendering a Halo Around Virtual Objects for Displaying Augmented or Virtual Reality"; 20150243103 (Schowengerdt, Aug. 27, 2015) "Rendering Dark Virtual Objects as Blue to Facilitate Viewing Augmented or Virtual Reality"; 20150243102 (Schowengerdt, Aug. 27, 2015) "Rendering Visual Emphasis Proximate to Virtual Objects for Augmented or Virtual Reality"; and 20170343820 (Osterhout, Nov. 30, 2017) "See-Through Computer Display Systems."

Augmented reality eyewear with selective modification of environmental light also includes: 9097891 (Border et al., Aug. 4, 2015) and 20120242678 (Border et al., Sep. 27, 2012) "See-Through Near-Eye Display Glasses Including an Auto-Brightness Control for the Display Brightness Based on the Brightness in the Environment"; U.S. Pat. No. 9,129,295 (Border et al., Sep. 8, 2015) and 20120235900 (Border et al., Sep. 20, 2012) "See-Through Near-Eye Display Glasses with a Fast Response Photochromic Film System for Quick Transition from Dark to Clear"; 20150243097 (Schowengerdt, Aug. 27, 2015) "Selective Attenuation of Outside Light in an Augmented or Virtual Reality Device"; U.S. Pat. No. 6,559,813 (DeLuca et al., May 6, 2003) "Selective Real Image Obstruction in a Virtual Reality Display Apparatus and Method"; 20150241699 (Schowengerdt, Aug. 27, 2015) "Selectively Attenuating Light From the Outside World for Augmented or Virtual Reality"; 20170090194 (Hayes, Mar. 30, 2017) "System and Method for Subtractive Augmented Reality and Display Contrast Enhancement"; U.S. Pat. No. 8,950,867 (MacNamara, Feb. 10, 2015), 20150124317 (MacNamara, May 7, 2015) and 20170023794 (MacNamara, Jan. 26, 2017) "Three Dimensional Virtual and Augmented Reality Display System"; 20150319342 (Schowengerdt, Nov. 5, 2015) "Using a Halo to Facilitate Viewing Dark Virtual Objects in Augmented or Virtual Reality"; 20160109706 (Schowengerdt et al., Apr. 21, 2016) "Using a Plurality of Stacked Waveguides for Augmented or Virtual Reality Display"; 20150243098 (Schowengerdt, Aug. 27, 2015) "Using an Array of Spatial Light Modulators for Selective Attenuation"; 20150241703 (Schowengerdt, Aug. 27, 2015) "Using Spatial Light Modulators to Selectively Attenuate Light From an Outside Environment for Augmented or Virtual Reality"; and 20150205126 (Schowengerdt, Jul. 23, 2015) "Virtual and Augmented Reality Systems and Methods."

5. Microprojector Array:

A microprojector array can be used to selectively direct beams of light comprising a virtual object in a person's field of vision. Augmented reality eyewear in the prior art with microprojector arrays includes: 20150235468 (Schowengerdt, Aug. 20, 2015) "Coupling Optical Elements to an Array of Microprojectors for Augmented or Virtual Reality"; 20150235444 (Schowengerdt, Aug. 20, 2015) "Methods and System for Using Microprojectors for Augmented or Virtual Reality"; 20160109708 (Schowengerdt, Apr. 21, 2016) "Projecting Images to a Waveguide Through Microprojectors for Augmented or Virtual Reality"; 20150235440 (Schowengerdt, Aug. 20, 2015) "Providing Augmented Reality Using Microprojectors"; and 20150243090 (Schowengerdt, Aug. 27, 2015) "Using Polished Microprojectors for Augmented or Virtual Reality."

6. Pixel Size Variation:

Augmented reality eyewear with variation in pixel size includes: 20150235463 (Schowengerdt, Aug. 20, 2015) "Modulating a Size of Pixels Displayed to a User for Augmented or Virtual Reality"; 20150243092 (Schowengerdt, Aug. 27, 2015) "Pixel Size Modulation for Augmented or Virtual Reality"; and 20150243089 (Schowengerdt, Aug. 27, 2015) "Varying Pixel Size Based on Line Pitch for Augmented or Virtual Reality."

7. Multiple Display Areas:

Having multiple display areas allows flexibility in the creation of virtual objects in a person's field of vision. Augmented reality eyewear in the prior art with multiple display areas includes: 20170116897 (Ahn et al., Apr. 27, 2017) "Image Display Device and Method Using Unidirectional Beam"; 20150277123 Chaum et al., Oct. 1, 2015) "Nearto Eye Display and Appliance"; 20100149073 (Chaum et al., Jun. 17, 2010) "Nearto Eye Display System and Appliance"; 20160292921 (Evans et al., Oct. 6, 2016) "System, Apparatus, and Method for Displaying an Image Using Light of Varying Intensities"; and 20170176755 (Cai et al., Jun. 22, 2017) "Systems and Methods for Augmented Near-Eye Wearable Displays."

8. Scanning (Moving) Optical Beam:

Scanning (e.g. moving) projected beams of light over a lens, beamsplitter, or other optical member in a person's field of vision can enable flexibility in the creation of virtual objects. Augmented reality eyewear in the prior art with a scanning (e.g. moving) optical element includes: 20150248789 (Abovitz et al., Sep. 3, 2015) "Augmented Reality System Totems and Methods of Using Same"; 20170038579 (Yeoh et al., Feb. 9, 2017) "Collimating Fiber Scanner Design with Inward Pointing Angles in Virtual/

Augmented Reality System"; U.S. Pat. No. 5,715,337 (Spitzer et al., Feb. 3, 1998) "Compact Display System"; 20150234477 (Abovitz et al., Aug. 20, 2015) "Method and System for Determining User Input Based on Gesture"; 20150243100 (Abovitz et al., Aug. 27, 2015) "Method and System for Determining User Input Based on Totem"; 20150243106 (Abovitz et al., Aug. 27, 2015) "Method and System for Enhancing Job Performance Using an Augmented Reality System"; 20150242575 (Abovitz et al., Aug. 27, 2015) "Method and System for Facilitating Rehabilitation Using an Augmented Reality System"; 20150248793 (Abovitz et al., Sep. 3, 2015) "Method and System for Facilitating Surgery Using an Augmented Reality System"; 20150242943 (Abovitz et al., Aug. 27, 2015) "Method and System for Generating a Retail Experience Using an Augmented Reality System"; and 20150248169 (Abovitz et al., Sep. 3, 2015) "Method and System for Generating a Virtual User Interface Related to a Physical Entity."

Augmented reality eyewear with a scanning optical element also includes: 20150248170 (Abovitz et al., Sep. 3, 2015) "Method and System for Generating a Virtual User Interface Related to a Totem"; 20150235447 (Abovitz et al., Aug. 20, 2015) "Method and System for Generating Map Data From an Image"; 20150248791 (Abovitz et al., Sep. 3, 2015) "Method and System for Generating Virtual Rooms"; 20150235370 (Abovitz et al., Aug. 20, 2015) "Method and System for Identifying a User Location"; 20150235088 (Abovitz et al., Aug. 20, 2015) "Method and System for Inserting Recognized Object Data Into a Virtual World"; 20150243105 (Abovitz et al., Aug. 27, 2015) "Method and System for Interacting with User Interfaces"; 20150248792 (Abovitz et al., Sep. 3, 2015) "Method and System for Modifying Display of a Sporting Event Using an Augmented Reality System"; 20150247723 (Abovitz et al., Sep. 3, 2015) "Method and System for Obtaining Texture Data of a Space"; 20150235441 (Abovitz et al., Aug. 20, 2015) "Method and System for Rendering Virtual Content"; 20150248788 (Abovitz et al., Sep. 3, 2015) "Method and System for Retrieving Data in Response to User Activity"; 20150248787 (Abovitz et al., Sep. 3, 2015) "Method and System for Retrieving Data in Response to User Input"; 20150241959 (Abovitz et al., Aug. 27, 2015) "Method and System for Updating a Virtual World"; and 20170097506 (Schowengerdt et al., Apr. 6, 2017) "Microlens Collimator for Scanning Optical Fiber in Virtual/Augmented Reality System."

Augmented reality eyewear with a scanning optical element also includes: 20150222884 (Cheng, Aug. 6, 2015) "Multi-Focal Display System and Method"; U.S. Pat. No. 9,541,383 (Abovitz et al., Jan. 10, 2017) and 20150247975 (Abovitz et al., Sep. 3, 2015) "Optical System Having a Return Planar Waveguide"; U.S. Pat. No. 9,651,368 (Abovitz et al., May 16, 2017) and 20150247976 (Abovitz et al., Sep. 3, 2015) "Planar Waveguide Apparatus Configured to Return Light Therethrough"; U.S. Pat. No. 9,857,170 (Abovitz et al., Jan. 2, 2018) and 20150241705 (Abovitz et al., Aug. 27, 2015) "Planar Waveguide Apparatus Having a Plurality of Diffractive Optical Elements"; U.S. Pat. No. 9,612,403 (Abovitz et al., Apr. 4, 2017), U.S. Pat. No. 9,671,566 (Abovitz et al., Jun. 6, 2017), 20150016777 (Abovitz et al., Jan. 15, 2015), 20150309263 (Abovitz et al., Oct. 29, 2015) and 20150309264 (Abovitz et al., Oct. 29, 2015) "Planar Waveguide Apparatus with Diffraction Element(s) and System Employing Same"; 20170208297 (Yeoh et al., Jul. 20, 2017) "Polarizing Maintaining Optical Fiber in Virtual/Augmented Reality System"; 20170236463 (Chi et al., Aug. 17, 2017) "Scanned Micro LED Array for Waveguide Display"; 20150268415 (Schowengerdt et al., Sep. 24, 2015) "Ultra-High Resolution Scanning Fiber Display"; 20150243096 (Schowengerdt, Aug. 27, 2015) "Using a Fiber Scanning Display to Present a Lightfield to a User"; 20170097507 (Yeoh et al., Apr. 6, 2017) "Virtual/Augmented Reality System Having Reverse Angle Diffraction Grating"; and 20170235143 (Chi et al., Aug. 17, 2017) "Waveguide Display with Two-Dimensional Scanner."

9. Wedge-Shaped Optics:

A wedge-shaped optical member (e.g. prism or lens) can direct beams of light from a first location which is peripheral to (e.g. to the side of) a person's eye to a second location which is in front of the person's eye. Augmented reality eyewear in the prior art with a wedge-shaped optical member includes: U.S. Pat. No. 8,665,178 (Wang, Mar. 4, 2014) "Partially-Reflective Waveguide Stack and Heads-Up Display Using Same"; U.S. Pat. No. 9,436,980 (Powell, Sep. 6, 2016) and 20140098245 (Powell, Apr. 10, 2014) "Reducing Ghosting and Other Image Artifacts in a Wedge-Based Imaging System"; U.S. Pat. No. 8,467,133 (Miller, Jun. 18, 2013) and 20120218301 (Miller, Aug. 30, 2012) "See-Through Display with an Optical Assembly Including a Wedge-Shaped Illumination System"; U.S. Pat. No. 9,229,227 (Border et al., Jan. 5, 2016), 20120235883 (Border et al., Sep. 20, 2012) and 20160187654 (Border et al., Jun. 30, 2016) "See-Through Near-Eye Display Glasses with a Light Transmissive Wedge Shaped Illumination System"; 20150235442 (Schowengerdt, Aug. 20, 2015) "Using Wedge-Shaped Waveguides for Augmented or Virtual Reality"; and U.S. Pat. No. 9,244,277 (Cheng et al., Jan. 26, 2016) "Wide Angle and High Resolution Tiled Head-Mounted Display Device."

10. Microlens Array

A microlens array can selectively direct beams of light from (an array of) light emitters in order to create virtual objects in a person's field of vision. Augmented reality eyewear in the prior art with a microlens array includes: U.S. Pat. No. 9,720,228 (Harrison et al., Aug. 1, 2017) "Collimating Display with Pixel Lenses"; 20170139213 (Schmidtlin, May 18, 2017) "Combination Prism Array for Focusing Light"; 20170139211 (Trail, May 18, 2017) "Directed Display Architecture"; 20170038591 (Jepsen, Feb. 9, 2017) "Display with a Tunable Pinhole Array for Augmented Reality"; 20170038590 (Jepsen, Feb. 9, 2017) "Enhanced Pixel Resolution Through Non-Uniform Ocular Projection"; U.S. Pat. No. 5,883,606 (Smoot, Mar. 16, 1999) "Flat Virtual Displays for Virtual Reality"; U.S. Pat. No. 9,368,546 (Fleck et al., Jun. 14, 2016), U.S. Pat. No. 9,684,174 (Fleck et al., Jun. 20, 2017) and 20160282625 (Fleck et al., Sep. 29, 2016) "Imaging Structure with Embedded Light Sources"; 20170171533 (Benitez et al., Jun. 15, 2017) "Immersive Compact Display Glasses"; 20170371159 (Yoon, Dec. 28, 2017) "Lens Assembly with Multiple Lenses for Relaying Images"; 20170115432 (Schmidtlin, Apr. 27, 2017) "Microlens Array System with Multiple Discrete Magnification"; 20170269367 (Qin, Sep. 21, 2017) "Microlens Array-Based Near-Eye Display (NED)"; 20170205877 (Qin, Jul. 20, 2017) "Near-Eye Microlens Array Display Having Diopter Detection Device"; U.S. Pat. No. 9,841,537 (Luebke et al., Dec. 12, 2017) "Near-Eye Microlens Array Displays"; 20170039905 (Jepsen et al., Feb. 9, 2017) "Optical System for Retinal Projection from Near-Ocular Display"; 20150241701 (Schowengerdt, Aug. 27, 2015) "Pinhole Array Operatively Coupled to a Spatial Light Modulator for Augmented or Virtual Reality"; 20170039904 (Jepsen, Feb. 9, 2017) "Tile Array for Near-Ocular Display"; 20170269369 (Qin, Sep. 21, 2017) "Transmissive Augmented Reality Near-Eye Display"; and U.S. Pat. No. 6,999,238 (Glebov et al., Feb. 14, 2006) "Tunable Micro-Lens Array."

11. Fresnel Lens

A Fresnel lens can be used to redirect light beams from a lateral location to a central location for projection into a person's eye for the creation of virtual objects in the person's field of vision. Augmented reality eyewear in the prior art with a Fresnel lens includes: U.S. Pat. No. 9,134,535 (Dobschal et al., Sep. 15, 2015) "Display Device Having a Holding Device That Can Be Placed on the Head of a User"; 20180074320 (Wheelwright et al., Mar. 15, 2018) "Dynamic Draft for Fresnel Lenses"; 20170199496 (Grata et al., Jul. 13, 2017) "Dynamic Fresnel Projector"; 20180074323 (Wheelwright et al., Mar. 15, 2018) "Fresnel Lens with Dynamic Draft for Reduced Optical Artifacts"; 20180074324 (Wheelwright et al., Mar. 15, 2018) "Fresnel Lens with Dynamic Draft for Variable Gaze"; 20180074325 (Wheelwright et al., Mar. 15, 2018) "Fresnel Lens with Dynamic Pitch"; U.S. Pat. No. 9,632,315 (Smith et al., Apr. 25, 2017) "Head-Mounted Display Apparatus Employing One or More Fresnel Lenses"; U.S. Pat. No. 5,949,583 (Rallison et al., Sep. 7, 1999) "Head-Mounted Display with Image Generator, Fold Mirror and Mirror for Transmission to the Eye Position of the User"; 20180074319 (Wheelwright et al., Mar. 15, 2018) "Hybrid Fresnel Lens with Increased Field of View"; 20180074318 (Wheelwright et al., Mar. 15, 2018) "Hybrid Fresnel Lens with Reduced Artifacts"; and U.S. Pat. No. 9,519,084 (Thomas, Dec. 13, 2016), 20160370510 (Thomas, Dec. 22, 2016) and 20170075110 (Thomas, Mar. 16, 2017) "Securing a Fresnel Lens to a Refractive Optical Element."

12. Freeform Optics

Augmented reality eyewear in the prior art with freeform optical structures for creating virtual objects in a person's field of vision includes: 20110221659 (King et al., Sep. 15, 2011) "Augmented Reality Eyepiece with Freeform Optic, Image Source, and Optical Display"; 20150235418 (Schowengerdt, Aug. 20, 2015) "Determining User Accommodation to Display an Image at a Desired Focal Distance Using Freeform Optics"; 20150243107 (Schowengerdt, Aug. 27, 2015) "Displaying Augmented or Virtual Reality Through Freeform Optics"; U.S. Pat. No. 9,348,143 (Gao et al., May 24, 2016), U.S. Pat. No. 9,740,006 (Gao, Aug. 22, 2017), U.S. Pat. No. 9,753,286 (Gao et al., Sep. 5, 2017), 20120162549 (Gao et al., Jun. 28, 2012), 20140071539 (Gao, Mar. 13, 2014), 20160154245 (Gao et al., Jun. 2, 2016) and 20170336639 (Gao et al., Nov. 23, 2017) "Ergonomic Head Mounted Display Device and Optical System"; 20160011419 (Gao, Jan. 14, 2016) "Methods and Systems for Displaying Stereoscopy with a Freeform Optical System with Addressable Focus for Virtual and Augmented Reality"; 20150241707 (Schowengerdt, Aug. 27, 2015) "Modifying Light Using Freeform Optics for Augmented or Virtual Reality"; 20150248012 (Schowengerdt, Sep. 3, 2015) "Stacked Configuration of Freeform Optics for Augmented or Virtual Reality"; U.S. Pat. No. 9,804,397 (Schowengerdt et al., Oct. 31, 2017) "Using a Freeform Reflective and Lens Optical Component for Augmented or Virtual Reality Display"; 20150234191 (Schowengerdt, Aug. 20, 2015) "Using Freeform Optical Elements to Display Augmented or Virtual Reality"; and 20150309315 (Schowengerdt, Oct. 29, 2015) "Using Freeform Optics for Augmented or Virtual Reality."

13. Waveguides with Different Beam Angles

Augmented reality eyewear can employ multiple waveguides which direct beams of light at different angles in order to create virtual objects in a person's field of vision. Such augmented reality eyewear in the prior art includes: 20150235462 (Schowengerdt, Aug. 20, 2015) "Generating a Lightfield Using a Plurality of Spatial Light Modulators"; 20170316736 (Hughes et al., Nov. 2, 2017) "Sub-Pixel for a Display with Controllable Viewing Angle"; 20150235438 (Schowengerdt, Aug. 20, 2015) "Using a Display Assembly for Augmented or Virtual Reality"; 20150241704 (Schowengerdt et al., Aug. 27, 2015) "Using a Plurality of Waveguides Coupled with Edge Reflectors for Augmented or Virtual Reality"; 20150235461 (Schowengerdt, Aug. 20, 2015) "Using an Array of Spatial Light Modulators to Generate a Lightfield"; 20150235448 (Schowengerdt, Aug. 20, 2015) "Using Multiple Exit Pupils to Transmit Light Into a User's Pupil for Augmented or Virtual Reality"; U.S. Pat. No. 9,791,700 (Schowengerdt, Oct. 17, 2017) "Virtual and Augmented Reality Systems and Methods"; and 20150235458 (Schowengerdt et al., Aug. 20, 2015) "Waveguide Assembly Having Reflective Layers for Augmented or Virtual Reality."

14. Waveguides with Different Wavelengths

Augmented reality eyewear can employ multiple waveguides which direct beams of light with different wavelengths in order to create virtual objects in a person's field of vision. Such augmented reality eyewear in the prior art includes: 20160116739 (TeKolste et al., Apr. 28, 2016) and 20170322419 (TeKolste et al., Nov. 9, 2017) "Architectures and Methods for Outputting Different Wavelength Light Out of Waveguides"; 20170010466 (Klug et al., Jan. 12, 2017) "Display System with Optical Elements for In-Coupling Multiplexed Light Streams"; U.S. Pat. No. 9,671,615 (Vallius et al., Jun. 6, 2017) "Extended Field of View in Near-Eye Display Using Wide-Spectrum Imager"; 20160274362 (Tinch, Sep. 22, 2016) "Light Combiner for Augmented Reality Display Systems"; 20180052277 (Schowengerdt et al., Feb. 22, 2018) "Multi-Layer Diffractive Eyepiece"; 20170255016 (Tinch et al., Sep. 27, 2017) "Reflective Switching Device for Inputting Different Wavelengths of Light into Waveguides"; 20170212351 (Schowengerdt et al., Jul. 27, 2017) "Virtual and Augmented Reality Systems and Methods Having Unequal Numbers of Component Color Images Distributed Across Depth Planes"; and 20170329075 (Yeoh et al., Nov. 16, 2017) "Wavelength Multiplexing in Waveguides."

15. (Total) Internal Reflection Waveguide

Waveguides with (total) internal reflection are increasingly used in augmented reality eyewear. A common application of (total) internal reflection waveguides is to guide beams of light from a location which is peripheral relative to a person's eye to a location which is in front of the eye, from which it is redirected into the eye. Augmented reality eyewear in the prior art with (total) internal reflection waveguides includes: 20140176528 (Robbins, Jun. 26, 2014) "Auto-Stereoscopic Augmented Reality Display"; U.S. Pat. No. 6,204,974 (Spitzer, Mar. 20, 2001), U.S Pat. No. 6,356,392 (Spitzer, Mar. 12, 2002) and U.S. Pat. No. 6,384,982 (Spitzer, May 7, 2002) "Compact Image Display System for Eyeglasses or Other Head-Borne Frames"; U.S. Pat. No. 7,158,096 (Spitzer, Jan. 2, 2007), U.S. Pat. No. 7,843,403 (Spitzer, Nov. 30, 2010) and 20070103388 (Spitzer, May 10, 2007) "Compact, Head-Mountable Display Device with Suspended Eyepiece Assembly"; U.S. Pat. No. 9,897,811 (Martinez et al., Feb. 20, 2018) "Curved Eyepiece with Color Correction for Head Wearable Display"; U.S. Pat. No. 9,372,347 (Levola et al., Jun. 21, 2016) "Display System"; 20170248750 (Curtis et al., Jul. 31, 2017) "Display System Having a Plurality of Light Pipes for a Plurality of Light Emitters"; 20160341575 (Kaehler, Nov.

24, 2016) and 20180080803 (Kaehler, Mar. 22, 2018) "Dual Composite Light Field Device"; 20170108697 (El-Ghoroury et al., Apr. 20, 2017) "Dual-Mode Augmented/Virtual Reality (AR/VR) Near-Eye Wearable Displays"; U.S. Pat. No. 6,353,503 (Spitzer et al., Mar. 5, 2002) "Eyeglass Display Lens System Employing Off-Axis Optical Design"; U.S. Pat. No. 8,873,148 (Gupta et al., Oct. 28, 2014) "Eyepiece Having Total Internal Reflection Based Light Folding"; 20150260992 (Luttmann et al., Sep. 17, 2015) "Eyepiece with Switchable Reflector for Head Wearable Display"; 20150125109 (Robbins et al., May 7, 2015) "Grating Configurations for a Tiled Waveguide Display"; and U.S. Pat. No. 9,097,890 (Miller et al., Aug. 4, 2015) and 20120235885 (Miller et al., Sep. 20, 2012) "Grating in a Light Transmissive Illumination System for See-Through Near-Eye Display Glasses."

Augmented reality eyewear with (total) internal reflection waveguides also includes: 20100046070 (Mukawa, Feb. 25, 2010) "Head-Mounted Display"; U.S. Pat. No. 6,724,354 (Spitzer et al., Apr. 20, 2004) "Illumination Systems for Eyeglass and Facemask Display Systems"; 20160341873 (Kaehler, Nov. 24, 2016) "Illuminator"; U.S. Pat. No. 5,699,194 (Takahashi, Dec. 16, 1997) "Image Display Apparatus Comprising an Internally Reflecting Ocular Optical System"; U.S. Pat. No. 9,274,338 (Robbins et al., Mar. 1, 2016) "Increasing Field of View of Reflective Waveguide"; U.S. Pat. No. 7,457,040 (Amitai, Nov. 25, 2008), 7576916 (Amitai, Aug. 18, 2009), 7724441 (Amitai, May 25, 2010), 8004765 (Amitai, Aug. 23, 2011), 20090052046 (Amitai, Feb. 26, 2009) and 20090097127 (Amitai, Apr. 16, 2009) "Light Guide Optical Device"; 20170251201 (Sissom et al., Aug. 31, 2017) "Light Output System with Reflector and Lens for Highly Spatially Uniform Light Output"; U.S. Pat. No. 6,023,372 (Spitzer et al., Feb. 8, 2000) "Light Weight, Compact Remountable Electronic Display Device for Eyeglasses or Other Head-Borne Eyewear Frames"; 20030090439 (Spitzer et al., May 15, 2003) "Light Weight, Compact, Remountable Face-Supported Electronic Display"; U.S. Pat. No. 7,577,326 (Amitai, Aug. 18, 2009) "Optical Device for Light Coupling"; U.S. Pat. No. 9,223,134 (Miller et al., Dec. 29, 2015) and 20120235884 (Miller et al., Sep. 20, 2012) "Optical Imperfections in a Light Transmissive Illumination System for See-Through Near-Eye Display Glasses"; U.S. Pat. No. 7,242,527 (Spitzer et al., Jul. 10, 2007) "Optical System Using Total Internal Reflection Images"; 20160327789 (Klug et al., Nov. 10, 2016) "Separated Pupil Optical Systems for Virtual and Augmented Reality and Methods for Displaying Images Using Same"; and 20090052047 (Amitai, Feb. 26, 2009) "Substrate-Guided Imaging Lens."

Augmented reality eyewear with (total) internal reflection waveguides also includes: 6829095 (Amitai, Dec. 7, 2004) "Substrate-Guided Optical Beam Expander"; 20090122414 (Amitai, May 14, 2009) "Substrate-Guided Optical Device Utilizing Thin Transparent Layer"; U.S. Pat. No. 7,643,214 (Amitai, Jan. 5, 2010) "Substrate-Guided Optical Device with Wide Aperture"; U.S. Pat. No. 7,391,573 (Amitai, Jun. 24, 2008), U.S. Pat. No. 7,672,055 (Amitai, Mar. 2, 2010) and 20080285140 (Amitai, Nov. 20, 2008) "Substrate-Guided Optical Devices"; 20170293141 (Schowengerdt et al., Oct. 12, 2017) "Systems and Methods for Augmented Reality"; 20080117341 (McGrew, May 22, 2008) "Traveling Lens for Video Display"; U.S. Pat. No. 6,396,639 (Togino et al., May 28, 2002) "Viewing Optical System and Image Display Apparatus Using the Same"; 20170248790 (Cheng, Aug. 31, 2017) "Virtual and Augmented Reality Systems and Methods"; 20180067318 (St. Hilaire, Mar. 8, 2018) "Virtual Reality, Augmented Reality, and Mixed Reality Systems Including Thick Media and Related Methods"; U.S. Pat. No. 9,513,480 (Saarikko et al., Dec. 6, 2016) "Waveguide"; 20080247722 (Van Gorkom et al., Oct. 9, 2008) "Waveguide and Lighting Device"; 20090161383 (Meir et al., Jun. 25, 2009) "Waveguide Sheet Containing In-Coupling, Propagation, and Out-Coupling Regions"; U.S. Pat. No. 9,891,436 (Wall et al., Feb. 13, 2018) "Waveguide-Based Displays with Anti-Reflective and Highly-Reflective Coating"; U.S. Pat. No. 9,915,825 (Robbins et al., Mar. 13, 2018) "Waveguides with Embedded Components to Improve Intensity Distributions"; and U.S. Pat. No. 9,791,703 (Vallius et al., Oct. 17, 2017) and 20170299864 (Vallius et al., Oct. 19, 2017) "Waveguides with Extended Field of View."

16. Liquid Crystal

Liquid crystal technology, including Liquid Crystal Displays (LCDs), is used in augmented reality eyewear to modify beams of light in order to create virtual objects in a person's field of vision. Augmented reality eyewear in the prior art which uses such liquid crystal technology includes: U.S. Pat. No. 6,222,677 (Budd et al., Apr. 24, 2001) "Compact Optical System for Use in Virtual Display Applications"; U.S. Pat. No. 9,885,870 (Stenberg et al., Feb. 6, 2018) "Diffractive Optical Elements with Analog Modulations and Switching"; 20180039106 (Alonso, Feb. 8, 2018) "Electronic Liquid Crystal Lenses"; 20170176818 (Shi et al., Jun. 22, 2017) "Enhanced Spatial Resolution Using a Segmented Electrode Array"; 20050248852 (Yamasaki, Nov. 10, 2005) "Head-Mounted Display Apparatus"; 20170115491 (Shi et al., Apr. 27, 2017) "Liquid Crystal Half-Wave Plate Lens"; 20120242698 (Haddick et al., Sep. 27, 2012) "See-Through Near-Eye Display Glasses with a Multi-Segment Processor-Controlled Optical Layer"; U.S. Pat. No. 5,696,521 (Robinson et al., Dec. 9, 1997) "Video Headset"; 20170010488 (Klug et al., Jan. 12, 2017) "Virtual and Augmented Reality Systems and Methods"; U.S. Pat. No. 9,791,696 (Woltman et al., Oct. 17, 2017) "Waveguide Gratings to Improve Intensity Distributions"; and 20170176753 (Shi et al., Jun. 22, 2017) "Wide Angle Beam Steering in Sunglasses for Virtual Reality and Augmented Reality."

17. Optical Fiber

Optical fibers can be used in augmented reality eyewear as optical pathways to direct beams of light to selected locations in order to create virtual objects in a person's field of vision. Augmented reality eyewear which uses optical fibers includes: 20150235464 (Schowengerdt, Aug. 20, 2015) "Coupling a Lens to an Optical Fiber for Augmented or Virtual Reality Displays"; 20150243091 (Schowengerdt, Aug. 27, 2015) "Coupling Phase Modulators to Optical Fibers for Augmented or Virtual Reality"; U.S. Pat. No. 9,778,414 (Richards, Oct. 3, 2017), 20160320559 (Richards, Nov. 3, 2016) and 20170343732 (Richards, Nov. 30, 2017) "Curved Electronic Display Element"; 20150235471 (Schowengerdt, Aug. 20, 2015) "Delivering Light Beams Through Optical Fiber Cores At a Plurality of Angles for Augmented or Virtual Reality"; 20150241698 (Schowengerdt, Aug. 27, 2015) "Methods and Systems to Use Multicore Fibers for Augmented or Virtual Reality"; 20150241697 (Schowengerdt, Aug. 27, 2015) "Physical Actuators Coupled to Optical Fiber Cores for Augmented or Virtual Reality"; 20150235465 (Schowengerdt, Aug. 20, 2015) "Polishing an Array of Optical Fibers at an Angle to Deliver Augmented or Virtual Reality Images"; U.S. Pat. No. 9,846,306 (Schowengerdt, Dec. 19, 2017) "Using a Plurality of Optical Fibers for Augmented or Virtual Reality Display"; and 20150235466 (Schowengerdt, Aug. 20, 2015) "Using Optical Fibers to Deliver Multiple Depth Planes for Augmented or Virtual Reality."

18. Variable-Focus Lens

The configurations of variable-focus lenses can be changed in order to change their focal distances. This can be useful for changing the focal distance of a virtual object in augmented reality eyewear to reduce vergence-accommodation conflict. Augmented reality eyewear in the prior art with variable-focus lenses includes: 20150235583 (Schowengerdt et al., Aug. 20, 2015) "Adjusting Pixels to Compensate for Spacing in Augmented or Virtual Reality Systems"; 20170293145 (Miller et al., Oct. 12, 2017) "Augmented Reality Systems and Methods with Variable Focus Lens Elements"; U.S. Pat. No. 9,304,319 (Bar-Zeev et al., Apr. 5, 2016) "Automatic Focus Improvement for Augmented Reality Displays"; U.S. Pat. No. 9,292,973 (Bar-Zeev et al., Mar. 22, 2016), U.S. Pat. No. 9,588,341 (Bar-Zeev et al., Mar. 7, 2017) and 20120113092 (Bar-Zeev et al., May 10, 2012) "Automatic Variable Virtual Focus for Augmented Reality Displays"; 20180048882 (Eash et al., Feb. 15, 2018) "Binocular Display with Digital Light Path Length Modulation"; U.S. Pat. No. 9,915,824 (Schowengerdt et al., Mar. 13, 20181"; 20160109707 (Schowengerdt et al., Apr. 21, 2016) "Combining at Least One Variable Focus Element with a Plurality of Stacked Waveguides for Augmented or Virtual Reality Display"; 20110221656 (Haddick et al., Sep. 15, 2011) "Displayed Content Vision Correction with Electrically Adjustable Lens"; and 20170358136 (Gollier et al., Dec. 14, 2017) "Focus Adjusting Virtual Reality Headset."

Augmented reality eyewear with variable-focus lenses also includes: 20100295987 (Berge, Nov. 25, 2010) "Image Stabilization Circuitry for Liquid Lens"; 20040174610 (Aizenberg et al., Sep. 9, 2004) "Lenses with Tunable Liquid Optical Elements"; 20150235420 (Schowengerdt, Aug. 20, 2015) "Method for Displaying Multiple Depth Planes Through Variable Focus Elements"; U.S. Pat. No. 9,857,591 (Welch et al., Jan. 2, 2018) and 20150346495 (Welch et al., Dec. 3, 2015) "Methods and System for Creating Focal Planes in Virtual and Augmented Reality"; 20150235419 (Schowengerdt, Aug. 20, 2015) "Methods and Systems for Displaying Multiple Depth Planes Through a Variable Focus Element"; 20160110920 (Schowengerdt, Apr. 21, 2016) "Modifying a Focus of Virtual Images Through a Variable Focus Element"; 20150235445 (Schowengerdt, Aug. 20, 2015) "Modulating a Depth of Focus of a Plurality of Pixels Displayed to a User"; 20150222883 (Welch, Aug. 6, 2015) "Multi-Focal Display System and Method"; and 20180048881 (Eash et al., Feb. 15, 2018) "Near-Eye Display System Including a Modulation Stack."

Augmented reality eyewear with variable-focus lenses also includes: U.S. Pat. No. 7,864,440 (Berge, Jan. 4, 2011) "Optical Lens with Variable Focal length"; 20110221657 (Haddick et al., Sep. 15, 2011) "Optical Stabilization of Displayed Content with a Variable Lens"; U.S. Pat. No. 7,009,757 (Nishioka et al., Mar. 7, 2006) "Optimal Elements (Such as Vari-Focal Lens Component, Vari-Focal Diffractive Optical Element and Variable Declination Prism) and Electronic Image Pickup Unit Using Optical Elements"; U.S. Pat. No. 9,507,174 (Qin, Nov. 29, 2016) and 20150015814 (Qin, Jan. 15, 2015) "Spatial Focal Field Type Glasses Display"; 20160295202 (Evans et al., Oct. 6, 2016) "System, Apparatus, and Method for Displaying an Image Using Focal Modulation"; 20090213321 (Galstian et al., Aug. 27, 2009) "Tunable Liquid Lens with Reduced Aberration"; 20150243088 (Schowengerdt et al., Aug. 27, 2015) "Using a Variable Focus Element Coupled to a Waveguide to Create Multiple Depth Planes"; U.S. Pat. No. 7,245,440 (Peseux, Jul. 17, 2007) "Variable Focal Lens"; U.S. Pat. No. 9,846,967 (Schowengerdt, Dec. 19, 2017) and 20150235431 (Schowengerdt, Aug. 20, 2015) "Varying a Focus Through a Variable Focus Element Based on User Accommodation"; and 20130314793 (Robbins et al., Nov. 28, 2013) "Waveguide Optics Focus Elements."

19. Multiple Focal Planes

One of the challenges in augmented reality eyewear is vergence-accommodation conflict. One way to address this conflict is to create multiple depth planes (e.g. multiple focal planes) for the perception of virtual objects in a person's field of vision. There is some overlap between this category and the variable-focus lenses in the prior category. Augmented reality eyewear in the prior art with multiple depth planes (e.g. multiple focal planes) includes: 20150248011 (Schowengerdt, Sep. 3, 2015) "Delivering Virtual Images of Different Portions of the User's Pupil for Augmented or Virtual Reality"; 20150243093 (Schowengerdt, Aug. 27, 2015) "Determining User Accommodation to Display an Image at a Desired Focal Plane Using Diffractive Optical Elements"; 20150235437 (Schowengerdt, Aug. 20, 2015) "Determining User Accommodation to Display an Image at a Focal Plane Corresponding to a User's Current State of Focus"; 20160219269 (Tekolste, Jul. 28, 2016) "Methods and System for Creating Focal Planes Using an Alvarez Lens"; 20150243101 (Schowengerdt et al., Aug. 27, 2015) "Modifying a Curvature of Light Rays to Produce Multiple Depth Planes"; 20170237974 (Samec et al., Aug. 17, 2017) "Multi-Depth Plane Display System with Reduced Switching Between Depth Planes"; 20160109705 (Schowengerdt, Apr. 21, 2016) "Providing Variable Depth Planes Through Arrays of Reflectors"; 20150234190 (Schowengerdt, Aug. 20, 2015) "Using Blurring to Create Multiple Depth Planes for Augmented or Virtual Reality"; 20170053450 (Rodriguez et al., Feb. 23, 2017), 20170276948 (Welch et al., Sep. 28, 2017), 20180039084 (Schowengerdt, Feb. 8, 2018) and 20180061139 (Rodriguez et al., Mar. 1, 2018) "Virtual and Augmented Reality Systems and Methods"; and 20150235467 (Schowengerdt et al., Aug. 20, 2015) "Waveguide Assembly to Display Images at Multiple Focal Planes."

20. Polarized Light

Polarized light can be used to selectively block and/or redirect beams of light in order to create virtual objects in a person's field of vision. Augmented reality eyewear in the prior art which uses light polarization includes: 20170184848 (Vallius, Jun. 29, 2017) "Augmented Reality Display System with Variable Focus"; 20180045984 (Evans et al., Feb. 15, 2018) "Digital Light Path Length Modulation"; 20180045985 (Eash et al., Feb. 15, 2018) "Digital Light Path Length Modulation Systems"; U.S. Pat. No. 9,535,253 (Levola et al., Jan. 3, 2017) "Display System"; 20170255015 (Geng et al., Sep. 7, 2017) "Field Curvature Corrected Display"; 20120249797 (Haddick et al., Oct. 4, 2012) "Head-Worn Adaptive Display"; 20180048814 (Evans et al., Feb. 15, 2018) "Image Capture with Digital Light Path Length Modulation"; U.S. Pat. No. 8,760,762 (Kelly et al., Jun. 24, 2014) "Image Waveguide Utilizing Two Mirrored or Polarized Surfaces"; U.S. Pat. No. 9,841,598 (Ouderkirk et al., Dec. 12, 2017) "Lens with Embedded Multilayer Optical Film for Near-Eye Display Systems"; 20180045973 (Evans et al., Feb. 15, 2018) "Method and Apparatus for an Optical Path Length Extender"; 20150235456 (Schowengerdt, Aug. 20, 2015) "Modulating a Polarization of Light for Augmented or Virtual Reality";

U.S. Pat. No. 8,989,535 (Robbins, Mar. 24, 2015) and U.S. Pat. No. 9,581,820 (Robbins, Feb. 28, 2017) "Multiple Waveguide Imaging Structure"; U.S. Pat. No. 8,848,289 (Amirparviz et al., Sep. 30, 2014) "Near-To-Eye Display with Diffractive Lens"; and 20170269368 (Yun et al., Sep. 21, 2017) "Optical Stack and Optical System."

Augmented reality eyewear with polarized light also includes: 20180045974 (Eash et al., Feb. 15, 2018) "Orthogonal Optical Path Length Extender"; U.S. Pat. No. 9,766,464 (Poon et al., Sep. 19, 2017) "Reducing Ghost Images"; U.S. Pat. No. 8,488,246 (Border et al., Jul. 16, 2013) and 20120212400 (Border et al., Aug. 23, 2012) "See-Through Near-Eye Display Glasses Including a Curved Polarizing Film in the Image Source, a Partially Reflective, Partially Transmitting Optical Element and an Optically Flat Film"; U.S. Pat. No. 8,472,120 (Border et al., Jun. 25, 2013) and 20120218172 (Border et al., Aug. 30, 2012) "See-Through Near-Eye Display Glasses with a Small Scale Image Source"; U.S. Pat. No. 9,182,596 (Border et al., Nov. 10, 2015) and 20120242697 (Border et al., Sep. 27, 2012) "See-Through Near-Eye Display Glasses with the Optical Assembly Including Absorptive Polarizers or Anti-Reflective Coatings to Reduce Stray Light"; 20120236031 (Haddick et al., Sep. 20, 2012) "System and Method for Delivering Content to a Group of See-Through Near Eye Display Eyepieces"; 20150235455 (Schowengerdt, Aug. 20, 2015) "Using Polarization Modulators for Augmented or Virtual Reality"; 20180074340 (Robbins et al., Mar. 15, 2018) "Waveguides with Improved Intensity Distributions."

21. Collimated Light

Light collimation can be used to selectively block and/or direct beams of light in order to create virtual objects in a person's field of vision. Augmented reality eyewear in the prior art which uses collimated light includes: 20170199384 (Yeoh et al., Jul. 13, 2017) "Beam Angle Sensor in Virtual/Augmented Reality System"; 20150346490 (Tekolste et al., Dec. 3, 2015) "Methods and Systems for Generating Virtual Content Display with a Virtual or Augmented Reality Apparatus"; U.S. Pat. No. 9,515,238 (Maaskant et al., Dec. 6, 2016) "Micro-LED Array with Filters"; 20170184776 (El-Ghoroury et al., Jun. 29, 2017) "Non-Telecentric Emissive Micro-Pixel Array Light Modulators and Methods of Fabrication Thereof"; and U.S. Pat. No. 7,724,442 (Amitai, May 25, 2010) "Substrate-Guided Optical Devices."

22. Holographic Projection

Augmented reality eyewear which uses holographic projection technology to project virtual objects in a person's field of vision includes: 20170227771 (Sverdrup, Aug. 10, 2017) "Augmented Reality Head Worn Device"; 20170094265 (Mullins et al., Mar. 30, 2017) "Bidirectional Holographic Lens"; 20170185037 (Lee et al., Jun. 29, 2017) "Holographic Display Architecture"; 20170038589 (Jepsen, Feb. 9, 2017) "Near-Ocular Display Based on Hologram Projection"; U.S. Pat. No. 6,710,902 (Takeyama, Mar. 23, 2004) "Observation Optical System"; and U.S. Pat. No. 5,854,697 (Caulfield et al., Dec. 29, 1998) "Waveguide Hologram Illuminators."

23. Adjustable Interpupillary Distance

Augmented reality with mechanisms to adjust the interpupillary distance of optics (e.g. the distance between lenses or other optical structures for right and left side eyes) includes: 20170235126 (DiDomenico, Aug. 17, 2017) "Wide Angle, Broad-Band, Polarization Independent Beam Steering and Concentration of Wave Energy Utilizing Electronically Controlled Soft Matter"; U.S. Pat. No. 6,879,443 (Spitzer et al., Apr. 12, 2005) and 20050174651 (Spitzer et al., Aug. 11, 2005) "Binocular Viewing System"; 20170192198 (Bristol et al., Jul. 6, 2017) "Flexible Membranes Connected to Movable Lenses of Head-Mounted Display Systems and Related Technology"; 20170192240 (Drinkwater et al., Jul. 6, 2017) "Head Mounted Displays with Shaped Lenses"; 20170102546 (Tempel et al., Apr. 13, 2017) "Lens Movement Assemblies for Use with Head Mounted Displays"; and U.S. Pat. No. 9,470,906 (Kaji et al., Oct. 18, 2016), 20150103306 (Kaji et al., Apr. 16, 2015) and 20160341967 (Kaji et al., Nov. 24, 2016) "Virtual or Augmented Reality Headsets Having Adjustable Interpupillary Distance."

24. Eye/Head Movement Tracking

Augmented reality eyewear can track the movement of a person's eyes and/or head and can adjust the projection of virtual objects appropriately in response to this detected movement. Augmented reality eyewear with eye and/or head tracking includes: U.S. Pat. No. 9,304,003 (Ashman et al., Apr. 5, 2016) "Augmented Reality Navigation"; 20150235452 (Schowengerdt et al., Aug. 20, 2015) "Blanking Techniques in Augmented or Virtual Reality Systems"; 20180061121 (Yeoh et al., Mar. 1, 2018) "Continuous Time Warp and Binocular Time Warp for Virtual and Augmented Reality Display Systems and Methods"; 20150235436 (Schowengerdt, Aug. 20, 2015) "Delivering Light Rays Associated with Virtual Images Based on User Accommodation"; 20150234476 (Schowengerdt et al., Aug. 20, 2015) "Determining User Accommodation to Display an Image Through a Waveguide Assembly"; 20150235469 (Schowengerdt, Aug. 20, 2015) "Determining User Accommodation to Project Image Data at a Desired Focal Distance"; U.S. Pat. No. 9,417,452 (Schowengerdt et al., Aug. 16, 2016) and 20140267420 (Schowengerdt et al., Sep. 18, 2014) "Display System and Method"; 20170038836 (Jepsen et al., Feb. 9, 2017) "Display with an Embedded Eye Tracker"; 20150235446 (Schowengerdt, Aug. 20, 2015) "Driving Sub-Images Based on a User's Accommodation"; 20170307891 (Bucknor et al., Oct. 26, 2017) "Electromagnetic Tracking with Augmented Reality Systems"; and U.S. Pat. No. 9,323,325 (Perez et al., Apr. 26, 2016) "Enhancing an Object of Interest in a See-Through, Mixed Reality Display Device."

Augmented reality eyewear with eye and/or head tracking also includes: 20170148215 (Aksoy et al., May 25, 2017) "Eye Tracking for Mitigating Vergence and Accommodation Conflicts"; 20150301599 (Miller, Oct. 22, 2015) "Eye Tracking Systems and Method for Augmented or Virtual Reality"; U.S. Pat. No. 6,091,546 (Spitzer, Jul. 18, 2000) and U.S. Pat. No. 6,349,001 (Spitzer, Feb. 19, 2002) "Eyeglass Interface System"; U.S. Pat. No. 9,568,603 (Yahav et al., Feb. 14, 2017) "Eyewear-Mountable Eye Tracking Device"; 20180039083 (Miller et al., Feb. 8, 2018) "Fixed-Distance Virtual and Augmented Reality Systems and Methods"; 20150235449 (Schowengerdt et al., Aug. 20, 2015) "Frame-By-Frame Rendering for Augmented or Virtual Reality Systems"; U.S. Pat. No. 8,928,558 (Lewis et al., Jan. 6, 2015) and U.S. Pat. No. 9,110,504 (Lewis et al., Aug. 18, 2015) "Gaze Detection in a See-Through, Near-Eye, Mixed Reality Display"; U.S. Pat. No. 9,116,337 (Miao, Aug. 25, 2015) "Increasing Effective Eyebox Size of an MID"; 20170264879 (Zhou, Sep. 14, 2017) "Method and Apparatus to Realize Virtual Reality"; U.S. Pat. No. 9,727,132 (Liu et al., Aug. 8, 2017) "Multi-Visor: Managing Applications in Augmented Reality Environments"; U.S. Pat. No. 9,690,099 (Bar-Zeev et al., Jun. 27, 2017) "Optimized Focal Area for Augmented Reality Displays"; and 20150235417 (Schowengerdt et al., Aug. 20, 2015) "Over-Rendering Techniques in Augmented or Virtual Reality Systems."

Augmented reality eyewear with eye and/or head tracking also includes: U.S. Pat. No. 9,495,801 (Ebstyne et al., Nov. 15, 2016) "Pose Tracking an Augmented Reality Device"; 20150235430 (Schowengerdt et al., Aug. 20, 2015) "Predicting Head Movement for Rendering Virtual Objects in Augmented or Virtual Reality Systems"; 20150235451 (Schowengerdt et al., Aug. 20, 2015) "Presenting Virtual Objects Based on Head Movements in Augmented or Virtual Reality Systems"; 20150235453 (Schowengerdt et al., Aug. 20, 2015) "Rendering Based on Predicted Head Movement in Augmented or Virtual Reality Systems"; 20150235443 (Schowengerdt, Aug. 20, 2015) "Selectively Blurring a Portion of an Image Based on a User's Accommodation"; 20170371184 (Shtukater, Dec. 28, 2017) "Smart Contact Lens with Orientation Sensor"; 20170139209 (Evans et al., May 18, 2017) "System, Method, and Apparatus for Displaying an Image Using a Curved Mirror and Partially transparent Plate"; 20150234184 (Schowengerdt et al., Aug. 20, 2015) "Using Historical Attributes of a User for Virtual or Augmented Reality Rendering"; 20150235450 (Schowengerdt et al., Aug. 20, 2015) "Utilizing Head Movement of User for Frame Rendering in Augmented or Virtual Reality Systems"; 20150316982 (Miller, Nov. 5, 2015) "Utilizing Pseudo-Random Patterns for Eye Tracking in Augmented or Virtual Reality Systems"; and 20180045965 (Schowengerdt, Feb. 15, 2018) "Virtual and Augmented Reality Systems and Methods."

25. Other Relevant Technology

Augmented reality eyewear in the prior art which is relevant to this invention but whose distinctive technologies do not fall into one of the above classifications includes the following: 20150234205 (Schowengerdt, Aug. 20, 2015) "Contact Lens Device for Displaying Augmented or Virtual Reality"; 20150248158 (Schowengerdt, Sep. 3, 2015) "Curved Waveguides for Augmented or Virtual Reality"; 20180052276 (Klienman et al., Feb. 22, 2018) "Diffractive Eyepiece"; 20170223344 (Kaehler, Aug. 3, 2017) "Display for Three-Dimensional Image"; U.S. Pat. No. 6,522,794 (Bischel et al., Feb. 18, 2003) "Display Panel with Electrically-Controlled Waveguide-Routing"; 20150103152 (Qin, Apr. 16, 2015) "Head-Mounted Stereoscopic Display"; 20150241706 (Schowengerdt, Aug. 27, 2015) "Injecting Images Having an Inverse Fourier Transform to Produce a Desired Wavefront"; 20160286204 (Grata et al., Sep. 29, 2016) "Light Projector Using an Acousto-Optical Control Device"; 20170131460 (Lin et al., May 11, 2017) "Metasurfaces for Redirecting Light and Methods for Fabricating"; 20150243095 (Schowengerdt, Aug. 27, 2015) "Modulating Light Associated with Image Data Through Phase Modulators for Augmented or Virtual Reality"; U.S. Pat. No. 5,724,463 (Deacon et al., Mar. 3, 1998) "Projection Display with Electrically Controlled Waveguide-Routing"; U.S. Pat. No. 9,823,474 (Evans et al., Nov. 21, 2017) and 20160291326 (Evans et al., Oct. 6, 2016) "System, Apparatus, and Method for Displaying an Image with a Wider Field of View"; U.S. Pat. No. 9,915,826 (Tekolste et al., Mar. 13, 2018) and 20160266387 (Tekolste et al., Sep. 15, 2016) "Virtual and Augmented Reality Systems and Methods Having Improved Diffractive Grating Structures"; 20170115689 (Liu, Apr. 27, 2017) "Virtual Reality Glasses"; and 20180053284 (Rodriguez et al., Feb. 22, 2018) "Virtual, Augmented, and Mixed Reality Systems and Methods."

SUMMARY OF THE INVENTION

This invention can be embodied in Augmented Reality (AR) eyewear with Volumetric Annular Photon Emission (VAPE) technology comprising: an annular light projector (such as a ring of light emitters) which projects images of virtual objects into a person's field of vision; an annular light reflector and/or refractor (such as a ring of mirrors) which receives light rays from the annular light projector and redirects these light rays away from the person's eye; and an eyewear lens (such as a semi-reflective eyewear lens), wherein the eyewear lens receives light rays from the annular light reflector and/or refractor and at least partially reflects these light rays back toward the person's eye, and wherein the eyewear lens receives light rays from the environment and transmits these light rays toward the person's eye.

Volumetric Annular Photon Emission (VAPE) and related technology disclosed herein can enable a person to see their environment directly with minimal vision impairment while also displaying virtual objects in the person's field of vision with minimal light loss. This can help to address a first challenge in augmented reality by increasing the brightness of virtual objects. This technology also reduces the size of the optics required to display virtual objects in the person's field of vision. For example, by having an annular array of light emitters and an annular array of reflecting members, one can reduce the depth of the required optical structure. This can help to address a second challenge in augmented reality by making augmented reality eyewear less obtrusive in appearance.

INTRODUCTION TO THE FIGURES

FIG. 31 shows two sequential views of eyewear with a side-to-front-pivoting horizontal arm which holds an image projector.

FIG. 32 shows two sequential views of eyewear with a front-pivoting vertical arm which holds an image projector.

FIG. 33 shows two sequential views of eyewear with a front-pivoting horizontal arm which holds an image projector.

FIGS. 66 through 68 show an example of how a person's view of the environment and/or virtual objects can be changed based on data from an EEG sensor, wherein a virtual object reflects the person's negative response to a real object.

DETAILED DESCRIPTION OF THE FIGURES

In an example, augmented reality eyewear can comprise: an annular light projector which projects images of virtual objects into a person's field of vision, wherein this annular light projector is configured to span at least 75% of the circumference of a virtual circle around a near-eye area which is less than 6" in front of the person's eye, and wherein this annular light projector further comprises an array of light emitters which emit light rays in a radially-inward direction toward the near-eye area; an annular light reflector/refractor, wherein this annular light reflector/refractor is configured to span at least 75% of the circumference of a virtual circle around the near-eye area, wherein this annular light reflector/refractor is located between the annular light projector and the center of the near-eye area, wherein this annular light reflector/refractor receives light rays from the annular light projector and redirects these light rays away from the person's eye; and an arcuate-proximal-surface light reflector, wherein this arcuate-proximal-surface light reflector is located between the near-eye area and the environment in front of the person's eye, wherein a proximal surface is configured to be closer to the person's eye and a distal surface is configured to be farther from the person's eye, wherein the proximal surface of the arcuate-proximal-surface light reflector receives light rays from the annular light reflector/refractor and at least partially reflects these light rays back toward the person's eye, and wherein the distal surface of the arcuate-proximal-surface light reflector receives light rays from the environment in front of the person's eye and transmits these light rays toward the person's eye through a central opening or transparent core in the annular light reflector/refractor.

Figure 1:
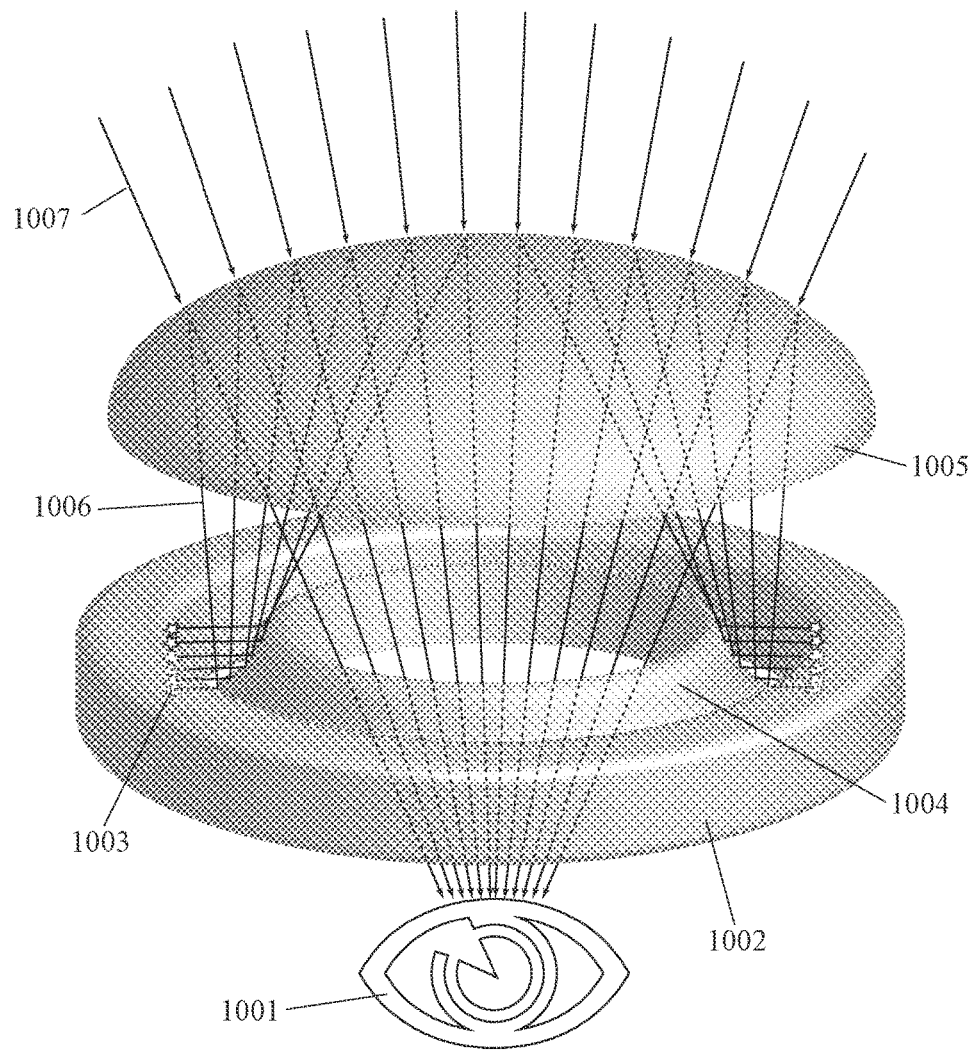
FIG. 1 shows an oblique view of a single-eye portion (of augmented reality eyewear) with a continuous annular light projector and a continuous annular light reflector.

FIG. 1 shows an example of augmented reality eyewear. FIG. 1 shows an oblique side view of a Volumetric Annular Photon Emission (VAPE) optical structure in front of one eye. In an example, augmented reality eyewear can comprise two such optical structures, one in front of each eye. In an example, such optical structures can be held in place by an eyewear frame, goggles, headset, helmet, or visor. The overall form of augmented reality eyewear can be selected from the group consisting of: augmented reality headset, electronically-functional glasses, eyeglasses, face mounted display, goggles, head mounted display, head worn display, heads up display, helmet, monocle, near eye display, pair of eyeglasses, prescription eyeglasses, see-through head-mounted display, "smart glasses," sunglasses, and visor.

The Volumetric Annular Photon Emission (VAPE) optical structure shown in FIG. 1 comprises: an annular light projector 1002 which projects images of virtual objects into a person's field of vision, wherein this annular light projector is configured to span at least 75% of the circumference of a virtual circle around a near-eye area which is less than 6" in front of the person's eye, and wherein this annular light projector further comprises an array of light emitters (including light emitter 1003) which emit light rays in a radially-inward direction toward the near-eye area; an annular light reflector/refractor 1004, wherein this annular light reflector/refractor is configured to span at least 75% of the circumference of a virtual circle around the near-eye area, wherein this annular light reflector/refractor is located between the annular light projector and the center of the near-eye area, wherein this annular light reflector/refractor receives light rays from the annular light projector and redirects these light rays away from the person's eye; and an arcuate-proximal-surface light reflector 1005, wherein this arcuate-proximal-surface light reflector is located between the near-eye area and the environment in front of the person's eye, wherein a proximal surface is configured to be closer to the person's eye and a distal surface is configured to be farther from the person's eye, wherein the proximal surface of the arcuate-proximal-surface light reflector receives light rays from the annular light reflector/refractor and at least partially reflects these light rays back toward the person's eye, wherein the distal surface of the arcuate-proximal-surface light reflector receives light rays from the environment in front of the person's eye and transmits these light rays toward the person's eye through a central opening or transparent core in the annular light reflector/refractor.

FIG. 1 also includes solid and dotted-line arrows which represent the paths of a subset of virtual object light rays (including light ray 1006) emitted from the annular light projector and the paths of a subset of environmental light rays (including environmental light ray 1007) from the person's environment. When these light rays are in full view from the side perspective of this figure, they are shown with solid lines. When these light rays are obscured by an optical structure from the side perspective of this figure, they are shown with dotted lines.

Only a subset of virtual object light rays and environmental light rays in a single cross-sectional plane are shown in this figure in order to avoid hopelessly cluttering the figure. Similarly, only a subset of light emitters (including light emitter 1003) in a single cross-sectional plane are shown in this figure. It is to be understood that there are light emitters distributed around the (entire) circumference of the radially-inward surface of the annular light projector, not just those shown in this single cross-sectional plane. It is also to be understood that there are a myriad of virtual object light rays and environmental light rays in other cross-sectional planes (e.g. in other planes rotated around an axis connecting the centers of the arcuate-proximal-surface light reflector and the annular light projector). Overall, the perspective shown in FIG. 1 shows the full volumes of primary optical structures (including annular light projector 1002, annular light reflector/refractor 1004, and arcuate-proximal-surface light reflector/refractor 1005), but for the sake of diagrammatic clarity only shows light emitters and light rays in a single cross-sectional plane.

The Volumetric Annular Photon Emission (VAPE) optical structure shown in FIG. 1 can also be described as comprising: an annular light projector which projects images of virtual objects into a person's field of vision, wherein this annular light projector is configured to curve around at least 75% of the circumference of a virtual circle around a near-eye area which is less than 6" in front of the person's eye, and wherein this annular light projector further comprises an array of light emitters which emit light rays in a radially-inward direction toward the near-eye area; an annular light reflector/refractor, wherein this annular light reflector/refractor is configured to curve around at least 75% of the circumference of a virtual circle around the near-eye area, wherein this annular light reflector/refractor is located between the annular light projector and the center of the near-eye area, wherein this annular light reflector/refractor receives light rays from the annular light projector and redirects these light rays away from the person's eye; and an arcuate-proximal-surface light reflector, wherein this arcuate-proximal-surface light reflector is located between the near-eye area and the environment in front of the person's eye, wherein a proximal surface is the surface configured to be closer to the person's eye and a distal surface is configured to be farther from the person's eye, wherein this arcuate-proximal-surface light reflector receives light rays from the annular light reflector/refractor and at least partially reflects these light rays back toward the person's eye, wherein this arcuate-proximal-surface light reflector also receives light rays from the environment in front of the person's eye and transmits these light rays toward the person's eye through a central opening or transparent core in the annular light reflector/refractor.

It is useful to follow the path of a single virtual object light ray 1006 in FIG. 1. First, light ray 1006 starts when it is emitted from light emitter 1003 on the radially-inward surface of annular light projector 1002 and is directed in a radially-inward manner toward the (center of an) opening in the middle of the annular light projector. Second, light ray 1006 hits the reflective radially-outward surface of annular light reflector/refractor 1004 and is redirected away from the person's eye toward arcuate-proximal-surface light reflector 1005. Third, light ray 1006 hits the (one-way) reflective proximal surface of arcuate-proximal-surface light reflector 1005 and is redirected toward the person's eye through an opening (or transparent corer) in the middle of annular light reflector/refractor 1004. Finally, light ray 1006 enters the person's eye. In combination with other light rays from the annular light projector, light ray 1006 displays a virtual object in the person's field of vision.

It is also useful to follow the path of a single environmental light ray 1007 in FIG. 1. First, light ray 1007 from the environment enters the non-reflective (or minimally-reflective) distal surface of arcuate-proximal-surface light reflector 1005. Second, light ray 1007 passes through arcuate-proximal-surface light reflector 1005 and continues unimpaired through the central opening (or transparent center) in the middle of the annular light reflector/refractor toward the person's eye. Finally, environmental light ray 1007 enters the person's eye.

Since virtual object light ray 1006 and environmental light ray 1007 enter the person's eye from the same location on the arcuate-proximal-surface light reflector, virtual object light ray 1006 and environmental light ray 1007 combine in the person's field of vision to superimpose the image of a virtual object on the persons' view of their environment. Although this may cause the virtual object to be semi-transparent, there is less loss of light in transmission of the virtual object image in this Volumetric Annular Photon Emission (VAPE) optical structure than in much of the prior art concerning see-through augmented reality. Also, if the radially-outward surface of annular light reflector/refractor 1004 is highly reflective, then its redirection of light rays can result in minimal light loss. If the proximal surface of arcuate-proximal-surface light reflector 1005 is also highly reflective, then it can also cause minimal light loss. Overall, light loss in the transmission of a virtual object image with this technology can be as low as 10%-25%. This can provide much brighter virtual object images (and thus less apparent transparency) than is common in the prior art for see-through augmented reality eyewear. This is a significant potential advantage of this invention over see-through augmented reality eyewear in the prior art.

Another potential advantage of Volumetric Annular Photon Emission (VAPE) technology over see-through augmented reality in the prior art is that it offers the wearer a clear view of their environment. This technology causes only minimal impairment of a person's direct view of their environment. If the opening or transparent core in the middle of the annular light reflector/refractor is sufficiently large, then the only part of the optical structure between a person's eye and a central view of the person's environment is the arcuate-proximal-surface light reflector. If the arcuate-proximal-surface light reflector is a one-way mirror then it causes only low light loss and minimal distortion of environmental light rays. This can be an advantage over complex waveguide structures in the prior art which can distort and obscure incoming environmental light rays. This can be also an advantage over non-see-through augmented reality eyewear in the prior art, wherein environmental light rays are reproduced digitally with loss of environmental scene resolution and loss of natural three-dimensional perspective. Even if there are challenges with precision in the display of virtual objects, at least this present eyewear does not "mess up" display of the environment. This can be vital for many applications in which a clear view of one's environment is essential.

In an example, a virtual object can be generated by a computer. A virtual object can be a computer-generated image which is not visible in a screen-independent environmental context with the naked eye, but does appears to a device-wearer in a screen-independent environmental context. In an example, a virtual object can be linked conceptually to an environmental object. In an example, a virtual object can comprise words, symbols, or graphics which convey information about a nearby environmental object.

In an example, a virtual object can be perceptually linked in physical location and/or position relative to a real environmental object in a person's field of vision. In an example, a virtual object can appear to be connected to an environmental object. A virtual object can appear to a viewer as being consistently on top of, adjacent to, or beneath an environmental object. In an example, a virtual object can be super-imposed over (i.e. shown in front of and/or occluding) an environmental object or sub-imposed under (i.e. shown behind and/or occluded by) an environmental object in a person's field of vision. In an example, a virtual object can appear to be moving with an environmental object when the environmental object moves. In an example, both a virtual object and an environmental object can appear to move together, relative to a person's field of vision, when the person moves their head.

In an example, the appearance of a virtual object can be changed to simulate its physical interaction with a physical environmental object. In an example, a virtual object can appear to be obscured by a physical object when the two objects meet. In an example, a virtual object can appear to come out of (or go into) a physical object. In an example, a virtual object can function as a virtual mouse and/or cursor to enable a person to interact with their environment in augmented reality. In an example, a person can select an environmental object by moving a virtual object (e.g. virtual mouse, cursor, or pointer) to the environmental object. In an example, a person can purchase an environmental object by moving a virtual object (e.g. virtual mouse, cursor, or pointer) to the environmental object.

In an example, an annular light projector can be a type of projector (or display) which is selected from the group consisting of: collimated light projector and/or display; ferroelectric liquid crystal on silicon (FLCOS) projector and/or display; holographic projector and/or display; light emitting diode (LED) projector and/or display; liquid crystal display (LCD); liquid crystal on silicon (LCOS) projector and/or display; microdisplay and/or microprojector; micromirror array; picodisplay and/or picoprojector; and spatial light modulator (SLM) projector and/or display.

In an example, an annular light projector (or display) can comprise a light-emitting ring, torus, cylinder, or disk with a central opening or hole. In an example, an annular light projector (or display) can comprise a light-emitting ring, torus, cylinder, or disk with a transparent central portion or core. In an example, an annular light projector can have a central opening, hole, or transparent core toward which it projects light rays in a radially-inward manner. In an example, an annular light projector can have an outer diameter between 0.5" and 6." In an example, the width of a central opening, hole, or transparent core of an annular light projector can be between 0.5" and 5." In an example, the width of a central opening, hole, or transparent core in the middle of an annular light projector can be between 20% and 80% of the width of the annular light projector. In an example, a central opening, hole, or transparent core can have a circular perimeter.

In an example, an annular light projector can be located within 6" of a person's eye. In an example, an annular light projector can be located within 3" of a person's eye. In an example, an annular light projector can be centered around a point in space which is directly in front of the center of an eye lens. In an example, an annular light projector can have a proximal surface and a distal surface, wherein the proximal surface is configured to be closer to a person's eye and the distal surface is configured to be farther from the person's eye. In an example, the proximal surface of an annular light projector can be substantially parallel to the plane of an eye lens when a person is looking straight ahead.

In an example, an annular light projector (or display) can have a shape selected from the group consisting of: arcuate cylinder, arcuate ring, circle, ellipse, oval, and torus. In an example, an annular light projector can be continuous and uniformly arcuate. In an example, an annular light projector can be a continuous arcuate light-emitting ring which encircles a space in front of a person's eye. In an example, an annular light projector can comprise a continuous arcuate light-emitting torus which encircles a space in front of a person's eye. In an example, an annular light projector can comprise a continuous arcuate light-emitting cylinder which encircles a space in front of a person's eye. In an example, an annular light projector can comprise a continuous arcuate light-emitting disk with a hollow or transparent core which encircles a space in front of a person's eye.

In an example, an annular light projector (or display) can have an equilateral polygonal shape. In an example, an annular light projector (or display) can have a shape selected from the group consisting of: square, hexagon, octagon, and decagon. In an example, an annular light projector can be continuous, but be comprised of individual non-arcuate segments or sections. In an example, an annular light projector can have polygonal inner and/or outer perimeters. In an example, an annular light projector can be a continuous polygonal light-emitting ring which encircles a space in front of a person's eye. In an example, an annular light projector can comprise a continuous polygonal light-emitting torus which encircles a space in front of a person's eye. In an example, an annular light projector can comprise a continuous polygonal light-emitting cylinder which encircles a space in front of a person's eye. In an example, an annular light projector can comprise a circumferential series of arcuate light-emitting segments or sections which encircles a space in front of a person's eye. In an example, an annular light projector can comprise a circumferential polygonal series of flat light-emitting segments or sections which encircles a space in front of a person's eye.

In an example, an annular light projector can be discontinuous with a circumferential series of individually-arcuate segments or sections. In an example, an annular light projector can be a light-emitting ring comprised of a circumferential series of arcuate projector segments or sections with gaps and/or light barriers between them. In an example, an annular light projector can be a light-emitting torus comprised of a circumferential series of arcuate projector segments or sections with gaps and/or light barriers between them. In an example, an annular light projector can be a light-emitting cylinder comprised of a circumferential series of arcuate projector segments or sections with gaps and/or light barriers between them. In an example, a discontinuous annular light projector can comprise a circumferential series of four, six, or eight arcuate projector segments or sections with gaps and/or light barriers between them. In an example, an annular light projector can comprise a circumferential array of ten or more arcuate projector segments or sections.

In an example, an annular light projector can be discontinuous with a circumferential series of individually-flat segments or sections. In an example, an annular light projector can be a light-emitting polygonal ring comprised of a circumferential series of individually-flat projector segments or sections with gaps and/or light barriers between them. In an example, an annular light projector can be a light-emitting polygonal torus comprised of a circumferential series of individually-flat projector segments or sections with gaps and/or light barriers between them. In an example, an annular light projector can be a light-emitting polygonal cylinder comprised of a circumferential series of individually-flat projector segments or sections with gaps and/or light barriers between them. In an example, a discontinuous annular light projector can comprise a circumferential series of four, six, or eight flat projector segments or sections with gaps and/or light barriers between them. In an example, an annular light projector can comprise a circumferential array of ten or more flat projector segments or sections.

In an example, an annular light projector can comprise a continuous arcuate light-emitting ring which curves around at least 75% of the circumference of a virtual circle around a space in front of a person's eye. In an example, an annular light projector can comprise a continuous arcuate light-emitting torus which curves around at least 75% of the circumference of a virtual circle around a space in front of a person's eye. In an example, an annular light projector can comprise a continuous arcuate light-emitting cylinder which curves around at least 75% of the circumference of a virtual circle around a space in front of a person's eye. In an example, an annular light projector can comprise a continuous polygonal light-emitting ring which curves around at least 75% of the circumference of a virtual circle around a space in front of a person's eye. In an example, an annular light projector can comprise a continuous polygonal light-emitting torus which curves around at least 75% of the circumference of a virtual circle around a space in front of a person's eye. In an example, an annular light projector can comprise a continuous polygonal light-emitting cylinder which curves around at least 75% of the circumference of a virtual circle around a space in front of a person's eye.

In an example, an annular light projector can have a shape selected from the group consisting of: arcuate cylinder arcuate ring, circle, ellipse, oval, polygonal cylinder polygonal ring, and torus. In an example, an annular light projector can comprise a circumferential series of arcuate light-emitting segments or sections which encircle a space in front of a person's eye. In an example, an annular light projector can comprise a circumferential polygonal series of flat light-emitting segments or sections encircles at least 75% of the circumference of a virtual circle around a space in front of a person's eye.

In an example, an annular light projector can completely encircle an area less than 6" in front of a person's eye. In an example, an annular light projector can encircle at least 75% of an area less than 6" in front of a person's eye. In an example, an annular light projector can encircle at least 66% of an area less than 6" in front of a person's eye. In an example, an annular light projector can comprise a continuous light-emitting arcuate ring, torus, circle, or cylinder. In an example, an annular light projector can comprise an array of light emitting segments or sections which together comprise a discontinuous light-emitting ring, torus, circle, or cylinder. In an example, light emitting segments or sections in a discontinuous annular array can each be arcuate. In an example, individual light emitting segments or sections in an annular array can be non-arcuate, but together they can comprise an annular ring, torus, circle, or cylinder. In an example, light emitting segments or sections in an annular array can be individually flat, but together can comprise segments or sections of an overall polygonal ring, torus, circle, or cylinder. In an example, an annular light projector can be a polygonal light projector composed of a series of individually-flat segments or sections wherein each flat segment or section projects a set of light rays in a radially-inward manner.

In an example, an annular light projector can further comprise an array of light emitters which emit light rays in a radially-inward manner toward an open center or transparent core of the annular light projector. In an example, light emitters can emit substantially collimated light. In an example, an annular light projector can further comprise a circumferential array of light emitters which emit light rays in a radially-inward manner toward an open center or transparent core of the annular light projector. In an example, an annular light projector can further comprise a ring of light emitters which emit light rays in a radially-inward manner toward an open center or transparent core of the light projector. In an example, an annular light projector can further comprise a cylindrical array of inward-facing light emitters.

In an example an annular light projector can further comprise a circumferential array (or matrix) of light emitters with "Column" and "Row" coordinates. In an example, each light emitter in this array can have a "Column" coordinate expressed in compass degrees around the circumference of a virtual circle and a "Row" coordinate expressed in distance from (or number of rows from) the proximal surface of an annular light projector. In an example, a circumferential array of light emitters can have at least 10 Columns and at least 5 Rows. In an example, a circumferential array of light emitters can have at least 100 Columns and at least 50 Rows. In an example, a circumferential array of light emitters can have at least 1,000 Columns and at least 500 Rows.

Conveying this same coordinate concept with different terminology, an annular light projector can further comprise a circumferential array (or matrix) of light emitters with "Degree" and "Depth" coordinates. In an example, each light emitter in this array can have a "Degree" coordinate which is expressed in compass degrees around the circumference of a virtual circle and a "Depth" coordinate which is expressed in distance from the proximal surface of the annular light projector. In an example, a circumferential array of light emitters can have at least 10 Degrees and at least 5 Depths. In an example, a circumferential array of light emitters can have at least 100 Degrees and at least 50 Depths. In an example, a circumferential array of light emitters can have at least 1,000 Degrees and at least 500 Depths.

In an example, an annular light reflector/refractor can be a mirror which receives light rays from an annular light projector and redirects them away from a person's eye. In an example, an annular light reflector/refractor can have a flat cross-sectional perimeter. In an example, an annular light reflector/refractor can have a curved cross-sectional perimeter. In an example, an annular light reflector/refractor can have a convex side. In an example, an annular light reflector/refractor can have a concave side. In an example, an annular light reflector/refractor can have an undulating and/or sinusoidal side. In an example, an annular light reflector/refractor can be a frustum-shaped mirror.

In an example, an annular light reflector/refractor can be a lens and/or waveguide which receives light rays from an annular light projector and redirects them away from a person's eye. In an example, an annular light reflector/refractor can be an array of lenses and/or waveguides which receive light rays from an annular light projector and redirect them away from a person's eye. In an example, an annular light reflector/refractor can comprise a light-reflecting ring or torus with a central opening or hole. In an example, an annular light reflector/refractor can comprise a light-reflecting ring or torus with a transparent central portion or core. In an example, an annular light refractor can comprise a light-refracting ring or torus with a central opening or hole. In an example, an annular light refractor can comprise a light-refracting ring or torus with a transparent central portion or core. In an example, an annular light reflector/refractor can have an outer diameter between 0.5" and 5." In an example, the width of a central opening or transparent core of an annular light reflector/refractor can be between 0.5" and 4."

In an example, an annular light reflector/refractor can be located between an annular light projector and the center of a near-eye area. In an example, an annular light reflector/refractor can be nested within an annular light projector. In an example, an annular light reflector/refractor can be concentric with an annular light projector. In an example, there can be a gap between an annular light reflector/refractor and an annular light projector. In an example, there can be transparent material between an annular light reflector/refractor and an annular light projector. In an example, there can be a lens or other intermediate optical structure between an annular light reflector/refractor and an annular light projector. In an example, an annular light reflector/refractor can be coplanar with an annular light projector. In an example, the proximal surface of an annular light reflector/refractor can be coplanar with the proximal surface of an annular light projector. In an example, an annular light reflector/refractor can be stationery. In an example, an annular light reflector/refractor can have one or more moving surfaces.

In an example, an annular reflector/refractor can be made from one or more materials selected from the group consisting of: carbon, polycarbonate, silver alloy, polyvinyl alcohol, copper alloy, photorefractive, polypropylene oxide, ethylene tetrafluoroethylene, polyacrylate, silicon oxy nitride, and carbon nanotubes. In an example, an annular reflector/refractor can be made from one or more materials selected from the group consisting of: polytetrafluoroethylene, indium tin oxide, graphene, Mylar™, polyvinylpyrrolidone, acrylic, tantalum oxide, neoprene, crystal, aluminum, silicon, parylene, polyimide, and polyvinylidene difluoride.

In an example, an annular light reflector/refractor can have a radially-outward surface which faces away from its center (towards the annular light projector) and a radially-inward which faces toward its center. In an example, the radially-outward surface of a cross-section of an annular light reflector/refractor can be flat. In an example, an annular light reflector/refractor can be shaped like a frustum or other conic section. In an example, the radially-outward surface of an annular light reflector/refractor can be flat in a cross-sectional slice. In an example, the radially-outward surface of an annular light reflector/refractor can be concave. In an example, an annular light reflector/refractor can have a funnel shape. In an example, the radially-outward surface of an annular light reflector/refractor can be convex. In an example, a first portion of the radially-outward surface of an annular light reflector/refractor can be concave and a second portion of the radially-outward surface of an annular light reflector/refractor can be convex. In an example, the radially-outward surface of an annular light reflector/refractor can be a conic section. In an example, the radially-outward surface of an annular light reflector/refractor can be undulating and/or sinusoidal.

In an example, an annular reflector/refractor can be made from one or more materials selected from the group consisting of: photopolymer, silver halide emulsion, polyethylene oxide, dichromated gelatin, polyethylene naphtalate, polyethylene terephthalate, nickel, glass, polyaniline, polyurethane, silver, gold, and polytetramethylene oxide. In an example, an annular reflector/refractor can be made from one or more materials selected from the group consisting of: copper, silicone, acetate, polyamide, gallium nitride, silicon oxide, aluminum oxide, polypyrrole, silicon nitride, polymethyl methacrylate, and polystyrene.

In an example, collimated light rays emitted from an annular light projector can hit an annular light reflector/refractor at acute angles of incidence. In an example, collimated light rays emitted from an annular light projector in a given cross-section (perpendicular to the plane of the annular light projector) can hit an annular light reflector/refractor at a constant angle of incidence X. In an example, this constant angle X can be within the range of 30-60 degrees. In an example, collimated light rays emitted from an annular light projector in a given cross-section (perpendicular to the plane of the annular light projector) can hit an annular light reflector/refractor at an average angle of incidence X. In an example, this average angle X can be within the range of 30-60 degrees.

In an example, an annular light reflector/refractor can comprise a continuous arcuate light-reflecting/refracting ring which encircles a space in front of a person's eye. In an example, an annular light reflector/refractor can comprise a continuous arcuate light-reflecting/refracting torus which encircles a space in front of a person's eye. In an example, an annular light reflector/refractor can comprise a continuous arcuate light-reflecting/refracting cylinder which encircles a space in front of a person's eye. In an example, an annular light reflector/refractor can comprise a continuous polygonal light-reflecting/refracting ring which encircles a space in front of a person's eye. In an example, an annular light reflector/refractor can comprise a continuous polygonal light-reflecting/refracting torus which encircles a space in front of a person's eye.

In an example, an annular light reflector/refractor can comprise a continuous polygonal light-reflecting/refracting cylinder which encircles a space in front of a person's eye. In an example, an annular light reflector/refractor (or display) can have a shape selected from the group consisting of: arcuate cylinder arcuate ring, circle, ellipse, oval, polygonal cylinder polygonal ring, and torus. In an example, an annular light reflector/refractor can comprise a circumferential series of arcuate light-reflecting/refracting segments or sections which encircle a space in front of a person's eye. In an example, an annular light reflector/refractor can comprise a circumferential polygonal series of flat light-reflecting/refracting segments or sections encircles a space in front of a person's eye.

In an example, an annular light reflector/refractor can comprise a continuous arcuate light reflecting/refracting ring which curves around at least 75% of the circumference of a virtual circle around a space in front of a person's eye. In an example, an annular light reflector/refractor can comprise a continuous arcuate light reflecting/refracting torus which curves around at least 75% of the circumference of a virtual circle around a space in front of a person's eye. In an example, an annular light reflector/refractor can comprise a continuous arcuate light reflecting/refracting cylinder which curves around at least 75% of the circumference of a virtual circle around a space in front of a person's eye. In an example, an annular light reflector/refractor can comprise a continuous polygonal light reflecting/refracting ring which curves around at least 75% of the circumference of a virtual circle around a space in front of a person's eye. In an example, an annular light reflector/refractor can comprise a continuous polygonal light reflecting/refracting torus which curves around at least 75% of the circumference of a virtual circle around a space in front of a person's eye.

In an example, an annular light reflector/refractor can comprise a continuous polygonal light reflecting/refracting cylinder which curves around at least 75% of the circumference of a virtual circle around a space in front of a person's eye. In an example, an annular light reflector/refractor (or display) can have a shape selected from the group consisting of: arcuate cylinder arcuate ring, circle, ellipse, oval, polygonal cylinder polygonal ring, and torus. In an example, an annular light reflector/refractor can comprise a circumferential series of arcuate light reflecting/refracting segments or sections which encircle a space in front of a person's eye. In an example, an annular light reflector/refractor can comprise a circumferential polygonal series of flat light reflecting/refracting segments or sections encircles at least 75% of the circumference of a virtual circle around a space in front of a person's eye.

In an example, an annular light reflector/refractor can completely encircle an area less than 6" in front of a person's eye. In an example, an annular light reflector/refractor can encircle at least 75% of an area less than 6" in front of a person's eye. In an example, an annular light reflector/refractor can encircle at least 66% of an area less than 6" in front of a person's eye.

In an example, an annular light reflector/refractor can comprise a continuous light-reflecting/refracting arcuate ring, torus, circle, or cylinder. In an example, an annular light reflector/refractor can comprise an array of light reflecting/refracting segments or sections which together comprise a discontinuous light-reflecting/refracting ring, torus, circle, or cylinder. In an example, light reflecting/refracting segments or sections in a discontinuous annular array can each be arcuate. In an example, individual light reflecting/refracting segments or sections in an annular array can be non-arcuate, but together they can comprise an annular ring, torus, circle, or cylinder. In an example, light reflecting/refracting segments or sections in an annular array can be individually flat, but together can comprise portions of an overall polygonal ring, torus, circle, or cylinder. In an example, an annular light reflector/refractor can be a polygonal light reflector/refractor composed of a series of individually-flat segments or sections, which each flat section projects a set of light rays in a radially-inward manner.

In an example, augmented reality eyewear can further comprise a circumferential array of radially-extending light barriers between segments or sections of an annular light projector, annular light reflector/refractor, or both. In an example, augmented reality eyewear can further comprise a circumferential array of light-blocking radially-extending fins, slots, spokes, or panels between an annular light projector and an annular light reflector/refractor. In an example, augmented reality eyewear can further comprise an array of light-blocking fins, slots, spokes, or panels which are evenly distributed around the circumference of an annular light reflector/refractor, between the annular light reflector/refractor and an annular light projector.

In an example, augmented reality eyewear can further comprise an array of light-blocking fins, slots, spokes, or panels between light reflectors/refractors in an annular array of light reflectors/refractors. In an example, augmented reality eyewear can further comprise an array of light-blocking fins, slots, spokes, or panels between light projectors in an annular array of light projectors. In an example, augmented reality eyewear can further comprise a circumferential array of light-blocking fins, slots, spokes, or panels between each light projector and light reflectors/refractor pair, wherein each light projector is part of an annular array of light projectors and each light reflector/refractor is part of an annular array of light reflectors/refractors.

In an example, a perimeter location on an annular light projector can be identified as "X degrees"—measured in compass degrees—relative to the circumference of a virtual circle around a space in front of a person's eye. In an example, a corresponding "X degrees" location can also be identified on the perimeter of an arcuate-proximal-surface light reflector. In an example, light from a column of light emitters at "X degrees" on the annular light projector can be redirected by the annular light reflector/refractor to hit the arcuate-proximal-surface light reflector between the "X degree" location on the perimeter of the arcuate-proximal-surface light reflector and the center of the arcuate inner-surface reflector.

In an example, light rays from light emitters on the right side of an annular light projector can be directed to hit the right side of an arcuate-proximal-surface light reflector. In an example, light rays from light emitters on the left side of the annular light projector can be directed to hit the left side of the arcuate-proximal-surface light reflector. In an example, light rays from light emitters in a selected quadrant (or hextant or octant) of the annular light projector can be directed to hit the same quadrant (or hextant or octant) of the arcuate-proximal-surface light reflector.

In an example, light rays from light emitters on the right side of the annular light projector can be directed to hit the left side of the arcuate-proximal-surface light reflector. In an example, light rays from light emitters on the left side of the annular light projector can be directed to hit the right side of the arcuate-proximal-surface light reflector. In an example, light rays from light emitters in a selected quadrant (or hextant or octant) of the annular light projector can be directed to hit the diametrically opposite quadrant (or hextant or octant) of the arcuate-proximal-surface light reflector.

In an example, an annular light reflector/refractor can have an average outer diameter which is between 50% and 90% of the average inner diameter of an annular light projector. In an example, an annular light reflector/refractor can have an average outer diameter which is between 60% and 80% of the average outer diameter of an annular light projector. In an example, an annular light reflector/refractor can have an average outer diameter which is between 65% and 75% of the average outer diameter of an annular light projector.

In an example, an annular light reflector/refractor can have the same proximal-to-distal width as an annular light projector. In an example, an annular light reflector/refractor can have the same proximal-to-distal width as the proximal-to-distal width of an array of light emitters on an annular light projector. In an example, an annular light reflector/refractor can have a greater proximal-to-distal width than the proximal-to-distal width of an annular light projector. In an example, an annular light reflector/refractor can have a greater proximal-to-distal width than the proximal-to-distal width of an array of light emitters on an annular light projector.

In an example, an arcuate-proximal-surface reflector can be made from one or more materials selected from the group consisting of: polytetrafluoroethylene, indium tin oxide, graphene, Mylar™, polyvinylpyrrolidone, acrylic, tantalum oxide, neoprene, crystal, aluminum, silicon, parylene, polyimide, and polyvinylidene difluoride. In an example, an arcuate-proximal-surface light reflector can be a mirror. In an example, an arcuate-proximal-surface light reflector can be a one-way mirror. In an example, an arcuate-proximal-surface light reflector can be a spherical (section) mirror. In an example, an arcuate-proximal-surface light reflector can be concave. In an example, an arcuate-proximal-surface light reflector can direct virtual object light rays toward a person's eye in a converging manner.

In an example, an arcuate-proximal-surface light reflector can have a central rotational axis which is coaxial with the central rotational axes of an annular light projector and/or an annular light reflector/refractor. In an example, an arcuate-proximal-surface reflector can be made from one or more materials selected from the group consisting of: carbon, polycarbonate, silver alloy, polyvinyl alcohol, copper alloy, photorefractive, polypropylene oxide, ethylene tetrafluoroethylene, polyacrylate, silicon oxy nitride, and carbon nanotubes.

In an example, an arcuate-proximal-surface light reflector can be configured to be between a near-eye area and the environment in front of the person's eye. In an example, the proximal surface of an arcuate-proximal-surface light reflector can receive light rays from an annular light reflector/refractor and (at least partially) reflect these light rays back toward the person's eye. In an example, the distal surface of an arcuate-proximal-surface light reflector can receive light rays from the environment in front of the person's eye and transmit these light rays through a central opening or transparent core of the annular light reflector/refractor toward the person's eye.

In an example, an arcuate-proximal-surface reflector can be made from one or more materials selected from the group consisting of: photopolymer, silver halide emulsion, polyethylene oxide, dichromated gelatin, polyethylene naphtalate, polyethylene terephthalate, nickel, glass, polyaniline, polyurethane, silver, gold, and polytetramethylene oxide. In an example, an arcuate-proximal-surface reflector can be made from one or more materials selected from the group consisting of: copper, silicone, acetate, polyamide, gallium nitride, silicon oxide, aluminum oxide, polypyrrole, silicon nitride, polymethyl methacrylate, and polystyrene.

In an example, augmented reality eyewear can comprise: an annular array of light projectors, wherein this annular array of light projectors projects images of virtual objects into a person's field of vision, wherein this annular array of light projectors is configured to span at least 75% of the circumference of a virtual circle around a near-eye area which is less than 6" in front of the person's eye, and wherein this annular array of light projectors further comprises light emitters which emit light rays in a radially-inward direction toward the near-eye area; an annular array of light reflectors/refractors, wherein this annular array of light reflectors/refractors is configured to span at least 75% of the circumference of a virtual circle around the near-eye area, wherein this annular array of light reflectors/refractors is located between the annular array of light projectors and the center of the near-eye area, wherein this annular array of light reflectors/refractors receives light rays from the annular array of light projectors and redirects them away from the person's eye; and an arcuate-proximal-surface light reflector, wherein this arcuate-proximal-surface light reflector is configured to be between the near-eye area and the environment in front of the person's eye, wherein the proximal surface is the surface configured to be closest to the person's eye, wherein this arcuate-proximal-surface light reflector receives light rays from the annular array of light reflectors/refractors and at least partially reflects these light rays back toward the person's eye, wherein this arcuate-proximal-surface light reflector also receives light rays from the environment in front of the person's eye and transmits these light rays toward the person's eye through a central opening or transparent core in the annular light reflector/refractor.

In an example, augmented reality eyewear can further comprise a radially-extending array of light barriers (like "fins" or "spokes") between an annular light projector and an annular light reflector/refractor. In an example, a radial array of light barriers between an annular light projector and an annular light reflector/refractor can help to reduce optical "cross-talk" between light rays in different cross-sections of the optical structure. In an example, these light barriers can extend outward in a radial manner from an annular light reflector/refractor and/or inward in a radial manner from an annular light projector—like paddles on a paddle wheel, fins or slots on a roulette wheel, or teeth on a gear. In an example, a radial array of light barriers between an annular light projector and an annular light reflector/refractor can create optically-isolated paired segments or sections of the annular light projector and annular light reflector/refractor. In an example, a radial array of light barriers between an annular light projector and an annular light reflector/refractor can help reduce optical "cross-talk" between paired segments or sections of an annular light projector and an annular light reflector/refractor.

In an example, augmented reality eyewear can comprise a radial array of 5-10 light barriers between an annular light projector and an annular light reflector/refractor. In an example, augmented reality eyewear can comprise 5-10 light barriers which are circumferentially distributed around an annular light reflector/refractor between the annular light reflector/refractor and an annular light projector. In an example, augmented reality eyewear can comprise a radial array of ten or more light barriers between an annular light projector and an annular light reflector/refractor. In an example, augmented reality eyewear can comprise ten or more light barriers which are circumferentially distributed around an annular light reflector/refractor between the annular light reflector/refractor and an annular light projector.

In an example, augmented reality eyewear can further comprise one or more optical components selected from the group consisting of: spatial light modulator, light guide, wave guide, birefringent material, thin-film transistor, compound lens, and diffraction grating. In an example, augmented reality eyewear can further comprise one or more optical components selected from the group consisting of: diffraction optical element array, reflection holographic optical element, directional diffuser, etched waveguide, and fiber optics.

In an example, augmented reality eyewear can further comprise one or more lenses between an annular light projector and an annular light reflector/refractor. In an example, augmented reality eyewear can further comprise one or more lenses between an annular array of light projectors in an annular array or light reflectors/refractors. In an example, augmented reality eyewear can further comprise one or more lenses between an annular light reflector/refractor and an arcuate-proximal-surface light reflector. In an example, augmented reality eyewear can further comprise one or more lenses between an annular array of light reflectors/refractors and an arcuate-proximal-surface light reflector. In an example, one or more lenses can be selected from the group consisting of: aspheric lens, asymmetric lens, collimating lens, compound lens, concave lens, concentric lenses, contact lens, convex lens, curved lens, diverging lens, filtered lens, flat lens, fluid lens, fly's eye lens, Fresnel lens, lens with integrated circuitry, lens with nanoscale gratings, liquid lens, MEMS-based lens array, microlens, mirrored lens, movable lens, optoelectric lens, parabolic lens, prescription lens, semi-reflective lens, simple lens, smart lens, spherical lens, tinted lens, variable-focus lens, virtual curved lens, vision-correcting lens, and wedge-shaped lens.

In an example, augmented reality eyewear can include a local power source. In an example, augmented reality eyewear can include a battery. In an example, augmented reality eyewear can further comprise include one or more sensors selected from the group consisting of: inertial motion sensor, accelerometer, gyroscope, GPS module, inclinometer, magnetometer, impedance sensor, permittivity sensor, resistance sensor, microphone, sound sensor, thermal energy sensor, ambient light sensor, air pressure sensor, and humidity sensor.

In an example, augmented reality eyewear can further comprise an eye tracker (such as an optical sensor) which tracks the position and/or focal direction of a person's eye. In an example, eye tracking can enable control of a virtual object based on movement of a person's eye. In an example, eyewear can further comprise a frame-mounted camera which tracks the movement and focal direction of a person's eye. In an example, augmented reality eyewear can further comprise one or more optical components selected from the group consisting of: light channel, reflection holographic volume grating, spatial filter, optoelectric lens, beam splitter, and polarizing beam splitter. In an example, augmented reality eyewear can further comprise one or more optical components selected from the group consisting of: light-transmitting nanotube, optical waveguide, metal oxide semiconductor, prism, and micro-mirror array.

In an example, augmented reality eyewear can further comprise a haptic computer-to-human interface. In an example, such eyewear can include a vibrating member, buzzer, roller, or electrical pulse generator which sends vibrations or electrical pulses to a person's body. In an example, such eyewear can further comprise an auditory computer-to-human interface. In an example, such eyewear can include an ear phone, headset, and/or speaker. In an example, such eyewear can communicate with the wearer by generating voice messages, tones, alarms, songs, or other auditory stimuli. In an example, this eyewear can further comprise one or more components selected from the group consisting of: battery or other power source; data processing unit; data transmitter; and data receiver. Example variations discussed elsewhere in this disclosure or in priority-linked disclosures can be applied where relevant to the example shown in these figures.

Figure 2:
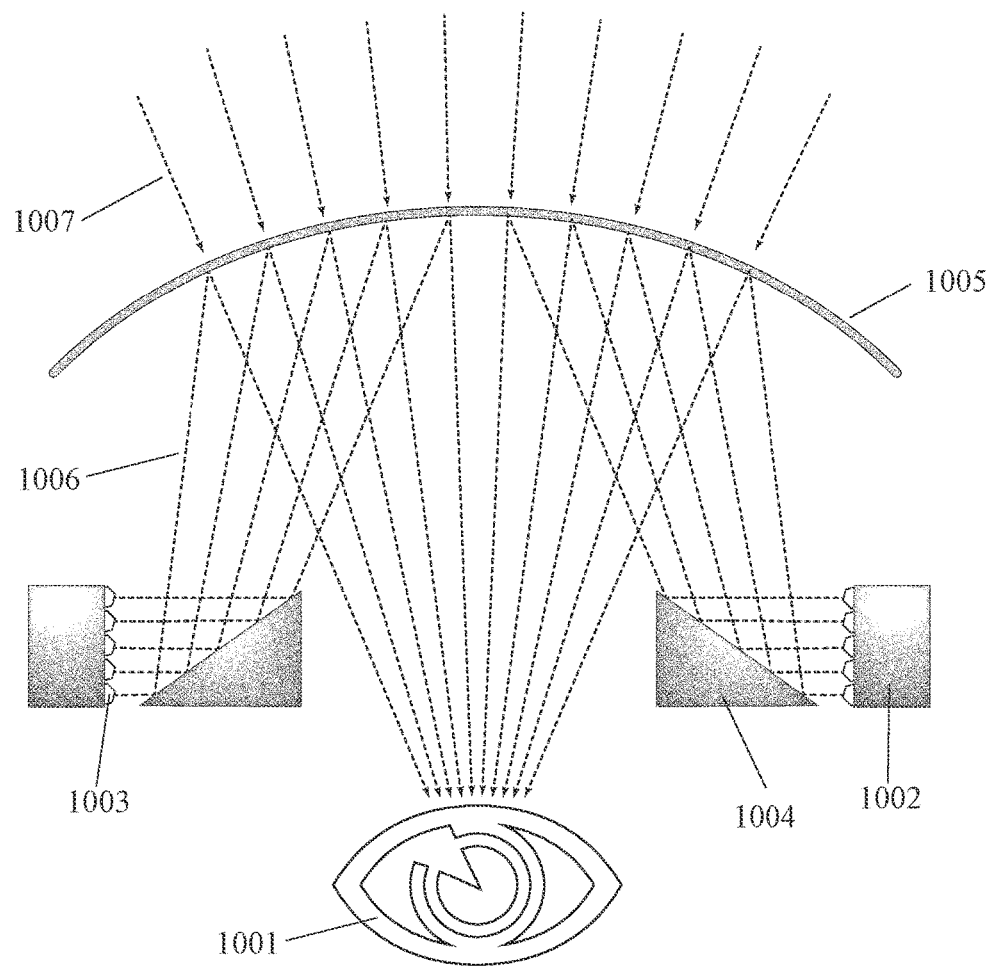
FIG. 2 shows a cross-sectional view of the single-eye portion in FIG. 1.

FIG. 2 shows a cross-sectional side view of the optical structure which was introduced in FIG. 1. FIG. 2 is similar to FIG. 1, except that cross-sectional slices of the annular light projector, annular light reflector/refractor, and arcuate-proximal-surface light reflector are shown instead of a full three-dimensional view of these three structures. The radially-outward surface of the annular reflector/refractor is shown as flat in FIG. 2 for diagrammatic simplicity, but it can be convex or concave.

FIG. 2 shows: a cross-sectional slice of annular light projector 1002 which projects images of virtual objects into a person's field of vision, wherein this annular light projector is configured to span at least 75% of the circumference of a virtual circle around a near-eye area which is less than 6" in front of the person's eye, and wherein this annular light projector further comprises an array of light emitters (including light emitter 1003) which emit light rays in a radially-inward direction toward the near-eye area; a cross-sectional slice of annular light reflector/refractor 1004, wherein this annular light reflector/refractor is configured to span at least 75% of the circumference of a virtual circle around the near-eye area, wherein this annular light reflector/refractor is located between the annular light projector and the center of the near-eye area, wherein this annular light reflector/refractor receives light rays from the annular light projector and redirects these light rays away from the person's eye; and a cross-sectional slice of arcuate-proximal-surface light reflector 1005, wherein this arcuate-proximal-surface light reflector is located between the near-eye area and the environment in front of the person's eye, wherein a proximal surface is configured to be closer to the person's eye and a distal surface is configured to be farther from the person's eye, wherein the proximal surface of the arcuate-proximal-surface light reflector receives light rays from the annular light reflector/refractor and at least partially reflects these light rays back toward the person's eye, wherein the distal surface of the arcuate-proximal-surface light reflector receives light rays from the environment in front of the person's eye and transmits these light rays toward the person's eye through a central opening or transparent core in the annular light reflector/refractor.

FIG. 2 also includes dotted-line arrows which represent the paths of a subset of virtual object light rays (including light ray 1006) emitted from the annular light projector and the paths of a subset of environmental light rays (including environmental light ray 1007) from the person's environment. Only a subset of virtual object light rays and environmental light rays in a single cross-sectional plane are shown in this figure. Similarly, only a subset of light emitters (including light emitter 1003) in a single cross-sectional plane are shown in this figure. It is to be understood that there are light emitters distributed around the (entire) circumference of the radially-inward surface of the annular light projector, not just those shown in this single cross-sectional plane. It is also to be understood that there are a myriad of virtual object light rays and environmental light rays in other cross-sectional planes.

Figure 3:
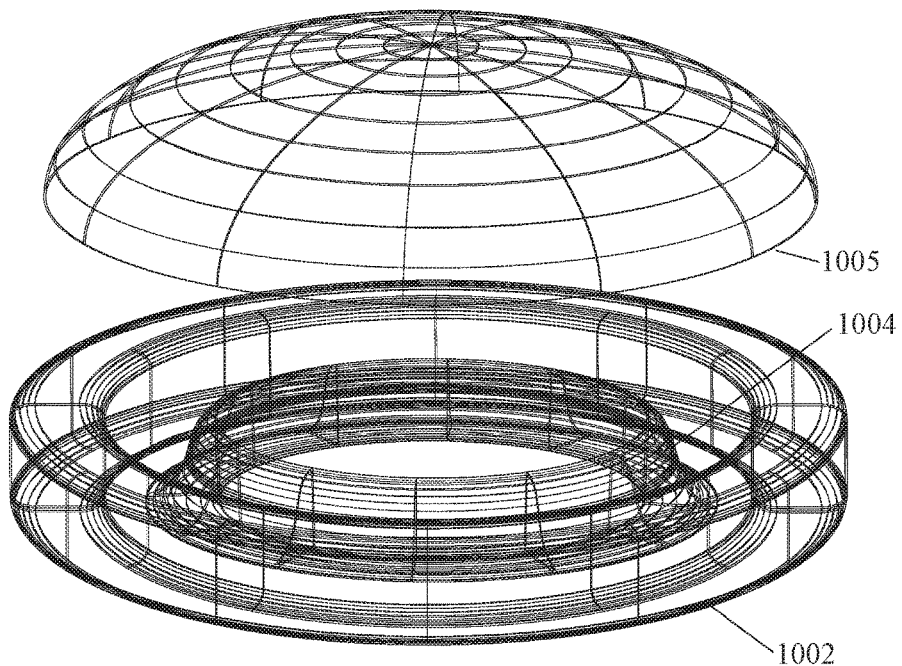
FIG. 3 shows a wireframe view of the single-eye portion in FIG. 1.

FIG. 3 shows a wireframe view of the same three VAPE optical components (annular light projector 1002, annular light reflector/refractor 1004, and arcuate-proximal-surface light reflector 1005) which were introduced in FIG. 1. Light rays are not shown in FIG. 3 to avoid cluttering the figure and to more clearly show the three-dimensional shapes of the optical components in this example. The see-through nature of the wireframe perspective in FIG. 3 provides additional visual perspective on the shapes of these three optical components in this example.

Figure 4:
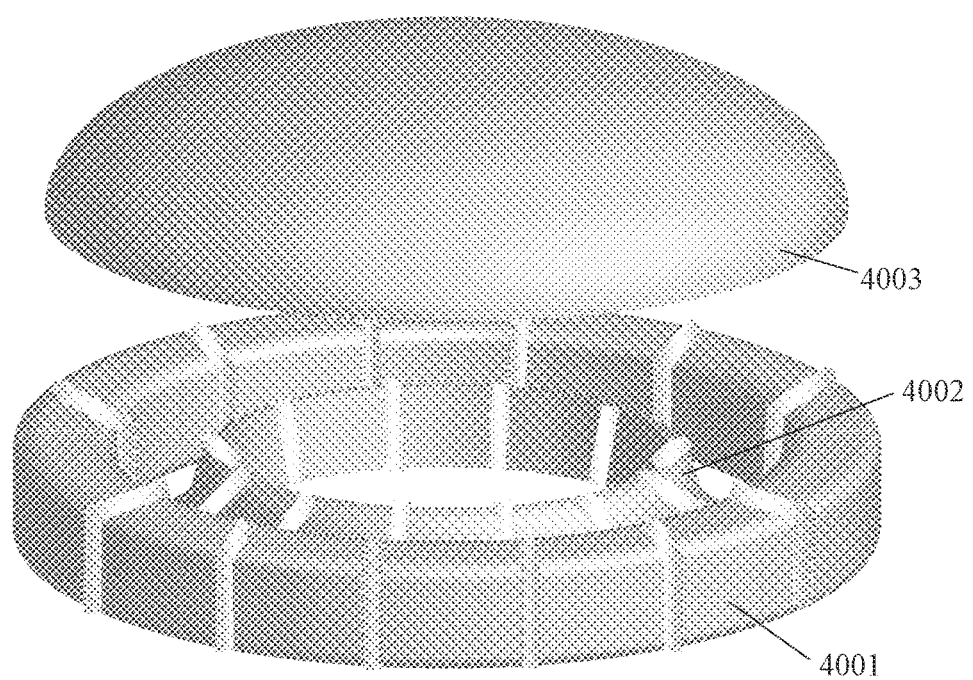
FIG. 4 shows a single-eye portion with a segmented annular light projector and a segmented annular light reflector.

FIG. 4 shows an example of augmented reality eyewear comprising: an annular array of light projectors (including 4001), wherein this annular array of light projectors projects images of virtual objects into a person's field of vision, wherein this annular array of light projectors is configured to span at least 75% of the circumference of a virtual circle around a near-eye area which is less than 6" in front of the person's eye, and wherein this annular array of light projectors further comprises light emitters which emit light rays in a radially-inward direction toward the near-eye area; an annular array of light reflectors/refractors (including 4002), wherein this annular array of light reflectors/refractors is configured to span at least 75% of the circumference of a virtual circle around the near-eye area, wherein this annular array of light reflectors/refractors is located between the annular array of light projectors and the center of the near-eye area, wherein this annular array of light reflectors/refractors receives light rays from the annular array of light projectors and redirects them away from the person's eye; and an arcuate-proximal-surface light reflector 4003, wherein this arcuate-proximal-surface light reflector is configured to be between the near-eye area and the environment in front of the person's eye, wherein the proximal surface is configured to be closer to the person's eye and the distal surface is configured to be farther from the person's eye, wherein the proximal surface of this arcuate-proximal-surface light reflector receives light rays from the annular array of light reflectors/refractors and at least partially reflects these light rays back toward the person's eye, wherein the distal surface of this arcuate-proximal-surface light reflector also receives light rays from the environment in front of the person's eye and transmits these light rays toward the person's eye through a central opening or transparent core in the annular light reflector/refractor.

In an example, there can be gaps and/or light barriers between individual light projectors in an annular array of light projectors. In an example, light barriers (such as "fins" or "spokes") can block light co-mingling of light emitted from individual light projectors in an annular array of light projectors. In an example, there can be gaps and/or light barriers between individual light reflectors/refractors in an annular array of light reflectors/refractors. In an example, light barriers (such as "fins" or "spokes") can block light co-mingling of light reflected from individual light reflectors/refractors in an annular array of light reflectors/refractors.

In an example, augmented reality eyewear can comprise four individual light projectors and four individual light reflectors/refractors, comprising an annular array of light projectors and an annular array of light reflectors/refractors respectively, around a space in front of a person's eye. In an example, there can also be a circumferential array of six ("fin" or "spoke" shaped) light barriers between individual light projectors and between individual light reflectors/refractors, respectively. In an example, a circumferential array of six ("fin" or "spoke" shaped) light barriers can separate optically-linked pairs of individual light projectors and individual light reflectors/refractors to reduce optical "cross talk" between these pairs.

In an example, augmented reality eyewear can comprise six individual light projectors and six individual light reflectors/refractors, comprising an annular array of light projectors and an annular array of light reflectors/refractors respectively, around a space in front of a person's eye. In an example, there can also be a circumferential array of six ("fin" or "spoke" shaped) light barriers between individual light projectors and between individual light reflectors/refractors, respectively. In an example, a circumferential array of six ("fin" or "spoke" shaped) light barriers can separate optically-linked pairs of individual light projectors and individual light reflectors/refractors to reduce optical "cross talk" between these pairs.

In an example, augmented reality eyewear can comprise eight individual light projectors and eight individual light reflectors/refractors, comprising an annular array of light projectors and an annular array of light reflectors/refractors respectively, around a space in front of a person's eye. In an example, there can also be a circumferential array of eight ("fin" or "spoke" shaped) light barriers between individual light projectors and between individual light reflectors/refractors, respectively. In an example, a circumferential array of eight ("fin" or "spoke" shaped) light barriers can separate optically-linked pairs of individual light projectors and individual light reflectors/refractors to reduce optical "cross talk" between these pairs.

In an example, augmented reality eyewear can comprise ten or more individual light projectors and ten or more individual light reflectors/refractors, comprising an annular array of light projectors and an annular array of light reflectors/refractors respectively, around a space in front of a person's eye. In an example, there can also be a circumferential array of ten or more ("fin" or "spoke" shaped) light barriers between individual light projectors and between individual light reflectors/refractors, respectively. In an example, a circumferential array of ten or more ("fin" or "spoke" shaped) light barriers can separate optically-linked pairs of individual light projectors and individual light reflectors/refractors to reduce optical "cross talk" between these pairs.

In an example, individual light projectors comprising an annular array can each have an arcuate radially-inward surface and/or an arcuate radially-outward surface. In an example, individual light projectors comprising an annular array can each have a flat radially-inward surface and/or a flat radially-outward surface. In an example, individual flat light projectors can combine to form a polygonal annular array. In an example, individual flat light projectors can combine to form a polygonal ring or torus. In an example, individual light reflectors/refractors comprising an annular reflector/refractor array can each have an arcuate radially-inward surface and/or an arcuate radially-outward surface. In an example, individual light reflectors/refractors comprising an annular array can each have a flat radially-inward surface and/or a flat radially-outward surface. In an example, individual light reflectors/refractors can combine to form a polygonal annular array. In an example, individual flat light projectors can combine to form a polygonal ring or torus. In an example, light projectors in an annular projector array and light reflectors/refractors in an annular reflector/refractor array can be paired and optically linked.

In an example, there can be six individual light projectors in a ring comprising an annular array of light projectors. In an example, there can be six individual light reflectors/refractors in a ring comprising an annular array of light reflectors/refractors. In an example, these six light projectors and six light reflectors/refractors can form six optically-linked projector-reflector/refractor pairs. In an example, augmented reality eyewear can further comprise six light-barrier fins between the annular array of light projectors and the annular array of light reflector/refractors. In an example, there can be eight individual light projectors in a ring comprising an annular array of light projectors. In an example, there can be eight individual light reflectors/refractors in a ring comprising an annular array of light reflectors/refractors. In an example, these eight light projectors and eight light reflectors/refractors can form eight optically-linked projector-reflector/refractor pairs. In an example, augmented reality eyewear can further comprise eight light-barrier fins between the annular array of light projectors and the annular array of light reflector/refractors.

In an example, there can be twelve individual light projectors in a ring comprising an annular array of light projectors. In an example, there can be twelve individual light reflectors/refractors in a ring comprising an annular array of light reflectors/refractors. In an example, these twelve light projectors and twelve light reflectors/refractors can form twelve optically-linked projector-reflector/refractor pairs. In an example, augmented reality eyewear can further comprise twelve light-barrier fins between the annular array of light projectors and the annular array of light reflector/refractors. In an example, augmented reality eyewear can further comprise a radial array of light barriers between individual light projectors comprising an annular light projector array and between individual light reflectors/refractors comprising an annular light reflector/refractor array. In an example, these light barriers can create optically-linked pairs of individual light projectors and individual light reflectors/refractors around (at least 75% of) the circumference of a virtual circle around a space in front of a person's eye.

In an example, augmented reality eyewear can comprise: an annular light projector which projects images of virtual objects into a person's field of vision, wherein this annular light projector is configured to span at least 75% of the circumference of a virtual circle around a near-eye area which is less than 6" in front of the person's eye; and an arcuate-proximal-surface light reflector, wherein this arcuate-proximal-surface light reflector is located between the near-eye area and the environment in front of the person's eye, wherein the proximal surface is the surface configured to be closest to the person's eye, wherein the proximal surface of this arcuate-proximal-surface light reflector receives light rays from the annular light projector and (at least partially) reflects these light rays back toward the person's eye, wherein the distal surface of this arcuate-proximal-surface light reflector receives light rays from the environment in front of the person's eye and transmits these light rays toward the person's eye through a central opening or transparent core in the annular light reflector/refractor.

Figure 5:
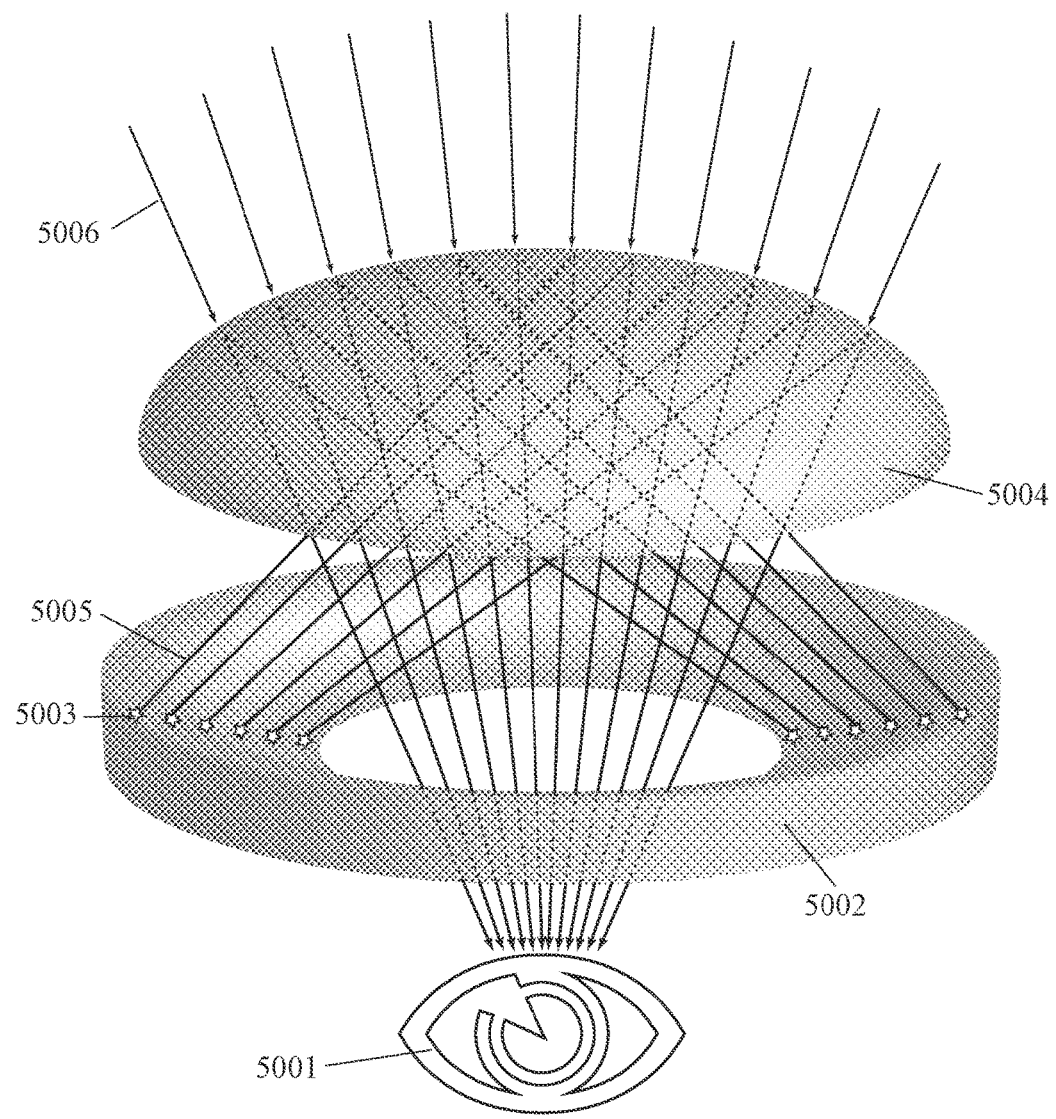
FIG. 5 shows an oblique view of a single-eye portion with an annular light projector, but no annular light reflector.

FIG. 5 shows another example of augmented reality eyewear. FIG. 5 shows an oblique side view of a single Volumetric Annular Photon Emission (VAPE) optical structure in front of one eye. In an example, augmented reality eyewear can comprise two such optical structures, one in front of each eye. In an example, these optical structures can be held in place by an eyewear frame, goggles, headset, helmet, or visor. The overall form of augmented reality eyewear can be selected from the group consisting of: augmented reality headset, electronically-functional glasses, eyeglasses, face mounted display, goggles, head mounted display, head worn display, heads up display, helmet, monocle, near eye display, pair of eyeglasses, prescription eyeglasses, see-through head-mounted display, "smart glasses," sunglasses, and visor.

The optical structure shown in FIG. 5 comprises: an annular light projector 5002 which projects images of virtual objects into a person's field of vision, wherein this annular light projector is configured to span at least 75% of the circumference of a virtual circle around a near-eye area which is less than 6" in front of the person's eye 5001; and an arcuate-proximal-surface light reflector 5004, wherein this arcuate-proximal-surface light reflector is located between the near-eye area and the environment in front of the person's eye, wherein the proximal surface is the surface configured to be closest to the person's eye, wherein the proximal surface of this arcuate-proximal-surface light reflector receives light rays from the annular light projector and (at least partially) reflects these light rays back toward the person's eye, wherein the distal surface of this arcuate-proximal-surface light reflector receives light rays from the environment in front of the person's eye and transmits these light rays toward the person's eye through a central opening or transparent core in the annular light reflector/refractor.

FIG. 5 also includes solid and dotted-line arrows which represent the paths of a subset of virtual object light rays (including light ray 5005) emitted from the annular light projector and the paths of a subset of environmental light rays (including environmental light ray 5006) from the person's environment. When these light rays are in full view from the figure perspective, they are shown with solid lines. When these light rays are obscured by an optical structure, they are shown with dotted lines.

Only a subset of virtual object light rays and environmental light rays in a single cross-sectional plane are shown in this figure in order to avoid hopelessly cluttering the figure. Similarly, only a subset of light emitters (including light emitter 5003) in a single cross-sectional plane are shown in this figure. It is to be understood that there are light emitters distributed around the circumference of the radially-inward surface of the annular light projector, not just those shown in this single cross-sectional plane. It is also to be understood that there are a myriad of virtual object light rays and environmental light rays in other cross-sectional planes (e.g. rotated around an axis connecting the centers of the arcuate-proximal-surface light reflector and the annular light projector). Overall, the perspective shown in FIG. 5 shows the full volumes of annular light projector 5002 and arcuate-proximal-surface light reflector 5004, but only shows light emitters and light rays in a single cross-sectional plane.

In an example, a virtual object can be generated by a computer. A virtual object can be a computer-generated image which is not visible in a screen-independent environmental context with the naked eye, but does appears to a device-wearer in a screen-independent environmental context. In an example, a virtual object can be linked conceptually to an environmental object. In an example, a virtual object can comprise words, symbols, or graphics which convey information about a nearby environmental object.

In an example, a virtual object can be perceptually linked in physical location and/or position relative to a real environmental object in a person's field of vision. In an example, a virtual object can appear to be connected to an environmental object. A virtual object can appear to a viewer as being consistently on top of, adjacent to, or beneath an environmental object. In an example, a virtual object can be super-imposed over (i.e. shown in front of and/or occluding) an environmental object or sub-imposed under (i.e. shown behind and/or occluded by) an environmental object in a person's field of vision. In an example, a virtual object can appear to be moving with an environmental object when the environmental object moves. In an example, both a virtual object and an environmental object can appear to move together, relative to a person's field of vision, when the person moves their head.

In an example, the appearance of a virtual object can be changed to simulate its physical interaction with a physical environmental object. In an example, a virtual object can appear to be obscured by a physical object when the two objects meet. In an example, a virtual object can appear to come out of (or go into) a physical object. In an example, a virtual object can function as a virtual mouse and/or cursor to enable a person to interact with their environment in augmented reality. In an example, a person can select an environmental object by moving a virtual object (e.g. virtual mouse, cursor, or pointer) to the environmental object. In an example, a person can purchase an environmental object by moving a virtual object (e.g. virtual mouse, cursor, or pointer) to the environmental object.

In an example, an annular light projector can be a type of projector (or display) which is selected from the group consisting of: collimated light projector and/or display; ferroelectric liquid crystal on silicon (FLCOS) projector and/or display; holographic projector and/or display; light emitting diode (LED) projector and/or display; liquid crystal display (LCD); liquid crystal on silicon (LCOS) projector and/or display; microdisplay and/or microprojector; micromirror array; picodisplay and/or picoprojector; and spatial light modulator (SLM) projector and/or display.

In an example, an annular light projector (or display) can comprise a light-emitting ring, torus, cylinder, or disk with a central opening or hole. In an example, an annular light projector (or display) can comprise a light-emitting ring, torus, cylinder, or disk with a transparent central portion or core. In an example, an annular light projector can have a shape like an athletic stadium with sloping inward-facing sides around a central circular area (e.g. a central circular opening, hole, or transparent core). In an example, an annular light projector can have a shape selected from the group consisting of: frustum, funnel, and athletic stadium.

In an example, an annular light projector can have an outer diameter between 0.5" and 6." In an example, the width of a central opening, hole, or transparent core of an annular light projector can be between 0.5" and 5." In an example, the width of a central opening, hole, or transparent core in the middle of an annular light projector can be between 20% and 80% of the width of the annular light projector. In an example, a central opening, hole, or transparent core can have a circular perimeter.

In an example, an annular light projector can be located within 6" of a person's eye. In an example, an annular light projector can be located within 3" of a person's eye. In an example, an annular light projector can be centered around a point in space which is directly in front of the center of an eye lens. In an example, an annular light projector can have a proximal surface and a distal surface, wherein the proximal surface is configured to be closer to a person's eye and the distal surface is configured to be farther from the person's eye. In an example, the proximal surface of an annular light projector can be substantially parallel to the plane of an eye lens when a person is looking straight ahead.

In an example, an annular light projector (or display) can have a shape selected from the group consisting of: arcuate cylinder, arcuate ring, circle, ellipse, oval, and torus. In an example, an annular light projector can be continuous and uniformly arcuate. In an example, an annular light projector can be a continuous arcuate light-emitting ring which encircles a space in front of a person's eye. In an example, an annular light projector can comprise a continuous arcuate light-emitting torus which encircles a space in front of a person's eye. In an example, an annular light projector can comprise a continuous arcuate light-emitting cylinder which encircles a space in front of a person's eye. In an example, an annular light projector can comprise a continuous arcuate light-emitting disk with a hollow or transparent core which encircles a space in front of a person's eye.

In an example, an annular light projector (or display) can have a shape selected from the group consisting of: hexagon, octagon, decagon, and wobegon. In an example, an annular light projector can be continuous, but be comprised of individual non-arcuate segments or sections. In an example, an annular light projector can have polygonal inner and/or outer perimeters. In an example, an annular light projector can be a continuous polygonal light-emitting ring which encircles a space in front of a person's eye. In an example, an annular light projector can comprise a continuous polygonal light-emitting torus which encircles a space in front of a person's eye. In an example, an annular light projector can comprise a continuous polygonal light-emitting cylinder which encircles a space in front of a person's eye. In an example, an annular light projector can comprise a circumferential series of arcuate light-emitting segments or sections which encircles a space in front of a person's eye. In an example, an annular light projector can comprise a circumferential polygonal series of flat light-emitting segments or sections which encircles a space in front of a person's eye.

In an example, an annular light projector can be discontinuous with a circumferential series of individually-arcuate segments or sections. In an example, an annular light projector can be a light-emitting ring comprised of a circumferential series of arcuate projector segments or sections with gaps and/or light barriers between them. In an example, an annular light projector can be a light-emitting torus comprised of a circumferential series of arcuate projector segments or sections with gaps and/or light barriers between them. In an example, an annular light projector can be a light-emitting cylinder comprised of a circumferential series of arcuate projector segments or sections with gaps and/or light barriers between them. In an example, a discontinuous annular light projector can comprise a circumferential series of four, six, or eight arcuate projector segments or sections with gaps and/or light barriers between them. In an example, an annular light projector can comprise a circumferential array often or more arcuate projector segments or sections.

In an example, an annular light projector can be discontinuous with a circumferential series of individually-flat segments or sections. In an example, an annular light projector can be a light-emitting polygonal ring comprised of a circumferential series of individually-flat projector segments or sections with gaps and/or light barriers between them. In an example, an annular light projector can be a light-emitting polygonal torus comprised of a circumferential series of individually-flat projector segments or sections with gaps and/or light barriers between them. In an example, an annular light projector can be a light-emitting polygonal cylinder comprised of a circumferential series of individually-flat projector segments or sections with gaps and/or light barriers between them. In an example, a discontinuous annular light projector can comprise a circumferential series of four, six, or eight flat projector segments or sections with gaps and/or light barriers between them. In an example, an annular light projector can comprise a circumferential array of ten or more flat projector segments or sections.

In an example, an annular light projector can comprise a continuous arcuate light-emitting ring which curves around at least 75% of the circumference of a virtual circle around a space in front of a person's eye. In an example, an annular light projector can comprise a continuous arcuate light-emitting torus which curves around at least 75% of the circumference of a virtual circle around a space in front of a person's eye. In an example, an annular light projector can comprise a continuous arcuate light-emitting cylinder which curves around at least 75% of the circumference of a virtual circle around a space in front of a person's eye. In an example, an annular light projector can comprise a continuous polygonal light-emitting ring which curves around at least 75% of the circumference of a virtual circle around a space in front of a person's eye. In an example, an annular light projector can comprise a continuous polygonal light-emitting torus which curves around at least 75% of the circumference of a virtual circle around a space in front of a person's eye. In an example, an annular light projector can comprise a continuous polygonal light-emitting cylinder which curves around at least 75% of the circumference of a virtual circle around a space in front of a person's eye.

In an example, an annular light projector can have a shape selected from the group consisting of: arcuate cylinder arcuate ring, circle, ellipse, oval, polygonal cylinder polygonal ring, and torus. In an example, an annular light projector can comprise a circumferential series of arcuate light-emitting segments or sections which encircle a space in front of a person's eye. In an example, an annular light projector can comprise a circumferential polygonal series of flat light-emitting segments or sections encircles at least 75% of the circumference of a virtual circle around a space in front of a person's eye.

In an example, an annular light projector can completely encircle an area less than 6" in front of a person's eye. In an example, an annular light projector can encircle at least 75% of an area less than 6" in front of a person's eye. In an example, an annular light projector can encircle at least 66% of an area less than 6" in front of a person's eye. In an example, an annular light projector can comprise a continuous light-emitting arcuate ring, torus, circle, or cylinder. In an example, an annular light projector can comprise an array of light emitting segments or sections which together comprise a discontinuous light-emitting ring, torus, circle, or cylinder. In an example, light emitting segments or sections in a discontinuous annular array can each be arcuate. In an example, individual light emitting segments or sections in an annular array can be non-arcuate, but together they can comprise an annular ring, torus, circle, or cylinder. In an example, light emitting segments or sections in an annular array can be individually flat, but together can comprise segments or sections of an overall polygonal ring, torus, circle, or cylinder. In an example, an annular light projector can be a polygonal light projector composed of a series of individually-flat segments or sections wherein each flat segment or section projects a set of light rays in a radially-inward manner.

In an example, an annular light projector can further comprise an array of light emitters which emit light rays in a distal direction toward an arcuate-proximal-surface light reflector. In an example, these light emitters can emit substantially collimated light. In an example, an annular light projector can further comprise a circumferential array of light emitters which emit light rays in a distal direction toward an arcuate-proximal-surface light reflector. In an example, an annular light projector can further comprise a ring of light emitters which emit light rays in a distal direction toward an arcuate-proximal-surface light reflector. In an example, an annular light projector can further comprise a cylindrical array of distal-facing light emitters.

In an example, an arcuate-proximal-surface light reflector can be a mirror. In an example, an arcuate-proximal-surface light reflector can be a mirror one-way mirror. In an example, an arcuate-proximal-surface light reflector can be a spherical (section) mirror. In an example, an arcuate-proximal-surface reflector can be made from one or more materials selected from the group consisting of: polytetrafluoroethylene, indium tin oxide, graphene, Mylar™, polyvinylpyrrolidone, acrylic, tantalum oxide, neoprene, crystal, aluminum, silicon, parylene, polyimide, and polyvinylidene difluoride.

In an example, an arcuate-proximal-surface light reflector can be concave. In an example, an arcuate-proximal-surface light reflector can redirect virtual object light rays toward a person's eye in a converging manner. In an example, an arcuate-proximal-surface light reflector can have a central rotational axis which is coaxial with the central rotational axes of an annular light projector and/or an annular light reflector/refractor. In an example, an arcuate-proximal-surface reflector can be made from one or more materials selected from the group consisting of: carbon, polycarbonate, silver alloy, polyvinyl alcohol, copper alloy, photorefractive, polypropylene oxide, ethylene tetrafluoroethylene, polyacrylate, silicon oxy nitride, and carbon nanotubes.

In an example, an arcuate-proximal-surface light reflector can be configured to be between a near-eye area and the environment in front of the person's eye. In an example, the proximal surface of an arcuate-proximal-surface light reflector can receive light rays from an annular light projector and (at least partially) reflect these light rays back toward the person's eye. In an example, the distal surface of an arcuate-proximal-surface light reflector can receive light rays from the environment in front of the person's eye and transmit these light rays through a central opening or transparent core of the annular light projector toward the person's eye.

In an example, an arcuate-proximal-surface reflector can be made from one or more materials selected from the group consisting of: photopolymer, silver halide emulsion, polyethylene oxide, dichromated gelatin, polyethylene naphtalate, polyethylene terephthalate, nickel, glass, polyaniline, polyurethane, silver, gold, and polytetramethylene oxide. In an example, an arcuate-proximal-surface reflector can be made from one or more materials selected from the group consisting of: copper, silicone, acetate, polyamide, gallium nitride, silicon oxide, aluminum oxide, polypyrrole, silicon nitride, polymethyl methacrylate, and polystyrene.

In an example, augmented reality eyewear can further comprise an array of light barriers between an annular light projector and arcuate-proximal-surface light reflector. In an example, these light barriers shaped like fins on a paddle wheel or slots on a roulette wheel. In an example, there can be the same number of light barriers are there are segments or sections of an annular light projector. In an example, a radial array of light barriers between an annular light projector and an arcuate-proximal-surface light reflector can help to reduce optical "cross-talk" between light rays in different cross-sections of the optical structure. In an example, these light barriers can extend distally from an annular light projector. In an example, an array of light barriers between an annular light projector and arcuate-proximal-surface light reflector can create optically-isolated paired segments or sections of the annular light projector and arcuate-proximal-surface light reflector.

In an example, augmented reality eyewear can further comprise one or more optical components selected from the group consisting of: spatial light modulator, light guide, wave guide, birefringent material, thin-film transistor, compound lens, and diffraction grating. In an example, augmented reality eyewear can further comprise one or more optical components selected from the group consisting of: diffraction optical element array, reflection holographic optical element, directional diffuser, etched waveguide, and fiber optics.

In an example, augmented reality eyewear can further comprise one or more lenses between an annular light projector and an annular light reflector/refractor. In an example, augmented reality eyewear can further comprise one or more lenses between an annular array of light projectors in an annular array or light reflectors/refractors. In an example, augmented reality eyewear can further comprise one or more lenses between an annular light reflector/refractor and an arcuate-proximal-surface light reflector. In an example, augmented reality eyewear can further comprise one or more lenses between an annular array of light reflectors/refractors and an arcuate-proximal-surface light reflector. In an example, one or more lenses can be selected from the group consisting of: aspheric lens, asymmetric lens, collimating lens, compound lens, concave lens, concentric lenses, contact lens, convex lens, curved lens, diverging lens, filtered lens, flat lens, fluid lens, fly's eye lens, Fresnel lens, lens with integrated circuitry, lens with nanoscale gratings, liquid lens, MEMS-based lens array, microlens, mirrored lens, movable lens, optoelectric lens, parabolic lens, prescription lens, semi-reflective lens, simple lens, smart lens, spherical lens, tinted lens, variable-focus lens, virtual curved lens, vision-correcting lens, and wedge-shaped lens.

In an example, augmented reality eyewear can include a local power source. In an example, augmented reality eyewear can include a battery. In an example, augmented reality eyewear can further comprise include one or more sensors selected from the group consisting of: inertial motion sensor, accelerometer, gyroscope, GPS module, inclinometer, magnetometer, impedance sensor, permittivity sensor, resistance sensor, microphone, sound sensor, thermal energy sensor, ambient light sensor, air pressure sensor, and humidity sensor.

In an example, augmented reality eyewear can further comprise an eye tracker (such as an optical sensor) which tracks the position and/or focal direction of a person's eye. In an example, eye tracking can enable control of a virtual object based on movement of a person's eye. In an example, eyewear can further comprise a frame-mounted camera which tracks the movement and focal direction of a person's eye. In an example, augmented reality eyewear can further comprise one or more optical components selected from the group consisting of: light channel, reflection holographic volume grating, spatial filter, optoelectric lens, beam splitter, and polarizing beam splitter. In an example, augmented reality eyewear can further comprise one or more optical components selected from the group consisting of: light-transmitting nanotube, optical waveguide, metal oxide semiconductor, prism, and micro-mirror array.

In an example, augmented reality eyewear can further comprise a haptic computer-to-human interface. In an example, such eyewear can include a vibrating member, buzzer, roller, or electrical pulse generator which sends vibrations or electrical pulses to a person's body. In an example, such eyewear can further comprise an auditory computer-to-human interface. In an example, such eyewear can include an ear phone, headset, and/or speaker. In an example, such eyewear can communicate with the wearer by generating voice messages, tones, alarms, songs, or other auditory stimuli. In an example, this eyewear can further comprise one or more components selected from the group consisting of: battery or other power source; data processing unit; data transmitter; and data receiver. Example variations discussed elsewhere in this disclosure or in priority-linked disclosures can be applied where relevant to the example shown in this figure.

Figure 6:
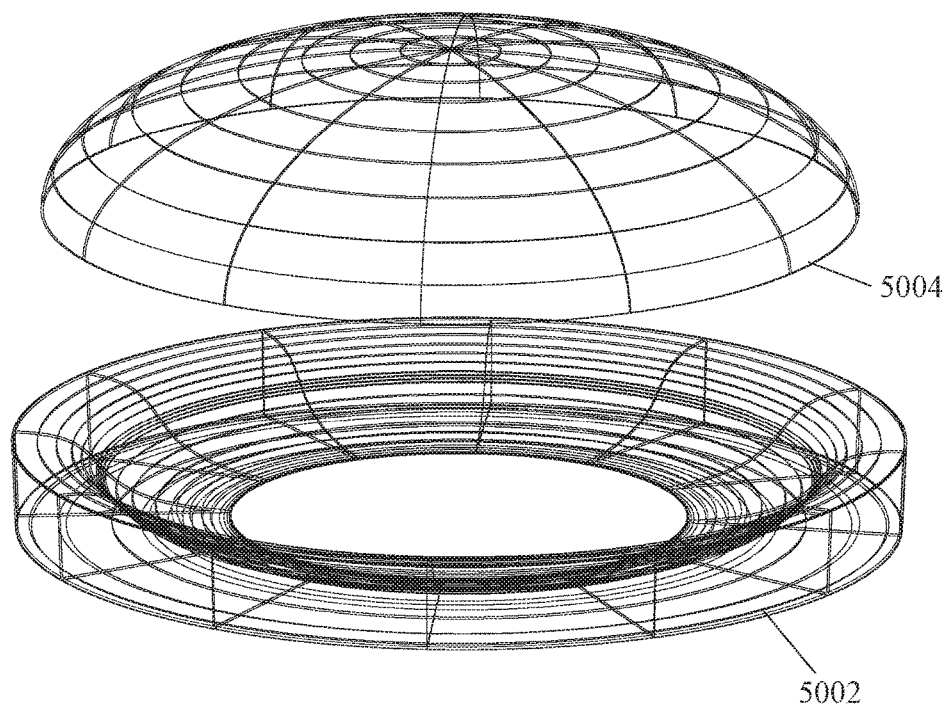
FIG. 6 shows a wireframe view of the single-eye portion in FIG. 5.

FIG. 6 shows a wireframe view of the same three VAPE optical components (annular light projector 5002 and arcuate-proximal-surface light reflector 5004) which were introduced in FIG. 5. Light rays are not shown in FIG. 6 to avoid cluttering the figure and to more clearly show the three-dimensional shapes of the optical components in this example. The see-through nature of the wireframe perspective in FIG. 6 provides additional visual perspective on the shapes of these two optical components in this example.

Figure 7:
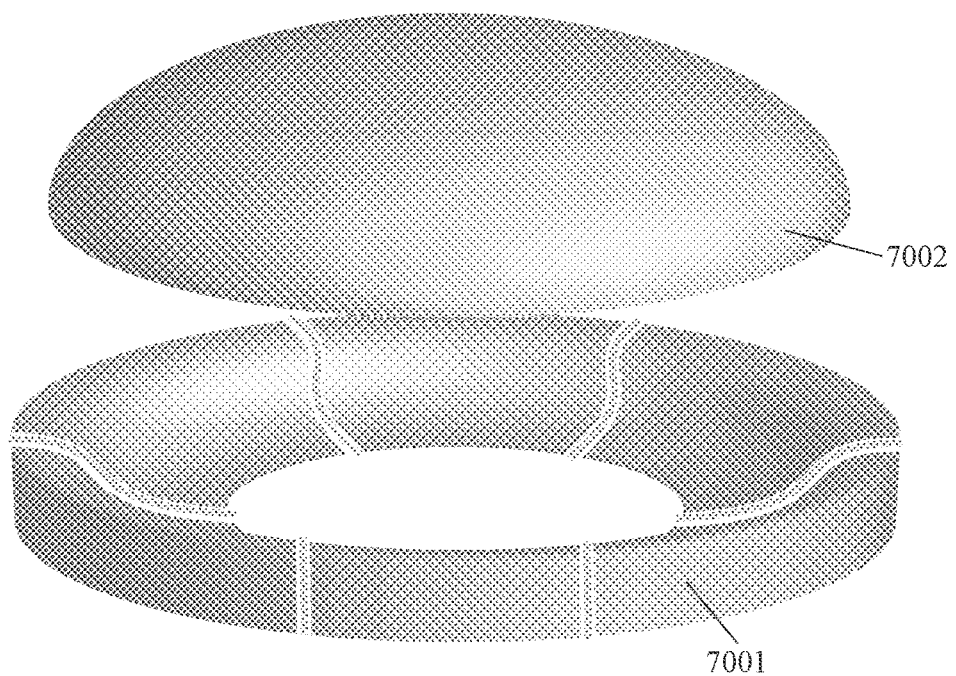
FIG. 7 shows a single-eye portion with a segmented annular light projector, but no annular light reflector.

FIG. 7 shows another example of augmented reality eyewear. FIG. 7 shows an oblique side view of a single Volumetric Annular Photon Emission (VAPE) optical structure in front of one eye. In an example, augmented reality eyewear can comprise two such optical structures, one in front of each eye. In an example, these optical structures can be held in place by an eyewear frame, goggles, headset, helmet, or visor. The overall form of augmented reality eyewear can be selected from the group consisting of: augmented reality headset, electronically-functional glasses, eyeglasses, face mounted display, goggles, head mounted display, head worn display, heads up display, helmet, monocle, near eye display, pair of eyeglasses, prescription eyeglasses, see-through head-mounted display, "smart glasses," sunglasses, and visor.

FIG. 7 shows an example of augmented reality eyewear comprising: an annular array of light projectors (including 7001), wherein this annular array of light projectors projects images of virtual objects into a person's field of vision, wherein this annular array of light projectors is configured to span at least 75% of the circumference of a virtual circle around a near-eye area which is less than 6" in front of the person's eye; and an arcuate-proximal-surface light reflector 7002, wherein this arcuate-proximal-surface light reflector is configured to be between the near-eye area and the environment in front of the person's eye, wherein the proximal surface is the surface configured to be closest to the person's eye and the distal surface is configured to be farthest from the person's eye, wherein the proximal surface of the arcuate-proximal-surface light reflector receives light rays from the annular array of light projectors and at least partially reflects these light rays back toward the person's eye, wherein the distal surface of this arcuate-proximal-surface light reflector receives light rays from the environment in front of the person's eye and transmits these light rays through a central opening or transparent core in the annular light projector toward the person's eye.

In an example, a light projector in an annular array of light projectors can be a type of projector selected from the group consisting of: collimated light projector and/or display; ferroelectric liquid crystal on silicon (FLCOS) projector and/or display; holographic projector and/or display; light emitting diode (LED) projector and/or display; liquid crystal display (LCD); liquid crystal on silicon (LCOS) projector and/or display; microdisplay and/or microprojector; micromirror array; picodisplay and/or picoprojector; and spatial light modulator (SLM) projector and/or display.

In the example shown in FIG. 6, an annular array of light projectors comprises six individual light projectors circumferentially-distributed in a ring around a space in front of an eye. In an example, augmented reality eyewear can comprise eight individual light projectors circumferentially-distributed in a ring around a space in front of an eye. In an example, augmented reality eyewear can comprise ten or more individual light projectors circumferentially-distributed in a ring around a space in front of an eye.

In an example, there can be gaps and/or light barriers between individual light projectors in an annular array of light projectors. In an example, these light barriers shaped like fins on a paddle wheel or slots on a roulette wheel. In an example, there can be the same number of light barriers are there are segments or sections of an annular light projector. In an example, augmented reality eyewear can further comprise a circumferential array of light barriers between segments or sections of an annular light projector. In an example, augmented reality eyewear can further comprise a circumferential array of light-blocking radially-extending fins, slots, spokes, or panels between an annular light projector and arcuate-proximal-surface light reflector. In an example, augmented reality eyewear can further comprise an array of light-blocking fins, slots, spokes, or panels which are evenly distributed around the circumference of an annular light projector. In an example, augmented reality eyewear can further comprise an array of light-blocking fins, slots, spokes, or panels between light projectors in an annular array of light projectors.

In an example, individual light projectors comprising an annular array can each have an arcuate radially-inward surface and/or an arcuate radially-outward surface. In an example, individual light projectors comprising an annular array can each have a flat radially-inward surface and/or a flat radially-outward surface. In an example, individual flat light projectors can combine to form a polygonal annular array. In an example, individual flat light projectors can combine to form a polygonal ring or torus.

In an example, individual light reflectors/refractors comprising an annular reflector/refractor array can each have an arcuate radially-inward surface and/or an arcuate radially-outward surface. In an example, individual light reflectors/refractors comprising an annular array can each have a flat radially-inward surface and/or a flat radially-outward surface. In an example, individual light reflectors/refractors can combine to form a polygonal annular array. In an example, individual flat light projectors can combine to form a polygonal ring or torus.

In an example, augmented reality eyewear can further comprise one or more optical components selected from the group consisting of: spatial light modulator, light guide, wave guide, birefringent material, thin-film transistor, compound lens, and diffraction grating. In an example, augmented reality eyewear can further comprise one or more optical components selected from the group consisting of: diffraction optical element array, reflection holographic optical element, directional diffuser, etched waveguide, and fiber optics.

In an example, augmented reality eyewear can further comprise one or more lenses between an annular array of light projectors in an annular array or light reflectors/refractors. In an example, augmented reality eyewear can further comprise one or more lenses between an annular array of light reflectors/refractors and an arcuate-proximalsurface light reflector. In an example, one or more lenses can be selected from the group consisting of: aspheric lens, asymmetric lens, collimating lens, compound lens, concave lens, concentric lenses, contact lens, convex lens, curved lens, diverging lens, filtered lens, flat lens, fluid lens, fly's eye lens, Fresnel lens, lens with integrated circuitry, lens with nanoscale gratings, liquid lens, MEMS-based lens array, microlens, mirrored lens, movable lens, optoelectric lens, parabolic lens, prescription lens, semi-reflective lens, simple lens, smart lens, spherical lens, tinted lens, variable-focus lens, virtual curved lens, vision-correcting lens, and wedge-shaped lens.

In an example, augmented reality eyewear can include a local power source. In an example, augmented reality eyewear can include a battery. In an example, augmented reality eyewear can further comprise include one or more sensors selected from the group consisting of: inertial motion sensor, accelerometer, gyroscope, GPS module, inclinometer, magnetometer, impedance sensor, permittivity sensor, resistance sensor, microphone, sound sensor, thermal energy sensor, ambient light sensor, air pressure sensor, and humidity sensor.

In an example, augmented reality eyewear can further comprise an eye tracker (such as an optical sensor) which tracks the position and/or focal direction of a person's eye. In an example, eye tracking can enable control of a virtual object based on movement of a person's eye. In an example, eyewear can further comprise a frame-mounted camera which tracks the movement and focal direction of a person's eye. In an example, augmented reality eyewear can further comprise one or more optical components selected from the group consisting of: light channel, reflection holographic volume grating, spatial filter, optoelectric lens, beam splitter, and polarizing beam splitter. In an example, augmented reality eyewear can further comprise one or more optical components selected from the group consisting of: light-transmitting nanotube, optical waveguide, metal oxide semiconductor, prism, and micro-mirror array.

In an example, augmented reality eyewear can further comprise a haptic computer-to-human interface. In an example, such eyewear can include a vibrating member, buzzer, roller, or electrical pulse generator which sends vibrations or electrical pulses to a person's body. In an example, such eyewear can further comprise an auditory computer-to-human interface. In an example, such eyewear can include an ear phone, headset, and/or speaker. In an example, such eyewear can communicate with the wearer by generating voice messages, tones, alarms, songs, or other auditory stimuli. In an example, this eyewear can further comprise one or more components selected from the group consisting of: battery or other power source; data processing unit; data transmitter; and data receiver. Example variations discussed elsewhere in this disclosure or in priority-linked disclosures can be applied where relevant to the example shown in this figure.

FIGS. 8 through 33 show additional examples of augmented reality eyewear including Volumetric Annular Photon Emission (VAPE) technology. In an example, augmented reality eyewear can comprise: (1) an eyewear frame which is configured to be worn on a person's head, wherein this eyewear frame spans from one of the person's ears, across the person's face, to the person's other ear; (2) a front optical member (such as a lens) which is configured be held by the eyewear frame in front of one of the person's eyes, within 4" of the eye, wherein the front optical member has a proximal surface which is configured to face the person's eye and a distal surface which is configured to face away from the person's eye, wherein the front optical member has a left side which is to the left of a central virtual vector which extends forward in a perpendicular manner from the center of the person's eye and a right side which is to the right of this central virtual vector; (3) a left-side light-emitting member (such as an image projector) which is configured to be held by the eyewear frame to the left of the central virtual vector, within 4" of the person's eye, wherein this left-side light-emitting member emits beams of light; (4) a left-side optical member (such as a lens, mirror, prism, or waveguide) which redirects beams of light from the left-side light-emitting member toward the left side of the proximal surface of the front optical member; (5) a right-side light-emitting member (such as an image projector) which is configured to be held by the eyewear frame to the right of the central virtual vector, within 4" of the person's eye, wherein this right-side light-emitting member emits beams of light; and (6) a right-side optical member (such as a lens, mirror, prism, or waveguide) which redirects beams of light from the right-side light-emitting member toward the right side of the proximal surface of the front optical member, and wherein redirected beams of light from the left-side light-emitting member and the right-side light-emitting member create virtual images in the person's field of view.

Figure 8:
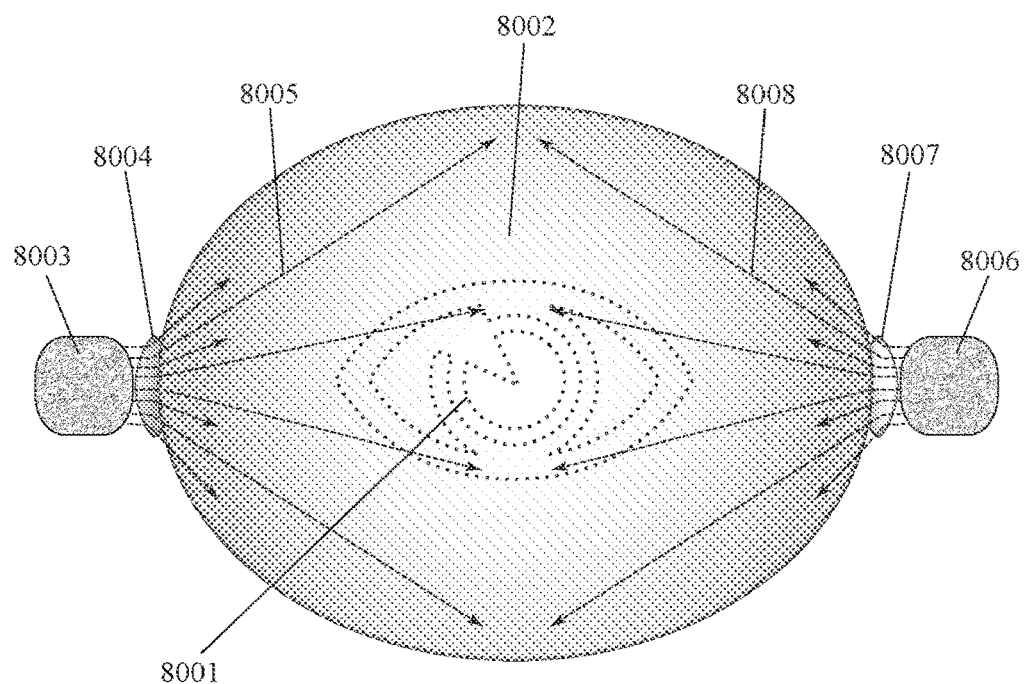
FIGS. 8 and 9 show two views of a single-eye portion with bilateral light emitters.
Figure 9:
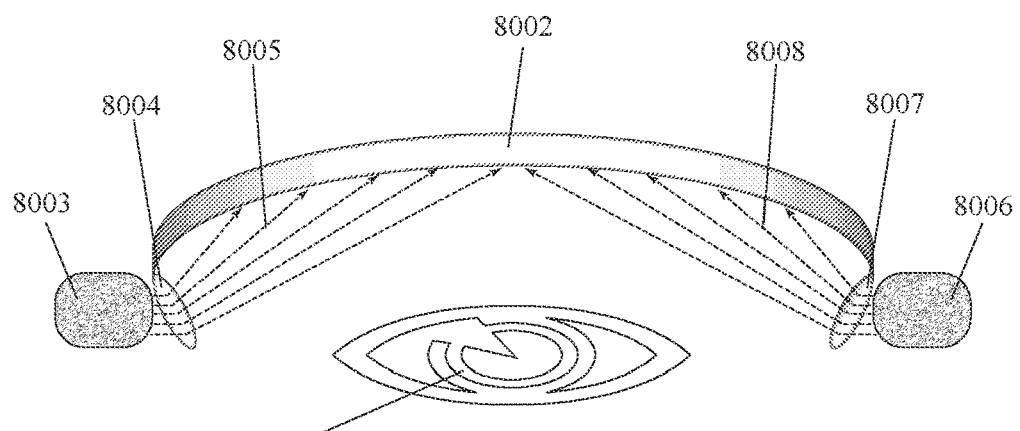

FIGS. 8 and 9 show two different perspectives of an example of a single-eye portion of augmented reality eyewear. In an example, augmented reality eyewear can comprise two such single-eye portions, one for each eye, to display augmented reality for both eyes. In an example, augmented reality eyewear can have such a portion for only eye, to display augmented reality for only one eye. FIG. 8 shows a front side view of this example. FIG. 9 shows a top-down cross-sectional view of this example.

The example of a single-eye portion of augmented reality eyewear shown in FIGS. 8 and 9 comprises: (1) a front optical member 8002 (such as a lens) which is configured be held by an eyewear frame in front of one of the person's eyes 8001, within 4" of the eye, wherein the front optical member has a proximal surface which is configured to face the person's eye and a distal surface which is configured to face away from the person's eye, wherein the front optical member has a left side which is to the left of a central virtual vector which extends forward in a perpendicular manner from the center of the person's eye and a right side which is to the right of this central virtual vector; (2) a left-side light-emitting member 8003 (such as an image projector) which is configured to be held by an eyewear frame to the left of the central virtual vector, within 4" of the person's eye, wherein this left-side light-emitting member emits beams of light 8005; (3) a left-side optical member 8004 (such as a lens, mirror, prism, or waveguide) which redirects beams of light 8005 from the left-side light-emitting member 8003 toward the left side of the proximal surface of the front optical member 8002; (4) a right-side light-emitting member 8006 (such as an image projector) which is configured to be held by an eyewear frame to the right of the central virtual vector, within 4" of the person's eye, wherein this right-side light-emitting member emits beams of light 8008; and (5) a right-side optical member 8007 (such as a lens, mirror, prism, or waveguide) which redirects beams of light 8008 from the right-side light-emitting member 8006 toward the right side of the proximal surface of the front optical member 8002, and wherein redirected beams of light from the left-side light-emitting member and the right-side light-emitting member create virtual images in the person's field of view. Relevant variations and components discussed elsewhere in this disclosure or in priority-linked disclosures can also be applied to this example.

In an example, augmented reality eyewear can comprise: an eyewear frame which is configured to be worn on the person's head, wherein the eyewear frame spans from one of the person's ears, across the person's face, to the person's other ear; a front lens which is configured be held by the eyewear frame in front of one of the person's eyes, within 4" of the person's eye, wherein the front lens has a proximal surface which is configured to face the person's eye and a distal surface which is configured to face away from the person's eye, wherein the front lens has a left side which is to the left of a central virtual vector which extends forward in a perpendicular manner from the center of the person's eye and a right side which is to the right of this central virtual vector; a left-side image projector which is configured to be held by the eyewear frame to the left of the central virtual vector, within 4" of the person's eye, wherein this left-side image projector emits beams of light; a left-side lens, mirror, prism, or waveguide which redirects beams of light from the left-side image projector toward the left side of the proximal surface of the front lens; a right-side image projector which is configured to be held by the eyewear frame to the right of the central virtual vector, within 4" of the person's eye, wherein this right-side image projector emits beams of light; and a right-side lens, mirror, prism, or waveguide which redirects beams of light from the right-side image projector toward the right side of the proximal surface of the front lens, and wherein redirected beams of light from the left-side image projector and the right-side image projector create virtual images in the person's field of view.

In an example, a front optical member can be a lens. In an example, a front optical member can be a convex lens. In an example, a front optical member can be a concave lens. In an example, a front optical member can be a prescription lens. In an example, a front optical member can be a Fresnel lens. In an example, a front optical member can further comprise a plurality of wave guides or micro-prisms. In an example, a front optical member can comprise a micro-lens array. In an example, a front optical member can be solid. In an example, a front optical member can be hollow or fluid-filled.

In an example, a front optical member can have an arcuate vertical cross-sectional perimeter. In an example, a front optical member can have a vertical cross-sectional perimeter with a shape selected from the group consisting of: circle, oval, ellipse, pear-shaped, conic-section, and rounded rectangle. In an example, a front optical member can have an aspherical shape. In an example, a front optical member can have a three-dimensional shape which is a section (or slice) of a sphere, ovaloid, or ellipsoid. In an example, a front optical member can have a conic-section shape. In an example, a front optical member can be planoconvex. In an example, a front optical member can be planoconcave.

In an example, a front optical member (such as a lens) can be radially symmetric with respect to a central virtual vector which extends outward and frontward, in a perpendicular manner, from the center of a person's eye pupil. In an example, a front optical member can be asymmetric with respect to the central virtual vector. In an example, the portion of the front optical member to the left of the central virtual vector can be larger than the portion of the front optical member to the right of the central virtual vector. In an example, the portion of the front optical member to the left of the central virtual vector can be more concave than the portion of the front optical member to the right of the central virtual vector. In an example, the portion of the front optical member to the left of the central virtual vector can be more convex than the portion of the front optical member to the right of the central virtual vector. In an example, the portion of the front optical member to the left of the central virtual vector can be more reflective than the portion of the front optical member to the right of the central virtual vector. In an example, the portion of the front optical member to the left of the central virtual vector can be thicker than the portion of the front optical member to the right of the central virtual vector.

In an example, the portion of the front optical member to the right of the central virtual vector can be larger than the portion of the front optical member to the left of the central virtual vector. In an example, the portion of the front optical member to the right of the central virtual vector can be more concave than the portion of the front optical member to the left of the central virtual vector. In an example, the portion of the front optical member to the right of the central virtual vector can be more convex than the portion of the front optical member to the left of the central virtual vector. In an example, the portion of the front optical member to the right of the central virtual vector can be more reflective than the portion of the front optical member to the left of the central virtual vector. In an example, the portion of the front optical member to the right of the central virtual vector can be thicker than the portion of the front optical member to the left of the central virtual vector.

In an example, the portion of the front optical member above the central virtual vector can be larger than the portion of the front optical member below the central virtual vector. In an example, the portion of the front optical member above the central virtual vector can be more concave than the portion of the front optical member below the central virtual vector. In an example, the portion of the front optical member above the central virtual vector can be more convex than the portion of the front optical member below the central virtual vector. In an example, the portion of the front optical member above the central virtual vector can be more reflective than the portion of the front optical member below the central virtual vector. In an example, the portion of the front optical member above the central virtual vector can be thicker than the portion of the front optical member below the central virtual vector.

In an example, the portion of the front optical member below the central virtual vector can be larger than the portion of the front optical member above the central virtual vector. In an example, the portion of the front optical member below the central virtual vector can be more concave than the portion of the front optical member above the central virtual vector. In an example, the portion of the front optical member below the central virtual vector can be more convex than the portion of the front optical member above the central virtual vector. In an example, the portion of the front optical member below the central virtual vector can be more reflective than the portion of the front optical member above the central virtual vector. In an example, the portion of the front optical member below the central virtual vector can be thicker than the portion of the front optical member above the central virtual vector.

In an example, a front optical member can be made with polycarbonate material. In an example, a front optical member can be made from one or more materials selected from the group consisting of: polycarbonate, glass, photopolymer, photorefractive, crystal, polyacrylate, acrylic, polyvinyl alcohol, indium tin oxide, silver, polypyrrole, acetate, neoprene, polypropylene oxide, carbon, polymethyl methacrylate, polyvinylidene difluoride, carbon nanotubes, parylene, polyimide, silicon, polyethylene naphtalate, silicone, dichromated gelatin, silicon nitride, ethylene tetrafluoroethylene, silicon oxide, polyethylene terephthalate, gallium nitride, tantalum oxide, polyethylene oxide, polytetrafluoroethylene, polyurethane, polyvinylpyrrolidone, polyaniline, graphene, polytetramethylene oxide, silver alloy, polyamide, and silver halide emulsion.

In an example, a front optical member can have multiple layers or coatings comprised of different materials. In an example, different materials used for multiple layers or coatings can be selected from the group consisting of: polycarbonate, glass, photopolymer, photorefractive, crystal, polyacrylate, acrylic, polyvinyl alcohol, indium tin oxide, silver, polypyrrole, acetate, neoprene, polypropylene oxide, carbon, polymethyl methacrylate, polyvinylidene difluoride, carbon nanotubes, parylene, polyimide, silicon, polyethylene naphtalate, silicone, dichromated gelatin, silicon nitride, ethylene tetrafluoroethylene, silicon oxide, polyethylene terephthalate, gallium nitride, tantalum oxide, polyethylene oxide, polytetrafluoroethylene, polyurethane, polyvinylpyrrolidone, polyaniline, graphene, polytetramethylene oxide, silver alloy, polyamide, and silver halide emulsion.

In an example, a front optical member can have a fixed width and curvature. In an example, the width or curvature of a front optical member can be moved and/or adjusted. In an example, the width or curvature of a front optical member can be moved and/or adjusted by changes in an electromagnetic field. In an example, the configuration of a micro-lens array can be changed by changes in an electromagnetic field. In an example, a front optical member can have a plurality of transparent electroconductive pathways.

In an example, a front optical member can receive light rays from the environment (in front of a person's eye) and transmit these light rays to the person's eye. In an example, a front optical member can selectively filter or transmit light rays in a selected wavelength range to the person's eye. In an example, a front optical member can be a semi-reflective lens. In an example, a front optical member can be semi-transparent. In an example, a front optical member can be a (partial) one-way mirror. In an example, a front optical member can have a reflective coating on its distal surface. In an example, a front optical member can have a reflective coating on its proximal surface. In an example, a front optical member can be semi-transparent. In an example, the proximal surface of a front optical member can partially reflect beams of light from one or more image projectors towards the person's eye. In an example, a front optical member can reflect light rays in a selected wavelength range towards the person's eye.

In an example, the centroid of a front optical member can be held by an eyewear frame between $1/4"$ and $2"$ from a person's eye. In an example, the centroid of a front optical member can be between $1/2"$ and $4"$ from a person's eye. In an example, the maximum vertical-cross-sectional diameter of a front optical member can be between $1"$ and $3"$. In an example, the maximum vertical-cross-sectional diameter of a front optical member can be between $2"$ and $6"$. In an example, the maximum width of a front optical member can be between $1/32"$ and $1/4"$. In an example, the maximum width of a front optical member can be between $1/8"$ and $1"$. In an example, there can be a separate front optical member in front of each eye in augmented reality eyewear. In an example, a single front optical member can span both eyes in augmented reality eyewear.

In an example, clockface (or compass) coordinates around a central virtual vector (defined previously) can be defined for a front optical member. These coordinates can be used to more precisely define the locations of other components of the eyewear. When a front optical member is viewed from the perspective of a person's eye when the person is standing upright, the 12-o'clock (or 0-degree) location is above the central virtual vector (extending forward in a perpendicular manner out from the person's eye). The 3-o'clock (or 90-degree) location is to the right of the central virtual vector. The 6-o'clock (or 180-degree) location is below the central virtual vector. The 9-o'clock (or 270-degree) location is to the left of the central virtual vector. Intermediate clockface (or compass) locations can be filled in between these four locations in a conventional clockface (or compass) manner.

In an example, a (left-side and/or right-side) light-emitting member can be an image projector. In an example, a light-emitting member can project collimated light. In an example, a light-emitting member can project coherent light. In an example, a light-emitting member can be a low-power laser or array of low-power lasers. In an example, a light-emitting member can project virtual objects (such as text or images) in a person's field of vision.

In an example, a virtual object projected by one or more light-emitting members can be perceptually linked in physical location and/or position relative to a real environmental object in a person's field of vision. In an example, a virtual object can appear to be connected to an environmental object. A virtual object can appear to a viewer as being consistently on top of, adjacent to, or beneath an environmental object. In an example, a virtual object can be super-imposed over (i.e. shown in front of and/or occluding) an environmental object or sub-imposed under (i.e. shown behind and/or occluded by) an environmental object in a person's field of vision. In an example, a virtual object can appear to be moving with an environmental object when the environmental object moves. In an example, both a virtual object and an environmental object can appear to move together, relative to a person's field of vision, when the person moves their head.

In an example, a single-eye portion of augmented reality eyewear can comprise two light-emitting members (e.g. image projectors). In an example, a left-side light-emitting member (e.g. left-side image projector) can be located in line with (an extension of) the 9 o'clock (or 270 degree) location of a front optical member and a right-side light-emitting member (e.g. right-side image projector) can be located in line with (an extension of) the 3 o'clock (90 degree) location of the front optical member. In an example, a left-side light-emitting member (e.g. left-side image projector) can be located in line with vectors between the 8 o'clock and 10 o'clock positions. In an example, a right-side light-emitting member (e.g. right-side image projector) can be located in line with vectors between the 2 o'clock and 4 o'clock positions.

In an example, a single-eye portion of augmented reality eyewear can comprise two light-emitting members (e.g. image projectors). In an example, a upper light-emitting member (e.g. upper image projector) can be located in line with (an extension of) the 12 o'clock (or 0 degree) location of a front optical member and a lower light-emitting member (e.g. lower image projector) can be located in line with (an extension of) the 6 o'clock (180 degree) location of the front optical member. In an example, an upper light-emitting member (e.g. upper image projector) can be located in line with vectors between the 11 o'clock and 1 o'clock positions. In an example, a lower light-emitting member (e.g. lower image projector) can be located in line with vectors between the 5 o'clock and 7 o'clock positions.

In an example, a single-eye portion of augmented reality eyewear can comprise two light-emitting members (e.g. image projectors). In another example, a first light-emitting member (e.g. first image projector) can be located in line with (an extension of) the 12 o'clock (or 0 degree) location of a front optical member and a second light-emitting member (e.g. lower image projector) can be located in line with (an extension of) the 3 o'clock (90 degree) location of the front optical member. In an example, a second light-emitting member (e.g. upper image projector) can be located in line with vectors between the 11 o'clock and 1 o'clock positions. In an example, a second light-emitting member (e.g. lower image projector) can be located in line with vectors between the 2 o'clock and 4 o'clock positions.

In an example, a (left-side or right-side) light-emitting member can project beams of light generally (at least partially) toward a central virtual vector which extends in a perpendicular manner outward from the center of a person's eye pupil. In an example, a left-side light-emitting member can project beams of light in a generally rightward direction. In an example, a right-side light-emitting member can project beams of light in a generally leftward direction. In an example, a left-side light-emitting member (such as an image projector) can project beams of light toward a left-side optical member (such as a lens, mirror, prism, or waveguide) which redirects those beams of light toward the left side of the proximal surface of a front optical member (such as a lens). Correspondingly, a right-side light-emitting member (such as an image projector) can project beams of light toward a right-side optical member (such as a lens, mirror, prism, or waveguide) which redirects those beams of light toward the right side of the proximal surface of a front optical member (such as a lens).

In an example, beams of light from left-side and right-side light emitters (e.g. image projectors) may not intersect or overlap before they reach the proximal surface of the front optical member (e.g. lens). In an example, beams of light from left-side and right-side light emitters (e.g. image projectors) may not intersect or overlap before they reach the person's eye. In an example, virtual images created by left-side and right-side light emitters may not intersect or overlap in a person's field of vision.

In an example, beams of light from left-side and right-side light emitters (e.g. image projectors) can intersect or overlap before they reach the proximal surface of the front optical member (e.g. lens). In an example, beams of light from left-side and right-side light emitters (e.g. image projectors) can intersect or overlap between a right-side or left-side optical member and a person's eye. In an example, virtual images created by left-side and right-side light emitters can intersect or overlap in a person's field of vision. In an example, the intersection or overlapping of left-side and right-side images can create the illusion of virtual objects being at different distances. In an example, the intersection or overlapping of left-side and right-side images can create virtual objects with different levels of brightness, clarity, or resolution. In an example, coherent beams of light from left-side and right-side light emitters can intersect or overlap to create interference patterns which, in turn, create three-dimensional holographic images in a person's field of vision.

In an example, a light-emitting member (e.g. image projector) can be integrated into (or part of) an eyewear frame. In an example, a right-side light-emitting member of a portion of augmented reality eyewear which spans a person's right eye can be part of the right-side earpiece (or "temple") of the eyewear frame. In an example, a left-side light-emitting member (or image projector) of a portion of augmented reality eyewear which spans a person's left eye can be part of the left-side earpiece (or "temple") of the eyewear frame. In an example, a left-side light-emitting member of a portion of augmented reality eyewear which spans a person's right eye can be part of the (nose) bridge of the eyewear frame. In an example, a right-side light-emitting member of a portion of augmented reality eyewear which spans a person's left eye can be part of the (nose) bridge of the eyewear frame.

In an example, left-side and right-side image projectors can project light beams simultaneously. In an example, left-side and right-side image projectors can project light beams at different times. In an example, left-side and right-side image projectors can project light beams sequentially. In an example, a left-side image projector can project light at a first time and a right-side image projector can project light at a second time. In an example, left-side and right-side image projectors can project light beams with the same spectral frequency or distribution. In an example, left-side and right-side image projectors can project light beams with different spectral frequencies or distributions. In an example, a left-side image projector can project light with a first spectral frequency or distribution and a right-side image projector can project light with a second spectral frequency or distribution. In an example, left-side and right-side image projectors can project light beams with the same intensity or brightness. In an example, left-side and right-side image projectors can project light beams with different intensity or brightness levels. In an example, a left-side image projector can project light with a first intensity or brightness and a right-side image projector can project light with a second intensity or brightness.

In an example, a light-emitting member (such as an image projector) can emit low-power coherent light. In an example, a light emitter can be a low-power laser. In an example, a light-emitting member (e.g. image projector) can be selected from the group consisting of: light emitting diode (LED); liquid crystal display (LCD); liquid crystal on silicon (LCOS); and spatial light modulator (SLM). In an example, an annular image projector can further comprise a Digital Micromirror Device (DMD). In an example, a light-emitting member (e.g. image projector) can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; micro-display and/or microprojector; micro-display array or matrix; optoelectronic display; organic light emitting diode (OLED) array or matrix; passive matrix light-emitting diode array or matrix; photoelectric display; and transmission holographic optical element array or matrix.

In an example, a left-side or right-side optical member can be a lens which redirects beams of light from a light-emitting member (e.g. image projector). In an example, a left-side or right-side optical member can be an arcuate lens. In an example, a left-side or right-side optical member can be a mirror which redirects beams of light from a light-emitting member (e.g. image projector). In an example, a left-side or right-side optical member can be an arcuate or flat mirror. In an example, a left-side or right-side optical member can be an array of mirrors. In an example, a left-side or right-side optical member can be a Digital Micromirror Device (DMD). In an example, a left-side or right-side optical member can be a prism which guides beams of light from a light-emitting member (e.g. image projector). In an example, a left-side or right-side optical member can be an arcuate or polygonal prism. In an example, a left-side or right-side optical member can be a waveguide which guides beams of light from a light-emitting member (e.g. image projector). In an example, a left-side or right-side optical member can be an arcuate or polygonal waveguide.

In an example, a left-side optical member can be located in line with (an extension of) the 9 o'clock (or 270 degree) location of the front optical member and a right-side optical member can be located in line with (an extension of) the 3 o'clock (90 degree) location of the front optical member. In an example, a left-side optical member can be located in line with vectors between the 8 o'clock and 10 o'clock positions. In an example, a right-side optical member can be located in line with vectors between the 2 o'clock and 4 o'clock positions.

In another example, an upper optical member can be located in line with (an extension of) the 12 o'clock (or 0 degree) location of the front optical member and a lower optical member can be located in line with (an extension of) the 6 o'clock (180 degree) location of the front optical member. In an example, an upper optical member can be located in line with vectors between the 11 o'clock and 1 o'clock positions. In an example, a lower optical member can be located in line with vectors between the 5 o'clock and 7 o'clock positions.

In an example, a right-side optical member can redirect beams of light from a right-side light emitter (e.g. image projector) so that these beams hit between 5% and 30% of the proximal surface area of the right side of the front arcuate optical member. In an example, a right-side optical member can redirect beams of light from a right-side light emitter so that these beams hit between 25% and 50% of the proximal surface area of the right side of the front arcuate optical member. In an example, a right-side optical member can redirect beams of light from a right-side light emitter so that these beams hit between 40% and 80% of the proximal surface area of the right side of the front arcuate optical member. In an example, a right-side optical member can redirect beams of light from a right-side light emitter so that these beams span the entire proximal surface area of the right side of the front arcuate optical member.

In an example, a left-side optical member can redirect beams of light from a left-side light emitter (e.g. image projector) so that these beams hit between 5% and 30% of the proximal surface area of the left side of the front arcuate optical member. In an example, a left-side optical member can redirect beams of light from a left-side light emitter so that these beams hit between 25% and 50% of the proximal surface area of the left side of the front arcuate optical member. In an example, a left-side optical member can redirect beams of light from a left-side light emitter so that these beams hit between 40% and 80% of the proximal surface area of the left side of the front arcuate optical member. In an example, a left-side optical member can redirect beams of light from a left-side light emitter so that these beams span the entire proximal surface area of the left side of the front arcuate optical member.

In an example, a right-side optical member can redirect beams of light from a right-side light emitter (e.g. image projector) so that these beams hit between 5% and 30% of the proximal surface area of the right half of the front arcuate optical member. In an example, a right-side optical member can redirect beams of light from a right-side light emitter so that these beams hit between 25% and 50% of the proximal surface area of the right half of the front arcuate optical member. In an example, a right-side optical member can redirect beams of light from a right-side light emitter so that these beams hit between 40% and 80% of the proximal surface area of the right half of the front arcuate optical member. In an example, a right-side optical member can redirect beams of light from a right-side light emitter so that these beams span the entire proximal surface area of the right half of the front arcuate optical member.

In an example, a left-side optical member can redirect beams of light from a left-side light emitter (e.g. image projector) so that these beams hit between 5% and 30% of the proximal surface area of the left half of the front arcuate optical member. In an example, a left-side optical member can redirect beams of light from a left-side light emitter so that these beams hit between 25% and 50% of the proximal surface area of the left half of the front arcuate optical member. In an example, a left-side optical member can redirect beams of light from a left-side light emitter so that these beams hit between 40% and 80% of the proximal surface area of the left half of the front arcuate optical member. In an example, a left-side optical member can redirect beams of light from a left-side light emitter so that these beams span the entire proximal surface area of the left half of the front arcuate optical member.

In an example, beams of light from the left-side and right-side light emitters (or image projectors) may not intersect before they reach the proximal surface of the front arcuate optimal member. In an example, virtual images created by left-side and right-side projector may not overlap in a person's field of vision. In an example, beams of light from the left-side and right-side light emitters (or image projectors) can intersect before they reach the proximal surface of the front arcuate optimal member. In an example, virtual images created by left-side and right-side image projectors can overlap in a person's field of vision. In an example, the intersection or overlapping of left-side and right-side images can be used to create the illusion of virtual objects being at different distances from the person's eye. In an example, the intersection or overlapping of left-side and right-side images can be used to create virtual objects with different levels of brightness, clarity, or resolution. In an example, coherent beams of light from left-side and right-side light emitters can intersect to create interference patterns which display three-dimensional holographic images in a person's field of vision.

In an example, a left-side or right-side optical member can be located at a distance from a left-side or right-side light emitting member (e.g. image projector), respectively, within a range of ⅟₃₂" to ¼". In an example, a left-side or right-side optical member can be located at a distance from a left-side or right-side light emitting member (e.g. image projector), respectively, within a range of ⅛" to ½". In an example, a left-side or right-side optical member can be located at a distance from a left-side or right-side light emitting member (e.g. image projector), respectively, within a range of ¼" to 2". In an example, a left-side or right-side optical member can be located between ⅛" and ½" from the centroid of the front optical member. In an example, a left-side or right-side optical member can be located between ¼" and 2" from the centroid of the front optical member. In an example, a left-side or right-side optical member can be located between ½" and 4" from the centroid of the front optical member.

In an example, a first virtual plane can be the virtual flat plane which best fits the surface of a right-side optical member which faces toward the right-side light-emitting member and a second virtual plane can be the virtual flat plane which best fits the surface of the right-side light-emitting member which faces toward the right-side optical member. In an example, (virtual extensions of) these first and second virtual planes can intersect each other at an acute angle. In an example, this angle can be between 1 and 20 degrees. In an example, this angle can be between 10 and 45 degrees. In an example, beams of light from the right-side light-emitting member can intersect the first virtual plane at an angle between 5 and 45 degrees.

In an example, a first virtual plane can be the virtual flat plane which best fits the surface of a left-side optical member which faces toward the left-side light-emitting member and a second virtual plane can be the virtual flat plane which best fits the surface of the left-side light-emitting member which faces toward the left-side optical member. In an example, (virtual extensions of) these first and second virtual planes can intersect each other at an acute angle. In an example, this angle can be between 1 and 20 degrees. In an example, this angle can be between 10 and 45 degrees. In an example, beams of light from the left-side light-emitting member can intersect the first virtual plane at an angle between 5 and 45 degrees.

In an example, a left-side or right-side optical member can be stationary relative to a light-emitting member and/or a front optical member. In an example, a left-side or right-side optical member can be selectively moved relative to a light-emitting member and/or front optical member in order to selectively adjust the redirection of beams of light from the light-emitting member onto the front optical member. In an example, a left-side or right-side optical member can be moved continuously (and repeatedly) in order to scan beams of light from a light-emitting member back and forth over the proximal surface of a front optical member. In an example, a left-side or right-side optical member can be rotated continuously and repeatedly in order to scan beams of light from a light-emitting member back and forth over the proximal surface of a front optical member. Relevant variations and components discussed elsewhere in this disclosure or in priority-linked disclosures can also be applied to this example.

Figure 10:
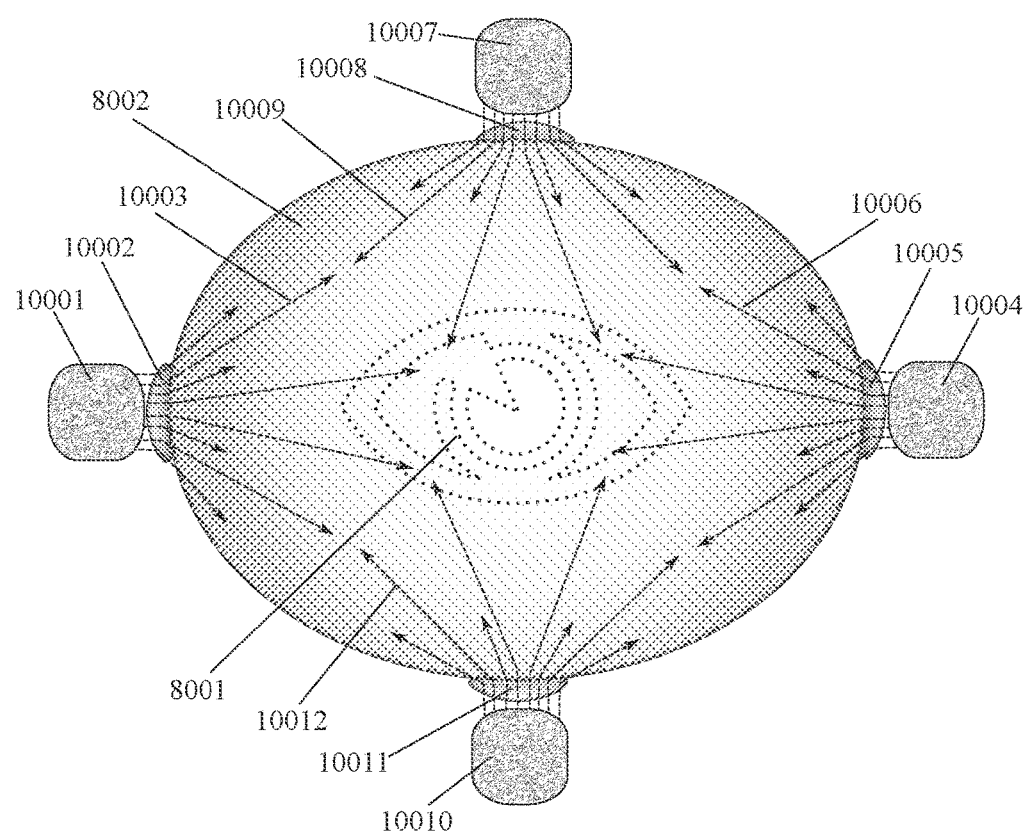
FIG. 10 shows a side view of a single-eye portion with four lateral light emitters.

FIG. 10 shows a front side view of another example of a single-eye portion of augmented reality eyewear. In an example, augmented reality eyewear can comprise two such single-eye portions, one for each eye, to display augmented reality in both eyes. In an example, augmented reality eyewear can have such a portion for only eye, to display augmented reality in only one eye. The example shown in FIG. 10 is similar to the example which was shown in FIGS. 8 and 9 except that there are now four light-emitting members and four side optical members which are distributed around the front optical member at the 12 o'clock, 3 o'clock, 6 o'clock, and 9 o'clock positions.

The example of a single-eye portion of augmented reality eyewear shown in FIG. 10 comprises: a front optical member 8002 (such as a lens) which is configured be held by an eyewear frame in front of one of the person's eyes 8001, within 4" of the eye, wherein the front optical member has a proximal surface which is configured to face the person's eye and a distal surface which is configured to face away from the person's eye; a left-side light-emitting member 10001 (such as an image projector) which is configured to be held by an eyewear frame to the left of the central virtual vector, within 4" of the person's eye, wherein this left-side light-emitting member emits beams of light 10003; a left-side optical member 10002 (such as a lens, mirror, prism, or waveguide) which redirects beams of light from the left-side light-emitting member toward the left-side portion of the proximal surface of the front optical member; a right-side light-emitting member 10004 (such as an image projector) which is configured to be held by an eyewear frame to the right of the central virtual vector, within 4" of the person's eye, wherein this right-side light-emitting member emits beams of light 10006; a right-side optical member 10005 (such as a lens, mirror, prism, or waveguide) which redirects beams of light from the right-side light-emitting member toward a right-side portion of the proximal surface of the front optical member; a top-side light-emitting member 10007 (such as an image projector) which is configured to be held by an eyewear frame above the central virtual vector, within 4" of the person's eye, wherein this top-side light-emitting member emits beams of light 10009; a top-side optical member 10008 (such as a lens, mirror, prism, or waveguide) which redirects beams of light from the top-side light-emitting member toward an upper portion of the proximal surface of the front optical member; a bottom-side light-emitting member 10010 (such as an image projector) which is configured to be held by an eyewear frame above the central virtual vector, within 4" of the person's eye, wherein this bottom-side light-emitting member emits beams of light 10012; a bottom-side optical member 10011 (such as a lens, mirror, prism, or waveguide) which redirects beams of light from the bottom-side light-emitting member toward an lower portion of the proximal surface of the front optical member, and wherein redirected beams of light from the light-emitting members create virtual images in the person's field of view. Relevant variations and components discussed elsewhere in this disclosure or in priority-linked disclosures can also be applied to this example.

In an example, augmented reality eyewear can comprise: an eyewear frame which is configured to be worn on a person's head, wherein this eyewear frame spans from one of the person's ears, across the person's face, to the person's other ear; a front lens which is configured be held by the eyewear frame in front of one of the person's eyes, within 4" of the eye, wherein the front lens has a proximal surface which is configured to face the person's eye and a distal surface which is configured to face away from the person's eye; a left-side image projector which is configured to be held by an eyewear frame to the left of the central virtual vector, within 4" of the person's eye, wherein this left-side image projector emits beams of light; a left-side lens, mirror, prism, or waveguide (such as a lens, mirror, prism, or waveguide) which redirects beams of light from the left-side image projector toward the left-side quartile (segment) of the proximal surface of the front lens; a right-side image projector which is configured to be held by an eyewear frame to the right of the central virtual vector, within 4" of the person's eye, wherein this right-side image projector emits beams of light; a right-side lens, mirror, prism, or waveguide which redirects beams of light from the right-side image projector toward a right-side quartile (segment) of the proximal surface of the front lens; a top-side image projector which is configured to be held by an eyewear frame above the central virtual vector, within 4" of the person's eye, wherein this top-side image projector emits beams of light; a top-side lens, mirror, prism, or waveguide which redirects beams of light from the top-side image projector toward an upper quartile (segment) of the proximal surface of the front lens; a bottom-side image projector which is configured to be held by an eyewear frame above the central virtual vector, within 4" of the person's eye, wherein this bottom-side image projector emits beams of light; a bottom-side lens, mirror, prism, or waveguide which redirects beams of light from the bottom-side image projector toward an lower quartile (segment) of the proximal surface of the front lens, and wherein redirected beams of light from the image projectors create virtual images in the person's field of view.

In an example, four light-emitting members and four side optical members can be distributed around the front optical member at the 12 o'clock, 3 o'clock, 6 o'clock, and 9 o'clock position. In an example, a top-side light-emitting member (e.g. image projector) and/or a top-side optical member can be located in line with (an extension of) the 12 o'clock (or 0 degree) position. In an example, a right-side light-emitting member (e.g. image projector) and/or a right-side optical member can be located in line with (an extension of) the 3 o'clock (or 90 degree) position. In an example, a bottom-side light-emitting member (e.g. image projector) and/or a bottom-side optical member can be located in line with (an extension of) the 6 o'clock (or 180 degree) position. In an example, a left-side light-emitting member (e.g. image projector) and/or a left-side optical member can be located in line with (an extension of) the 9 o'clock (or 270 degree) position.

In an example, a top-side light-emitting member (e.g. image projector) and/or a top-side optical member can be located in line with vectors between the 11 o'clock and 1 o'clock positions. In an example, a right-side light-emitting member (e.g. image projector) and/or a right-side optical member can be located in line with vectors between the 2 o'clock and 4 o'clock positions. In an example, a bottom-side light-emitting member (e.g. image projector) and/or a bottom-side optical member can be located in line with vectors between the 5 o'clock and 7 o'clock positions. In an example, a left-side light-emitting member (e.g. image projector) and/or a left-side optical member can be located in line with vectors between the 8 o'clock and 10 o'clock positions.

In another example, four light-emitting members and four side optical members can be distributed around the front optical member at the 1 o'clock, 5 o'clock, 7 o'clock, and 11 o'clock positions. A first light-emitting member (e.g. image projector) and/or a first optical member can be located in line with (an extension of) the 1 o'clock position. A second light-emitting member (e.g. image projector) and/or a second optical member can be located in line with (an extension of) the 5 o'clock position. A third light-emitting member (e.g. image projector) and/or a third optical member can be located in line with (an extension of) the 7 o'clock position. A fourth light-emitting member (e.g. image projector) and/or a fourth optical member can be located in line with (an extension of) the 11 o'clock position.

In an example, a first light-emitting member (e.g. image projector) and/or a first optical member can be located in line with vectors between the 12 o'clock and 2 o'clock positions. In an example, a second light-emitting member (e.g. image projector) and/or a second optical member can be located in line with vectors between the 4 o'clock and 6 o'clock positions. In an example, a third light-emitting member (e.g. image projector) and/or a third optical member can be located in line with vectors between the 6 o'clock and 8 o'clock positions. In an example, a fourth light-emitting member (e.g. image projector) and/or a fourth optical member can be located in line with vectors between the 10 o'clock and 12 o'clock positions.

In this example, there are four light-emitting members (e.g. image projectors) distributed around a front optical member (e.g. front lens). In another example, there can be six or eight light-emitting members (e.g. image projectors) distributed (evenly) around the front optical member (e.g. front lens). In another example, there can be ten or more light-emitting members (e.g. image projectors) distributed (evenly) around the front optical member (e.g. front lens). In an example, a plurality of light-emitting members (e.g. image projectors) can be evenly distributed (e.g. equally-spaced) around the perimeter of a front optical member (e.g. front lens). In an example, a single-eye portion of augmented reality eyewear can comprise an annular array of light-emitting members (e.g. image projectors). In an example, augmented reality eyewear can comprise Volumetric Annular Photon Emission (VAPE) technology. In an example, augmented reality eyewear can comprise augmented reality with VAPE or wear technology.

In an example, different image projectors can project light beams simultaneously. In an example, different image projectors can project light beams at different times. In an example, different image projectors can be activated sequentially. In an example, a plurality of image projectors can be activated sequentially, in a clockwise (or counter-clockwise) manner. In an example, a first image projector can project light at a first time and a second image projector can project light at a second time. In an example, different image projectors can project light beams with the same spectral frequency or distribution. In an example, different image projectors can project light beams with different spectral frequencies or distributions. In an example, a first image projector can project light with a first spectral frequency or distribution and a second image projector can project light with a second spectral frequency or distribution. In an example, different image projectors can project light beams with the same intensity or brightness. In an example, different image projectors can project light beams with different intensity or brightness levels. In an example, a first image projector can project light with a first intensity or brightness and a second image projector can project light with a second intensity or brightness.

In an example, a plurality of light-emitting members (e.g. image projectors) can be evenly distributed around clock coordinates (and/or compass coordinates) around a front optical member. In an example, a plurality of light-emitting members (e.g. image projectors) can be unevenly distributed (e.g. equally-spaced) around the perimeter of a front optical member (e.g. front lens). In an example, a plurality of light-emitting members (e.g. image projectors) can be unevenly distributed around clock coordinates (and/or compass coordinates) around a front optical member. In an example, light-emitting members can be disproportionately clustered along the upper portion of the perimeter of a front optical member, compared to other portions of this perimeter. In an example, light-emitting members can be disproportionately clustered on the left side or the right side of the perimeter of a front optical member, compared to other portions of this perimeter.

In an example, the proximal surface of a front optical member (e.g. a front lens) can be virtually divided into pie-shaped segments, wherein each pie-shaped segment has a central vertex where the front optical member intersects the central virtual vector (defined previously) and a peripheral arcuate side defined by a segment of the perimeter of the front optical member. In an example, there can be four virtual pie-shaped segments and four light-emitting members (e.g. image projectors), wherein beams of light from each light-emitting member are directed toward a different virtual pie-shaped segment. In an example, there can be as many virtual pie-shaped segments as there are light-emitting members (e.g. image projectors), wherein beams of light from a specific light-emitting member are directed toward a specific virtual pie-shaped segment.

In an example, beams of light from a selected light-emitting member (e.g. image projector) can be projected onto a selected projection area of the proximal surface of a front optical member, wherein this projection area has a shape selected from the group consisting of: pie-shaped segment; rectangle or rounded rectangle; square or rounded square; and circle, oval, or ellipse. In an example, projection areas of different light-emitting members (e.g. image projectors) may not overlap. In an example, projection areas of different light-emitting members (e.g. image projectors) can overlap. In an example, projection areas of different light-emitting members (e.g. image projectors) can overlap in a central portion of a front optical member (e.g. lens) but not in peripheral portions of the front optical member. In an example, having overlapping projection areas in a central portion of a front optical member (e.g. lens) can enable greater image brightness, clarity, and/or resolution in the center of a person's field of vision.

In an example, beams of light from a plurality of light-emitting members (e.g. image projectors) around a front optical member (e.g. front lens) may not intersect or overlap in a person's field of vision. In an example, beams of light from a plurality of light-emitting members (e.g. image projectors) around a front optical member can intersect or overlap in a person's field of vision. In an example, the intersection or overlapping of beams of light from different light-emitting members (e.g. image projectors) can create the illusion of virtual objects at different distances, with different levels of brightness, and/or with different image resolution. In an example, the intersection or overlapping of beams of coherent light from different light-emitting members (e.g. image projectors) can create interference pattern which, in turn, creates three-dimensional holographic images in a person's field of vision.

In an example, a plurality of light-emitting members (e.g. image projectors) distributed around a front optical member (e.g. front lens) can project beams of light with different spectral frequencies and/or wavelengths. In an example, a plurality of light-emitting members (e.g. image projectors) distributed around a front optical member (e.g. front lens) can display images simultaneously. In an example, a plurality of light-emitting members (e.g. image projectors) distributed around a front optical member (e.g. front lens) can display images at different times. In an example, a plurality of light-emitting members (e.g. image projectors) distributed around a front optical member (e.g. front lens) can display images sequentially. In an example, a plurality of light-emitting members (e.g. image projectors) distributed around a front optical member (e.g. front lens) can display images on different portions of a front optical member (e.g. front lens). In an example, a plurality of light-emitting members (e.g. image projectors) distributed around a front optical member (e.g. front lens) can display images on the same area of a front optical member (e.g. front lens).

In an example, one or more light-emitting members (e.g. image projectors) can be in a stationary configuration with respect to a front optical member. In an example, one or more light-emitting members (e.g. image projectors) can move with respect to a front optical member. In an example, one or more light-emitting members (e.g. image projectors) can tilt back and forth with respect to a front optical member, causing beams of light to scan back and forth over the proximal surface of the front optical member. In an example, one or more light-emitting members (e.g. image projectors) can rotate around a front optical member, causing beams of light to move over (e.g. around) the proximal surface of the front optical member. Relevant variations and components discussed elsewhere in this disclosure or in priority-linked disclosures can also be applied to this example.

Figure 11:
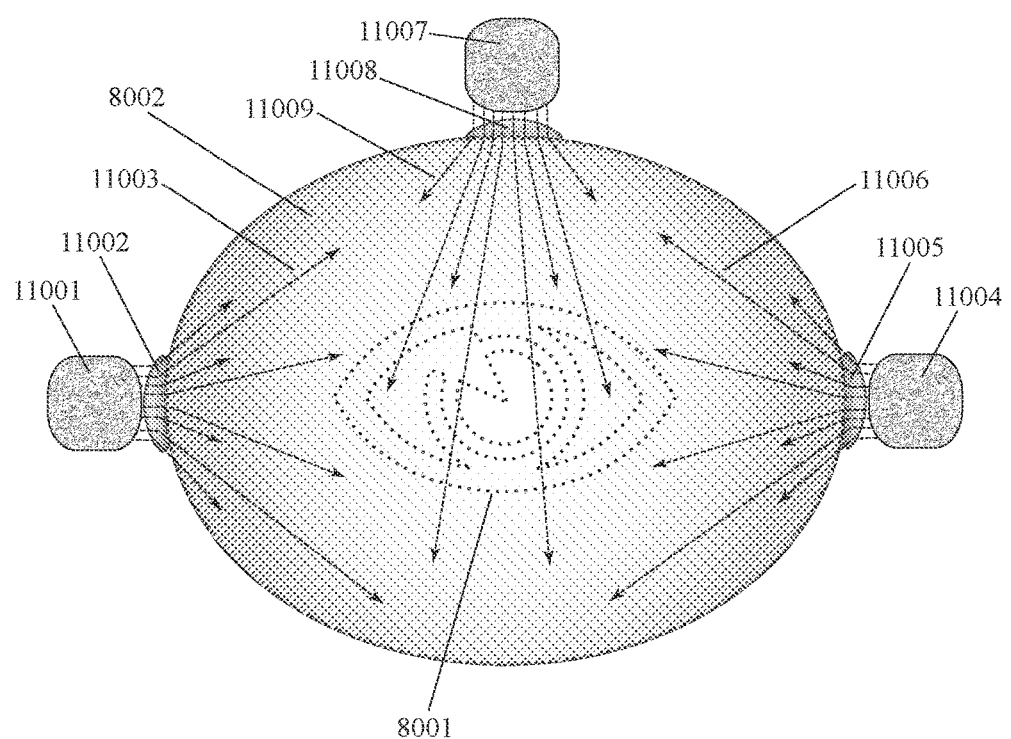
FIG. 11 shows a side view of a single-eye portion with three lateral light emitters.

FIG. 11 shows a front side view of another example of a single-eye portion of augmented reality eyewear. This example is like the one in FIGS. 8 and 9, except that there are three light-emitting members (e.g. image projectors), at 12 o'clock, 3 o'clock, and 9 o'clock positions, and one projector directs beams of light onto the central portion of the front optical member (e.g. front lens). Having just one image (from just one projector) in the central portion of the front optical member (e.g. front lens) can avoid fragmentation or boundary lines (between multiple images) cluttering the central portion of a person's field of vision.

The example of a single-eye portion of augmented reality eyewear shown in FIG. 11 comprises: a front optical member 8002 (such as a lens) which is configured be held by an eyewear frame in front of one of the person's eyes 8001, within 4" of the eye, wherein the front optical member has a proximal surface which is configured to face the person's eye and a distal surface which is configured to face away from the person's eye; a left-side light-emitting member 11001 (such as an image projector) which is configured to be held by an eyewear frame to the left of the central virtual vector, within 4" of the person's eye, wherein this left-side light-emitting member emits beams of light 11003; a left-side optical member 11002 (such as a lens, mirror, prism, or waveguide) which redirects beams of light from the left-side light-emitting member toward the left-side portion of the proximal surface of the front optical member; a right-side light-emitting member 11004 (such as an image projector) which is configured to be held by an eyewear frame to the right of the central virtual vector, within 4" of the person's eye, wherein this right-side light-emitting member emits beams of light 11006; a right-side optical member 11005 (such as a lens, mirror, prism, or waveguide) which redirects beams of light from the right-side light-emitting member toward a right-side portion of the proximal surface of the front optical member; a top-side light-emitting member 11007 (such as an image projector) which is configured to be held by an eyewear frame above the central virtual vector, within 4" of the person's eye, wherein this top-side light-emitting member emits beams of light 11009; a top-side optical member 11008 (such as a lens, mirror, prism, or waveguide) which redirects beams of light from the top-side light-emitting member toward the a central portion of the proximal surface of the front optical member, and wherein redirected beams of light from the light-emitting members create virtual images in the person's field of view. Relevant variations and components discussed elsewhere in this disclosure or in priority-linked disclosures can also be applied to this example.

In an example, augmented reality eyewear can comprise: an eyewear frame which is configured to be worn on a person's head, wherein this eyewear frame spans from one of the person's ears, across the person's face, to the person's other ear; a front lens which is configured be held by the eyewear frame in front of one of the person's eyes, within 4" of the eye, wherein the front lens has a proximal surface which is configured to face the person's eye and a distal surface which is configured to face away from the person's eye; a left-side image projector which is configured to be held by an eyewear frame to the left of the central virtual vector, within 4" of the person's eye, wherein this left-side image projector emits beams of light; a left-side lens, mirror, prism, or waveguide which redirects beams of light from the left-side image projector toward the left-side portion of the proximal surface of the front lens; a right-side image projector which is configured to be held by an eyewear frame to the right of the central virtual vector, within 4" of the person's eye, wherein this right-side image projector emits beams of light; a right-side lens, mirror, prism, or waveguide which redirects beams of light from the right-side image projector toward a right-side portion of the proximal surface of the front lens; a top-side image projector which is configured to be held by an eyewear frame above the central virtual vector, within 4" of the person's eye, wherein this top-side image projector emits beams of light; a top-side lens, mirror, prism, or waveguide which redirects beams of light from the top-side image projector toward the a central portion of the proximal surface of the front lens, and wherein redirected beams of light from the image projectors create virtual images in the person's field of view.

In an example, three light-emitting members and three side optical members can be distributed around the front optical member at the 12 o'clock, 3 o'clock, and 9 o'clock positions. In an example, beams of light from a selected light-emitting member (e.g. image projector) can be projected onto a selected projection area of the proximal surface of a front optical member, wherein this projection area has a shape selected from the group consisting of: pie-shaped segment; rectangle or rounded rectangle; square or rounded square; and circle, oval, or ellipse. Relevant variations and components discussed elsewhere in this disclosure or in priority-linked disclosures can also be applied to this example.

Figure 12:
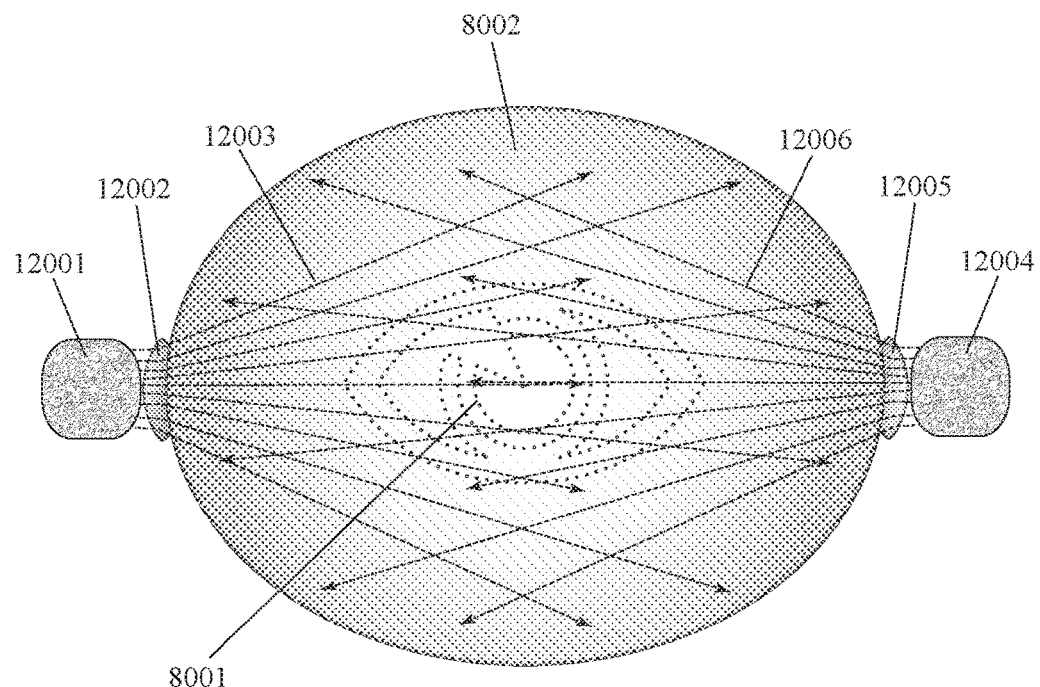
FIGS. 12 and 13 show two views of a single-eye portion with bilateral light emitters, wherein each projects light onto an opposite side.
Figure 13:
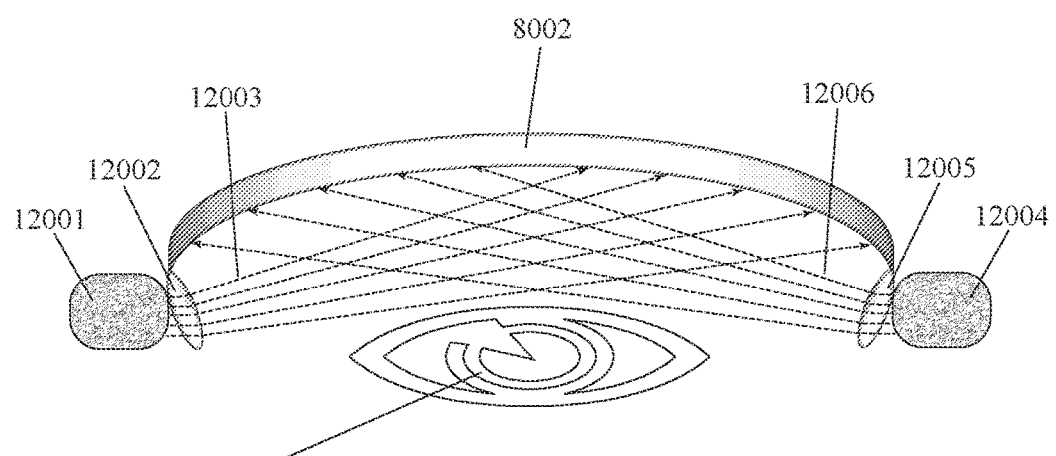

FIGS. 12 and 13 show two different perspectives of another example of a single-eye portion of augmented reality eyewear. FIG. 12 shows a front side view of this example. FIG. 13 shows a top-down cross-sectional view of this example. This example is like the one in FIGS. 8 and 9, except that left-side and right-side light-emitting members (e.g. image projectors) project images onto the opposite (e.g. left vs. right) sides, respectively, of the front optical member (e.g. front lens).

The example of a single-eye portion of augmented reality eyewear shown in FIGS. 12 and 13 comprises: a front optical member 8002 (such as a lens) which is configured be held by an eyewear frame in front of one of a person's eyes 8001, within 4" of the eye, wherein the front optical member has a proximal surface which is configured to face the person's eye and a distal surface which is configured to face away from the person's eye; a left-side light-emitting member 12001 (such as an image projector) which is configured to be held by an eyewear frame to the left of a central virtual vector, within 4" of the person's eye, wherein this left-side light-emitting member emits beams of light 12003; a left-side optical member 12002 (such as a lens, mirror, prism, or waveguide) which redirects beams of light from the left-side light-emitting member toward the right-side portion of the proximal surface of the front optical member; a right-side light-emitting member 12004 (such as an image projector) which is configured to be held by an eyewear frame to the right of the central virtual vector, within 4" of the person's eye, wherein this right-side light-emitting member emits beams of light 12006; a right-side optical member 12005 (such as a lens, mirror, prism, or waveguide) which redirects beams of light from the right-side light-emitting member toward a left-side portion of the proximal surface of the front optical member, and wherein redirected beams of light from the light-emitting members create virtual images in the person's field of view. Relevant variations and components discussed elsewhere in this disclosure or in priority-linked disclosures can also be applied to this example.

In an example, augmented reality eyewear can comprise: an eyewear frame which is configured to be worn on a person's head, wherein this eyewear frame spans from one of the person's ears, across the person's face, to the person's other ear; a front lens which is configured be held by the eyewear frame in front of one of the person's eyes, within 4" of the eye, wherein the front lens has a proximal surface which is configured to face the person's eye and a distal surface which is configured to face away from the person's eye; a left-side image projector which is configured to be held by an eyewear frame to the left of a central virtual vector, within 4" of the person's eye, wherein this left-side image projector emits beams of light; a left-side lens, mirror, prism, or waveguide which redirects beams of light from the left-side image projector toward the right-side portion of the proximal surface of the front lens; a right-side image projector which is configured to be held by an eyewear frame to the right of the central virtual vector, within 4" of the person's eye, wherein this right-side image projector emits beams of light; a right-side lens, mirror, prism, or waveguide which redirects beams of light from the right-side image projector toward a left-side portion of the proximal surface of the front lens, and wherein redirected beams of light from the image projectors create virtual images in the person's field of view.

In an example, two light-emitting members and two side optical members can be located at the 3 o'clock and 9 o'clock positions. In an example, beams of light from a selected light-emitting member (e.g. image projector) can be projected onto a selected projection area of the proximal surface of a front optical member, wherein this projection area has a shape selected from the group consisting of: pie-shaped segment; rectangle or rounded rectangle; square or rounded square; and circle, oval, or ellipse. Relevant variations and components discussed elsewhere in this disclosure or in priority-linked disclosures can also be applied to this example.

Figure 14:
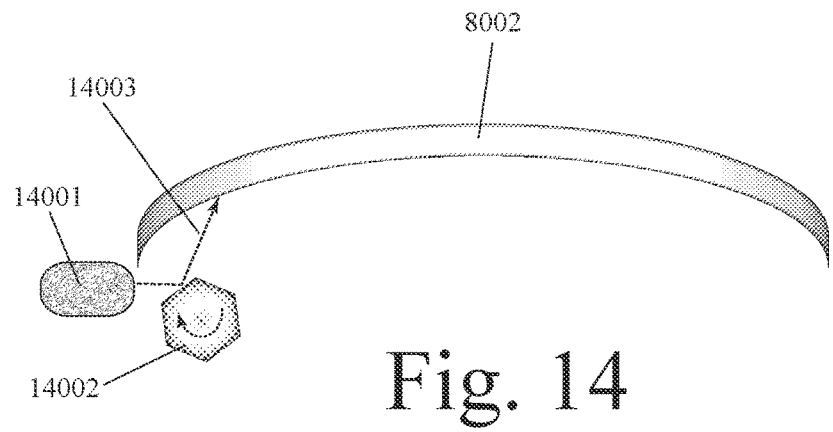
FIGS. 14 through 16 show sequential cross-sectional views of a single-eye portion with a rotating side optical member.
Figure 15:
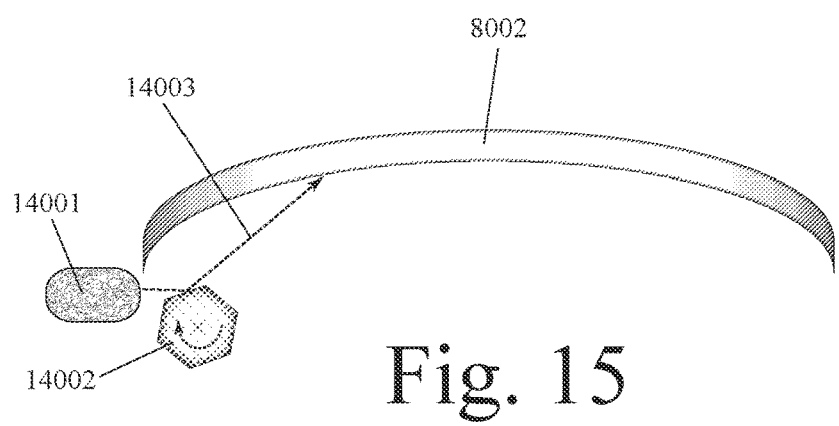
Figure 16:
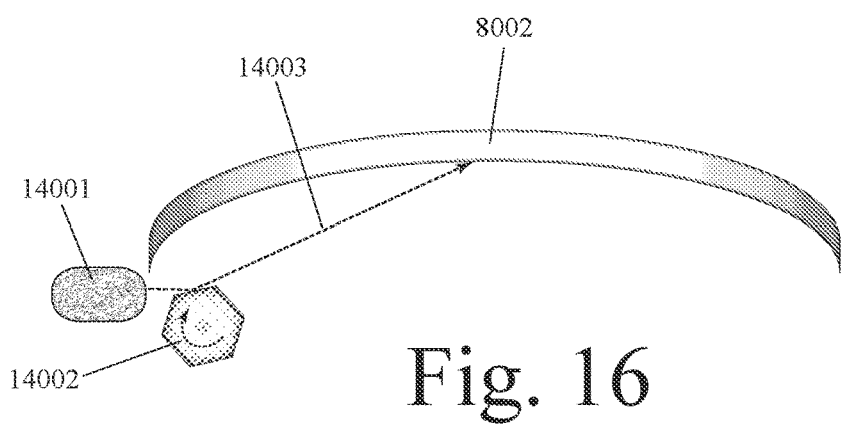

FIGS. 14 through 16 show three top-down cross-sectional views, at three different times, of an example of a single-eye portion of augmented reality eyewear in which a side optical member (e.g. side lens, mirror, prism, or waveguide) moves. In this example, rotation of the side optical member (e.g. side lens, mirror, prism, or waveguide) changes the redirection vectors of beams of light from a light-emitting member (e.g. image projector), causing these beams to move (back and forth) across the proximal surface of a front optical member (e.g. front lens). FIGS. 14 through 16 show this example at three different times, wherein movement of the side lens, mirror, prism, or waveguide changes the redirection of a light beam from an image projector, sequentially redirecting the light beam toward different locations on the proximal surface of a front lens.

The example of a single-eye portion of augmented reality eyewear shown in FIGS. 14 through 16 comprises: a front optical member 8002 (such as a front lens) which is configured be held by an eyewear frame in front of one of a person's eyes, wherein the front optical member has a proximal surface which is configured to face the person's eye; a light-emitting member 14001 (such as an image projector), wherein this light-emitting member emits beams of light 14003; a moving optical member 14002 (such as a moving side lens, mirror, prism, or waveguide) which redirects and moves beams of light 14003 from the light-emitting member 14001 (back and forth) across the proximal surface of the front optical member 8002, wherein redirected and moving beams of light from the light-emitting member create virtual images in the person's field of view. Relevant variations and components discussed elsewhere in this disclosure or in priority-linked disclosures can also be applied to this example.

In an example, augmented reality eyewear can comprise: an eyewear frame which is configured to be worn on a person's head, wherein this eyewear frame spans from one of the person's ears, across the person's face, to the person's other ear; a front lens which is configured be held by the eyewear frame in front of one of the person's eyes, wherein the front lens has a proximal surface which is configured to face the person's eye; an image projector, wherein this image projector emits beams of light; a moving side lens, mirror, prism, or waveguide which redirects and moves beams of light from the image projector (back and forth) across the proximal surface of the front lens, wherein redirected and moving beams of light from the image projector create virtual images in the person's field of view.

In an example, a moving side lens, mirror, prism, or waveguide can be a moving lens. In an example, a moving side lens, mirror, prism, or waveguide can be a moving mirror. In an example, a moving side lens, mirror, prism, or waveguide can be a moving prism. In an example, a moving side lens, mirror, prism, or waveguide can be a moving waveguide. In an example, a moving side lens, mirror, prism, or waveguide can have a polygonal cross-sectional shape. In an example, a moving side lens, mirror, prism, or waveguide can be flat. In an example, a moving side lens, mirror, prism, or waveguide can be convex. In an example, a moving side lens, mirror, prism, or waveguide can be parabolic. In an example, a moving side lens, mirror, prism, or waveguide can have a conic section shape. In an example, a moving side lens, mirror, prism, or waveguide can be concave.

In an example, a moving side lens, mirror, prism, or waveguide can rotate and/or revolve. In an example, a moving side lens, mirror, prism, or waveguide can rotate and/or revolve, in a clockwise or counter-clockwise manner, around a central axis. In an example, a moving side lens, mirror, prism, or waveguide can rotate and/or revolve through multiple complete rotations and/or revolutions. In an example, a moving side lens, mirror, prism, or waveguide can tilt. In an example, a moving side lens, mirror, prism, or waveguide can tilt and/or oscillate repeatedly. In an example, a moving side lens, mirror, prism, or waveguide can tilt and/or oscillate back and forth repeatedly. In an example, a moving side lens, mirror, prism, or waveguide can tilt and/or oscillate in a sequential manner.

In an example, movement of a side lens, mirror, prism, or waveguide can cause beams of light from a light-emitting member (e.g. image projector) to scan (back and forth) across a portion of the proximal surface of a front optical member (e.g. front lens). In an example, movement of a side lens, mirror, prism, or waveguide can cause beams of light from a light-emitting member (e.g. image projector) to scan (back and forth) across between 5% and 20% of the proximal surface area of a front optical member (e.g. front lens). In an example, movement of a side lens, mirror, prism, or waveguide can cause beams of light from a light-emitting member (e.g. image projector) to scan (back and forth) across between 10% and 50% of the proximal surface area of a front optical member (e.g. front lens). In an example, movement of a side lens, mirror, prism, or waveguide can cause beams of light from a light-emitting member (e.g. image projector) to scan (back and forth) across between 40% and 90% of the proximal surface area of a front optical member (e.g. front lens).

In an example, movement of a side lens, mirror, prism, or waveguide can cause beams of light from a light-emitting member (e.g. image projector) to scan (back and forth) across a central portion of the proximal surface of a front optical member (e.g. front lens). In an example, movement of a side lens, mirror, prism, or waveguide can cause beams of light from a light-emitting member (e.g. image projector) to scan (back and forth) across a lower portion of the proximal surface of a front optical member (e.g. front lens). In an example, movement of a side lens, mirror, prism, or waveguide can cause beams of light from a light-emitting member (e.g. image projector) to scan (back and forth) across an upper portion of the proximal surface of a front optical member (e.g. front lens).

In an example, movement of a side lens, mirror, prism, or waveguide can cause beams of light from a light-emitting member (e.g. image projector) to scan (back and forth) across a right portion of the proximal surface of a front optical member (e.g. front lens). In an example, movement of a side lens, mirror, prism, or waveguide can cause beams of light from a light-emitting member (e.g. image projector) to scan (back and forth) across a left portion of the proximal surface of a front optical member (e.g. front lens).

In an example, movement of a side lens, mirror, prism, or waveguide can cause beams of light from a light-emitting member (e.g. image projector) to move (e.g. scan) in a linear (back and forth) path across the proximal surface of a front optical member (e.g. front lens). In an example, movement of a side lens, mirror, prism, or waveguide can cause beams of light from a light-emitting member (e.g. image projector) to move (e.g. scan) in a zigzag path across the proximal surface of a front optical member (e.g. front lens). In an example, movement of a side lens, mirror, prism, or waveguide can cause beams of light from a light-emitting member (e.g. image projector) to move (e.g. scan) in a sinusoidal path across the proximal surface of a front optical member (e.g. front lens).

In an example, movement of a side lens, mirror, prism, or waveguide can cause beams of light from a light-emitting member (e.g. image projector) to move (e.g. scan) in a radial (spoke) path on the proximal surface of a front optical member (e.g. front lens). In an example, movement of a side lens, mirror, prism, or waveguide can cause beams of light from a light-emitting member (e.g. image projector) to move (e.g. scan) in a circular path on the proximal surface of a front optical member (e.g. front lens). In an example, movement of a side lens, mirror, prism, or waveguide can cause beams of light from a light-emitting member (e.g. image projector) to move (e.g. scan) in a spiral path on the proximal surface of a front optical member (e.g. front lens).

In an example, an image projector and a moving lens, mirror, prism, or waveguide can be integrated into (e.g. be part of) the earpiece (or "temple") of an eyewear frame. In an example, an image projector and a moving lens, mirror, prism, or waveguide can be integrated into (e.g. be part of) the front and/or bridge portion an eyewear frame. In an example, augmented reality eyewear can comprise multiple image projectors and multiple moving lenses, mirrors, prisms, and waveguides. In an example, augmented reality eyewear can comprise a plurality of image projectors, each with a matched moving lens, mirror, prism, or waveguide. In an example, augmented reality eyewear can comprise an annular array of image projectors and moving lenses, mirrors, prisms, or waveguides which encircles a space in front of a person's eye. In an example, augmented reality eyewear can comprise Volumetric Annular Photon Emission (VAPE) technology with a ring of image projectors and moving lenses, mirrors, prisms, or waveguides around a person's eye. In an example, augmented reality eyewear can comprise VAPE or wear technology. Relevant variations and components discussed elsewhere in this disclosure or in priority-linked disclosures can also be applied to this example.

Figure 17:
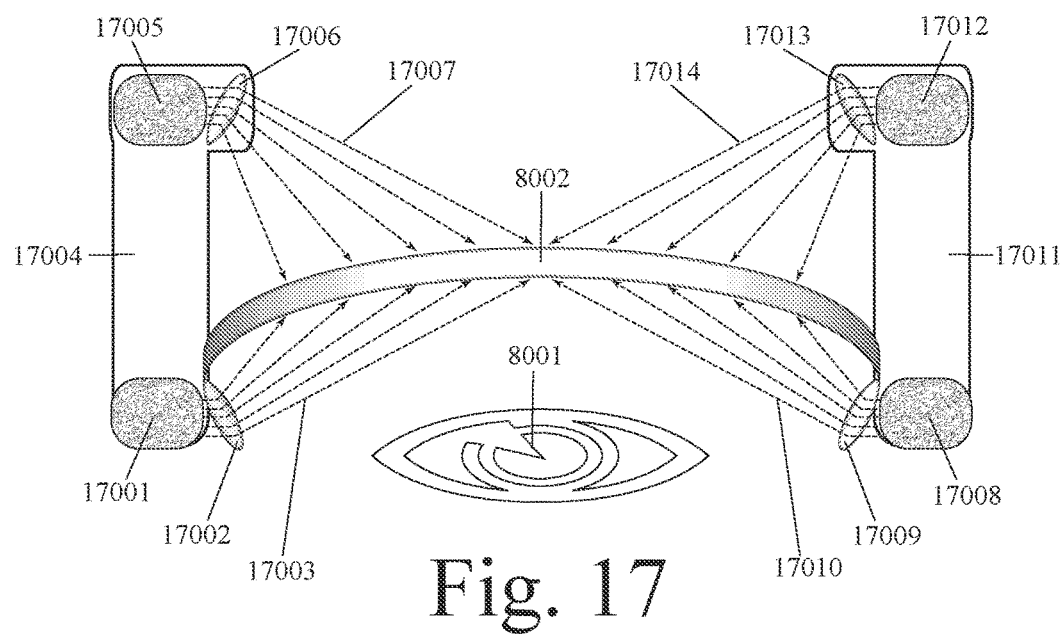
FIG. 17 shows a single-eye portion with bilateral light emitters distal relative to a lens and bilateral light emitters proximal relative to the lens.

FIG. 17 shows a top-down cross-sectional view of another example of a single-eye portion of augmented reality eyewear. In an example, augmented reality eyewear can comprise two such single-eye portions, one for each eye, to display augmented reality for both eyes. In an example, augmented reality eyewear can have such a portion for only eye, to display augmented reality for only one eye. In this example, there is at least one distal light-emitting member (e.g. image projector) which projects light onto the distal surface of a front optical member (e.g. front lens) in addition to at least one proximal light-emitting member (e.g. image projector) which projects light onto the proximal surface of the front optical member (e.g. front lens). In this example, there are left-side and right-side distal light-emitting members (e.g. image projectors) in addition to left-side and right-side proximal light-emitting members (e.g. image projectors).

Augmented reality eyewear with both distal and proximal light-emitting members (e.g. image projectors) can provide more-advanced virtual image projection capability than is possible with only distal light-emitting members or only proximal light-emitting members. In an example, augmented reality eyewear with both distal and proximal light-emitting members can display virtual images at different distances from a person's eye which can help to reduce vergence-accommodation conflict. In an example, augmented reality eyewear with both distal and proximal light-emitting members can display overlapping virtual images for greater variation in the brightness and/or resolution of virtual images. In an example, augmented reality eyewear with both distal and proximal coherent-light-emitting members can form interference patterns which create three-dimensional holographic images.

With respect to specific components, FIG. 17 shows an example of a single-eye portion of augmented reality eyewear which comprises: a front optical member 8002 (such as a lens) which is configured be held by an eyewear frame in front of one of a person's eyes 8001, wherein the front optical member has a proximal surface which is configured to face the person's eye and a distal surface which is configured to face away from the person's eye; a proximal left-side light-emitting member 17001 (such as an image projector) which is configured to be held by the eyewear frame, wherein this proximal left-side light-emitting member emits beams of light 17003; a proximal left-side optical member 17002 (such as a lens, mirror, prism, or waveguide) which redirects beams of light from the proximal left-side light-emitting member toward the proximal surface of the front optical member; a proximal right-side light-emitting member 17008 (such as an image projector) which is configured to be held by the eyewear frame, wherein this proximal right-side light-emitting member emits beams of light 17010; a proximal right-side optical member 17009 (such as a lens, mirror, prism, or waveguide) which redirects beams of light from the proximal right-side light-emitting member toward the proximal surface of the front optical member; a distal left-side light-emitting member 17005 (such as an image projector) which is configured to be held by the eyewear frame, wherein this distal left-side light-emitting member emits beams of light 17007; a distal left-side optical member 17006 (such as a lens, mirror, prism, or waveguide) which redirects beams of light from the distal left-side light-emitting member toward the distal surface of the front optical member; a distal right-side light-emitting member 17012 (such as an image projector) which is configured to be held by the eyewear frame, wherein this distal right-side light-emitting member emits beams of light 17014; and a distal right-side optical member 17013 (such as a lens, mirror, prism, or waveguide) which redirects beams of light from the distal right-side light-emitting member toward the distal surface of the front optical member, wherein redirected beams of light from the light-emitting members create virtual images in the person's field of view. The example shown in FIG. 17 further comprises left-side arm 17004 which holds the distal left-side light-emitting member and right-side arm 17011 which holds the distal right-side light-emitting member. Relevant variations and components discussed elsewhere in this disclosure or in priority-linked disclosures can also be applied to this example.

In an example, augmented reality eyewear can comprise: an eyewear frame which is configured to be worn on a person's head, spanning from one of the person's ears to the person's other ear; a front lens which is configured be held by the eyewear frame in front of at least one of a person's eyes, wherein the front lens has a proximal surface which is configured to face the person's eye and a distal surface which is configured to face away from the person's eye; a proximal left-side image projector which held by the eyewear frame; a proximal left-side lens, mirror, prism, or waveguide which redirects beams of light from the proximal left-side image projector toward the proximal surface of the front lens; a proximal right-side image projector which is held by the eyewear frame; a proximal right-side lens, mirror, prism, or waveguide which redirects beams of light from the proximal right-side image projector toward the proximal surface of the front lens; a distal left-side image projector which is held by the eyewear frame; a distal left-side lens, mirror, prism, or waveguide which redirects beams of light from the distal left-side image projector toward the distal surface of the front lens; a distal right-side image projector which is held by the eyewear frame; and a distal right-side lens, mirror, prism, or waveguide which redirects beams of light from the distal right-side image projector toward the distal surface of the front lens, wherein redirected beams of light from the light-emitting members create virtual images in the person's field of view.

In an example, augmented reality eyewear can comprise: an eyewear frame which is configured to be worn on a person's head, spanning from one of the person's ears to the person's other ear; a front lens which is configured be held by the eyewear frame in front of at least one of a person's eyes, wherein the front lens has a proximal surface which is configured to face the person's eye and a distal surface which is configured to face away from the person's eye; a proximal lower image projector which held by the eyewear frame; a proximal lower lens, mirror, prism, or waveguide which redirects beams of light from the proximal lower image projector toward the proximal surface of the front lens; a proximal upper image projector which is held by the eyewear frame; a proximal upper lens, mirror, prism, or waveguide which redirects beams of light from the proximal upper image projector toward the proximal surface of the front lens; a distal lower image projector which is held by the eyewear frame; a distal lower lens, mirror, prism, or waveguide which redirects beams of light from the distal lower image projector toward the distal surface of the front lens; a distal upper image projector which is held by the eyewear frame; and a distal upper lens, mirror, prism, or waveguide which redirects beams of light from the distal upper image projector toward the distal surface of the front lens, wherein redirected beams of light from the light-emitting members create virtual images in the person's field of view.

In an example, augmented reality eyewear can comprise: an eyewear frame which is configured to be worn on a person's head, spanning from one of the person's ears to the person's other ear; a front lens which is configured be held by the eyewear frame in front of at least one of a person's eyes, wherein the front lens has a proximal surface which is configured to face the person's eye and a distal surface which is configured to face away from the person's eye; a proximal first image projector which held by the eyewear frame; a proximal first lens, mirror, prism, or waveguide which redirects beams of light from the proximal first image projector toward the proximal surface of the front lens; a proximal second image projector which is held by the eyewear frame; a proximal second lens, mirror, prism, or waveguide which redirects beams of light from the proximal second image projector toward the proximal surface of the front lens; a distal first image projector which is held by the eyewear frame; a distal first lens, mirror, prism, or waveguide which redirects beams of light from the distal first image projector toward the distal surface of the front lens; a distal second image projector which is held by the eyewear frame; and a distal second lens, mirror, prism, or waveguide which redirects beams of light from the distal second image projector toward the distal surface of the front lens, wherein redirected beams of light from the light-emitting members create virtual images in the person's field of view.

In an example, augmented reality eyewear can comprise: an eyewear frame which is configured to be worn on a person's head, spanning from one of the person's ears to the person's other ear; a front lens which is configured be held by the eyewear frame in front of at least one of a person's eyes, wherein the front lens has a proximal surface which is configured to face the person's eye and a distal surface which is configured to face away from the person's eye; a proximal set of image projectors which direct beams of light toward the proximal surface of the front lens; and a distal set of image projectors which direct beams of light toward the distal surface of the front lens, wherein redirected beams of light from the light-emitting members create virtual images in the person's field of view.

In an example, augmented reality eyewear can comprise: an eyewear frame which is configured to be worn on a person's head, spanning from one of the person's ears to the person's other ear; a front lens which is configured be held by the eyewear frame in front of at least one of a person's eyes, wherein the front lens has a proximal surface which is configured to face the person's eye and a distal surface which is configured to face away from the person's eye; two or more image projectors which direct beams of light toward the proximal surface of the front lens; and two or more image projectors which direct beams of light toward the distal surface of the front lens, wherein redirected beams of light from the light-emitting members create virtual images in the person's field of view.

In an example, a front optical member can be a lens. In an example, a front optical member can be a convex lens. In an example, a front optical member can be a concave lens. In an example, a front optical member can be a prescription lens. In an example, a front optical member can be a Fresnel lens. In an example, a front optical member can further comprise a plurality of wave guides or micro-prisms. In an example, a front optical member can comprise a micro-lens array. In an example, a front optical member can be solid. In an example, a front optical member can be hollow or fluid-filled.

In an example, a front optical member can have an arcuate vertical cross-sectional perimeter. In an example, a front optical member can have a vertical cross-sectional perimeter with a shape selected from the group consisting of: circle, oval, ellipse, pear-shaped, conic-section, and rounded rectangle. In an example, a front optical member can have an aspherical shape. In an example, a front optical member can have a three-dimensional shape which is a section (or slice) of a sphere, ovaloid, or ellipsoid. In an example, a front optical member can have a conic-section shape. In an example, a front optical member can be planoconvex. In an example, a front optical member can be planoconcave.

In an example, a front optical member (such as a lens) can be radially symmetric with respect to a central virtual vector which extends outward and frontward, in a perpendicular manner, from the center of a person's eye pupil. In an example, a front optical member can be asymmetric with respect to the central virtual vector. In an example, the portion of the front optical member to the left of the central virtual vector can be larger than the portion of the front optical member to the right of the central virtual vector. In an example, the portion of the front optical member to the left of the central virtual vector can be more concave than the portion of the front optical member to the right of the central virtual vector. In an example, the portion of the front optical member to the left of the central virtual vector can be more convex than the portion of the front optical member to the right of the central virtual vector. In an example, the portion of the front optical member to the left of the central virtual vector can be more reflective than the portion of the front optical member to the right of the central virtual vector. In an example, the portion of the front optical member to the left of the central virtual vector can be thicker than the portion of the front optical member to the right of the central virtual vector.

In an example, the portion of the front optical member to the right of the central virtual vector can be larger than the portion of the front optical member to the left of the central virtual vector. In an example, the portion of the front optical member to the right of the central virtual vector can be more concave than the portion of the front optical member to the left of the central virtual vector. In an example, the portion of the front optical member to the right of the central virtual vector can be more convex than the portion of the front optical member to the left of the central virtual vector. In an example, the portion of the front optical member to the right of the central virtual vector can be more reflective than the portion of the front optical member to the left of the central virtual vector. In an example, the portion of the front optical member to the right of the central virtual vector can be thicker than the portion of the front optical member to the left of the central virtual vector.

In an example, the portion of the front optical member above the central virtual vector can be larger than the portion of the front optical member below the central virtual vector. In an example, the portion of the front optical member above the central virtual vector can be more concave than the portion of the front optical member below the central virtual vector. In an example, the portion of the front optical member above the central virtual vector can be more convex than the portion of the front optical member below the central virtual vector. In an example, the portion of the front optical member above the central virtual vector can be more reflective than the portion of the front optical member below the central virtual vector. In an example, the portion of the front optical member above the central virtual vector can be thicker than the portion of the front optical member below the central virtual vector.

In an example, the portion of the front optical member below the central virtual vector can be larger than the portion of the front optical member above the central virtual vector. In an example, the portion of the front optical member below the central virtual vector can be more concave than the portion of the front optical member above the central virtual vector. In an example, the portion of the front optical member below the central virtual vector can be more convex than the portion of the front optical member above the central virtual vector. In an example, the portion of the front optical member below the central virtual vector can be more reflective than the portion of the front optical member above the central virtual vector. In an example, the portion of the front optical member below the central virtual vector can be thicker than the portion of the front optical member above the central virtual vector.

In an example, a front optical member can be made with polycarbonate material. In an example, a front optical member can be made from one or more materials selected from the group consisting of: polycarbonate, glass, photopolymer, photorefractive, crystal, polyacrylate, acrylic, polyvinyl alcohol, indium tin oxide, silver, polypyrrole, acetate, neoprene, polypropylene oxide, carbon, polymethyl methacrylate, polyvinylidene difluoride, carbon nanotubes, parylene, polyimide, silicon, polyethylene naphtalate, silicone, dichromated gelatin, silicon nitride, ethylene tetrafluoroethylene, silicon oxide, polyethylene terephthalate, gallium nitride, tantalum oxide, polyethylene oxide, polytetrafluoroethylene, polyurethane, polyvinylpyrrolidone, polyaniline, graphene, polytetramethylene oxide, silver alloy, polyamide, and silver halide emulsion.

In an example, a front optical member can have multiple layers or coatings comprised of different materials. In an example, different materials used for multiple layers or coatings can be selected from the group consisting of: polycarbonate, glass, photopolymer, photorefractive, crystal, polyacrylate, acrylic, polyvinyl alcohol, indium tin oxide, silver, polypyrrole, acetate, neoprene, polypropylene oxide, carbon, polymethyl methacrylate, polyvinylidene difluoride, carbon nanotubes, parylene, polyimide, silicon, polyethylene naphtalate, silicone, dichromated gelatin, silicon nitride, ethylene tetrafluoroethylene, silicon oxide, polyethylene terephthalate, gallium nitride, tantalum oxide, polyethylene oxide, polytetrafluoroethylene, polyurethane, polyvinylpyrrolidone, polyaniline, graphene, polytetramethylene oxide, silver alloy, polyamide, and silver halide emulsion.

In an example, a front optical member can have a fixed width and curvature. In an example, the width or curvature of a front optical member can be moved and/or adjusted. In an example, the width or curvature of a front optical member can be moved and/or adjusted by changes in an electromagnetic field. In an example, the configuration of a micro-lens array can be changed by changes in an electromagnetic field.

In an example, a front optical member can have a plurality of transparent electroconductive pathways.

In an example, a front optical member can receive light rays from the environment (in front of a person's eye) and transmit these light rays to the person's eye. In an example, a front optical member can selectively filter or transmit light rays in a selected wavelength range to the person's eye. In an example, a front optical member can be a semi-reflective lens. In an example, a front optical member can be semi-transparent. In an example, a front optical member can be a (partial) one-way mirror. In an example, a front optical member can have a reflective coating on its distal surface. In an example, a front optical member can have a reflective coating on its proximal surface. In an example, a front optical member can be semi-transparent. In an example, the proximal surface of a front optical member can partially reflect beams of light from one or more image projectors towards the person's eye. In an example, a front optical member can reflect light rays in a selected wavelength range towards the person's eye.

In an example, the centroid of a front optical member can be held by an eyewear frame between ¼" and 2" from a person's eye. In an example, the centroid of a front optical member can be between ½" and 4" from a person's eye. In an example, the maximum vertical-cross-sectional diameter of a front optical member can be between 1" and 3". In an example, the maximum vertical-cross-sectional diameter of a front optical member can be between 2" and 6". In an example, the maximum width of a front optical member can be between 1/32" and ¼". In an example, the maximum width of a front optical member can be between ⅛" and 1". In an example, there can be a separate front optical member in front of each eye in augmented reality eyewear. In an example, a single front optical member can span both eyes in augmented reality eyewear.

In an example, a light-emitting member can be an image projector. In an example, a light-emitting member can project collimated light. In an example, a light-emitting member can project coherent light. In an example, a light-emitting member can be a low-power laser or array of low-power lasers. In an example, a light-emitting member can project virtual objects (such as text or images) in a person's field of vision.

In an example, a virtual object projected by one or more light-emitting members can be perceptually linked in physical location and/or position relative to a real environmental object in a person's field of vision. In an example, a virtual object can appear to be connected to an environmental object. A virtual object can appear to a viewer as being consistently on top of, adjacent to, or beneath an environmental object. In an example, a virtual object can be super-imposed over (i.e. shown in front of and/or occluding) an environmental object or sub-imposed under (i.e. shown behind and/or occluded by) an environmental object in a person's field of vision. In an example, a virtual object can appear to be moving with an environmental object when the environmental object moves. In an example, both a virtual object and an environmental object can appear to move together, relative to a person's field of vision, when the person moves their head.

In an example, a single-eye portion of augmented reality eyewear can comprise two proximal light-emitting members (e.g. image projectors). In an example, a proximal left-side light-emitting member (e.g. left-side image projector) can be located in line with (an extension of) the 9 o'clock (or 270 degree) location of a front optical member and a proximal right-side light-emitting member (e.g. right-side image projector) can be located in line with (an extension of) the 3 o'clock (90 degree) location of the front optical member. In an example, a proximal left-side light-emitting member (e.g. left-side image projector) can be located in line with vectors between the 8 o'clock and 10 o'clock positions. In an example, a proximal right-side light-emitting member (e.g. right-side image projector) can be located in line with vectors between the 2 o'clock and 4 o'clock positions.

In an example, a single-eye portion of augmented reality eyewear can comprise two proximal light-emitting members (e.g. image projectors). In an example, a proximal upper light-emitting member (e.g. upper image projector) can be located in line with (an extension of) the 12 o'clock (or 0 degree) location of a front optical member and a proximal lower light-emitting member (e.g. lower image projector) can be located in line with (an extension of) the 6 o'clock (180 degree) location of the front optical member. In an example, a proximal upper light-emitting member (e.g. upper image projector) can be located in line with vectors between the 11 o'clock and 1 o'clock positions. In an example, a proximal lower light-emitting member (e.g. lower image projector) can be located in line with vectors between the 5 o'clock and 7 o'clock positions.

In an example, a single-eye portion of augmented reality eyewear can comprise two proximal light-emitting members (e.g. image projectors). In another example, a first proximal light-emitting member (e.g. first image projector) can be located in line with (an extension of) the 12 o'clock (or 0 degree) location of a front optical member and a second proximal light-emitting member (e.g. lower image projector) can be located in line with (an extension of) the 3 o'clock (90 degree) location of the front optical member. In an example, a second proximal light-emitting member (e.g. upper image projector) can be located in line with vectors between the 11 o'clock and 1 o'clock positions. In an example, a second proximal light-emitting member (e.g. lower image projector) can be located in line with vectors between the 2 o'clock and 4 o'clock positions.

In an example, a proximal light-emitting member (e.g. proximal image projector) can be aligned with a distal light-emitting member (e.g. distal image projector) along a proximal-to-distal vector which is parallel to the central virtual vector defined earlier. In an example, a first proximal light-emitting member (e.g. image projector) can be aligned with a first distal light-emitting member (e.g. image projector). In an example, a proximal left-side light-emitting member (e.g. proximal image projector) can be aligned with a distal left-side light-emitting member (e.g. distal image projector). In an example, a proximal right-side light-emitting member (e.g. proximal image projector) can be aligned with a distal right-side light-emitting member (e.g. distal image projector).

In an example, a light-emitting member can project beams of light generally (at least partially) toward a central virtual vector which extends in a perpendicular manner outward from the center of a person's eye pupil. In an example, a left-side light-emitting member can project beams of light in a generally rightward direction. In an example, a right-side light-emitting member can project beams of light in a generally leftward direction. In an example, beams of light from light emitters (e.g. image projectors) may not intersect or overlap before they reach the proximal surface of the front optical member (e.g. lens). In an example, beams of light from light emitters (e.g. image projectors) may not intersect or overlap before they reach the person's eye. In an example, virtual images created by light emitters may not intersect or overlap in a person's field of vision.

In an example, beams of light from light emitters (e.g. image projectors) can intersect or overlap before they reach the proximal surface of the front optical member (e.g. lens). In an example, virtual images created by light emitters can intersect or overlap in a person's field of vision. In an example, the intersection or overlapping of virtual images can create the illusion of virtual objects being at different distances. In an example, the intersection or overlapping of virtual images can create virtual objects with different levels of brightness, clarity, or resolution. In an example, coherent beams of light from light emitters can intersect or overlap to create interference patterns which, in turn, create three-dimensional holographic images in a person's field of vision.

In an example, a light-emitting member (such as an image projector) can emit low-power coherent light. In an example, a light emitter can be a low-power laser. In an example, a light-emitting member (e.g. image projector) can be selected from the group consisting of: light emitting diode (LED); liquid crystal display (LCD); liquid crystal on silicon (LCOS); and spatial light modulator (SLM). In an example, an annular image projector can further comprise a Digital Micromirror Device (DMD). In an example, a light-emitting member (e.g. image projector) can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; micro-display and/or microprojector; micro-display array or matrix; optoelectronic display; organic light emitting diode (OLED) array or matrix; passive matrix light-emitting diode array or matrix; photoelectric display; and transmission holographic optical element array or matrix.

In an example, a proximal image projector can be stationary relative to the surface of a front lens. In an example, a proximal image projector can move relative to a front lens so that beams of light from the image projector move (e.g. scan) across the proximal surface of the front lens. In an example, a proximal image projector can tilt or rotate relative to a front lens so that beams of light from the image projector move across the proximal surface of the front lens. In an example, a proximal image projector can tilt or rotate relative to a front lens so that beams of light from the image projector move back and forth across the proximal surface of the front lens. In an example, a proximal image projector can revolve relative to a front lens so that beams of light from the image projector move across the proximal surface of the front lens. In an example, a proximal image projector can revolve relative to a front lens so that beams of light from the image projector move back and forth across the proximal surface of the front lens.

In an example, a distal image projector can be stationary relative to the surface of a front lens. In an example, a distal image projector can move relative to a front lens so that beams of light from the image projector move (e.g. scan) across the distal surface of the front lens. In an example, a distal image projector can tilt or rotate relative to a front lens so that beams of light from the image projector move across the distal surface of the front lens. In an example, a distal image projector can tilt or rotate relative to a front lens so that beams of light from the image projector move back and forth across the distal surface of the front lens. In an example, a distal image projector can revolve relative to a front lens so that beams of light from the image projector move across the distal surface of the front lens. In an example, a distal image projector can revolve relative to a front lens so that beams of light from the image projector move back and forth across the distal surface of the front lens.

In an example, a proximal or distal image projector can have components which move relative to a front lens so that beams of light from the image projector move (e.g. scan) across the surface of the front lens. In an example, an image projector can have components which tilt or rotate relative to a front lens so that beams of light from the image projector move across the surface of the front lens. In an example, an image projector can have components which tilt or rotate relative to a front lens so that beams of light from the image projector move back and forth across the surface of the front lens. In an example, an image projector can have components which revolve relative to a front lens so that beams of light from the image projector move across the surface of the front lens. In an example, an image projector can have components which revolve relative to a front lens so that beams of light from the image projector move back and forth across the surface of the front lens.

In an example, proximal and distal image projectors can project light beams simultaneously. In an example, proximal and distal image projectors can project light beams at different times. In an example, proximal and distal image projectors can project light beams sequentially. In an example, a proximal image projector can project light at a first time and a distal image projector can project light at a second time. In an example, proximal and distal image projectors can project light beams with the same spectral frequency or distribution. In an example, proximal and distal image projectors can project light beams with different spectral frequencies or distributions. In an example, a proximal image projector can project light with a first spectral frequency or distribution and a distal image projector can project light with a second spectral frequency or distribution. In an example, proximal and distal image projectors can project light beams with the same intensity or brightness. In an example, proximal and distal image projectors can project light beams with different intensity or brightness levels. In an example, a proximal image projector can project light with a first intensity or brightness and a distal image projector can project light with a second intensity or brightness.

In an example, augmented reality eyewear can further comprise one or more arms which extend outward (in a distal direction) from an eyewear frame and hold two or more light-emitting members (e.g. image projectors) in a plane which is in front of (distal relative to) the plane of the front lens. In an example, an arm can extend outward from the plane of the front lens by a distance in the range of ¼" to 1". In an example, an arm can extend outward from the plane of the front lens by a distance in the range of ½" to 3". In an example, an arm can extend outward from the plane of the front lens by a distance in the range of 1" to 4". In an example, eyewear can comprise a left arm which is to the left of the central virtual vector and a right arm which is to the right of the central virtual vector. In an example, augmented reality eyewear can comprise two arms, one to the left of a person's left eye and one to the right of a person's right eye. Relevant variations and components discussed elsewhere in this disclosure or in priority-linked disclosures can also be applied to this example.

Figure 18:
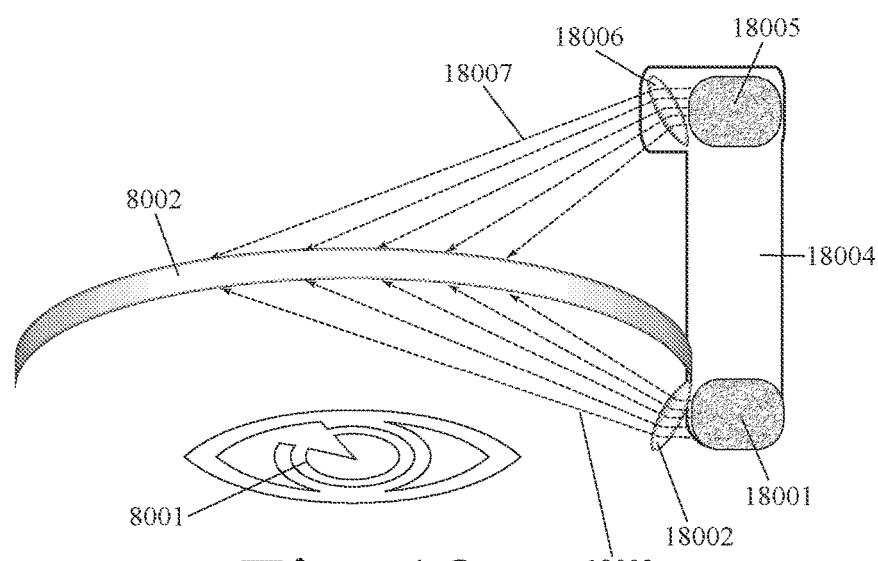
FIG. 18 shows a single-eye portion with one light emitter distal relative to a lens and one light emitter proximal relative to the lens.

FIG. 18 shows an example of a single-eye portion of augmented reality eyewear which is like the one shown in FIG. 17 except that there is only one set of proximal and distal light-emitting members (e.g. image projectors). In this example, there is a set of proximal and distal image projectors only on the right-side of the person's eye. In an example, an arm which holds a distal image projector in place can be a forward extension of the earpiece (or "temple") of the eyewear frame. In an example, am arm which holds a distal image projector in place can be a (rotating) piece which can be positioned parallel to the earpiece (or "temple") of the eyewear frame.

With respect to specific components, FIG. 18 shows an example of a single-eye portion of augmented reality eyewear which comprises: a front optical member 8002 (such as a lens) which is configured be held by an eyewear frame in front of one of a person's eyes 8001, wherein the front optical member has a proximal surface which is configured to face the person's eye and a distal surface which is configured to face away from the person's eye; a proximal right-side light-emitting member 18001 (such as an image projector) which is configured to be held by the eyewear frame, wherein this proximal right-side light-emitting member emits beams of light 18003; a proximal right-side optical member 18002 (such as a lens, mirror, prism, or waveguide) which redirects beams of light from the proximal right-side light-emitting member toward the proximal surface of the front optical member; a distal right-side light-emitting member 18005 (such as an image projector) which is configured to be held by the eyewear frame, wherein this distal right-side light-emitting member emits beams of light 18007; and a distal right-side optical member 18006 (such as a lens, mirror, prism, or waveguide) which redirects beams of light from the distal right-side light-emitting member toward the proximal surface of the front optical member, wherein redirected beams of light from the light-emitting members create virtual images in the person's field of view. The example shown in FIG. 18 further comprises right-side arm 18004 which holds the distal right-side light-emitting member in place. Relevant variations and components discussed elsewhere in this disclosure or in priority-linked disclosures can also be applied to this example.

In an example, augmented reality eyewear can comprise: an eyewear frame which is configured to be worn on a person's head, spanning from one of the person's ears to the person's other ear; a front lens which is configured be held by an eyewear frame in front of one of a person's eyes, wherein the front optical member has a proximal surface which is configured to face the person's eye and a distal surface which is configured to face away from the person's eye; a proximal right-side image projector; a proximal right-side lens, mirror, prism, or waveguide which redirects beams of light from the proximal image projector toward the proximal surface of the front lens; a distal right-side image projector; and a distal right-side lens, mirror, prism, or waveguide which redirects beams of light from the distal image projector toward the distal surface of the front lens, wherein redirected beams of light from the light-emitting members create virtual images in the person's field of view. Relevant variations and components discussed elsewhere in this disclosure or in priority-linked disclosures can also be applied to this example.

Figure 19:
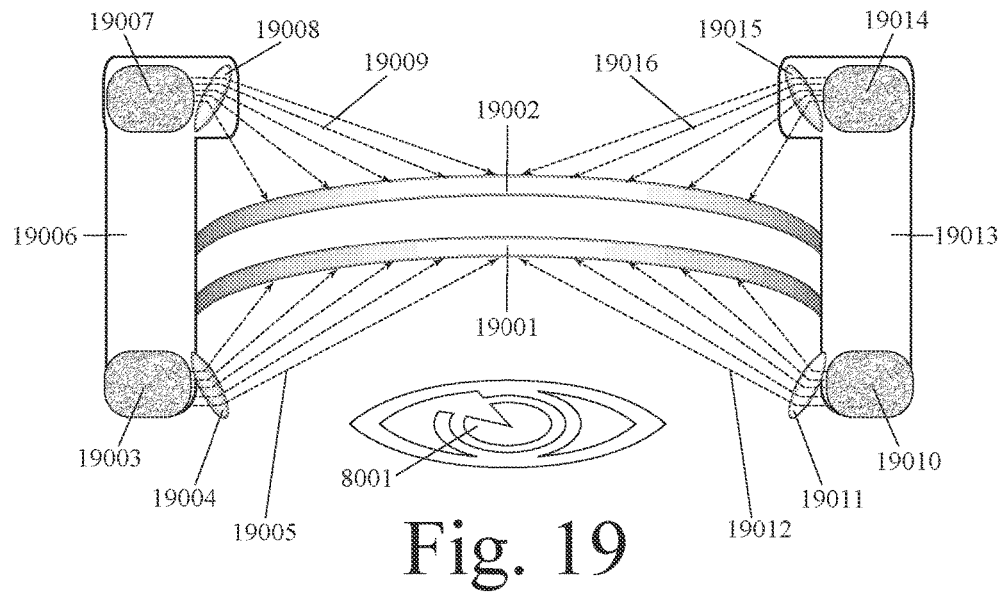
FIG. 19 shows a single-eye portion with bilateral light emitters distal relative to a dual lens and bilateral light emitters proximal relative to the dual lens.

FIG. 19 shows an example of a single-eye portion of augmented reality eyewear which is like the one shown in FIG. 17, except that there are two front optical members (e.g. two front lenses) instead of just one. In this example, there is a proximal front optical member (e.g. a proximal front lens) and a distal front optical member (e.g. a distal front lens). In this example, proximal and distal front lenses are generally parallel to each other. In this example, proximal and distal front lenses are separate but, alternatively, a single-eye portion of augmented reality eyewear can have a single compound lens comprising a proximal layer, a distal layer, and a gas (or liquid) filled gap between the proximal and distal layers.

In an example, one or more proximal light-emitting members (e.g. proximal image projectors) can project beams of light toward the proximal surface of the proximal (layer of the) front lens. In an example, one or more distal light-emitting members (e.g. distal image projectors) can project beams of light toward the distal surface of the distal (layer of the) front lens. In an example, one or more proximal light-emitting members (e.g. proximal image projectors) can project images of virtual objects on the proximal surface of the proximal (layer of the) front lens. In an example, one or more distal light-emitting members (e.g. distal image projectors) can project images of virtual objects on the distal surface of the distal (layer of the) front lens.

With respect to specific components, FIG. 19 shows an example of a single-eye portion of augmented reality eyewear which comprises: a proximal front optical member 19001 (such as a proximal front lens) which is configured be held by an eyewear frame at a first distance from a person's eye 8001, wherein the proximal front optical member has a proximal surface which is configured to face the person's eye and a distal surface which is configured to face away from the person's eye; a distal front optical member 19002 (such as a distal front lens) which is configured be held by an eyewear frame at a second distance from the person's eye, wherein the second distance is greater than the first distance, wherein the distal front optical member has a proximal surface which is configured to face the person's eye and a distal surface which is configured to face away from the person's eye; a proximal left-side light-emitting member 19003 (such as an image projector) which emits beams of light 19005; a proximal left-side optical member 19004 (such as a lens, mirror, prism, or waveguide) which redirects beams of light from the proximal left-side light-emitting member toward the proximal surface of the proximal front optical member; a proximal right-side light-emitting member 19010 (such as an image projector) which emits beams of light 19012; a proximal left-side optical member 19011 (such as a lens, mirror, prism, or waveguide) which redirects beams of light from the proximal right-side light-emitting member toward the proximal surface of the proximal front optical member; a distal left-side light-emitting member 19007 (such as an image projector) which emits beams of light 19009; a distal left-side optical member 19008 (such as a lens, mirror, prism, or waveguide) which redirects beams of light from the distal left-side light-emitting member toward the distal surface of the distal front optical member; and a distal right-side light-emitting member 19014 (such as an image projector) which emits beams of light 19016; a distal right-side optical member 19015 (such as a lens, mirror, prism, or waveguide) which redirects beams of light from the distal right-side light-emitting member toward the distal surface of the distal front optical member, wherein redirected beams of light from the light-emitting members create virtual images in the person's field of view. The example shown in FIG. 19 further comprises left-side arm 19006 and right-side arm 19013 which hold the distal light-emitting members in place. Relevant variations and components discussed elsewhere in this disclosure or in priority-linked disclosures can also be applied to this example.

In an example, augmented reality eyewear can comprise: an eyewear frame which is configured to be worn on a person's head, spanning from one of the person's ears to the person's other ear; a proximal front lens which is configured be held by an eyewear frame at a first distance from a person's eyes, wherein the proximal front lens has a proximal surface which is configured to face the person's eye and a distal surface which is configured to face away from the person's eye; a distal front lens which is configured be held by an eyewear frame at a second distance from the person's eye, wherein the second distance is greater than the first distance, wherein the distal front lens has a proximal surface which is configured to face the person's eye and a distal surface which is configured to face away from the person's eye; a proximal left-side image projector; a proximal left-side lens, mirror, prism, or waveguide which redirects beams of light from the proximal left-side image projector toward the proximal surface of the proximal front lens; a proximal right-side image projector; a proximal left-side lens, mirror, prism, or waveguide which redirects beams of light from the proximal right-side image projector toward the proximal surface of the proximal front lens; a distal left-side image projector; a distal left-side lens, mirror, prism, or waveguide which redirects beams of light from the distal left-side image projector toward the distal surface of the distal front lens; and a distal right-side image projector; a distal right-side lens, mirror, prism, or waveguide which redirects beams of light from the distal right-side image projector toward the distal surface of the distal front lens, wherein redirected beams of light from the image projectors create virtual images in the person's field of view.

In an example, augmented reality eyewear can comprise: an eyewear frame which is configured to be worn on a person's head, spanning from one of the person's ears to the person's other ear; a multilayer front lens which further comprises a proximal layer, a distal layer, and a gas (or fluid) filled gap between the proximal and distal layers; a proximal left-side image projector; a proximal left-side lens, mirror, prism, or waveguide which redirects beams of light from the proximal left-side image projector toward the proximal layer of the multilayer front lens; a proximal right-side image projector; a proximal left-side lens, mirror, prism, or waveguide which redirects beams of light from the proximal right-side image projector toward the proximal layer of the multilayer front lens; a distal left-side image projector; a distal left-side lens, mirror, prism, or waveguide which redirects beams of light from the distal left-side image projector toward the distal layer of the multilayer front lens; and a distal right-side image projector; a distal right-side lens, mirror, prism, or waveguide which redirects beams of light from the distal right-side image projector toward the distal layer of the multilayer front lens, wherein redirected beams of light from the image projectors create virtual images in the person's field of view. Relevant variations and components discussed elsewhere in this disclosure or in priority-linked disclosures can also be applied to this example.

Figure 20:
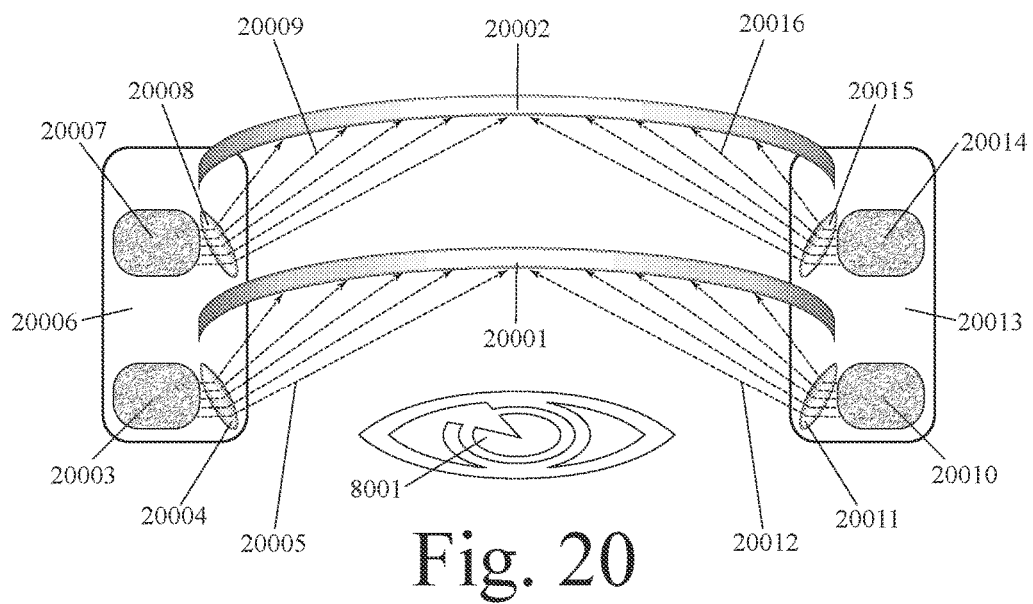
FIG. 20 shows a single-eye portion with bilateral light emitters proximal relative to a proximal lens and bilateral light emitters proximal relative to a distal lens.

FIG. 20 shows an example of a single-eye portion of augmented reality eyewear which is like the one shown in FIG. 19, except that distal image projectors shine beams of light onto the proximal surface (not the distal surface) of a distal front lens. With respect to specific components, FIG. 20 shows an example of a single-eye portion of augmented reality eyewear which comprises: a proximal front optical member 20001 (such as a proximal front lens) which is configured be held by an eyewear frame at a first distance from a person's eyes 8001, wherein the proximal front optical member has a proximal surface which is configured to face the person's eye and a distal surface which is configured to face away from the person's eye; a distal front optical member 20002 (such as a distal front lens) which is configured be held by an eyewear frame at a second distance from the person's eye, wherein the second distance is greater than the first distance, wherein the distal front optical member has a proximal surface which is configured to face the person's eye and a distal surface which is configured to face away from the person's eye; a proximal left-side light-emitting member 20003 (such as an image projector) which emits beams of light 20005; a proximal left-side optical member 20004 (such as a lens, mirror, prism, or waveguide) which redirects beams of light from the proximal left-side light-emitting member toward the proximal surface of the proximal front optical member; a proximal right-side light-emitting member 20010 (such as an image projector) which emits beams of light 20012; a proximal right-side optical member 20011 (such as a lens, mirror, prism, or waveguide) which redirects beams of light from the proximal right-side light-emitting member toward the proximal surface of the proximal front optical member; a distal left-side light-emitting member 20007 (such as an image projector) which emits beams of light 20009; a distal left-side optical member 20008 (such as a lens, mirror, prism, or waveguide) which redirects beams of light from the distal left-side light-emitting member toward the proximal surface of the distal front optical member; and a distal right-side light-emitting member 20014 (such as an image projector) which emits beams of light 20016; a distal right-side optical member 20015 (such as a lens, mirror, prism, or waveguide) which redirects beams of light from the distal right-side light-emitting member toward the proximal surface of the distal front optical member, wherein redirected beams of light from the light-emitting members create virtual images in the person's field of view. The example shown in FIG. 20 further comprises left-side arm 20006 and right-side arm 20013 which hold the distal light-emitting members in place. Relevant variations and components discussed elsewhere in this disclosure or in priority-linked disclosures can also be applied to this example.

In an example, augmented reality eyewear can comprise: an eyewear frame which is configured to be worn on a person's head, spanning from one of the person's ears to the person's other ear; a proximal front lens which is configured be held by an eyewear frame at a first distance from a person's eyes, wherein the proximal front lens has a proximal surface which is configured to face the person's eye and a distal surface which is configured to face away from the person's eye; a distal front lens which is configured be held by an eyewear frame at a second distance from the person's eye, wherein the second distance is greater than the first distance, wherein the distal front lens has a proximal surface which is configured to face the person's eye and a distal surface which is configured to face away from the person's eye; a proximal left-side image projector; a proximal left-side lens, mirror, prism, or waveguide which redirects beams of light from the proximal left-side image projector toward the proximal surface of the proximal front lens; a proximal right-side image projector; a proximal right-side lens, mirror, prism, or waveguide which redirects beams of light from the proximal right-side image projector toward the proximal surface of the proximal front lens; a distal left-side image projector; a distal left-side lens, mirror, prism, or waveguide which redirects beams of light from the distal left-side image projector toward the proximal surface of the distal front lens; and a distal right-side image projector; a distal right-side lens, mirror, prism, or waveguide which redirects beams of light from the distal right-side image projector toward the proximal surface of the distal front lens, wherein redirected beams of light from the image projectors create virtual images in the person's field of view.

In an example, augmented reality eyewear can comprise: an eyewear frame which is configured to be worn on a person's head, spanning from one of the person's ears to the person's other ear; a multilayer front lens which further comprises a proximal layer, a distal layer, and a gas (or fluid) filled gap between the proximal and distal layers; a proximal left-side image projector; a proximal left-side lens, mirror, prism, or waveguide which redirects beams of light from the proximal left-side image projector toward the proximal layer of the multilayer front lens; a proximal right-side image projector; a proximal right-side lens, mirror, prism, or waveguide which redirects beams of light from the proximal right-side image projector toward the proximal layer of the multilayer front lens; a distal left-side image projector; a distal left-side lens, mirror, prism, or waveguide which redirects beams of light from the distal left-side image projector toward the distal layer of the multilayer front lens; and a distal right-side image projector; a distal right-side lens, mirror, prism, or waveguide which redirects beams of light from the distal right-side image projector toward the distal layer of the multilayer front lens, wherein redirected beams of light from the image projectors create virtual images in the person's field of view.

In an example, beams of light from a light-emitting member (e.g. an image projector) can travel in a direct (e.g. linear) path from a side optical member (e.g. side lens, mirror, prism, or waveguide) to the surface of a front lens. In an example, beams of light from a light-emitting member (e.g. an image projector) can travel in an indirect (reflected) path from a side optical member (e.g. side lens, mirror, prism, or waveguide) to the surface of a front lens. In an example, beams of light from a light-emitting member (e.g. an image projector) can travel in an indirect (reflected) path through a (gas or liquid filled) gap between a proximal front lens and a distal front lens. In an example, beams of light from a light-emitting member (e.g. an image projector) can travel in an indirect (reflected) path between a proximal layer of a multilayer front lens and a distal layer of multilayer front lens. In an example, beams of light from a light-emitting member (e.g. an image projector) can travel in an indirect (reflected) path through a gap between a proximal front lens and a distal front lens, being reflected back and forth by the proximal surface of the distal front lens and the distal surface of the proximal front lens. In an example, beams of light from a light-emitting member (e.g. an image projector) can travel in an indirect (reflected) path between a proximal layer of a multilayer front lens and a distal layer of multilayer front lens, being reflected back and forth by the proximal surface of the distal layer and the distal surface of the proximal layer.

In an example, beams of light from a light-emitting member (e.g. an image projector) can travel in a zigzag reflected path from a side optical member (e.g. side lens, mirror, prism, or waveguide) to the surface of a front lens. In an example, beams of light from a light-emitting member (e.g. an image projector) can travel in a zigzag reflected path through a (gas or liquid filled) gap between a proximal front lens and a distal front lens. In an example, beams of light from a light-emitting member (e.g. an image projector) can travel in a zigzag reflected path between a proximal layer of a multilayer front lens and a distal layer of multilayer front lens. In an example, beams of light from a light-emitting member (e.g. an image projector) can travel in a zigzag reflected path through a gap between a proximal front lens and a distal front lens, being reflected back and forth by the proximal surface of the distal front lens and the distal surface of the proximal front lens. In an example, beams of light from a light-emitting member (e.g. an image projector) can travel in a zigzag path between a proximal layer of a multilayer front lens and a distal layer of multilayer front lens, being reflected back and forth by the proximal surface of the distal layer and the distal surface of the proximal layer. Relevant variations and components discussed elsewhere in this disclosure or in priority-linked disclosures can also be applied to this example.

Figure 21:
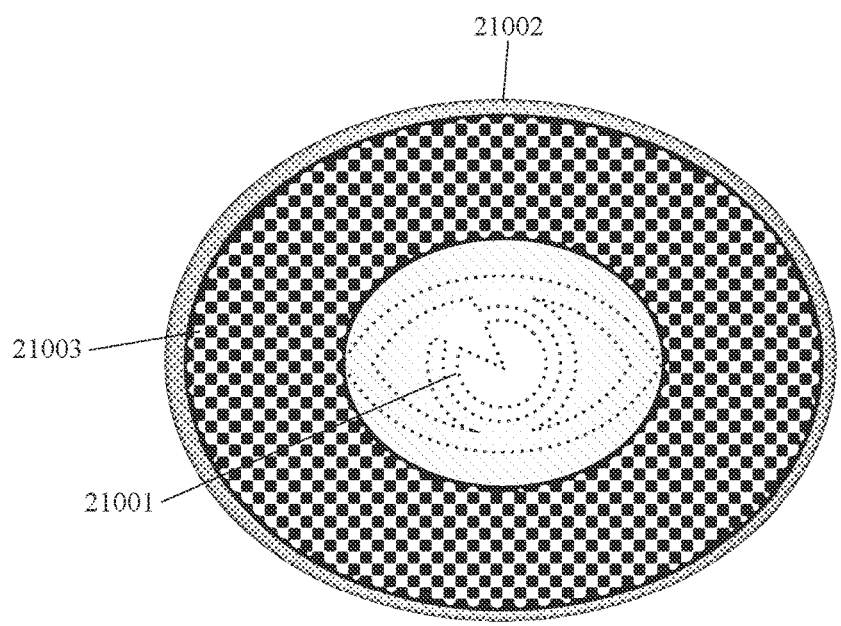
FIGS. 21 and 22 show two views of a single-eye portion with an annular array of light emitters that is proximal relative to a lens.
Figure 22:
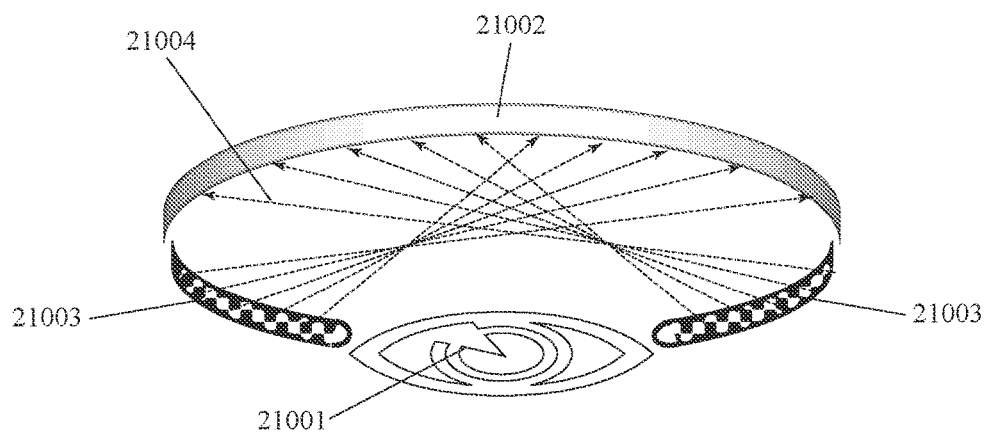

FIGS. 21 and 22 show two different perspectives of another example of a single-eye portion of augmented reality eyewear. In an example, augmented reality eyewear can comprise two such single-eye portions, one for each eye, to display augmented reality for both eyes. In an example, augmented reality eyewear can have such a portion for only one eye, to display augmented reality for only one eye. FIG. 21 shows a front side view of this example. FIG. 22 shows a top-down cross-sectional view of this example.

The example of a single-eye portion of augmented reality eyewear shown in FIGS. 21 and 22 comprises: a front optical member 21002 (such as a front lens) which is configured be held by an eyewear frame in front of one of the person's eyes 21001, wherein the front optical member has a proximal surface which is configured to face the person's eye and a distal surface which is configured to face away from the person's eye; and an annular array of light-emitting members 21003 (such as an annular image projector) which encircles a space in front of the person's eye, wherein this annular array of light-emitting members projects beams of light 21004 toward the proximal surface of the front optical member, and wherein these beams of light create virtual images in the person's field of view. Relevant variations and components discussed elsewhere in this disclosure or in priority-linked disclosures can also be applied to this example.

In an example, a single-eye portion of augmented reality eyewear can comprise: a front lens which is configured be held by an eyewear frame in front of one of the person's eyes, wherein the front lens has a proximal surface which is configured to face the person's eye and a distal surface which is configured to face away from the person's eye; and an annular image projector which encircles a space in front of the person's eye, wherein this annular image projector beams of light toward the proximal surface of the front lens, and wherein these beams of light create virtual images in the person's field of view. In an example, a single-eye portion of augmented reality eyewear can comprise: a front lens which is configured be held by an eyewear frame in front of one of the person's eyes, wherein the front lens has a proximal surface which is configured to face the person's eye and a distal surface which is configured to face away from the person's eye; and a ring of light-emitting members which encircles a space in front of the person's eye, wherein this ring beams of light toward the proximal surface of the front lens, and wherein these beams of light create virtual images in the person's field of view.

In an example, augmented reality eyewear can comprise: an eyewear frame which is configured to be worn on the person's head, wherein the eyewear frame spans from one of the person's ears, across the person's face, to the person's other ear; a front lens which is configured be held by the eyewear frame in front of at least one of the person's eyes, wherein the front lens has a proximal surface which is configured to face the person's eye and a distal surface which is configured to face away from the person's eye; and an annular image projector which encircles a space in front of the person's eye, wherein this annular image projector beams of light toward the proximal surface of the front lens, and wherein these beams of light create virtual images in the person's field of view.

In an example, a front optical member can be a lens. In an example, a front optical member can be a convex lens. In an example, a front optical member can be a concave lens. In an example, a front optical member can be a prescription lens. In an example, a front optical member can be a Fresnel lens. In an example, a front optical member can further comprise a plurality of wave guides or micro-prisms. In an example, a front optical member can comprise a micro-lens array. In an example, a front optical member can be solid. In an example, a front optical member can be hollow or fluid-filled.

In an example, a front optical member can have an arcuate vertical cross-sectional perimeter. In an example, a front optical member can have a vertical cross-sectional perimeter with a shape selected from the group consisting of: circle, oval, ellipse, pear-shaped, conic-section, and rounded rectangle. In an example, a front optical member can have an aspherical shape. In an example, a front optical member can have a three-dimensional shape which is a section (or slice) of a sphere, ovaloid, or ellipsoid. In an example, a front optical member can have a conic-section shape. In an example, a front optical member can be planoconvex. In an example, a front optical member can be planoconcave.

In an example, a front optical member (such as a lens) can be radially symmetric with respect to a central virtual vector which extends outward and frontward, in a perpendicular manner, from the center of a person's eye pupil. In an example, a front optical member can be asymmetric with respect to the central virtual vector. In an example, the portion of the front optical member to the left of the central virtual vector can be larger than the portion of the front optical member to the right of the central virtual vector. In an example, the portion of the front optical member to the left of the central virtual vector can be more concave than the portion of the front optical member to the right of the central virtual vector. In an example, the portion of the front optical member to the left of the central virtual vector can be more convex than the portion of the front optical member to the right of the central virtual vector. In an example, the portion of the front optical member to the left of the central virtual vector can be more reflective than the portion of the front optical member to the right of the central virtual vector. In an example, the portion of the front optical member to the left of the central virtual vector can be thicker than the portion of the front optical member to the right of the central virtual vector.

In an example, the portion of the front optical member to the right of the central virtual vector can be larger than the portion of the front optical member to the left of the central virtual vector. In an example, the portion of the front optical member to the right of the central virtual vector can be more concave than the portion of the front optical member to the left of the central virtual vector. In an example, the portion of the front optical member to the right of the central virtual vector can be more convex than the portion of the front optical member to the left of the central virtual vector. In an example, the portion of the front optical member to the right of the central virtual vector can be more reflective than the portion of the front optical member to the left of the central virtual vector. In an example, the portion of the front optical member to the right of the central virtual vector can be thicker than the portion of the front optical member to the left of the central virtual vector.

In an example, the portion of the front optical member above the central virtual vector can be larger than the portion of the front optical member below the central virtual vector. In an example, the portion of the front optical member above the central virtual vector can be more concave than the portion of the front optical member below the central virtual vector. In an example, the portion of the front optical member above the central virtual vector can be more convex than the portion of the front optical member below the central virtual vector. In an example, the portion of the front optical member above the central virtual vector can be more reflective than the portion of the front optical member below the central virtual vector. In an example, the portion of the front optical member above the central virtual vector can be thicker than the portion of the front optical member below the central virtual vector.

In an example, the portion of the front optical member below the central virtual vector can be larger than the portion of the front optical member above the central virtual vector. In an example, the portion of the front optical member below the central virtual vector can be more concave than the portion of the front optical member above the central virtual vector. In an example, the portion of the front optical member below the central virtual vector can be more convex than the portion of the front optical member above the central virtual vector. In an example, the portion of the front optical member below the central virtual vector can be more reflective than the portion of the front optical member above the central virtual vector. In an example, the portion of the front optical member below the central virtual vector can be thicker than the portion of the front optical member above the central virtual vector.

In an example, a front optical member can be made with polycarbonate material. In an example, a front optical member can be made from one or more materials selected from the group consisting of: polycarbonate, glass, photopolymer, photorefractive, crystal, polyacrylate, acrylic, polyvinyl alcohol, indium tin oxide, silver, polypyrrole, acetate, neoprene, polypropylene oxide, carbon, polymethyl methacrylate, polyvinylidene difluoride, carbon nanotubes, parylene, polyimide, silicon, polyethylene naphtalate, silicone, dichromated gelatin, silicon nitride, ethylene tetrafluoroethylene, silicon oxide, polyethylene terephthalate, gallium nitride, tantalum oxide, polyethylene oxide, polytetrafluoroethylene, polyurethane, polyvinylpyrrolidone, polyaniline, graphene, polytetramethylene oxide, silver alloy, polyamide, and silver halide emulsion.

In an example, a front optical member can have multiple layers or coatings comprised of different materials. In an example, different materials used for multiple layers or coatings can be selected from the group consisting of: polycarbonate, glass, photopolymer, photorefractive, crystal, polyacrylate, acrylic, polyvinyl alcohol, indium tin oxide, silver, polypyrrole, acetate, neoprene, polypropylene oxide, carbon, polymethyl methacrylate, polyvinylidene difluoride, carbon nanotubes, parylene, polyimide, silicon, polyethylene naphtalate, silicone, dichromated gelatin, silicon nitride, ethylene tetrafluoroethylene, silicon oxide, polyethylene terephthalate, gallium nitride, tantalum oxide, polyethylene oxide, polytetrafluoroethylene, polyurethane, polyvinylpyrrolidone, polyaniline, graphene, polytetramethylene oxide, silver alloy, polyamide, and silver halide emulsion.

In an example, a front optical member can have a fixed width and curvature. In an example, the width or curvature of a front optical member can be moved and/or adjusted. In an example, the width or curvature of a front optical member can be moved and/or adjusted by changes in an electromagnetic field. In an example, the configuration of a micro-lens array can be changed by changes in an electromagnetic field. In an example, a front optical member can have a plurality of transparent electroconductive pathways.

In an example, a front optical member can receive light rays from the environment (in front of a person's eye) and transmit these light rays to the person's eye. In an example, a front optical member can selectively filter or transmit light rays in a selected wavelength range to the person's eye. In an example, a front optical member can be a semi-reflective lens. In an example, a front optical member can be semi-transparent. In an example, a front optical member can be a (partial) one-way mirror. In an example, a front optical member can have a reflective coating on its distal surface. In an example, a front optical member can have a reflective coating on its proximal surface. In an example, a front optical member can be semi-transparent. In an example, the proximal surface of a front optical member can partially reflect beams of light from one or more image projectors towards the person's eye. In an example, a front optical member can reflect light rays in a selected wavelength range towards the person's eye.

In an example, the centroid of a front optical member can be held by an eyewear frame between $\frac{1}{4}$" and 2" from a person's eye. In an example, the centroid of a front optical member can be between $\frac{1}{2}$" and 4" from a person's eye. In an example, the maximum vertical-cross-sectional diameter of a front optical member can be between 1" and 3". In an example, the maximum vertical-cross-sectional diameter of a front optical member can be between 2" and 6". In an example, the maximum width of a front optical member can be between $\frac{1}{32}$" and $\frac{1}{4}$". In an example, the maximum width of a front optical member can be between $\frac{1}{8}$" and 1". In an example, there can be a separate front optical member in front of each eye in augmented reality eyewear. In an example, a single front optical member can span both eyes in augmented reality eyewear.

In an example an annular array of light-emitting members can further comprise an annular array of low-power lasers. In an example, can you find Waldo in the figures? In an example, light-emitting members in an annular array can be selected from the group consisting of: active matrix organic light-emitting diode; digital pixel; diode laser; ferroelectric liquid crystal on silicon; holographic optical element; Light Emitting Diode (LED); liquid crystal display (LCD); liquid crystal on silicon (LCOS); low-power (e.g. nano-watt) laser; organic light emitting diode (OLED); passive matrix light-emitting diode; spatial light modulator (SLM); and transmission holographic optical element.

In an example, an annular array of light-emitting members can have a toroidal or ring shape. In an example, an annular array of light-emitting members can be convex. In an example, an annular array of light-emitting members can be concave. In an example, an annular array of light-emitting members can be flat. In an example, an annular array of light-emitting members can have a central opening (or hole) in front of a person's eye. In an example, a central opening (or hole) of an annular array of light-emitting members can be centered on the center of the pupil of a person's eye. In an example, an annular array of light-emitting members can have an outer circumference in the range of 2" to 5." In an example, an annular array of light-emitting members can have an outer circumference in the range of 4" to 10." In an example, an annular array of light-emitting members can have a central opening (or hole) with a circumference in the range of 0.5" to 2". In an example, an annular array of light-emitting members can have a central opening (or hole) with a circumference in the range of 2" to 5".

In an example, an annular array of light-emitting members can comprise a ring around a person's eye. In an example, an annular array of light-emitting members can comprise between two-thirds and three-quarters of a ring around a person's eye. In an example, an annular array of light-emitting members can comprise between one-half and four-fifths of a ring around a person's eye. In an example, an annular array of light-emitting members can comprise a section of the surface of a sphere or ellipsoid with an opening (hole) in the middle. In an example, an annular array of light-emitting members can comprise a convex ring around a person's eye. In an example, an annular array of light-emitting members can comprise between two-thirds and three-quarters of a convex ring around a person's eye. In an example, an annular array of light-emitting members can comprise between one-half and four-fifths of a convex ring around a person's eye.

In an example, light-emitting members in an annular array can be arranged in concentric rings, spanning at least two-thirds of the circumference of a virtual ring around a person's eye. In an example, light-emitting members in an annular array can be arranged in concentric arcuate perimeters around at least two-thirds of the circumference of a virtual ring around a person's eye. In an example, light-emitting members in an annular array can be arranged in concentric circles, ovals, or ellipses around at least two-thirds of the circumference of a virtual ring around a person's eye. In an example, light-emitting members in an annular array can be arranged in concentric rings around at least three-quarters of the circumference of a virtual ring around a person's eye. In an example, light-emitting members in an annular array can be arranged in concentric arcuate perimeters around at least three-quarters of the circumference of a virtual ring around a person's eye. In an example, light-emitting members in an annular array can be arranged in concentric circles, ovals, or ellipses around at least three-quarters of the circumference of a virtual ring around a person's eye. In an example, light-emitting members in an annular array can be arranged in concentric rings which completely encircle a person's eye. In an example, light-emitting members in an annular array can be arranged in concentric arcuate perimeters which completely encircle a person's eye. In an example, light-emitting members in an annular array can be arranged in concentric circles, ovals, or ellipses which completely encircle a person's eye.

In an example, an annular array of light-emitting members can be structured with radial spokes and/or circumferential rings around person's eye. In an example, an annular array of light-emitting members can comprise at least three light-emitting members along a given radial spoke. In an example, an annular array of light-emitting members can comprise at least three concentric rings of light-emitting members. In an example, an annular array of light-emitting members can comprise at least ten light-emitting members along a given radial spoke. In an example, an annular array of light-emitting members can comprise at least ten concentric rings of light-emitting members. In an example, an annular array of light-emitting members can comprise at least fifty light-emitting members along a given radial spoke. In an example, an annular array of light-emitting members can comprise at least fifty concentric rings of light-emitting members.

In an example, one ring of light-emitting members in a multi-ring annular array of light-emitting members can comprise between 10 and 50 light emitting members. In an example, one ring of light-emitting members in a multi-ring annular array of light-emitting members can comprise between 25 and 100 light emitting members. In an example, an annular array of light-emitting members can comprise between 30 and 100 light emitting members. In an example, an annular array of light-emitting members can comprise between 50 and 500 light emitting members. In an example, an annular array of light-emitting members can comprise between 100 and 1,000 light emitting members. In an example, an annular array of light-emitting members can comprise between 500 and 10,000 light emitting members.

In an example, light-emitting members on the right side of an annular array of light-emitting members can direct beams of light toward the left side of the proximal surface of a front optical member (e.g. front lens). In an example, light-emitting members on the left side of an annular array of light-emitting members can direct beams of light toward the right side of the proximal surface of a front optical member (e.g. front lens). In an example, light-emitting members on the right side of an annular array of light-emitting members can direct beams of light toward the right side of the proximal surface of a front optical member (e.g. front lens). In an example, light-emitting members on the left side of an annular array of light-emitting members can direct beams of light toward the left side of the proximal surface of a front optical member (e.g. front lens).

In an example, an annular array of light-emitting members can project beams of light onto between 5% and 30% of the proximal surface of a front optical member (e.g. front lens). In an example, an annular array of light-emitting members can project beams of light onto between 25% and 50% of the proximal surface of a front optical member (e.g. front lens). In an example, an annular array of light-emitting members can project beams of light onto between 40% and 80% of the proximal surface of a front optical member (e.g. front lens). In an example, an annular array of light-emitting members can project beams of light over the entire proximal surface area of front optical member (e.g. front lens). In an example, the distance between the centroid of an annular array of light-emitting members and a front optical member (e.g. front lens) can be between $\frac{1}{32}$" and $\frac{1}{4}$". In an example, the distance between the centroid of an annular array of light-emitting members and a front optical member (e.g. front lens) can be between $\frac{1}{8}$" and $\frac{1}{2}$". In an example, the distance between the centroid of an annular array of light-emitting members and a front optical member (e.g. front lens) can be between $\frac{1}{4}$" and 2".

In an example, light-emitting members in an annular array of light-emitting members can emit light simultaneously. In an example, different light-emitting members can emit light at different times. In an example, light-emitting members can emit light sequentially. In an example, light-emitting members can emit light sequentially in a clockwise or counter-clockwise manner. In an example, different light-emitting members along the same radial spoke of an array can emit light sequentially. In an example, light-emitting members can emit light sequentially in a radially-expanding or radially shrinking manner. In an example, different light-emitting members along the same ring of an array can emit light sequentially. In an example, light-emitting members in an annular array of light-emitting members can emit light with the same spectral frequency. In an example, different light-emitting members can emit light with different spectral frequencies. Relevant variations and components discussed elsewhere in this disclosure or in priority-linked disclosures can also be applied to this example.

Figure 23:
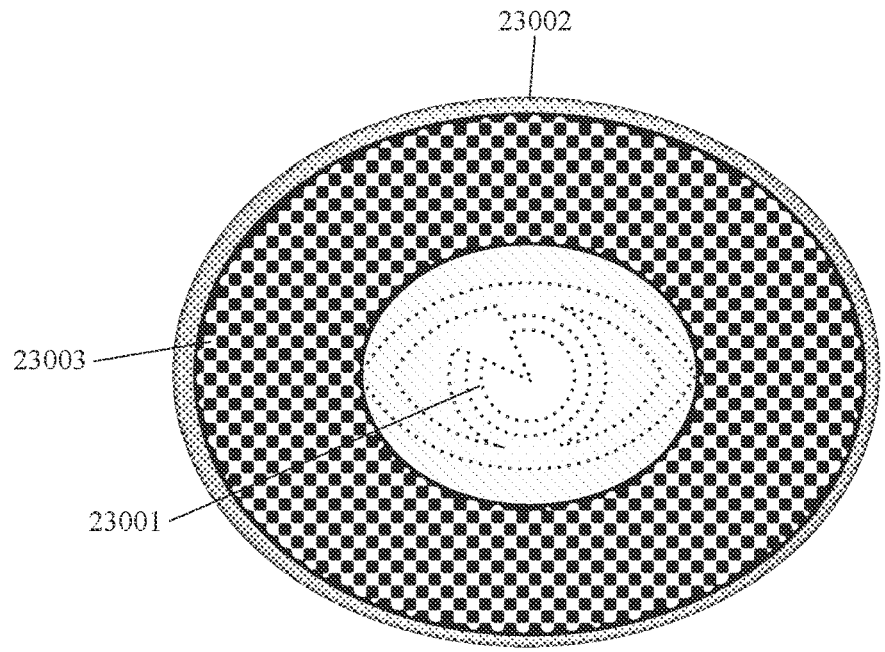
FIGS. 23 and 24 show two views of a single-eye portion with an annular array of light emitters that is distal relative to a lens.
Figure 24:
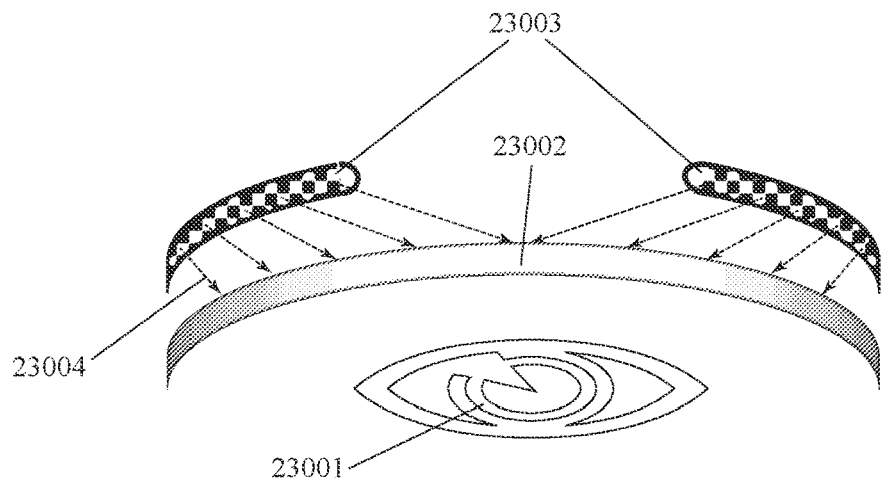

FIGS. 23 and 24 show an example of a single-eye portion of augmented reality eyewear which is like the example in FIGS. 21 and 22 except that the annular array of light-emitting members (e.g. annular image projector) is distal relative to the front optical member (e.g. front lens). In an example, augmented reality eyewear can comprise two such single-eye portions, one for each eye, to display augmented reality for both eyes. In an example, augmented reality eyewear can have such a portion for only eye, to display augmented reality for only one eye. FIG. 23 shows a front side view of this example. FIG. 24 shows a top-down cross-sectional view of this example.

The example of a single-eye portion of augmented reality eyewear shown in FIGS. 23 and 24 comprises: a front optical member 23002 (such as a front lens) which is in front of one of the person's eyes 23001, wherein the front optical member has a proximal surface which is configured to face the person's eye and a distal surface which is configured to face away from the person's eye; and an annular array of light-emitting members 23003 (such as an annular image projector), wherein this annular array of light-emitting members projects beams of light 23004 onto the distal surface of the front optical member, and wherein these beams of light create virtual images in the person's field of view.

In an example, a single-eye portion of augmented reality eyewear can comprise: a front lens which is in front of one of a person's eyes, wherein the front lens has a proximal surface which is configured to face the person's eye and a distal surface which is configured to face away from the person's eye; and an annular array of light-emitting members (such as an annular image projector), wherein this annular array of light-emitting members projects beams of light onto the distal surface of the front lens, and wherein these beams of light create virtual images in the person's field of view.

In an example, the centroid of an annular array of light-emitting members can be distal relative to the centroid of a front optical member. In an example, a central virtual vector can be defined which extends forward in a perpendicular manner from the center of a person's eye. In an example, an annular array of light-emitting members can (at least partially) encircle the central virtual vector. In an example, the perimeter of a central opening or hole of the annular array of light-emitting members can (at least partially) encircle the central virtual vector. In an example, the size of a central opening or hole of an annular array of light-emitting members can be increased or decreased. Relevant variations and components discussed elsewhere in this disclosure or in priority-linked disclosures can also be applied to this example.

Figure 25:
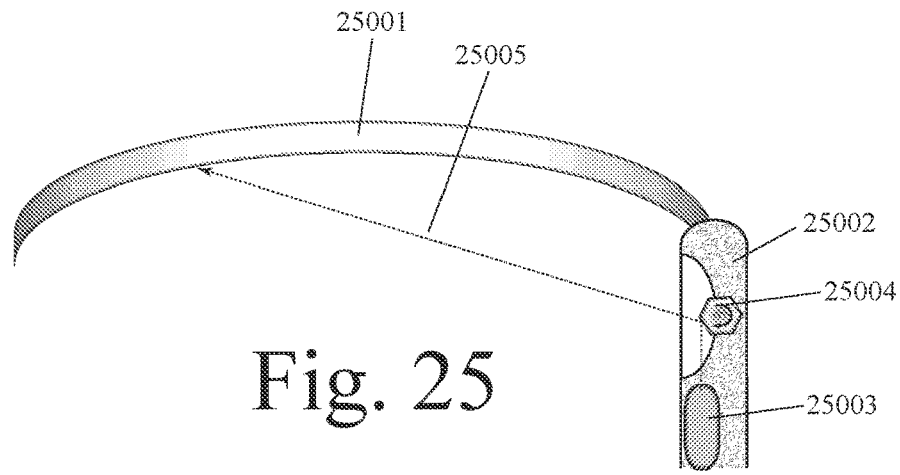
FIGS. 25 through 27 show sequential cross-sectional views of a single-eye portion with a rotating optical member on an eyewear arm.
Figure 26:
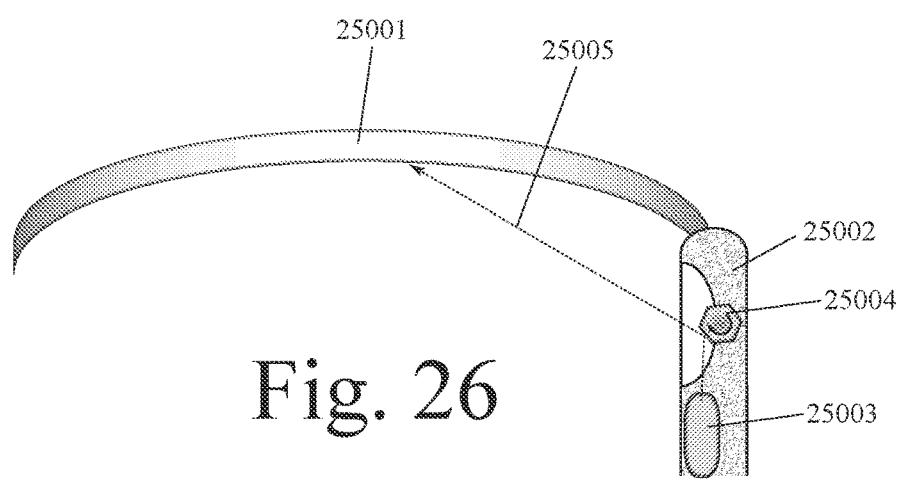
Figure 27:
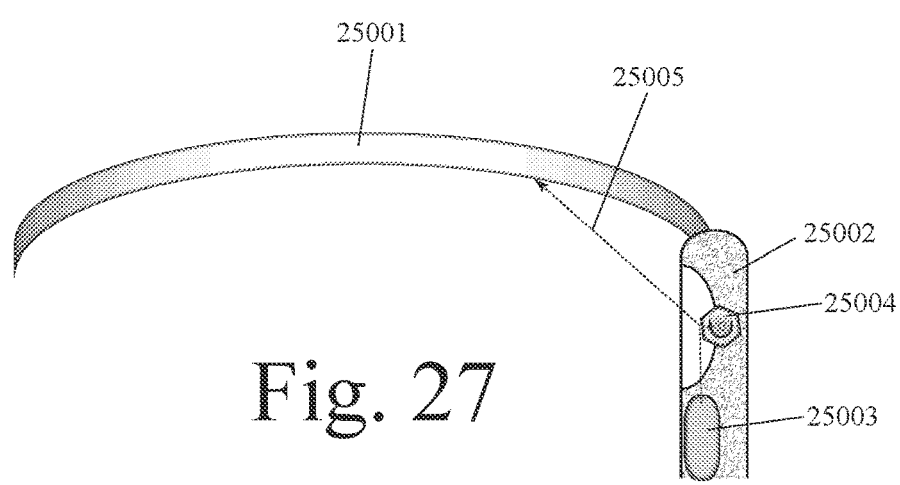

FIGS. 25 through 27 show three (sequential) top-down cross-sectional views an example of a single-eye portion of augmented reality eyewear with a rotating side optical member (such as a rotating lens, mirror, prism, or waveguide) which is part of the sidepiece (e.g. "temple" or earpiece) of an eyewear frame. Rotation of the side optical member causes beams of light from a light-emitting member (e.g. image projector) to move (e.g. scan) across the proximal surface of a front optical member (e.g. a front lens). FIGS. 25, 26, and 27 show this example at a first point in time, a second point time, and a third point in time, respectively. In an example, augmented reality eyewear can comprise two such single-eye portions, one for each eye, to display augmented reality for both eyes. In an example, augmented reality eyewear can have such a portion for only eye, to display augmented reality for only one eye.

The example of a single-eye portion of augmented reality eyewear shown in FIGS. 25 through 27 comprises: a front optical member 25001 which is configured to be held in front of one of a person's eyes by an eyewear frame, wherein the front optical member has a proximal surface which is configured to face the person's eye and a distal surface which is configured to face away from the person's eye; a sidepiece 25002 of the eyewear frame; a light-emitting member 25003 which is attached to (or part of) the sidepiece of the eyewear frame; and a rotating optical member 25004 which is attached to (or part of) the sidepiece of the eyewear frame, wherein the rotating optical member redirects light beams 25005 from the light-emitting member toward the proximal surface of the front optical member, wherein rotation of the rotating optical member causes the light beams to hit the proximal surface of the front optical member at different locations at different times, and wherein these light beams create virtual images in the person's field of view. Relevant variations and components discussed elsewhere in this disclosure or in priority-linked disclosures can also be applied to this example.

In an example, a rotating optical member can be a polygonal mirror. In an example, a rotating optical member can be a geodesic mirror. In an example, a rotating optical member can be a polygonal prism. In an example, a rotating optical member can be a polygonal columnar prism. In an example, a rotating optical member can be a convex lens. In an example, a rotating optical member can be a concave lens. In an example, a rotating optical member can rotate with multiple complete revolutions in the same clockwise or counter-clockwise direction. In an example, a rotating optical member can rotate in alternating clockwise and counter-clockwise directions. In an example, a rotating optical member can be located within a recess of a sidepiece of an eyewear frame.

In an example, a rotating optical member can direct light beams so that they move over (e.g. scan across) between 5% and 30% of the proximal surface of a front lens. In an example, a rotating optical member can direct light beams so that they move over (e.g. scan across) between 25% and 50% of the proximal surface of a front lens. In an example, a rotating optical member can direct light beams so that they move over (e.g. scan across) between 40% and 80% of the proximal surface of a front lens. In an example, a rotating optical member can direct light beams so that they move over (e.g. scan across) the entire proximal surface of a front lens.

In an example, a single-eye portion of augmented reality eyewear can comprise: a front lens which is configured to be held in front of one of a person's eyes by an eyewear frame, wherein the front lens has a proximal surface which is configured to face the person's eye and a distal surface which is configured to face away from the person's eye; a sidepiece (such as an earpiece or "temple" of the eyewear frame); a light-emitting member (such as an image projector) which is attached to (or part of) the sidepiece of the eyewear frame; and a rotating lens, mirror, prism, or waveguide which is attached to (or part of) the sidepiece of the eyewear frame, wherein the rotating lens, mirror, prism, or waveguide redirects light beams from the light-emitting member toward the proximal surface of the front lens, wherein rotation of the rotating lens, mirror, prism, or waveguide causes the light beams to hit the proximal surface of the front lens at different locations at different times, and wherein these light beams create virtual images in the person's field of view.

In an example, a single-eye portion of augmented reality eyewear can comprise: a front lens which is configured to be held in front of one of a person's eyes by an eyewear frame; a sidepiece (e.g. temple) of the eyewear frame; an image projector which is part of the sidepiece; and a rotating lens, mirror, prism, or waveguide which is part of the sidepiece, wherein the rotating lens, mirror, prism, or waveguide redirects light beams from the image projector toward the front lens, wherein rotation of the rotating lens, mirror, prism, or waveguide causes the light beams to hit the front lens at different locations at different times, and wherein these light beams create virtual images in the person's field of view.

In an example, a single-eye portion of augmented reality eyewear can comprise: a front lens which is configured to be held in front of one of a person's eyes by an eyewear frame; a sidepiece (e.g. temple) of the eyewear frame; an image projector which is part of the sidepiece; and a tilting lens, mirror, prism, or waveguide which is part of the sidepiece, wherein the tilting lens, mirror, prism, or waveguide redirects light beams from the image projector toward the front lens, wherein movement of the tilting lens, mirror, prism, or waveguide causes the light beams to hit the front lens at different locations at different times, and wherein these light beams create virtual images in the person's field of view. In an example, a single-eye portion of augmented reality eyewear can comprise: a front lens which is configured to be held in front of one of a person's eyes by an eyewear frame; a sidepiece (e.g. temple) of the eyewear frame; an image projector which is part of the sidepiece; and an oscillating lens, mirror, prism, or waveguide which is part of the sidepiece, wherein the oscillating lens, mirror, prism, or waveguide redirects light beams from the image projector toward the front lens, wherein movement of the oscillating lens, mirror, prism, or waveguide causes the light beams to hit the front lens at different locations at different times, and wherein these light beams create virtual images in the person's field of view.

In an example, a single-eye portion of augmented reality eyewear can comprise: a front lens which is configured to be held in front of one of a person's eyes by an eyewear frame; a sidepiece of the eyewear frame; an image projector which is part of the sidepiece; and a moving micromirror array, wherein the micromirror array redirects light beams from the image projector toward the front lens, wherein movement of the micromirror array causes the light beams to hit the front lens at different locations at different times, and wherein these light beams create virtual images in the person's field of view. In an example, a single-eye portion of augmented reality eyewear can comprise: a front lens which is configured to be held in front of one of a person's eyes by an eyewear frame; a sidepiece of the eyewear frame; a laser which is part of the sidepiece; and a moving micromirror array, wherein the micromirror array redirects light beams from the laser toward the front lens, wherein movement of the micromirror array causes the light beams to hit the front lens at different locations at different times, and wherein these light beams create virtual images in the person's field of view. Relevant variations and components discussed elsewhere in this disclosure or in priority-linked disclosures can also be applied to this example.

Figure 28:
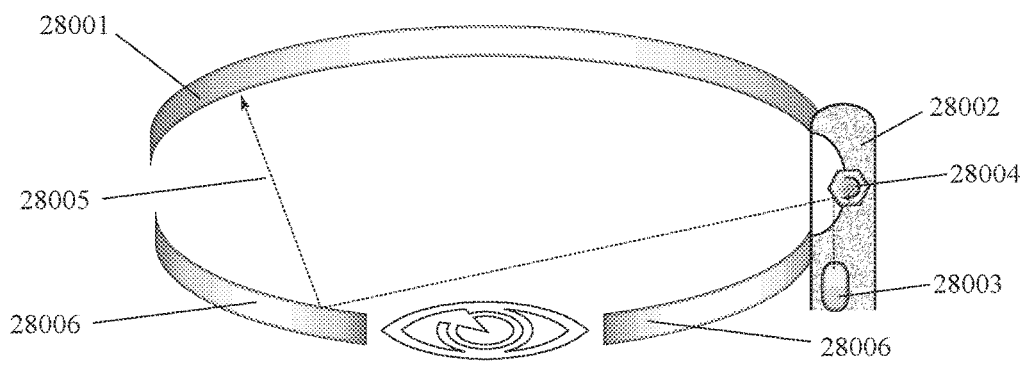
FIGS. 28 through 30 show sequential cross-sectional views of a single-eye portion with a rotating optical member and an annular proximal optical member.
Figure 29:
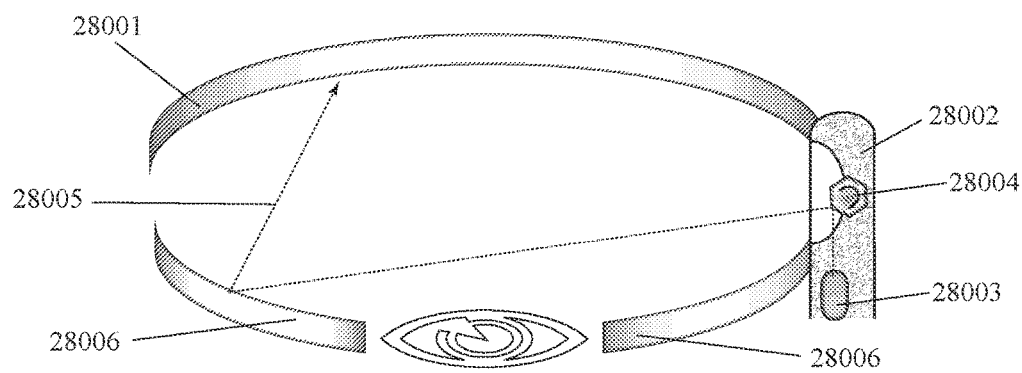
Figure 30:
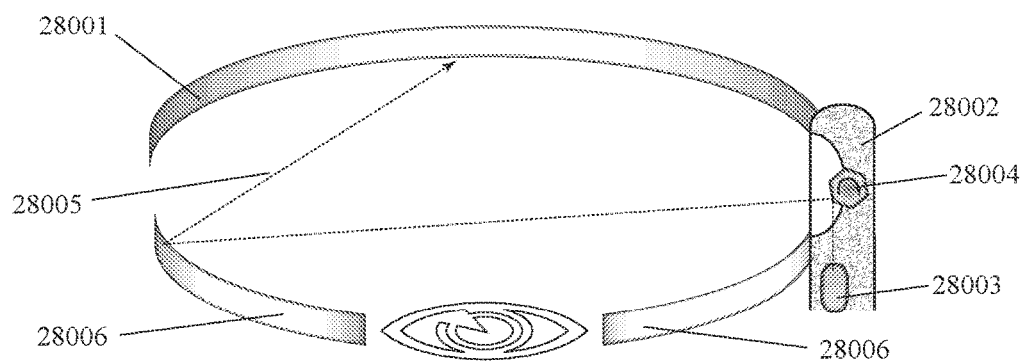

FIGS. 28 through 30 show three (sequential) top-down cross-sectional views an example of a single-eye portion of augmented reality eyewear which is like the one shown in FIGS. 25 through 27, except that it includes an annular proximal optical member (e.g. annular reflector) in addition to a distal front optical member (e.g. front lens). FIGS. 28, 29, and 30 show this example at a first point in time, a second point time, and a third point in time, respectively. In an example, augmented reality eyewear can comprise two such single-eye portions, one for each eye, to display augmented reality for both eyes. In an example, augmented reality eyewear can have such a portion for only eye, to display augmented reality for only one eye.

The example of a single-eye portion of augmented reality eyewear shown in FIGS. 28 through 30 comprises: a front optical member 28001 (e.g. front lens) which is configured to be held in front of one of a person's eyes by an eyewear frame, wherein the front optical member has a proximal surface which is configured to face the person's eye and a distal surface which is configured to face away from the person's eye; an annular reflector 28006 which (at least partially) encircles a space in front of the person's eye; a sidepiece 28002 (e.g. earpiece or "temple") of the eyewear frame; a light-emitting member 28003 (e.g. image projector) which is attached to (or part of) the sidepiece of the eyewear frame; and a moving optical member 28004 (e.g. moving lens, mirror, prism, or waveguide) which is attached to (or part of) the sidepiece of the eyewear frame, wherein the moving optical member redirects light beams 28005 from the light-emitting member toward the (distal surface of) the annular reflector and/or the (proximal surface of the) front optical member, and wherein these light beams create virtual images in the person's field of view. Relevant variations and components discussed elsewhere in this disclosure or in priority-linked disclosures can also be applied to this example.

In an example, a moving lens, mirror, prism, or waveguide can rotate, tilt, or oscillate. In an example, a moving lens, mirror, prism, or waveguide can move in multiple complete rotations in a clockwise or counter-clockwise manner. In an example, a moving lens, mirror, prism, or waveguide can be polygonal. In an example, a moving lens, mirror, prism, or waveguide can be convex. In an example, the annular reflector can be convex. In an example, an annular reflector can be a portion of a spherical mirror with a central opening or hole. In an example, the central opening can be centered on a central virtual vector.

In an example, a single-eye portion of augmented reality eyewear can comprise: a front lens which is configured to be held in front of one of a person's eyes by an eyewear frame, wherein the front lens has a proximal surface which is configured to face the person's eye and a distal surface which is configured to face away from the person's eye; a convex annular reflector which encircles a space in front of the person's eye; a sidepiece (e.g. "temple") of the eyewear frame; an image projector which is part of the sidepiece of the eyewear frame; and a moving lens, mirror, prism, or waveguide which redirects light beams from the image projector toward the annular reflector, wherein these light beams create virtual images in the person's field of view. In an example, the moving lens, mirror, prism, or waveguide can rotate, tilt, or oscillate.

In an example, augmented reality eyewear can comprise: an eyewear frame with a frontpiece which is configured to span a person's face and right and left sidepieces which are connect the front piece to the person's right and left ears, respectively; at least one front lens which is held by the frontpiece in front of one of the person's eyes; an annular reflector which is proximal (closer to the eye) relative to the front lens and is configured to at least partially encircle the person's eye; an image projector which is part of one of the sidepieces; and a moving lens, mirror, prism, or waveguide which redirects light beams from the image projector toward the annular reflector, wherein these light beams create virtual images in the person's field of view. In an example, the moving lens, mirror, prism, or waveguide can rotate, tilt, or oscillate. Relevant variations and components discussed elsewhere in this disclosure or in priority-linked disclosures can also be applied to this example.

FIG. 31 shows two sequential oblique views of an example of augmented reality eyewear with a movable arm which holds an image projector. The left side of FIG. 31 shows this eyewear at a first time wherein a moveable arm is in a first configuration, holding an image projector at a first location relative to a person's eye. The right side of FIG. 31 shows this eyewear at a second time wherein the moveable arm is in a second configuration, holding the image projector at a second location relative to the person's eye. In this example, augmented reality eyewear has one movable arm on one side of the eyewear. In an example, augmented reality eyewear can have two movable arms, one on each side (e.g. right and left) of eyewear.

The example of augmented reality eyewear shown in FIG. 31 comprises: an eyewear frame 31001; a light-emitting member (e.g. image projector) 31004; and a movable arm 31002 which holds the light-emitting member, wherein the moveable arm has a first configuration in which the moveable arm holds the light-emitting member at a first location and a second configuration in which the movable arm holds the light-emitting member at a second location, wherein beams of light 31005 from the light-emitting member create virtual images in the person's field of view when the light-emitting member is at the second location. In this example, a movable arm is moved from its first configuration to its second configuration by being pivoted around a hinge or joint 31003. In this example, a movable arm is generally aligned with a sidepiece of the eyewear frame in its first configuration and extends out in front of one of the person's eyes in its second configuration. Relevant variations and components discussed elsewhere in this disclosure or in priority-linked disclosures can also be applied to this example.

In an example, a light-emitting member can be an image projector. In an example, a light-emitting member can project collimated light. In an example, a light-emitting member can project coherent light. In an example, a light-emitting member can be a low-power laser or array of low-power lasers. In an example, a light-emitting member can project virtual objects (such as text or images) in a person's field of vision. In an example, a virtual object projected by one or more light-emitting members can be perceptually linked in physical location and/or position relative to a real environmental object in a person's field of vision. In an example, a virtual object can appear to be connected to an environmental object. A virtual object can appear to a viewer as being consistently on top of, adjacent to, or beneath an environmental object. In an example, a virtual object can be super-imposed over (i.e. shown in front of and/or occluding) an environmental object or sub-imposed under (i.e. shown behind and/or occluded by) an environmental object in a person's field of vision. In an example, a virtual object can appear to be moving with an environmental object when the environmental object moves. In an example, both a virtual object and an environmental object can appear to move together, relative to a person's field of vision, when the person moves their head.

In an example, a light-emitting member (e.g. image projector) can be selected from the group consisting of: light emitting diode (LED); liquid crystal display (LCD); liquid crystal on silicon (LCOS); and spatial light modulator (SLM). In an example, an annular image projector can further comprise a Digital Micromirror Device (DMD). In an example, a light-emitting member (e.g. image projector) can comprise one or more components selected from the group consisting of: active matrix organic light-emitting diode array, projector, or display; collimated light projector or display; digital micro-mirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix.

In an example, a movable arm can have a longitudinal axis with a generally-horizontal orientation (when worn by an upright person). In an example, a movable arm can move in a generally-horizontal plane (when worn by an upright person) as it moves from its first configuration to its second configuration. In an example, a movable arm can be connected to the sidepiece of an eyewear frame. In an example, the front portion (e.g. front end in its first configuration) of a movable arm can be connected to the sidepiece of an eyewear frame. In an example, a movable arm can be connected to the frontpiece of an eyewear frame. In an example, a movable arm can be connected to the corner of the front piece of an eyewear frame. In an example, the front portion (e.g. front end in its first configuration) of a movable arm can be connected to the frontpiece of an eyewear frame.

In an example, a movable arm which holds a light-emitting member can be moved from its first configuration to its second configuration by pivoting, tilting, swinging, or rotating around a hinge or joint. In an example, a moveable arm can be generally aligned with the sidepiece of an eyewear frame when the arm is in its first configuration. In an example, a moveable arm can pivot, tilt, swing, and/or rotate (around a hinge or joint) to a position in front of the sidepiece when the arm is in its second configuration. In an example, a movable arm can be soft, flexible, elastic, and/or compressible. In an example, a movable arm can bend or compress in response to external force. In an example, a movable arm can be moved manually from its first configuration to its second configuration (and vice versa) by a person wearing eyewear. In an example, a movable arm can be moved automatically from its first configuration to its second configuration (and vice versa) by an actuator which is part of the eyewear.

In an example, a movable arm can fit into a recess in the sidepiece of eyewear when the arm is in its first configuration. In an example, a movable arm can be temporarily locked, latched, snapped, or clicked into position in its first configuration. In an example, a movable arm can be temporarily locked, latched, snapped, or clicked into position in its second configuration. In an example, a portion of a movable arm can be reversibly attached to a portion of eyewear frame by a magnet, snap, pin, hook, button, clip, or hook-and-eye material. In an example, the dorsal portion (in its first configuration) of a movable arm can be reversibly attached to a portion of eyewear frame by a magnet, snap, pin, hook, button, clip, or hook-and-eye material. In an example, the front (and/or ventral) portion (in its first configuration) of a movable arm can be (permanently) attached to an eyewear frame by a hinge or joint and the rear (and/or dorsal) portion (in its first configuration) of a movable arm can be (reversibly) attached to the eyewear frame by a magnet, snap, pin, hook, button, clip, or hook-and-eye material.

In an example, a movable arm can have a longitudinal axis in a first vertical plane and a sidepiece (e.g. earpiece or "temple") of eyewear can have a longitudinal axis in a second vertical plane. In an example, (virtual extensions of) these first and second vertical planes can intersect in three-dimensional space, wherein this intersection forms a forward-facing angle. In an example, this angle can be in the range of 0 degrees to 20 degrees when the movable arm is in its first configuration. In an example, this angle can also be in the range of 0 degrees to 20 degrees when then movable arm is in its second configuration, but the angle can change and reach a maximum of 90-degrees as the movable arm is moved from its first configuration to its second configuration. In an example, this angle can be in the range of 40 degrees to 80 degrees when the movable arm is in its second configuration.

In an example, a light-emitting member is not in front of a person's eye when a movable arm is in its first configuration, but the light-emitting member is in front of the person's eye when the movable arm is in its second configuration. In an example, a light-emitting member can be between ⅛" and ½" in front of a person's eye when a movable arm is in its second configuration. In an example, a light-emitting member can be between ¼" and 1" in front of a person's eye when a movable arm is in its second configuration. In an example, a light-emitting member can be between ½" and 4" in front of a person's eye when a movable arm is in its second configuration. In an example, augmented reality eyewear comprises at least one lens in front of a person's eye. In an example, a light-emitting member can be between ⅛" and ½" in front of the lens when a movable arm is in its second configuration. In an example, a light-emitting member can be between ¼" and 1" in front of the lens when a movable arm is in its second configuration. In an example, a light-emitting member can be between ½" and 4" in front of the lens when a movable arm is in its second configuration.

In an example, a light-emitting member in its second location can shine light beams onto between 5% and 30% of the surface of a front lens of augmented reality eyewear. In an example, a light-emitting member in its second location can shine light beams onto between 25% and 50% of the surface of a front lens of augmented reality eyewear. In an example, a light-emitting member in its second location can shine light beams onto between 40% and 80% of the surface of a front lens of augmented reality eyewear. Relevant variations and components discussed elsewhere in this disclosure or in priority-linked disclosures can also be applied to this example.

FIG. 32 shows two sequential oblique views of another example of augmented reality eyewear with a movable arm which holds an image projector. This example is similar to the example shown in FIG. 31, except that the movable arm is generally aligned with the frontpiece of the eyewear when the movable arm is in its first configuration. The left side of FIG. 32 shows this eyewear at a first time wherein the moveable arm is in a first configuration, holding an image projector at a first location relative to a person's eye. The right side of FIG. 32 shows this eyewear at a second time wherein the moveable arm is in a second configuration, holding the image projector at a second location relative to the person's eye. In this example, augmented reality eyewear has one movable arm on one side of the eyewear. In an example, augmented reality eyewear can have two movable arms, one on each side (e.g. right and left) of eyewear.

The example of augmented reality eyewear shown in FIG. 32 comprises: an eyewear frame 32001; a light-emitting member (e.g. image projector) 32005; and an arcuate movable arm 32002 which holds the light-emitting member, wherein the arcuate moveable arm has a first configuration in which the arm holds the light-emitting member at a first location and a second configuration in which the arm holds the light-emitting member at a second location, wherein beams of light 32006 from the light-emitting member create virtual images in the person's field of view when the light-emitting member is at the second location. In this example, the arcuate movable arm is moved from its first configuration to its second configuration by being pivoted around at least one hinge or joint (32003 and 32004). In this example, an arcuate movable arm in its first configuration is generally aligned with the side of the portion of a frontpiece which surrounds a lens and extends out in front of one of the person's eyes in the arm's second configuration.

In an example, an arcuate movable arm can have a longitudinal axis which is in a generally-vertical plane (when the wearer is standing upright). In an example, an arcuate movable arm can be attached to the top of the portion of an eyewear frontpiece which surrounds a lens. In an example, an arcuate movable arm can be attached to the bottom of the portion of an eyewear frontpiece which surrounds a lens. In an example, upper and lower ends of an arcuate movable arm can be attached to the top and bottom, respectively, of the portion of an eyewear frontpiece which surrounds a lens. In an example, an arcuate movable arm can be U-shaped. In an example, an arcuate movable arm can have a shape which is a conic section. Relevant variations and components discussed elsewhere in this disclosure or in priority-linked disclosures can also be applied to this example.

FIG. 33 shows two sequential oblique views of another example of augmented reality eyewear with a movable arm which holds an image projector. This example is similar to the example shown in FIG. 32, except that the movable arm in its first configuration is generally aligned with the top of the portion of a frontpiece which surrounds a lens. The left side of FIG. 33 shows this eyewear at a first time wherein the moveable arm is in a first configuration, holding an image projector at a first location relative to a person's eye. The right side of FIG. 33 shows this eyewear at a second time wherein the moveable arm is in a second configuration, holding the image projector at a second location relative to the person's eye. In this example, augmented reality eyewear has one movable arm on one side of the eyewear. In an example, augmented reality eyewear can have two movable arms, one on each side (e.g. right and left) of eyewear.

The example of augmented reality eyewear shown in FIG. 33 comprises: an eyewear frame 33001; a light-emitting member (e.g. image projector) 33005; and an arcuate movable arm 33002 which holds the light-emitting member, wherein the arcuate moveable arm has a first configuration in which the arm holds the light-emitting member at a first location and a second configuration in which the arm holds the light-emitting member at a second location, wherein beams of light 33006 from the light-emitting member create virtual images in the person's field of view when the light-emitting member is at the second location. In this example, the arcuate movable arm is moved from its first configuration to its second configuration by being pivoted around at least one hinge or joint (33003 and 33004). In this example, an arcuate movable arm in its first configuration is generally aligned with the top of the portion of a frontpiece which surrounds a lens and extends out in front of one of the person's eyes in the arm's second configuration.

In an example, an arcuate movable arm can be attached to the right side of the portion of an eyewear frontpiece which surrounds a lens. In an example, an arcuate movable arm can be attached to the left side of the portion of an eyewear frontpiece which surrounds a lens. In an example, right and left ends of an arcuate movable arm can be attached to the right and left sides, respectively, of the portion of an eyewear frontpiece which surrounds a lens. In an example, an arcuate movable arm can be U-shaped. In an example, an arcuate movable arm can have a shape which is a conic section. Relevant variations and components discussed elsewhere in this disclosure or in priority-linked disclosures can also be applied to this example.

In an example, augmented reality eyewear can comprise a near-eye compound optical structure for see-through augmented reality using Volumetric Annular Photon Emission (VAPE) technology comprising a concave lens with a plurality of concentric annular sections (such as a Fresnel Lens) and an annular image projector, wherein the concave lens is within the central opening of the annular image projector. This VAPE technology can enable a person to see real objects in their environment and also projected virtual objects juxtaposed with the real objects, with minimal light loss for the projected virtual objects.

In an example, augmented reality eyewear can be embodied in a compound optical structure which enables see-through Augmented Reality (AR) comprising: (1) an annular image projector further comprising an array of light emitters, wherein this annular image projector projects images of virtual objects into a person's field of vision, wherein this annular image projector has a central opening, wherein the light emitters emit light rays into the central opening, and wherein this annular image projector is configured to span at least 75% of the circumference of a virtual circle around an near-eye area which is less than 6" in front of the person's eye; and (2) a concave lens (such as a Fresnel Lens) further comprising a plurality of concentric annular sections, wherein this concave lens is located in the central opening of annular image projector, wherein a proximal surface of the concave lens is configured to be closer to the person's eye and a distal surface of the concave lens is configured to be farther from the person's eye, wherein the distal surface receives light rays from the annular image projector and directs these light rays toward the person's eye, and wherein the distal surface receives light rays from the environment and transmits these light rays toward the person's eye.

Figure 34:
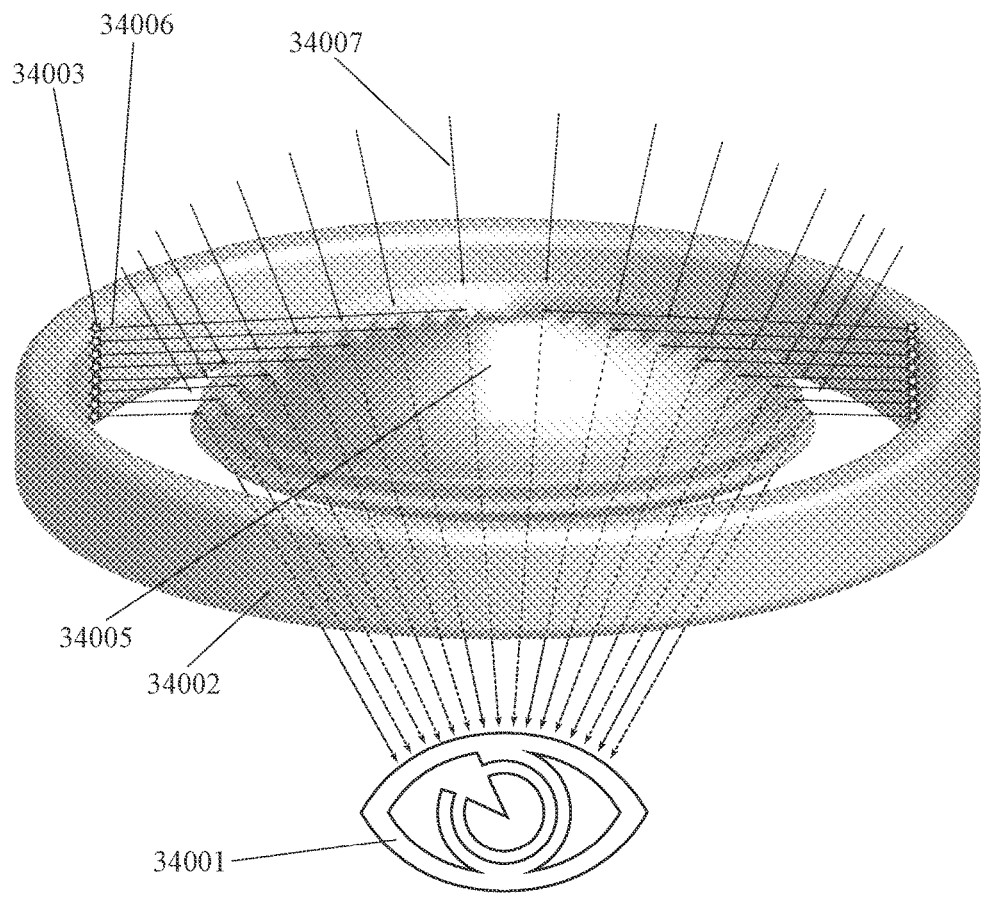
FIG. 34 shows a single-eye portion with an annular light projector and a Fresnel Lens.

FIG. 34 shows an example of a Volumetric Annular Photon Emission (VAPE) optical structure which enables see-through Augmented Reality (AR). FIG. 34 shows an oblique side view of a Volumetric Annular Photon Emission (VAPE) optical structure in front of an eye. In an example, augmented reality eyewear can comprise two such optical structures, one in front of each eye. In an example, such optical structures can be held in place by an eyewear frame, goggles, headset, helmet, or visor. The overall form of augmented reality eyewear can be selected from the group consisting of: augmented reality headset, electronically-functional glasses, eyeglasses, face mounted display, goggles, head mounted display, head worn display, heads up display, helmet, monocle, near eye display, pair of eyeglasses, prescription eyeglasses, see-through head-mounted display, smart glasses, sunglasses, and visor.

The Volumetric Annular Photon Emission (VAPE) optical structure shown in FIG. 34 is an optical structure which enables see-through Augmented Reality (AR) comprising: an annular image projector 34002 further comprising an array of light emitters (including 34003), wherein this annular image projector projects images of virtual objects into a person's field of vision, wherein this annular image projector has a central opening, wherein the light emitters emit light rays into the central opening, and wherein this annular image projector is configured to span at least 75% of the circumference of a virtual circle around an near-eye area which is less than 6" in front of the person's eye; and a concave lens 34005 (such as a Fresnel Lens) further comprising a plurality of concentric annular sections wherein this concave lens is located in the central opening of the annular image projector, wherein a proximal surface of the concave lens is configured to be closer to the person's eye and a distal surface of the concave lens is configured to be farther from the person's eye, wherein the distal surface receives light rays (such as 34006) from the annular image projector and directs these light rays through the lens toward the person's eye, wherein the distal surface also receives light rays (such as 34007) from the environment in front of the person's eye and transmits these light rays through the lens toward the person's eye 34001.

The compound optical structure in FIG. 34 can also be described as is an optical structure which enables see-through Augmented Reality (AR) comprising: an annular image projector 34002 which projects images of virtual objects into a person's field of vision, wherein this annular image projector is configured to span at least 75% of the circumference of a virtual circle around an near-eye area which is less than 6" in front of the person's eye, and wherein this annular image projector further comprises an array of light emitters (including 34003) which emit light rays in an radially-inward direction toward the near-eye area; and a concave lens 34005 comprised of a plurality of concentric annular sections, wherein this concave lens is located within the central opening of the annular image, wherein a distal surface of the lens is configured to be farther from the person's eye, wherein the distal surface of the concave lens comprised of concentric annular sections receives light rays (including 34006) from the annular image projector and directs these light rays toward the person's eye, wherein the distal surface of the concave lens also receives light rays (including 34007) from the environment in front of the person's eye and directs these light rays toward the person's eye 34001.

In FIG. 34, dotted-line arrows represent the paths of a subset of virtual object light rays (including 34006) emitted from the annular image projector and the paths of a subset of environmental light rays (including 34007) from the person's environment. Only a subset of the myriad of virtual object light rays and environmental light rays in a single cross-sectional plane are shown in this figure in order to avoid hopelessly cluttering the figure. Similarly, only a subset of light emitters (including 34003), in a single cross-sectional plane, are shown in this figure. It is to be understood that there are light emitters distributed around the (entire) circumference of the radially-inward surface of the annular image projector, not just those shown in a single cross-sectional plane. It is also to be understood that there are a myriad of virtual object light rays and environmental light rays in other cross-sectional planes (e.g. in other planes rotated around an axis connecting the centers of the concave lens and the annular image projector). Overall, the perspective shown in FIG. 34 shows the full volumes of the annular image projector 34002 and the concave lens 34005, but for the sake of diagrammatic clarity only shows a subset of light emitters and light rays in a single cross-sectional plane.

It is useful to follow the path of a single virtual object light ray 34006 in FIG. 34. Light ray 34006 starts when it is emitted from light emitter 34003 on the radially-inward surface of annular image projector 34002 and is directed in a radially-inward manner toward the (center of an) opening in the annular image projector. Then light ray 34006 hits the distal surface of concave lens 34005 and is directed through the lens toward the person's eye. In combination with other light rays from the annular image projector, light ray 34006 displays a virtual object in the person's field of vision. It is also useful to follow the path of a single environmental light ray 34007 in FIG. 34. Light ray 34007 from the environment enters the distal surface of concave lens 34005 and continues through the lens toward the person's eye. Finally, environmental light ray 34007 enters the person's eye.

In this example, virtual object light ray 34006 and environmental light ray 34007 travel toward the person's eye from the same location on the concave lens (and with the same transmission vector). Accordingly, virtual object light ray 34006 and environmental light ray 34007 combine in the person's field of vision. In an example, this can superimpose the image of a virtual object on the persons' view of their environment. Although this may cause the virtual object to be semi-transparent, there can be less loss of light in the projection of the virtual object image in this Volumetric Annular Photon Emission (VAPE) optical structure than in much of the prior art concerning see-through augmented reality.

In an example, a virtual object can be generated by a computer. A virtual object can be a computer-generated image which is not visible in a screen-independent environmental context with the naked eye, but does appears to a device-wearer in a screen-independent environmental context. In an example, a virtual object can be linked conceptually to an environmental object. In an example, a virtual object can comprise words, symbols, or graphics which convey information about a nearby environmental object.

In an example, a virtual object can be perceptually linked in physical location and/or position relative to a real environmental object in a person's field of vision. In an example, a virtual object can appear to be connected to an environmental object. A virtual object can appear to a viewer as being consistently on top of, adjacent to, or beneath an environmental object. In an example, a virtual object can be super-imposed over (i.e. shown in front of and/or occluding) an environmental object or sub-imposed under (i.e. shown behind and/or occluded by) an environmental object in a person's field of vision. In an example, a virtual object can appear to be moving with an environmental object when the environmental object moves. In an example, both a virtual object and an environmental object can appear to move together, relative to a person's field of vision, when the person moves their head.

In an example, the appearance of a virtual object can be changed to simulate its physical interaction with a physical environmental object. In an example, a virtual object can appear to be obscured by a physical object when the two objects meet. In an example, a virtual object can appear to come out of (or go into) a physical object. In an example, a virtual object can function as a virtual mouse and/or cursor to enable a person to interact with their environment in augmented reality. In an example, a person can select an environmental object by moving a virtual object (e.g. virtual mouse, cursor, or pointer) to the environmental object. In an example, a person can purchase an environmental object by moving a virtual object (e.g. virtual mouse, cursor, or pointer) to the environmental object.

In an example, an annular image projector can be a type of projector (or display) which is selected from the group consisting of: collimated light projector and/or display; ferroelectric liquid crystal on silicon (FLCOS) projector and/or display; holographic projector and/or display; light emitting diode (LED) projector and/or display; liquid crystal display (LCD); liquid crystal on silicon (LCOS) projector and/or display; microdisplay and/or microprojector; micromirror array; picodisplay and/or picoprojector; and spatial light modulator (SLM) projector and/or display.

In an example, an annular image projector (or display) can comprise a light-emitting ring, torus, cylinder, or disk with a central opening or hole. In an example, an annular image projector (or display) can comprise a light-emitting ring, torus, cylinder, or disk with a transparent central portion or core. In an example, an annular image projector can have a central opening, hole, or transparent core into which it projects light rays in a radially-inward manner. In an example, an annular image projector can have an outer diameter between 0.5" and 6." In an example, the width of a central opening, hole, or transparent core of an annular image projector can be between 0.5" and 5." In an example, the width of a central opening, hole, or transparent core in the middle of an annular image projector can be between 20% and 80% of the width of the annual light projector. In an example, a central opening, hole, or transparent core can have a circular perimeter.

In an example, an annular image projector can be located within 6" of a person's eye. In an example, an annular image projector can be located within 4" of a person's eye. In an example, an annular image projector can be centered around a point in space which is directly in front of the center of an eye lens. In an example, an annular image projector can have a proximal surface and a distal surface, wherein the proximal surface is configured to be closer to a person's eye and the distal surface is configured to be farther from the person's eye. In an example, the proximal surface of an annular image projector can be substantially parallel to the plane of an eye lens when a person is looking straight ahead.

In an example, an annular image projector (or display) can have a shape selected from the group consisting of: arcuate cylinder, arcuate ring, circle, ellipse, oval, and torus. In an example, an annular image projector can be continuous and uniformly arcuate. In an example, an annular image projector can be a continuous arcuate light-emitting ring which encircles a space in front of a person's eye. In an example, an annular image projector can comprise a continuous arcuate light-emitting torus which encircles a space in front of a person's eye. In an example, an annular image projector can comprise a continuous arcuate light-emitting cylinder which encircles a space in front of a person's eye. In an example, an annular image projector can comprise a continuous arcuate light-emitting disk with a hollow or transparent core which encircles a space in front of a person's eye.

In an example, an annular image projector (or display) can have a shape selected from the group consisting of: hexagon, octagon, and decagon. In an example, an annular image projector can be continuous, but be comprised of individual non-arcuate segments or sections. In an example, an annular image projector can have polygonal inner and/or outer perimeters. In an example, an annular image projector can be a continuous polygonal light-emitting ring which encircles a space in front of a person's eye. In an example, an annular image projector can comprise a continuous polygonal light-emitting torus which encircles a space in front of a person's eye. In an example, an annular image projector can comprise a continuous polygonal light-emitting cylinder which encircles a space in front of a person's eye. In an example, an annular image projector can comprise a circumferential series of arcuate light-emitting sections which encircles a space in front of a person's eye. In an example, an annular image projector can comprise a circumferential polygonal series of flat light-emitting sections which encircles a space in front of a person's eye.

In an example, an annular image projector can be discontinuous with a circumferential series of arcuate segments or sections. In an example, an annular image projector can be a light-emitting ring comprised of a circumferential series of arcuate projector sections with gaps and/or light barriers between them. In an example, an annular image projector can be a light-emitting torus comprised of a circumferential series of arcuate projector sections with gaps and/or light barriers between them. In an example, an annular image projector can be a light-emitting cylinder comprised of a circumferential series of arcuate projector sections with gaps and/or light barriers between them. In an example, a discontinuous annular image projector can comprise a circumferential series of four, six, or eight arcuate projector sections with gaps and/or light barriers between them. In an example, an annular image projector can comprise a circumferential array of ten or more arcuate projector sections.

In an example, an annular image projector can be discontinuous with a circumferential series of individually-flat segments or sections. In an example, an annular image projector can be a light-emitting polygonal ring comprised of a circumferential series of individually-flat projector sections with gaps and/or light barriers between them. In an example, an annular image projector can be a light-emitting polygonal torus comprised of a circumferential series of individually-flat projector sections with gaps and/or light barriers between them. In an example, an annular image projector can be a light-emitting polygonal cylinder comprised of a circumferential series of individually-flat projector sections with gaps and/or light barriers between them. In an example, a discontinuous annular image projector can comprise a circumferential series of four, six, or eight flat projector sections with gaps and/or light barriers between them. In an example, an annular image projector can comprise a circumferential array often or more flat projector sections.

In an example, an annular image projector can comprise a continuous arcuate light-emitting ring which curves around at least 75% of the circumference of a virtual circle around a space in front of a person's eye. In an example, an annular image projector can comprise a continuous arcuate light-emitting torus which curves around at least 75% of the circumference of a virtual circle around a space in front of a person's eye. In an example, an annular image projector can comprise a continuous arcuate light-emitting cylinder which curves around at least 75% of the circumference of a virtual circle around a space in front of a person's eye. In an example, an annular image projector can comprise a continuous polygonal light-emitting ring which curves around at least 75% of the circumference of a virtual circle around a space in front of a person's eye. In an example, an annular image projector can comprise a continuous polygonal light-emitting torus which curves around at least 75% of the circumference of a virtual circle around a space in front of a person's eye. In an example, an annular image projector can comprise a continuous polygonal light-emitting cylinder which curves around at least 75% of the circumference of a virtual circle around a space in front of a person's eye.

In an example, an annular image projector can have a shape selected from the group consisting of: arcuate cylinder arcuate ring, circle, ellipse, oval, polygonal cylinder polygonal ring, and torus. In an example, an annular image projector can comprise a circumferential series of arcuate light-emitting sections which encircle a space in front of a person's eye. In an example, an annular image projector can comprise a circumferential polygonal series of flat light-emitting sections encircles at least 75% of the circumference of a virtual circle around a space in front of a person's eye.

In an example, an annular image projector can completely encircle an area less than 6" in front of a person's eye. In an example, an annular image projector can encircle at least 75% of an area less than 6" in front of a person's eye. In an example, an annular image projector can encircle at least 66% of an area less than 6" in front of a person's eye. In an example, an annular image projector can comprise a continuous light-emitting arcuate ring, torus, circle, or cylinder. In an example, an annular image projector can comprise an array of light emitting segments or sections which together comprise a discontinuous light-emitting ring, torus, circle, or cylinder. In an example, light emitting segments or sections in a discontinuous annular array can each be arcuate. In an example, individual light emitting segments or sections in an annular array can be non-arcuate, but together they can comprise an annular ring, torus, circle, or cylinder. In an example, light emitting segments or sections in an annular array can be individually flat, but together can comprise segments or sections of an overall polygonal ring, torus, circle, or cylinder. In an example, an annular image projector can be a polygonal light projector composed of a series of individually-flat segments or sections wherein each flat segment or section projects a set of light rays in a radially-inward manner.

In an example, an annular image projector can further comprise an array of light emitters which emit light rays in a radially-inward manner toward an open or transparent center of the annular image projector. In an example, a light emitter can be an LED. In an example, a light emitter can emit collimated light. In an example, a light emitter can emit low-power coherent light. In an example, a light emitter can be a laser. In an example, a light emitter can be selected from the group consisting of: light emitting diode (LED); liquid crystal display (LCD); liquid crystal on silicon (LCOS); and spatial light modulator (SLM). In an example, an annular image projector can further comprise a Digital Micromirror Device (DMD).

In an example, an annular image projector can further comprise a circumferential array of light emitters which emit light rays in a radially-inward manner toward an open or transparent center of the annular image projector. In an example, an annular image projector can further comprise a ring of light emitters which emit light rays in a radially-inward manner toward an open or transparent center of the light projector. In an example, an annular image projector can further comprise a cylindrical array of inward-facing light emitters.

In an example an annular image projector can further comprise a circumferential array (or matrix) of light emitters with "Column" and "Row" coordinates. In an example, each light emitter in this array can have a "Column" coordinate expressed in compass degrees around the circumference of a virtual circle and a "Row" coordinate expressed in distance from (or number of rows from) the proximal surface of an annular image projector. In an example, a circumferential array of light emitters can have at least 10 Columns and at least 5 Rows. In an example, a circumferential array of light emitters can have at least 100 Columns and at least 50 Rows. In an example, a circumferential array of light emitters can have at least 1000 Columns and at least 500 Rows.

Conveying this same coordinate concept with different terminology, an annular image projector can further comprise a circumferential array (or matrix) of light emitters with "Degree" and "Depth" coordinates. In an example, each light emitter in this array can have a "Degree" coordinate which is expressed in compass degrees around the circumference of a virtual circle and a "Depth" coordinate which is expressed in distance from the proximal surface of the annular image projector. In an example, a circumferential array of light emitters can have at least 10 Degrees and at least 5 Depths. In an example, a circumferential array of light emitters can have at least 100 Degrees and at least 50 Depths. In an example, a circumferential array of light emitters can have at least 1,000 Degrees and at least 500 Depths.

In an example, a perimeter location on an annular image projector can be identified as "X degrees"—measured in compass degrees—relative to the circumference of a virtual circle around a space in front of a person's eye. In an example, a corresponding "X degrees" location can also be identified on the perimeter of a concave lens. In an example, light from a column of light emitters at "X degrees" on the annular image projector can hit the concave lens between the "X degree" location on the perimeter of the concave lens. In an example, light rays from light emitters on the right side of the annular image projector can be directed to hit the left side of the concave lens. In an example, light rays from light emitters on the left side of the annular image projector can be directed to hit the right side of the concave lens. In an example, a concave lens can have a central rotational axis which is coaxial with the central rotational axis of an annular image projector.

In an example, an annular image projector can be stationary. In an example, an annular image projector can move automatically. In an example, an annular image projector can be rotated around a concave lens. In an example, this device can further comprise an actuator which rotates an annular image projector around a concave lens. In an example, this device can further comprise an actuator which rotates an annular image projector around a concave lens, thereby changing the circumferential location which receives light rays from a selected array of light emitters on the projector. In an example, this device can further comprise one or more actuators which change the angles at which light rays are emitted from an annular image projector toward a concave lens.

In an example, a concave lens with a plurality of concentric annular sections can be a Fresnel Lens. In an example, a concave lens with a plurality of concentric annular sections can be a section of a sphere. In an example, a concave lens with a plurality of concentric annular sections can be a conic section. In an example, a concave lens with a plurality of concentric annular sections can be a spherical-section-shaped Fresnel Lens. In an example, a concave lens with a plurality of concentric annular sections can be a conic-section-shaped Fresnel Lens.

In an example, a concave lens can have a plurality of annular undulations. In an example, a concave lens can have a proximal-to-distal series of annular undulations. In an example, a concave lens can have a plurality of circumferential, concentric, and/or nested undulations. In an example, a concave lens can have a plurality of circumferential, concentric, and/or nested sinusoidal waves. In an example, a concave lens can have between 5 and 50 circumferential, concentric, and/or nested undulations. In an example, a concave lens can have between 10 and 100 circumferential, concentric, and/or nested undulations. In an example, a concave lens can have between 50 and 500 circumferential, concentric, and/or nested undulations.

In an example, a concave lens can have a plurality of annular undulations with equal widths and/or heights. In an example, a concave lens can have a plurality of annular undulations with proximal-to-distal variation in width and/or height. In an example, a concave lens can comprise a series of annular undulations, wherein proximal undulations have a smaller width or height and distal undulations have a larger width or height. In an example, a concave lens can comprise a series of annular undulations, wherein distal undulations have a smaller width or height and proximal undulations have a larger width or height. In an example, a concave lens can comprise a series of annular undulations, wherein central undulations have a smaller width or height and peripheral undulations have a larger width or height. In an example, a concave lens can comprise a series of annular undulations, wherein peripheral undulations have a smaller width or height and central undulations have a larger width or height.

In an example, the cross-sectional perimeter of a concave lens can have a plurality of annular undulations. In an example, the cross-sectional perimeter of a concave lens can have a plurality of circumferential, concentric, and/or nested undulations. In an example, the cross-sectional perimeter of a concave lens can have a plurality of circumferential, concentric, and/or nested sinusoidal waves. In an example, the cross-sectional perimeter of a concave lens can have between 5 and 50 circumferential, concentric, and/or nested undulations. In an example, the cross-sectional perimeter of a concave lens can have between 10 and 100 circumferential, concentric, and/or nested undulations. In an example, the cross-sectional perimeter of a concave lens can have between 50 and 500 circumferential, concentric, and/or nested undulations.

In an example, the cross-sectional perimeter of a concave lens can have a plurality of annular undulations with equal widths and/or heights. In an example, the cross-sectional perimeter of a concave lens can have a plurality of annular undulations with proximal-to-distal variation in width and/or height. In an example, the cross-sectional perimeter of a concave lens can comprise a series of annular undulations, wherein proximal undulations have a smaller width or height and distal undulations have a larger width or height. In an example, the cross-sectional perimeter of a concave lens can comprise a series of annular, wherein distal undulations have a smaller width or height and proximal undulations have a larger width or height.

In an example, a concave lens can have a plurality of annular serrations. In an example, a concave lens can have a proximal-to-distal series of annular serrations. In an example, a concave lens can have a plurality of circumferential, concentric, and/or nested serrations. In an example, a concave lens can have a plurality of circumferential, concentric, and/or nested sawtooth waves. In an example, a concave lens can have between 5 and 50 circumferential, concentric, and/or nested serrations. In an example, a concave lens can have between 10 and 100 circumferential, concentric, and/or nested serrations. In an example, a concave lens can have between 50 and 500 circumferential, concentric, and/or nested serrations.

In an example, a concave lens can have a plurality of annular serrations with equal widths and/or heights. In an example, a concave lens can have a plurality of annular serrations with proximal-to-distal variation in width and/or height. In an example, a concave lens can comprise a series of annular serrations, wherein proximal serrations have a smaller width or height and distal serrations have a larger width or height. In an example, a concave lens can comprise a series of annular serrations, wherein distal serrations have a smaller width or height and proximal serrations have a larger width or height. In an example, a concave lens can comprise a series of annular serrations, wherein central serrations have a smaller width or height and peripheral serrations have a larger width or height. In an example, a concave lens can comprise a series of annular serrations, wherein peripheral serrations have a smaller width or height and central serrations have a larger width or height.

In an example, the cross-sectional perimeter of a concave lens can have a plurality of annular serrations. In an example, the cross-sectional perimeter of a concave lens can have a plurality of circumferential, concentric, and/or nested serrations. In an example, the cross-sectional perimeter of a concave lens can have a plurality of circumferential, concentric, and/or nested sawtooth waves. In an example, the cross-sectional perimeter of a concave lens can have between 5 and 50 circumferential, concentric, and/or nested serrations. In an example, the cross-sectional perimeter of a concave lens can have between 10 and 100 circumferential, concentric, and/or nested serrations. In an example, the cross-sectional perimeter of a concave lens can have between 50 and 500 circumferential, concentric, and/or nested serrations.

In an example, the cross-sectional perimeter of a concave lens can have a plurality of annular serrations with equal widths and/or heights. In an example, the cross-sectional perimeter of a concave lens can have a plurality of annular serrations with proximal-to-distal variation in width and/or height. In an example, the cross-sectional perimeter of a concave lens can comprise a series of annular serrations, wherein proximal serrations have a smaller width or height and distal serrations have a larger width or height. In an example, the cross-sectional perimeter of a concave lens can comprise a series of annular serrations, wherein distal serrations have a smaller width or height and proximal serrations have a larger width or height.

In an example, there can be proximal-to-distal variation in the angles of annular serrations in a concave lens. In an example, the angles of proximal annular serrations relative to a central longitudinal axis of a lens can be a smaller than the angles of distal annular serrations. In an example, the angles of distal annular serrations relative to a central longitudinal axis of a lens can be a smaller than the angles of proximal annular serrations. In an example, the angles of annular serrations in the concave lens can be configured so that light rays from environmental objects hit the distal surface of the lens in a substantially perpendicular manner, but light rays from the image projector hit the distal surface of the lens at in a non-perpendicular manner. In an example, annular serrations in the concave lens can be configured so that light rays from environmental objects hit the lens in perpendicular manner, but light rays from the image projector hit the lens in a non-perpendicular manner.

In an example, annular sections of a concave lens with a plurality of annular sections can be continuous. In an example, annular sections of a concave lens with a plurality of annular sections can be discontinuous. In an example, annular sections of a concave lens with a plurality of annular sections can comprise rings of connected linear segments. In an example, annular sections of a concave lens can be polygonal rings. In an example, the annular sections of a concave lens can be continuous polygonal rings. In an example, annular sections of a concave lens can be discontinuous polygonal rings.

In an example, the configuration of a concave lens comprising a plurality of concentric annular sections can be changed, moved, and/or adjusted. In an example, the angles, widths, and/or heights of undulations or serrations in a concave lens comprising a plurality of concentric annular sections can be changed, moved, and/or adjusted. In an example, the angles, widths, and/or heights of undulations or serrations in a concave lens comprising a plurality of concentric annular sections can be changed, moved, and/or adjusted to adjust the display of projected virtual objects. In an example, the angles, widths, and/or heights of undulations or serrations in a concave lens comprising a plurality of concentric annular sections can be changed, moved, and/or adjusted to adjust the focal depth of projected virtual objects.

In an example, the angles, widths, and/or heights of undulations or serrations in a concave lens comprising a plurality of concentric annular sections can be changed, moved, and/or adjusted to adjust the relative brightness and/or dominance of environmental and virtual objects into a person's field of vision. In an example, a concave lens comprising a plurality of concentric annular sections can have a first configuration in which it only transmits light rays from the environment and a second configuration in which it only displays virtual objects. In an example, a concave lens can be changed from the first configuration to the second configuration, or vice versa, by changing, moving, and/or adjusting the angles, widths, and/or heights of annular undulations or serrations in the concave lens.

In an example, augmented reality eyewear can further comprise a radial array (or "spokes" or "fins") of light barriers between an annular image projector and a concave lens. In an example, a radial array of light barriers between an annular image projector and a concave lens can help to reduce optical "cross-talk" between light rays in different cross-sections of the optical structure. In an example, these light barriers can extend outward in a radial manner from a concave lens and/or inward in a radial manner from an annular image projector—like paddles on a paddle wheel, fins or slots on a roulette wheel, or teeth on a gear. In an example, a radial array of light barriers between an annular image projector and a concave lens can create optically-isolated paired sections of the annular image projector and concave lens. In an example, a radial array of light barriers between an annular image projector and a concave lens can help reduce optical "cross-talk" between paired sections of an annular image projector and a concave lens.

In an example, augmented reality eyewear can comprise a radial array of 5-10 light barriers between an annular image projector and a concave lens. In an example, augmented reality eyewear can comprise 5-10 light barriers which are circumferentially distributed around a concave lens between it and an annular image projector. In an example, augmented reality eyewear can comprise a radial array of ten or more light barriers between an annular image projector and a concave lens. In an example, augmented reality eyewear can comprise ten or more light barriers which are circumferentially distributed around a concave lens between it and an annular image projector.

In an example, a concave lens with a plurality of concentric annular sections can be made from one or more materials selected from the group consisting of: polycarbonate, glass, photopolymer, photorefractive, crystal, polyacrylate, acrylic, polyvinyl alcohol, indium tin oxide, silver, polypyrrole, acetate, neoprene, polypropylene oxide, carbon, polymethyl methacrylate, polyvinylidene difluoride, carbon nanotubes, parylene, polyimide, silicon, polyethylene naphtalate, silicone, dichromated gelatin, silicon nitride, ethylene tetrafluoroethylene, silicon oxide, polyethylene terephthalate, gallium nitride, tantalum oxide, polyethylene oxide, polytetrafluoroethylene, Mylar™, polyurethane, polyvinylpyrrolidone, polyaniline, graphene, polytetramethylene oxide, silver alloy, polyamide, and silver halide emulsion.

In an example, augmented reality eyewear can further comprise one or more optical components selected from the group consisting of: spatial light modulator, light guide, wave guide, birefringent material, thin-film transistor, compound lens, and diffraction grating. In an example, augmented reality eyewear can further comprise one or more optical components selected from the group consisting of: diffraction optical element array, reflection holographic optical element, directional diffuser, etched waveguide, and fiber optics. In an example, augmented reality eyewear can include a local power source. In an example, augmented reality eyewear can include a battery. In an example, augmented reality eyewear can further comprise include one or more sensors selected from the group consisting of: inertial motion sensor, accelerometer, gyroscope, GPS module, inclinometer, magnetometer, impedance sensor, permittivity sensor, resistance sensor, microphone, sound sensor, thermal energy sensor, ambient light sensor, air pressure sensor, and humidity sensor.

In an example, augmented reality eyewear can further comprise an eye tracker (such as an optical sensor) which tracks the position and/or focal direction of a person's eye. In an example, eye tracking can enable control of a virtual object based on movement of a person's eye. In an example, eyewear can further comprise a frame-mounted camera which tracks the movement and focal direction of a person's eye. In an example, augmented reality eyewear can further comprise one or more optical components selected from the group consisting of: light channel, reflection holographic volume grating, spatial filter, optoelectric lens, beam splitter, and polarizing beam splitter. In an example, augmented reality eyewear can further comprise one or more optical components selected from the group consisting of: light-transmitting nanotube, optical waveguide, metal oxide semiconductor, prism, and micro-mirror array.

In an example, augmented reality eyewear can further comprise a haptic computer-to-human interface. In an example, such eyewear can include a vibrating member, buzzer, roller, or electrical pulse generator which sends vibrations or electrical pulses to a person's body. In an example, such eyewear can further comprise an auditory computer-to-human interface. In an example, such eyewear can include an ear phone, headset, and/or speaker. In an example, such eyewear can communicate with the wearer by generating voice messages, tones, alarms, songs, or other auditory stimuli. In an example, this eyewear can further comprise one or more components selected from the group consisting of: battery or other power source; data processing unit; data transmitter; and data receiver. Example variations discussed elsewhere in this disclosure or in priority-linked disclosures are not repeated here to avoid redundancy, but can be applied where relevant to the example shown in these figures.

In an example, augmented reality eyewear can comprise: a front piece of eyewear which is configured to span the front of a person's face; a front optical member which is configured to be held by the front piece of the eyewear in front of (at least) one of the person's eyes, within 6" of the person's eye, wherein light rays from environmental objects exit the dorsal surface of the front optical member toward the person's eye; a side piece of the eyewear which is configured to span from the front piece to one of the person's ears; wherein a ventral vector points toward space in front of the person's head, a dorsal vector points toward space behind the person's head, an upward vector points toward space above the person's head when the person is standing upright, and a downward vector points toward space below the person's head when the person is standing upright; wherein a ventral-to-dorsal axis (e.g. "x axis") is the virtual line which best fits the centers of a ventral-to-dorsal series of vertical cross-sections of the side piece from its ventral end to its ventral-to-dorsal midpoint; wherein a lower-to-upper axis (e.g. "y axis") is substantially perpendicular to the ventral-to-dorsal axis of the side piece and has a substantially lower-to-upper orientation; a first light emitter on the side piece at a first location with a first ventral-to-dorsal coordinate (x1) measured along the ventral-to-dorsal longitudinal axis (or a line parallel to it) and a first lower-to-upper coordinate (y1) measured along a lower-to-upper axis, wherein light rays emitted from the first light emitter are directed onto the front optical member, and wherein light rays emitted from the first light emitter create a portion of a virtual image in the person's field of vision; and a second light emitter on the side piece at a second location with a second ventral-to-dorsal coordinate (x2) measured along the ventral-to-dorsal longitudinal axis (or a line parallel to it) and a second lower-to-upper coordinate (y2) measured along a lower-to-upper axis, wherein light rays emitted from the second light emitter are directed onto the front optical member, wherein light rays emitted from the second light emitter create a portion of a virtual image in the person's field of vision; and wherein the second ventral-to-dorsal coordinate (x2) is more dorsal than the first ventral-to-dorsal coordinate (x1).

In an example, a front optical member can be a lens. In an example, a side piece can be an eyewear arm (or "temple"). In an example, a light emitter can be an image projector. In an example, an image projector can project light rays onto the dorsal surface of a lens. In an example, augmented reality eyewear with at least one image projector on an eyewear arm can comprise: a front piece of eyewear which is configured to span the front of a person's face; a front lens which is configured to be held by the front piece of the eyewear in front of (at least) one of the person's eyes, within 6" of the person's eye, wherein light rays from environmental objects exit the dorsal surface of the front lens toward the person's eye; an arm of the eyewear which is configured to span from the front piece to one of the person's ears; wherein a ventral vector points toward space in front of the person's head, a dorsal vector points toward space behind the person's head, an upward vector points toward space above the person's head when the person is standing upright, and a downward vector points toward space below the person's head when the person is standing upright; wherein a ventral-to-dorsal axis (e.g. "x axis") is the virtual line which best fits the centers of a ventral-to-dorsal series of vertical cross-sections of the arm from its ventral end to its ventral-to-dorsal midpoint; wherein a lower-to-upper axis (e.g. "y axis") is substantially perpendicular to the ventral-to-dorsal axis of the arm and has a substantially lower-to-upper orientation; a first image projector on the arm at a first location with a first ventral-to-dorsal coordinate (x1) measured along the ventral-to-dorsal longitudinal axis (or a line parallel to it) and a first lower-to-upper coordinate (y1) measured along a lower-to-upper axis, wherein light rays emitted from the first image projector are directed onto the dorsal surface of the front lens, and wherein light rays emitted from the first image projector create a portion of a virtual image in the person's field of vision; and a second image projector on the arm at a second location with a second ventral-to-dorsal coordinate (x2) measured along the ventral-to-dorsal longitudinal axis (or a line parallel to it) and a second lower-to-upper coordinate (y2) measured along a lower-to-upper axis, wherein light rays emitted from the second image projector are directed onto the dorsal surface of the front lens, wherein light rays emitted from the second image projector create a portion of a virtual image in the person's field of vision; and wherein the second ventral-to-dorsal coordinate (x2) is more dorsal than the first ventral-to-dorsal coordinate (x1). Relevant variations and components discussed elsewhere in this disclosure or in priority-linked disclosures can also be applied to this example.

In an example, a front piece of eyewear can comprise: a "bridge" which spans a person's nose; and "eye wires" which directly hold at least one front optical member in front of at least one of the person's eyes. In an example, a front piece can hold two front optical members. In an example, a front piece can hold a right front optical member in front of a person's right eye and a left front optical member in front of the person's left eye. In an example, a front piece can hold a single (arcuate) front optical member in front of both of a person's eyes. In an example, a front piece can completely encircle the perimeter of a front optical member. In an example, a front piece can span only a portion of the perimeter of a front optical member.

In an example, a front optical member can be a lens. In an example, a front optical member can be a convex lens. In an example, a front optical member can be a concave lens. In an example, a front optical member can be a prescription lens. In an example, a front optical member can be a Fresnel lens. In an example, a front optical member can be a compound lens. In an example, a front optical member can comprise a micro-lens array. In an example, a front optical member can be solid. In an example, a front optical member can be hollow or fluid-filled. In an example, a front optical member can further comprise a plurality of wave guides or micro-prisms.

In an example, a front optical member can have an arcuate vertical cross-sectional perimeter. In an example, a front optical member can have a vertical cross-sectional perimeter with a shape selected from the group consisting of: circle, oval, ellipse, pear-shape, conic-section, rounded rectangle, and rounded trapezoid. In an example, a front optical member can have an aspherical shape. In an example, a front optical member can have a three-dimensional shape which is a section (or slice) of a sphere, ovaloid, or ellipsoid. In an example, a front optical member can be planoconvex. In an example, a front optical member can be planoconcave.

In an example, the ventral surface of a front optical member can receive light rays from the environment (in front of a person) and transmit these light rays through its dorsal surface to the person's eye. In an example, a front optical member can selectively filter or transmit light rays in a selected wavelength range to the person's eye. In an example, a front optical member can be a semi-reflective lens. In an example, a front optical member can be semi-transparent. In an example, a front optical member can be a (partial) one-way mirror. In an example, a front optical member can have a reflective coating on its ventral surface. In an example, a front optical member can have a reflective coating on its dorsal surface. In an example, a front optical member can be semi-transparent. In an example, the dorsal surface of a front optical member can partially reflect beams of light from one or more image projectors towards the person's eye. In an example, a front optical member can reflect light rays in a selected wavelength range towards the person's eye.

In an example, the centroid of a front optical member can be held by an eyewear front piece between ¼" and 2" from a person's eye. In an example, the centroid of a front optical member can be between ½" and 4" from a person's eye. In an example, the maximum vertical-cross-sectional diameter of a front optical member can be between 1" and 3". In an example, the maximum vertical-cross-sectional diameter of a front optical member can be between 2" and 6". In an example, the maximum width of a front optical member can be between ¹⁄₃₂" and ¼". In an example, the maximum width of a front optical member can be between ⅛" and 1". In an example, there can be a separate front optical member in front of each eye in augmented reality eyewear. In an example, a single front optical member can span both eyes in augmented reality eyewear.

In an example, a front optical member can be made from polycarbonate material. In an example, a front optical member can have multiple layers or coatings comprised of different materials. In an example, a front optical member can be made from one or more materials selected from the group consisting of: polycarbonate, glass, photopolymer, photorefractive, crystal, polyacrylate, acrylic, polyvinyl alcohol, indium tin oxide, silver, polypyrrole, acetate, neoprene, polypropylene oxide, carbon, polymethyl methacrylate, polyvinylidene difluoride, carbon nanotubes, parylene, polyimide, silicon, polyethylene naphtalate, silicone, dichromated gelatin, silicon nitride, ethylene tetrafluoroethylene, silicon oxide, polyethylene terephthalate, gallium nitride, tantalum oxide, polyethylene oxide, polytetrafluoroethylene, polyurethane, polyvinylpyrrolidone, polyaniline, graphene, polytetramethylene oxide, silver alloy, polyamide, and silver halide emulsion.

In an example, a side piece (e.g. arm) of this eyewear can be called an eyewear arm (or "temple"). In an example, a side piece (e.g. arm) can span from the front piece of eyewear back to a person's ear. In an example, eyewear can comprise two side pieces (e.g. arms), a one on the right side of a person's head and the other one on the left side of the person's head. In an example, there can be an array of light emitters (e.g. image projectors) along only one side piece (e.g. only along a right side piece or a left side piece). In an example, there can be arrays of light emitters (e.g. image projectors) along both side pieces (e.g. along both right and left side pieces).

In an example, a dorsal portion of a side piece (e.g. arm) can rest on a person's ear and a ventral portion of the side piece (e.g. arm) can connect to the front piece of eyewear. In an example, a side piece (e.g. arm) can be connected to the front piece of this eyewear by a hinge or joint. In an example, side and front pieces of eyewear can be side and front portions, respectively, of a single continuous piece of material. In an example, the dorsal portion of a side piece (e.g. arm) can curve around the rear of a person's ear. In an example, a side piece (e.g. arm) can further connect to a rear loop which spans the dorsal surface of a person's head. In an example, a right side piece (e.g. arm) can continue past a person's ear to curve around the dorsal surface of a person's head and then connect to the left side piece (e.g. arm).

In an example, a side piece (e.g. arm) can be made from a metal, a polymer, or a combination of a metal and a polymer. In an example, a side piece can be flexible. In an example, the dorsal portion (end) of a side piece can be more flexible than the ventral portion (end) of the side piece. In an example, a side piece can have one or more hollow sections which contain optical and/or electronic members. In an example, a side piece can have one or more openings on its side which faces toward the surface of a person's head. In an example, a side piece can have a ventral-to-dorsal array of light emitters (e.g. image projectors) along its side which faces toward the surface of a person's head.

In an example, an eyewear side piece (e.g. arm) can have a ventral-to-dorsal axis (e.g. "x axis") which is the virtual line which best fits the centers of a ventral-to-dorsal series of vertical cross-sections of the side piece from its ventral end to its ventral-to-dorsal midpoint. This axis can be used to more-precisely specify the locations of light emitters in an array of light emitters (e.g. image projectors) which are distributed, in a ventral to dorsal manner, along a side piece. In this disclosure, the ventral-to-dorsal axis is defined by fitting it to only the front half of the side piece because an array of light emitters tends to be distributed primarily along the front half of the side piece. Further, fitting the ventral-to-dorsal axis in this manner reduces the chances of a downward dorsal tilt due to a portion of the side piece possibly curving down around the dorsal surface of a person's ear. In an example, this ventral-to-dorsal axis can be substantially horizontal when a person wearing the eyewear is standing upright. In an example, an eyewear side piece (e.g. arm) can also have a lower-to-upper axis (e.g. "y axis") which is substantially perpendicular to the ventral-to-dorsal axis of the side piece and has a substantially lower-to-upper orientation. In an example, a lower-to-upper axis can be substantially vertical when a person wearing the eyewear is standing upright.

In an example, a side piece (e.g. arm) can have a ventral-to-dorsal length in the range of 3" to 10." In an example, a side piece (e.g. arm) can have a ventral-to-dorsal length in the range of 4" to 7." In an example, a side piece (e.g. arm) can have a lower-to-upper height in the range of ⅛" to 3." In an example, a side piece (e.g. arm) can have a lower-to-upper height in the range of ⅛" to 1." In an example, a ventral portion of a side piece can have a greater height than a dorsal portion of the side piece. In an example, the height of a side piece can generally decrease as one moves in a dorsal direction along its ventral-to-dorsal axis. In an example, a (ventral-to-dorsal) mid-section of a side piece can have a greater height than either its ventral end or its dorsal end.

In an example, a side piece (e.g. arm) can have a (right-to-left) thickness in the range of ⅛" to 3." In an example, a side piece (e.g. arm) can have a (right-to-left) thickness in the range of ⅛" to 1." In an example, a ventral portion of a side piece can have a greater thickness than a dorsal portion of the side piece. In an example, the thickness of a side piece can decrease as one moves in a dorsal direction along its ventral-to-dorsal axis. In an example, a (ventral-to-dorsal) mid-section of a side piece can have a greater thickness than either its ventral end or its dorsal end.

In an example, the ventral half of a side piece can be substantially straight. In an example, the centers of a ventral-to-proximal series of vertical cross sections along the ventral half of a side piece can be substantially aligned with its ventral-to-proximal axis. In an example, the ventral half of a side piece can be arcuate. In an example, the ventral half of a side piece can have one or more undulations and/or waves. In an example, the ventral half of a side piece can have a sinusoidal undulation and/or wave. In an example, the ventral half of a side piece can have an inward-outward (or right-left) sinusoidal undulation. In an example, the ventral half of a side piece can have an upward-downward sinusoidal undulation. In an example, a (ventral-to-dorsal) mid-portion of a side piece of an augmented reality eyewear frame can bow outward (further from the surface of a person's head) so that light emitters (e.g. image projectors) along this mid-portion can have a less-obstructed light projection pathway to a front optical member (e.g. lens).

In an example, a side piece (e.g. arm) can bifurcate. In an example, a side piece (e.g. arm) can bifurcate in a dorsal-to-ventral direction. In an example, an upper ventral bifurcation branch of an eyewear side piece (e.g. arm) can connect to an upper portion of an eyewear front piece and a lower ventral bifurcation branch of an eyewear side piece (e.g. arm) can connect to a lower portion of an eyewear front piece. In an example, there can be at least two light emitters (e.g. image projectors) on a bifurcating side piece (e.g. arm), including an upper light emitter on an upper bifurcation branch and a lower light emitter on a lower bifurcation branch. In an example, the ventral end of an eyewear side piece (e.g. arm) can have an expanded width section which extends (part of the way to a person's nose bridge) over a portion of the upper surface of an eyewear front piece. In an example, there can be at least one light emitter (e.g. image projector) on this expanded width section which projects light rays down onto the front optical member (e.g. lens).

In an example, a side piece can further comprise at least one inward-facing protrusion, projection, bump, bulge, ridge, wing, and/or wedge which extends inward from the main body of a side piece toward the surface of a person's head, wherein there are one or more light emitters (e.g. image projectors) on this inward-facing protrusion, projection, bump, bulge, ridge, wing, and/or wedge. In an example, there can be one or more light emitters (e.g. image projectors) on the ventral (forward-facing) surface of an inward-facing protrusion, projection, bump, bulge, ridge, wing, and/or wedge on a side piece. In an example, a side piece can have a single inward-facing protrusion, projection, bump, bulge, ridge, wing, and/or wedge on which light emitters are located. In an example, a side piece can have two or more inward-facing protrusions, projections, bumps, bulges, ridges, and/or wedges on which light emitters are located.

In an example, at least one inward-facing protrusion, projection, bump, bulge, ridge, wing, and/or wedge can be located on the ventral half (e.g. front half) of a side piece. In an example, at least one inward-facing protrusion, projection, bump, bulge, ridge, wing, and/or wedge can be located on the ventral quarter (e.g. front quarter) of a side piece. In an example, an inward-facing protrusion, projection, bump, bulge, ridge, wing, and/or wedge can be arcuate. In an example, an inward-facing protrusion, projection, bump, bulge, ridge, wing, and/or wedge can be a three-dimensional structure comprised of multiple polygons. In an example, an inward-facing protrusion, projection, bump, bulge, ridge, wing, and/or wedge on a side piece can have a shape selected from the group consisting of: hemispherical or other portion of a sphere; hemi-cylindrical or other portion of a cylinder; sinusoidal wave; wedge or frustum; trapezoid; rounded rectangle or cube; and conic section.

In an example, a protrusion, projection, bump, bulge, ridge, wing, and/or wedge on a side piece can be rigid. In an example, a protrusion, projection, bump, bulge, ridge, wing, and/or wedge on a side piece can be flexible, compressible, and/or soft. In an example, a protrusion, projection, bump, bulge, ridge, wing, and/or wedge on a side piece can be made from foam. In an example, a protrusion, projection, bump, bulge, ridge, wing, and/or wedge on a side piece can be inflatable. In an example, the size and/or shape of a protrusion, projection, bump, bulge, ridge, wing, and/or wedge on a side piece can be adjusted by a pneumatic or hydraulic mechanism. In an example, the size and/or shape of a protrusion, projection, bump, bulge, ridge, wing, and/or wedge on a side piece can be adjusted by an electromagnetic actuator.

In an example, a light emitter can be an image projector. In an example, a light emitter can project collimated light. In an example, a light emitter can project coherent light. In an example, a light emitter can be a low-power laser. In an example, a light emitter (e.g. image projector) can be selected from the group consisting of: low-power (e.g. nano-watt) laser; Light Emitting Diode (LED); Organic Light Emitting Diode (OLED); collimated light projector; digital micro-mirror projector; digital pixel element; diode laser; ferroelectric liquid crystal on silicon element; holographic optical element; holographic projector; transmission holographic optical element; micro-display element; active matrix organic light-emitting diode; and passive matrix light-emitting diode. In an example, a light emitter (e.g. image projector) can be accompanied by (or further comprise) a Digital Micromirror Device (DMD) or Spatial Light Modulator (SLM).

In an example, a light emitter can project virtual objects (such as text or images) in a person's field of vision. In an example, a first light emitter can project a first portion of a virtual object and a second light emitter can project a second portion of a virtual object. In an example, a first light emitter can project a first virtual object (at a first apparent distance from the person) and a second light emitter can project a second virtual object (at a second apparent distance from the person).

In an example, a virtual object projected by one or more light emitters can be perceptually linked in physical location and/or position relative to a real environmental object in a person's field of vision. In an example, a virtual object can appear to be connected to an environmental object. A virtual object can appear to a viewer as being consistently on top of, adjacent to, or beneath an environmental object. In an example, a virtual object can be super-imposed over (i.e. shown in front of and/or occluding) an environmental object or sub-imposed under (i.e. shown behind and/or occluded by) an environmental object in a person's field of vision. In an example, a virtual object can appear to be moving with an environmental object when the environmental object moves. In an example, both a virtual object and an environmental object can appear to move together, relative to a person's field of vision, when the person moves their head.

In an example, there can be a ventral-to-dorsal array of light emitters (e.g. image projectors) along a side piece of augmented reality eyewear. In an example, a first light emitter can have a first location along a side piece and a second light emitter can have a second location along a side piece, wherein the second location is more dorsal than the first location. In an example, a first light emitter can have a first location along a central ventral-to-dorsal axis of a side piece and a second light emitter can have a second location along a central ventral-to-dorsal axis of a side piece, wherein the second location is more dorsal than the first location.

In an example, beams of light from a first light emitter (e.g. image projector) in a ventral-to-dorsal array of light emitters on a side piece can be directed onto a first portion of a front optical member (e.g. lens) and beams of light from a second light emitter in a ventral-to-dorsal array of light emitters on a side piece can be directed onto a second portion of the front optical member (e.g. lens). In an example, the first light emitter can have a more-ventral location along the side piece and the second light emitter can have a more-dorsal location along the side piece. In an example, a second light emitter can be dorsal relative to a first light emitter.

In an example, the first portion of a front optical member (e.g. lens) can be closer to the nose bridge of a front piece and the second portion of the front optical member (e.g. lens) can be farther from the nose bridge of the front piece. In an example, a more-ventral light emitter can project images onto a portion of a lens which is closer to a nose bridge and a more-dorsal light emitter can project images onto a portion of a lens which is farther from a nose bridge. In an alternative example, the first portion of a front optical member (e.g. lens) can be more farther from the nose bridge of a front piece and the second portion of the front optical member (e.g. lens) can be closer to the nose bridge of the front piece. In an example, a more-ventral light emitter can project images onto a portion of a lens which is farther from a nose bridge and a more-dorsal light emitter can project images onto a portion of a lens which is closer to a nose bridge.

In an example, light beams from a first light emitter (e.g. image projector) in an array of light emitters on a side piece can be directed toward a central portion of a front optical member (e.g. lens) and light beams from a second light emitter can be directed toward a (right, left, lower, or upper) peripheral portion of the front optical member. In an example, light beams from a first light emitter (e.g. image projector) in an array of light emitters on a side piece can be directed toward a right-side portion of a front optical member (e.g. lens) and light beams from a second light emitter can be directed toward a left-side portion of the front optical member. In an example, light beams from a first light emitter (e.g. image projector) in an array of light emitters on a side piece can be directed toward an upper portion of a front optical member (e.g. lens) and light beams from a second light emitter can be directed toward a lower portion of the front optical member. In an example, different light emitters in an array of light emitters can project overlapping and/or concentric light patterns onto a front optical member.

In an example, a light emitter (e.g. image projector) on a side piece can project beams of light toward a front optical member (e.g. lens) at a selected ventral-facing angle relative to the ventral-to-dorsal axis of the side piece. In an example, a first light emitter (e.g. image projector) on a side piece can project beams of light toward a front optical member (e.g. lens) at a selected ventral-facing first angle relative to the ventral-to-dorsal axis of the side piece and a second light emitter (e.g. image projector) on the side piece can project beams of light toward the front optical member (e.g. lens) at a selected ventral-facing second angle relative to the ventral-to-dorsal axis of the side piece. In an example, the first light emitter can have a more-ventral location along the side piece and the second light emitter can have a more-dorsal location along the side piece. In an example, a second light emitter can be dorsal relative to a first light emitter.

In an example, a more-ventral light emitter (e.g. image projector) on a side piece can project beams of light toward a front optical member (e.g. lens) at a first ventral-facing angle relative to the ventral-to-dorsal axis of the side piece and a more-dorsal light emitter (e.g. image projector) on a side piece can project beams of light toward a front optical member (e.g. lens) at a second ventral-facing angle relative to the ventral-to-dorsal axis of the side piece, wherein the second angle is smaller than the first angle. In an example, the first angle can be within the range of 20 to 90 degrees and the second angle can be in the range of 5 to 30 degrees. In an example, the first angle can be within the range of 45 to 120 degrees and the second angle can be in the range of 10 to 45 degrees. In an example, the first angle can be within the range of 60 to 150 degrees and the second angle can be in the range of 20 to 80 degrees. In an alternative example, the second angle can be larger than the first angle.

In an example, a light emitter (e.g. image projector) on a side piece can be located at a distance from a front optical member (e.g. lens) within a range of ¼" to 1." In an example, a light emitter (e.g. image projector) on a side piece can be located at a distance from a front optical member (e.g. lens) within a range of ¾" to 3." In an example, a light emitter (e.g. image projector) on a side piece can be located at a distance from a front optical member (e.g. lens) within a range of 2" to 5." In an example, the average distance of an array of light emitters on a side piece from a front optical member (e.g. lens) can be within a range of ¼" to 1." In an example, the average distance of an array of light emitters on a side piece from a front optical member (e.g. lens) can be within a range of ¾" to 3." In an example, the average distance of an array of light emitters on a side piece from a front optical member (e.g. lens) can be within a range of 2" to 5."

In an example, there can be multiple light emitters along the same lower-to-upper axis of a side piece. In an example, there can be a first number of light emitters along a more-ventral lower-to-upper axis of a side piece and a second number of light emitters along a more-dorsal lower-to-upper axis of a side piece, wherein the first number is greater than the second number. In an example, the density or proximity of light emitters in a ventral-to-dorsal array of light emitters on a side piece can be greater in a ventral portion of the side piece than in a dorsal portion of the side piece. In an example, the density or proximity of light emitters in a ventral-to-dorsal array of light emitters on a side piece can decrease as one moves along the side piece in a dorsal direction. In an example, the density or proximity of light emitters in an array of light emitters on a side piece can be greatest in a ventral-to-dorsal mid-portion of the side piece. In an example, the density or proximity of light emitters in an array of light emitters on a side piece can be greatest in the ventral half of the side piece. In an example, the density or proximity of light emitters in an array of light emitters on a side piece can be greatest in the ventral quartile of the side piece. In an example, the density or proximity of light emitters in an array of light emitters on a side piece can be greatest in the second ventral-to-dorsal quartile of the side piece.

In an example, different light emitters in an array of light emitters on a side piece of augmented reality eyewear can differ in one or more attributes selected from the group consisting of: location (e.g. x coordinate) of light emitter along a ventral-to-proximal axis of the side piece; location (e.g. y coordinate) of light emitter along a lower-to-upper axis of the side piece; number of light emitters along the lower-to-upper axis of the side piece on which the light emitter is located; proximity of closest other light emitter in array; (average) forward-facing angle with respect to ventral-to-dorsal axis of side piece at which light beams are directed from the light emitter toward a front optical member; right vs. left location on a front optical member onto which beams of light from light emitter are directed; central vs. peripheral location on a front optical member onto which beams of light from light emitter are directed; apparent distance of virtual object projected by light emitter as seen by the person; focal distance of image projected from light emitter; coherence and/or collimation of light from the light emitter; wavelength, spectrum, and/or color of light emitted; power or intensity of light from the light emitter; variation, timing, and/or duration of light over time from light emitter (e.g. in a sequence of light emissions); and presence (and type) of intermediate optical member (e.g. mirror, lens, prism, or waveguide) between light emitter and front optical member.

In an example, a first light emitter in an array can have a first location (e.g. x coordinate) along a ventral-to-proximal axis of the side piece and a second light emitter in the array can have a second location (e.g. x coordinate) along the ventral-to-proximal axis, wherein the second location is more dorsal than the first location. In an example, a first light emitter in an array can have a first location (e.g. y coordinate) along a lower-to-upper axis of the side piece and a second light emitter in the array can have a second location (e.g. y coordinate) along the lower-to-upper axis, wherein the second location is higher than the first location. In an example, a first light emitter in an array can have a first distance to the closest other light emitter in the array and a second light emitter in the array can have a second distance to the closest other light emitter in the array, wherein the second distance is greater than the first distance. In an example, a first light emitter in an array can have a first (average) forward-facing angle with respect to ventral-to-dorsal axis of side piece at which light beams are directed from the light emitter toward a front optical member and a second light emitter in the array can have a second (average) such forward-facing angle, wherein the second angle is less than the first angle.

In an example, a first light emitter in an array can have a first location on a front optical member onto which its beams of light are directed and a second light emitter in the array can have a second location on a front optical member onto which its beams of light are directed, wherein the first location is farther left than the second location. In an example, a first light emitter in an array can have a first location on a front optical member onto which its beams of light are directed and a second light emitter in the array can have a second location on a front optical member onto which its beams of light are directed, wherein the first location is farther right than the second location. In an example, a first light emitter in an array can have a first location on a front optical member onto which its beams of light are directed and a second light emitter in the array can have a second location on a front optical member onto which its beams of light are directed, wherein the first location is closer to the nose bridge than the second location. In an example, a first light emitter in an array can have a first location on a front optical member onto which its beams of light are directed and a second light emitter in the array can have a second location on a front optical member onto which its beams of light are directed, wherein the first location is farther from the nose bridge than the second location.

In an example, a first light emitter in an array can have a first location on a front optical member onto which its beams of light are directed and a second light emitter in the array can have a second location on a front optical member onto which its beams of light are directed, wherein second location is more central to the lens than the first location. In an example, a first light emitter in an array can project a first virtual object with a first apparent distance as seen by the person and a second light emitter in the array can project a second virtual object with a second apparent distance as seen by the person, wherein the second distance is greater than the first distance. In an example, a first light emitter in an array can project images with a first focal distance and a second light emitter in the array can project images with a second focal distance, wherein the second distance is greater than the first distance.

In an example, a first light emitter in an array can project light with a first degree of coherence and/or collimation and a second light emitter in the array can project light with a second degree of coherence and/or collimation, wherein the second degree is greater than the first degree. In an example, a first light emitter in an array can emit light with a first wavelength, spectrum, and/or color and a second light emitter in the array can emit light with a second wavelength, spectrum, and/or color. In an example, a first light emitter in an array can emit light with a first level of power or intensity and a second light emitter in the array can emit light with a second level of power or intensity, wherein the second level is greater than the first level.

In an example, a first light emitter in an array can emit light with a first variation, timing, and/or duration (e.g. in a sequence of light emissions) and a second light emitter in the array can emit light with a second variation, timing, and/or duration. In an example, a first light emitter in an array can have a first type or configuration of intermediate optical member (e.g. mirror, lens, prism, or waveguide) between it and a front optical member, but a second light emitter in the array can have a second type or configuration of intermediate optical member (e.g. mirror, lens, prism, or waveguide) between it and a front optical member.

In an example, beams of light from a plurality of light emitters (e.g. image projectors) can intersect or overlap before they reach the dorsal surface of the front optical member (e.g. lens). In an example, virtual images created by a plurality of light emitters can intersect or overlap in a person's field of vision. In an example, the intersection or overlapping of different virtual images can create the illusion of virtual objects being at different distances. In an example, the intersection or overlapping of different virtual images can create virtual objects with different levels of brightness, clarity, or resolution. In an example, coherent beams of light from a plurality of light emitters can intersect or overlap to create interference patterns which, in turn, create three-dimensional holographic images in a person's field of vision.

In an example, beams of light from a light emitter (e.g. image projector) can hit between 5% and 30% of the dorsal surface area of a front arcuate optical member. In an example, beams of light from a light emitter can hit between 25% and 50% of the dorsal surface area of a front arcuate optical member. In an example, beams of light from a light emitter can hit between 40% and 80% of the dorsal surface area of a front arcuate optical member. In an example, beams of light from a light emitter can span the entire dorsal surface area of a front arcuate optical member. In an example, beams of light from an array of light emitters can hit between 5% and 30% of the dorsal surface area of a front arcuate optical member. In an example, beams of light from an array of light emitters can hit between 25% and 50% of the dorsal surface area of a front arcuate optical member. In an example, beams of light from an array of light emitters can hit between 40% and 80% of the dorsal surface area of a front arcuate optical member. In an example, beams of light from an array of light emitters can span the entire dorsal surface area of a front arcuate optical member.

In an example, the ventral-to-dorsal position of a light emitter (e.g. image projector) on an eyewear side piece can be moved (e.g. adjusted). In an example, the ventral-to-dorsal position of a light emitter (e.g. image projector) on an eyewear side piece can be moved along a ventral-to-dorsal track or channel. In an example, the ventral-to-dorsal position of a light emitter (e.g. image projector) on an eyewear side piece can be moved (e.g. adjusted) manually. In an example, the ventral-to-dorsal position of a light emitter (e.g. image projector) on an eyewear side piece can be moved (e.g. adjusted) by an electromagnetic actuator. In an example, the ventral-to-dorsal position of a light emitter (e.g. image projector) on an eyewear side piece can be moved (e.g. adjusted) by a hydraulic or pneumatic mechanism. In an example, the ventral-to-dorsal position of a light emitter (e.g. image projector) on an eyewear side piece can be automatically adjusted.

In an example, the distance of a light emitter from the main body of an eyewear side piece can be adjusted. In an example, the distance of a light emitter from the main body of an eyewear side piece can be adjusted manually. In an example, the distance of a light emitter from the main body of an eyewear side piece can be adjusted by an electromagnetic actuator. In an example, the distance of a light emitter from the main body of an eyewear side piece can be adjusted by a hydraulic or pneumatic mechanism. In an example, the distance of a light emitter from the main body of an eyewear side piece can be automatically adjusted.

In an example, the ventral-facing angle of beams of light projected from a light emitter (e.g. image projector) on an eyewear side piece can be adjusted. In an example, the ventral-facing angle of beams of light projected from a light emitter (e.g. image projector) on an eyewear side piece can be adjusted manually. In an example, the ventral-facing angle of beams of light projected from a light emitter (e.g. image projector) on an eyewear side piece can be adjusted by an electromagnetic actuator. In an example, the ventral-facing angle of beams of light projected from a light emitter (e.g. image projector) on an eyewear side piece can be adjusted by a hydraulic or pneumatic mechanism. In an example, the ventral-facing angle of beams of light projected from a light emitter (e.g. image projector) on an eyewear side piece can be automatically adjusted.

In an example, the focal distance of beams of light projected from an image projector on an eyewear side piece can be adjusted. In an example, the focal distance of beams of light projected from an image projector on an eyewear side piece can be adjusted manually. In an example, the focal distance of beams of light projected from an image projector on an eyewear side piece can be adjusted by an electromagnetic actuator. In an example, the focal distance of beams of light projected from an image projector on an eyewear side piece can be adjusted by a hydraulic or pneumatic mechanism. In an example, the focal distance of beams of light projected from an image projector on an eyewear side piece can be automatically adjusted.

In an example, a light emitter (e.g. image projector) on a side piece can be accompanied by (or further comprise) a side lens, mirror, prism, or waveguide which is also on the side piece. In an example, there can be one or more side lenses, mirrors, prisms, or waveguides between a light emitter (e.g. image projector) on a side piece and a front optical member (e.g. front lens). In an example, light beams from a light emitter can pass through a side lens, prism, or waveguide before they reach a front optical member (e.g. front lens). In an example, light beams from a light emitter can be reflected by a side mirror (or mirror array) before they reach a front optical member (e.g. front lens).

In an example, a light emitter (e.g. image projector) on a side piece can be accompanied by (or further comprise) a moving side lens, mirror, prism, or waveguide which is also on the side piece. In an example, light beams from a light emitter can pass through a moving side lens, prism, or waveguide before they reach a front optical member (e.g. front lens). In an example, light beams from a light emitter can be reflected by a moving side mirror (or mirror array) before they reach a front optical member (e.g. front lens). In an example, a light emitter (e.g. image projector) on a side piece can be accompanied by (or further comprise) a rotating or oscillating side lens, mirror, prism, or waveguide which is also on the side piece. In an example, light beams from a light emitter can pass through a rotating or oscillating side lens, prism, or waveguide before they reach a front optical member (e.g. front lens). In an example, light beams from a light emitter can be reflected by a rotating or oscillating side mirror (or mirror array) before they reach a front optical member (e.g. front lens).

In an example, augmented reality eyewear can further comprise a side optical member (such as a side lens, mirror, prism, or waveguide) on a side piece which redirects beams of light from one or more light emitters in an array of light emitters on the side piece. In an example, a side optical member can be an arcuate lens. In an example, a side optical member can be a mirror which redirects beams of light from a light emitter (e.g. image projector). In an example, a side optical member can be an arcuate or flat mirror. In an example, a side optical member can be an array of mirrors. In an example, a side optical member can be a Digital Micromirror Device (DMD). In an example, a side optical member can be a prism which guides beams of light from a light emitter (e.g. image projector). In an example, a side optical member can be an arcuate or polygonal prism. In an example, a side optical member can be a waveguide which guides beams of light from a light emitter (e.g. image projector). In an example, a side optical member can be an arcuate or polygonal waveguide.

In an example, a side optical member (e.g. side lens, mirror, prism, or waveguide) can be stationary relative to a light emitter. In an example, a side optical member can be selectively moved relative to a light emitter (e.g. image projector) in order to selectively adjust the redirection of beams of light from the light emitter onto the front optical member (e.g. front lens). In an example, a side optical member can be moved continuously (and repeatedly) in order to scan beams of light from a light emitter back and forth over the dorsal surface of a front optical member. In an example, a side optical member can be rotated continuously and repeatedly in order to scan beams of light from a light emitter back and forth over the dorsal surface of a front optical member.

In this example, only one side of augmented eyewear can have a light emitter. In this example, only a right or left side lens of augmented eyewear can display virtual images. In this example, the left and right sides of augmented reality eyewear can be asymmetric. In another example, both the left and right sides of augmented reality eyewear can have light emitters. In another example, both right side and left side lenses of augmented eyewear can display virtual images. In another example, augmented reality eyewear can have left and right side symmetry.

In an example, augmented reality eyewear can further comprise one or more components selected from the group consisting of: accelerometer; battery or other power supply; camera; compass; data processing unit; data receiver; data transceiver; data transmitter; display screen; EEG sensor; electromagnetic actuator; electromagnetic energy emitter; sensor and/or camera for tracking eye movement; finger-activated button or switch; gyroscope; memory; motion sensor (e.g. combination of accelerometer and gyroscope); outward-facing light; pressure sensor; speaker; spectroscopy sensor; and vibrating element.

In an example, one or more operations of augmented reality eyewear can be adjusted based on a person's eye movement as detected by an eye movement tracker which is part of the eyewear. In an example, an operation of augmented reality eyewear which is adjusted based on a person's eye movement can be selected from the group consisting of: angle of light beams from one or more light emitters; coherence of light beams from one or more light emitters; focal distance of a virtual object created in a person's field of vision; polarization of light beams from one or more light emitters; power or intensity of light beams from one or more light emitters; and wavelength, spectrum, and/or color of light beams from one or more light emitters. Relevant variations and components discussed in the preceding introduction section can be applied to the figures which follow, but are not repeated in the narratives accompanying each of the figures in order to avoid redundant and duplicative content in this disclosure.

Figure 35:
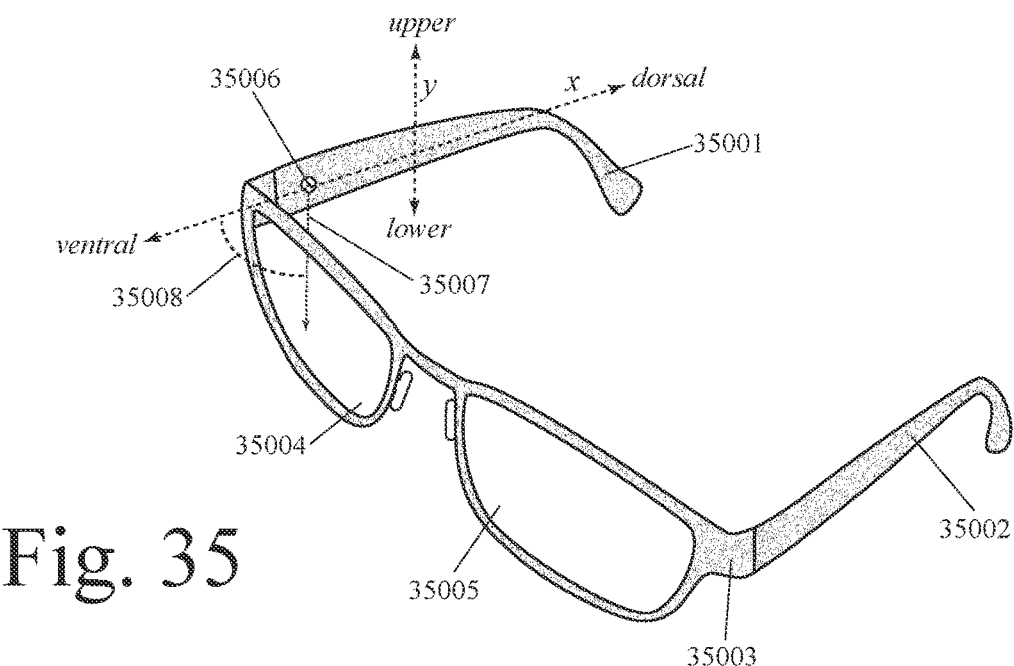
FIG. 35 shows the angle between the ventral-to-dorsal axis of an eyewear arm and a beam of light projected from a light emitter on the arm.

FIG. 35 shows an oblique side view of an example of augmented reality eyewear. With respect to components, FIG. 35 shows: an eyewear front piece 35003 (e.g. comprising "eye wires" and a "nose bridge") which holds two front optical members 35004 and 35005 (e.g. right and left front lenses); two side pieces 35001 and 35002 (e.g. right and left side "arms" or "temples") connected to the front piece; and a light emitter 35006 (e.g. a virtual image projector) on one of the side pieces which projects beams of light 35007 onto the dorsal surface of one of the front optical members. FIG. 35 also shows an eyewear frame with a front piece which holds two lenses and is connected to right side and left side arms, wherein there is an image projector on one of the arms which projects light beams onto one of the lenses. These light beams create a virtual image in the person's field of view.

A ventral vector (or the ventral direction) can be defined as pointing toward space which is in front of a person's head. A dorsal vector (or the dorsal direction) can be defined as pointing toward space which is behind a person's head. An upward vector (or upward direction) can be defined as pointing toward space which is above a person's head when the person is upright. A downward vector (or downward direction) can be defined as pointing toward space which is below a person's head when the person is upright.

FIG. 35 also shows how ventral-to-dorsal and lower-to-upper axes can be defined for a side piece of augmented reality eyewear. These axial definitions are used to more-precisely specify the configurations of example embodiments which follow in subsequent figures. The ventral-to-dorsal axis (e.g. "x axis") can be defined for an eyewear side piece as the virtual line which best fits the centers of a ventral-to-dorsal series of vertical cross-sections of the side piece from its ventral end to its ventral-to-dorsal midpoint (e.g. along the "front half" of the side piece). A lower-to-upper axis (e.g. "y axis") can be defined for an eyewear side piece as a virtual line which is substantially perpendicular to the ventral-to-dorsal axis of the side piece and has a substantially lower-to-upper orientation.

FIG. 35 also shows how a ventral-facing angle 35008 can be defined for a beam of light which is projected from a light emitter on a side piece. The ventral-facing angle for such a beam of light is the ventral-facing angle (in two-dimensional space) between the beam of light and the ventral-to-dorsal axis of the side piece.

In this example, only one side piece of this eyewear has a light emitter and virtual images are only displayed in one eye. In this example, the left side and the right side of this eyewear are asymmetric. In another example, both the left slide piece and the right side piece of augmented reality eyewear can have light emitters and virtual images can be displayed in both eyes. In another example, augmented reality eyewear can have left side and right side symmetry.

Figure 36:
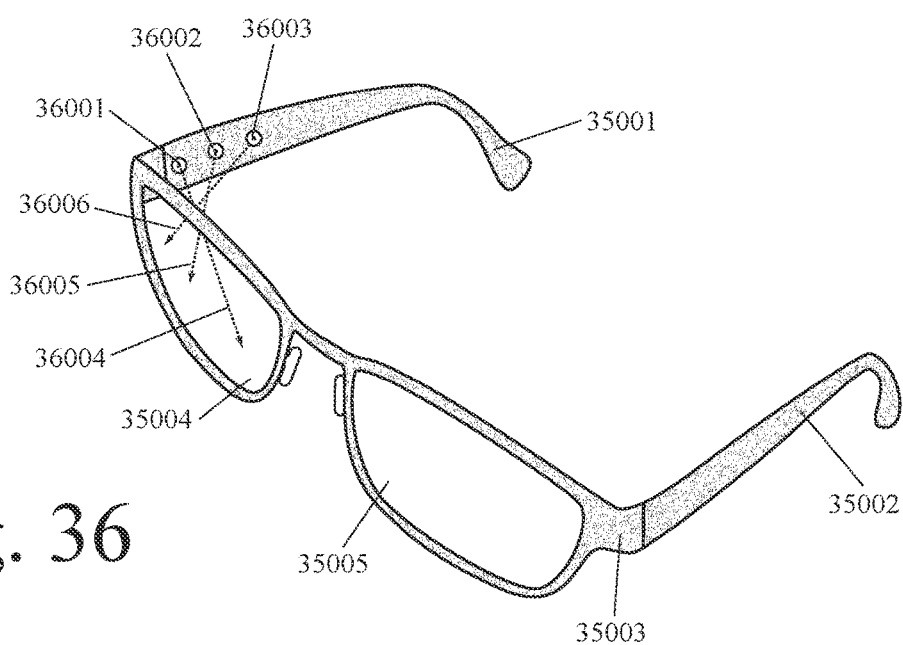
FIG. 36 shows eyewear with a ventral-to-dorsal array of light emitters with central-to-side, respectively, projection beam destinations.

FIG. 36 shows an example of augmented reality eyewear comprising: a front piece 35003 of eyewear which is configured to span the front of a person's face; a front optical member 35004 which is configured to be held by the front piece of the eyewear in front of (at least) one of the person's eyes, wherein light rays from environmental objects exit the dorsal surface of the front optical member toward the person's eye; a side piece 35001 of the eyewear which is configured to span from the front piece to one of the person's ears; a first light emitter 36001 on the side piece at a first location with a first ventral-to-dorsal coordinate (x1) measured along the ventral-to-dorsal longitudinal axis (or a line parallel to it) and a first lower-to-upper coordinate (y1) measured along a lower-to-upper axis, wherein light rays 36004 emitted from the first light emitter are directed onto the front optical member, and wherein light rays emitted from the first light emitter create a portion of a virtual image in the person's field of vision; and a second light emitter 36002 on the side piece at a second location with a second ventral-to-dorsal coordinate (x2) measured along the ventral-to-dorsal longitudinal axis (or a line parallel to it) and a second lower-to-upper coordinate (y2) measured along a lower-to-upper axis, wherein light rays 36005 emitted from the second light emitter are directed onto the front optical member, wherein light rays emitted from the second light emitter create a portion of a virtual image in the person's field of vision; and wherein the second ventral-to-dorsal coordinate (x2) is more dorsal than the first ventral-to-dorsal coordinate (x1).

In an example, a front piece can further comprise "eye wires" and a "nose bridge." In an example, a front optical member can be a front lens. In an example, a side piece can be an eyewear "arm" or "temple." In an example, a light emitter can be an image projector. In an example, an image projector can project light rays onto the dorsal surface of a lens. FIG. 36 also shows an example of augmented reality eyewear comprising: a front piece of eyewear; a front lens which is configured to be held by the front piece of the eyewear in front of (at least) one of the person's eyes; an arm (or "temple") which is configured to span from the front piece to one of the person's ears; a first image projector on the arm at a first location, wherein light rays from the first image projector are directed onto the dorsal surface of a front optical member, and wherein these light rays create a portion of a virtual image in the person's field of vision; and a second image projector on the arm at a second location, wherein light rays from the second image projector are directed onto the dorsal surface of a front optical member, and wherein these light rays create a portion of a virtual image in the person's field of vision, and wherein the second location is more dorsal than the first location.

The example in FIG. 36 further comprises: a third light emitter 36003 on the side piece at a third (more dorsal) location, wherein light rays 36006 emitted from the third light emitter create a portion of a virtual image in the person's field of vision; a second (e.g. left side) side piece 35002 of the eyewear; and a second (e.g. left side) front optical member 35005. In this example, only one side piece (e.g. the right side piece) of this eyewear has a light emitter and virtual images are only displayed in one eye (e.g. the right eye). In this example, the left and right sides of this eyewear are asymmetric. In another example, both the left and right side pieces of augmented reality eyewear can have light emitters and virtual images can be displayed in both the left and right eyes. In another example, augmented reality eyewear can have left side and right side symmetry.

In an example, a front optical member can be selected from the group consisting of: convex lens; concave lens; prescription lens; Fresnel lens; compound lens; micro-lens array; semi-reflective lens; one-way mirror; semi-transparent lens; spherical lens; planoconcave lens; planoconvex lens; and wavelength-filtering lens. In an example, an eyewear side piece (e.g. "arm" or "temple") can span from an eyewear front piece to the back of a person's ear. In an example, an eyewear side piece (e.g. "arm" or "temple") can further span from one ear to the other ear around the back of a person's head. In an example, a light emitter (e.g. image projector) can be selected from the group consisting of: low-power (e.g. nano-watt) laser; Light Emitting Diode (LED); Organic Light Emitting Diode (OLED); collimated light projector; digital micro-mirror projector; digital pixel element; diode laser; ferroelectric liquid crystal on silicon element; holographic optical element; holographic projector; transmission holographic optical element; micro-display element; active matrix organic light-emitting diode; and passive matrix light-emitting diode. In an example, a light emitter (e.g. image projector) can be accompanied by (or further comprise) a Digital Micromirror Device (DMD) or Spatial Light Modulator (SLM).

In the example shown in FIG. 36, there is a ventral-to-dorsal array of light emitters, 36001, 36002, and 36003, (e.g. image projectors) along a side piece of augmented reality eyewear. In this example, a first light emitter 36001 has a first location along a side piece and a second light emitter 36002 has a second location along the side piece, wherein the second location is more dorsal than the first location. In this example, beams of light 36004 from first light emitter 36001 (e.g. image projector) in a ventral-to-dorsal array of light emitters on a side piece are directed onto a first portion of a front optical member (e.g. lens) and beams of light 36005 from second light emitter 36002 in the ventral-to-dorsal array of light emitters are directed onto a second portion of the front optical member. In this example, the second light emitter 36002 is dorsal relative to the first light emitter 36001. In this example, the first portion of the front optical member (e.g. lens) is closer to the nose bridge of a front piece and the second portion of the front optical member is farther from the nose bridge. In this example, a more-ventral light emitter 36001 projects images onto a portion of a lens which is closer to a nose bridge and a more-dorsal light emitter 36002 projects images onto a portion of the lens which is farther from the nose bridge.

There can be a trade off in the location of a light emitter along the ventral-to-dorsal axis of the side piece of augmented reality eyewear. A more-ventral location for a light emitter can offer less obstruction of the projection path of beams of light from the light emitter (e.g. image projector) to a front optical member (e.g. a front lens). However, a more-dorsal location for a light emitter can offer a closer-to-perpendicular incidence angle of beams of light from the light emitter (e.g. image projector) projected onto the dorsal surface of a front optical member (e.g. a front lens). A ventral-to-dorsal array of light emitters along a side piece can be a good configuration which provides the best of both locations. One or more ventral light emitters in this array can project light onto portion of a lens which is closer to the nose bridge and one or more dorsal light emitters in this array can project light onto a portion of the lens which is farther from the nose bridge.

FIG. 36 shows how a more-ventral light emitter (e.g. image projector) on a side piece can project beams of light toward a front optical member (e.g. lens) at a first ventral-facing angle relative to the ventral-to-dorsal axis of the side piece and a more-dorsal light emitter (e.g. image projector) on a side piece can project beams of light toward a front optical member (e.g. lens) at a second ventral-facing angle relative to the ventral-to-dorsal axis of the side piece, wherein the second angle is smaller than the first angle. In an example, the first angle can be within the range of 20 to 90 degrees and the second angle can be in the range of 5 to 30 degrees. In an example, the first angle can be within the range of 45 to 120 degrees and the second angle can be in the range of 10 to 45 degrees. In an example, the first angle can be within the range of 60 to 150 degrees and the second angle can be in the range of 20 to 80 degrees. In an alternative example, the second angle can be larger than the first angle.

The example of augmented reality eyewear shown in FIG. 36 has three light emitters on a side piece of the eyewear. Specifically, it has three light emitters in a ventral-to-proximal array of light emitters. In an example, there can be four or five light emitters on a side piece. In an example, there can be six or more light emitters on a side piece. In an example, a ventral-to-dorsal array of light emitters can comprise six or more light emitters. In an example, a ventral-to-dorsal array of light emitters can span between ½" and 2" along the ventral-to-dorsal axis of a side piece. In an example, a ventral-to-dorsal array of light emitters can span between ¾" and 3" along the ventral-to-dorsal axis of a side piece. In an example, a ventral-to-dorsal array of light emitters can span between 1" and 4" along the ventral-to-dorsal axis of a side piece.

In an example, augmented reality eyewear can further comprise one or more other components selected from the group consisting of: accelerometer; battery or other power source; camera; compass; data processing unit; data receiver; data transceiver; data transmitter; display screen; EEG sensor; electromagnetic actuator; electromagnetic energy emitter; finger-activated button or switch; gyroscope; memory; motion sensor (e.g. combination of accelerometer and gyroscope); outward-facing light; pressure sensor; speaker; spectroscopy sensor; speech recognition component; and vibrating element. Relevant variations and components discussed elsewhere in this disclosure or in priority-linked disclosures can also be applied to this example.

Figure 37:
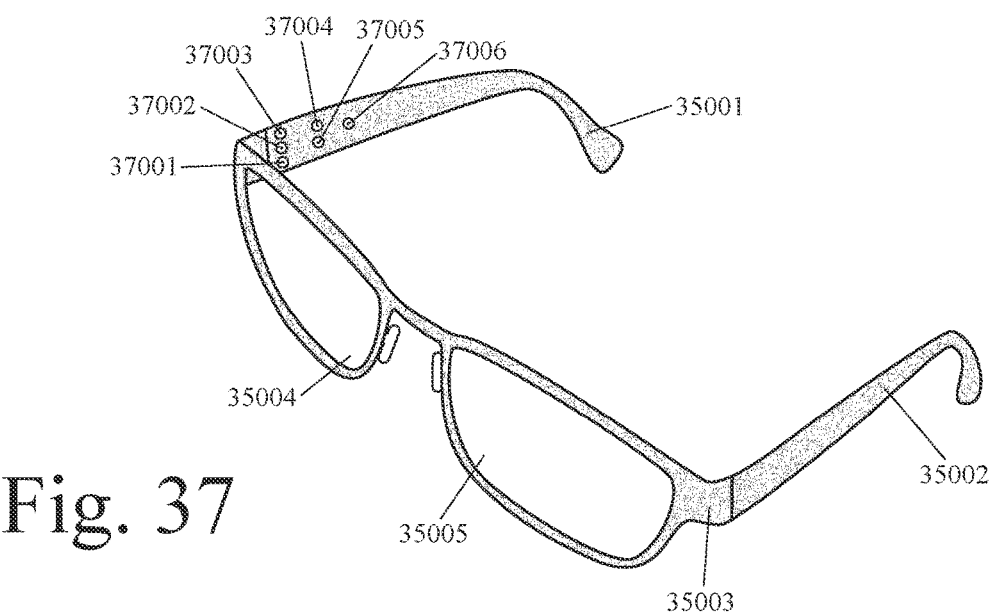
FIG. 37 shows eyewear with a non-linear ventral-to-dorsal array of light emitters on an eyewear arm.

FIG. 37 shows an example of augmented reality eyewear which is like the one shown in FIG. 36 except that there are multiple light emitters along the same lower-to-upper axis of a side piece. In this example, there are more light emitters along a more-ventral lower-to-upper axis of the side piece and fewer light emitters along a more-dorsal lower-to-upper axis of the side piece. In this example, there are more light emitters in a ventral portion of an array of light emitters and fewer light emitters in a dorsal portion of the array. In this example, the density of light emitters decreases as one moves in a dorsal direction.

The augmented reality eyewear in FIG. 37 comprises: an eyewear front piece 35003 which spans the front of a person's face; a front optical member 35004 which is held by the eyewear front piece in front of one of the person's eyes, wherein light rays from environmental objects exit the dorsal surface of the front optical member; an eyewear side piece 35001 which spans from the front piece to one of the person's ears; a first number of light emitters (37001, 37002, and 37003) along a first lower-to-upper axis of the side piece; and a second number of light emitters (37004 and 37005) along a second lower-to-upper axis of the side piece, wherein the second number is less than the first number and the second lower-to-upper axis is more dorsal than the first lower-to-upper axis. This example also comprises: a third number of light emitters (37006) on a third lower-to-upper axis of the side piece, wherein the third number is less than the second number and the third lower-to-upper axis is more dorsal than the second lower-to-upper axis; a second (e.g. left side) eyewear side piece 35002; and a second (e.g. left side) front optical member 35005.

In this example, the number of light emitters on a given lower-to-upper axis decreases as one follows the ventral-to-dorsal axis of a side piece in a dorsal direction. In this example, the density of light emitters decreases as one follows the ventral-to-dorsal axis of a side piece in a dorsal direction. In another example, the number of light emitters on a given lower-to-upper axis can increase as one follows the ventral-to-dorsal axis of a side piece in a dorsal direction. In another example, the density of light emitters can increase as one follows the ventral-to-dorsal axis of a side piece in a dorsal direction. In another example, the density of light emitters in an array of light emitters can be greatest in a ventral-to-dorsal mid-section of the array. In an example, a ventral-to-dorsal array of light emitters can span between ½" and 2" along the ventral-to-dorsal axis of a side piece. In an example, a ventral-to-dorsal array of light emitters can span between ¾" and 3" along the ventral-to-dorsal axis of a side piece. In an example, a ventral-to-dorsal array of light emitters can span between 1" and 4" along the ventral-to-dorsal axis of a side piece.

In an example, an eyewear front piece can further comprise "eye wires" and a "nose bridge." In an example, an eyewear front optical member can be a front lens. In an example, an eyewear side piece can be an "arm" or "temple." In an example, a light emitter can be an image projector. FIG. 37 can also be described as augmented reality eyewear comprising: an eyewear front piece; a front lens held by the eyewear front piece; an eyewear arm which spans from the eyewear front piece to one of the person's ears; and a ventral-to-dorsal array of image projectors on the eyewear arm, wherein there is a first density of light emitters on a ventral portion of the array, wherein there is a second density of light emitters on a dorsal portion of the array, and wherein the second density is less than the first density. In an alternative example, the second density can be greater than the first density.

In this example, only one eyewear side piece (e.g. the right side piece) has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry. Relevant variations and components discussed elsewhere in this disclosure or in priority-linked disclosures can also be applied to this example.

Figure 38:
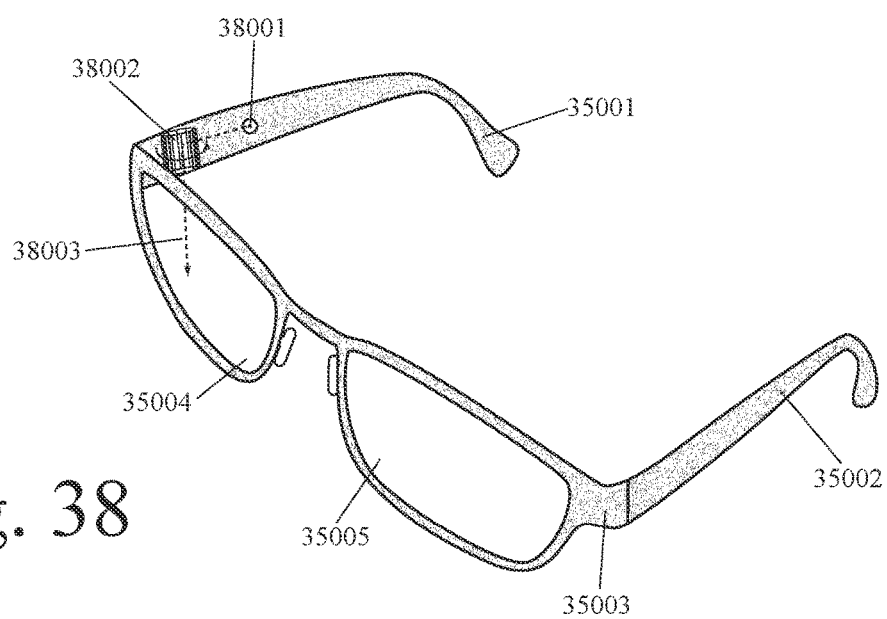
FIG. 38 shows eyewear with a rotating mirror on an eyewear arm.

FIG. 38 shows another example of augmented reality eyewear. In this example, light beams from a light emitter (e.g. image projector) are redirected by a side optical member (e.g. a side lens, prism, mirror, or waveguide) before they reach a front optical member (e.g. front lens). In an example, a side optical member (e.g. a side lens, mirror, prism, mirror, or waveguide) can be stationary relative to a light emitter. In an example, a side optical member (e.g. a side lens, mirror, prism, mirror, or waveguide) can move relative to a light emitter. In an example, a side optical member can tilt, oscillate, and/or rotate relative to a light emitter. In an example, a side optical member can be moved in order to adjust the redirection of beams of light from a light emitter toward the dorsal surface of a front optical member. In an example, a side optical member can be moved in order to move beams of light back and forth (e.g. in scanning motion) across the dorsal surface of a front optical member. In an example, a tilting, oscillating, and/or rotating side optical member can redirect beams of light back and forth (e.g. in scanning motion) across the dorsal surface of a front optical member.

With respect to specific components, the augmented reality eyewear in FIG. 38 comprises: an eyewear front piece 35003 which spans the front of a person's face; a front optical member 35004 which is held by the eyewear front piece in front of one of the person's eyes, wherein light rays from environmental objects exit the dorsal surface of the front optical member; an eyewear side piece 35001 which spans from the front piece to one of the person's ears; a light emitter 38001 on the eyewear side piece; and a side optical member (e.g. a side lens, prism, mirror, or waveguide) 38002 on the side piece which redirects beams of light 38003 from the light emitter toward the front optical member. This example also comprises: a second (e.g. left side) eyewear side piece 35002; and a second (e.g. left side) front optical member 35005.

In this example, the side optical member (e.g. side lens, prism, mirror, or waveguide) rotates. In an example, a side optical member can tilt and/or oscillate. In this example, light beams from a light emitter are reflected by a side optical member (e.g. a side lens, prism, mirror, or waveguide) before they reach a front optical member (e.g. front lens). In another example, light beams from a light emitter can pass through a side optical member before they reach a front optical member (e.g. front lens). In this example, a side optical member is rotated continuously and repeatedly in order to scan beams of light from a light emitter over the dorsal surface of a front optical member. In an example, a side optical member can tilt back and forth repeatedly in order to scan beams of light from a light emitter over the dorsal surface of a front optical member.

In an example, a side optical member can be a side lens, prism, mirror, or waveguide. In an example, a side optical member can be a Digital Micromirror Device (DMD). In an example, a side optical member can be an arcuate or polygonal prism. In an example, a side optical member can be a waveguide which guides beams of light from a light emitter. In an example, a side optical member can be an arcuate or polygonal waveguide. In an example, a side optical member can rotate around a vector which is parallel to a lower-to-upper axis of a side piece. In an example, a side optical member can rotate around a vertical vector. In an example, a side optical member can tilt and/or oscillate around a vector which is parallel to a lower-to-upper axis of a side piece. In an example, a side optical member can tilt and/or oscillate around a vertical vector.

In this example, there is one side optical member on a side piece. In an example, there can be one side optical member on a side piece which redirects beams of light from a single light emitter. In an example, there can be one side optical member on a side piece which redirects beams of light from a plurality of light emitters. In this example, there can be a plurality of side optical members on a side piece. In this example, there can be a plurality of side optical members on a side piece, each of which redirects light from a single light emitter. In this example, there can be a plurality of side optical members on a side piece, each of which redirects light from a plurality of light emitters.

In an example, an eyewear front piece can further comprise "eye wires" and a "nose bridge." In an example, an eyewear front optical member can be a front lens. In an example, an eyewear side piece can be an "arm" or "temple." In an example, a light emitter can be an image projector. FIG. 38 can also be described as augmented reality eyewear comprising: an eyewear front piece; a front lens held by the eyewear front piece; an eyewear arm which spans from the eyewear front piece to one of the person's ears; an image projector on the eyewear arm; and a side lens, prism, mirror, or waveguide on the arm which redirects beams of light from the image projector toward the front lens. FIG. 38 can also be described as augmented reality eyewear comprising: an eyewear front piece; a front lens held by the eyewear front piece; an eyewear arm which spans from the eyewear front piece to one of the person's ears; an image projector on the eyewear arm; and a rotating side lens, prism, mirror, or waveguide on the arm which moves beams of light from the image projector across the dorsal surface of the front lens.

In this example, only one eyewear side piece (e.g. the right side piece) has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry. Relevant variations and components discussed elsewhere in this disclosure or in priority-linked disclosures can also be applied to this example.

Figure 39:
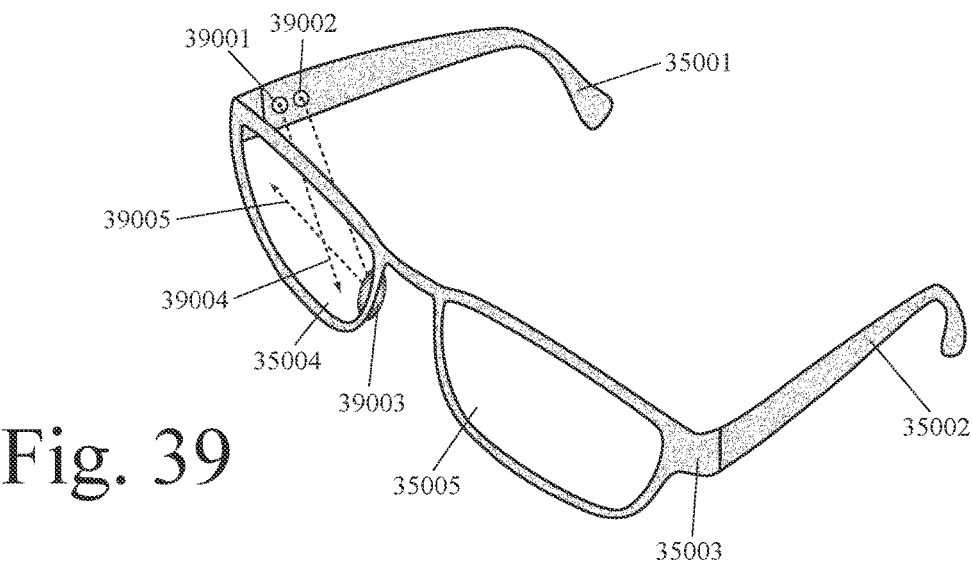
FIG. 39 shows eyewear with a ventral-to-dorsal array of light emitters and a reflector near the nose bridge.

FIG. 39 shows another example of augmented reality eyewear. In this example, light beams from at least one light emitter (e.g. image projector) on an eyewear side piece (e.g. eyewear arm) are redirected by a central optical member (e.g. a mirror, prism, waveguide, or lens within ¾" of an eyewear nose bridge) before these beams reach a front optical member (e.g. front lens).

The augmented reality eyewear in FIG. 39 comprises: an eyewear front piece 35003, wherein this eyewear front piece further comprises a nose bridge which is configured to span the upper portion of a person's nose; a front optical member (e.g. front lens) 35004 which is configured to be held in front of one of the person's eyes; an eyewear side piece (e.g. eyewear arm) 35001 which spans from the eyewear front piece to one of the person's ears; a central optical member (e.g. mirror, prism, waveguide, or lens) 39003 within ¾" of the nose bridge; a first light emitter (e.g. image projector) 39001 on the eyewear side piece, wherein beams of light 39004 from the first light emitter are projected directly onto the front optical member to create a portion of a virtual image in the person's field of vision; and a second light emitter (e.g. image projector) 39002 on the eyewear side piece, wherein beams of light 39005 from the second light emitter are redirected by the central optical member before they reach the front optical member to create a portion of a virtual image in the person's field of vision.

This example also comprises: a second (e.g. left side) eyewear side piece 35002; and a second (e.g. left side) front optical member 35005. In this example, only one eyewear side piece (e.g. the right side piece) has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry.

In this example, there is a ventral-to-dorsal array of light emitters (e.g. image projectors) on an eyewear side piece. In this example, the second light emitter (e.g. image projector) is more dorsal than the first light emitter (e.g. image projector). In this example, beams of light from the first light emitter are projected onto a portion of the front optical member which is closer to the nose bridge and beams of light from the second light emitter are projected onto a portion of the front optical member which is farther from the nose bridge. In an alternative example, beams of light from the first light emitter can be projected onto a portion of the front optical member which is farther from the nose bridge and beams of light from the second light emitter can be projected onto a portion of the front optical member which is closer to the nose bridge. In an alternative example, there may be only one light emitter on an eyewear side piece, wherein beams of light from this light emitter are redirected by a central optical member (e.g. a mirror, prism, waveguide, or lens within ¾" of a nose bridge) before they reach the dorsal surface of a front optical member. In an alternative example, there may be no light emitters whose beams of light are projected directly onto a front optical member.

In an example, a central optical member can be a flat mirror. In an example, a central optical member can be an arcuate mirror. In an example, a central optical member can be a polygonal prism. In an example, a central optical member can be a waveguide. In an example, a central optical member (e.g. mirror, prism, waveguide, or lens within ¾" of a nose bridge) can tilt, oscillate, or rotate. In an example, a central optical member can be a Digital Micromirror Device (DMD). In an example, a tilting, oscillating, or rotating central optical member can cause light beams from a light emitter (e.g. image projector) on an eyewear side piece to scan back and forth across the dorsal surface of a front optical member (e.g. front lens). Relevant variations and components discussed elsewhere in this disclosure or in priority-linked disclosures can also be applied to this example.

Figure 40:
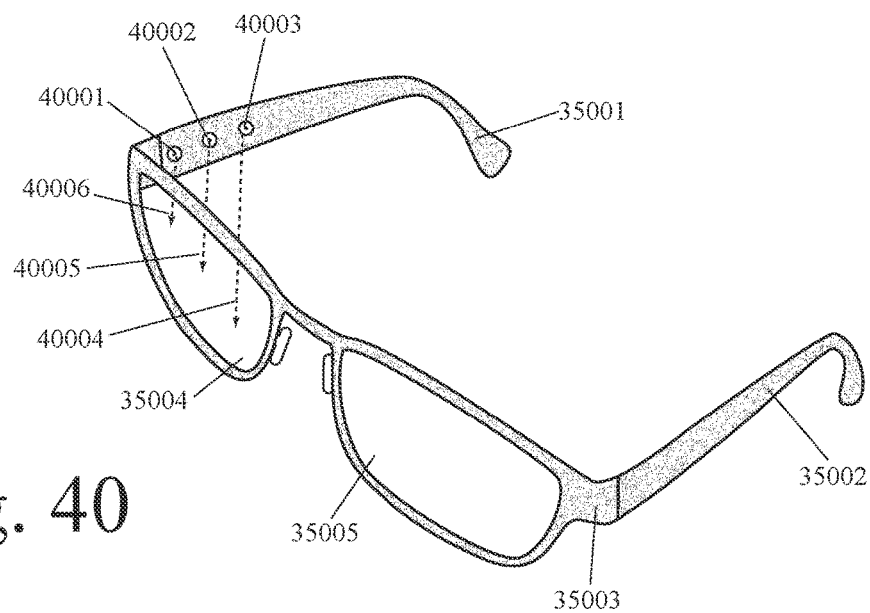
FIG. 40 shows eyewear with a ventral-to-dorsal array of light emitters with side-to-central, respectively, projection beam destinations.

FIG. 40 shows another example of augmented reality eyewear with a ventral-to-dorsal array of light emitters on an eyewear side piece. The augmented reality eyewear in FIG. 40 comprises: an eyewear front piece 35003 which further comprises a nose bridge; a front optical member (e.g. front lens) 35004 which is configured to be held in front of one of the person's eyes; an eyewear side piece (e.g. eyewear arm) 35001 which spans from the eyewear front piece to one of the person's ears; a first light emitter (e.g. image projector) 40001 on the eyewear side piece, wherein beams of light 40006 from the first light emitter are projected onto a first area of the front optical member to create a portion of a virtual image in the person's field of vision; a second light emitter (e.g. image projector) 40002 on the eyewear side piece, wherein beams of light 40005 from the second light emitter are projected onto a second area of the front optical member to create a portion of a virtual image in the person's field of vision, wherein the location of the second light emitter is more dorsal than the location of the first light emitter, and wherein the second area of the front optical member is closer to the nose bridge than the first area of the front optical member; a third light emitter (e.g. image projector) 40003 on the eyewear side piece, wherein beams of light 40004 from the third light emitter are projected onto a third area of the front optical member to create a portion of a virtual image in the person's field of vision, wherein the location of the third light emitter is more dorsal than the location of the second light emitter, and wherein the third area of the front optical member is closer to the nose bridge than the second area of the front optical member.

This example also comprises: a second (e.g. left side) eyewear side piece 35002; and a second (e.g. left side) front optical member 35005. In this example, only one eyewear side piece (e.g. the right side piece) has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry.

In a variation on the example, augmented reality eyewear can comprise: an eyewear front piece which further comprises a nose bridge; a front optical member (e.g. front lens) which is configured to be held in front of one of the person's eyes; an eyewear side piece (e.g. eyewear arm) which spans from the eyewear front piece to one of the person's ears; a first light emitter (e.g. image projector) on the eyewear side piece, wherein beams of light from the first light emitter are projected onto a first area of the front optical member to create a portion of a virtual image in the person's field of vision; a second light emitter (e.g. image projector) on the eyewear side piece, wherein beams of light from the second light emitter are projected onto a second area of the front optical member to create a portion of a virtual image in the person's field of vision, wherein the location of the second light emitter is more dorsal than the location of the first light emitter, and wherein the second area of the front optical member is farther from the nose bridge than the first area of the front optical member; a third light emitter (e.g. image projector) on the eyewear side piece, wherein beams of light from the third light emitter are projected onto a third area of the front optical member to create a portion of a virtual image in the person's field of vision, wherein the location of the third light emitter is more dorsal than the location of the second light emitter, and wherein the third area of the front optical member is farther from the nose bridge than the second area of the front optical member.

In a variation on the example, augmented reality eyewear can comprise: an eyewear front piece which further comprises a nose bridge; a front optical member (e.g. front lens) which is configured to be held in front of one of the person's eyes; an eyewear side piece (e.g. eyewear arm) which spans from the eyewear front piece to one of the person's ears; a first light emitter (e.g. image projector) on the eyewear side piece, wherein beams of light from the first light emitter are projected onto a first area of the front optical member to create a portion of a virtual image in the person's field of vision; and a second light emitter (e.g. image projector) on the eyewear side piece, wherein beams of light from the second light emitter are projected onto a second area of the front optical member to create a portion of a virtual image in the person's field of vision, wherein the location of the second light emitter is more dorsal than the location of the first light emitter, and wherein the second area of the front optical member is closer to the center of the front optical member (e.g. front lens) than the first area of the front optical member. Relevant variations and components discussed elsewhere in this disclosure or in priority-linked disclosures can also be applied to this example.

Figure 41:
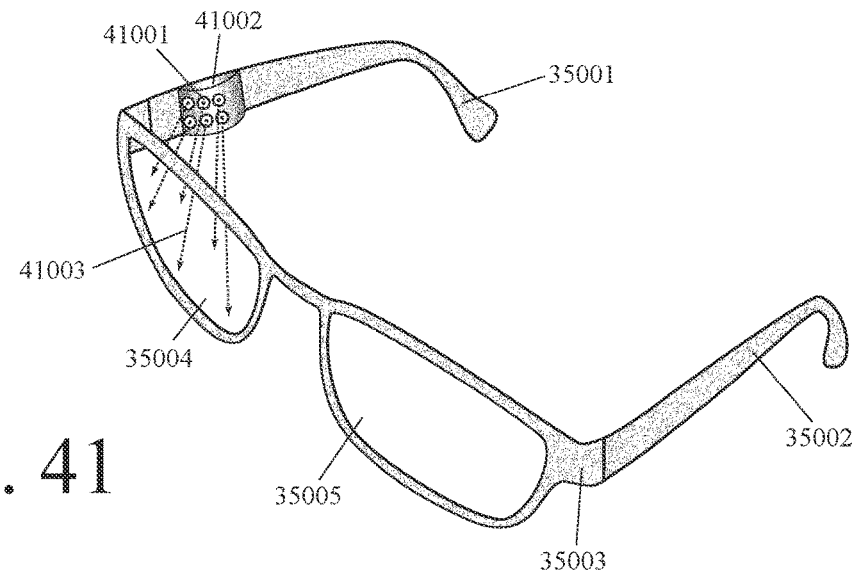
FIG. 41 shows eyewear with light emitters on an arcuate inward-facing protrusion on an eyewear arm.

FIG. 41 shows another example of augmented reality eyewear with a ventral-to-dorsal array of light emitters on an eyewear side piece. The eyewear in FIG. 41 comprises: an eyewear front piece 35003 which holds a front optical member (e.g. front lens) 35004 in front of one of a person's eyes; an eyewear side piece (e.g. "arm") 35001 which spans from the eyewear front piece to one of the person's ears; an inward-facing protrusion (e.g. an inward projection, bump, bulge, ridge, wing, or wedge) 41002 on the eyewear side piece, wherein the inward-facing protrusion extends out from the main body of the eyewear side piece toward the person's head; and a ventral-to-dorsal array of light emitters (including 41001) on the inward-facing protrusion, wherein beams of light (including 41003) from the array of light emitters create a virtual image in the person's field of vision.

This example also comprises a second (e.g. left side) eyewear side piece 35002 and a second (e.g. left side) front optical member 35005. In this example, only one eyewear side piece (e.g. the right eyewear "arm") has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry.

In this example, an inward-facing protrusion (which extends out from the main body of an eyewear side piece) is arcuate. In this example, the inward-facing protrusion is planoconcave. In this example, the inward-facing protrusion is a half-section of a disk or wheel. In an example, an inward-facing protrusion can be a three-dimensional structure comprised of multiple polygons. In an example, an inward-facing protrusion can have a wedge shape or a frustal shape. In an example, an inward-facing protrusion can have a shape selected from the group consisting of: conic section; cube; disk or section of a disk; frustum; half cylinder or other section of a cylinder; hemisphere or other section of a sphere; rectangle; rounded cube; rounded rectangle; planoconcave or planoconvex; section of an ellipsoid; sinusoidal or other undulating wave; sphere; trapezoid or parallelogram; wedge; and wheel or section of a wheel. In an example, an inward-facing protrusion can be rigid. In an example, an inward-facing protrusion can be flexible, compressible, and/or soft. In an example, an inward-facing protrusion can be made from foam or inflatable.

In an example, an inward-facing protrusion can be located on the ventral half (e.g. front half) of an eyewear side piece. In an example, an inward-facing protrusion can be located on the ventral quarter (e.g. front quarter) of an eyewear side piece. In an example, an inward-facing protrusion can be in a ventral-to-dorsal mid-section (e.g. central two quarters) of an eyewear side piece. In an example, an inward-facing protrusion which houses a plurality of light emitters can be located at a distance between ¼" and 1" from the ventral end of an eyewear side piece. In an example, an inward-facing protrusion which houses a plurality of light emitters can be located at a distance between ½" and 3" from the ventral end of an eyewear side piece.

In an example, an inward-facing protrusion can extend out from the main body of an eyewear side piece by a distance in the range of ⅛" to ½." In an example, an inward-facing protrusion can extend out from the main body of an eyewear side piece by a distance in the range of ¼" to 1." In an example, an inward-facing protrusion can be tapered in a dorsal-to-ventral manner, with a thicker dorsal portion and a thinner ventral portion. In an example, a dorsal portion of an inward-facing protrusion can be closer to a person's head than the ventral portion of the protrusion. In an example, the mid-section of an inward-facing protrusion can be closest to the surface of a person's head.

In an example, there can be a ventral-to-dorsal series of inward-facing protrusions along an eyewear side piece. In an example, there can be multiple inward-facing protrusions along an eyewear side piece, wherein each inward-facing protrusion houses a single light emitter (e.g. image projector). In an example, there can be multiple inward-facing protrusions along an eyewear side piece, wherein each inward-facing protrusion houses multiple light emitters (e.g. image projectors). In an example, there can be two inward-facing protrusions on an eyewear side piece, one in the most ventral quarter of the side piece and one in the second most ventral quarter of the side piece.

In an example, there can be one or more light emitters on the ventral (forward-facing) surface of an inward-facing protrusion. In an example, there can be an array of light emitters on the ventral (forward-facing) surface of an inward-facing protrusion. In an example, there can be an array of light emitters on the inward-facing surface of an inward-facing protrusion. In an example, all of the light emitters can be on a ventral (forward-facing) surface of an inward-facing protrusion. In an example, all of the light emitters can be on an inward-facing surface of an inward-facing protrusion. In an example, there can be two light emitters on the ventral surface of each inward-facing protrusion on an eyewear side piece. In an example, there can be four or more light emitters on the ventral surface of each inward-facing protrusion on an eyewear side piece.

In an example, there can be a ventral-to-dorsal series of sinusoidal undulations along an eyewear sidepiece. In an example, there can be a ventral-to-dorsal series of sinusoidal protrusions (e.g. undulations or waves) along an eyewear side piece, wherein there is at least one light emitting on the generally-ventral-facing portions of the three or more protrusions. In an example, there can be a ventral-to-dorsal series of sawtooth protrusions along an eyewear side piece, wherein there is at least one light emitting on the generally-ventral-facing portions of the three or more protrusions.

In an example, the ventral-to-dorsal position of an inward-facing protrusion on an eyewear side piece can be moved (e.g. adjusted). In an example, the ventral-to-dorsal position of an inward-facing protrusion can be moved along a ventral-to-dorsal track or channel. In an example, the ventral-to-dorsal position of an inward-facing protrusion can be moved (e.g. adjusted) manually. In an example, the ventral-to-dorsal position of an inward-facing protrusion can be moved (e.g. adjusted) by an electromagnetic actuator. In an example, the ventral-to-dorsal position of an inward-facing protrusion can be moved (e.g. adjusted) by a hydraulic or pneumatic mechanism. In an example, the ventral-to-dorsal position of an inward-facing protrusion can be automatically adjusted.

In an example, the maximum distance of an inward-facing protrusion from the main body of an eyewear side piece can be adjusted. In an example, the maximum distance of an inward-facing protrusion from the main body of an eyewear side piece can be adjusted manually. In an example, the maximum distance of an inward-facing protrusion from the main body of an eyewear side piece can be adjusted by an electromagnetic actuator. In an example, the maximum distance of an inward-facing protrusion from the main body of an eyewear side piece can be adjusted by a hydraulic or pneumatic mechanism. In an example, the maximum distance of an inward-facing protrusion from the main body of an eyewear side piece can be automatically adjusted.

In an example, the shape of an inward-facing protrusion on an eyewear side piece can be adjusted. In an example, the shape of an inward-facing protrusion on an eyewear side piece can be adjusted manually. In an example, the shape of an inward-facing protrusion on an eyewear side piece can be adjusted by an electromagnetic actuator. In an example, the shape of an inward-facing protrusion on an eyewear side piece can be adjusted by a hydraulic or pneumatic mechanism. In an example, the shape of an inward-facing protrusion on an eyewear side piece can be automatically adjusted. Relevant variations and components discussed elsewhere in this disclosure or in priority-linked disclosures can also be applied to this example.

Figure 42:
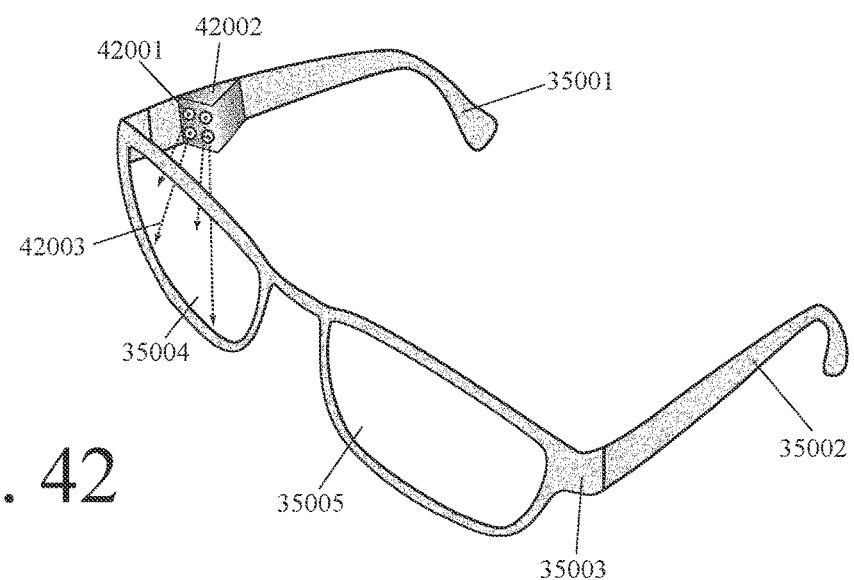
FIG. 42 shows eyewear with light emitters on a polygonal inward-facing protrusion on an eyewear arm.

FIG. 42 shows an example of augmented reality eyewear which is like the example shown in FIG. 41 except that an inward-facing protrusion on an eyewear side piece is wedge shaped (e.g. tapered toward the rear). The augmented reality eyewear in FIG. 42 comprises: an eyewear front piece 35003 which holds a front optical member (e.g. front lens) 35004 in front of one of a person's eyes; an eyewear side piece (e.g. "arm") 35001 which spans from the eyewear front piece to one of the person's ears; a wedge-shaped protrusion 42002 on the eyewear side piece, wherein the wedge-shaped protrusion extends inward from the main body of the eyewear side piece toward the person's head; and a plurality of light emitters (including 42001) on the wedge-shaped protrusion, wherein beams of light (including 42003) from the plurality of light emitters create a virtual image in the person's field of vision. In this example, the plurality of light emitters are located on a generally-ventral-facing surface of the wedge-shape protrusion.

This example also comprises a second (e.g. left side) eyewear side piece 35002 and a second (e.g. left side) front optical member 35005. In this example, only one eyewear side piece (e.g. the right eyewear "arm") has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry. Relevant variations and components discussed elsewhere in this disclosure or in priority-linked disclosures can also be applied to this example.

Figure 43:
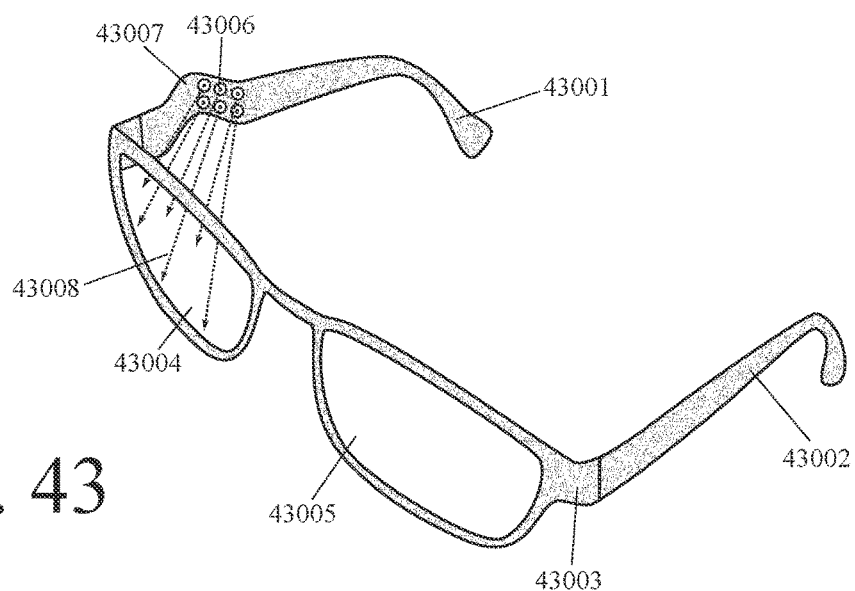
FIG. 43 shows eyewear with light emitters on an outward-bending undulation of an eyewear arm.

FIG. 43 shows another example of augmented reality eyewear. In this example, an eyewear side piece (e.g. eyewear "arm") is arcuate. In this example, a side piece has at least one outward-inward undulation. In this example, a side piece has at least one outward-inward sinusoidal wave. In this example, there is at least one light emitter (e.g. image projector) on a generally-ventral-facing surface of a sinusoidal undulation. In this example, there is a ventral-to-dorsal array of light emitters on a generally-ventral-facing surface of a sinusoidal undulation. In an example, a side piece can have a ventral-to-dorsal series of undulations, wherein there are light emitters on the ventral-facing surfaces of each of these undulations. In an example, a side piece can have a ventral-to-dorsal series of (three or more) sinusoidal undulations, wherein there are light emitters on the ventral-facing surfaces of each of these undulations.

The eyewear in FIG. 43 comprises: an eyewear front piece 43003 which holds a front optical member (e.g. front lens) 43004 in front of one of a person's eyes; an eyewear side piece (e.g. "arm") 43001 which spans from the eyewear front piece to one of the person's ears, wherein the eyewear side piece further comprises an undulation 43007; and a plurality of light emitters (including 43006) on the undulation, wherein beams of light (including 43008) from the plurality of light emitters create a virtual image in the person's field of vision. This example also comprises a second (e.g. left side) eyewear side piece 43002 and a second (e.g. left side) front optical member 43005. In this example, only one eyewear side piece (e.g. the right eyewear "arm") has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry.

In this example, an undulation of the side piece undulates in an outward-inward manner, wherein inward means closer to the person's head and outward means farther from the person's head. In this example, one or more light emitters are located on a generally-ventral-facing surface of the undulation. In an example, a side piece can further comprise an outward-inward sinusoidal wave. In an example, a side piece can further comprise a ventral-to-dorsal series of outward-inward sinusoidal waves, wherein there are forward-facing light emitters (e.g. image projectors) on these sinusoidal waves.

In an example, an undulation of the side piece can undulate in an upward-downward manner. In an example, one or more light emitters can be located on a generally-ventral-facing surface of such an undulation. In an example, a side piece can further comprise an upward-downward sinusoidal wave. In an example, a side piece can further comprise a ventral-to-dorsal series of upward-downward sinusoidal waves, wherein there are forward-facing light emitters (e.g. image projectors) on these sinusoidal waves. Relevant variations and components discussed elsewhere in this disclosure or in priority-linked disclosures can also be applied to this example.

Figure 44:
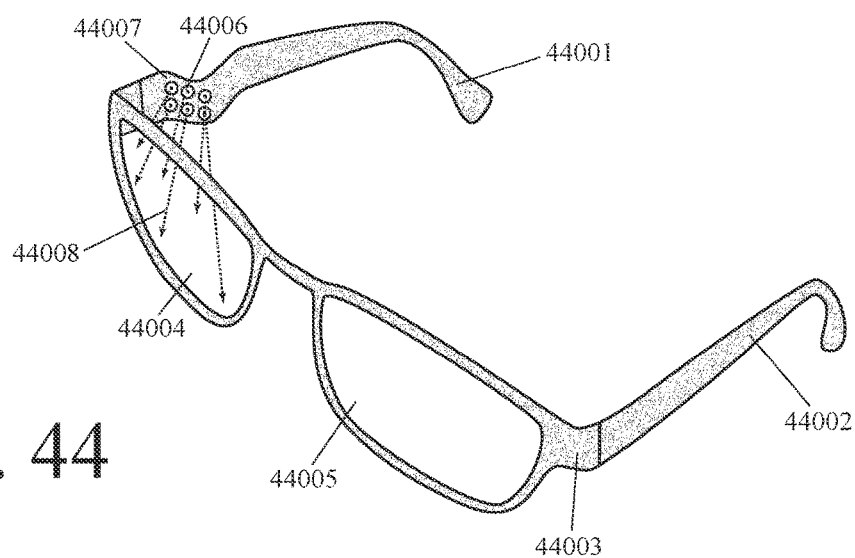
FIG. 44 shows eyewear with light emitters on an inward-bending undulation of an eyewear arm.

FIG. 44 shows an example of augmented reality eyewear which is similar to the one in FIG. 43 except that an undulation of an eyewear side piece bows inward instead of outward. The eyewear in FIG. 44 comprises: an eyewear front piece 44003 which holds a front optical member (e.g. front lens) 44004 in front of one of a person's eyes; an eyewear side piece (e.g. "arm") 44001 which spans from the eyewear front piece to one of the person's ears, wherein the eyewear side piece further comprises an undulation 44007; and a plurality of light emitters (including 44006) on a ventral-facing surface of the undulation, wherein beams of light (including 44008) from the plurality of light emitters create a virtual image in the person's field of vision. This example also comprises a second (e.g. left side) eyewear side piece 44002 and a second (e.g. left side) front optical member 44005. In this example, only one eyewear side piece (e.g. the right eyewear "arm") has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry. Relevant variations and components discussed elsewhere in this disclosure or in priority-linked disclosures can also be applied to this example.

Figure 45:
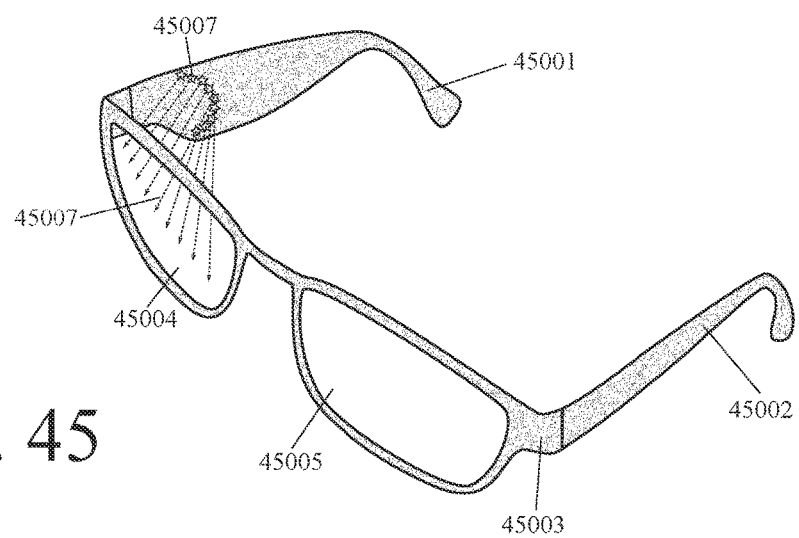
FIG. 45 shows eyewear with a convex array of light emitters on an eyewear arm.

FIG. 45 shows an example of augmented reality eyewear with a convex array of light emitters on an eyewear side piece. The eyewear in FIG. 45 comprises: an eyewear front piece 45003 which holds a front optical member (e.g. front lens) 45004 in front of one of a person's eyes; an eyewear side piece (e.g. "arm") 45001 which spans from the eyewear front piece to one of the person's ears; and a convex array of light emitters (including 45007) on the eyewear side piece, wherein beams of light (including 45008) from the light emitters create a virtual image in the person's field of vision. This example also comprises a second (e.g. left side) eyewear side piece 45002 and a second (e.g. left side) front optical member 45005. In this example, only one eyewear side piece (e.g. the right eyewear "arm") has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry. Relevant variations and components discussed elsewhere in this disclosure or in priority-linked disclosures can also be applied to this example.

Figure 46:
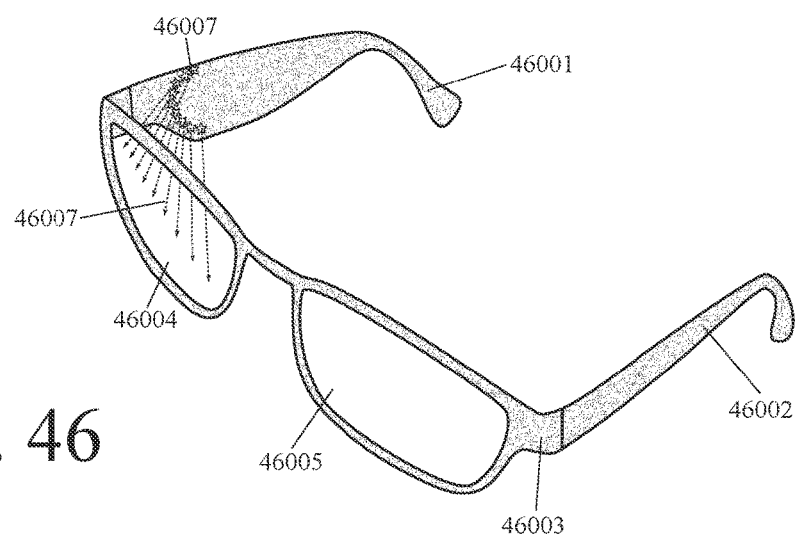
FIG. 46 shows eyewear with a concave array of light emitters on an eyewear arm.

FIG. 46 shows an example of augmented reality eyewear with a concave array of light emitters on an eyewear side piece. The eyewear in FIG. 46 comprises: an eyewear front piece 46003 which holds a front optical member (e.g. front lens) 46004 in front of one of a person's eyes; an eyewear side piece (e.g. "arm") 46001 which spans from the eyewear front piece to one of the person's ears; and a concave array of light emitters (including 46007) on the eyewear side piece, wherein beams of light (including 46008) from the light emitters create a virtual image in the person's field of vision. This example also comprises a second (e.g. left side) eyewear side piece 46002 and a second (e.g. left side) front optical member 46005. In this example, only one eyewear side piece (e.g. the right eyewear "arm") has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry. Relevant variations and components discussed elsewhere in this disclosure or in priority-linked disclosures can also be applied to this example.

Figure 47:
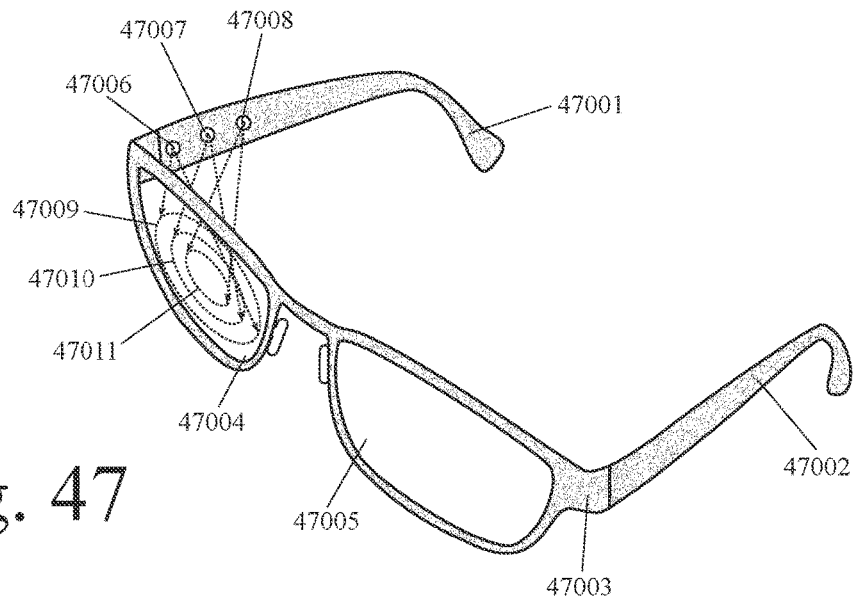
FIG. 47 shows eyewear which creates nested virtual images.

FIG. 47 shows an example of augmented reality eyewear wherein a ventral-to-dorsal array of light emitters along an eyewear side piece creates nested and/or concentric virtual images in a person's field of vision. The eyewear in FIG. 47 comprises: an eyewear front piece 47003 which holds a front optical member (e.g. front lens) 47004 in front of one of a person's eyes; an eyewear side piece (e.g. "arm") 47001 which spans from the eyewear front piece to one of the person's ears; and a ventral-to-dorsal array of light emitters (47006, 47007, and 47008) along the eyewear side piece, wherein beams of light (including 47009, 47010, and 47011) from the array of light emitters create nested and/or concentric virtual images in the person's field of vision. This example also comprises a second (e.g. left side) eyewear side piece 47002 and a second (e.g. left side) front optical member 47005. In this example, only one eyewear side piece (e.g. the right eyewear "arm") has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry.

In this example, a ventral-to-dorsal array of light emitters (e.g. image projectors) on an eyewear side piece can project nested and/or concentric virtual images onto the dorsal surface of a front optical member (e.g. front lens). In an example, a first light emitter (e.g. image projector) in an array of light emitters (e.g. image projectors) can project light onto a central portion of a front lens and a second light emitter (e.g. image projector) in an array of light emitters (e.g. image projectors) can project light onto a peripheral portion of the front lens. In an example, light from a first light emitter is directed onto a first area of the dorsal surface of a front lens and light from a second light emitter is directed onto a second area of the dorsal surface of a front lens, wherein the first area is more central with respect to the center of the dorsal surface than the second area.

In an example, light from a first light emitter (e.g. first image projector) is directed onto a first area of the dorsal surface of a front lens and light from a second light emitter (e.g. second image projector) is directed onto a second area of the dorsal surface of a front lens, wherein the first and second areas are nested. In an example, light from a first light emitter is directed onto a first area of the dorsal surface of a front lens and light from a second light emitter is directed onto a second area of the dorsal surface of a front lens, wherein the first area is inside the second area. In an example, light from a first light emitter is directed onto a first area of the dorsal surface of a front lens and light from a second light emitter is directed onto a second area of the dorsal surface of a front lens, wherein the first and second areas are concentric.

In an example, light from a first light emitter is directed onto a first area of the dorsal surface of a front lens and light from a second light emitter is directed onto a second area of the dorsal surface of a front lens, wherein the first and second areas overlap. In an example, light from a first light emitter can be directed onto the center of the dorsal surface of a front lens to create a virtual image in the center of a person's field of vision, while light from a plurality of other light emitters can be directed onto peripheral portions of the dorsal surface of the front lens to create virtual images in the periphery of the person's field of vision.

In an example, light from a first light emitter can be directed onto a central portion of the dorsal surface of a front lens to create a virtual image in the center of a person's field of vision, while light from two other light emitters can be directed onto two peripheral (e.g. upper and lower) portions of the dorsal surface of the front lens to create virtual images in the periphery of the person's field of vision. In an example, light from a first light emitter can be directed onto a central portion of the dorsal surface of a front lens to create a virtual image in the center of a person's field of vision, while light from two other light emitters can be directed onto two peripheral (e.g. right and left) portions of the dorsal surface of the front lens to create virtual images in the periphery of the person's field of vision.

In an example, light from a first light emitter can be directed onto a central portion of the dorsal surface of a front lens to create a virtual image in the center of a person's field of vision, while light from four other light emitters can be directed onto four peripheral quadrants (e.g. upper, lower, right, and left) of the dorsal surface of the front lens to create virtual images in the periphery of the person's field of vision. In an example, light from a first light emitter can be directed onto a central portion of the dorsal surface of a front lens to create a virtual image in the center of a person's field of vision, while light from six other light emitters can be directed onto six peripheral segments of the dorsal surface of the front lens to create virtual images in the periphery of the person's field of vision. Relevant variations and components discussed elsewhere in this disclosure or in priority-linked disclosures can also be applied to this example.

Figure 48:
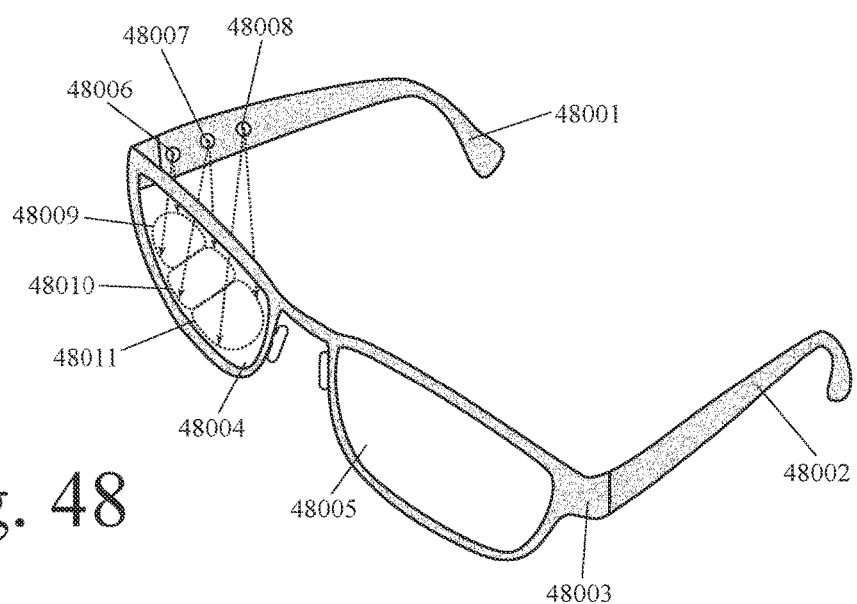
FIG. 48 shows eyewear which creates a lateral series of virtual images.

FIG. 48 shows another example of augmented reality eyewear with a ventral-to-dorsal array of light emitters along an eyewear side piece. The eyewear in FIG. 48 comprises: an eyewear front piece 48003 which holds a front optical member (e.g. front lens) 48004 in front of a person's eyes; an eyewear side piece (e.g. "arm") 48001 which spans from the eyewear front piece to one of the person's ears; and a ventral-to-dorsal array of light emitters (48006, 48007, and 48008) along the eyewear side piece, wherein beams of light (including 48009, 48010, and 48011) from the light emitters are directed to a lateral (e.g. right-to-left) series of areas of the eyewear front piece, respectively, and wherein these beams of light create virtual images in the person's field of vision. This example also comprises a second (e.g. left side) eyewear side piece 48002 and a second (e.g. left side) front optical member 48005. In this example, only one eyewear side piece (e.g. the right eyewear "arm") has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry.

In this example, light beams from a ventral-to-dorsal series of light emitters (e.g. image projectors) are directed to a lateral (e.g. right-to-left) series of areas on the dorsal surface of a front optical member (e.g. front lens). In this example, light from a first light emitter is directed to a first portion of the dorsal surface of a front optical member and light from a second light emitter is directed to a second portion of the dorsal surface of the front optical member. In this example, the first and second portions do not overlap. In an alternative example, first and second portions may overlap.

In this example, light from a first light emitter is directed to a first portion of the dorsal surface of a front optical member and light from a second light emitter is directed to a second portion of the dorsal surface of the front optical member, wherein the (centroid of the) second portion is to the left of the (centroid of the) first portion. In an example, light from a more-ventral light emitter is directed to farther-right portion of the dorsal surface of a front optical member and light from a more-dorsal light emitter is directed to a farther-left portion of the dorsal surface of the front optical member.

In an alternative example, light from a first light emitter can be directed to a first portion of the dorsal surface of a front optical member and light from a second light emitter can be directed to a second portion of the dorsal surface of the front optical member, wherein the (centroid of the) second portion is to the right of the (centroid of the) first portion. In an alternative example, light from a more-ventral light emitter can be directed to farther-left portion of the dorsal surface of a front optical member and light from a more-dorsal light emitter can be directed to a farther-right portion of the dorsal surface of the front optical member.

In this example, light from one light emitter in a ventral-to-dorsal array of light emitters on an eyewear side piece is directed onto a central portion of a front lens and light beams from two other emitters (one more ventral than the first and one more dorsal than the first) are directed to right and left portions, respectively, of the front lens. In this example, light beams from one light emitter in a ventral-to-dorsal array of light emitters on an eyewear side piece are directed onto a central area of a front lens and light beams from two other emitters are directed to two peripheral areas, respectively, of the front lens. In an example, two peripheral areas can be on opposite sides of a central area. Relevant variations and components discussed elsewhere in this disclosure or in priority-linked disclosures can also be applied to this example.

Figure 49:
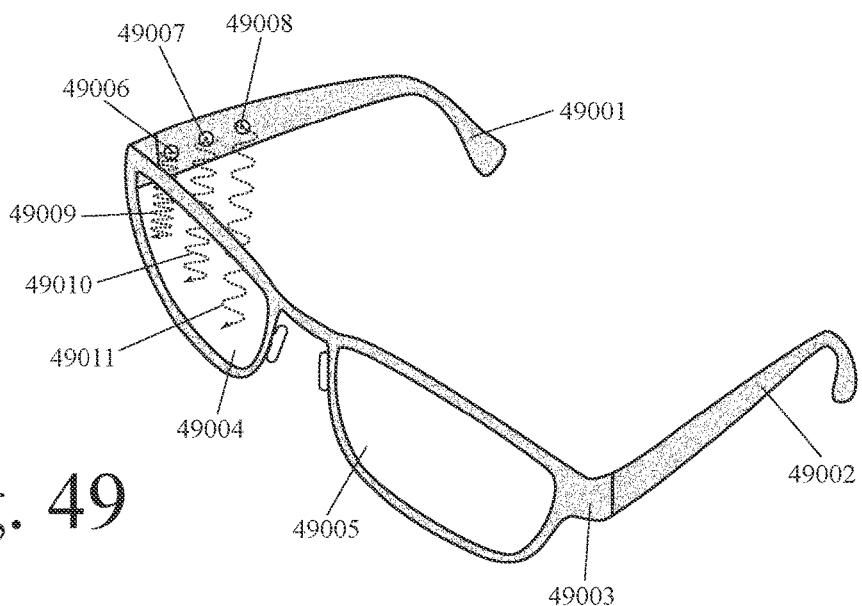
FIG. 49 shows eyewear wherein different light emitters emit light with different spectral distributions.

FIG. 49 shows an example of augmented reality eyewear with a plurality of light emitters which emit beams of light with different spectral distributions, wavelengths, and/or colors. The eyewear in FIG. 49 comprises: an eyewear front piece 49003; a front optical member (e.g. front lens) 49004 which is held by the eyewear front piece in front of one of a person's eyes; an eyewear side piece (e.g. "arm") 49001 which spans from the eyewear front piece to one of the person's ears; and a plurality of light emitters (49006, 49007, and 49008), wherein beams of light (including 49009, 49010, and 49011) from the plurality of light emitters are directed onto the front optical member (e.g. front lens), wherein beams of light from different light emitters in the plurality of light emitters have different spectral distributions, and wherein these beams of light collectively create virtual images in the person's field of vision.

This example also comprises a second (e.g. left side) eyewear side piece 49002 and a second (e.g. left side) front optical member 49005. In this example, only one eyewear side piece (e.g. the right eyewear "arm") has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry.

In an example, different light emitters in a plurality of light emitters in augmented reality eyewear can emit beams of light with different spectral distributions. In an example, the spectral distributions of beams of light can be selected from the group consisting of: visible light; infrared light; near-infrared light; and ultraviolet light. In an example, a first light emitter in augmented reality eyewear can project beams of light with a first spectral distribution onto a front lens and a second light emitter can project beams of light with a second spectral distribution onto the front lens. In an example, the interaction of these beams of light can create three-dimensional virtual objects in a wearer's field of view. In an example, a first set of light emitters in an array of light emitters can project beams of light with a first spectral distribution onto a front lens and a second set of light emitters in the array can project beams of light with a second spectral distribution onto the front lens, wherein the second spectral distribution is different than the first spectral distribution.

In an example, different light emitters in a plurality of light emitters in augmented reality eyewear can emit beams of light with different wavelengths. In an example, a first light emitter in augmented reality eyewear can project beams of light with a first wavelength onto a front lens and a second light emitter can project beams of light with a second wavelength onto the front lens. In an example, the interaction of these beams of light with different wavelengths can create three-dimensional virtual objects in a wearer's field of view. In an example, a first set of light emitters in an array of light emitters in augmented reality eyewear can project beams of light with a first average wavelength onto a front lens and a second set of light emitters in the array of light emitters can project beams of light with a second average wavelength onto the front lens, wherein the second average wavelength is greater than the first average wavelength.

In an example, different light emitters in a plurality of light emitters in augmented reality eyewear can emit beams of light with different colors. In an example, the colors of beams of light can be selected from the group consisting of: red; blue; and yellow. In an example, the colors of beams of light can be selected from the group consisting of: red; blue; and green. In an example, a first light emitter in augmented reality eyewear can project beams of light with a first color onto a front lens and a second light emitter can project beams of light with a second color onto the front lens. In an example, a first set of light emitters in an array of light emitters in augmented reality eyewear can project beams of light with a first color onto a front lens and a second set of light emitters in the array of light emitters can project beams of light with a second color onto the front lens, wherein the second color is different than the first color.

In an example, different light emitters in a plurality of light emitters in augmented reality eyewear can emit beams of light with different polarizations. In an example, a first light emitter in augmented reality eyewear can project beams of light with a first polarization onto a front lens and a second light emitter can project beams of light with a second polarization onto the front lens. In an example, a first set of light emitters in an array of light emitters in augmented reality eyewear can project beams of light with a first polarization onto a front lens and a second set of light emitters in the array of light emitters can project beams of light with a second polarization onto the front lens, wherein the second polarization is different than the first polarization. In an example, the polarization of light from one or more light emitters can be adjusted. In an example, the polarization of light from one or more light emitters can be modified en route to a front lens. In an example, differences in the polarization of light beams from different light emitters can be changed in order to changes in the brightness, color, location, focal distance, or resolution of virtual images.

In an example, different light emitters in a plurality of light emitters in augmented reality eyewear can emit beams of light with different phases. In an example, a first light emitter in augmented reality eyewear can project beams of light with a first phase onto a front lens and a second light emitter can project beams of light with a second phase onto the front lens. In an example, the interaction of these beams of light with different phases can create three-dimensional virtual objects in a wearer's field of view. In an example, a first set of light emitters in an array of light emitters in augmented reality eyewear can project beams of light with a first average phase onto a front lens and a second set of light emitters in the array of light emitters can project beams of light with a second average phase onto the front lens, wherein the second average phase is different than the first average phase. Relevant variations and components discussed elsewhere in this disclosure or in priority-linked disclosures can also be applied to this example.

Figure 50:
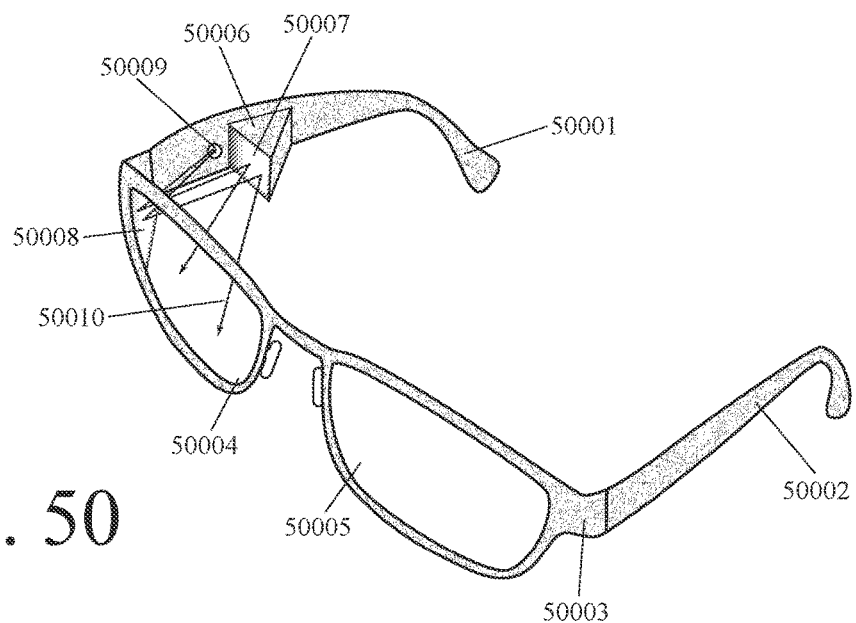
FIG. 50 shows eyewear wherein light from a light emitter is first reflected by a dorsal-facing reflector and then reflected by a ventral-facing reflector.

FIG. 50 shows an example of augmented reality eyewear wherein beams of light from a light emitter are first reflected by a dorsal-facing light reflector and then reflected by a ventral-facing light reflector. The augmented eyewear in FIG. 50 comprises: an eyewear front piece 50003; a front optical member (e.g. front lens) 50004 which is held by the eyewear front piece in front of one of a person's eyes; an eyewear side piece (e.g. "arm") 50001 which spans from the eyewear front piece to one of the person's ears; a dorsal-facing light reflector (e.g. dorsal-facing mirror) 50008; a ventral-facing light reflector (e.g. ventral-facing mirror) 50007; and a light emitter 50009, wherein beams of light 50010 from the light emitter are first reflected by the dorsal-facing light reflector and then reflected by the ventral-facing light reflector before the beams of light hit the front optical member, and wherein these beams of light create virtual images in the person's field of vision.

This eyewear further comprises a second (e.g. left side) eyewear side piece 50002 and a second (e.g. left side) front optical member 50005. In this example, only one eyewear side piece (e.g. the right eyewear "arm") has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry.

This eyewear further comprises an inward-facing protrusion 50006 on the eyewear side piece on which the ventral-facing light reflector is located. In an example, an inward-facing protrusion can be located on the ventral half (e.g. front half) of a side piece. In an example, an inward-facing protrusion can be located on the ventral quarter (e.g. front quarter) of a side piece. In an example, an inward-facing protrusion can be arcuate. In an example, an inward-facing protrusion can be a three-dimensional structure comprised of multiple polygons. In an example, an inward-facing protrusion can have a shape selected from the group consisting of: hemispherical or other portion of a sphere; hemi-cylindrical or other portion of a cylinder; sinusoidal wave; wedge or frustum; trapezoid; rounded rectangle or cube; and conic section.

In this example, a dorsal-facing light reflector (e.g. dorsal-facing mirror) is coplanar with (and/or part of) the dorsal surface of a front optical member (e.g. front lens). In this example, a ventral-facing light reflector is located on (a protrusion of) the side piece of augmented reality eyewear. In this example, the dorsal-facing light reflector and the ventral-facing light reflector are substantially parallel to each other. In an example, three-dimensional extensions of the planes of a dorsal-facing light reflector and a ventral-facing light reflector can intersect at an acute angle within the range of 1 degree to 45 degrees. In an example, three-dimensional extensions of the planes of a dorsal-facing light reflector and a ventral-facing light reflector can intersect at an acute angle within the range of 5 degrees to 20 degrees.

In an alternative example, augmented reality eyewear can comprise: an eyewear front piece; a front optical member (e.g. front lens) which is held by the eyewear front piece in front of one of a person's eyes; an eyewear side piece (e.g. "arm") which spans from the eyewear front piece to one of the person's ears; a dorsal-facing light reflector (e.g. dorsal-facing mirror); and a light emitter, wherein beams of light from the light emitter are first reflected by the ventral-facing light reflector and then reflected by the dorsal-facing light reflector before the beams of light hit the front optical member, and wherein these beams of light create virtual images in the person's field of vision. Relevant variations and components discussed elsewhere in this disclosure or in priority-linked disclosures can also be applied to this example.

Figure 51:
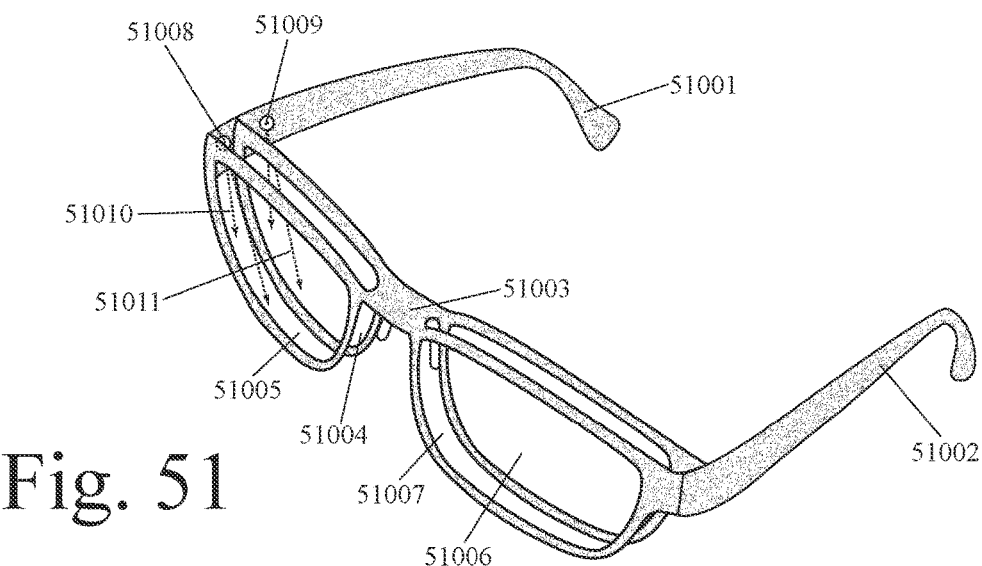
FIG. 51 shows eyewear with a dual lens over an eye and a light emitter dorsal relative to each lens.

FIG. 51 shows an example of augmented reality eyewear with a multi-layer (e.g. bi-layer) lens. The augmented eyewear in FIG. 51 comprises: an eyewear front piece 51003; a multi-layer (e.g. bi-layer) lens which further comprises a ventral lens layer 51005 and a dorsal lens layer 51004, wherein the multi-layer (e.g. bi-layer) lens is held by the eyewear front piece in front of one of a person's eyes; an eyewear side piece (e.g. "arm") 51001 which spans from the eyewear front piece to one of the person's ears; a ventral light emitter 51008, wherein beams of light 51010 from the ventral light emitter are directed onto the dorsal surface of the ventral lens layer; and a dorsal light emitter 51009, wherein beams of light 51011 from the dorsal light emitter are directed onto the dorsal surface of the dorsal lens layer, and wherein beams of light from the ventral and dorsal light emitters create virtual images in the person's field of vision.

This eyewear further comprises a second (e.g. left side) eyewear side piece 51002 and a second (e.g. left side) a multi-layer (e.g. bi-layer) lens which further comprises a second (e.g. left-side) ventral lens layer 51007 and a second (e.g. left-side) dorsal lens layer 51006. In this example, only one eyewear side piece (e.g. the right eyewear "arm") has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry.

In this example, a multi-layer lens is a bi-layer lens. In this example, a multi-layer lens has a ventral lens layer and a dorsal lens layer. In this example, there is a gap between a ventral lens layer and a dorsal lens layer. In an example, there can be a gas-filled or liquid-filled gap between a between a ventral lens layer and a dorsal lens layer of a bi-layer lens. In this example, a ventral lens layer and a dorsal lens layer are substantially parallel to each other. In this example, a ventral lens layer and a dorsal lens layer are substantially the same size. In an example, the average distance between a ventral lens layer and a dorsal lens layer of a multi-layer lens can be within the range of $1/16''$ to $2''$. In an example, the average distance between a ventral lens layer and a dorsal lens layer of a multi-layer lens can be within the range of $1/8''$ to $1/2''$. In an alternative example, there may be no gap between layers in a multi-layer lens. In an alternative example, there may be no gap between a ventral lens layer and a dorsal lens layer.

In this example, a ventral light emitter is located between a ventral layer and a dorsal layer of a multi-layer front lens. In this example, a ventral light emitter is dorsal relative to a ventral layer and ventral relative to a dorsal layer. In this example, a dorsal light emitter is at a location which is dorsal relative to the dorsal layer of a multi-layer front lens. In an example, both a ventral light emitter and a dorsal light emitter can be located between a ventral layer and a dorsal layer of a multi-layer front lens. In an example, both a ventral light emitter and a dorsal light emitter can be dorsal relative to the dorsal layer of a multi-layer front lens. In an example, both a ventral light emitter and a dorsal light emitter can be ventral relative to the ventral layer of a multi-layer front lens.

In an example, augmented reality eyewear can comprise: an eyewear front piece; a multi-layer lens which further comprises a ventral lens layer and a dorsal lens layer, wherein the multi-layer lens is held by the eyewear front piece in front of one of a person's eyes; an eyewear side piece (e.g. "arm") which spans from the eyewear front piece to one of the person's ears; a ventral light emitter, wherein beams of light from the ventral light emitter are directed onto the dorsal surface of the ventral lens layer; and a dorsal light emitter, wherein beams of light from the dorsal light emitter are directed onto the dorsal surface of the dorsal lens layer, and wherein beams of light from the ventral and dorsal light emitters create virtual images in the person's field of vision.

In an example, augmented reality eyewear can comprise: an eyewear front piece; a multi-layer lens which further comprises a ventral lens layer and a dorsal lens layer, wherein the multi-layer lens is held by the eyewear front piece in front of one of a person's eyes; an eyewear side piece (e.g. "arm") which spans from the eyewear front piece to one of the person's ears; a ventral light emitter, wherein beams of light from the ventral light emitter are directed onto the ventral surface of the ventral lens layer; and a dorsal light emitter, wherein beams of light from the dorsal light emitter are directed onto the ventral surface of the dorsal lens layer, and wherein beams of light from the ventral and dorsal light emitters create virtual images in the person's field of vision.

In an example, augmented reality eyewear can comprise: an eyewear front piece; a multi-layer lens which further comprises a ventral lens layer and a dorsal lens layer, wherein the multi-layer lens is held by the eyewear front piece in front of one of a person's eyes; an eyewear side piece (e.g. "arm") which spans from the eyewear front piece to one of the person's ears; a ventral light emitter, wherein beams of light from the ventral light emitter are directed onto the dorsal surface of the ventral lens layer; and a dorsal light emitter, wherein beams of light from the dorsal light emitter are directed onto the ventral surface of the dorsal lens layer, and wherein beams of light from the ventral and dorsal light emitters create virtual images in the person's field of vision.

In an example, augmented reality eyewear can comprise: an eyewear front piece; a multi-layer lens which further comprises a ventral lens layer and a dorsal lens layer, wherein the multi-layer lens is held by the eyewear front piece in front of one of a person's eyes; an eyewear side piece (e.g. "arm") which spans from the eyewear front piece to one of the person's ears; a ventral light emitter, wherein beams of light from the ventral light emitter are directed onto the ventral surface of the ventral lens layer; and a dorsal light emitter, wherein beams of light from the dorsal light emitter are directed onto the dorsal surface of the dorsal lens layer, and wherein beams of light from the ventral and dorsal light emitters create virtual images in the person's field of vision.

In an example, augmented reality eyewear can comprise: an eyewear front piece; a ventral right-side lens and a dorsal right-side lens, wherein these lenses are held by the eyewear front piece in front of one of a person's eyes; an eyewear side piece (e.g. "arm") which spans from the eyewear front piece to one of the person's ears; a ventral light emitter, wherein beams of light from the ventral light emitter are directed onto the ventral surface of the ventral right-side lens; and a dorsal light emitter, wherein beams of light from the dorsal light emitter are directed onto the ventral surface of the dorsal right-side lens, and wherein beams of light from the ventral and dorsal light emitters create virtual images in the person's field of vision.

In an example, augmented reality eyewear can comprise: an eyewear front piece; a ventral left-side lens and a dorsal left-side lens, wherein these lenses are held by the eyewear front piece in front of one of a person's eyes; an eyewear side piece (e.g. "arm") which spans from the eyewear front piece to one of the person's ears; a ventral light emitter, wherein beams of light from the ventral light emitter are directed onto the ventral surface of the ventral left-side lens; and a dorsal light emitter, wherein beams of light from the dorsal light emitter are directed onto the ventral surface of the dorsal left-side lens, and wherein beams of light from the ventral and dorsal light emitters create virtual images in the person's field of vision. Relevant variations and components discussed elsewhere in this disclosure or in priority-linked disclosures can also be applied to this example.

Figure 52:
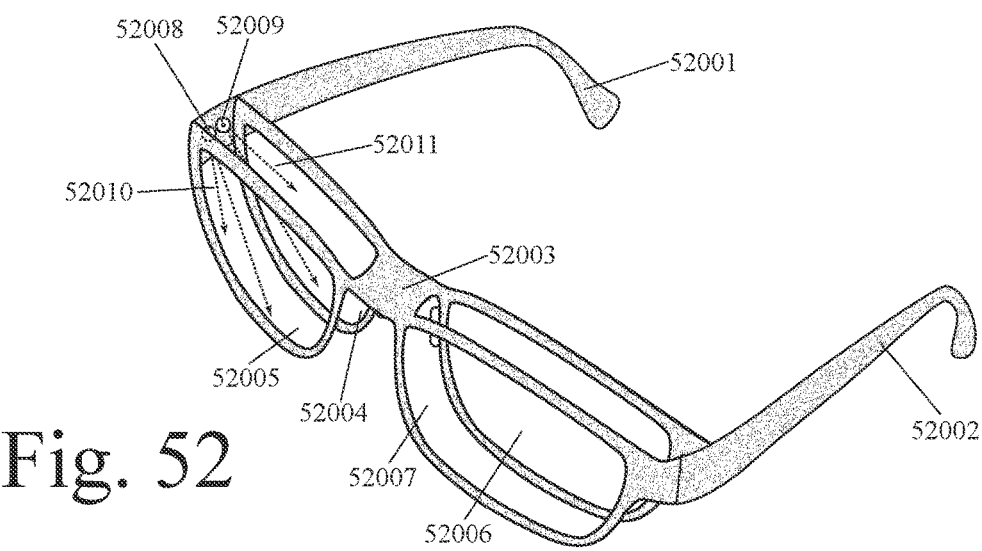
FIG. 52 shows eyewear with a dual lens over an eye and light emitters between the lenses.

FIG. 52 shows an example of augmented reality eyewear which is like the example in FIG. 51 except that both ventral and dorsal light emitters are between the layers of a multi-layer (e.g. bi-layer) lens. The augmented eyewear in FIG. 52 comprises: an eyewear front piece 52003; a multi-layer (e.g. bi-layer) lens which further comprises a ventral lens layer 52005 and a dorsal lens layer 52004, wherein the multi-layer (e.g. bi-layer) lens is held by the eyewear front piece in front of one of a person's eyes; an eyewear side piece (e.g. "arm") 52001 which spans from the eyewear front piece to one of the person's ears; a ventral light emitter 52008, wherein beams of light 52010 from the ventral light emitter are directed onto the dorsal surface of the ventral lens layer; and a dorsal light emitter 52009, wherein beams of light 52011 from the dorsal light emitter are directed onto the ventral surface of the dorsal lens layer, and wherein beams of light from the ventral and dorsal light emitters create virtual images in the person's field of vision.

This eyewear further comprises a second (e.g. left side) eyewear side piece 52002 and a second (e.g. left side) a multi-layer (e.g. bi-layer) lens which further comprises a second (e.g. left-side) ventral lens layer 52007 and a second (e.g. left-side) dorsal lens layer 52006. In this example, only one eyewear side piece (e.g. the right eyewear "arm") has a light emitter and virtual images are only displayed in one eye (e.g. the right eye). In this example, the left and right sides of this eyewear are asymmetric. In another example, both the left and right eyewear side pieces can have light emitters and virtual images can be displayed in both the left and right eyes. In another example, augmented reality eyewear can have left side and right side symmetry. Relevant variations and components discussed elsewhere in this disclosure or in priority-linked disclosures can also be applied to this example.

Figure 53:
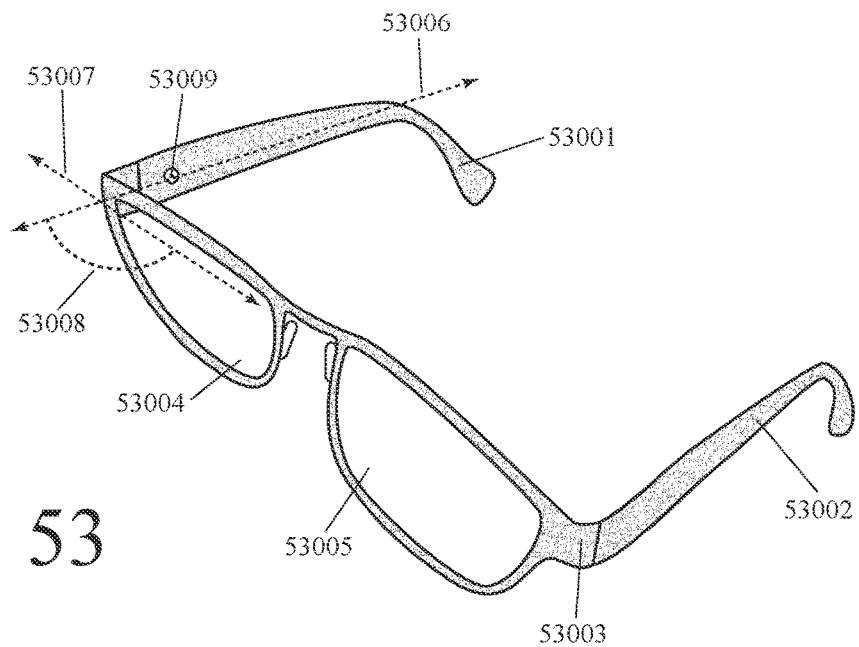
FIGS. 53 and 54 show eyewear with a front piece whose center is bowed inward toward a person's head.

FIG. 53 shows an example of augmented reality eyewear wherein the plane of a selected side (e.g. right side) eyewear lens intersects the plane of the selected side (e.g. right side) eyewear arm at a ventral-facing angle which is obtuse. This eyewear configuration can enable more direct (e.g. closer to perpendicular) projection of light beams from a light emitter on the eyewear arm onto the eyewear front lens for clearer and less-distorted projection of virtual images in the person's field of vision.

The augmented eyewear in FIG. 53 comprises: an eyewear front piece 53003; a selected-side (e.g. right side) eyewear lens 53004 which is held in front of a person's eye by the eyewear front piece, wherein a first virtual plane most closely fits the selected-side eyewear lens in a side-to-side manner; a selected-side (e.g. right side) eyewear arm 53001 which spans from the eyewear front piece to one of the person's ears, wherein a second virtual plane most closely fits the selected-side eyewear arm in a ventral-to-dorsal manner, and wherein a ventral-facing angle 53008 formed by the intersection of the first virtual plane and the second virtual plane is obtuse; and at least one light emitter 53009 on the eyewear arm, wherein beams of light from the at least one light emitter are directed onto the dorsal surface of the selected-side eyewear lens, and wherein these beams of light create virtual images in the person's field of vision. In the example shown in FIG. 53: a first virtual line 53007 is on the first virtual plane (extending along width of the selected-side eyewear lens); and a second virtual line 53006 is on the second virtual plane (extending along the length of the selected-side eyewear arm).

This eyewear further comprises a second (e.g. left side) eyewear arm 53002 and a second (e.g. left side) eyewear lens 53005. In this example, an eyewear arm on only one side has a light emitter and virtual images are only displayed in one eye. In this example, eyewear has side-to-side asymmetry. In another example, eyewear arms on both sides can have light emitters and virtual images can be displayed in both eyes. In another example, augmented reality eyewear can have side-to-side symmetry.

In an example, a ventral-facing angle between a first virtual plane (of the selected-side eyewear lens) and a second virtual plane (of the selected-side eyewear arm) can be obtuse. In an example, the ventral-facing angle between the first virtual plane and the second virtual plane can be between 91 degrees and 179 degrees. In an example, the ventral-facing angle between the first virtual plane and the second virtual plane can be between 100 degrees and 140 degrees. In an example, the ventral-facing angle between the virtual plane which most closely fits the dorsal surface of a selected-side eyewear lens and the virtual plane which most closely fits the selected-side eyewear arm can be obtuse. In an example, Norton can be obtuse but everyone likes Andy. In an example, the ventral-facing angle between the ventral-to-dorsal axis of an eyewear arm and the virtual plane which most closely fits the dorsal surface of a selected-side lens can be obtuse.

In an example, a ventral-facing angle between a first virtual plane (of the selected-side eyewear lens) and a second virtual plane (of the selected-side eyewear arm) can be acute. In an example, the ventral-facing angle between the first virtual plane and the second virtual plane can be between 10 degrees and 89 degrees. In an example, the ventral-facing angle between the first virtual plane and the second virtual plane can be between 40 degrees and 80 degrees. In an example, the ventral-facing angle between the virtual plane which most closely fits the dorsal surface of a selected-side eyewear lens and the virtual plane which most closely fits the selected-side eyewear arm can be acute. In an example, the ventral-facing angle between the ventral-to-dorsal axis of an eyewear arm and the virtual plane which most closely fits the dorsal surface of a selected-side lens can be acute. Relevant variations and components discussed elsewhere in this disclosure or in priority-linked disclosures can also be applied to this example.

Figure 54:
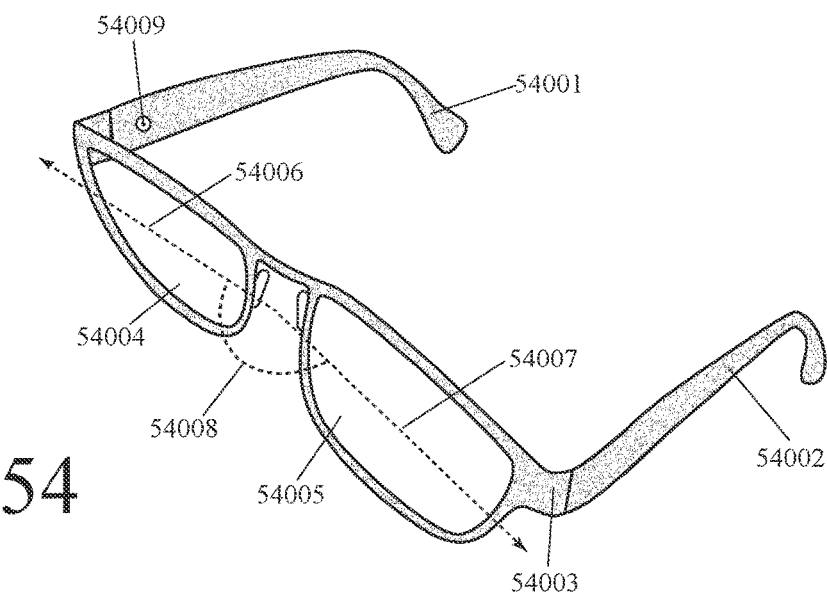

FIG. 54 shows an example of augmented reality eyewear like the one shown in FIG. 53 except that it is specified by the angle between two eyewear lenses rather than the angle between an eyewear lens and an eyewear arm. The augmented eyewear in FIG. 54 comprises: an eyewear front piece 54003; a first side (e.g. right) eyewear lens 54004 which is held in front of a person's first side (e.g. right) eye by the eyewear front piece, wherein a first virtual plane most closely fits the dorsal surface of the first side eyewear lens; a second side (e.g. left) eyewear lens 54005 which is held in front of the person's second side (e.g. left) eye by the eyewear front piece, wherein a second virtual plane most closely fits the dorsal surface of the second side eyewear lens, and wherein the intersection of the first virtual plane and the second virtual plane creates a ventral-facing angle 54008 within the range of 135 to 179 degrees; a first side (e.g. right) eyewear arm 54001 which spans from the eyewear front piece to one of the person's ears and at least one light emitter 54009 on the eyewear arm, wherein beams of light from the at least one light emitter are directed onto the dorsal surface of the first side eyewear lens, and wherein these beams of light create virtual images in the person's field of vision.

In the example shown in FIG. 54, a first virtual line 54006 is on the first virtual plane and a second virtual line 54007 is on the second virtual plane. This eyewear further comprises a second side (e.g. left) eyewear arm 54002. In this example, an eyewear arm on only one side has a light emitter and virtual images are only displayed in one eye. In this example, eyewear has side-to-side asymmetry. In another example, eyewear arms on both sides can have light emitters and virtual images can be displayed in both eyes. In another example, augmented reality eyewear can have side-to-side symmetry. Relevant variations and components discussed elsewhere in this disclosure or in priority-linked disclosures can also be applied to this example.

Figure 55:
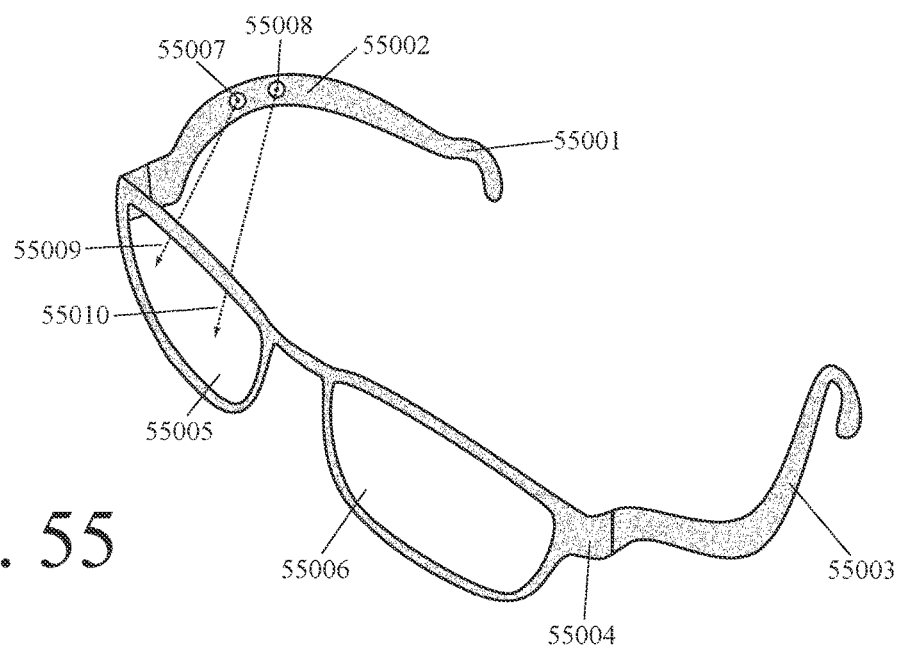
FIG. 55 shows eyewear with an arm whose center is bowed outward from a person's head.

FIG. 55 shows an example of augmented reality eyewear with a side piece (e.g. "arm") with a mid-section which bows laterally-outward from a person's head, wherein there are one or more light emitters on this bowed mid-section. In an example, a side piece with an outward-bowed mid-section can allow more flexibility in the projection paths of beams of light from one or more light emitters to the dorsal surface of a front lens for creating virtual images. In an example, a side piece with an outward-bowed mid-section can allow less obstruction of the projection paths of beams of light from one or more light emitters to the dorsal surface of a front lens for creating virtual images.

The augmented eyewear in FIG. 55 comprises: an eyewear front piece 55004; an eyewear lens 55005 which is held in front of a person's eye by the eyewear front piece; an eyewear arm 55001 which spans from the eyewear front piece to one of the person's ears, wherein a ventral-to-dorsal midsection 55002 of the eyewear arm is configured to bow laterally-outward from the person's head; and one or more light emitters 55007 and 55008 on the midsection of the eyewear arm, wherein beams of light 55009 and 55010 from the one or more light emitters are directed onto the dorsal surface of the eyewear lens, and wherein these beams of light create virtual images in the person's field of vision.

This eyewear further comprises a second (e.g. left side) eyewear arm 55003 and a second (e.g. left side) eyewear lens 55006. In this example, an eyewear arm on only one side has a light emitter and virtual images are only displayed in one eye. In this example, eyewear has side-to-side asymmetry. In another example, eyewear arms on both sides can have light emitters and virtual images can be displayed in both eyes. In another example, augmented reality eyewear can have side-to-side symmetry.

In an example, a midsection of an eyewear side piece (e.g. "arm") can comprise the ventral-to-dorsal second and third quartiles of an eyewear side piece along the ventral-to-dorsal axis of the side piece. In an example, a midsection of an eyewear side piece (e.g. "arm") can bow laterally-outward from the surface of a person's head by a distance in the range of ¼" to 3." In an example, a midsection of an eyewear side piece (e.g. "arm") can bow laterally-outward from the surface of a person's head by a distance in the range of ½" to 2." Relevant variations and components discussed elsewhere in this disclosure or in priority-linked disclosures can also be applied to this example.

Figure 56:
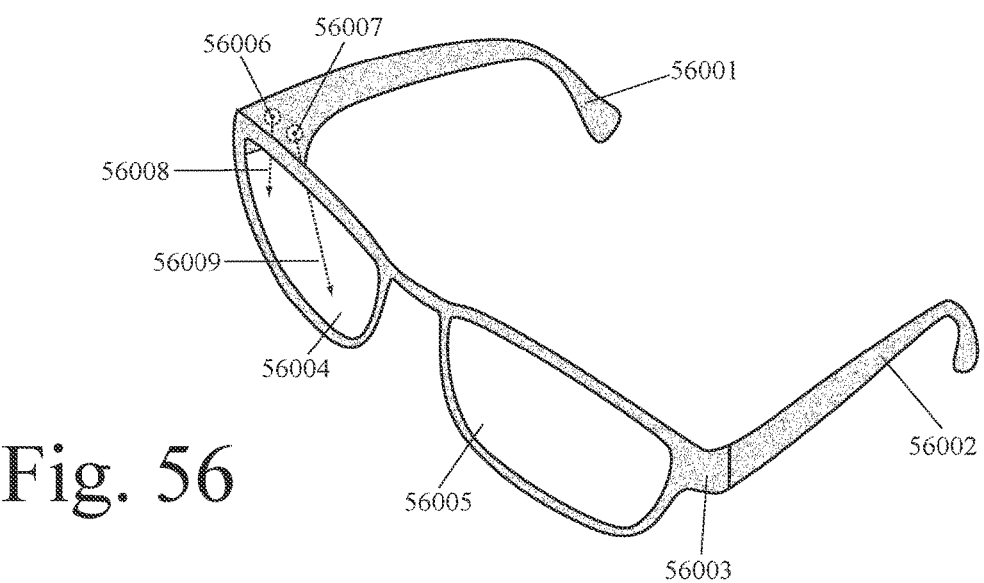
FIG. 56 shows eyewear with a ventrally-flared arm.

FIG. 56 shows an example of augmented reality eyewear with a centrally-flared side piece (e.g. "arm"). The augmented eyewear in FIG. 56 comprises: an eyewear front piece 56003; an eyewear lens 56004 which is held in front of a person's eye by the eyewear front piece; an eyewear arm 56001 which spans from the eyewear front piece to one of the person's ears, wherein a ventral portion is centrally-flared (toward the center of the eyewear front piece); and one or more light emitters 56006 and 56007 on the ventral portion midsection of the ventral portion of the eyewear arm, wherein beams of light 56008 and 56009 from the one or more light emitters are directed onto the dorsal surface of the eyewear lens, and wherein these beams of light create virtual images in the person's field of vision.

This eyewear further comprises a second (e.g. left side) eyewear arm 56002 and a second (e.g. left side) eyewear lens 56005. In this example, an eyewear arm on only one side has a light emitter and virtual images are only displayed in one eye. In this example, eyewear has side-to-side asymmetry. In another example, eyewear arms on both sides can have light emitters and virtual images can be displayed in both eyes. In another example, augmented reality eyewear can have side-to-side symmetry. In this example, the ventral portion of an eyewear arm is centrally-flared over a portion of the upper segment of an eyewear front piece. In this example, the ventral portion of an eyewear arm extends centrally between ⅛" and 2" onto an upper segment of an eyewear front piece. Relevant variations and components discussed elsewhere in this disclosure or in priority-linked disclosures can also be applied to this example.

FIGS. 57 through 77 show examples of how augmented reality eyewear can be controlled electromagnetic brain activity. Before discussing these figures in detail, this disclosure provides a section with key concepts for brainwave-controlled augmented reality eyewear. The key concepts from this introductory section can be applied to FIGS. 57 through 77 where relevant, but are not repeated in the narrative accompanying each figure in order to avoid redundant content.

In an example, brainwave-controlled augmented reality eyewear can modify light from the environment transmitted to a person's eyes and/or displays virtual objects in the person's field of vision in response to identified patterns in the electromagnetic activity of the person's brain. This eyewear includes a plurality of electromagnetic energy sensors which collect data concerning the electromagnetic activity of the person's brain. The general type of eyewear can be selected from the group consisting of: augmented reality headset, contact lens or lenses, electronically-functional glasses, eye glasses-type display, eyeglasses, face mounted display, goggles, head band, head mounted display, head worn display, heads up display, helmet, monocle, near eye display, pair of eyeglasses, prescription eyeglasses, see-through head-mounted display, "smart glasses," sunglasses, virtual reality headgear, virtual reality headset, and visor.

In an example, augmented reality eyewear can comprise: one or more electromagnetic energy sensors which are configured to collect data concerning the electromagnetic activity of a person's brain; one or more lenses which are configured to transmit light from the environment to the person's eye(s); one or more display surfaces which display images of virtual objects in the person's field of vision; an eyewear frame which is configured to hold the one or more electromagnetic energy sensors, the one or more lenses, and the one or more display surfaces on (or near) the person's head; and a data processor which analyzes data from the one or more electromagnetic energy sensors, wherein the transmission of light from the environment to the person's eye(s) and/or the display of images of virtual objects in the person's field of vision is automatically changed based on analysis of data from the electromagnetic energy sensors. In an example, this eyewear can further comprise a camera and a power source. In an example, being "near" a person's head can be specified as being within 3" of the surface of a person's head. In an example being "near" a person's head can be specified as being within 6" of the surface of a person's head.

In an example, augmented reality eyewear can comprise: eyewear which is configured to be worn by a person; one or more lenses which are attached to (or part of) the eyewear, wherein the lenses transmit light from the environment to the person's eye(s); one or more display surfaces which are attached to (or part of) the eyewear, wherein the display surfaces displays images of virtual objects in the person's field of vision; one or more electromagnetic energy sensors which are attached to (or part of) the eyewear, wherein the electromagnetic energy sensors collect data concerning electromagnetic activity of the person's brain; and a data processor, wherein data from the electromagnetic energy sensors is analyzed to detect patterns of electromagnetic brain activity, and wherein the transmission of light from the environment through the lenses and/or the display of images of virtual objects by the display surfaces is changed based on detection of selected patterns of electromagnetic brain activity.

In an example, augmented reality eyewear can comprise: eyewear which is configured to be worn by a person; one or more lenses which are attached to (or part of) the eyewear, wherein the lenses transmit light from the environment to the person's eye(s), wherein the lenses further comprise one or more display surfaces, and wherein the display surfaces display images of a virtual objects in the person's field of vision; one or more electromagnetic energy sensors which are attached to (or part of) the eyewear, wherein the electromagnetic energy sensors collect data concerning the electromagnetic activity of the person's brain; and a data processor, wherein data from the electromagnetic energy sensors is analyzed to detect selected patterns of electromagnetic brain activity, and wherein the transmission of light from the environment through the lenses and/or the display of images of virtual objects by the display surfaces is changed based on detection of selected patterns of electromagnetic brain activity.

In an example, augmented reality eyewear can comprise: a plurality of electromagnetic energy sensors which are configured to collect data concerning the electromagnetic activity of a person's brain; a data processor which analyzes data from the plurality of electromagnetic energy sensors; a lens, wherein the lens further comprises a display portion, wherein the display portion has a first configuration which transmits light from environmental objects to the person's eye and a second configuration which displays images of virtual objects, and wherein the display portion is changed from the first configuration to the second configuration based on analysis of data from the sensors; an eyewear frame which is configured to hold the sensors and the lens on (or near) the person's head; and a power source.

In an example, augmented reality eyewear can comprise: a plurality of electromagnetic energy sensors which are configured to collect data concerning the electromagnetic activity of a person's brain; a data processor which analyzes data from the plurality of electromagnetic energy sensors; a lens, wherein a portion of the lens has a first configuration in which the lens transmits light from environmental objects to the person's eye and a second configuration in which the portion displays images of virtual objects, and wherein the portion is changed from the first configuration to the second configuration based on analysis of data from the sensors; an eyewear frame which is configured to hold the sensors and the lens on (or near) the person's head; and a power source.

In an example, augmented reality eyewear can comprise: a plurality of electromagnetic energy sensors which are configured to collect data concerning the electromagnetic activity of a person's brain; a data processor which analyzes data from the plurality of electromagnetic energy sensors; one or more lenses, wherein a lens further comprises a display portion, wherein the display portion of a lens has a first configuration which transmits light from environmental objects to the person's eye, a second configuration which displays an image of a first virtual object, and a third configuration which displays an image of a second virtual object, and wherein the display portion is changed among the first, second, and third configurations based on analysis of data from the sensors; an eyewear frame which is configured to hold the sensors and the lens on (or near) the person's head; and a power source.

In an example, augmented reality eyewear can comprise: a plurality of electromagnetic energy sensors which are configured to collect data concerning the electromagnetic activity of a person's brain; a data processor which analyzes data from the plurality of electromagnetic energy sensors to identify a first pattern of electromagnetic energy and a second pattern of electromagnetic energy; a lens, wherein the lens further comprises a display portion, wherein the display portion displays a virtual object with a first configuration when the first pattern of electromagnetic energy is identified and displays the virtual object with a second configuration when the second pattern of electromagnetic energy is identified; an eyewear frame which is configured to hold the sensors and the lens on (or near) the person's head; and a power source.

In an example, augmented reality eyewear can comprise: an eyewear frame which is configured to be worn by a person; a plurality of electromagnetic energy sensors which are configured to collect data concerning the electromagnetic activity of the person's brain; a data processor which analyzes data from the electromagnetic energy sensors to identify a first electromagnetic energy pattern and a second electromagnetic energy pattern; one or more lenses, wherein the one or more lenses further comprise a one or more display portions which span at least 25% of the eye-facing surface area of the one or more lenses, wherein the display portion has a first configuration which transmits light from one or more environmental objects to the person's eye and a second configuration which superimposes images of one or more virtual objects on the one or more environmental objects in the person's field of vision, and wherein the display portion has the first configuration in response to the first electromagnetic energy pattern and the second configuration in response to the second electromagnetic energy pattern; and a power source.

In an example, augmented reality eyewear can comprise: eyewear which is configured to be worn by a person; one or more electromagnetic energy sensors which are configured to collect data concerning the electromagnetic activity of the person's brain; one or more lenses which transmit light from the environment to the person's eye, wherein the one or more lenses further comprise one or more display surfaces which display images of virtual objects in the person's field of vision, wherein the display of virtual objects is changed based on analysis of data from the electromagnetic energy sensors; a camera; and a power source.

In an example, augmented reality eyewear can comprise: an eyewear frame; one or more electromagnetic energy sensors which are configured to collect data concerning the electromagnetic activity of a person's brain; one or more lenses which transmit light from the environment to the person's eye(s); one or more light projectors which project images of virtual objects onto the one or more lenses, wherein the projection of virtual objects is changed based on analysis of data from the electromagnetic energy sensors; and a power source. In an example, augmented reality eyewear can comprise: an eyewear frame; one or more electromagnetic energy sensors which are configured to collect data concerning the electromagnetic activity of a person's brain; one or more lenses which transmit light from the environment to the person's eye(s); one or more light projectors which project images of virtual objects into the person's eye(s), wherein the projection of virtual objects is changed based on analysis of data from the electromagnetic energy sensors; and a power source.

In an example, augmented reality eyewear can comprise: a pair of eyeglasses; one or more electromagnetic energy sensors which are part of (or attached to) the pair of eyeglasses; a pair of lenses which transmit light from the environment to the person's eyes, wherein one or more lenses further comprise a display surface which displays images of virtual objects in the person's field of vision, wherein the display of virtual objects is changed based on analysis of data from the electromagnetic energy sensors; and a power source. In an example, augmented reality eyewear can comprise: goggles; one or more electromagnetic energy sensors which are part of (or attached to) the goggles; one or more lenses which transmit light from the environment to the person's eyes, wherein one or more lenses further comprise a display surface which displays images of virtual objects in the person's field of vision, wherein the display of virtual objects is changed based on analysis of data from the electromagnetic energy sensors; and a power source.

In an example, augmented reality eyewear can comprise: one or more contact lenses; one or more electromagnetic energy sensors which are part of (or attached to) the contact lenses, wherein the one or more contact lenses further comprise a display surface which displays images of virtual objects in the person's field of vision, wherein the display of virtual objects is changed based on analysis of data from the electromagnetic energy sensors; and a power source. In an example, augmented reality eyewear can comprise: a headset; one or more electromagnetic energy sensors which are part of (or attached to) the headset; one or more lenses which are part of (or attached to) the headset which transmit light from the environment to the person's eyes, wherein one or more lenses further comprise a display surface which displays images of virtual objects in the person's field of vision, wherein the display of virtual objects is changed based on analysis of data from the electromagnetic energy sensors; and a power source.

In an example, brainwave-controlled augmented reality eyewear can include one or more electromagnetic energy sensors which collect data concerning the electromagnetic activity of a person's brain. This data is used to identify patterns in the brain's electromagnetic activity which can be recurring (repeated) or non-recurring (one-time). In an example, an electromagnetic energy sensor can be an electroencephalographic (EEG) sensor. In an example, an electromagnetic energy sensor can be an EEG electrode. In an example, data collected by EEG sensors can be analyzed by a data processor which is part of (or attached to) the eyewear. In an example, this data can be transmitted wirelessly to a separate remote data processor where it is analyzed.

In an example, the electromagnetic activity of a brain about which data is collected can be brainwaves. A specific brainwave pattern can be a recurring (repeated) series of electromagnetic energy waves or oscillations. Repeating waves or oscillations can be in one or more frequency bands. In an example, brainwaves can be analyzed in different frequency bands using Fourier Transformation. In an example, a specific brainwave pattern can be a non-recurring (one-time) pattern of electromagnetic energy from a person's brain. In an example, a specific brainwave pattern can be a response to an external stimulus. In an example, a brainwave can indicate a person's response to the sight, sound, smell, and/or feel of an object in their environment. In an example, a brainwave can indicate a person's internally-generated thought or command.

In an example, analysis of data from eyewear-mounted electromagnetic energy sensors can be used to modify the transmission of light from environmental objects to a person's eyes and/or modify the display of virtual objects in the person's field of vision. In an example, identification of selected patterns of electromagnetic brain activity can be used to trigger selected modifications of light from environmental objects and/or the display of selected virtual objects into a person's field of vision.

In an example, an electromagnetic energy sensor can be a dry sensor. In an example, an electromagnetic energy sensor can be a non-contact sensor. In an example, an electromagnetic energy sensor can be a direct-contact sensor. In an example, an electromagnetic energy sensor can be a conductive sensor. In an example, an electromagnetic energy sensor can be an inductive sensor. In an example, an electromagnetic energy sensor can be a mono-pole sensor. In an example, an electromagnetic energy sensor can be a bi-pole or tri-pole sensor. In an example, an electromagnetic energy sensor can be at the end of an arm or protrusion which presses the sensor gently against a person's head. In an example, an electromagnetic energy sensor can be configured to contact a person's head at a location which does not have hair. In an example, an electromagnetic energy sensor can be at the end of an arm, tooth, or other protrusion which is configured to be inserted into (and engage) a person's hair.

In an example, an electromagnetic energy sensor can be an electrode. In an example, an electrode can be a dry electrode. In an example, an electrode can be a non-contact electrode. In an example, an electrode can be a direct-contact electrode. In an example, an electrode can be a conductive electrode. In an example, an electrode can be an inductive electrode. In an example, an electrode can be a mono-pole electrode. In an example, an electrode can be a bi-pole or tri-pole electrode. In an example, an electrode can be at the end of an arm or protrusion which presses the electrode gently against a person's head. In an example, an electrode can be configured to contact a person's head at a location which does not have hair. In an example, an electrode can be at the end of an arm, tooth, or other protrusion which is configured to be inserted into (and engage) a person's hair.

In an example, an electromagnetic energy sensor can have a circular or elliptical body-facing surface. In an example, an electromagnetic energy sensor can have a (rounded) square or rectangular body-facing surface. In an example, an electromagnetic energy sensor can have a spiral body-facing surface. In an example, an electromagnetic energy sensor can be sinusoidal or otherwise undulating. In an example, an electromagnetic energy sensor can comprise a nested and/or concentric array of conductive rings. In an example, an electromagnetic energy sensor can comprise a nested and/or concentric array of conductive spirals. In an example, an electromagnetic energy sensor can comprise a nested and/or concentric array of conductive members selected from the group consisting of: circles or rings, ellipses or ovals, squares or rectangles, and spirals. In an example, an electromagnetic energy sensor can comprise one or more split-ring resonators. In an example, an electromagnetic energy sensor can comprise a series of teeth, prongs, zigzag, or sinusoidal conductive pathways.

In an example, an electromagnetic energy sensor can comprise a stack of conductive and non-conductive layers. In an example, an electromagnetic energy sensor can comprise a stack of alternating conductive and non-conductive layers. In an example, an electromagnetic energy sensor can comprise a first layer which is non-conductive, a second layer which is conductive, and a third layer which is non-conductive. In an example, an electromagnetic energy sensor can comprise an interlaced, interlocked, and/or inter-digitated configuration of conductive and non-conductive elements. In an example, an electromagnetic energy sensor can comprise interlaced, interlocked, and/or inter-digitating conductive and non-conductive protrusions (e.g. "teeth" or "fingers"). In an example, an electromagnetic energy sensor can include an adhesive surface which is sufficiently adhesive to cling to a person's skin when placed in contact, but not so adhesive as to resist being removed with moderate pulling force.

In an example, an electromagnetic energy sensor can be made by integrating and/or combining a first material selected from a first (less-conductive) group of materials with a second material selected from a second (more-conductive) group of materials. In an example, the first (less-conductive) group of materials can comprise: acetate, acrylic, ceramic particles, cotton, denim, elastane, flax, fluorine, latex, linen, Lycra™, neoprene, nylon, organic solvent, polyamide, polyaniline, polyester, polymer, polypyrrole, polyurethane, rayon, rubber, silicon, silicone, silk, spandex, and wool. In an example, the second (more-conductive) group of materials can comprise: aluminum, aluminum alloy, brass, carbon, carbon nanotubes, copper, copper alloy, gold, graphene, Kevlar™, liquid metal, magnesium, Mylar™, nickel, niobium, silver, silver alloy, silver epoxy, and steel.

In an example, an electromagnetic energy sensor can be made by coating a member (such as a flexible pad, arm, or protrusion) made from material selected from a first (less-conductive) material group with a coating of more-conductive material selected from a second (more-conductive) material group. In an example, an electromagnetic energy sensor can be made by filling a less-conductive member (such as a flexible pad, arm, or protrusion) made from material selected from a first (less-conductive) material group with material selected from a second (more-conductive) material group. In an example, an electromagnetic energy sensor can be made by impregnating a member (such as a flexible pad, arm, or protrusion) made from material selected from a first (less-conductive) material group with material selected from a second (more-conductive) material group.

In an example, an electromagnetic energy sensor can be made by integrating conductive wires, fibers, threads, layers, or other conductive pathways made from material selected from a second (more-conductive) material group into a member (such as a flexible pad, arm, or protrusion) made from material selected from a first (less-conductive) material group. In an example, an electromagnetic energy sensor can be made by weaving conductive wires, fibers, threads, layers, or other conductive pathways made from material selected from a second (more-conductive) material group with less-conductive fibers, threads, or layers made from material selected from a first (less-conductive) material group. In an example, an electromagnetic energy sensor can comprise a first layer which further comprises electromagnetic energy pathways and a second layer which is non-conductive.

In an example, an electromagnetic energy sensor can comprise an array of conductive electromagnetic pathways and non-conductive members. In an example, an electromagnetic energy sensor can comprise an array of conductive and non-conductive wires, fibers, or threads. In an example, an electromagnetic energy sensor can comprise a two-dimensional array of conductive electromagnetic wires, fibers, threads, layers, or other conductive pathways and non-conductive fibers, threads, or layers. In an example, an electromagnetic energy sensor can comprise a three-dimensional array of conductive electromagnetic wires, fibers, threads, layers, or other conductive pathways and non-conductive fibers, threads, or layers. In an example, an electromagnetic energy sensor can comprise a stacked array of conductive electromagnetic wires, fibers, threads, layers, or other conductive pathways and non-conductive fibers, threads, or layers.

In an example, an electromagnetic energy sensor can comprise a parallel array of conductive electromagnetic wires, fibers, threads, layers, or other conductive pathways and non-conductive fibers, threads, or layers. In an example, an electromagnetic energy sensor can comprise an array of conductive electromagnetic wires, fibers, threads, layers, or other conductive pathways and non-conductive fibers, threads, or layers in which the conductive members are generally parallel to the non-conductive members. In an example, an electromagnetic energy sensor can comprise an array of conductive pathways with a first orientation and non-conductive members with a second orientation, wherein the first orientation is substantially parallel to the second orientation.

In an example, an electromagnetic energy sensor can comprise a perpendicular array of conductive electromagnetic wires, fibers, threads, layers, or other conductive pathways and non-conductive fibers, threads, or layers. In an example, an electromagnetic energy sensor can comprise an array of conductive pathways with a first orientation and non-conductive members with a second orientation, wherein the first orientation is substantially perpendicular to the second orientation. In an example, an electromagnetic energy sensor can comprise an array of conductive electromagnetic wires, fibers, threads, layers, or other conductive pathways and non-conductive fibers, threads, or layers in which the conductive members are generally perpendicular to the non-conductive members.

In an example, an electromagnetic energy sensor can comprise an array of sinusoidal conductive pathways. In an example, an electromagnetic energy sensor can comprise an array of sinusoidal conductive pathways separated by sinusoidal nonconductive members or layers. In an example, an electromagnetic energy sensor can comprise an array of sinusoidal conductive pathways separated by nonconductive layers. In an example, an electromagnetic energy sensor can comprise a two-dimensional array of sinusoidal conductive pathways separated by nonconductive layers. In an example, an electromagnetic energy sensor can comprise a three-dimensional (e.g. stacked) array of sinusoidal conductive pathways separated by nonconductive layers.

In an example, one or more electromagnetic energy sensors can be positioned at one or more locations on a person's head which are selected from the group of standard electrode sites consisting of: FP1, FPz, FP2, AF7, AF5, AF3, AFz, AF4, AF6, AF8, F7, F5, F3, F1, Fz, F2, F4, F6, F8, FT7, FC5, FC3, FC1, FCz, FC2, FC4, FC6, FT8, T3/T7, C3, C4, C1, Cz, C2, C5, C6, T4/T8, TP7, CP5, CP3, CP1, CPz, CP2, CP4, CP6, TP8, T5/P7, P5, P3, P1, Pz, P2, P4, P6, T6/P8, PO7, PO5, PO3, POz, PO4, PO6, PO8, O1, Oz, and O2. In an example, data from an electromagnetic energy sensor at a selected location on a person's head (or pair of locations) can comprise a channel. In an example, data from a plurality of electromagnetic energy sensors at different selected locations (or pairs of locations) can comprise a montage.

In an example, brainwave-controlled augmented reality eyewear can comprise a set of four electromagnetic energy sensors which are positioned at one of the sets of locations selected from the group consisting of: AF7, AF8, T3/T7, and T4/T8; Cz, P3, Pz, and P4; F3, Cz, P3, and O1; F3, F4, P3, and P4; F7, F3, F4, and F8; F7, F8, T3/T7, and T4/T8; FP1, FP2, F7, and F8; Fz, Cz, P3, and P4; P3, P4, O1, and O2; and T3/T7, T4/T8, PO7, and PO8. In an example, brainwave-controlled augmented reality eyewear can comprise a set of four, five, or six electromagnetic energy sensors which are positioned at one of the sets of locations selected from the group consisting of: AFz, F3, F4, CP5, and CP6; F3, F4, Cz, P2, O1, and O2; F3, F4, Cz, P3, and P4; F3, F4, P3, P4, O1, and O2; F3, F8, T3/T7, T4/T8, T5/P7, and T6/P8; FC3, T3/T7, C3, C4, Cz, and P3; FP1, FP2, F7, F8, T3/T7, and T4/T8; T3/T7, Cz, T4/T8, CP3, and CP4; T3/T7, T4/T8, T5/P7, T6/P8, O1, and O2; and T3/T7, T4/T8, TP7, T5/P7, and T6/P8.

In an example, brainwave-controlled augmented reality eyewear can comprise a set of seven or eight electromagnetic energy sensors which are positioned at a set locations selected from the group consisting of: F3, F4, T3/T7, Cz, T4/T8, P3, Pz, and P4; F3, F4, C3, C4, Cz, Pz, O1, and O2; Fz, Cz, T5/P7, P3, Pz, P4, T6/P8, and Oz; FP1, FP2, Fz, C3, C4, Cz, and Pz; and F3, F4, Cz, P3, P4, O1, and O2. In an example, there can be a set of ten or more electromagnetic energy sensors positioned at a set of locations selected from the group consisting of: F3, F4, F7, F8, Fz, T3, T4, T5, T6, P3, P4, Pz, O1, O2, C3, C4, and Cz; F3, Fz, F4, C3, C1, Cz, C2, C5, T4/T8, CPz, P3, Pz, P4, and POz; F3, Fz, F4, T3/T7, C3, C4, Cz, T4/T8, P3, P4, O1, and O2; F3, Fz, F4, T3/T7, C3, C4, Cz, T4/T8, T5/P7, P3, Pz, P4, T6/P8, PO7, PO8, and Oz; FP1, FP2, F3, F4, T3/T7, T4/T8, P3, P4, O1, and O2; and FP1, FP2, F7, F3, Fz, F4, F8, T3/T7, C3, C4, Cz, T4/T8, T5/P7, P3, Pz, P4, T6/P8, O1, and O2.

In an example, augmented reality eyewear can include one or more electromagnetic energy sensors which are held on (or near) a person's forehead and/or temple so as to be in electromagnetic communication with the person's brain. In an example, augmented reality eyewear can include one or more electromagnetic energy sensors which are held in direct contact with a person's forehead and/or temple. In an example, augmented reality eyewear can include one or more electromagnetic energy sensors which gently press against a person's forehead and/or temple. In an example, augmented reality eyewear can include one or more electromagnetic energy sensors which are held in proximity to (e.g. within one inch of) a person's forehead and/or temple.

In an example, augmented reality eyewear can include a frame with a frontpiece (or front portion) which is configured to span a person's face laterally (i.e. from right to left, or vice versa). In an example, a frontpiece can be a separate piece or separate part which is attached to other pieces (e.g. sidepieces) of an eyewear frame by hinges, joints, or screws. In an example, a front portion can be just one portion (or segment) of a single continuous piece of eyewear which curves around a person's head (e.g. spanning both the front and sides of the person's head). In an example, an eyewear frontpiece (or front portion) can span a person's face across their eyes. In an example, an eyewear frontpiece (or front portion) can span a person's face across their forehead. In an example, an eyewear frontpiece (or front portion) can span a person's face across both their eyes and their forehead.

In an example, a frontpiece (or front portion) of augmented reality eyewear can be arcuate. In an example, a frontpiece (or front portion) can be convex. In an example, an arcuate frontpiece (or front portion) can be configured to curve around the front of a person's head at a substantially constant distance from the surface of the person's head. In an example, a frontpiece (or front portion) of an eyewear frame can be greater distance from a person's head than a sidepiece of an eyewear frame. In an example, a frontpiece (or front portion) can have a central longitudinal axis which is section of a circle or other conic section. In an example, eyewear can have a first (vertical) width as it spans the front of a person's head and a second (vertical) width as it spans the sides of the person's head, wherein the first width is at least twice the second width. In an example, eyewear can bifurcate into lower and upper branches, wherein one or more lenses are held between the lower and upper branches as the eyewear spans the front of a person's head. In an example, the upper branch can hold electromagnetic energy sensors against the person's forehead. In an example, the upper branch can be transparent.

In an example, an eyewear frontpiece (or front portion) can further comprise two flexible, soft, compressible, and/or inflatable rings (or cylinders). Each of these rings (or cylinders) can encircle an eye. In an example, a flexible, soft, compressible, and/or inflatable ring (or cylinder) can conform to the contours of a person's face around their eye. This can block out environmental light except light which is transmitted through a lens. In an example, a flexible, soft, compressible, and/or inflatable ring (or cylinder) can be opaque. In an example, a flexible, soft, compressible, and/or inflatable ring (or cylinder) can be filled with foam or gel. In an example, a flexible, soft, compressible, and/or inflatable ring (or cylinder) can comprise an inflatable chamber. In an example, the firmness or softness of a flexible, soft, compressible, and/or inflatable ring (or cylinder) can be adjusted by deflation or inflation of a chamber. In an example, a flexible, soft, compressible, and/or inflatable ring (or cylinder) can span the space between the eye-facing surface of a lens and the portion of a person's face around their eye.

In an example, an eyewear frontpiece (or front portion) can be configured to span (a portion of) a person's forehead. In an example, an eyewear frontpiece can be configured to extend laterally (from right to left, or vice versa) across a person's forehead. In an example, an eyewear frontpiece can have at least one upward bulge or wave. In an example, an eyewear frontpiece can be arcuate and/or undulating. In an example, an eyewear frontpiece can be sinusoidal. In an example, an eyewear frontpiece can have a compound sinusoidal shape. In an example, an eyewear frontpiece can have an upward wave with amplitude of at least one inch. In an example, an eyewear frontpiece can bifurcate into lower and upper branches. In an example, an eyewear frontpiece can further comprise an arm, branch, or protrusion.

In an example, an eyewear frontpiece (or front portion) can have a central upward bulge or wave above a person's nose which extends up onto the person's forehead. In an example, such a central upward bulge or wave can hold an electromagnetic energy sensor on the person's forehead. In an example, an eyewear frontpiece can have right-side and left-side upward bulges or waves which extend above a person's right-side and left-side eyes, respectively, up onto the person's forehead. In an example, an arcuate eyewear front piece can have a right-side upward bulge or wave above a person's right eye and a left-side upward bulge or wave above the person's left eye. In an example, right-side and left-side bulges or waves can hold right-side and left-side electromagnetic energy sensors, respectively, on the person's forehead. In an example, an eyewear frontpiece (or front portion) can be shaped like an ox yoke. In an example, an eyewear frontpiece can be shaped like an ox yoke with upward undulations above each eye which extend onto the person's forehead where they hold electromagnetic energy sensors in place.

In an example, an eyewear frontpiece (or front portion) can have a central upward arm, branch, or protrusion above a person's nose which extends up onto the person's forehead. In an example, this central upward arm, branch, or protrusion can hold an electromagnetic energy sensor on the person's forehead. In an example, an eyewear frontpiece can have right-side and left-side upward arms, branches, or protrusions which extend above a person's right-side and left-side eyes, respectively, up onto the person's forehead. In an example, an arcuate eyewear front piece can have a right-side upward arm, branch, or protrusion above a person's right eye and a left-side upward arm, branch, or protrusion above the person's left eye. In an example, these right-side and left-side arms, branches, or protrusions can hold right-side and left-side electromagnetic energy sensors, respectively, on the person's forehead. In an example, these arms, branches, or protrusions can be transparent.

In an example, an eyewear frontpiece (or front portion) can further comprise a spring, hinge, or other tensile member which exerts force on an arm, branch, or protrusion in order to keep an electromagnetic energy sensor gently pressed against a person's forehead. In an example, an eyewear frontpiece can have a first spring, hinge, or other tensile member which exerts forces on a first forehead-overlapping arm, branch, or protrusion and a second spring, hinge, or other tensile member which exerts forces on a second forehead-overlapping arm, branch, or protrusion. In an example, an eyewear frontpiece can further comprise an inflatable compartment which keeps an electromagnetic energy sensor gently pressed against a person's forehead. In an example, an eyewear frontpiece can further comprise a piece of compressible foam which keeps an electromagnetic energy sensor gently pressed against a person's forehead. In an example, an eyewear frontpiece can further comprise an elastic band which keeps an electromagnetic energy sensor gently pressed against a person's forehead.

In an example, an eyewear frontpiece (or front portion) can include an elastic band which laterally spans a portion of a person's forehead (from right to left, or vice versa) which holds one or more electromagnetic energy sensors on (or near) the person's forehead. In an example, this elastic band can be configured to laterally span across the middle of a person's forehead, approximately midway between the person's eyes and hairline. In an example, an elastic band can connect split infinitives. In an example, an elastic band can laterally span a person's forehead in a relatively straight manner. In an example, an elastic band can laterally span a person's forehead in a simple curve. In an example, an elastic band can laterally span a person's forehead in an undulating and/or sinusoidal manner. In an example, an elastic band can hold two electromagnetic energy sensors on (or near) a person's forehead. In an example, an elastic band can hold two electromagnetic energy sensors in proximity to (e.g. within one inch of) a person's forehead.

In an example, an eyewear frontpiece (or front portion) can be configured to hold two electromagnetic energy sensors on (or near) a person's forehead. In an example, an eyewear frontpiece can hold a first electromagnetic energy sensor above a person's right eye and a second electromagnetic energy sensor above the person's left eye. In an example, an eyewear frontpiece can be configured to hold three electromagnetic energy sensors on (or near) a person's forehead. In an example, an eyewear frontpiece can hold a first electromagnetic energy sensor above a person's right eye, a second electromagnetic energy sensor above the person's left eye, and a third electromagnetic energy sensor on the center of the person's forehead. In an example, an eyewear frontpiece (or front portion) can hold three or more electromagnetic energy sensors on (or near) a person's forehead at locations which are evenly distributed and/or equally spaced along the length of the frontpiece.

In an example, an eyewear frontpiece (or front portion) can hold an electromagnetic energy sensor on (or near) (or in proximity to) a person's forehead. In an example, this frontpiece can hold two or electromagnetic energy sensors on (or near) (or in proximity to) a person's forehead, one above each eye. In an example, a right side sensor and a left side sensor can be held on a person's forehead, above the person's right eye and left eye, respectively. In an example, a frontpiece can hold three or more electromagnetic energy sensors on (or near) a person's forehead, comprising one central sensor above the person's nose and one side sensor above each eye. In an example, a frontpiece can hold three or more electromagnetic energy sensors on (or near) a person's forehead—one central sensor and one side sensor over each temple.

In an example, an eyewear frontpiece (or front portion) can further comprise a nose bridge. In an example, a nose bridge can hold an electromagnetic energy sensors on (or near) a person's nose. In an example, an eyewear frontpiece (or front portion) can further comprise one or more nose pads. In an example, one or more nose pads can hold an electromagnetic energy sensors on (or near) a person's nose. In an example, analysis of data from these sensors can reveal what a person nose.

In an example, a portion of an eyewear frontpiece (or front portion) can be transparent. The portion of an eyewear frontpiece which spans a person's forehead can be transparent. In an example, an upward bulge or wave on a person's forehead can be transparent. In an example, an elastic band which spans a person's forehead can be transparent. In an example, an upward protrusion or arm of a frontpiece can be transparent. In an example, an eyewear frontpiece can comprise a first (non-elastic) portion which is configured to span a person's face at a first (average) height and a second (elastic) portion which is configured to span the person's forehead at a second (average) height, wherein the second height is greater than the first height. In an example, the second (elastic) portion can be transparent.

In an example, an eyewear frontpiece (or front portion), or just an upper branch thereof, can be made by integrating conductive wires, fibers, threads, or other conductive pathways made from material selected from a second (more-conductive) material group into material selected from a first (less-conductive) material group. In an example, an eyewear frontpiece, or just an upper branch thereof, can be made by weaving conductive wires, fibers, threads, layers, or other conductive pathways made from material selected from a second (more-conductive) material group with fibers, threads, or layers made from material selected from a first (less-conductive) material group.

In an example, an eyewear frontpiece, or just an upper branch thereof, can comprise a two-dimensional array of conductive electromagnetic wires, fibers, threads, layers, or other conductive pathways and non-conductive fibers, threads, or layers. In an example, an eyewear frontpiece, or just an upper branch thereof, can comprise a three-dimensional array of conductive electromagnetic wires, fibers, threads, layers, or other conductive pathways and non-conductive fibers, threads, or layers. In an example, an eyewear frontpiece, or just an upper branch thereof, can comprise a parallel array of conductive electromagnetic wires, fibers, threads, layers, or other conductive pathways and non-conductive fibers, threads, or layers. In an example, an eyewear frontpiece, or just an upper branch thereof, can comprise an array of conductive electromagnetic wires, fibers, threads, layers, or other conductive pathways and non-conductive fibers, threads, or layers in which the conductive members are generally parallel to the non-conductive members.

In an example, an eyewear frontpiece, or just an upper branch thereof, can comprise a perpendicular array of conductive electromagnetic wires, fibers, threads, layers, or other conductive pathways and non-conductive fibers, threads, or layers. In an example, an eyewear frontpiece, or just an upper branch thereof, can comprise an array of conductive electromagnetic wires, fibers, threads, layers, or other conductive pathways and non-conductive fibers, threads, or layers in which the conductive members are generally perpendicular to the non-conductive members.

In an example, a first (less-conductive) material group can comprise: acetate, acrylic, ceramic particles, cotton, denim, elastane, flax, fluorine, latex, linen, Lycra™, neoprene, nylon, organic solvent, polyamide, polyaniline, polyester, polymer, polypyrrole, polyurethane, rayon, rubber, silicon, silicone, silk, and spandex. In an example, a second (more-conductive) material group can comprise: aluminum, aluminum alloy, brass, carbon, carbon nanotubes, copper, copper alloy, gold, graphene, Kevlar™, liquid metal, magnesium, Mylar™, nickel, niobium, silver, silver alloy, silver epoxy, and steel.

In an example, an eyewear frame can include a sidepiece (or side portion) which is configured to span (a portion of) the side of a person's head. An eyewear sidepiece (or side portion) of an eyewear frame can also be called an "earpiece," "arm," or "temple." In an example, a sidepiece can hold one or more electromagnetic energy sensors on (or near) the side of a person's head and/or on the person's ear. In an example, an eyewear frame can include right-side and left-side sidepieces which hold electromagnetic energy sensors on (or near) right and left sides of a person's head, respectively. In an example, an eyewear frame can include right-side and left-side sidepieces which hold electromagnetic energy sensors on a person's right and left ears, respectively.

In an example, an eyewear sidepiece (or side portion) can be a separate piece which is connected to an eyewear frontpiece by a hinge or other attachment mechanism. In an example, an eyewear sidepiece can extend forward from a person's ear to connect (e.g. via a hinge) to the end of an eyewear frontpiece. In an example, an eyewear sidepiece (or side portion) can be part of a continuous arcuate piece (which also includes a front portion) which curves around a person's head including their face. In an example, two side portions and a front portion can together comprise a single continuous arcuate eyewear frame. In an example, two sidepieces and a frontpiece can be side and front parts, respectively, of a connected eyewear frame. In an example, a single continuous eyewear frame can curve around a person's head from one ear to the other, spanning the person's eyes. In an example, a single continuous eyewear frame can have a U-shaped central longitudinal axis. In an example, a single continuous eyewear frame can have a C-shaped central longitudinal axis.

In an example, an eyewear frame can completely encircle a person's head like a halo or headband. In an example, a single continuous eyewear frame can have an O-shaped central longitudinal axis. In an example, the central longitudinal axis of an eyewear frame can completely encircle a person's head in a substantially-horizontal manner when the person's head is upright. In an example, the central longitudinal axis of an eyewear frame can encircle a person's head at a forward-facing acute angle relative to a horizontal plane (when the person's head is upright) within the range of 1 to 45 degrees. In an example, the central longitudinal axis of an eyewear frame can encircle a person's head at a forward-facing acute angle relative to a horizontal plane (when the person's head is upright) within the range of 10 to 30 degrees. In an example, the central longitudinal axis of an eyewear frame can encircle a person's head at a forward-facing acute angle relative to a horizontal plane (when the person's head is upright) within the range of 10 to 20 degrees.

In an example, augmented reality eyewear can have lateral (right-vs.-left side) symmetry. In an example, augmented reality eyewear can have the same structure on its right side and left side. In an example, augmented reality can have the same sensor configuration on its right side and left side. Most figures in this disclosure show just one side of a person's head. In example, there can be identical eyewear structure (including sensors) on the other side of the person's head which is not shown. In an example, augmented reality eyewear can have lateral (right-vs.-left side) asymmetry with respect to frame structure, sensor configuration, or both. In alternative example, there can be different eyewear structure (including sensors) on the other side of a person's head which is not shown. In an example, augmented reality eyewear can have electromagnetic energy sensors only on the right side or only on the left side of an eyewear frame.

In an example, an eyewear sidepiece can hold an electromagnetic energy sensor on (or near) the side of a person's head in electromagnetic communication with the person's brain. In an example, an eyewear sidepiece can hold an electromagnetic energy sensor in direct contact with the side of a person's head. In an example, an eyewear sidepiece can gently press an electromagnetic energy sensor against the side of a person's head. In an example, an eyewear sidepiece can hold an electromagnetic energy sensor near (e.g. within one inch of) the side of a person's head. In an example, a sidepiece can hold an electromagnetic energy sensor on a person's temple region. In an example, a sidepiece can hold an electromagnetic energy sensor on the side of a person's head above their ear. In an example, an eyewear sidepiece can hold two sensors on (or near) the side of a person's head, a first sensor above and forward relative to the person's ear and a second sensor above and rearward relative to the person's ear. In an example, a sidepiece can hold three or more electromagnetic energy sensors on the side of a person's head, all above ear level.

In an example, an eyewear sidepiece can extend forward in a relatively-straight manner from a person's ear to the front of their face. In an example, an eyewear sidepiece can extend in a straight manner from a person's ear to connect to an eyewear frontpiece. In an example, an eyewear sidepiece can be arcuate, undulating, and/or sinusoidal. In an example, an eyewear sidepiece can become wider as it extends forward from a person's ear. In an example, an eyewear sidepiece can bifurcate as it extends forward from a person's ear. In an example, an eyewear sidepiece can bifurcate into an upper elastic portion and a lower non-elastic portion as it extends forward from a person's ear. In an example, an eyewear sidepiece can undulate upwards as it extends forward from a person's ear. In an example, an eyewear sidepiece can curve inwards toward the surface of a person's head as it extends forward from a person's ear. In an example, an eyewear sidepiece can further comprise an inflatable compartment, a piece of foam, a spring, or an elastic band which keeps an electromagnetic energy sensor gently pressed against a person's head.

In an example, an eyewear sidepiece (or side portion) can span between a person's ear and a frontpiece (or front portion) in a substantially-horizontal manner when the person's head is upright. In an example, an eyewear sidepiece (or side portion) can ascend as it extends from a person's ear to a frontpiece (or front portion). In an example, the front end of an eyewear sidepiece can be higher than the back end of an eyewear sidepiece. In an example, an eyewear sidepiece (or side portion) can descend as it extends from a person's ear to a frontpiece (or front portion). In an example, the front end of an eyewear sidepiece can be lower than the back end of an eyewear sidepiece. In an example, an eyewear sidepiece (or side portion) can undulate up and down as it spans between a person's ear and a frontpiece (or front portion). In an example, the middle portion of an eyewear sidepiece (or side portion) can be higher than its ends.

In an example, an eyewear sidepiece (or side portion) can have a central bulge (or wave) which extends upwards. In an example, an upward bulge of an eyewear sidepiece (or side portion) can extend upwards to an area above a person's ear. In an example, an upward bulge of an eyewear sidepiece (or side portion) can extend upwards to an area on (or above) a person's temple. In an example, an upward bulge of an eyewear sidepiece (or side portion) can extend upwards to an area on (or above) a person's forehead. In an example, such a bulge (or wave) can curve inwards towards the surface of the person's head. In an example, an eyewear sidepiece (or side portion) can undulate inward and outward as well as undulating up and down as it spans between a person's ear and an eyewear frontpiece (or front portion). In an example, an eyewear sidepiece (or side portion) can curve in and out in addition to curving up and down as it spans between a person's ear and an eyewear frontpiece (or front portion). In an example, an eyewear sidepiece (or side portion) can have two upward and downward waves.

In an example, an eyewear sidepiece (or side portion) can have a branch (or bifurcation) which extends upwards. In an example, an upward branch (or bifurcation) can extend upwards onto an area above a person's ear, onto their temple region, and/or onto the side of their forehead. In an example, an eyewear sidepiece can further comprise teeth and/or comb-like protrusions which extend between hairs to achieve better electromagnetic communication with a person's brain and/or to better hold the eyewear on the person's head. In an example, an upward branch (or bifurcation) can further comprise teeth or comb-like protrusions which protrude between hairs to achieve better electromagnetic communication with a person's brain. In an example, an eyewear sidepiece can have two upward branches (or bifurcations). In an example, some or all of an eyewear sidepiece (or side portion) can be transparent. In an example, an upward branch (or bifurcation) of an eyewear sidepiece can be transparent.

In an example, an eyewear sidepiece can have a flexible arm (or protrusion) which extends upwards. In an example, an upward flexible arm (or protrusion) can extend upwards onto an area above a person's ear, their temple region, and/or the side of their forehead. In an example, this upward arm (or protrusion) can be transparent. In an example, this upward arm (or protrusion) can further comprise teeth or comb-like protrusions which protrude between hairs to achieve better electromagnetic communication with a person's brain. In an example, an upward arm (or protrusion) can comprise a hair comb or clip. In an example, a hair comb or hair clip (with electromagnetic energy sensors) can be removably attached (via a snap, clip, pin, or other attachment mechanism) to brainwave-controlled eyewear.

In an example, an arm (or protrusion) can be adjustably pivoted or rotated. In an example, an arm (or protrusion) can be pivoted or rotated around its point of connection with the main body of a sidepiece. In an example, an arm (or protrusion) can be manually pivoted or rotated around its point of connection with the main body of a sidepiece to a desired configuration and then locked in place at this desired configuration. In an example, an eyewear sidepiece (or side portion) can further comprise a locking mechanism which locks an upward arm (or protrusion) into place. In an example, an eyewear sidepiece (or side portion) can have two upward arms (or protrusions).

In an example, an eyewear sidepiece (or side portion), or just an upper branch thereof, can be made by integrating conductive wires, fibers, threads, or other conductive pathways made from material selected from a second (more-conductive) material group into material selected from a first (less-conductive) material group. In an example, an eyewear sidepiece, or just an upper branch thereof, can be made by weaving conductive wires, fibers, threads, layers, or other conductive pathways made from material selected from a second (more-conductive) material group with fibers, threads, or layers made from material selected from a first (less-conductive) material group.

In an example, an eyewear sidepiece, or just an upper branch thereof, can comprise a two-dimensional array of conductive electromagnetic wires, fibers, threads, layers, or other conductive pathways and non-conductive fibers, threads, or layers. In an example, an eyewear sidepiece, or just an upper branch thereof, can comprise a three-dimensional array of conductive electromagnetic wires, fibers, threads, layers, or other conductive pathways and non-conductive fibers, threads, or layers. In an example, an eyewear sidepiece, or just an upper branch thereof, can comprise a parallel array of conductive electromagnetic wires, fibers, threads, layers, or other conductive pathways and non-conductive fibers, threads, or layers. In an example, an eyewear sidepiece, or just an upper branch thereof, can comprise an array of conductive electromagnetic wires, fibers, threads, layers, or other conductive pathways and non-conductive fibers, threads, or layers in which the conductive members are generally parallel to the non-conductive members. In an example, an eyewear sidepiece, or just an upper branch thereof, can comprise a perpendicular array of conductive electromagnetic wires, fibers, threads, layers, or other conductive pathways and non-conductive fibers, threads, or layers. In an example, an eyewear sidepiece, or just an upper branch thereof, can comprise an array of conductive electromagnetic wires, fibers, threads, layers, or other conductive pathways and non-conductive fibers, threads, or layers in which the conductive members are generally perpendicular to the non-conductive members.

In an example, the first (less-conductive) material group can comprise: acetate, acrylic, ceramic particles, cotton, denim, elastane, flax, fluorine, latex, linen, Lycra™, neoprene, nylon, organic solvent, polyamide, polyaniline, polyester, polymer, polypyrrole, polyurethane, rayon, rubber, silicon, silicone, silk, and spandex. In an example, the second (more-conductive) material group can comprise: aluminum, aluminum alloy, brass, carbon, carbon nanotubes, copper, copper alloy, gold, graphene, Kevlar™, liquid metal, magnesium, Mylar™, nickel, niobium, silver, silver alloy, silver epoxy, and steel.

In an example, augmented reality eyewear can further comprise an earring or other earlobe attachment with which it is in electromagnetic communication. In an example, this electromagnetic communication can be wireless. In an example, an earring or other earlobe attachment can be removably connected to an eyewear frame. In an example, augmented reality eyewear can further comprise an ear-attached member which is configured to attach an electromagnetic energy sensor to a person's ear or to insert an electromagnetic energy sensor into the person's ear. In an example, an electromagnetic energy sensor can be attached to a person's earlobe. In an example, an ear-attached member can be selected from the group consisting of: ear ring, clip, clasp, pin, snap, sticker, tattoo, and Bluetooth earset. In an example, an ear-attached member with an electromagnetic energy sensor can be in electromagnetic communication with (the rest of) eyewear via a wire. In an example, an ear-attachment member with an electromagnetic energy sensor can be in wireless communication with a data transceiver and/or data processor. In an example, augmented reality eyewear can include an ear-inserted member which includes an electromagnetic energy sensor. In an example, an ear-inserted member can be selected from the group consisting of: an ear bud, an earphone, an ear plug, a hearing aid, a Bluetooth earset, and a "hearable" (i.e. smart ear-worn computer-to-human interface device).

In an example, augmented reality eyewear can include one or more electromagnetic energy sensors on (or near) the back portion (e.g. the "rear quartile") of a person's head. In an example, a person's head can be virtually divided into four quartiles, front to rear, by virtually dividing the head into four sections evenly using three equally-spaced right-to-left vertical planes. The "rear quartile" can be defined as the furthest rear quartile. In an example, eyewear can include one or more electromagnetic energy sensors which are held on (or near) the back portion of a person's head. In an example, eyewear can include one or more electromagnetic energy sensors which are held in proximity to (e.g. within one inch of) the back portion of a person's head.

In an example, augmented reality eyewear can include a back loop (or band or strap) which loops around the back portion (e.g. the "rear quartile") of a person's head. This back loop can hold one or more energy sensors in electromagnetic communication on (or in proximity to) the back portion of the person's head. In an example, a back loop (or band or strap) can be elastic, stretchable, tensile, and/or expandable. In an example, the elasticity and/or length of a back loop can be manually or automatically adjusted. In an example, augmented reality eyewear can further comprise an electromagnetic actuator which adjusts the elasticity and/or length of a back loop.

In an example, a back loop (or band or strap) can further comprise comb-like teeth or other protrusions which go between hairs to achieve better contact between an electromagnetic energy sensor and the surface of the person's head. In an example, a back loop can further comprise a hair comb or hair clip which holds electromagnetic energy sensors on (or near) a person's head. In an example, a hair comb or hair clip with electromagnetic energy sensors can be removably attached (e.g. via a snap, clip, plug, or pin) to the frame of augmented reality eyewear. In an example, a hair comb or hair clip with electromagnetic energy sensors can be removably attached (e.g. via a snap, clip, plug, or pin) to the back loop of augmented reality eyewear.

In an example, a back loop can become wider as it extends backward from a person's ear. In an example, a back loop (or band or strap) can span the back of a person's head at approximately ear level. In an example, a back loop can span the back of a person's head at a rear-facing acute angle with respect to a horizontal plane when the person is standing with their head upright. In an example, a back loop can slope downward as it extends backward from a person's ear to the rear of their head. In an example, a back loop can slope upward as it extends backward from a person's ear to the rear of their head. In an example, a back loop (or band or strap) can be undulating, wavy, and/or sinusoidal. In an example, the central longitudinal axis of a back loop (or band or strap) can have a sinusoidal wave shape with an amplitude greater than 1".

In an example, a back loop can bifurcate into a lower branch and an upper branch as it extends backward from a person's ear. In an example, a back loop can bifurcate on the rear portion (e.g. "rear quartile) of a person's head. In an example, augmented reality can include two back loops, an upper back loop which spans the back of a person's head above ear level and a lower back loop which spans the back of a person's head below ear level. In an example, two back loops can be further connected by a connecting band (or segment) which is perpendicular to the arcuate longitudinal axes of the two loops. In an example, an upper branch of a back loop can be undulating, wavy, and/or sinusoidal. In an example, a lower branch of a back loop can be undulating, wavy, and/or sinusoidal. In an example, a back loop portion of augmented reality eyewear can split into three loops: an upper loop: a middle loop; and a lower loop. In an example, each of these three loops can hold two or more electromagnetic energy sensors on (or near) a person's head.

In an example, a back loop, or just a portion thereof, can be made by integrating conductive wires, fibers, threads, or other conductive pathways made from a material selected from a second (more-conductive) material group into a member made from a material selected from a first (less-conductive) material group. In an example, a back loop, or just a portion thereof, can be made by weaving conductive wires, fibers, threads, layers, or other conductive pathways made from a material selected from a second (more-conductive) material group with fibers, threads, or layers made from a material selected from a first (less-conductive) material group.

In an example, a back loop, or just a portion thereof, can comprise a two-dimensional array of conductive electromagnetic wires, fibers, threads, layers, or other conductive pathways and non-conductive fibers, threads, or layers. In an example, a back loop, or just a portion thereof, can comprise a three-dimensional array of conductive electromagnetic wires, fibers, threads, layers, or other conductive pathways and non-conductive fibers, threads, or layers. In an example, a back loop, or just a portion thereof, can comprise a parallel array of conductive electromagnetic wires, fibers, threads, layers, or other conductive pathways and non-conductive fibers, threads, or layers. In an example, a back loop, or just a portion thereof, can comprise an array of conductive electromagnetic wires, fibers, threads, layers, or other conductive pathways and non-conductive fibers, threads, or layers in which the conductive members are generally parallel to the non-conductive members. In an example, a back loop, or just a portion thereof, can comprise a perpendicular array of conductive electromagnetic wires, fibers, threads, layers, or other conductive pathways and non-conductive fibers, threads, or layers. In an example, a back loop, or just a portion thereof, can comprise an array of conductive electromagnetic wires, fibers, threads, layers, or other conductive pathways and non-conductive fibers, threads, or layers in which the conductive members are generally perpendicular to the non-conductive members.

In an example, the first (less-conductive) material group can comprise: acetate, acrylic, ceramic particles, cotton, denim, elastane, flax, fluorine, latex, linen, Lycra™, neoprene, nylon, organic solvent, polyamide, polyaniline, polyester, polymer, polypyrrole, polyurethane, rayon, rubber, silicon, silicone, silk, and spandex. In an example, the second (more-conductive) material group can comprise: aluminum, aluminum alloy, brass, carbon, carbon nanotubes, copper, copper alloy, gold, graphene, Kevlar™, liquid metal, magnesium, Mylar™, nickel, niobium, silver, silver alloy, silver epoxy, and steel.

In an example, augmented reality eyewear can hold one or more electromagnetic energy sensors on the top portion (e.g. the "upper quartile") of a person's head in electromagnetic communication with the person's brain. A person's head can be virtually divided into four quartiles, bottom to top, by virtually dividing the head into four sections evenly using three equally-spaced front-to-left horizontal planes. The "upper quartile" can be defined as the highest quartile. In an example, augmented reality eyewear can hold one or more electromagnetic energy sensors on (or near) the top portion of a person's head.

In an example, an eyewear frame can include a top loop (or band or strap) which loops over the top portion (e.g. the "upper quartile") of a person's head. In an example, a top loop can be elastic, stretchable, tensile, and/or expandable. In an example, the elasticity and/or length of a top loop can be manually or automatically adjusted. In an example, augmented reality eyewear can further comprise an electromagnetic actuator which adjusts the elasticity and/or length of a top loop. In an example, a top loop (or band or strap) can further comprise comb-like teeth or other protrusions which go between hairs to achieve better electromagnetic communication between an electromagnetic energy sensor and a person's brain.

In an example, augmented reality eyewear system can include a cap, beanie, yarmulke, or skull-cap with electromagnetic energy sensors. In an example, a cap, beanie, yarmulke, or skull-cap with electromagnetic energy sensors can be removably attached to the eyewear frame of augmented reality eyewear. In an example, a cap, beanie, yarmulke, or skull-cap with electromagnetic energy sensors can be removably attached to a top loop of augmented reality eyewear. In an example, this could make you look like a luftmensh.

In an example, a top loop can span upward from a person's right ear, loop over the top of the person's head, and then span downward to the person's left ear (or vice versa, left to right). In an example, a top loop can go over the top of a person's head from one side to the other. In an example, a top loop can span upward and rearward from a frontpiece, loop over the top of the person's head, and then span downward to a back loop. In an example, a top loop can go over the top of a person's head from front to back (or vice versa, back to front). In an example, a top loop can bifurcate as it extends upward. In an example, an eyewear frame can have two top loops. In an example, an eyewear frame can include a first (front) top loop and a second (rear) top loop.

In an example, one or more top loops can hold one or more electromagnetic energy sensors on (or near) the top portion of a person's head. In an example, one or more top loops can hold two electromagnetic energy sensors on (or near) the top portion of a person's head. In an example, one or more top loops can hold three or more electromagnetic energy sensors on (or near) the top portion of a person's head. In an example, a top loop can be undulating, wavy, and/or sinusoidal. In an example, a frontal branch of a bifurcating top loop can be undulating, wavy, and/or sinusoidal. In an example, a rear branch of a bifurcating top loop can be undulating, wavy, and/or sinusoidal. In an example, a top loop portion of augmented reality eyewear can split into three loops: a frontal loop: a middle loop; and a rear loop. In an example, each of these three loops can hold two or more electromagnetic energy sensors on (or near) a person's head.

In an example, augmented reality eyewear can comprise two top loops which loop over the top portion of a person's head, wherein each top loop holds at least one electromagnetic energy sensor. In an example, this can comprise a first (front) top loop which is further forward and a second (rear) top loop which is further back. In an example, eyewear can comprise a bifurcating top loop which bifurcates on the top portion (e.g. the "upper quartile") of a person's head, wherein each branch of the bifurcation holds at least one electromagnetic energy sensor.

In an example, an eyewear frame can have two top loops which are separate as they span the top of a person's head but have lower ends which converge within 3" of the person's ears. In an example, two top loops can be separate as they span the top of a person's head, but have lower right and left ends which converge within 3" of the person's right and left ears, respectively. In an example, an eyewear frame can have two top loops which are separate as they span the top of a person's head but have lower ends which converge within 3" of the person's forehead. In an example, two top loops can be separate as they span the top of a person's head, but have lower right and left ends which converge within 3" of the person's forehead.

In an example, a top loop, or just a portion thereof, can be made by integrating conductive wires, fibers, threads, layers, or other conductive pathways made from a material selected from a second (more-conductive) material group into a member made from a material selected from a first (less-conductive) material group. In an example, a top loop, or just a portion thereof, can be made by weaving conductive wires, fibers, threads, layers, or other conductive pathways made from a material selected from a second (more-conductive) material group with fibers, threads, or layers made from a material selected from a first (less-conductive) material group.

In an example, a top loop, or just a portion thereof, can comprise a two-dimensional array of conductive electromagnetic wires, fibers, threads, layers, or other conductive pathways and non-conductive fibers, threads, or layers. In an example, a top loop, or just a portion thereof, can comprise a three-dimensional array of conductive electromagnetic wires, fibers, threads, layers, or other conductive pathways and non-conductive fibers, threads, or layers. In an example, a top loop, or just a portion thereof, can comprise a parallel array of conductive electromagnetic wires, fibers, threads, layers, or other conductive pathways and non-conductive fibers, threads, or layers. In an example, a top loop, or just a portion thereof, can comprise an array of conductive electromagnetic wires, fibers, threads, layers, or other conductive pathways and non-conductive fibers, threads, or layers in which the conductive members are generally parallel to the non-conductive members. In an example, a top loop, or just a portion thereof, can comprise a perpendicular array of conductive electromagnetic wires, fibers, threads, layers, or other conductive pathways and non-conductive fibers, threads, or layers. In an example, a top loop, or just a portion thereof, can comprise an array of conductive electromagnetic wires, fibers, threads, layers, or other conductive pathways and non-conductive fibers, threads, or layers in which the conductive members are generally perpendicular to the non-conductive members.

In an example, a first (less-conductive) material group can comprise: acetate, acrylic, ceramic particles, cotton, denim, elastane, flax, fluorine, latex, linen, Lycra™, neoprene, nylon, organic solvent, polyamide, polyaniline, polyester, polymer, polypyrrole, polyurethane, rayon, rubber, silicon, silicone, silk, and spandex. In an example, a second (more-conductive) material group can comprise: aluminum, aluminum alloy, brass, carbon, carbon nanotubes, copper, copper alloy, gold, graphene, Kevlar™, liquid metal, magnesium, Mylar™, nickel, niobium, silver, silver alloy, silver epoxy, and steel.

In an example, electromagnetic energy sensors can be modular. In an example, electromagnetic energy sensors can be moved from one location to another on augmented reality eyewear. In an example, electromagnetic energy sensors can be selectively and removably connected to an eyewear frame by the person who wears the device. In an example, one or more electromagnetic energy sensors can be selectively and removably connected to different locations on an eyewear frame. Movable and/or modular electromagnetic energy sensors enable customization of the placement of electromagnetic energy sensors to the specific anatomy and/or physiology of a person's head. In an example, electromagnetic energy sensors can be selectively and removably configured in proximity to different areas of a person's head and/or different brain regions. In an example, one or more electromagnetic energy sensors can be selectively and removably connected to an eyewear frame by one or more mechanisms selected from the group consisting of: button; clasp; clip; electronic connector; hook; hook-and-eye material (e.g. Velcro™); pin; plug; prong; threaded connector; and snap.

In an example, movable and/or modular electromagnetic energy sensors enable a person to customize the placement of electromagnetic energy sensors to the anatomy and/or physiology of their brain. In an example, movable and/or modular electromagnetic energy sensors enables a person to customize the placement of electromagnetic energy sensors for selected activities (e.g. selected sports or tasks). In an example, augmented reality can have a first configuration of electromagnetic energy sensors which is best for a first type of activity and a second configuration of electromagnetic energy sensors which is best for a second type of activity. In an example, augmented reality can have a first configuration of electromagnetic energy sensors which is best for a first sport and a second configuration of electromagnetic energy sensors which is best for a second sport. In an example, augmented reality can have a first configuration of electromagnetic energy sensors which is best for a first type of work and a second configuration of electromagnetic energy sensors which is best for a second type of work. In an example, a person can selectively and removably change the configuration of electromagnetic energy sensors from the first configuration to the second configuration.

In an example, one or more electromagnetic energy sensors in augmented reality eyewear can be selectively and removably connected to one or more electrode sites selected from the group consisting of FP1, FPz, FP2, AF7, AF5, AF3, AFz, AF4, AF6, AF8, F7, F5, F3, F1, Fz, F2, F4, F6, F8, FT7, FC5, FC3, FC1, FCz, FC2, FC4, FC6, FT8, T3/T7, C3, C4, C1, Cz, C2, C5, C6, T4/T8, TP7, CP5, CP3, CP1, CPz, CP2, CP4, CP6, TP8, T5/P7, P5, P3, P1, Pz, P2, P4, P6, T6/P8, PO7, PO5, PO3, POz, PO4, PO6, PO8, O1, Oz, and O2 by a button, clasp, clip, electronic connector, hook, hook-and-eye material (e.g. Velcro™), pin, plug, prong, threaded connector, or snap.

In an example, the location of an electromagnetic energy sensor (relative to an area of a person's head and/or brain region) can be moved by a mechanism selected from the group consisting of: moving the sensor with a pneumatic mechanism; moving the sensor with a hydraulic mechanism; moving the sensor with an electromagnetic actuator; MEMS activation; adjusting the length or tension of an elastic strap or band; activating a piezoelectric-contracting strap or band; activating micro-actuator contracting fabric; adjusting the length or tension of a spring or other tensile member; inflating a pouch or chamber; pumping a flowable substance into a piston or other telescoping member; moving the sensor by rotating gears; moving the sensor by rotating a threaded member; manually removing and reattaching a sensor; and sliding the sensor along a track or channel.

In an example, a sensor can have a first location (relative to an area of a person's head and/or brain region) in a first configuration, can have a second location (relative to an area of a person's head and/or brain region) in a second configuration, and can be moved from the first configuration to the second configuration by a mechanism selected from the group consisting of: moving the sensor with a pneumatic mechanism; moving the sensor with a hydraulic mechanism; moving the sensor with an electromagnetic actuator; MEMS activation; adjusting the length or tension of an elastic strap or band; activating a piezoelectric-contracting strap or band; activating micro-actuator contracting fabric; adjusting the length or tension of a spring or other tensile member; inflating a pouch or chamber; pumping a flowable substance into a piston or other telescoping member; moving the sensor by rotating gears; moving the sensor by rotating a threaded member; manually removing and reattaching a sensor; and sliding the sensor along a track or channel.

In an example, augmented reality eyewear can include a proximity sensor which is configured to measure the distance between an electromagnetic energy sensor and the surface of a person's head. In an example, a proximity sensor can be an optical sensor which measures distance by reflecting light energy off the surface of a person's head. In an example, a proximity sensor can be a sound sensor which measures distance by reflecting sound energy off the surface of a person's head. In an example, augmented reality eyewear can include a pressure sensor which is configured to measure the pressure with which a sensor presses against the surface of a person's head. In an example, the proximity and/or pressure of an electromagnetic energy sensor relative to a person's head can be automatically adjusted based on analysis of data collected from a proximity and/or pressure sensor.

In an example, the distance between an electromagnetic energy sensor and the surface of a person's head can be reduced when analysis of data from the sensor shows inadequate electromagnetic communication between the sensor and the person's brain. In an example, the pressure of an electromagnetic energy sensor against the surface of a person's head can be automatically increased when analysis of data from the sensor shows inadequate electromagnetic communication between the sensor and the person's brain. In an example, augmented reality eyewear can include a motion sensor (such as an accelerometer, gyroscope, and/or inclinometer). In an example, the proximity of an electromagnetic energy sensor relative to the surface of a person's head and/or the pressure of a sensor relative to the surface of a person's head can be automatically changed based on the amount and/or direction of head motion to ensure close contact despite body movement.

In an example, the proximity of an electromagnetic energy sensor relative to the surface of person's head and/or the pressure with which a sensor is held against the person's head can be changed by a mechanism selected from the group of mechanisms consisting of: moving the sensor with a pneumatic mechanism; moving the sensor with a hydraulic mechanism; moving the sensor with an electromagnetic actuator; MEMS activation; adjusting the length or tension of an elastic strap or band; activating a piezoelectric-contracting strap or band; activating micro-actuator contracting fabric; adjusting the length or tension of a spring or other tensile member; inflating a pouch or chamber; pumping a flowable substance into a piston or other telescoping member; moving the sensor by rotating gears; moving the sensor by rotating a threaded member; manually removing and reattaching a sensor; and sliding the sensor along a track or channel.

In an example, an electromagnetic energy sensor can have a first proximity and/or pressure relative to a person's head in a first configuration, can have a second proximity and/or pressure relative to a person's head in a second configuration, and can be changed from the first configuration to the second configuration by a mechanism selected from the group consisting of: moving the sensor with a pneumatic mechanism; moving the sensor with a hydraulic mechanism; moving the sensor with an electromagnetic actuator; MEMS activation; adjusting the length or tension of an elastic strap or band; activating a piezoelectric-contracting strap or band; activating micro-actuator contracting fabric; adjusting the length or tension of a spring or other tensile member; inflating a pouch or chamber; pumping a flowable substance into a piston or other telescoping member; moving the sensor by rotating gears; moving the sensor by rotating a threaded member; manually removing and reattaching a sensor; and sliding the sensor along a track or channel.

In an example, augmented reality eyewear can comprise: an eyewear frame which is configured to be worn by a person; a lens which is attached to or part of the eyewear frame which transmits light from the environment to the person's eye; a display surface which is attached to or part of the eyewear frame which projects an image of a virtual object to the person's eye; an inflatable chamber which is attached to the eyewear frame; and an electromagnetic energy sensor which is attached to the inflatable chamber. In an example, augmented reality eyewear can comprise: an eyewear frame which is configured to be worn by a person; a lens which is attached to or part of the eyewear frame which transmits light from the environment to the person's eye; wherein the lens further comprises a display portion which projects an image of a virtual object to the person's eye; an inflatable chamber which is attached to the eyewear frame; and an electromagnetic energy sensor which is attached to the inflatable chamber.

In an example, the angle of an axis (e.g. the longitudinal axis) of an electromagnetic energy sensor relative to the surface of person's head can be changed by a mechanism selected from the group of mechanisms consisting of: moving the sensor with a pneumatic mechanism; moving the sensor with a hydraulic mechanism; moving the sensor with an electromagnetic actuator; MEMS activation; adjusting the length or tension of an elastic strap or band; activating a piezoelectric-contracting strap or band; activating micro-actuator contracting fabric; adjusting the length or tension of a spring or other tensile member; inflating a pouch or chamber; pumping a flowable substance into a piston or other telescoping member; moving the sensor by rotating gears; moving the sensor by rotating a threaded member; manually removing and reattaching a sensor; and sliding the sensor along a track or channel.

In an example, (the longitudinal axis of) an electromagnetic energy sensor can have a first angle relative to the surface of a person's head in a first configuration, can have a second angle relative to the surface of a person's head in a second configuration, and can be changed from the first configuration to the second configuration by a mechanism selected from the group consisting of: moving the sensor with a pneumatic mechanism; moving the sensor with a hydraulic mechanism; moving the sensor with an electromagnetic actuator; MEMS activation; adjusting the length or tension of an elastic strap or band; activating a piezoelectric-contracting strap or band; activating micro-actuator contracting fabric; adjusting the length or tension of a spring or other tensile member; inflating a pouch or chamber; pumping a flowable substance into a piston or other telescoping member; moving the sensor by rotating gears; moving the sensor by rotating a threaded member; manually removing and reattaching a sensor; and sliding the sensor along a track or channel.

In an example, the distance between a sensor and a person's head, the pressure with which a sensor is pressed against the person's head, and/or the angle between a sensor and the person's head can be adjusted to achieve the optimal balance between electromagnetic energy sensing and the person's comfort. In an example, a device can automatically vary sensor distance, pressure, or angle within a range of values to determine a desired balance between electromagnetic energy sensing and comfort—incorporating feedback from the person with respect to comfort. In an example, a person can (manually) vary sensor distance, pressure, or angle within a range of values to determine find a balance between electromagnetic energy sensing and comfort—incorporating feedback from the device with respect to sensing accuracy.

In an example, automatic or manual variation of sensor distance, pressure, or angle can be done by a mechanism selected from the group consisting of: moving the sensor with a pneumatic mechanism; moving the sensor with a hydraulic mechanism; moving the sensor with an electromagnetic actuator; MEMS activation; adjusting the length or tension of an elastic strap or band; activating a piezoelectric-contracting strap or band; activating micro-actuator contracting fabric; adjusting the length or tension of a spring or other tensile member; inflating a pouch or chamber; pumping a flowable substance into a piston or other telescoping member; moving the sensor by rotating gears; moving the sensor by rotating a threaded member; manually removing and reattaching a sensor; and sliding the sensor along a track or channel.

In an example, brainwave-controlled augmented reality eyewear can include one or two lenses. In an example, augmented reality eyewear can include a lens which is configured to transmit light from the environment (including images of environmental objects) in real time to a person's eye. In an example, augmented reality eyewear can include a lens which transmits light from the environment to a person's eye, displays images of virtual objects in the person's field of vision, or both. In an example, images of virtual objects can be superimposed on environmental objects into a person's field of vision. In an example, images of virtual objects can appear to interact with environmental objects into a person's field of vision. In an example, augmented reality eyewear can include one or more lenses which transmit environmental light to a person's eye(s) and a separate display surface which displays images of virtual objects in the person's field of vision.

In an example, augmented reality eyewear can comprise two lenses, one for each eye. In an example, augmented reality eyewear can comprise a pair of eyeglasses or goggles. In an example, a lens can be curved. In an example, a lens can have a surface which is a section of a sphere. In an example, a lens can have an aspherical surface. In an example, a lens can have a surface which is a conic section. In an example, a lens can be made from material selected from the group of materials consisting of: acrylic, crystal, dichromated gelatin, glass, photopolymer, photorefractive, photoresist, and silver halide emulsion.

In an example, augmented reality eyewear can comprise one or more lenses which are selected from the group consisting of: aspheric lens, asymmetric lens, collimating lens, compound lens, concave lens, concentric lenses, contact lens, convex lens, curved lens, diverging lens, filtered lens, flat lens, fluid lens, fly's eye lens, Fresnel lens, lens with integrated circuitry, lens with nanoscale gratings, liquid lens, MEMS-based lens array, microlens, mirrored lens, movable lens, optoelectric lens, parabolic lens, prescription lens, semi-reflective lens, simple lens, smart lens, spherical lens, tinted lens, variable-focus lens, virtual curved lens, vision-correcting lens, and wedge-shaped lens.

In an example, brainwave-controlled augmented reality eyewear can include a lens whose size, position, transparency, light-transmission characteristics, light reflection, and/or image display characteristics are automatically changed based on analysis of data from one or more electromagnetic energy (e.g. EEG) sensors. In an example, the whose size, position, transparency, light-transmission characteristics, light reflection, and/or image display characteristics of one or more lenses can be automatically changed based on analysis of brainwaves as measured by one or more EEG sensors on augmented reality eyewear.

In an example, the shape, size, position, transparency, light-transmission characteristics, light reflection, and/or image display characteristics of a lens can be changed by a mechanism selected from the group consisting of: adjustable electro-tinting layer; adjustable distance between two flexible transparent components; adjustable distance between two rigid transparent components; adjustable fluid, liquid, or gel lens; adjustable lens concavity or convexity by application of electricity; adjustable liquid crystal structure and/or adjustable LCD matrix; adjustable micro-actuator lens; MEMS-adjustable lens; adjustable mirror array; adjustable spatial light modulator; adjustable multi-layered lens; adjustable optoelectronic or photoelectric component; adjustable photochromic lens; adjustable piezoelectric lens component; lens with adjustable refractive index; lens with adjustable spectral filter.

In an example, the transparency of a lens can be automatically changed based on analysis of data from one or more electromagnetic energy sensors. In an example, the amount and/or intensity of environmental light transmitted through a lens can be automatically changed based on analysis of data from one or more electromagnetic energy sensors. In an example, the amount or proportion of environmental light blocked by a lens can be automatically changed based on analysis of data from one or more electromagnetic energy sensors. In an example, the amount or proportion of environmental light reflected by a lens can be automatically changed based on analysis of data from one or more electromagnetic energy sensors.

In an example, the amount of light transmitted through a can be automatically changed based on changes in the relative power of brainwaves in one or more selected frequency bands and/or based on recognition of a specific brainwave pattern. In an example, the absorption, blocking, or reflection of environmental light transmitted through a lens can be automatically changed based on detection of a specific brainwave pattern. In an example, if a brainwave pattern is predictive or indicative of a migraine headache, then the device can reduce transmission of environmental light through a lens. In an example, the absorption, blocking, or reflection of images of environmental objects transmitted through a lens can be automatically changed based on analysis of data from one or more electromagnetic energy sensors. In an example, one can literally take a dim view of something when one figuratively takes a dim view of something.

In an example, the color tint of a lens can be automatically changed based on analysis of data from one or more electromagnetic energy sensors. In an example, the spectrum and/or color of environmental light transmitted through a lens can be automatically changed based on analysis of data from one or more electromagnetic energy sensors. In an example, spectral filtering of environmental light transmitted through a lens can be automatically changed based on analysis of data from one or more electromagnetic energy sensors. In an example, a lens can function as a spectroscopic sensor in response to a selected brainwave pattern. In an example, augmented reality eyewear can perform spectroscopic analysis of environmental objects, including analyzing their molecular composition.

In an example, the spectrum and/or color of light transmitted through a lens can be automatically changed based on changes in the relative power of brainwaves in one or more selected frequency bands and/or recognition of a specific brainwave pattern. In an example, the spectrum and/or color of environmental light transmitted through a lens can be automatically changed based on detection of a specific brainwave pattern. In an example, the spectrum and/or color of images of environmental objects transmitted through a lens can be automatically changed based on analysis of data from one or more electromagnetic energy sensors. In an example, one can literally see the world through rosy-tinted glasses when one figuratively sees the world through rosy-tinted glasses.

In an example, the focal direction of a lens can be automatically changed based on analysis of data from one or more electromagnetic energy sensors. In an example, the direction, refraction, and/or reflection of environmental light transmitted through a lens can be automatically changed based on analysis of data from one or more electromagnetic energy sensors. In an example, the directional view of environmental images seen through a lens can be changed based on analysis of data from one or more electromagnetic energy sensors. In an example, the direction from which a lens transmits images of environmental objects can be automatically changed based on changes in the relative power of brainwaves in one or more selected frequency bands and/or recognition of a specific brainwave pattern. In an example, one can literally look on the bright side when one figuratively looks on the bright side.

In an example, a lens can selectively transmit environmental light from the person's front, side, or rear perspectives, depending on the detection of a specific brainwave pattern. In an example, the compass location or polar coordinate of the perspective seen via a lens can be rotated based on changes in measured brainwave patterns. In an example, a person could see a 360-degree scan of their environment by changing the relative power of their brainwaves in selected frequency bands or by some other identifiable pattern of brainwave emission. In an example, one can literally have 20-20 hindsight when figuratively has 20-20 hindsight.

In an example, the focal distance of environmental images transmitted through a lens can be automatically changed based on analysis of data from one or more electromagnetic energy sensors. In an example, the focal distance of a lens can be automatically changed based on changes in the relative power of brainwaves in one or more selected frequency bands and/or recognition of a specific brainwave pattern. In an example, a lens can function as a telescope in response to a selected brainwave pattern. In an example, the focal distance of a lens can be automatically changed based on detection of a specific brainwave pattern. In an example, the focal distance of images of environmental objects transmitted through a lens can be automatically changed based on analysis of data from one or more electromagnetic energy sensors. In an example, one can literally be far-sighted when one is figuratively far-sighted.

In an example, the magnification of a lens can be automatically changed based on analysis of data from one or more electromagnetic energy sensors. In an example, the magnification of environmental light transmitted through a lens can be automatically changed based on analysis of data from one or more electromagnetic energy sensors. In an example, a lens can function as a microscope in response to a selected brainwave pattern. In an example, the magnification of an environmental object by a lens can be automatically changed based on changes in the relative power of brainwaves in one or more selected frequency bands and/or recognition of a specific brainwave pattern. In an example, brainwave-controlled augmented reality eyewear can enable brainwave-controlled telescopic and/or microscopic magnification of environmental objects. In an example, one can literally take a closer look at something when one figuratively takes a closer look at something.

In an example, the polarization of environmental light transmitted through a polarizing lens can be automatically changed based on analysis of data from one or more electromagnetic energy sensors. In an example, the polarization of light by a lens can be automatically changed based on changes in the relative power of brainwaves in one or more selected frequency bands and/or recognition of a specific brainwave pattern. In an example, the polarization of environmental light transmitted through a lens can be automatically changed based on detection of a specific brainwave pattern. In an example, the polarization of images of environmental objects transmitted through a lens can be automatically changed based on analysis of data from one or more electromagnetic energy sensors.

In an example, the collimation of environmental light transmitted through a lens can be automatically changed based on analysis of data from one or more electromagnetic energy sensors. In an example, collimation of environmental light by a lens can be automatically changed based on changes in the relative power of brainwaves in one or more selected frequency bands and/or recognition of a specific brainwave pattern. In an example, the collimation of environmental light transmitted through a lens can be automatically changed based on detection of a specific brainwave pattern. In an example, the collimation of images of environmental objects transmitted through a lens can be automatically changed based on analysis of data from one or more electromagnetic energy sensors.

In an example, in addition to transmitting light from the environment to the person's eye(s), one or more lenses (or portions thereof) can also display images of virtual objects into a person's field of vision. In an example, a portion of a lens can be a display surface which displays images of virtual objects. In an example, a lens (or a portion thereof) can have an image-generating layer which displays images of one or more virtual objects into a person's field of vision. In an example, images of virtual objects can be superimposed over environmental objects into a person's field of vision. In an example, images of virtual objects can appear to interact with environmental objects into a person's field of vision. In an example, a virtual object can appear to come out of (or go into) an environmental object.

In an example, an image of a virtual object can be created in two steps: first, a digital electronic pattern representing a virtual object can be created by a data processor; and, second, this digital electronic pattern can be converted into a pattern of light energy which is perceived by a person as an image of a virtual object. In an example, both of these steps can be performed by an electronically-functional lens (e.g. a "smart lens"). In an example, the first step can be done in a separate data processor and only the second step is done within an electronically-functional lens (e.g. a "smart lens").

In an example, brainwave-controlled augmented reality eyewear can comprise: an electromagnetic energy sensor which is configured to collect data concerning the electromagnetic activity of a person's brain; a lens which is configured to transmit light from the environment to the person's eye, wherein the lens further comprises an image-generating portion which generates images of virtual objects; an eyewear frame which is configured to hold the electromagnetic energy sensor and the lens on (or near) the person's head; a data processor which analyzes data from the electromagnetic energy sensor, wherein the transmission of light from the environment and/or the images of virtual objects are automatically changed based on analysis of data from the electromagnetic energy sensor; and a power source.

In an example, brainwave-controlled augmented reality eyewear can comprise: an electromagnetic energy sensor which is configured to collect data concerning the electromagnetic activity of a person's brain; a lens which is configured to transmit light from the environment to the person's eye, wherein the lens further comprises a display surface which displays images of virtual objects; an eyewear frame which is configured to hold the electromagnetic energy sensor and the lens on (or near) the person's head; a data processor which analyzes data from the electromagnetic energy sensor, wherein the transmission of light from the environment and/or the display of images of virtual objects are automatically changed based on analysis of data from the electromagnetic energy sensor; and a power source.

In an example, brainwave-controlled augmented reality eyewear can comprise: an electromagnetic energy sensor which is configured to collect data concerning the electromagnetic activity of a person's brain; a lens which is configured to transmit light from the environment to the person's eye; an image-generating display surface which displays images of virtual objects, wherein the image-generating display surface is a layer of the lens; an eyewear frame which is configured to hold the electromagnetic energy sensor and the lens on (or near) the person's head; a data processor which analyzes data from the electromagnetic energy sensor, wherein the transmission of light from the environment transmitted by the lens and/or the display of images of virtual objects are automatically changed based on analysis of data from the electromagnetic energy sensor; and a power source.

Brainwave-controlled augmented reality eyewear can display images of virtual objects into a person's field of vision. In an example, these virtual objects can be super-imposed over environmental objects into a person's field of vision. In an example, these virtual objects can appear to interact with environmental objects into a person's field of vision. In an example, these virtual objects can be changed based on changes in the electromagnetic activity of a person's brain. In an example, these virtual objects can be changed based on changes in a person's brainwaves. In an example, brainwave-controlled eyewear creates Cogmented Reality (CR)—a mixture of physical reality and virtual reality which is controlled by changes in a person's brainwaves.

In an example, a virtual object can be generated by a computer. A virtual object can be a computer-generated image which is not visible in a screen-independent environmental context with the naked eye, but does appears to a device-wearer in a screen-independent environmental context. A virtual object can be perceptually linked in physical location and/or position relative to a real environmental object in a person's field of vision. In an example, a virtual object can appear to be connected to an environmental object. A virtual object can appear to a viewer as being consistently on top of, adjacent to, or beneath an environmental object. In an example, a virtual object can be super-imposed over (i.e. shown in front of and/or occluding) an environmental object or sub-imposed under (i.e. shown behind and/or occluded by) an environmental object in a person's field of vision. In an example, a virtual object can appear to be moving with an environmental object when the environmental object moves. In an example, both a virtual object and an environmental object can appear to move together, relative to a person's field of vision, when the person moves their head.

In an example, a virtual object can be linked conceptually to an environmental object. In an example, a virtual object can comprise words, symbols, or graphics which convey information about a nearby environmental object. In an example, virtual words providing nutritional information can be displayed near food in a person's field of vision in order to provide the person with information to better manage their food consumption choices. In an example, an unappealing image can be shown near tempting, but unhealthy, food in a person's field of vision to decrease the person's desire to eat that food. For example, a weight-augmented image of a person could be shown near a sugary drink to deter consumption. In an example, a picture of a diseased lung could be shown near a pack of cigarettes to deter smoking. In an example, positive images could be shown near environmental objects which improve a person's health to encourage their consumption and/or use.

In an example, the appearance of a virtual object can be changed to simulate its physical interaction with a physical environmental object. In an example, a virtual object can appear to be obscured by a physical object when the two objects meet. In an example, a virtual object can appear to come out of (or go into) a physical object. In an example, a person can move a virtual object by moving their hand, changing the direction of their gaze, or changing their brainwave patterns. With brainwave-controlled augmented reality eyewear, a person can move a virtual object (e.g. virtual mouse, cursor, or pointer) by changing their brain activity. In an example, a virtual object can function as a virtual mouse and/or cursor to enable a person to interact with their environment in augmented reality. In an example, a person can select an environmental object by moving a virtual object (e.g. virtual mouse, cursor, or pointer) to the environmental object. In an example, a person can use brainwave-controlled augmented eyewear to find out information about an environmental object and/or to purchase it.

In an example, brainwave-controlled augmented reality eyewear can control a device in the physical environment (such as a robot, done, actuator, or appliance) which enables the wearer of the eyewear to move, activate, and/or control environmental objects by thought. In an example, a person can change their brainwaves, which moves a virtual object in their environment, which controls a robot, done, actuator, or appliance in the person's physical environment. This can be invaluable for a person who is paralyzed or otherwise unable to control a physical mouse, touch screen, or keyboard. In an example, brainwave-controlled augmented reality eyewear can empower a paralyzed person to move and control objects in their environment selected from the group consisting of: lights, television, home environmental controls, doors, appliances, communication devices, drones, faucets, and robots. In an example, a person can use Cogmented Reality (CR) to control lights, television, home environmental controls, doors, appliances, communication devices, drones, faucets, and/or robots.

In an example, augmented reality eyewear can comprise an image-generating lens. In an example, an image-generating lens can comprise a component selected from the group consisting of: active matrix organic light-emitting diode; active matrix organic light-emitting diode array or matrix; laser diode array or matrix; Light Emitting Diode (LED); Light Emitting Diode (LED) array or matrix; organic light emitting diode (OLED); organic light emitting diode (OLED) array or matrix; passive matrix light-emitting diode; and passive matrix light-emitting diode array or matrix.

In an example, an image-generating lens can comprise a component selected from the group consisting of: computer display; digital pixel array or matrix; holographic optical element; holographic optical element array or matrix; laser array or matrix; micro-display array or matrix; optoelectronic display; photoelectric display; transmission holographic optical element; and transmission holographic optical element array or matrix. In an example, an image-generating lens can comprise a component selected from the group consisting of: coherent light projector; collimated light projector; holoprojector; image projector; laser projector; micro-projector; micro-projector array or matrix; pico-projector; projector; and projector array or matrix.

In an example, an image-generating lens can comprise a component selected from the group consisting of: mirror; mirror array or matrix; micro-mirror array or matrix; reflection holographic optical element; reflection holographic optical element array or matrix; reflection holographic volume grating; reflection holographic volume grating array or matrix; reflective surface; semi-reflective film; and semi-reflective mirror. In an example, an image-generating lens can comprise a component selected from the group consisting of: etched waveguide; etched waveguide array or matrix; fiber optics array or matrix; light channel array or matrix; light guide; light guide array or matrix; light-guiding channel; light-guiding channel array or matrix; light-guiding tube; light-guiding tube array or matrix; light-transmitting nanotube; light-transmitting nanotube array or matrix; optical waveguide; optical waveguide array or matrix; wave guide; wave guide array or matrix; wedge-shaped waveguide; and wedge-shaped waveguide array or matrix.

In an example, an image-generating lens can comprise a component selected from the group consisting of: beam splitter; birefringent material; birefringent material array or matrix; diffraction grating; diffraction grating array or matrix; diffraction optical element array or matrix; directional diffuser; holographic array or matrix; holographic display; nanoscale grating; nanoscale grating array or matrix; photonic metamaterial; photonic metamaterial array or matrix; polarizing beam splitter; prism; prism array or matrix; spatial filter; and spatial light modulator. In an example, an image-generating lens can comprise a component selected from the group consisting of: computer screen; crystal array or matrix; digital display; digital light processor; electronic display; liquid crystal array or matrix; metal oxide semiconductor field effect transistor; metal oxide semiconductor field effect transistor array or matrix; off-axis optical projection system; optical filter; optoelectric lens array or matrix; thin-film transistor; and thin-film transistor array or matrix. In an example, an image-generating lens can comprise a digital light processor. In an example, an image-generating lens can comprise a substrate containing a liquid crystal display.

In an example, augmented reality eyewear can comprise a stereoscopic display. In an example, augmented reality eyewear can have dual displays, one for the right eye and one for the left eye. In an example, brainwave-controlled augmented reality eyewear can comprise a see-through display screen. In an example, this display screen can be curved. In an example, this curve can be a portion of a cylinder or sphere.

In an example, an image-generating portion of a lens can have a first configuration in which it is transparent and a second configuration in which it is not transparent. In an example, an image-generating portion of a lens can have a first configuration in which it is transparent and a second configuration in which it displays virtual objects. In an example, an image-generating portion of a lens can have a first configuration with a first level of transparency and a second configuration with a second level of transparency, wherein the second level is less than the first level.

In an example, an image-generating portion of a lens can comprise a lens layer or a series of lens layers. In an example, an image-generating lens layer or layers can be located inside a lens, between two other parts of the lens. In an example, an image-generating lens layer can be located inside a lens, between two other layers of the lens. In an example, an image-generating lens (or portion thereof) can have a two-layer or three-layer composited structure. In an example, an image-generating lens (or portion thereof) can have a two-layer or three-layer laminated structure. In an example, an image-generating portion lens layer can be located on the outside of a lens. In an example, an image-generating portion lens layer can be located on the surface of a lens. In an example, an image-generating lens layer can be electronically-activated. In an example, an image-generating lens layer can include photo-electronic circuitry.

In an example, an image-generating portion of a lens can span the entire (vertical cross-sectional) area of a lens. In an example, an image-generating portion of a lens can span the entire eye-facing surface area of a lens. In an example, an image-generating portion of a lens can span between 25% and 66% of the (vertical cross-sectional) area of a lens. In an example, an image-generating portion of a lens can span between 25% and 66% of the eye-facing surface area of a lens. In an example, an image-generating portion of a lens can span between 10% and 26% of the (vertical cross-sectional) area of a lens. In an example, an image-generating portion of a lens can span between 10% and 26% of the eye-facing surface area of a lens.

In an example, an image-generating portion of a lens can be located on the left half of a lens. In an example, an image-generating portion of a lens can be located on the lower-left quarter of a lens. In an example, an image-generating portion of a lens can be located on the upper-left quarter of a lens. In an example, an image-generating portion of a lens can be located on the right half of a lens. In an example, an image-generating portion of a lens can be located on the lower-right quarter of a lens. In an example, an image-generating portion of a lens can be located on the upper-right quarter of a lens. In an example, an image-generating portion of a lens can be on the lower half of a lens. In an example, an image-generating portion of a lens can be on the upper half of a lens.

In an example, a lens can have a first portion which transmits light from the environment and a second portion which generates images of virtual objects. In an example, the second portion can comprise between 25% and 66% of the eye-facing surface area of the lens. In an example, the second portion can comprise between 25% and 66% of the person's field of vision. In an example, the second portion can comprise between 10% and 26% of the eye-facing surface area of the lens. In an example, the second portion can comprise between 10% and 26% of the person's field of vision.

In an example, a first (environmental light transmitting) portion of a lens can be nested within a second (virtual image generating) portion of a lens. In an example, a first portion can span a person's central field of vision and a second portion can span (some or all of) the person's peripheral field of vision. In an example, first and second portions can be concentric. In an example, first and second portions can be coplanar. In an example, first and second portions can be parallel to each other. In an example, a lens can comprise a first portion which transmits light from the environment, a second portion which generates images of virtual objects, and a third portion which generates images of virtual objects. In an example, the first portion can span a central portion of the lens. In an example, the second and third portions can be located to the right and left sides, respectively, of the first portion. In an example, a lens can include a three-dimensional series of imaging-generating layers. In an example, a lens can include a three-dimensional series of parallel imaging-generating layers.

In an example, an image-generating portion of a lens can comprise an array, matrix, or series of light guides, waveguides, or channels. In an example, an image-generating portion of a lens can comprise an array, matrix, or series of liquid crystals. In an example, an image-generating portion of a lens can comprise an array, matrix, or series of fiber optics. In an example, an image-generating portion of a lens can comprise an array, matrix, or series of diffraction gratings. In an example, an image-generating portion of a lens can comprise an array, matrix, or series of nanotubes. In an example, an image-generating portion of a lens can comprise an array, matrix, or series of meta-materials and/or split-ring resonators. In an example, an image-generating portion of a lens can comprise an array, matrix, or series of LEDs. In an example, an image-generating portion of a lens can comprise an array, matrix, or series of metal oxide semiconductor field effect transistors. In an example, an image-generating portion of a lens can comprise an array, matrix, or series of holographic optical elements.

In an example, an image-generating portion of a lens can comprise a component selected from the group consisting of: active matrix organic light-emitting diode; active matrix organic light-emitting diode array or matrix; laser diode array or matrix; Light Emitting Diode (LED); Light Emitting Diode (LED) array or matrix; organic light emitting diode (OLED); organic light emitting diode (OLED) array or matrix; passive matrix light-emitting diode; and passive matrix light-emitting diode array or matrix. In an example, an image-generating portion of a lens can comprise a component selected from the group consisting of: computer display; digital pixel array or matrix; holographic optical element; holographic optical element array or matrix; laser array or matrix; micro-display array or matrix; micro-mirror array or matrix; optoelectronic display; photoelectric display; transmission holographic optical element; and transmission holographic optical element array or matrix.

In an example, an image-generating portion of a lens can comprise a component selected from the group consisting of: coherent light projector; collimated light projector; holo-projector; image projector; laser projector; micro-projector; micro-projector array or matrix; picoprojector; projector; and projector array or matrix. In an example, an image-generating portion of a lens can comprise a component selected from the group consisting of: mirror; mirror array or matrix; micro-mirror array or matrix; reflection holographic optical element; reflection holographic optical element array or matrix; reflection holographic volume grating; reflection holographic volume grating array or matrix; reflective surface; semi-reflective film; and semi-reflective mirror.

In an example, an image-generating portion of a lens can comprise a component selected from the group consisting of: etched waveguide; etched waveguide array or matrix; fiber optics array or matrix; light channel array or matrix; light guide; light guide array or matrix; light-guiding channel; light-guiding channel array or matrix; light-guiding tube; light-guiding tube array or matrix; light-transmitting nanotube; light-transmitting nanotube array or matrix; optical waveguide; optical waveguide array or matrix; wave guide; wave guide array or matrix; wedge-shaped waveguide; and wedge-shaped waveguide array or matrix.

In an example, an image-generating portion of a lens can comprise a component selected from the group consisting of: beam splitter; birefringent material; birefringent material array or matrix; diffraction grating; diffraction grating array or matrix; diffraction optical element array or matrix; directional diffuser; holographic array or matrix; holographic display; nanoscale grating; nanoscale grating array or matrix; photonic metamaterial; photonic metamaterial array or matrix; polarizing beam splitter; prism; prism array or matrix; spatial filter; and spatial light modulator. In an example, an image-generating portion of a lens can comprise a component selected from the group consisting of: computer screen; crystal array or matrix; digital display; digital light processor; electronic display; liquid crystal array or matrix; metal oxide semiconductor field effect transistor; metal oxide semiconductor field effect transistor array or matrix; off-axis optical projection system; optical filter; optoelectric lens array or matrix; thin-film transistor; and thin-film transistor array or matrix.

In an example, augmented reality eyewear can comprise a lens and one or more light sources (such as LEDs) located within 2" of the perimeter of the lens. In an example, augmented reality eyewear can comprise a lens with one or more light sources (such as LEDs) located on (or around) the cross-sectional perimeter of the lens. In an example, an image-generating portion of a lens can be an array, matrix, or series of light guides, waveguides, or channels which transmit light from one or more light sources (such as LEDs) on the perimeter of a lens to one or more points within the perimeter of the lens. In an example, an image-generating portion of a lens can be an array, matrix, or series of liquid crystals which transmit light from one or more light sources (such as LEDs) on the perimeter of a lens to one or more points within the perimeter of the lens. In an example, an image-generating portion of a lens can be an array, matrix, or series of fiber optics which transmit light from one or more light sources (such as LEDs) on the perimeter of a lens to one or more points within the perimeter of the lens.

In an example, an image-generating portion of a lens can be an array, matrix, or series of diffraction gratings which transmit light from one or more light sources on the perimeter of a lens to one or more points within the perimeter of the lens. In an example, an image-generating portion of a lens can be an array, matrix, or series of nanotubes which transmit light from one or more light sources on the perimeter of a lens to one or more points within the perimeter of the lens. In an example, an image-generating portion of a lens can be an array, matrix, or series of meta-materials and/or split-ring resonators which transmit light from one or more light sources on the perimeter of a lens to one or more points within the perimeter of the lens.

In an example, an image-generating portion of a lens can be a parallel array of light guides, waveguides, or channels. In an example, an image-generating portion of a lens can be a parallel array of liquid crystals. In an example, an image-generating portion of a lens can be a parallel array of fiber optics. In an example, an image-generating portion of a lens can be a parallel array of diffraction gratings. In an example, an image-generating portion of a lens can be a parallel array of nanotubes. In an example, an image-generating portion of a lens can be a parallel array of meta-materials and/or split-ring resonators. In an example, an image-generating portion of a lens can be a parallel array of LEDs.

In an example, an image-generating portion of a lens can comprise a nested array, matrix, or series of light guides, waveguides, or channels. In an example, an image-generating portion of a lens can comprise a nested array, matrix, or series of liquid crystals. In an example, an image-generating portion of a lens can comprise a nested array, matrix, or series of fiber optics. In an example, an image-generating portion of a lens can comprise a nested array, matrix, or series of diffraction gratings. In an example, an image-generating portion of a lens can comprise a nested array, matrix, or series of nanotubes. In an example, an image-generating portion of a lens can comprise a nested array, matrix, or series of meta-materials and/or split-ring resonators. In an example, an image-generating portion of a lens can comprise a nested array, matrix, or series of LEDs. In an example, an image-generating portion of a lens can comprise a nested array, matrix, or series of holographic optical elements.

In an example, an image-generating portion of a lens can be a concentric array of light guides, waveguides, or channels. In an example, an image-generating portion of a lens can be a concentric array of liquid crystals. In an example, an image-generating portion of a lens can be a nested or concentric array of fiber optics. In an example, an image-generating portion of a lens can be a concentric array of diffraction gratings. In an example, an image-generating portion of a lens can be a nested or concentric array of nanotubes. In an example, an image-generating portion of a lens can be a concentric array of meta-materials or split-ring resonators. In an example, an image-generating portion of a lens can be a concentric array of LEDs. In an example, augmented reality eyewear can comprise one or more electroluminescent, incandescent, infrared, photoluminescent, or ultraviolet light sources. In an example, an image-generating portion of a lens can comprise a concentric array of holographic optical elements.

In an example, an image-generating portion of a lens can be a perpendicular ("criss-crossing") matrix of light guides, waveguides, or channels. In an example, an image-generating portion of a lens can be a perpendicular ("criss-crossing") matrix of liquid crystals. In an example, an image-generating portion of a lens can be a perpendicular ("criss-crossing") matrix of fiber optics. In an example, an image-generating portion of a lens can be a perpendicular ("criss-crossing") matrix of diffraction gratings. In an example, an image-generating portion of a lens can be a perpendicular ("criss-crossing") matrix of nanotubes. In an example, an image-generating portion of a lens can be a perpendicular ("criss-crossing") matrix of meta-materials and/or split-ring resonators. In an example, an image-generating portion of a lens can be a perpendicular ("criss-crossing") matrix of LEDs. In an example, an image-generating portion of a lens can be a perpendicular matrix of holographic optical elements.

In an example, an image-generating portion of a lens can comprise a three-dimensional (e.g. multi-layer) array of light guides, waveguides, or channels. In an example, an image-generating portion of a lens can comprise a three-dimensional (e.g. multi-layer) array of liquid crystals. In an example, an image-generating portion of a lens can comprise a three-dimensional (e.g. multi-layer) array of fiber optics. In an example, an image-generating portion of a lens can comprise a three-dimensional (e.g. multi-layer) array of diffraction gratings. In an example, an image-generating portion of a lens can comprise a three-dimensional (e.g. multi-layer) array of nanotubes. In an example, an image-generating portion of a lens can comprise a three-dimensional (e.g. multi-layer) array of meta-materials and/or split-ring resonators. In an example, an image-generating portion of a lens can comprise a three-dimensional (e.g. multi-layer) array of LEDs. In an example, an image-generating portion of a lens can comprise a three-dimensional (e.g. multi-layer) array of holographic optical elements.

In an example, a lens can include a micro-mirror array. In an example, a lens with a micro-mirror array can reflect images from a nearby projector or other light source (in a directed and controlled manner) into a person's eye. In an example, brainwave-controlled augmented reality eyewear can comprise: an electromagnetic energy sensor which is configured to collect data concerning the electromagnetic activity of a person's brain; a lens which is configured to transmit light from the environment in real time to the person's eye, wherein the lens further comprises a micro-mirror array which is configured to reflects images of virtual objects into the person's eye; an eyewear frame which is configured to hold the electromagnetic energy sensor and the lens on (or near) the person's head; a data processor which analyzes data from the electromagnetic energy sensor, wherein the transmission of light from the environment transmitted by the lens and/or images of virtual objects are automatically changed based on analysis of data from the electromagnetic energy sensor; and a power source.

In an example, the proportion, mix, and/or blend of environmental objects and virtual objects transmitted by a lens to a person's eye can be automatically changed based on analysis of data from one or more electromagnetic energy sensors. In an example, the proportion, mix, and/or blend of environmental objects and virtual objects transmitted by a lens to a person's eye can be automatically changed based on changes in the relative power of brainwaves in one or more selected frequency bands and/or recognition of a specific brainwave pattern. In an example, the proportion, mix, and/or blend of environmental objects and virtual objects transmitted to a person's eye can be automatically changed based on detection of a specific brainwave pattern. In an example, the proportion, mix, and/or blend of environmental objects and virtual objects transmitted to a person's eye can be automatically changed based on analysis of analysis of data from one or more electromagnetic energy sensors. In an example, one can literally lose sight of with reality when one figuratively loses sight of reality. In an example, one can literally have a flight of fancy when one figuratively has a flight of fancy.

In an example, a virtual object can be linked conceptually to an environmental object. In an example, a virtual object can comprise words, symbols, or graphics which convey information about a nearby environmental object. In an example, the appearance of a virtual object can be changed to simulate physical interaction with a nearby environmental object. In an example a virtual object can appear to come out of (or go into) an environmental object. In an example, a person can move a virtual object by moving their hand or by changing the direction of their gaze. In an example, a person can move a virtual object by changing their brain activity, as measured by electromagnetic energy sensors on augmented reality eyewear. In an example, a person can select an environmental object by moving a virtual object towards the environmental object. In an example, a person can select an environmental object by virtually clicking on it with a virtual cursor.

In an example, augmented reality eyewear can identify certain types of objects in a person's environment and automatically modify the person's view of those objects. In an example, the types of environmental objects whose images are selectively transmitted through a lens can be automatically changed based on analysis of data from one or more electromagnetic energy sensors. In an example, environmental objects whose images are selectively transmitted through a lens can be automatically changed based on changes in the relative power of brainwaves in one or more selected frequency bands and/or recognition of a specific brainwave pattern.

In an example, the types of environmental objects whose images are selectively highlighted by a lens can be automatically changed based on analysis of data from one or more electromagnetic energy sensors. In an example, types of environmental objects whose images are selectively transmitted highlighted by a lens can be automatically changed based on changes in the relative power of brainwaves in one or more selected frequency bands and/or recognition of a specific brainwave pattern. In an example, the types of environmental images transmitted through a lens can be automatically changed based on detection of a specific brainwave pattern. In an example, the types of environmental images transmitted through a lens can be automatically changed based on analysis of analysis of data from one or more electromagnetic energy sensors.

In an example, brainwave-controlled augmented reality eyewear can selectively transmit images of environmental objects or people who are associated with positive or beneficial brainwave patterns. In an example, brainwave-controlled augmented reality eyewear can selectively highlight, amplify, or magnify images of environmental objects or people who are associated with positive or beneficial brainwave patterns. In an example, brainwave-controlled augmented reality eyewear can selectively focus on environmental objects which are associated with positive or beneficial brainwave patterns. In an example, brainwave augmented reality eyewear can selectively highlight an environmental object (e.g. by a flashing virtual cursor, highlighted virtual object outline, virtual icon, or virtual words) in a person's environment which have historically been associated with positive brainwave patterns. In an example, brainwave augmented reality eyewear can selectively highlight a person (e.g. by a flashing virtual cursor, highlighted virtual object outline, virtual icon, or virtual words) who has historically been associated with positive brainwave patterns.

In an example, brainwave-controlled augmented reality eyewear can selectively block, dim, blur, or otherwise modify images of environmental objects or people which are associated with negative or detrimental brainwave patterns. In an example, brainwave-controlled augmented reality eyewear can selectively block, dim, blur, or modify images of environmental objects or people who are associated with negative or detrimental brainwave patterns. In an example, brainwave-controlled augmented reality eyewear can selectively generate virtual objects and superimpose them on environmental objects or people who are associated with negative or detrimental brainwave patterns. In an example, brainwave augmented reality eyewear can block or modify the view of a person who has historically been associated with negative brainwave patterns. For example, if you are giving a public speech and one person in the audience is behaving in a particularly distracting and/or negative manner, then augmented reality can detect this and selectively block, dim, blur, or modify your view of that person. For example, perhaps the person's head will be virtually replaced in your field of vision with the head of a purple dinosaur or yellow smiley face. Alternatively, a person's head can be virtually replaced by the head of a little fuzzy yellow chick—comprising a magic peep.

In an example, brainwave-controlled augmented reality eyewear can include an image-generating and/or image-transmitting display surface which generates and/or transmits images of virtual objects. In an example, this display surface can be separate from a lens. In an example, a display surface can comprise a component selected from the group consisting of: active matrix organic light-emitting diode; active matrix organic light-emitting diode array or matrix; laser diode array or matrix; Light Emitting Diode (LED); Light Emitting Diode (LED) array or matrix; organic light emitting diode (OLED); organic light emitting diode (OLED) array or matrix; passive matrix light-emitting diode; and passive matrix light-emitting diode array or matrix.

In an example, a display surface can comprise a component selected from the group consisting of: computer display; digital pixel array or matrix; holographic optical element; holographic optical element array or matrix; laser array or matrix; micro-display array or matrix; micro-mirror array or matrix; optoelectronic display; photoelectric display; transmission holographic optical element; and transmission holographic optical element array or matrix. In an example, a display surface can comprise a component selected from the group consisting of: coherent light projector; collimated light projector; holoprojector; image projector; laser projector; micro-projector; micro-projector array or matrix; picoprojector; projector; and projector array or matrix.

In an example, a display surface can comprise a component selected from the group consisting of: mirror; mirror array or matrix; micro-mirror array or matrix; reflection holographic optical element; reflection holographic optical element array or matrix; reflection holographic volume grating; reflection holographic volume grating array or matrix; reflective surface; semi-reflective film; and semi-reflective mirror. In an example, a display surface can comprise a component selected from the group consisting of: etched waveguide; etched waveguide array or matrix; fiber optics array or matrix; light channel array or matrix; light guide; light guide array or matrix; light-guiding channel; light-guiding channel array or matrix; light-guiding tube; light-guiding tube array or matrix; light-transmitting nanotube; light-transmitting nanotube array or matrix; optical waveguide; optical waveguide array or matrix; wave guide; wave guide array or matrix; wedge-shaped waveguide; and wedge-shaped waveguide array or matrix.

In an example, a display surface can comprise a component selected from the group consisting of: beam splitter; birefringent material; birefringent material array or matrix; diffraction grating; diffraction grating array or matrix; diffraction optical element array or matrix; directional diffuser; holographic array or matrix; holographic display; nanoscale grating; nanoscale grating array or matrix; photonic metamaterial; photonic metamaterial array or matrix; polarizing beam splitter; prism; prism array or matrix; spatial filter; and spatial light modulator. In an example, a display surface can comprise a component selected from the group consisting of: computer screen; crystal array or matrix; digital display; digital light processor; electronic display; liquid crystal array or matrix; metal oxide semiconductor field effect transistor; metal oxide semiconductor field effect transistor array or matrix; off-axis optical projection system; optical filter; optoelectric lens array or matrix; thin-film transistor; and thin-film transistor array or matrix.

In an example, a display surface can both generate and transmit images of virtual objects. In an example, a display can transmit images of virtual objects which are created in a data processor elsewhere (such as a data processor in a remote device which is separate from the display surface). In an example, a display surface can transmit images of virtual objects to one or both of a person's eyes. In an example, an image-generating display surface can be separate from a lens. In an example, brainwave-controlled reality eyewear can have right and left display surfaces, one for a person's right eye and one for the person's left eye.

In an example, an image-generating display surface can overlap some (or all) of a lens in a person's field of view. In an example, an image-generating display surface can be parallel to a lens. In an example, an image-generating display surface can be between a lens and a person's eye. In an example, an image-generating display surface between a lens and the environment. In an example, an image-generating and/or transmitting display surface can have a first configuration in which it is transparent and a second configuration in which it is not transparent. In an example, an image-generating display surface can have a first configuration in which it is transparent and a second configuration in which it display surfaces a virtual object. In an example, an image-generating display surface can have a first configuration with a first level of transparency and a second configuration with a second level of transparency, wherein the second level is less than the first level. In an example, an image-generating surface can be transitioned from a first (more transparent) configuration to a second (less transparent) configuration by application of electromagnetic energy.

In an example, an image-generating display surface can overlap between 20% and 50% of a lens in a person's field of view. In an example, an image-generating display surface can overlap between 10% and 25% of a lens in a person's field of view. In an example, an image-generating display surface can overlap a portion of the left half of the lens, the lower-left quarter of the lens, or the upper-left quarter of the lens. In an example, an image-generating display surface can overlap a portion of the lower-right quarter of the lens, the right half of the lens, or the upper-right quarter of the lens. In an example, an image-generating display surface can overlap a portion of the lower half of the lens. In an example, an image-generating display surface can overlap a portion of the upper half of the lens.

In an example, an image-generating display surface might not overlap a lens within a person's field of view. In an example, an image-generating display surface can be adjacent to a lens. In an example, an image-generating display surface can be located to the right of a lens. In an example, an image-generating display surface can be located to the left of a lens. In an example, an image-generating display surface can be located above a lens. In an example, an image-generating display surface can be located below a lens. In an example, an image-generating display surface can be co-planar with a lens. In an example, an image-generating display surface can be flat. In an example, an image-generating display surface can curve around the front of a person's face. In an example, the surface of an image-generating display surface can be a section of a sphere. In an example, the surface of image-generating display surface can be a conic section. In an example, augmented reality eyewear can comprise two image-generating display surfaces, one for each eye.

In an example, a separate display surface can display images of virtual objects in a person's field of view when the person wears augmented reality eyewear. In an example, a virtual object can be generated by a computer. In an example, a virtual object is not visible in a screen-independent environmental context with the naked eye, but is visible when a person wears augmented reality eyewear. In an example, a virtual object can be shown in constant proximity to an environmental object. In an example, a virtual object can appear as being consistently next to, connected to, or pointing toward an environmental object. In an example, a virtual object can be super-imposed over (i.e. shown in front of and occluding) an environmental object in a person's field of vision. In an example, a virtual object can be sub-imposed under (i.e. shown behind and occluded by) an environmental object in a person's field of vision. In an example, a virtual object can appear to come out of (or go into) an environmental object. In an example, a virtual object can appear to move with an environmental object when the environmental object moves. In an example, both a virtual object and an environmental object can appear to move together when a person moves their head.

In an example, a person's movement of a virtual object (e.g. via though control) can move a real object in the person's environmental via remote control of an actuator, robot, appliance, or drone. In an example, when a person changes their brainwaves, this changes the location or configuration of a virtual object in the person's field of vision, which then changes the location or configuration of an actuator, robot, appliance, or drone in the person's environment, which then changes the location or configuration of an object in the person's environment.

In an example, a person's movement of a virtual object (e.g. via though control) can initiate a transaction concerning a real object in the person's environmental. In an example, when a person changes their brainwaves, this changes the location or configuration of a virtual object in the person's field of vision, which then selects an object in the person's environment and initiates a transaction. In an example, brainwave controlled augmented eyewear can function in virtual commerce. In an example, augmented reality eyewear can perform five-star banking functions, functioning as an astro teller. In an example, brainwave-controlled augmented reality eyewear can perform algorithm evolution with internal reinforcement for signal understanding.

In an example, augmented reality eyewear can include an image projector. In an example, an image projector can project images of virtual objects. In an example, an image projector can project images of environmental objects. In an example, an image projector can project a mixture of virtual objects and environmental objects. In an example, augmented reality eyewear can include one or more light projectors can be selected from the group consisting of: collimated light projector; holographic projector; holoprojector; intra-lens light projector; laser projector; microprojector; picoprojector; and projector array.

In an example, an image projector can project images onto a screen, lens, or other reflective surface. In an example, an image projector can project images onto the surface of a screen, lens, or other reflective surface which faces a person's eye. In an example, an image projector can project images onto the surface of a screen, lens, or other reflective surface which faces away from a person's eye, but these images can be seen by the person through the eye-facing surface. In an example, an image projector can project images onto the front a screen, lens, or other reflective surface. In an example, an image projector can project images onto the back a screen, lens, or other reflective surface. In an example, an image projector can project images onto a semi-reflective film, coating, or layer on a lens. In an example, an image projector can project images onto a moving micro-mirror array. In an example, an image projector can project images directly into a person's eye(s). In an example, a beam of light from an image projector can be directed toward the retina of a person's eye.

In an example, an image projector can project collimated and/or coherent light. In an example, an image projector can comprise one or more lasers. In an example, an image projector can project two or more beams of light which intersect to form an interference pattern. In an example, an image projector can project two or more beams of light which intersect to form an interference pattern on, within, or near a lens. In an example, an image projector can project two or more beams of light which intersect to form a hologram on, within, or near a person's eye. In an example, an image projector can comprise one or more lasers. In an example, a projector can project a hologram. In an example, an image projector can project two or more beams of light which intersect to form a hologram. In an example, an image projector can project two or more beams of light which intersect to form a hologram on, within, or near a lens. In an example, an image projector can project two or more beams of light which intersect to form a hologram on, within, or near a person's eye.

In an example, an image projector can face downward. In an example, an image projector can face upwards. In an example, augmented reality eyewear can comprise dual light projectors, one for each eye. In an example, the focal distance of a beam of light can be changed. In an example, the direction of a beam of light can be moved. In an example, the direction of a beam of light from an image projector can be scanned back and forth. In an example, the direction of a beam of light from an image projector can be moved in a circular or spiral path.

In an example, augmented reality eyewear can include an array of light projectors. In an example, augmented reality eyewear can include a movable array of light projectors. In an example, augmented reality eyewear can include an array of light projectors which are distributed along an arcuate surface. In an example, augmented reality eyewear can include an array of light projectors which are distributed along a convex or concave surface. In an example, augmented reality eyewear can include a convex or concave array of light projectors. In an example, augmented reality eyewear can include a parabolic array of light projectors. In an example, augmented reality eyewear can include a circular or elliptical array of light projectors.

In an example, an image projector can be in front of a lens. In an example, an image projector can be behind a lens. In an example, an image projector can be to the right a lens. In an example, an image projector can be located to the left of a lens. In an example, an image projector can be above a lens. In an example, an image projector can be below a lens. In an example, an image projector can be co-planar with a lens. In an example, an image projector can be perpendicular to (the vertical cross-sectional surface of) a lens. In an example, an image projector can be located on a sidepiece of an eyewear frame, between a person's ear and a frontpiece. In an example, an image projector can be located on a frontpiece of an eyewear frame, wherein the frontpiece spans a portion of a person's forehead. In an example, there can be two light projectors on a frontpiece which spans a portion of a person's forehead—a right-side projector above the right eye and a left-side projector above the left eye.

In an example, augmented reality eyewear can include an array of light projectors pointed toward the eye-facing surface of a lens. In an example, augmented reality eyewear can include an array (e.g. a circular or elliptical array) of light projectors on the perimeter of a lens. In an example, augmented reality eyewear can include an array (e.g. a circular or elliptical array) of light projectors around a lens. In an example, augmented reality eyewear can include an array (e.g. a circular or elliptical array) of light projectors configured around a person's eye. In an example, augmented reality eyewear can include a three-dimensional stacked array of light projectors.

In an example, an image projector can be in front of a screen or other reflective surface. In an example, an image projector can be behind a screen or other reflective surface. In an example, an image projector can be to the right of a screen or other reflective surface. In an example, an image projector can be to the left of a screen or other reflective surface. In an example, an image projector can be located above a screen or other reflective surface. In an example, an image projector can be located below a screen or other reflective surface. In an example, an image projector can be co-planar with a screen or other reflective surface. In an example, an image projector can be perpendicular to (the vertical cross-sectional surface of) a screen or other reflective surface. In an example, augmented reality eyewear can include an array of light projectors pointed toward a screen or other reflective surface. In an example, augmented reality eyewear can include an array (e.g. a circular or elliptical array) of light projectors around a screen or other reflective surface.

In an example, augmented reality eyewear can comprise: an electromagnetic energy sensor which is configured to collect data concerning the electromagnetic activity of a person's brain; a lens which is configured to transmit light from the environment to the person's eye; an image projector which projects images of virtual objects onto the lens; an eyewear frame which is configured to hold the electromagnetic energy sensor, the lens, and the image projector on (or near) the person's head; a data processor which analyzes data from the electromagnetic energy sensor, wherein the transmission of light from the environment and/or images of virtual objects are automatically changed based on analysis of data from the electromagnetic energy sensor; and a power source.

In an example, augmented reality eyewear can comprise: an electromagnetic energy sensor which is configured to collect data concerning the electromagnetic activity of a person's brain; a lens which is configured to transmit light from the environment to the person's eye; an image projector which is configured to project images of virtual objects directly into the person's eye; an eyewear frame which is configured to hold the electromagnetic energy sensor, the lens, and the image projector on (or near) the person's head; a data processor which analyzes data from the electromagnetic energy sensor, wherein the transmission of light from the environment and/or images of virtual objects are automatically changed based on analysis of data from the electromagnetic energy sensor; and a power source.

In an example, augmented reality eyewear can comprise: an electromagnetic energy sensor which is configured to collect data concerning the electromagnetic activity of a person's brain; a lens which is configured to transmit light from the environment in real time to the person's eye; an image projector which projects images of virtual objects onto a screen or other reflective surface; an eyewear frame which is configured to hold the electromagnetic energy sensor, the lens, and the screen or other reflective surface on (or near) the person's head; a data processor which analyzes data from the electromagnetic energy sensor, wherein the transmission of light from the environment and/or images of virtual objects are automatically changed based on analysis of data from the electromagnetic energy sensor; and a power source.

In an example, brainwave-controlled augmented reality eyewear can include one or more cameras. In an example, augmented reality eyewear can include two cameras for three-dimensional imaging and environmental pattern recognition. In an example, augmented reality eyewear can create a three-dimensional model of a person's physical environment. In an example, images of the environment captured by a camera can be transmitted to a person's eye via an image-generating lens (e.g. "smart lens"). In an example, images of the environment captured by a camera can be transmitted to a person's eye via an image-generating display. In an example, images of the environment captured by a camera can be transmitted to a person's eye via an image projector.

In an example, images of environmental objects captured by a camera can be used to simulate interaction between a virtual object and an environmental object in a person's field of vision. In an example, a virtual object can be superimposed on (shown on top of), sub-imposed under (shown underneath), or shown adjacent to (near) an environmental object. In an example, augmented reality can further comprise a camera which captures light reflected from a person's eye. In an example, patterns of light reflected from a person's retina can be used for identity validation purposes.

In an example, augmented reality eyewear can comprise: an electromagnetic energy sensor which is configured to collect data concerning the electromagnetic activity of a person's brain; a camera; an image display which displays images of environmental objects and virtual objects; an eyewear frame which is configured to hold the electromagnetic energy sensor, the camera, and the image display on (or near) the person's head; a data processor which analyzes data from the electromagnetic energy sensor, wherein the transmission of light from the environment and/or images of virtual objects are automatically changed based on analysis of data from the electromagnetic energy sensor; and a power source.

In an example, augmented reality eyewear can comprise: an electromagnetic energy sensor which is configured to collect data concerning the electromagnetic activity of a person's brain; a camera; an image projector which projects images of environmental objects and virtual objects; an eyewear frame which is configured to hold the electromagnetic energy sensor, the camera, and the image projector on (or near) the person's head; a data processor which analyzes data from the electromagnetic energy sensor, wherein the transmission of light from the environment and/or images of virtual objects are automatically changed based on analysis of data from the electromagnetic energy sensor; and a power source.

In an example, augmented reality eyewear can comprise: an electromagnetic energy sensor which is configured to collect data concerning the electromagnetic activity of a person's brain; a camera; a lens which is configured to transmit light from the environment to the person's eye; an image display which displays images of virtual objects; an eyewear frame which is configured to hold the electromagnetic energy sensor, the camera, the lens, and the image display on (or near) the person's head; a data processor which analyzes data from the electromagnetic energy sensor, wherein the transmission of light from the environment and/or images of virtual objects are automatically changed based on analysis of data from the electromagnetic energy sensor; and a power source.

In an example, augmented reality eyewear can comprise: an electromagnetic energy sensor which is configured to collect data concerning the electromagnetic activity of a person's brain; a camera; a lens which is configured to transmit light from the environment to the person's eye, wherein a layer (or other portion) of the lens also transmits images of virtual objects to the person's eye; an eyewear frame which is configured to hold the electromagnetic energy sensor, the camera, and the lens on (or near) the person's head; a data processor which analyzes data from the electromagnetic energy sensor, wherein the transmission of light from the environment and/or images of virtual objects are automatically changed based on analysis of data from the electromagnetic energy sensor; and a power source.

In an example, augmented reality eyewear can comprise a single light-transmitting member (such as a lens with integrated optoelectronics) which is configured to transmit environmental light to a person's eye and also display images of virtual objects to the person's eye. In an example, augmented reality eyewear can comprise: an electromagnetic energy sensor which is configured to collect data concerning the electromagnetic activity of a person's brain; a light-transmitting member which is configured to transmit images of environmental objects to the person's eye and also send images of virtual objects to the person's eye; an eyewear frame which is configured to hold the electromagnetic energy sensor and the light-transmitting member on (or near) the person's head; a data processor which analyzes data from the electromagnetic energy sensor, wherein images of environment objects and/or images of virtual objects are automatically changed based on analysis of data from the electromagnetic energy sensor; and a power source.

In an example, augmented reality eyewear can comprise a first light-transmitting member (such as a lens) which transmits environmental light to a person's eye and a second light-transmitting member (such as an image display or image projector) which sends images of virtual objects to the person's eye. In an example, augmented reality eyewear can comprise: an electromagnetic energy sensor which is configured to collect data concerning the electromagnetic activity of a person's brain; a first light-transmitting member which is configured to transmit light from the environment to the person's eye; a second light-transmitting member which is configured to send images of virtual objects to the person's eye; an eyewear frame which is configured to hold the electromagnetic energy sensor, the first light-transmitting member, and the second light-transmitting member on (or near) the person's head; a data processor which analyzes data from the electromagnetic energy sensor, wherein the transmission of light from the environment and/or the images of virtual objects is automatically changed based on analysis of data from the electromagnetic energy sensor; and a power source.

In an example, a first light-transmitting member (for transmitting environmental light) can be selected from the group consisting of: aspheric lens, asymmetric lens, collimating lens, compound lens, concave lens, concentric lenses, contact lens, convex lens, curved lens, diverging lens, filtered lens, flat lens, fluid lens, fly's eye lens, Fresnel lens, lens array, lens with adjustable concavity or convexity, lens with adjustable distance between two rigid components, lens with adjustable refractive index, lens with electro-tinting, lens with integrated circuitry, lens with nanoscale gratings, liquid lens, MEMS-adjustable lens, MEMS-based lens array, microlens, mirrored lens, movable lens, optoelectric lens, optoelectronic lens, parabolic lens, photoelectric lens, piezoelectrically-adjustable lens, prescription lens, semi-reflective lens, simple lens, smart lens, spherical lens, tinted lens, variable-focus lens, virtual curved lens, vision-correcting lens, and wedge-shaped lens.

In an example, a second light-transmitting member (for displaying virtual objects) can comprise one or more components selected from the group consisting of: active matrix organic light-emitting diode; active matrix organic light-emitting diode array or matrix; laser diode array or matrix; Light Emitting Diode (LED); Light Emitting Diode (LED) array or matrix; organic light emitting diode (OLED); organic light emitting diode (OLED) array or matrix; passive matrix light-emitting diode; and passive matrix light-emitting diode array or matrix. In an example, a second light-transmitting member can comprise one or more components selected from the group consisting of: computer display; digital pixel array or matrix; holographic optical element; holographic optical element array or matrix; laser array or matrix; micro-display array or matrix; micro-mirror array or matrix; optoelectronic display; photoelectric display; transmission holographic optical element; and transmission holographic optical element array or matrix.

In an example, a second light-transmitting member can comprise one or more components selected from the group consisting of: coherent light projector; collimated light projector; holoprojector; image projector; laser projector; micro-projector; micro-projector array or matrix; picoprojector; projector; and projector array or matrix. In an example, a second light-transmitting member can comprise one or more components selected from the group consisting of: mirror; mirror array or matrix; reflection holographic optical element; reflection holographic optical element array or matrix; reflection holographic volume grating; reflection holographic volume grating array or matrix; reflective surface; semi-reflective film; and semi-reflective mirror.

In an example, a second light-transmitting member can comprise one or more components selected from the group consisting of: etched waveguide; etched waveguide array or matrix; fiber optics array or matrix; light channel array or matrix; light guide; light guide array or matrix; light-guiding channel; light-guiding channel array or matrix; light-guiding tube; light-guiding tube array or matrix; light-transmitting nanotube; light-transmitting nanotube array or matrix; optical waveguide; optical waveguide array or matrix; wave guide; wave guide array or matrix; wedge-shaped waveguide; and wedge-shaped waveguide array or matrix.

In an example, a second light-transmitting member can comprise one or more components selected from the group consisting of: beam splitter; birefringent material; birefringent material array or matrix; diffraction grating; diffraction grating array or matrix; diffraction optical element array or matrix; directional diffuser; holographic array or matrix; holographic display; nanoscale grating; nanoscale grating array or matrix; photonic metamaterial; photonic metamaterial array or matrix; polarizing beam splitter; prism; prism array or matrix; spatial filter; and spatial light modulator. In an example, a second light-transmitting member can comprise one or more components selected from the group consisting of: computer screen; crystal array or matrix; digital display; digital light processor; electronic display; liquid crystal array or matrix; metal oxide semiconductor field effect transistor; metal oxide semiconductor field effect transistor array or matrix; off-axis optical projection system; optical filter; optoelectric lens array or matrix; thin-film transistor; and thin-film transistor array or matrix.

In an example, a first light-transmitting member and a second light-transmitting member can be separate parts of augmented reality eyewear. In an example, a second light-transmitting member can be above a first light-transmitting member. In an example, a second light-transmitting member can be below a first light-transmitting member. In an example, a second light-transmitting member can be adjacent to a first light-transmitting member. In an example, a second light-transmitting member can be behind a first light-transmitting member. In an example, a second light-transmitting member can be in front of a first light-transmitting member. In an example, a second light-transmitting member can be below a first light-transmitting member. In an example, a second light-transmitting member can be above a first light-transmitting member. In an example, a second light-transmitting member can be co-planar with a first light-transmitting member, or vice versa. In an example, a second light-transmitting member can cover a portion of a first light-transmitting member. In an example, a first light-transmitting member can cover a portion of a second light-transmitting member.

In an example, a second light-transmitting member can be in front of a first light-transmitting member, or vice versa. In an example, a second light-transmitting member can be parallel to first light-transmitting member, or vice versa. In an example, a second light-transmitting member can be perpendicular to first light-transmitting member, or vice versa. In an example, a second light-transmitting member can be separated by a constant distance from a first light-transmitting member, or vice versa. In an example, a second light-transmitting member can be to the left of a first light-transmitting member, or vice versa. In an example, a second light-transmitting member can be to the right of a first light-transmitting member, or vice versa.

In an example, a first light-transmitting member and a second light-transmitting member can be portions of the same part of augmented reality eyewear. In an example, a second light-transmitting member can be a subset or part of a first light-transmitting member, or vice versa. In an example, a second light-transmitting member can be a layer of a first light-transmitting member, or vice versa. In an example, a second light-transmitting member can be a sub-set of a first light-transmitting member, or vice versa. In an example, a second light-transmitting member can be interlaced with first light-transmitting member, or vice versa.

In an example, a second light-transmitting member can be layered with a first light-transmitting member, or vice versa. In an example, a second light-transmitting member can be nested with a first light-transmitting member, or vice versa. In an example, a second light-transmitting member can overlap a first light-transmitting member, or vice versa. In an example, a second light-transmitting member can be peripheral to a first light-transmitting member, or vice versa. In an example, a second light-transmitting member can be within the perimeter of a first light-transmitting member, or vice versa.

In an example, a second light-transmitting member can span between 10% and 25% of the surface area of a first light-transmitting member. In an example, a second light-transmitting member can span between 20% and 50% of the surface area of a first light-transmitting member. In an example, a second light-transmitting member can span between 10% and 25% of the eye-facing area of a first light-transmitting member. In an example, a second light-transmitting member can span between 20% and 50% of the eye-facing area of a first light-transmitting member. In an example, a second light-transmitting member can have an eye-facing surface area which is 10% to 25% of the size of the eye-facing area of a first light-transmitting member. In an example, a second light-transmitting member can have an eye-facing surface area which is 20% to 50% of the size of the eye-facing area of a first light-transmitting member.

In an example, an image display can span between 10% and 25% of the surface area of a lens. In an example, an image display can span between 20% and 50% of the surface area of a lens. In an example, an image display can span between 10% and 25% of the eye-facing area of a lens. In an example, an image display can span between 20% and 50% of the eye-facing area of a lens. In an example, an image display can have an eye-facing surface area which is 10% to 25% of the size of the eye-facing area of a lens. In an example, an image display can have an eye-facing surface area which is 20% to 50% of the size of the eye-facing area of a lens.

In an example, an image-reflecting screen can span between 10% and 25% of the surface area of a lens. In an example, an image-reflecting screen can span between 20% and 50% of the surface area of a lens. In an example, an image-reflecting screen can span between 10% and 25% of the eye-facing area of a lens. In an example, an image-reflecting screen can span between 20% and 50% of the eye-facing area of a lens. In an example, an image-reflecting screen can have an eye-facing surface area which is 10% to 25% of the size of the eye-facing area of a lens. In an example, an image-reflecting screen can have an eye-facing surface area which is 20% to 50% of the size of the eye-facing area of a lens.

In an example, a first portion of a light-transmitting lens, display, reflector, projector, or screen can transmit light from real-time environmental objects and a second portion of the light-transmitting lens, display, reflector, projector, or screen can transmit images of virtual objects. In an example, a light-transmitting lens, display, reflector, projector, or screen can transmit light which combines an external view of real-time environmental object with a generated view of virtual objects. In an example, augmented reality eyewear can comprise a pair of right-side and left-side light-transmitting lenses, displays, reflectors, projectors, or screens—one for each eye. In an example, augmented reality eyewear can have a single lens and a single display which each span both eyes. In an example, brainwave-controlled augmented reality eyewear can comprise two lenses (one for each eye) and two displays (one for each eye). In an example, augmented reality eyewear can comprise a two-dimensional array of multiple light-transmitting lenses, displays, reflectors, projectors, or screens. In an example, augmented reality eyewear can comprises a three-dimensional array of multiple light-transmitting lenses, displays, reflectors, projectors, or screens.

In an example, a light-transmitting lens, display, reflector, projector, or screen can comprise two transparent layers with display circuitry between them. In an example, a light-transmitting lens, display, reflector, projector, or screen can comprise two transparent layers with electro-optical and/or photoelectric circuitry between them. In an example, a light-transmitting lens, display, reflector, projector, or screen can comprise two transparent layers with optical fibers between. In an example, a light-transmitting lens, display, reflector, projector, or screen can comprise two transparent layers with optical waveguides between them. In an example, a light-transmitting lens, display, reflector, projector, or screen can further comprise a plurality of carbon nanotubes, etched waveguides, light-guiding tubes, light-guiding channels, and/or nanoscale gratings. In an example, a light-transmitting lens, display, reflector, projector, or screen can further comprise a light-guiding metamaterial structure, photonic metamaterial, and/or birefringent material.

In an example, a light-transmitting lens, display, reflector, projector, or screen can comprise a crystalline structure. In an example, a light-transmitting lens, display, reflector, projector, or screen can comprise a structure selected from the group consisting of: a crystal array, an array of crystals with different alignments, an array of crystals with different orientations, immobilized liquid crystals, liquid crystal monomers, liquid crystals, liquid crystals on a silicon display, photonic crystals, two liquid crystal areas with different refractive indexes. In an example, a light-transmitting lens, display, reflector, projector, or screen can comprise fiber optics. In an example, it can comprise a plurality of parallel optical fibers. In an example, a light-transmitting lens, display, reflector, projector, or screen can comprise a cylindrical prism. In an example, a light-transmitting lens, display, reflector, projector, or screen can comprise a volume grating. In an example, a light-transmitting lens, display, reflector, projector, or screen can comprise a diffractive optical element. In an example, a light-transmitting lens, display, reflector, projector, or screen can comprise a digital light processor.

In an example, light-transmitting member can have a first configuration in which it is transparent and a second configuration in which it is not transparent. In an example, a light-transmitting member can have a first configuration in which it is transparent and a second configuration in which it displays a virtual object. In an example, a light-transmitting member can have a first configuration with a first level of transparency and a second configuration with a second level of transparency, wherein the second level is less than the first level. In an example, a light-transmitting member can be changed from a first configuration to a second configuration by the selective application of electromagnetic energy.

In an example, a light-transmitting member can be a display which transmits images of real-time environmental objects which have been captured by a camera. In an example, a display can transmit images of environmental objects in real time to a person's eye. In an example, a display can be curved. In an example, a display can have a surface which is a section of a sphere. In an example, a display can have a surface which is a conic section. In an example, a light-transmitting member can be a projector which projects images of environmental objects which have been captured by a camera in real time. In an example, a projector can project these images onto a screen on (or near) the person's head. In an example, a projector can project these images onto a lens. In an example, a projector can project images directly into a person's eye.

In an example, an overall category of eyewear for augmented reality eyewear can be selected from the group consisting of: augmented reality headset, contact lens or lenses, electronically-functional glasses, eye glasses-type display, eyeglasses, face mounted display, goggles, head band, head mounted display, head worn display, heads up display, helmet, monocle, near eye display, pair of eyeglasses, prescription eyeglasses, see-through head-mounted display, smart glasses, sunglasses, virtual reality headgear, virtual reality headset, and visor. In an example, brainwave-controlled augmented reality eyewear can comprise an eyewear frame. This eyewear frame can hold electromagnetic and optic components on or near (e.g. within 4" of) a person's head.

In an example, an eyewear frame can comprise different pieces which are connected by hinges or other connecting mechanisms. In an example, an eyewear frame can comprise a frontpiece and two sidepieces. In an example, an eyewear frame can further include one or more back loops (which loop around the rear portion of the person's head). In an example, an eyewear frame can further include one or more top loops (which loop over the top portion of the person's head). In an example, an eyewear frame can further include a flexible forehead band (which spans across a person's forehead from side to side).

In an example, an eyewear frame can comprise a single continuous arcuate member. In an example, an eyewear frame can comprise a single continuous arcuate member which curves around the front of a person's face (over their eyes) from one ear to the other ear. In an example, an eyewear frame can comprise a single continuous arcuate band which laterally encircles a person's head like a halo or headband. In an example, an arcuate band can encircle a person's head in a substantially horizontal manner when a person's head is upright. In an example, an arcuate band which encircles a person's head can be undulating, wavy, and/or sinusoidal.

In an example, a frontpiece of an eyewear frame can overlap a portion of a person's forehead and thereby hold one or more electromagnetic energy sensors on the person's forehead. In an example, a frontpiece can have a central upward bulge or wave (above a person's nose) which extends upward onto a central portion of a person's forehead. This bulge or wave can hold an electromagnetic energy sensor on the central portion of the person's forehead. In an example, a frontpiece can have right and left side upward bulges or waves above a person's right and left eyes, respectively, wherein these right and left side bulges or waves extend onto the right and left sides, respectively, of the person's forehead. These right and left side bulges or waves can hold electromagnetic energy sensors on the right and left sides, respectively, of the person's forehead.

In an example, a frontpiece of the eyewear frame can include a central upward arm or protrusion (above a person's nose) which extends upward onto a central portion of a person's forehead. This arm or protrusion can hold an electromagnetic energy sensor on the central portion of the person's forehead. In an example, a frontpiece can include right and left side upward arms or protrusions above a person's right and left eyes, respectively, wherein these right and left side arms or protrusions extend onto the right and left sides, respectively, of the person's forehead. These right and left side arms or protrusions can hold electromagnetic energy sensors on the right and left sides, respectively, of the person's forehead. In an example, a frontpiece can include a nose bridge and/or nose pads. A nose bridge and/or nose pads can hold one or more electromagnetic energy sensors on the bridge of a person's nose.

In an example, a frontpiece of an eyewear frame for augmented reality eyewear can comprise right and left side receptacles for right and left side lenses, displays, and/or screens. In an example, augmented reality eyewear can further comprise right and left side eye cups. In an example, a right eye cup can isolate a person's right eye from light from any source other than a right side lens, display, screens, or projector. In an example, a left eye cup can isolate a person's left eye from light from any source other than a left side lens, display, screens, or projector. In an example, an eyewear frame can comprise a single curved receptacle to hold a single curved lens, display, or screen.

In an example, an eyewear frame of augmented reality eyewear can include two sidepieces. In an example, the front ends of these two sidepieces can connect to the right and left side ends, respectively, of a frontpiece. In an example, the back portion of a sidepiece can curve and/or hook around the back of person's ear. In an example, the back portion of a sidepiece can connect to a rear loop which loops around the rear portion of a person's head. In an example, a sidepiece and a rear loop can both be part of a continuous arcuate band which spans from the front of a person's head on one side, around the rear of the person's head, and then back to the front on the other side. In an example, an eyewear frame can curve around a person's face, from one ear to the other. In an example, a sidepiece and a rear loop can be portions of a continuous arcuate band which encircles a persons' head, holding electromagnetic and optical components in proximity to the person's head.

In an example, a sidepiece can further comprise an ear-attached member which attaches an electromagnetic energy sensor to a person's outer ear. In an example, a sidepiece can further comprise an ear-attached member which attaches an electromagnetic energy sensor to a person's earlobe. In an example, an ear-attached member can be embodied in an ear ring. In an example, an ear-attached member can be in wireless communication with a data transceiver. In an example, a sidepiece can further comprise an ear-inserted member which is (at least partially) inserted into a person's ear canal. In an example, an ear-inserted member can be embodied in an ear bud, ear plug, earphone, or hearing aid. In an example, an ear-inserted member can be in wireless communication with a data transceiver.

In an example, a sidepiece can further comprise a circular or oval portion which encircles a person's ear in a substantially-vertical plane. In an example, a sidepiece can further comprise an arcuate portion which encircles the outside of a person's ear in a substantially-vertical plane when the person's head is upright. In an example, such an arcuate ear-encircling portion can help to keep eyewear on a person's head during sports or other active body motion. In an example, such an arcuate ear-encircling portion can also help to keep one or more electromagnetic energy sensors in close contact with the side of a person's head near their person's ear.

In an example, the front portion of a sidepiece can be wider than the rear portion of a sidepiece. In an example, the front portion of a sidepiece can bifurcate (or divide) into two branches, an upper branch and a lower branch. In an example, the front portion of a sidepiece can bifurcate into two parts, an upper branch which is more flexible (or elastic) and a lower branch which is less flexible (or elastic). In an example, the front portion of a sidepiece can bifurcate into two parts, an upper branch which is less rigid and a lower branch which is more rigid. In an example, an upper branch can hold one or more electromagnetic energy sensors on a person's temple area and/or the side of their forehead. In an alternative example, the rear portion of a sidepiece can be wider than the front portion of a sidepiece.

In an example, a sidepiece can bifurcate (or divide) as it spans a portion of a person's head above the person's ear. In an example, augmented reality eyewear can comprise an upper sidepiece and a lower sidepiece on the same side of the head. In an example, augmented reality eyewear can comprise a first sidepiece which spans the side of a person's head at a first height and a second sidepiece which spans the same side of the person's head at a second height, wherein the second height is greater than the first height. In an example, augmented reality eyewear can comprise a first sidepiece which spans the side of a person's head at a first average height and a second sidepiece which spans the same side of the person's head at a second average height, wherein the second average height is at least 1" greater than the first average height. In an example, augmented reality eyewear can comprise a first sidepiece which spans the side of a person's head with a first maximum height and a second sidepiece which spans the same side of the person's head with a second maximum height, wherein the second maximum height is at least 1" greater than the first maximum height.

In an example, a sidepiece can be undulating, wavy, and/or sinusoidal. In an example, a sidepiece can comprise at least one upward bulge or wave which extends up along the side of a person's head above ear level. In an example, such an upward bulge or wave can hold one or more electromagnetic energy sensors on the side of a person's head. In an example, a sidepiece can comprise at least one upward arm or protrusion which extends up along the side of a person's head above ear level. In an example, such an upward arm or protrusion can hold one or more electromagnetic energy sensors on the side of a person's head. In an example, an upward arm or protrusion can be gently pushed or pulled toward a person's head by a spring, hinge, elastic band, lever, inflatable compartment, magnet, or electromagnetic actuator.

In an example, augmented reality eyewear can further comprise one or more top loops which go over the top portion (e.g. upper quartile) of a person's head. In an example, a top loop can be a generally-semicircular band over the top of a person's head, from one ear to the other ear. In an example, a top loop can go over the top of a person's head, connecting eyewear right and left sidepieces. In an example, a top loop can be a generally-semicircular band over the top of a person's head, from the person's forehead to the back of the head. In an example, a top loop can go over the top of a person's head, connecting an eyewear frontpiece and back loop. In an example, a top loop can bifurcate or divide as it spans the top of a person's head. In an example, a top loop can bifurcate into two branches (or bands) and then re-converge into a single branch (or band) as it spans the top of a person's head. In an example, augmented reality eyewear can have two top loops which go over the top of a person's head. In an example, one or more top loops can hold one or more electromagnetic energy sensors within 2" of a person's head to collect data concerning a person's brain activity.

In an example, augmented reality eyewear can further comprise teeth, combs, or other generally-parallel protrusions which are configured to be inserted between strands of hair. In an example, these teeth, combs, or other generally-parallel protrusions can enable greater electromagnetic communication between electromagnetic energy sensors and a person's brain on portions of a person's head which are covered by hair. In an example, these teeth, combs, or other generally-parallel protrusions can hold the eyewear more securely on a person's head during sports or active body motion. In an example, these teeth, combs, or other generally-parallel protrusions can help to hide (head-spanning) portions of the eyewear under hair on a person's head. In an example, a rear loop can have teeth, combs, or other generally-parallel protrusions which increase electromagnetic communication with a person's brain, better hold the rear loop onto the person's head, and/or help to hide the rear loop under the person's hair. In an example, a top loop can have teeth, combs, or other generally-parallel protrusions which increase electromagnetic communication with a person's brain, better hold the rear loop onto the person's head, and/or help to hide the rear loop under the person's hair.

In an example, an eyewear frame of augmented reality eyewear can encircle a person's head. In an example, an eyewear frame of augmented reality eyewear can encircle a person's head in a substantially lateral and/or horizontal manner. In an example, the eyewear frame of augmented reality eyewear can encircle a person's head above their ears. In an example, augmented reality eyewear can comprise a head-circling band. In an example, one or more portions of this band can be elastic and/or stretchable. In an example, augmented reality eyewear can comprise an elastic headband. In an example, an eyewear frame can be a generally-horizontal band which encircles a person's head, spanning a portion of their forehead and spanning the side of their head above their ears. In an example, a head-circling band can be undulating, wavy, and/or sinusoidal. In an example, an undulating head-circling band can have three upward waves and/or undulations. In an example, an undulating head-circling band can comprise three wave cycles. In an example, an undulating head-circling band can have four or more upward waves and/or undulations. In an example, an undulating head-circling band can comprise four or more wave cycles.

In an example, augmented reality eyewear can comprise a head-circling band which is substantially-horizontal when worn by a person whose head is upright. In an alternative example, a head-circling band can tilt downward by an angle in the range of 1 to 25 degrees toward the back of a person's head. In an example, a head-circling band can tilt upward by an angle in the range of 1 to 25 degrees toward the back of a person's head. In an example, the "best fit plane" for a head-circling band can be defined as the two-dimensional plane which minimizes the sum of squared distance deviations between the plan and the band. In an example, the "head horizontal plane" can be defined as a horizontal plane relative to a person's head when the person holds their head upright. In an example, the "best fit plane" for a head-circling band can form an anterior-facing angle in the range of 1 to 25 degrees as it intersects the "head horizontal plane." In an example, the "best fit plane" for a head-circling band can form a posterior-facing angle in the range of 1 to 25 degrees as it intersects the "head horizontal plane."

In an example, the front portion of a head-circling band can be wider than the back portion of the head-circling band. In an example, the front of a head-circling band can bifurcate (or divide) to form receptacles for one or more lenses, screens, or displays. In an example, the front portion of a head-circling band can bifurcate (or divide) into two branches or bands, wherein an upper branch or band spans a portion of a person's forehead. In an example, the side of a head-circling band can bifurcate or (divide) into two branches or bands, wherein the lower branch or band rests on a person's ear. In an example, the rear portion of a head circling band can be wider than the front portion of the head-circling band. In an example, the side of a head-circling band can bifurcate or divide into two branches or bands. In an example, a head-circling band can bifurcate or divide as it spans the side of a person's head. In an example, the side of a head-circling band can bifurcate, with only the lower branch of this bifurcation resting on the person's ear. In an example, a head-circling band can bifurcate as it spans the rear portion of a person's head.

In an example, augmented reality eyewear can comprise a band which laterally encircles a person's head, wherein this head-circling band further comprises an inner band (configured to be closer to the surface of the person's head) and an outer band (configured to be farther from the surface of the person's head). In an example, both the inner and outer bands can completely encircle a person's head. In an example, the inner band may only span a portion of the perimeter of a person's head. In an example, a head-circling band can further comprise an inner band which is configured to be a first average distance from a person's head and an outer band which is configured to be a second average distance from the person's head, wherein the second average distance is greater than the first average distance. In an example, inner and outer bands can be nested. In an example, inner and outer bands can be concentric. In an example, an inner band can be nested inside an outer band. In an example, an inner band can have a first elasticity level and an outer band can have a second elasticity level, wherein the second elasticity level is less than the first elasticity level. In an example, an inner band can hold one or more electromagnetic energy sensors on (or near) (or close proximity to) the surface of a person's head.

In an example, inner and outer bands of a head-encircling band can be connected to each other on the sides of a person's head, near (e.g. within 2" of) a person's ears. In an example, an outer band is configured to completely encircle a person's head, but an inner band is configured to only span a portion of the person's head. In an example, an outer band can completely encircle a person's head, but an inner band only spans the front of the person's head. In an example, an outer band completely encircles a person's head, but an inner band only spans the person's forehead. In an example, a relatively-rigid outer band completely encircles a person's head and a relatively-elastic inner band only spans the person's forehead. In an example, an outer band completely encircles a person's head, but an inner band only spans the back portion a person's head. In an example, a relatively-rigid outer band completely encircles a person's head and a relatively-elastic inner band only spans the back portion of the person's head.

In an example, augmented reality eyewear comprises: (a) an outer member which completely encircles a person's head; and (b) an inner member, wherein the inner member is closer to the surface of the person's head than the outer member, wherein the inner member is nested within the outer member, and wherein the inner member does not completely encircle the person's head. In an example, augmented reality eyewear comprises: (a) an outer band which completely encircles a person's head; and (b) an inner band, wherein the inner band is closer to the surface of the person's head than the outer band, wherein the inner band is nested within the outer band, and wherein the inner band does not completely encircle the person's head. In an example, augmented reality eyewear comprises: (a) an outer band which completely encircles a person's head; and (b) an inner band, wherein the inner band is closer to the surface of the person's head than the outer band, wherein the inner band is nested within the outer band, wherein the inner band does not completely encircle the person's head, and wherein the inner band is connected to the outer band at two or more locations.

In an example, augmented reality eyewear comprises: (a) an outer band which completely encircles a person's head; and (b) an inner band, wherein the inner band is closer to the surface of the person's head than the outer band, wherein the inner band is nested within the outer band, wherein the inner band does not completely encircle the person's head, wherein the inner band is connected to the outer band at two or more locations, and wherein the inner band spans less than half of the perimeter of the person's head. In an example, augmented reality eyewear comprises: (a) an outer band which completely encircles the perimeter of a person's head; and (b) an inner band, wherein the inner band is closer to the surface of the person's head than the outer band, wherein the inner band is nested within the outer band, wherein the inner band does not completely encircle the person's head, wherein the inner band is connected to the outer band at two or more locations, and wherein the inner band is configured to span between 20% and 50% of the perimeter of the person's head.

In an example, augmented reality eyewear comprises: (a) an outer band which spans a first percentage of the perimeter of a person's head; and (b) an inner band which spans a second percentage of the perimeter of a person's head, wherein the second percentage is less than the first percentage, wherein the inner band is configured to be closer to the surface of the person's head than the outer band, wherein the inner band is concentric within (and/or nested within) the outer band, and wherein the inner band is connected to the outer band in at least two locations.

In an example, augmented reality eyewear comprises: (a) an outer band, wherein the outer band is configured to be worn at a first average distance from a person's head, wherein the outer band spans a first percentage of the perimeter of the person's head, wherein the outer band has a first elasticity (or flexibility) level; and (b) an inner band, wherein the inner band is nested within (and/or concentric within) the outer band, wherein the inner band is configured to be worn at a second average distance from a person's head, wherein the inner band spans a second percentage of the perimeter of the person's head, wherein the inner band has a second elasticity (or flexibility) level, wherein the second average distance is less than the first average distance, wherein the second percentage is less than the first percentage, and wherein the second elasticity (or flexibility) level is greater than the first elasticity (or flexibility) level.

In an example, augmented reality eyewear can comprise: (a) at least one electromagnetic energy sensor which is configured to collect data concerning the electromagnetic activity of a person's brain; (b) at least one lens which is configured to transmit light from the environment in real time to the person's eye; (c) at least one display surface which shows an image of a virtual object; (d) an outer band, wherein the outer band is configured to be worn at a first average distance from a person's head, wherein the outer band spans a first percentage of the perimeter of the person's head, wherein the outer band has a first elasticity (or flexibility) level; (e) an inner band, wherein the inner band is nested within (and/or concentric within) the outer band, wherein the inner band is configured to be worn at a second average distance from a person's head, wherein the inner band spans a second percentage of the perimeter of the person's head, wherein the inner band has a second elasticity (or flexibility) level, wherein the second average distance is less than the first average distance, wherein the second percentage is less than the first percentage, and wherein the second elasticity (or flexibility) level is greater than the first elasticity (or flexibility) level; (f) a data processor which analyzes data from the at least one electromagnetic energy sensor, wherein the transmission of light from the environment and/or the image of the virtual object is automatically changed based on analysis of data from the at least one electromagnetic energy sensor; and (g) a power source.

In an example, augmented reality eyewear can comprise: (a) at least one electromagnetic energy sensor which is configured to collect data concerning the electromagnetic activity of a person's brain; (b) at least one lens which is configured to transmit light from the environment in real time to the person's eye; (c) at least one display surface which shows an image of a virtual object; (d) an outer band, wherein the outer band is configured to be worn at a first average distance from a person's head, wherein the outer band spans a first percentage of the perimeter of the person's head, wherein the outer band has a first elasticity (or flexibility) level; (e) an inner band, wherein the inner band is nested within (and/or concentric within) the outer band, wherein the inner band is configured to be worn at a second average distance from a person's head, wherein the inner band spans a second percentage of the perimeter of the person's head, wherein the inner band has a second elasticity (or flexibility) level, wherein the second average distance is less than the first average distance, wherein the second percentage is less than the first percentage, wherein the second elasticity (or flexibility) level is greater than the first elasticity (or flexibility) level, and wherein the inner band is configured to hold the at least one electromagnetic energy sensor on (or near) (or close proximity to) the person's head; (f) a data processor which analyzes data from the at least one electromagnetic energy sensor, wherein the transmission of light from the environment and/or the image of the virtual object is automatically changed based on analysis of data from the at least one electromagnetic energy sensor; and (g) a power source.

In an example, augmented reality eyewear can comprise: (a) at least one electromagnetic energy sensor which is configured to collect data concerning the electromagnetic activity of a person's brain; (b) at least one lens which is configured to transmit light from the environment in real time to the person's eye; (c) at least one display surface which shows an image of a virtual object; (d) an outer band, wherein the outer band is configured to be worn at a first average distance from a person's head, wherein the outer band spans a first percentage of the perimeter of the person's head, wherein the outer band has a first elasticity (or flexibility) level, and wherein the outer band holds the at least one lens and the at least one display surface on (or near) the person's head; (e) an inner band, wherein the inner band is nested within (and/or concentric within) the outer band, wherein the inner band is configured to be worn at a second average distance from a person's head, wherein the inner band spans a second percentage of the perimeter of the person's head, wherein the inner band has a second elasticity (or flexibility) level, wherein the second average distance is less than the first average distance, wherein the second percentage is less than the first percentage, wherein the second elasticity (or flexibility) level is greater than the first elasticity (or flexibility) level, and wherein the inner band is configured to hold the at least one electromagnetic energy sensor on (or near) the person's head; (f) a data processor which analyzes data from the at least one electromagnetic energy sensor, wherein the transmission of light from the environment and/or the image of the virtual object is automatically changed based on analysis of data from the at least one electromagnetic energy sensor; and (g) a power source.

In an example, augmented reality eyewear can comprise: (a) at least one electromagnetic energy sensor which is configured to collect data concerning the electromagnetic activity of a person's brain; (b) at least one lens which is configured to transmit light from the environment in real time to the person's eye; (c) at least one display surface which shows an image of a virtual object; (d) an outer band, wherein the outer band is configured to be worn at a first average distance from a person's head, wherein the outer band encircles the person's head, wherein the outer band has a first elasticity (or flexibility) level, and wherein the outer band holds the at least one lens and the at least one display surface on (or near) the person's head; (e) an inner band, wherein the inner band is nested within (and/or concentric within) the outer band, wherein the inner band is configured to be worn at a second average distance from a person's head, wherein the inner band encircles less than half the person's head, wherein the inner band has a second elasticity (or flexibility) level, wherein the second average distance is less than the first average distance, wherein the second elasticity (or flexibility) level is greater than the first elasticity (or flexibility) level, and wherein the inner band is configured to hold the at least one electromagnetic energy sensor within 2" of the person's head; (f) a data processor which analyzes data from the at least one electromagnetic energy sensor, wherein the transmission of light from the environment and/or the image of the virtual object is automatically changed based on analysis of data from the at least one electromagnetic energy sensor; and (g) a power source.

In an example, augmented reality eyewear can comprise: (a) at least one electromagnetic energy sensor which is configured to collect data concerning the electromagnetic activity of a person's brain; (b) at least one lens which is configured to transmit light from the environment in real time to the person's eye; (c) at least one display surface which shows an image of a virtual object; (d) an outer band, wherein the outer band is configured to be worn a first average distance from a person's head, wherein the outer band encircles a first percentage of the person's head, wherein the outer band has a first elasticity (or flexibility) level, and wherein the outer band holds the at least one lens and the at least one display surface on (or near) the person's head; (e) an inner band, wherein the inner band is connected to the outer band at two or more locations, wherein the inner band is configured to be worn at second average distance from a person's head, wherein the inner band encircle a second percentage of the person's head, wherein the inner band has a second elasticity (or flexibility) level, wherein the second average distance is less than the first average distance, wherein the second elasticity (or flexibility) level is greater than the first elasticity (or flexibility) level, wherein the second percentage is less than the first percentage, and wherein the inner band is configured to hold at least one electromagnetic energy sensor within 2" of the person's head; (f) a data processor which analyzes data from the at least one electromagnetic energy sensor, wherein the transmission of light from the environment and/or the image of the virtual object is automatically changed based on analysis of data from the at least one electromagnetic energy sensor; and (g) a power source.

In an example, a mobile wearable brain activity monitor can comprise: (a) at least one electromagnetic energy sensor which is configured to collect data concerning the electromagnetic activity of a person's brain; (b) an outer band, wherein the outer band is configured to be worn a first average distance from a person's head, wherein the outer band encircles a first percentage of the person's head, and wherein the outer band has a first elasticity (or flexibility) level; (c) an inner band, wherein the inner band is connected to the outer band at two or more locations, wherein the inner band is configured to be worn at second average distance from a person's head, wherein the inner band encircle a second percentage of the person's head, wherein the inner band has a second elasticity (or flexibility) level, wherein the second average distance is less than the first average distance, wherein the second elasticity (or flexibility) level is greater than the first elasticity (or flexibility) level, wherein the second percentage is less than the first percentage, and wherein the inner band is configured to hold at least one electromagnetic energy sensor within 2" of the person's head; (d) a data processor which analyzes data from the at least one electromagnetic energy sensor; and (e) a power source.

In an example, brainwave-controlled augmented reality eyewear can include a reflective surface. In an example, a reflective surface can reflect light from environmental objects into a person's eye. In an example, a reflective surface can reflect a projected image of a virtual object into a person's eye. In an example, a reflective surface can span a portion (e.g. 10%-25%) of the eye-facing surface area of a lens. In an example, a reflective surface can span a portion (e.g. 25%-50%) of the eye-facing surface area of a lens. In an example, a reflective surface can span the entire eye-facing surface of a lens. In an example, a reflective surface can be curved and/or arcuate. In an example, a reflective surface can be convex. In an example, a reflective surface can be parabolic. In an example, brainwave-controlled augmented reality eyewear can include two or more nested reflective surfaces. In an example, a reflective surface can be retro-reflective.

In an example, a reflective surface in augmented reality eyewear can be an aspherical mirror. In an example, a reflective surface in augmented reality eyewear can be a MicroElectroMechanical systems (MEMS) controlled mirror array. In an example, a reflective surface in augmented reality eyewear can be a parabolic mirror. In an example, a reflective surface can be a semi-reflective mirror. In an example, a reflective surface can be a dichroic mirror. In an example, a reflective surface in augmented reality eyewear can reflect a beam from an image projector into a person's eye. In an example, a reflective surface can comprise an array of micro-mirrors. In an example, a reflective surface can be an array of moving micro-mirrors. In an example, micro-mirrors can be tilted or rotated. In an example, micro-mirrors can be moved by MEMS components. In an example, a reflective surface can comprise a moving array of flat mirrors. In an example, a reflective surface can comprise an array of reflective polygons. In an example, a reflective surface can comprise an array of curved mirrors. In an example, a reflective surface can comprise a surface with glass beads. In an example, a reflective surface can comprise birefringent material.

In an example, brainwave-controlled augmented reality eyewear can include one or more cameras. In an example, one or more cameras can be part or (or attached to) an eyewear frame. In an example, a camera can be a wide-angle camera. In an example, a camera can be automatically moved. In an example, the focal direction of an eyewear-mounted camera can be automatically changed by an electromagnetic actuator. In an example, the focal direction of an eyewear-mounted camera can be automatically changed in response to detected changes in a person's brainwaves. In an example, a person can change the focal direction of an eyewear-mounted camera by changing their brainwave patterns. In an example, augmented reality eyewear can include two cameras to enable three-dimensional imaging and environmental image analysis.

In an example, augmented reality eyewear can include one or more components selected from the group consisting of: data processor, computer storage devices, data control unit, computer chip, and data memory. In an example, augmented reality eyewear can include one or more components selected from the group consisting of: wireless data transmitter, wireless data receiver, and wireless data transceiver. In an example, augmented reality eyewear can be in wireless communication in with one or more separate and/or remote devices selected from the group consisting of: cell phone, mobile phone, electronic tablet, electronic pad, laptop computer, desktop computer, smart watch, smart wrist band, smart clothing, home environment control system, building security system, robot, smart appliance, cloud access port, and mainframe.

In an example, augmented reality eyewear can include a local power source. In an example, augmented reality eyewear can include a battery. In an example, such eyewear can harvest and/or transduce power from kinetic or mechanical energy due to body motion. In an example, such eyewear can harvest and/or transduce power from a person's body thermal energy. In an example, such eyewear can have thermoelectric elements which harvest and/or transduce power from a person's body thermal energy. In an example, such eyewear can use liquid metal (such as a mixture of gallium and indium) to harvest and/or transduce power from a person's body thermal energy. In an example, such eyewear can harvest and/or transduce power from solar energy, indoor lighting energy, ambient or localized radiofrequency energy, or ambient thermal energy.

In an example, augmented reality eyewear can further comprise include one or more sensors selected from the group consisting of: inertial motion sensor, accelerometer, gyroscope, GPS module, inclinometer, magnetometer, impedance sensor, permittivity sensor, resistance sensor, microphone, sound sensor, thermal energy sensor, ambient light sensor, air pressure sensor, and humidity sensor.

In an example, brainwave-controlled augmented reality eyewear can further comprise an eye tracker (such as an optical sensor) which tracks the position and/or focal direction of a person's eye. In an example, eye tracking can enable control of a virtual object based on movement of a person's eye. In an example, eye tracking can enable better recognition of associations between environmental object which a person sees and associated brainwave patterns. In an example, eyewear can further comprise a frame-mounted camera which tracks the movement and focal direction of a person's eye.

In an example, if eye tracking determines that a person is looking directly at an environmental object and the sight of this object triggers a positive brain state (as indicated by measured brainwave patterns), then this association can be used for therapeutic and/or functional purposes by an eyewear system. In another example, if eye tracking determines that a person is looking directly at an environmental object and the sight of this object triggers a negative brain state (as indicated by measured brainwave patterns), then this association can be used in an opposite manner for therapeutic and/or functional purposes by an eyewear system.

In an example, augmented reality eyewear can further comprise a haptic computer-to-human interface. In an example, such eyewear can include a vibrating member, buzzer, roller, or electrical pulse generator which sends vibrations or electrical pulses to a person's body. In an example, such eyewear can further comprise an auditory computer-to-human interface. In an example, such eyewear can include an ear phone, headset, and/or speaker. In an example, such eyewear can communicate with the wearer by generating voice messages, tones, alarms, songs, or other auditory stimuli.

In an example, augmented reality eyewear can be controlled based on the wearer's electromagnetic brain activity.

In an example, this a method to control augmented reality eyewear based on electromagnetic brain activity can comprise: (a) collecting data concerning electromagnetic activity of a person's brain from an electromagnetic energy sensor which is part of (or attached to) eyewear; (b) analyzing this data to identify a selected pattern of electromagnetic brain activity; and (c) modifying the transmission of light from environmental objects through the eyewear to the person's eyes and/or the display of virtual objects in the person's field of vision in response to identification of the selected pattern of electromagnetic brain activity.

In an example, analysis of data from electromagnetic energy sensors can include analyzing brainwaves decomposed and/or segmented into a subset or combination of five clinical frequency bands: Alpha, Beta, Delta, Gamma, and Theta. In an example, analysis of data from an electromagnetic energy sensors can include measuring and analyzing: Alpha brainwaves within frequency band of 7 to 14 Hz; Beta brainwaves within frequency band of 12 to 30 Hz; Delta brainwaves within frequency band of 1 to 4 Hz; Gamma brainwaves within a frequency band of 30 to 100 Hz; and/or Theta brainwaves within a frequency band of 4 to 8 Hz.

In an example, changes in brainwave shape, power, or frequency within a single frequency band can be analyzed. In an example, changes in brainwave shape, power, or frequency across multiple frequency bands can be analyzed. In an example, changes in brainwave shape, power, or frequency in a first frequency band can be analyzed relative to changes in brainwave shape, power, or frequency in a second frequency band. In an example, the covariation of brainwaves across multiple frequency bands can be analyzed. In an example, inter-band means or ratios can be analyzed.

In an example, analysis of data from one or more electromagnetic energy sensors can include one or more of the following steps: analyzing an inter-band power ratio; analyzing brainwaves by frequency band; analyzing brainwaves to identify a one-time pattern and/or evoked response signal; analyzing changes in intra-band frequency shifts; analyzing changes in signal amplitude or power level; analyzing changes in the sum of power levels over multiple frequency bands; analyzing decreases or increases in the relative power of brainwaves in a given frequency band; analyzing electromagnetic brain activity using discrete Fourier transformation; analyzing electromagnetic brain activity using fast Fourier transformation; analyzing non-repeating waveforms; analyzing power spectral density; analyzing relative power levels in different frequency bands; analyzing repeating waveforms; analyzing signals from a montage of multiple electromagnetic energy sensors; analyzing the frequency of rhythmic brain activity from one or more brain regions or channels which repeats over time; analyzing the mean power level of an electrical signal from a selected brain region or channel; analyzing the median power level of an electrical signal from a selected brain region or channel; analyzing the minimum or maximum power level from a selected brain region or channel; analyzing the waveform of rhythmic brain activity from one or more brain regions or channels which repeats over time; and analyzing the frequency of brainwave repetition analyzing wave phases.

In an example, analysis of data from one or more electromagnetic energy sensors can include one or more of the following steps: calculating a ratio of power levels in different frequency bands; calculating an inter-montage mean; calculating an inter-montage ratio; calculating an inter-region or inter-channel mean; calculating an inter-region or inter-channel ratio; calculating the covariance of signals across multiple brain regions or channels; calculating the mean value of data from one or more brain regions or channels during a period of time; calculating the ratio of the signal strength from a first brain region or channel to the signal strength from a second brain region or channel; calculating the wave amplitude of signals from a specific brain region or channel; conducting power spectrum analysis; conducting wavelet analysis; decomposing complex electromagnetic signals into sinusoidal components; and identifying one-time waveforms and/or evoked response potentials.

In an example, analysis of electromagnetic brain activity can be done using one or more statistical methods selected from the group consisting of: analysis of variance; artificial neural network; auto-regression; basic Markov model; Bayesian methods; Bayesian network; Bonferroni analysis; carlavian curve analysis; centroid analysis; chi-squared analysis; cluster analysis; correlation; covariance; decision tree analysis; entropy analysis; factor analysis; feature vector analysis; fuzzy logic model; Gaussian model; hidden Markov model; input-output hidden Markov model; Kalman filter; kernel estimation; linear discriminant analysis; linear transform; logit model; machine learning; multivariate least squares estimation; multivariate linear regression; multivariate logit; multivariate parametric classifier; naïve Bayes classifier; non-linear programming; pattern recognition; principal components analysis; probit model; random forest analysis; support vector machine; time-series model; trained Bayes classifier; T-test; and Z-scores.

In an example, a method to control smart eyewear based on electromagnetic brain activity can comprise: (a) collecting data concerning electromagnetic activity of a person's brain from one or more electromagnetic energy sensors which are part of eyewear; (b) analyzing this data to identify selected patterns of electromagnetic brain activity; and (c) modifying the transmission of light from environmental objects through the eyewear to the person's eyes and/or the display of virtual objects in the person's field of vision in response to identification of selected patterns of electromagnetic brain activity. In an example, a method to control smart eyewear based on electromagnetic brain activity can comprise: (a) collecting data concerning electromagnetic activity of a person's brain from one or more electromagnetic energy sensors which are part of eyewear; (b) analyzing this data to identify selected patterns of electromagnetic brain activity; and (c) modifying the transmission of light from environmental objects through an eyewear lens and/or the display of virtual objects in the person's field of vision in response to identification of selected patterns of electromagnetic brain activity.

In an example, a method to control smart eyewear based on electromagnetic brain activity can comprise: (a) collecting data concerning electromagnetic activity of a person's brain from one or more electromagnetic energy sensors which are part of eyewear; (b) analyzing this data to identify a selected pattern of electromagnetic brain activity; and (c) increasing or decreasing the amount of light transmitted through a lens based on identification of the selected pattern of electromagnetic brain activity. In an example, a method to control smart eyewear based on electromagnetic brain activity can comprise: (a) collecting data concerning electromagnetic activity of a person's brain from one or more electromagnetic energy sensors which are part of eyewear; (b) analyzing this data to identify a first pattern of electromagnetic brain activity and a second pattern of electromagnetic brain activity; and (c) transmitting a first amount of light through a lens when the first pattern occurs and transmitting a second amount of light through a lens when the second pattern occurs, wherein the second amount is less than the first amount.

In an example, a method to control smart eyewear based on electromagnetic brain activity can comprise: (a) collecting data concerning electromagnetic activity of a person's brain from one or more electromagnetic energy sensors which are part of eyewear; (b) analyzing this data to identify a first pattern of electromagnetic brain activity and a second pattern of electromagnetic brain activity; and (c) changing the transparency of an eyewear lens in order to transmit a first amount of environmental light through the lens when the first pattern occurs and transmit a second amount of environmental light through a lens when the second pattern occurs, wherein the second amount is different than the first amount.

In an example, smart eyewear can change the transmission of environmental light through one or more lenses based on changes in electromagnetic activity of a person's brain indentified by analysis of data from eyewear-mounted electromagnetic energy sensors. In an example, smart eyewear can change the transmission of environmental light through one or more lenses based on changes in a person's brainwaves. In an example, the optical transmission attributes of a smart eyewear lens can be changed in response to changes in electromagnetic activity of a person's brain. In an example, the amount of environmental light transmitted through one or more light-transmitting optical members in smart eyewear can be changed in response to changes in electromagnetic activity of a person's brain.

In an example, the brightness of environmental light transmitted through smart eyewear can be changed in response to changes in electromagnetic activity of a person's brain. In an example, smart eyewear can have an electro-tinting layer which increases or decreases the amount of environmental light transmitted through the eyewear based on changes in a person's brainwaves. In an example, smart eyewear can increase or decrease the amount of environmental light transmitted through the eyewear based on changes in the power of a person's brainwaves in a selected frequency band. In an example, smart eyewear can increase or decrease the amount of environmental light transmitted through the eyewear based on changes in the ratio of power of a person's brainwaves in first and second frequency bands.

In an example, smart eyewear can decrease the amount of environmental light transmitted through the eyewear when electromagnetic activity of a person's brain indicates that the person is stressed. In an example, smart eyewear can decrease the amount of environmental light transmitted through the eyewear when electromagnetic activity of a person's brain indicates or predicts a migraine headache. In an example, smart sunglasses can decrease the amount of environmental light transmitted through the sunglasses when electromagnetic activity of a person's brain indicates a neural response to glare or neuromuscular signals of squinting. In an example, smart eyewear can have variable transparency lenses whose transparency level is modified based on analysis of electromagnetic activity of a person's brain.

In an example, a method to control smart eyewear based on electromagnetic brain activity can comprise: (a) collecting data concerning electromagnetic activity of a person's brain from one or more electromagnetic energy sensors which are part of eyewear; (b) analyzing this data to identify patterns of electromagnetic brain activity; and (c) changing, modifying, adjusting, and/or shifting the spectrum of environmental light transmitted through one or more lenses of the smart eyewear based on identification of one or more selected patterns of electromagnetic brain activity. In an example, smart eyewear can automatically change the color of environmental objects as seen by a person wearing the eyewear based on changes in electromagnetic activity of the person's brain.

In an example, smart eyewear can automatically change the perceived color of environmental objects by changing, modifying, adjusting, and/or shifting the spectrum of environmental light transmitted through one or more lenses of the smart eyewear. In an example, smart eyewear can automatically change the perceived color of environmental objects in response to emotional changes in the person wearing the glasses which are identified by analysis of data from electromagnetic energy sensors. In an example, smart eyewear can automatically change the spectrum of environmental light transmitted through a lens to reflect and/or modify a person's mood, emotional state, and/or arousal level. In an example, smart eyewear can enable a person to literally see the world through rosy-tinted glasses when the person figuratively sees the world through rosy-tinted glasses.

In an example, smart eyewear can automatically change the spectrum, color, or tint of environmental objects seen by a person in response to changes in electromagnetic activity of the person's brain. In an example, smart eyewear can automatically change the spectrum, color, or tint of environmental objects seen by a person in response to changes in the person's brainwaves in the Delta, Theta, Alpha, Beta, and/or Gamma frequency bands. In an example, the lens of smart eyewear can automatically filter, absorb, shift, and/or block light in one or more portions of the light spectrum in response to changes in electromagnetic activity of a person's brain.

In an example, smart eyewear can modify the transmission of environmental light in a selected spectral range that would not be visible to the unaided human eye so that it the person wearing the smart eyewear can see it. In an example, smart eyewear can make light in a normally invisible portion of the light spectrum visible to a person wearing the smart eyewear in response to changes in electromagnetic activity of the person's brain. In an example, smart eyewear can make infrared or ultraviolet light visible to a person wearing the smart eyewear in response to changes in electromagnetic activity of the person's brain. In an example, smart eyewear can shift the spectrum of environmental light transmitted through a lens in order to make infrared or ultraviolet light visible to a person wearing the smart eyewear. This shift can be triggered by a change in electromagnetic activity of the person's brain.

In an example, smart eyewear can change the color of food seen through a lens in order to make the food more or less appealing to the person wearing the eyewear. In an example, smart eyewear can change the color of food seen through a lens based on identified patterns in electromagnetic activity of the person's brain. In an example, smart eyewear can change the color of food that a person sees in order to discourage the person from eating unhealthy food and/or encourage the person to eat healthy food. In an example, smart eyewear can change the appearance of food to discourage a person from eating more based on analysis of electromagnetic activity of the person's brain.

In an example, a method to control smart eyewear based on electromagnetic brain activity can comprise: (a) collecting data concerning electromagnetic activity of a person's brain from one or more electromagnetic energy sensors which are part of (or attached to) smart eyewear; (b) analyzing this data to identify patterns of electromagnetic brain activity; and (c) changing the focal direction and/or refraction angle of environmental light transmitted through one or more lenses of the smart eyewear based on identification of one or more selected patterns of electromagnetic brain activity.

In an example, such smart eyewear can enable a person to see their environment from different perspectives and/or in different directions by changing their electromagnetic brain activity. In an example, such eyewear can enable a person to change the focal direction of their field of vision by changing their brainwaves (e.g. by shifting the relative power levels between different frequency bands or by concentrating in a particular manner). In an example, now a teacher or parent really could almost literally have "eyes in the back of their head."

In an example, the focal direction of the eyewear lens can be changed by using an electronically-movable lens. In an example, movement of a lens can change the focal direction of a person's field of vision. In an example, the focal direction of a lens can change with respect to polar (or compass or clock) coordinate—around the circumference of a person's head. In an example, the polar (or compass or clock) coordinate of a person's focal direction can be changed when the person shifts the frequency of brain activity in a selected frequency band (or relative power between selected frequency bands). In an example, a person can be trained to rotate the focal direction of their field of vision through eyewear by changing their pattern of electromagnetic brain activity in a selected manner. These changing patterns can be identified in the data which is collected by electromagnetic energy sensors on the eyewear. In an example, this can enable a person to do a (360-degree) environmental scan triggered by changes in their brain activity.

In an example, eyewear can enable a person to see their environment from different environmental perspectives simultaneously. In an example, a person can see what is in front of them and also see what is behind them. In an example, a person can change the relative balance or mix of these different perspectives by changing their brainwave patterns. Such functionality can have many useful applications in situations where other forms of human-to-computer interface would be cumbersome, dangerous, intrusive, or impossible. Such situations might include a surgical operation where it is important to keep one's hands sterile or a military operation in which silence and lack of motion are important.

In an example, a method to control smart eyewear based on electromagnetic brain activity can comprise: (a) collecting data concerning electromagnetic activity of a person's brain from one or more electromagnetic energy sensors which are part of (or attached to) smart eyewear; (b) analyzing this data to identify patterns of electromagnetic brain activity; and (c) changing the focal direction of a camera which is part of (or attached to) the smart eyewear based on identification of one or more selected patterns of electromagnetic brain activity.

In an example, brainwave-controlled smart eyewear can comprise: (a) an eyewear frame which is configured to be worn by a person; (b) a plurality of electromagnetic energy sensors which are part of (or attached to) the eyewear frame, wherein these sensors are configured to collect data concerning electromagnetic activity of the person's brain; and (c) a camera which is part of (or attached to) the eyewear frame, wherein the focal direction of the camera is changed base on changes in electromagnetic activity of the person's brain.

In an example, brainwave-controlled smart eyewear can comprise: (a) an eyewear frame which is configured to be worn by a person; (b) a plurality of electromagnetic energy sensors which are part of (or attached to) the eyewear frame, wherein these sensors are configured to collect data concerning electromagnetic activity of the person's brain; and (c) a camera which is part of (or attached to) the eyewear frame, wherein the camera has a first focal direction when a first pattern of electromagnetic brain activity occurs and a second focal direction when a second pattern of electromagnetic brain activity occurs.

In an example, smart eyewear can comprise a camera whose focal direction is changed in response to changes in a person's brainwaves. In an example, the focal direction of a camera can be rotated around a person's head (in a 360-degree manner) based on frequency shifts or other selected patterns in the electromagnetic activity of the person's brain. In an example, the focal direction of a head-mounted camera can be changed by moving a mirror or other reflective surface. In an example, the focal direction of a head-mounted camera can be changed using an electromagnetic actuator.

In an example, smart eyewear can comprise multiple cameras with multiple focal directions. In an example, brainwave-controlled smart eyewear can comprise: (a) an eyewear frame which is configured to be worn by a person; (b) a plurality of electromagnetic energy sensors which are part of (or attached to) the eyewear frame, wherein these sensors are configured to collect data concerning electromagnetic activity of the person's brain; and (c) a first camera which is part of (or attached to) the eyewear frame, wherein the first camera has a first focal direction; (d) a second camera which is part of (or attached to) the eyewear frame, wherein the second camera has a second focal direction, when the eyewear displays images from the first camera when a first pattern of electromagnetic brain activity occurs and displays images from the second camera when a second pattern of electromagnetic brain activity occurs.

In an example, smart eyewear can comprise a camera whose operation is controlled by brainwave patterns. In an example, one or more of a camera's operational functions can be changed in response to changes in the electromagnetic activity of a person's brain wherein these operational functions are selected from the group consisting of: turning camera on or off; change in duration of image retention in memory; change in focal direction; change in focal distance; change in focal location; change in image brightness or dimness; change in image magnification; change in image width (e.g. wide angle); change in light spectrum enhancement; change in light spectrum filtering; and change in wireless transmission of camera images to a remote device. In an example, this can serve as a personal security feature in a manner similar to a "black box" in aircraft. In an example, when a pattern of intense stress is detected in a person's brainwaves, then the camera can automatically respond by turning on, wider imaging, longer image retention, and/or automatic transmission of images to a remote device for security purposes.

In an example, augmented reality eyewear can comprise: a lens which is configured to transmit light from the environment to a person's eye; a light projector (or display) which projects (or displays) images of virtual objects; a first holographic optical element; and a second holographic optical element, wherein the light projector (or display) is configured to project (or display) the images of virtual objects toward the first holographic optical element, wherein the images of virtual objects are guided from the first holographic element to the second holographic optical element, and wherein the second holographic optical element is configured to direct the images of virtual objects toward the person's eye. In an example, augmented reality eyewear can comprise two lenses which are configured to transmit light from the environment to a person's eyes. In an example, augmented reality eyewear can comprise two light projectors (or displays).

In an example, augmented reality eyewear can comprise: a plurality of electromagnetic energy sensors which are configured to collect data concerning the electromagnetic activity of a person's brain; a lens which is configured to transmit light from the environment to the person's eye; a light projector (or display) which projects (or displays) images of virtual objects; a first holographic optical element; a second holographic optical element, wherein the light projector (or display) is configured to project (or display) the images of virtual objects toward the first holographic optical element, wherein the images of virtual objects are guided from the first holographic element to the second holographic optical element, and wherein the second holographic optical element is configured to direct the images of virtual objects toward the person's eye, and a data processor which analyzes data from the electromagnetic energy sensors, wherein the transmission of light from the environment to the person's eye and/or the display of the images of virtual objects are changed based on analysis of data from the electromagnetic energy sensors. In an example, augmented reality eyewear can comprise two lenses which are configured to transmit light from the environment to a person's eyes. In an example, augmented reality eyewear can comprise two light projectors (or displays).

In an example, a holographic optical element can have a first configuration in which it is transparent and a second configuration in which it is not transparent. In an example, a holographic optical element can have a first configuration in which it transmits light from the environment and a second configuration in which it (also) transmits images of virtual objects. In an example, a holographic optical element can have a first configuration with a first transparency level and a second configuration with a second transparency level, wherein the second level is less than the first level. In an example, augmented reality eyewear can further comprise a wave guide between first and second holographic optical elements. In an example, a lens can serve as a wave guide between first and second holographic optical elements. In an example, first and second holographic optical elements can be integrated into and/or components of a lens.

In an example, first and second holographic optical elements can be co-planar. In an example, first and second holographic optical elements can be parallel to each other. In an example, the cross-sectional planes of first and second holographic optical elements can form an acute angle as their virtual extensions intersect in three-dimensional space. In an example, first and second holographic optical elements can have a first configuration in which virtual extensions of their cross-sectional planes intersect at a first angle and a second configuration in which virtual extensions of their cross-sectional planes intersect at a second angle. In an example, first and second holographic elements can be changed from a first configuration to a second configuration based on analysis of data from electromagnetic energy sensors. In an example, first and second holographic elements can be changed from a first configuration to a second configuration based on changes in a person's brainwaves.

In an example, an array of holographic optical elements can be configured in an arcuate manner. In an example, an array of holographic optical elements can be configured along an arcuate surface. In an example, eyewear can comprise a circular or elliptical array of holographic optical elements. In an example, an array of holographic optical elements can have converging focal directions. In an example, the focal directions of holographic optical elements can converge at a single point. In an example, reflected or refracted focal directions of holographic optical elements can converge at a single point. In an example, brainwave-controlled augmented eyewear can comprise a three-dimensional array of holographic optical elements whose collective shape is changed by changes in a person's brainwaves. In an example, eyewear can comprise a three-dimensional array of holographic optical elements whose focal directions are changed by changes in a person's brainwaves.

In an example, a method to control smart eyewear based on electromagnetic brain activity can comprise: (a) collecting data concerning electromagnetic activity of a person's brain from one or more electromagnetic energy sensors which are part of (or attached to) smart eyewear; (b) analyzing this data to identify patterns of electromagnetic activity emitted from the person's head; and (c) changing the focal distance and/or magnification of environmental objects through one or more lenses based on identification of one or more selected patterns of electromagnetic activity. In an example, electromagnetic activity measured by this device can be emitted from a person's brain. In an example, electromagnetic activity measured by this device can be emitted from a person's eye muscles (or the nerves which innervate those muscles).

In an example, a method to control smart eyewear based on electromagnetic brain activity can comprise: (a) smart eyewear with one or more movable lenses, wherein the lenses have a first configuration with a first focal distance and second configuration with a second focal distance; and (b) one or more electromagnetic energy sensors which are part of (or attached to) the smart eyewear, wherein these sensor are configured to collect data concerning electromagnetic energy emitted from the person's head, wherein the lenses have the first configuration in response to identification of a first pattern of electromagnetic energy based on data from the sensors have the second configuration in response to identification of a second pattern of electromagnetic energy based on data from the sensors. In an example, electromagnetic activity measured by this device can be emitted from a person's brain. In an example, electromagnetic activity measured by this device can be emitted from a person's eye muscles (or the nerves which innervate those muscles).

In an example, the focal distance and/or magnification of environmental objects through the lens of smart eyewear can be changed in response to changes in a person's brainwaves. In an example, such eyewear can function as mentally-controlled bifocals or trifocals. In an example, the focal distance of a pair of eyeglasses can be automatically increased or decreased in response to changes in brain activity. In an example, electromagnetic energy sensors which are part of (or attached to) eyewear can serve as EOG (Electrooculography) sensors. In an example, the focal distance of a pair of eyeglasses can be automatically increased or decreased in response to changes in eye muscle activity.

In an example, smart eyewear can automatically "zoom in" on an object of particular interest to a person based on measured changes in the person's brainwaves. In an example, smart eyewear can combine information from eye (focal direction) tracking and information from analysis of brainwaves to automatically "zoom in" on an environmental object in which a person is particularly interested. In an example, smart eyewear can automatically expand the width of a person's field of vision in response to changes in the person's brainwaves. In an example, smart eyewear can automatically enhance a person's peripheral vision in response to changes in the person's brainwaves.

In an example, a method to control smart eyewear based on electromagnetic brain activity can comprise: (a) collecting data concerning electromagnetic activity of a person's brain from one or more electromagnetic energy sensors which are part of (or attached to) smart eyewear; (b) analyzing this data to identify patterns of electromagnetic activity emitted from the person's head; and (c) selectively blocking and/or reducing the transmission of environmental light through one or more lenses based on identification of one or more selected patterns of electromagnetic activity.

In an example, brainwave-controlled smart eyewear can comprise: (a) an eyewear frame; (b) one or more lenses which are attached to (or part of) the eyewear frame, wherein these lenses have a first configuration in which they transmit a first level of environmental light to a person's eye(s) and a second configuration in which they transmit a second level of environmental light to the person's eye(s); (c) one or more electromagnetic energy sensors which are attached to (or part of) the eyewear frame, wherein these sensors collect data concerning electromagnetic activity of the person's brain, and wherein the lenses have the first configuration in response to a first pattern of electromagnetic activity of the person's brain and the second configuration in a second pattern of electromagnetic activity of the person's brain.

In an example, smart eyewear can selectively block or reduce the transmission of light from environmental objects in response to selected patterns of electromagnetic energy from a person's brain. In an example, smart eyewear can dim the transmission of environmental images when a person is stressed out. In an example, smart eyewear can dim images of particularly-stressful objects in a person's environment. In an example, smart eyewear can combine information from gaze-tracking sensors and EEG sensors to selectively block or dim images of objects in a person's environment which trigger very negative responses in the person's brain.

In an example, suppose that you are giving a speech to a large audience. In general, it is being well received, but one annoying person in the audience is doing facial expressions or other antics which cause you stress and it is hard not to look at them. This is very distracting to you. Not to worry! Your smart eyewear detects the stress in your brainwave patterns and identifies the source of this stress by correlating the direction of your gaze with those negative brainwave patterns. In response, your smart eyewear selectively blocks or dims your view of this annoying person. Voila! Problem solved. If your smart eyewear also has augmented reality capability, then there are even more interesting possibilities. Your brainwave-controlled augmented reality eyewear could virtually modify your view of the annoying person, virtually adding or subtracting image elements. Use your imagination! [It is hard not to smile at someone sporting virtual giant chicken wings or wearing a virtual bright-purple egg on their head or . . . ]. The person who was a stressful stimulus is now something funny that helps you to smile and continue your speech in an energized manner.

In an example, a method to control smart eyewear based on electromagnetic brain activity can comprise: (a) collecting data concerning electromagnetic activity of a person's brain from one or more electromagnetic energy sensors which are part of (or attached to) smart eyewear; (b) analyzing this data to identify patterns of electromagnetic activity emitted from the person's head; and (c) activating spectroscopic analysis of light from environmental objects based on identification of one or more selected patterns of electromagnetic activity. In an example, brainwave-controlled smart eyewear can comprise: (a) an eyewear frame; (b) one or more spectroscopic sensors; (c) one or more electromagnetic energy sensors which are configured to collect data concerning electromagnetic activity of a person's brain, wherein the one or more spectroscopic sensors are activated in response to identification of one or more selected patterns of electromagnetic activity. In an example, such smart eyewear can enable the wearer to discretely analyze the molecular composition of nearby environmental objects. For example, such spectroscopic capability can be very useful for analyzing the molecular composition of nearby food to identify allergens and/or track the consumption of selected nutrients. The feature this spectroscopy capability is brainwave-controlled is an advantage in terms of discretion, especially during social dining situations.

In an example, augmented reality eyewear can modify visual attributes of environmental objects into a person's field of vision. In an example, augmented reality eyewear can change the brightness of one or more environmental objects into a person's field of vision. In an example, augmented reality eyewear can change the apparent color of one or more environmental objects into a person's field of vision. In an example, augmented reality eyewear can virtually change the apparent texture of one or more environmental objects into a person's field of vision. In an example, augmented reality eyewear can change the polarization of light from one or more environmental objects into a person's field of vision. In an example, augmented reality eyewear can virtually change the orientation of one or more environmental objects into a person's field of vision. In an example, augmented reality eyewear can virtually change the size of one or more environmental objects into a person's field of vision.

In an example, brainwave-controlled augmented reality eyewear can modify visual attributes of environmental objects into a person's field of vision based on changes in the person's brainwaves. In an example, such eyewear can change the brightness of one or more environmental objects into a person's field of vision based on changes in the person's brainwaves. In an example, such eyewear can change the apparent color of one or more environmental objects into a person's field of vision based on changes in the person's brainwaves. In an example, such eyewear can virtually change the apparent texture of one or more environmental objects into a person's field of vision based on changes in the person's brainwaves. In an example, such eyewear can change the polarization of light from one or more environmental objects into a person's field of vision based on changes in the person's brainwaves. In an example, such eyewear can virtually change the orientation of one or more environmental objects into a person's field of vision based on changes in the person's brainwaves. In an example, such eyewear can virtually change the size of one or more environmental objects into a person's field of vision based on changes in the person's brainwaves.

In an example, brainwave-controlled augmented reality eyewear can make associations between selected environmental objects, people, or situations which the wearer experiences and the wearer's brainwaves. In an example, brainwave-controlled augmented reality can provide a wearer with advice based on past associations when a selected object, person, or situation is recognized in the person's environment. In an example, brainwave-controlled augmented reality eyewear can virtually display information (e.g. words, icons, images) near selected environmental objects, people, or situations in a person's field of vision based on past associations between such objects, people, or situations and the person's brainwave patterns. In an example, brainwave-controlled augmented reality eyewear can provide advice, warning, guidance, and/or information concerning selected environmental objects, people, or situations based on the electromagnetic activity of the wearer's brain.

In an warning example, brainwave-controlled augmented reality eyewear can function like a "virtual lane keeper" to help guide a person's actions going in good directions and avoid going in bad directions. For example, if analysis of associations between a person's environment and their brain activity indicates a possible gambling addiction, then brainwave-controlled augmented reality eyewear can provide auditory or visual warnings when the person is faced with a gambling opportunity. In an encouragement example, if analysis of associations between a person's environment and their brain activity indicates good results from a particular type of exercise, then brainwave-controlled augmented reality eyewear can provide auditory or visual encouragement when the person has an opportunity to do this exercise.

In an example, brainwave-controlled augmented reality eyewear can make associations between the facial expressions of other people and the wearer's brainwaves. In an example, brainwave-controlled augmented reality eyewear can be activated to analyze facial expressions of other people based on a change in the wearer's brainwaves. In an example, brainwave-controlled augmented reality eyewear can be activated to recognize other people's faces based on a change in the wearer's brainwaves. In an example, brainwave-controlled augmented reality eyewear can be activated to recognize other people's gestures based on a change in the wearer's brainwaves. In an example, brainwave-controlled augmented reality eyewear can be activated to translate other people's speech based on a change in the wearer's brainwaves.

In an example, augmented reality eyewear can change the color and/or light spectrum of an environmental object in a person's field of vision. In an example, augmented reality eyewear can change the mixture and/or relative proportions of environmental objects and virtual objects shown in a person's field of vision. In an example, augmented reality eyewear can create a stylized view of a person's environment in a their field of vision. In an example, augmented reality eyewear can create a three-dimensional map of a person's environment. In an example, augmented reality eyewear can create a virtual cursor, keypad, or keyboard in a person's field of vision. In an example, augmented reality eyewear can create a virtual object in a person's field of vision.

In an example, augmented reality eyewear can create a virtual object which appears to come out of (or go into) an environmental object in a person's field of vision. In an example, augmented reality eyewear can create an image of a virtual object whose location is tied to an environmental object in a person's field of vision. In an example, augmented reality eyewear can create virtual outlines for environmental objects into a person's field of vision. In an example, augmented reality eyewear can discourage unhealthy behavior by displaying an aversive image in a person's field of vision. In an example, augmented reality eyewear can display a virtual menu from which a person can select an option. In an example, augmented reality eyewear can display virtual text related to an environmental object in a person's field of vision.

In an example, augmented reality eyewear can encourage healthy behavior by displaying an attractive image in a person's field of vision. In an example, augmented reality eyewear can generate a three-dimensional virtual scene in a person's field of vision. In an example, augmented reality eyewear can highlight significant recognized environmental objects or people in a person's field of vision. In an example, augmented reality eyewear can link a virtual object to an environmental object in a person's field of vision. In an example, augmented reality eyewear can move a virtual object in response to changes in a person's focal direction. In an example, augmented reality eyewear can replace a selected environmental object with a selected virtual object in a person's field of vision. In an example, augmented reality eyewear can show interaction between environmental objects and virtual objects into a person's field of vision.

In an example, augmented reality eyewear can sub-impose a virtual object under an environmental object in a person's field of vision. In an example, augmented reality eyewear can superimpose a virtual map and/or directions on a person's view of their environment. In an example, augmented reality eyewear can super-impose a virtual object over an environmental object in a person's field of vision. In an example, augmented reality eyewear can virtually change the size or shape of an environmental object in a person's field of vision. In an example, augmented reality eyewear can virtually display information concerning food in a person's environment.

In an example, brainwave-controlled augmented reality eyewear can change the color and/or light spectrum of an environmental object in a person's field of vision based on a person's brainwaves. In an example, brainwave-controlled augmented reality eyewear can change the mixture and/or relative proportions of environmental objects and virtual objects shown in a person's field of vision based on a person's brainwaves. In an example, brainwave-controlled augmented reality eyewear can create a virtual cursor, keypad, or keyboard in a person's field of vision based on a person's brainwaves. In an example, brainwave-controlled augmented reality eyewear can create a virtual object in a person's field of vision based on a person's brainwaves. In an example, brainwave-controlled augmented reality eyewear can create virtual outlines for environmental objects into a person's field of vision based on a person's brainwaves.

In an example, brainwave-controlled augmented reality eyewear can discourage unhealthy behavior by displaying an aversive image in a person's field of vision based on a person's brainwaves. In an example, brainwave-controlled augmented reality eyewear can display a virtual menu from which a person can select an option based on a person's brainwaves. In an example, brainwave-controlled augmented reality eyewear can display a virtual message in a person's field of vision concerning how they are feeling (e.g. alertness, anger, attraction, dehydration, excitement, exertion, fatigue, fear, happiness, hunger, joy, sadness, stress, substance-based impairment, etc.) so that they can be more emotionally self-aware.

In an example, brainwave-controlled augmented reality eyewear can display virtual text related to an environmental object in a person's field of vision based on a person's brainwaves. In an example, brainwave-controlled augmented reality eyewear can encourage healthy behavior by displaying an attractive image in a person's field of vision based on a person's brainwaves. In an example, brainwave-controlled augmented reality eyewear can highlight significant recognized environmental objects or people in a person's field of vision based on a person's brainwaves. In an example, brainwave-controlled augmented reality eyewear can link a virtual object to an environmental object in a person's field of vision based on a person's brainwaves. In an example, brainwave-controlled augmented reality eyewear can move a virtual object in response to changes in a person's focal direction based on a person's brainwaves.

In an example, brainwave-controlled augmented reality eyewear can replace a selected environmental object with a selected virtual object in a person's field of vision based on a person's brainwaves. In an example, brainwave-controlled augmented reality eyewear can show interaction between environmental objects and virtual objects into a person's field of vision based on a person's brainwaves. In an example, brainwave-controlled augmented reality eyewear can sub-impose a virtual object under an environmental object in a person's field of vision based on a person's brainwaves. In an example, brainwave-controlled augmented reality eyewear can superimpose a virtual map and/or directions on a person's view of their environment based on a person's brainwaves.

In an example, brainwave-controlled augmented reality eyewear can super-impose a virtual object over an environmental object in a person's field of vision based on a person's brainwaves. In an example, brainwave-controlled augmented reality eyewear can virtually change the size or shape of an environmental object in a person's field of vision based on a person's brainwaves. In an example, brainwave-controlled augmented reality eyewear can virtually display information concerning food in a person's environment. In an example, brainwave-controlled augmented reality eyewear can change the expression of a virtual avatar based on a person's brainwaves. In an example, brainwave-controlled augmented reality eyewear can display a virtual image in a person's field of vision which graphically represents brainwave parameters (e.g. power levels in different frequency bands). In an example, brainwave-controlled augmented reality eyewear can change the expression of a virtual avatar based on what emotion a person is feeling (e.g. alertness, anger, attraction, dehydration, excitement, exertion, fatigue, fear, happiness, hunger, joy, sadness, stress, substance-based impairment, etc.).

In an example, brainwave-controlled augmented reality eyewear can change one or more attributes of a virtual object displayed in a person's field of vision based on changes in the person's brainwaves, wherein these attributes are selected from the group consisting of: accompanying sound, angle, brightness, color, expression, lighting direction, linkage to a physical object, opacity, parallax motion, perspective, position, reflection, shading, shape, size, spectrum, speed, sub-imposition, super-imposition, texture, and three-dimensionality. In an example, brainwave-controlled augmented reality eyewear can virtually display biometric and/or health information for a person selected from the group consisting of: activity level, blood alcohol level, blood pressure, body glucose level, core temperature, exercise level, fatigue, heart rate, heart rate variability, hydration level, muscle potential, posture, respiration rate, skin impedance, skin temperature, sleepiness, and steps taken.

In an example, brainwave-controlled augmented reality eyewear can be used for one or more applications selected from the group consisting of: animating the expressions of avatars in augmented or virtual reality; controlling home environmental systems or appliances; displaying data virtually for brainwave-based manipulation; displaying data virtually for gesture-based manipulation; displaying information about a person's body glucose level and suggesting appropriate action, if required; guiding sports training; helping a person to overcome fear by gradually changing virtual objects displayed in a person's field of vision based on changes in their brainwaves; improving a person's nutrition by displaying appetizing or unappetizing images near healthy or unhealthy food, respectively; modifying nutritional intake by displaying food nutrition information; modifying the pace or format of (online or remote) educational instruction based on brainwave patterns; providing humor (via virtual images or words) to reduce a person's stress indicated by the person's brainwaves; providing navigational guidance with augmented reality; selecting or modifying music based on brainwave patterns; suggesting actions (e.g. taking deep breaths) to reduce a person's stress indicated by the person's brainwaves; superimposition of a map and/or directional arrows on a person's view of their environment; teleconferencing; telerobotics and/or remote robotic control; virtual design and/or manufacturing; virtual shopping; and virtually displaying nutritional information concerning food in a person's environment.

Figure 57:
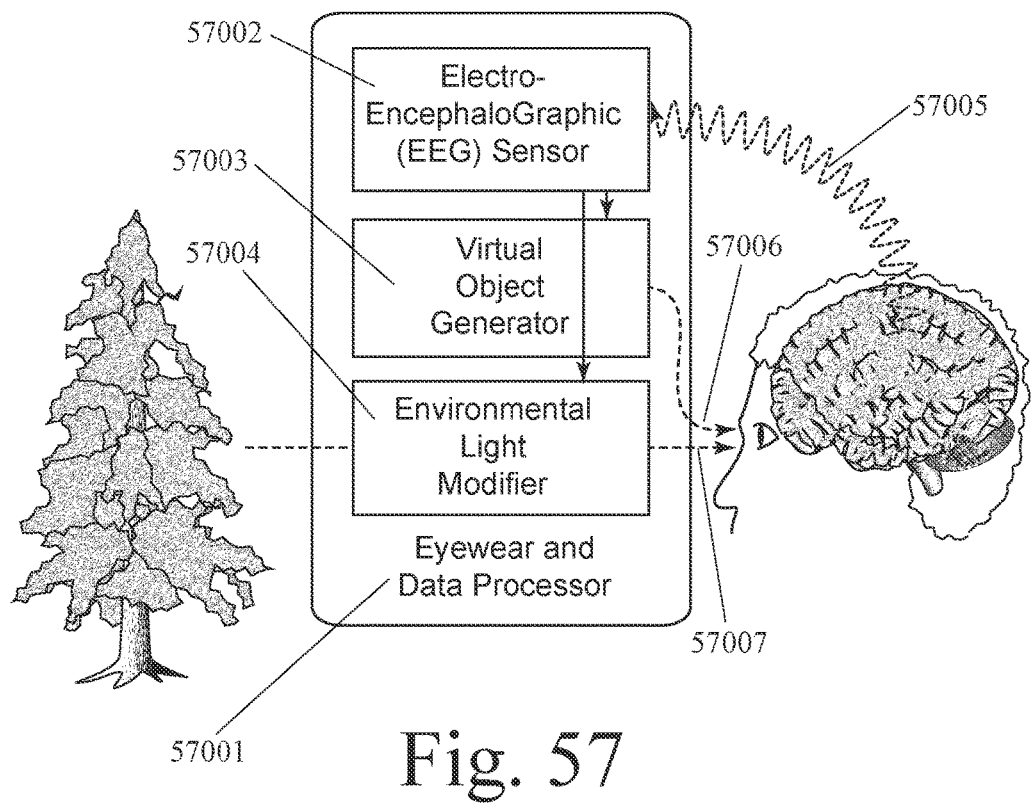
FIG. 57 shows a conceptual introduction to brainwave-controlled augmented reality eyewear comprising an EEG sensor, a virtual object generator, an environmental light modifier, an eyewear frame, and a data processor.

Key concepts and variations which have been discussed in the preceding introductory section or in priority-linked documents can be applied to FIGS. 57 through 77, but are not repeated in the narrative accompanying each figure in order to avoid duplicative content. FIGS. 57 through 77 show examples of brainwave-controlled augmented reality eyewear. FIG. 57 provides a first conceptual introduction to an embodiment of this brainwave-controlled augmented reality eyewear. In this embodiment, brainwave-controlled augmented reality eyewear comprises: an electroencephalographic sensor (57002); a virtual object generator (57003); an environmental light modifier (57004); and also an eyewear frame and data processor (57001). Light from environmental objects (57007) reaches the person's eye through the environmental light modifier (57004). In this figure, the environmental object is a tree. Images of virtual objects (57006) seen by the person are created by the virtual object generator (57003).

In an example, a virtual object generator can be a light projector or an array of light emitters. In an example, an environmental light modifier can be a lens. In an example, it can be a smart lens with electronic functionality and image display capability. The electroencephalographic sensor can be configured to collect data concerning electromagnetic energy (57005) from a person's brain. This data can be analyzed to identify selected patterns of electromagnetic brain activity which, in turn, trigger activation and/or modification of the virtual object generator and/or the environmental light modifier.

Figure 58:
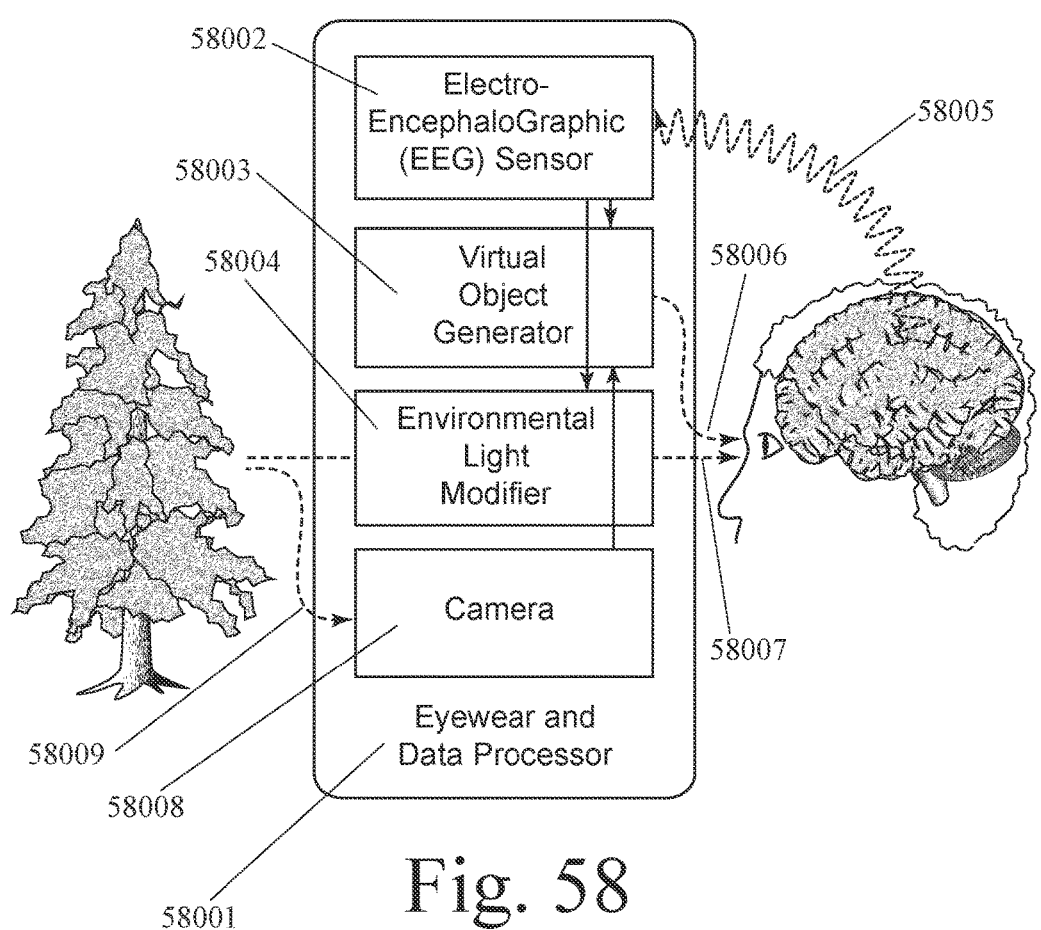
FIG. 58 shows a conceptual introduction to brainwave-controlled augmented reality eyewear comprising an EEG sensor, a virtual object generator, an environmental light modifier, a camera, an eyewear frame, and a data processor.

FIG. 58 provides a second conceptual introduction to an embodiment of this brainwave-controlled augmented reality eyewear. In this embodiment, the brainwave-controlled augmented reality eyewear comprises: an electroencephalographic sensor (58002); a virtual object generator (58003); an environmental light modifier (58004); a camera (58008); and also an eyewear frame and a data processor (58001). Light from environmental objects (58007) reaches the person's eye through the environmental light modifier (58004) and this light (58009) also enters the camera where it is analyzed using pattern recognition. Images of virtual objects (58006) seen by the person are created by the virtual object generator (58003).

In an example, a virtual object generator can be a light projector or an array of light emitters. In an example, an environmental light modifier can be a lens. In an example, it can be a smart lens with electronic functionality and image display capability. The electroencephalographic sensor can be configured to collect data concerning electromagnetic energy (58005) from a person's brain. This data can be analyzed to identify selected patterns of electromagnetic brain activity which, in turn, trigger activation and/or modification of the virtual object generator and/or the environmental light modifier. In an example, analysis of images from the camera can be used to position the virtual object so that it appears to be consistently in proximity to (e.g. behind, on top of, or next to) an environmental object in the person's field of vision.

Figure 59:
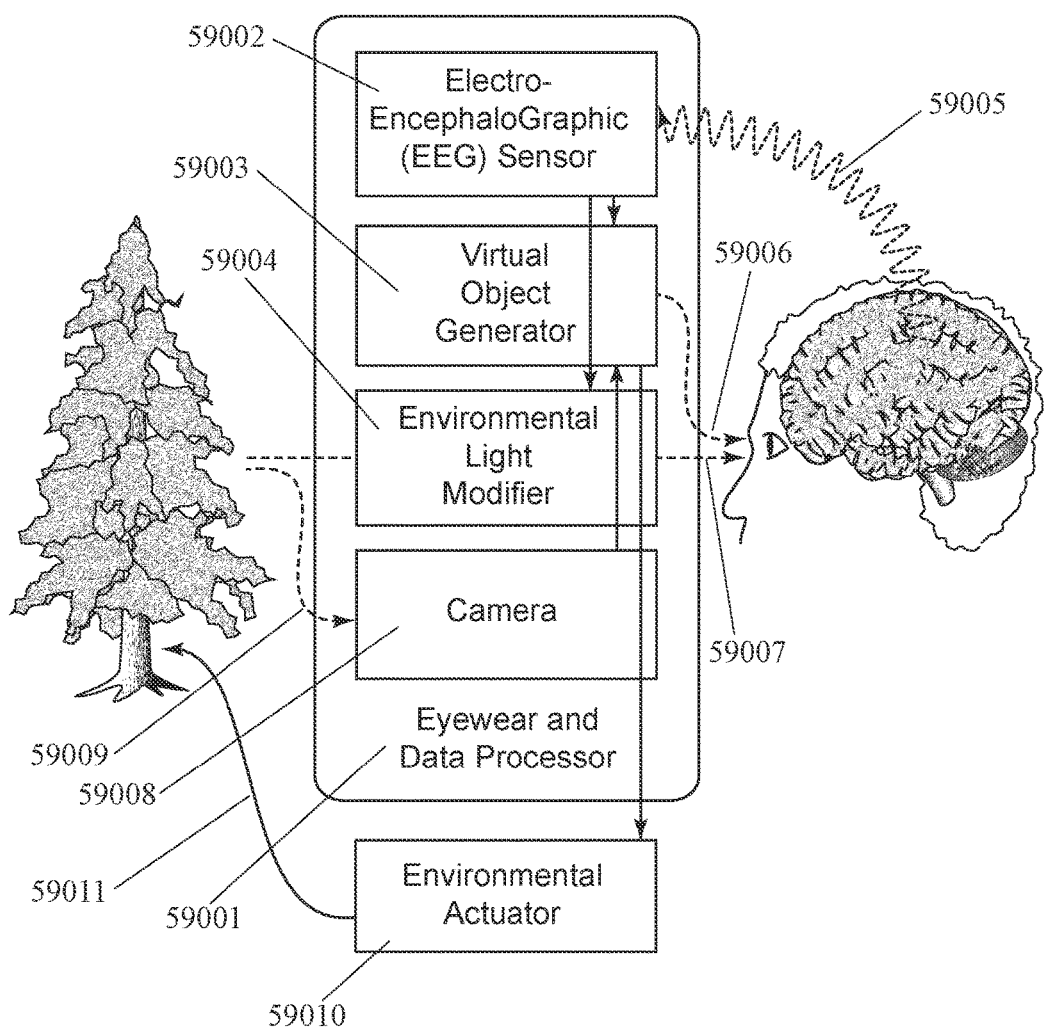
FIG. 59 shows a conceptual introduction to brainwave-controlled augmented reality eyewear comprising an EEG sensor, a virtual object generator, an environmental light modifier, a camera, an eyewear frame, a data processor, and an environmental actuator.

FIG. 59 provides a third conceptual introduction to an embodiment of this brainwave-controlled augmented reality eyewear. In the embodiment, the brainwave-controlled augmented reality eyewear comprises: an electroencephalographic sensor (59002); a virtual object generator (59003); an environmental light modifier (59004); a camera (59008); an environmental actuator (59010); and also an eyewear frame and a data processor (59001). Light from environmental objects (59007) reaches the person's eye through the environmental light modifier (59004) and this light (59009) also enters the camera. Images of virtual objects (59006) seen by the person are created by the virtual object generator (59003).

In an example, a virtual object generator can be a light projector or an array of light emitters. In an example, an environmental light modifier can be a lens. In an example, it can be a smart lens with electronic functionality and image display capability. In an example, an environmental actuator can be a robot. The electroencephalographic sensor can be configured to collect data concerning electromagnetic energy (59005) from a person's brain. This data can be analyzed to identify selected patterns of electromagnetic brain activity which, in turn, trigger activation and/or modification of the virtual object generator and/or the environmental light modifier. In an example, a generated virtual object can be consistently positioned so as to appear to be consistently in proximity to (e.g. behind, on top of, or next to) an environmental object in the person's field of vision.

In an example, this eyewear can be used to control an environmental actuator such as a mobile robot or drone. In an example, this eyewear can enable a person to control an environmental actuator such as a mobile robot or drone by changing their electromagnetic brain activity. In an example, this eyewear can enable a person to control an environmental actuator such as a mobile robot or drone by moving a virtual object (such as a virtual cursor) by changing their electromagnetic brain activity. For example, when the person alters their brainwaves to move a virtual cursor in a selected direction, the robot or drone can move in that direction in the person's environment. In this manner, this eyewear can serve as a brain-to-environment actuator interface in addition to being an augmented reality display.

Figure 60:
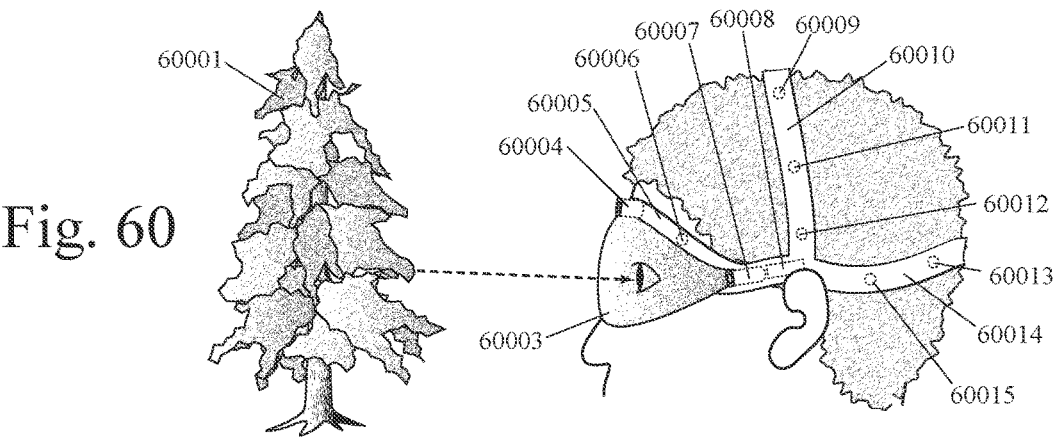
FIGS. 60 through 62 show an example of how a person's view of the environment and/or virtual objects can be changed based on data from an EEG sensor, wherein a virtual object is displayed behind a real object.
Figure 61:
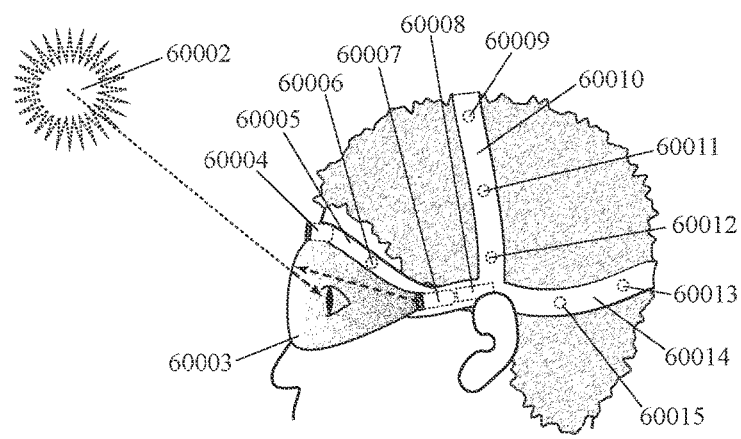
Figure 62:
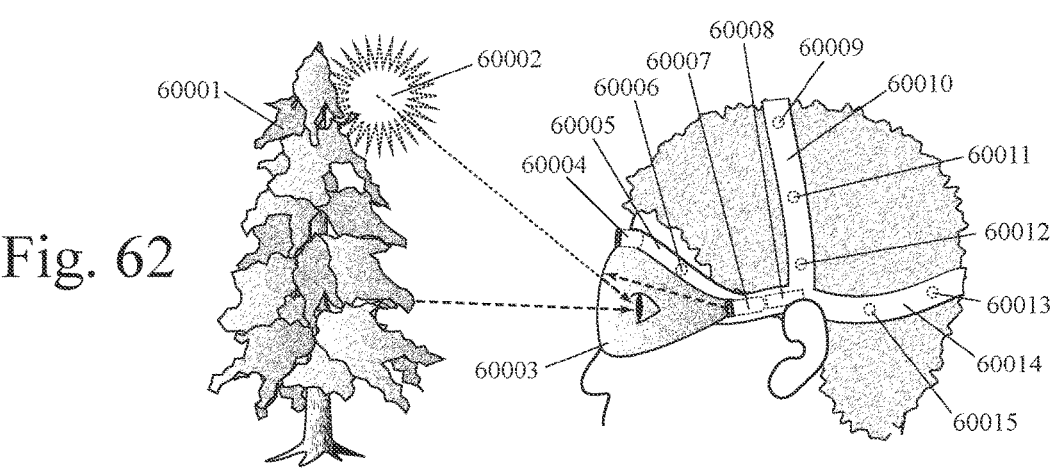

FIGS. 60 through 62 show an example augmented reality eyewear comprising: an electromagnetic energy sensor which is configured to collect data concerning the electromagnetic activity of a person's brain; a lens which is configured to transmit light from the environment to the person's eye; a light projector which projects an image of a virtual object into the person's field of vision; an eyewear frame which is configured to hold the electromagnetic energy sensor, the lens, and the light projector on (or near) the person's head; and a data processor which analyzes data from the electromagnetic energy sensor. In an example, transmission of light from the environment to the person's eye and/or the projection of the virtual object into the person's field of vision is automatically changed based on analysis of data from the electromagnetic energy sensor.

Specifically, FIGS. 60 through 62 show brainwave-controlled augmented reality eyewear comprising: a plurality of electromagnetic energy sensors (including 60006, 60009, 60011, 60012, 60013, and 60015) which collect data concerning the electromagnetic activity of a person's brain; a lens (60003) which transmits light from the environment (including tree 60001) to the person's eye; a light projector (60007) which projects an image of a virtual object (virtual sun 60002) into the person's field of vision; an eyewear frame (including portions 60005, 60010, and 60014) which holds the electromagnetic energy sensors, the lens, and the light projector on (or near) the person's head; and a data processor (60008) which analyzes data from the electromagnetic energy sensor. In example, transmission of light from the environment to the person's eye and/or the projection of the virtual object into the person's field of vision is automatically changed based on analysis of data from the electromagnetic energy sensor. This example also includes camera 60004. In an example, this eyewear can further comprise a local power source such as a battery.

In FIGS. 60 through 62, an eyewear frame comprises a frontpiece or front portion (60005) which spans the front of the person's face, a back loop (60014) which loops around the rear of the person's head, and a top loop (60010) which loops over the top of the person's head. Each of these three components of the eyewear frame holds one or more electromagnetic energy sensors in proximity to the person's head. FIGS. 60 through 62 show only the left side of a person's head, but in an example, this eyewear can be laterally symmetric, having symmetric structure and components on the right side as well as the left side of the person's head. In an example, augmented reality eyewear need not have a complete top loop, but rather have a sidepiece with undulations which provide some sensor coverage of the upper portion of a person's head. In an example, augmented reality eyewear need not have a complete back loop.

In this example, a light projector is located along the side of a person's head, slightly forward of their ear, and projects light onto the eye-facing surface of the lens. In an example, there can be two light projectors, one on each side of the person's head. In this example, a camera is located on the front of the person's head, above their eyes. In an example, a camera can be located along the side of a person's head. In an example, there can be two cameras, one on each side of the person's head. In this example, there is a single curved lens which spans both eyes. In an example, there can be two separate lenses, one in front of the left eye and one in front of the right eye.

In FIGS. 60 through 62, an image of a virtual object (e.g. virtual sun 60002) is projected from light projector 60007 onto the eye-facing surface of the lens, from which it is reflected into the person's eye to create an image of the virtual object in the person's field of vision. Virtual object (virtual sun 60002) can be displayed in the person's field of vision in proximity to an environmental object (tree 60001). In FIG. 60, the eyewear transmits light from the environment to the person's eye, but does not display a virtual object in the person's field of vision. In FIG. 61, the eyewear displays a virtual object in the person's field of vision, but does not transmit light from the environment. In FIG. 62, the eyewear transmits light from the environment and also displays a virtual object in the person's field of vision. In this example, a virtual object (virtual sun 60002) is shown as if it is behind an environmental object (tree 60001). In another example, a virtual object can be shown as if it is on top of an environmental object.

In an example, brainwave-controlled augmented reality eyewear can transmit light from the environment, display a virtual object, or do both in response to identification of a selected pattern of electromagnetic brain activity identified by analysis of data from the plurality of electromagnetic energy sensors. In this manner, a person can control the relative mix of environmental images vs. virtual images in their field of vision by changing their brain activity. This is one way in which brainwave-controlled augmented reality eyewear can be embodied. Example variations discussed elsewhere in this disclosure or in priority-linked disclosures are not repeated here to avoid redundancy, but can be applied where relevant to the example shown in these figures.

Figure 63:
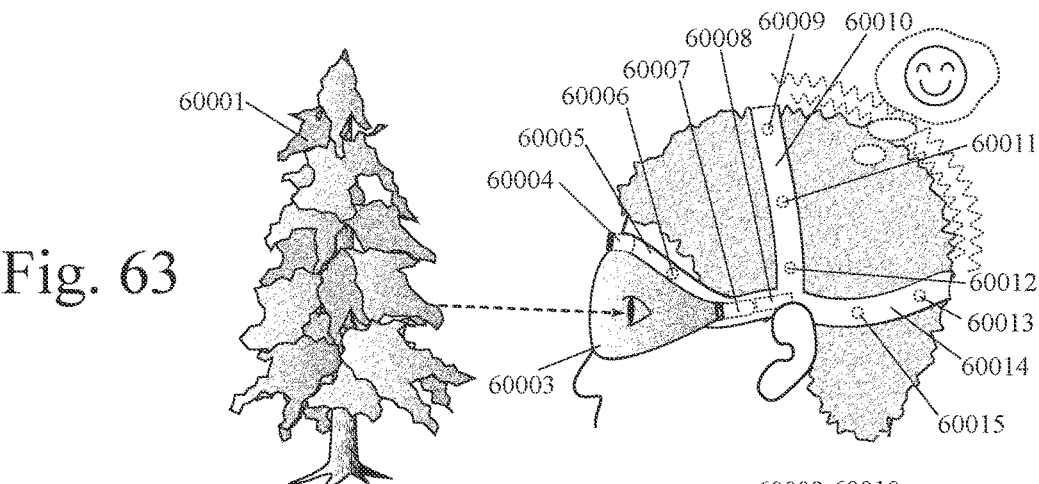
FIGS. 63 through 65 show an example of how a person's view of the environment and/or virtual objects can be changed based on data from an EEG sensor, wherein a virtual object reflects the person's positive response to a real object.
Figure 64:
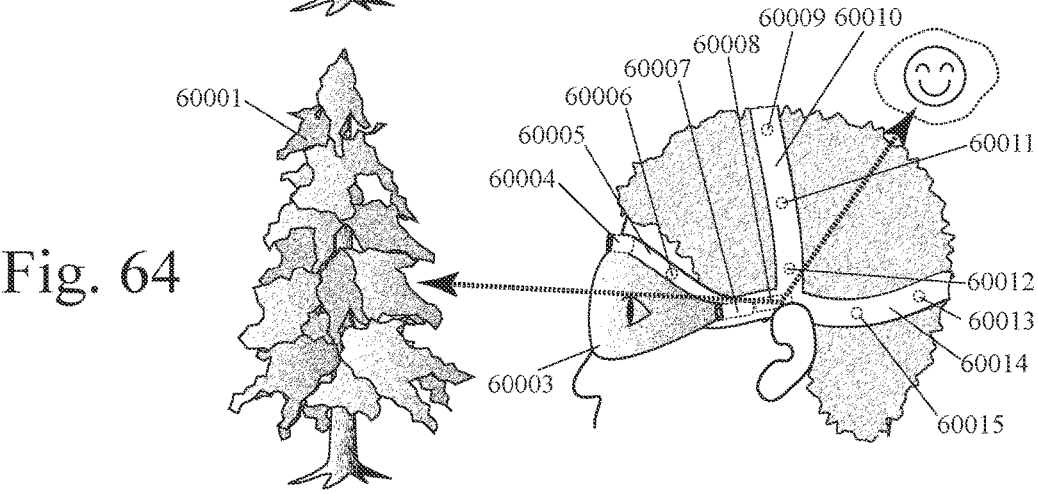
Figure 65:
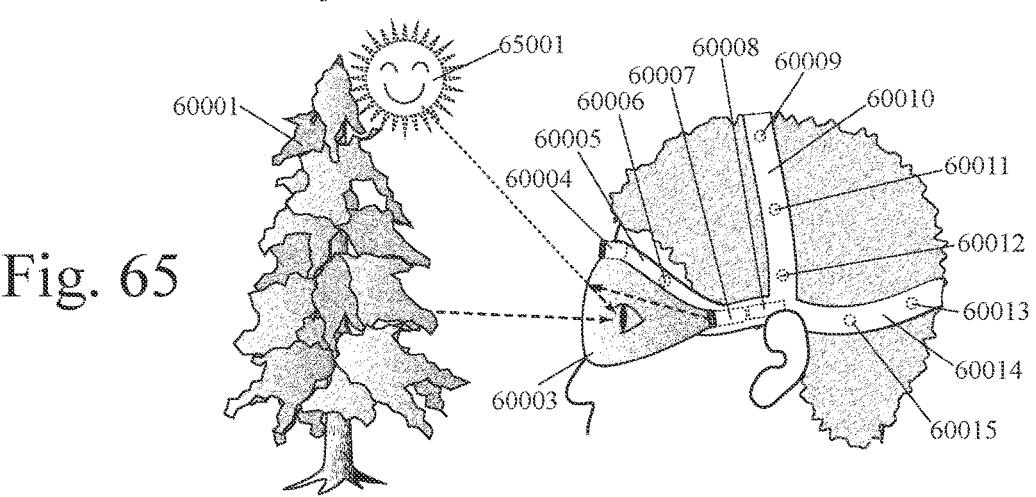

FIGS. 63 through 65 show an additional example of how the eyewear in FIGS. 60 through 62 can function. In FIG. 63, eyewear transmits light from the environment to the person's eye and the person sees tree 60001 in the environment. The sight of tree 60001 makes the person happy. This is represented symbolically by the smiling face icon in the "thought balloon" near the person's head. The person's happy response to the tree is identified by analysis of data from the electromagnetic energy sensors.

In FIG. 64, over time, the data processor identifies the association between sight of the tree in the environment and the person's happy response. In an example, the sight of the tree can be recognized by pattern recognition of images recorded by camera 60004. In an example, the direction of a person's gaze can also be tracked to identify where a person is looking. This can help to further narrow down the specific environmental stimulus which triggered a specific response in a person's brain. In an example, the sight of a tree can be linked to a pattern of electromagnetic brain activity which is associated with positive emotions. In an example, this data analysis can occur entirely within a local data processor. In an example, a local data processor can be in wireless communication with a remote data processor (e.g. a cell phone) where most of the data analysis occurs.

In FIG. 65, triggered by analysis of electromagnetic activity, eyewear displays a virtual object (virtual smiling sun 65001) in the person's field of vision. In this example, the virtual object is displayed in proximity to (and behind) the tree which has historically prompted a happy response in the person's brain. This is just one example of how a selected type of virtual object can be displayed in response to identification of a selected pattern of electromagnetic energy from a person's brain.

More generally, environmental objects which have been historically associated with (long-term) positive brain states could be accompanied in a person's field of vision by the display of positive virtual objects. Also, environmental objects which have been historically associated with (long-term) negative brain states could be accompanied in a person's field of vision by the display of negative virtual objects. The latter could be useful for someone fighting an addiction. For example, a virtual image of diseased lungs could be displayed in proximity to a pack of cigarettes in a person's field of vision. Example variations discussed elsewhere in this disclosure or in priority-linked disclosures are not repeated here to avoid redundancy, but can be applied where relevant to the example shown in these figures.

FIGS. 66 through 68 show an additional example of how the eyewear introduced in FIGS. 60 through 62 can function in response to an unhappy event and/or an association between an environmental object and a negative brain state. In FIG. 66, eyewear transmits light from the environment to the person's eye and the person sees a tree being destroyed by lighting. The sight of the tree being destroyed makes the person sad. This sadness is represented symbolically by the frowning face icon in the "thought balloon" near the person's head. The person's sad response to the tree's destruction is identified by analysis of data from the electromagnetic energy sensors.

In FIG. 67, the data processor identifies the association between the tree's destruction and the person's sad response. In an example, the tree's destruction can be recognized by pattern recognition of images recorded by the camera. In an example, the direction of a person's gaze can also be tracked to identify where a person is looking. In an example, the tree's destruction can be linked to a pattern of electromagnetic brain activity which is associated with negative emotions. In an example, this data analysis can occur entirely within a local data processor. In an example, a local data processor can be in wireless communication with a remote data processor (e.g. a cell phone) where most of the data analysis occurs.

In FIG. 68, triggered by analysis of electromagnetic activity, the eyewear displays a virtual object (frowning sun 68001) in the person's field of vision. In this example, the virtual object is displayed in proximity to (and behind) the tree's destruction which prompted the sad response in the person's brain. This is just one example of how a selected type of virtual object can be displayed in response to identification of a selected pattern of electromagnetic energy from a person's brain. Example variations discussed elsewhere in this disclosure or in priority-linked disclosures are not repeated here to avoid redundancy, but can be applied where relevant to the example shown in these figures.

Figure 69:
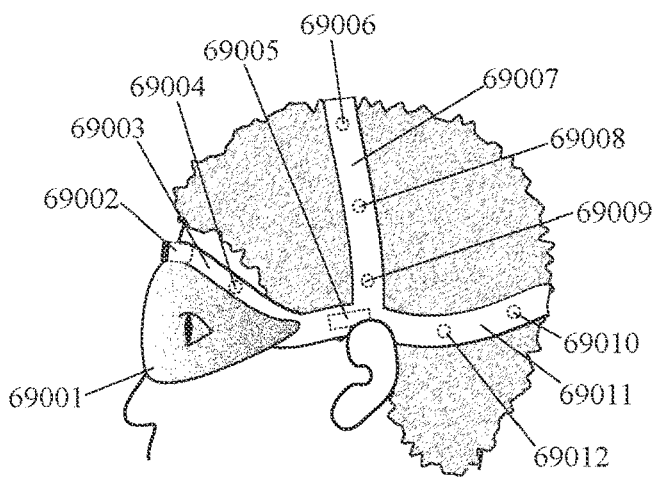
FIG. 69 shows brainwave-controlled augmented reality eyewear with EEG sensors, wherein the eyewear has a front piece, a back loop, and a top loop.

FIG. 69 shows another example of brainwave-controlled augmented reality eyewear. This example comprises: a plurality of electromagnetic energy sensors which are configured to collect data concerning the electromagnetic activity of a person's brain; a lens which transmits light from the environment to the person's eye, displays a virtual object in the person's field of vision, or both; an eyewear frame which is configured to hold the sensors and the lens on (or near) the person's head; and a data processor which analyzes data from the electromagnetic energy sensor. In an example, transmission of light from the environment to the person's eye and/or the display of the virtual object in the person's field of vision is automatically changed based on analysis of data from the electromagnetic energy sensor.

Specifically, FIG. 69 shows brainwave-controlled augmented reality eyewear comprising: a plurality of electromagnetic energy sensors (including 69004, 69006, 69008, 69009, 69010, and 69012) which are configured to collect data concerning the electromagnetic activity of a person's brain; a lens (69001) which transmits light from the environment to the person's eye, displays a virtual object in the person's field of vision, or both; an eyewear frame (including portions 69003, 69007, and 69011) which is configured to hold the sensors and the lens on (or near) the person's head; and a data processor (69005) which analyzes data from the electromagnetic energy sensor. In an example, transmission of light from the environment to the person's eye and/or the display of the virtual object in the person's field of vision is automatically changed based on analysis of data from the electromagnetic energy sensor. This example also includes camera 69002. In an example, this eyewear can further comprise a local power source such as a battery.

In FIG. 69, an eyewear frame comprises a frontpiece or front portion (69003) which spans the front of the person's face, a back loop (69011) which loops around the rear of the person's head, and a top loop (69007) which loops over the top of the person's head. In this example, each of these three components of the eyewear frame holds one or more electromagnetic energy sensors in proximity to the person's head. FIG. 69 shows only the left side of a person's head, but in an example, this eyewear can be laterally symmetric, having symmetric structure and components on the right side as well as the left side of the person's head. Example variations discussed elsewhere in this disclosure or in priority-linked disclosures are not repeated here to avoid redundancy, but can be applied where relevant to the example shown in these figures.

Figure 70:
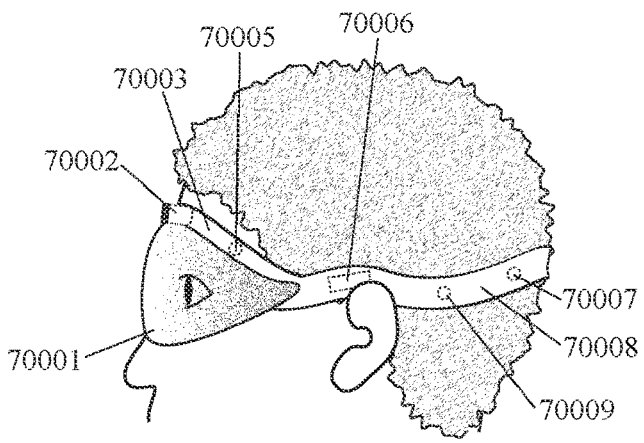
FIG. 70 shows brainwave-controlled augmented reality eyewear with EEG sensors, wherein the eyewear only has a front piece and a back loop.

FIG. 70 shows another example of brainwave-controlled augmented reality eyewear. This example comprises: a plurality of electromagnetic energy sensors which are configured to collect data concerning the electromagnetic activity of a person's brain; a lens which transmits light from the environment to the person's eye, displays a virtual object in the person's field of vision, or both; an eyewear frame which is configured to hold the sensors and the lens on (or near) the person's head; and a data processor which analyzes data from the electromagnetic energy sensor. In an example, transmission of light from the environment to the person's eye and/or the display of the virtual object in the person's field of vision is automatically changed based on analysis of data from the electromagnetic energy sensor.

Specifically, FIG. 70 shows brainwave-controlled augmented reality eyewear comprising: a plurality of electromagnetic energy sensors (including 70005, 70007, and 70009) which are configured to collect data concerning the electromagnetic activity of a person's brain; a lens (70001) which transmits light from the environment to the person's eye, displays a virtual object in the person's field of vision, or both; an eyewear frame (including portions 70003 and 70008) which is configured to hold the sensors and the lens on (or near) the person's head; and a data processor (70006) which analyzes data from the electromagnetic energy sensor. In an example, transmission of light from the environment to the person's eye and/or the display of the virtual object in the person's field of vision is automatically changed based on analysis of data from the electromagnetic energy sensor. This example also includes camera 70002. In an example, this eyewear can further comprise a local power source such as a battery.

In FIG. 70, an eyewear frame comprises a frontpiece or front portion (70003) which spans the front of the person's face and a back loop (70008) which loops around the rear of the person's head. In this example, both of these components of the eyewear frame hold one or more electromagnetic energy sensors in proximity to the person's head. FIG. 70 shows only the left side of a person's head, but in an example, this eyewear can be laterally symmetric, having symmetric structure and components on the right side as well as the left side of the person's head. Example variations discussed elsewhere in this disclosure or in priority-linked disclosures are not repeated here to avoid redundancy, but can be applied where relevant to the example shown in these figures.

Figure 71:
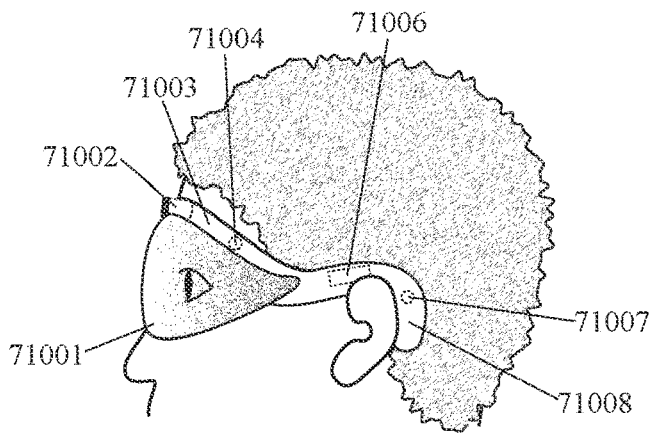
FIG. 71 shows brainwave-controlled augmented reality eyewear with EEG sensors, wherein the eyewear has a front piece and an arm which curves around an ear.

FIG. 71 shows another example of brainwave-controlled augmented reality eyewear. This example comprises: a plurality of electromagnetic energy sensors which are configured to collect data concerning the electromagnetic activity of a person's brain; a lens which transmits light from the environment to the person's eye, displays a virtual object in the person's field of vision, or both; an eyewear frame which is configured to hold the sensors and the lens on (or near) the person's head; and a data processor which analyzes data from the electromagnetic energy sensor. In an example, transmission of light from the environment to the person's eye and/or the display of the virtual object in the person's field of vision is automatically changed based on analysis of data from the electromagnetic energy sensor.

Specifically, FIG. 71 shows brainwave-controlled augmented reality eyewear comprising: a plurality of electromagnetic energy sensors (including 71004 and 71007) which are configured to collect data concerning the electromagnetic activity of a person's brain; a lens (71001) which transmits light from the environment to the person's eye, displays a virtual object in the person's field of vision, or both; an eyewear frame (including portions 71003 and 71008) which is configured to hold the sensors and the lens on (or near) the person's head; and a data processor (71006) which analyzes data from the electromagnetic energy sensor. In an example, transmission of light from the environment to the person's eye and/or the display of the virtual object in the person's field of vision is automatically changed based on analysis of data from the electromagnetic energy sensor. This example also includes camera 71002. In an example, this eyewear can further comprise a local power source such as a battery.

In FIG. 71, an eyewear frame comprises a frontpiece or front portion (71003) which spans the front of the person's face and a back loop (71008) which spans part of the side of the person's head and curves around the back of their ear. In this example, both of these components of the eyewear frame hold at least one electromagnetic energy sensor in proximity to the person's head. FIG. 71 shows only the left side of a person's head, but in an example, this eyewear can be laterally symmetric, having symmetric structure and components on the right side as well as the left side of the person's head. Example variations discussed elsewhere in this disclosure or in priority-linked disclosures are not repeated here to avoid redundancy, but can be applied where relevant to the example shown in these figures.

Figure 72:
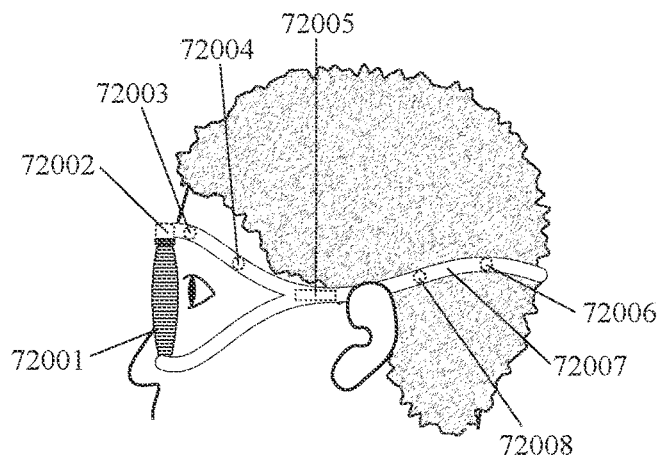
FIG. 72 shows brainwave-controlled augmented reality eyewear with EEG sensors, wherein an eyewear frame bifurcates into upper and lower branches as it spans a person's face.

FIG. 72 shows another example of brainwave-controlled augmented reality eyewear. This example comprises: a plurality of electromagnetic energy sensors which are configured to collect data concerning the electromagnetic activity of a person's brain; a lens which transmits light from the environment to the person's eye and/or displays a virtual object in the person's field of vision; an eyewear frame which is configured to hold the sensors and the lens on (or near) the person's head; and a data processor which analyzes data from the electromagnetic energy sensor.

In an example, the lens can further comprise (or be accompanied by) a light projector which projects light toward (or into) the lens in order to create the image of a virtual object in the person's field of vision. In an example, the lens can further comprise an array of light emitters and/or light channels which create the image of a virtual object in the person's field of vision. In an example, transmission of light from the environment to the person's eye and/or the display of the virtual object in the person's field of vision is automatically changed based on analysis of data from the electromagnetic energy sensor.

Specifically, FIG. 72 shows brainwave-controlled augmented reality eyewear comprising: a plurality of electromagnetic energy sensors (including 72003, 72004, 72006, and 72008) which are configured to collect data concerning the electromagnetic activity of a person's brain; a lens (72001) which transmits light from the environment to the person's eye; a light projector (72002) which projects light toward (or into) the lens in order to create the image of a virtual object in the person's field of vision; an eyewear frame (72007) which is configured to hold the sensors and the lens on (or near) the person's head; and a data processor (72005) which analyzes data from the electromagnetic energy sensor. In an example, this eyewear can further comprise a camera and a local power source.

In this example, an eyewear frame encircles a person's head in a generally horizontal plane (when the person's head is upright) and bifurcates into upper and lower branches as it spans the person's face. One or more lenses are held between the upper and lower branches. In this example, the eyewear frame has a slight sinusoidal undulation as it encircles the person's head. In this example, a light projector is located adjacent to the perimeter of a lens. In this example, the light projector projects an image of virtual object toward (or into) the lens. The image of the virtual object is then reflected into the person's eye so that the person sees the virtual object in their field of vision. FIG. 72 shows only the left side of a person's head, but in an example, this eyewear can be laterally symmetric, having symmetric structure and components on the right side as well as the left side of the person's head. Example variations discussed elsewhere in this disclosure or in priority-linked disclosures are not repeated here to avoid redundancy, but can be applied where relevant to the example shown in these figures.

Figure 73:
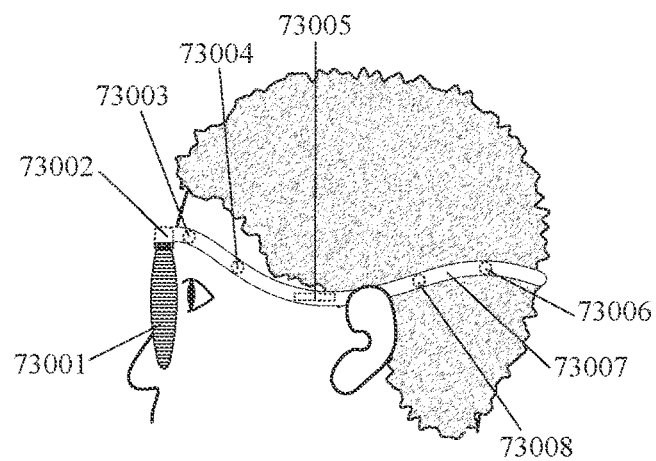
FIG. 73 shows brainwave-controlled augmented reality eyewear with EEG sensors, wherein an eyewear frame has a sinusoidal undulation.

FIG. 73 shows another example of brainwave-controlled augmented reality eyewear. This example comprises: a plurality of electromagnetic energy sensors which are configured to collect data concerning the electromagnetic activity of a person's brain; a lens which transmits light from the environment to the person's eye and/or displays a virtual object in the person's field of vision; an eyewear frame which is configured to hold the sensors and the lens on (or near) the person's head; and a data processor which analyzes data from the electromagnetic energy sensor.

In an example, the lens can further comprise (or be accompanied by) a light projector which projects light toward (or into) the lens in order to create the image of a virtual object in the person's field of vision. In an example, the lens can further comprise an array of light emitters and/or light channels which create the image of a virtual object in the person's field of vision. In an example, transmission of light from the environment to the person's eye and/or the display of the virtual object in the person's field of vision is automatically changed based on analysis of data from the electromagnetic energy sensor.

Specifically, FIG. 73 shows brainwave-controlled augmented reality eyewear comprising: a plurality of electromagnetic energy sensors (including 73003, 73004, 73006, and 73008) which are configured to collect data concerning the electromagnetic activity of a person's brain; a lens (73001) which transmits light from the environment to the person's eye; a light projector (73002) which projects light toward (or into) the lens in order to create the image of a virtual object in the person's field of vision; an eyewear frame (73007) which is configured to hold the sensors and the lens on (or near) the person's head; and a data processor (73005) which analyzes data from the electromagnetic energy sensor. In an example, this eyewear can further comprise a camera and a local power source.

In this example, an eyewear frame encircles a person's head in a generally horizontal plane (when the person's head is upright) and holds the upper perimeters of one (or two) lenses. In this example, the eyewear frame has a slight sinusoidal undulation as it encircles the person's head. In this example, a light projector is located next to the perimeter of a lens. In this example, the light projector projects an image of virtual object toward (or into) the lens. The image of the virtual object is then reflected into the person's eye so that the person sees the virtual object in their field of vision. FIG. 73 shows only the left side of a person's head, but in an example, this eyewear can be laterally symmetric, having symmetric structure and components on the right side as well as the left side of the person's head. Example variations discussed elsewhere in this disclosure or in priority-linked disclosures are not repeated here to avoid redundancy, but can be applied where relevant to the example shown in these figures.

Figure 74:
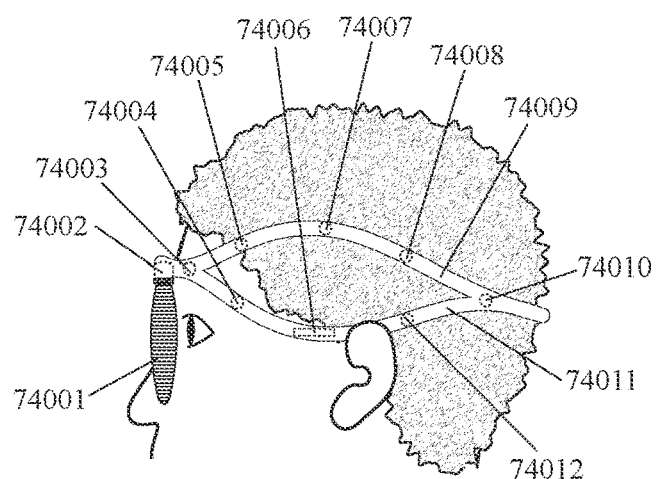
FIG. 74 shows brainwave-controlled augmented reality eyewear with EEG sensors, wherein an eyewear frame bifurcates into lower and upper branches as it spans the side of a person's head.

FIG. 74 shows another example of brainwave-controlled augmented reality eyewear. This example comprises: a plurality of electromagnetic energy sensors which are configured to collect data concerning the electromagnetic activity of a person's brain; a lens which transmits light from the environment to the person's eye and/or displays a virtual object in the person's field of vision; an eyewear frame which is configured to hold the sensors and the lens on (or near) the person's head; and a data processor which analyzes data from the electromagnetic energy sensor.

In an example, the lens can further comprise (or be accompanied by) a light projector which projects light toward (or into) the lens in order to create the image of a virtual object in the person's field of vision. In an example, the lens can further comprise an array of light emitters and/or light channels which create the image of a virtual object in the person's field of vision. In an example, transmission of light from the environment to the person's eye and/or the display of the virtual object in the person's field of vision is automatically changed based on analysis of data from the electromagnetic energy sensor.

Specifically, FIG. 74 shows brainwave-controlled augmented reality eyewear comprising: a plurality of electromagnetic energy sensors (including 74003, 74004, 74005, 74007, 74008, 74010, and 74012) which are configured to collect data concerning the electromagnetic activity of a person's brain; a lens (74001) which transmits light from the environment to the person's eye; a light projector (74002) which projects light toward (or into) the lens in order to create the image of a virtual object in the person's field of vision; an eyewear frame (74011) which is configured to hold the sensors and the lens on (or near) the person's head; and a data processor (74006) which analyzes data from the electromagnetic energy sensor. In an example, this eyewear can further comprise a camera and a local power source.

In this example, an eyewear frame encircles a person's head in a generally horizontal plane (when the person's head is upright) and bifurcates into a lower and upper branches as it spans the side of the person's head. In this example, the lower branch is shaped like an upward sinusoidal wave and the lower branch is shaped like a downward sinusoidal wave. In this example, a light projector is located next to the perimeter of a lens. In this example, the light projector projects an image of virtual object toward (or into) the lens. The image of the virtual object is then reflected into the person's eye so that the person sees the virtual object in their field of vision. FIG. 74 shows only the left side of a person's head, but in an example, this eyewear can be laterally symmetric, having symmetric structure and components on the right side as well as the left side of the person's head. Example variations discussed elsewhere in this disclosure or in priority-linked disclosures are not repeated here to avoid redundancy, but can be applied where relevant to the example shown in these figures.

Figure 75:
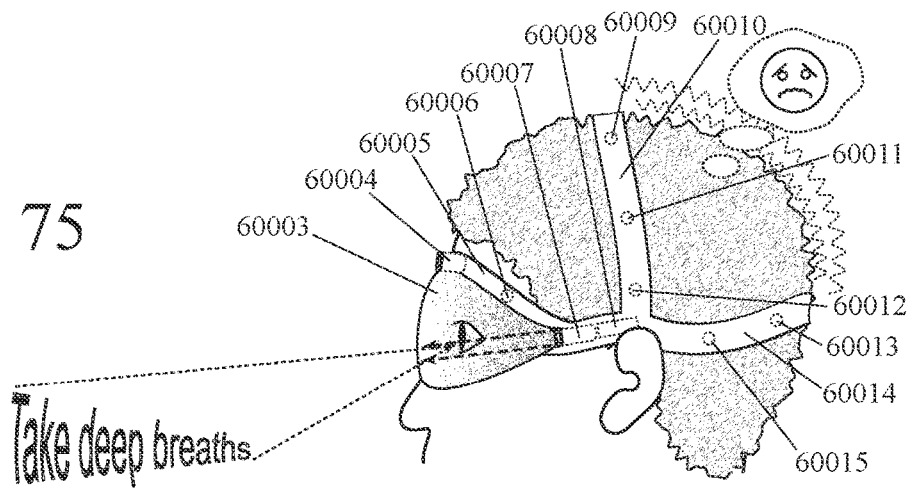
FIGS. 75 through 77 show how brainwave-controlled eyewear can display helpful virtual words (such as "Take deep breaths," "Eat slowly," or "Get some rest") in response to person's EEG data.
Figure 76:
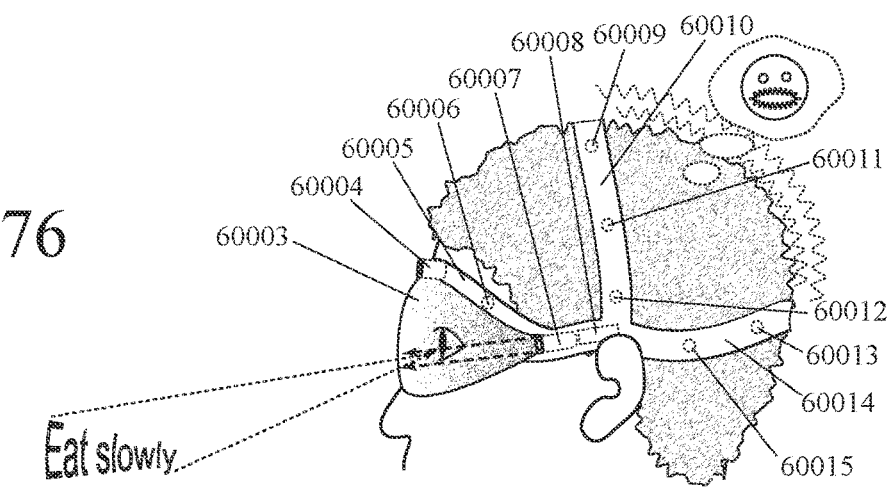
Figure 77:
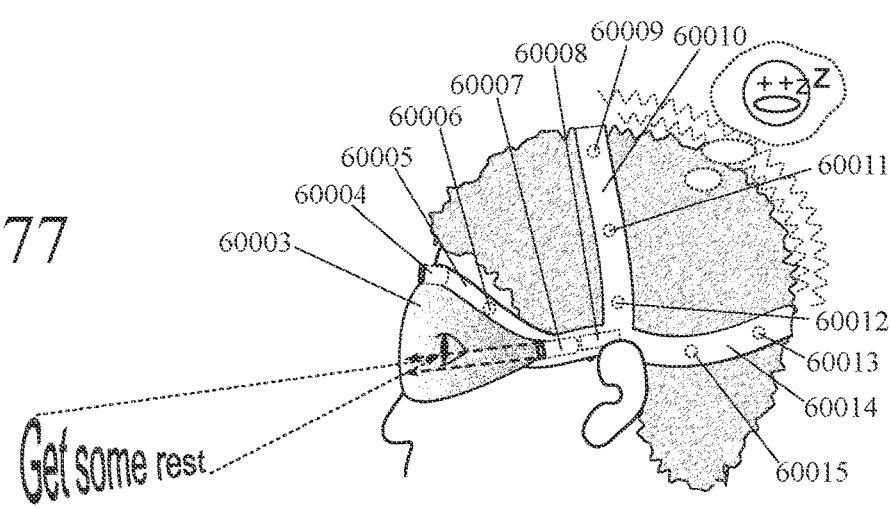

FIGS. 75 through 77 show additional examples of how the brainwave-controlled augmented reality eyewear introduced in FIGS. 60 through 62 can function. Concerning structure, this brainwave-controlled augmented reality eyewear comprises: a plurality of electromagnetic energy sensors (including 60006, 60009, 60011, 60012, 60013, and 60015) which collect data concerning the electromagnetic activity of a person's brain; a lens (60003) which transmits light from the environment (including tree 60001) to the person's eye; a light projector (60007) which projects an image of a virtual object (virtual sun 60002) into the person's field of vision; an eyewear frame (including portions 60005, 60010, and 60014) which holds the electromagnetic energy sensors, the lens, and the light projector on (or near) the person's head; and a data processor (60008) which analyzes data from the electromagnetic energy sensor. This example also includes camera 60004. In an example, this eyewear can further comprise a local power source such as a battery. Example variations discussed elsewhere in this disclosure or in priority-linked disclosures are not repeated here to avoid redundancy, but can be applied where relevant to the example shown in these figures.

FIGS. 75 through 77 show examples of how this brainwave-controlled eyewear can help a person by displaying selected virtual words (e.g. advice) in the person's field of vision in response to detection of selected patterns of electromagnetic energy from the person's brain. In FIG. 75, the person is feeling stressed. The person's stressful state is detected by the eyewear via analysis of data from the electromagnetic energy sensors. The person's stressful state is symbolically represented in the figure by a worried face in a "thought balloon" near the person's head. In response to this stressful state, the eyewear displays the helpful virtual words "Take deep breaths" in the person's field of vision so that the person will relax.

In FIG. 76, the person is feeling hungry. The person's hungry state is detected by the eyewear via analysis of data from the electromagnetic energy sensors. The person's hungry state is symbolically represented in the figure by a toothy face in a "thought balloon" near the person's head. In response to this hungry state, the eyewear displays the helpful virtual words "Eat slowly" in the person's field of vision so that the person will not overeat by eating too quickly. In FIG. 77, the person is feeling tired. The person's tired state is detected by the eyewear via analysis of data from the electromagnetic energy sensors. The person's tired state is symbolically represented in the figure by a sleepy face in a "thought balloon" near the person's head. In response to this tired state, the eyewear displays the helpful virtual words "Get some rest" in the person's field of vision so that the person will get some needed rest.

FIGS. 78 through 85 show examples of how augmented reality eyewear can comprise a plurality of reflective moving louvers. Before discussing these figures specifically, however, this disclosure provides a section with an overview of key design concepts and variations for such eyewear. The key design concepts and variations discussed in this introductory section can be applied, where appropriate, to the specific examples shown in figures or to examples in priority-linked disclosures. Providing these key concepts and variations once in a single introductory section helps to avoid the redundancy which would occur if these key concepts and variations were repeated in the narrative sections accompanying each of the figures.

In an example, augmented reality eyewear can have a plurality of reflective moving louvers comprising: (a) a distal transparent structure which is configured to be worn within 6" of a person's eye, wherein distal means farther from the person's eye and proximal means closer to the person's eye; (b) a proximal transparent structure which is proximal relative to the distal transparent structure; (c) a light emitter which is proximal relative to the proximal transparent structure; and (d) a plurality of reflective moving louvers between the distal transparent structure and the proximal transparent structure, wherein the plurality of reflective moving louvers are moved from a first configuration to a second configuration, wherein the plurality of reflective moving louvers allow a first amount of light from the environment entering the distal transparent structure to reach the person's eye in the first configuration, wherein the plurality of reflective moving louvers allow a second amount of light from the environment entering the distal transparent structure to reach the person's eye in the second configuration, wherein the second amount is less than 80% of the first amount, and wherein the plurality of reflective moving louvers reflect light from the light emitter toward the person's eye in the second configuration.

In an example, augmented reality eyewear can have a plurality of reflective moving louvers comprising: (a) a distal transparent layer which is configured to be worn within 6" of a person's eye, wherein distal means farther from the person's eye and proximal means closer to the person's eye; (b) a proximal transparent layer which is proximal relative to the distal transparent layer; (c) a light emitter which is proximal relative to the proximal transparent structure; and (d) a plurality of reflective moving louvers between the distal transparent layer and the proximal transparent layer, wherein the plurality of reflective moving louvers are moved from a first configuration to a second configuration, wherein the plurality of reflective moving louvers allow a first amount of light from the environment entering the distal transparent layer to reach the person's eye in the first configuration, wherein the plurality of reflective moving louvers allow a second amount of light from the environment entering the distal transparent layer to reach the person's eye in the second configuration, wherein the second amount is less than 80% of the first amount, and wherein the plurality of reflective moving louvers reflect light from the light emitter toward the person's eye in the second configuration.

In an example, a distal transparent structure (or layer) and/or a proximal transparent structure (or layer) can be arcuate. In an example, a distal and/or proximal transparent structure can be concave. In an example, a distal and/or proximal transparent structure can be convex. In an example, a distal and/or proximal transparent structure can be shaped like a section of a sphere or ellipsoid. In an example, a distal and/or proximal transparent structure can have an aspherical shape. In an example, a distal and/or proximal transparent structure can have a conic-section shape. In an example, a distal and/or proximal transparent structure can comprise a lens. In an example, distal and proximal transparent structures can have the same shape. In an example, distal and proximal transparent structures can have different shapes.

In an example, there can be a gap between distal and proximal transparent structures. In an example, this gap can be less than 1". In an example, this gap can be less than ¼". In an example, there can be a gas in the gap between a distal transparent structure and a proximal transparent structure. In an example, there can be a liquid in the gap between a distal transparent structure and a proximal transparent structure. In an example, flat distal and proximal transparent structures can be parallel. In an example, arcuate distal and proximal transparent structures can be nested and/or concentric. In an example, a distal transparent structure can be a section of a first virtual sphere (or ellipsoid) with a first radial center and a proximal transparent structure can be a section of a second virtual sphere (or ellipsoid) with a second radial center. In an example the first radial center can be the same point as the second radial center.

In an example, distal and proximal transparent structures can be substantially equidistant. In an example, there can be a substantially uniform gap between distal and proximal transparent structures. In an example, a gap between distal and proximal transparent structures can be wider toward the lateral centers of the structures and narrower toward the lateral edges of the structures. In an example, a gap between distal and proximal transparent structures can be wider toward the center of a person's field of vision and narrower toward the periphery of the person's field of vision. In an example, a gap between distal and proximal transparent structures can be narrower toward the lateral centers of the structures and wider toward the lateral edges of the structures. In an example, a gap between distal and proximal transparent structures can be narrower toward the center of a person's field of vision and wider toward the periphery of the person's field of vision.

In an example, a distal and/or proximal transparent structure (or layer) can have a refractive index between 1.4 and 1.8. In an example, a distal and/or proximal transparent structure can transmit at least 90% of incident light from a person's environment. In an example, a distal and/or proximal transparent structure can transmit at least 75% of incident light from a person's environment. In an example, a distal and/or proximal transparent structure can transmit at least a selected percentage of incident light, wherein this percentage is selected from the group consisting of: 95%, 90%, 75%, and 50%. In an example, a distal and/or proximal transparent structure can span at least 50% of the field of vision from a person's eye. In an example, a distal and/or proximal transparent structure can span at least 75% of the field of vision from a person's eye.

In an example, a distal transparent structure (or layer) can be configured to be worn within 4" of a person's eye. In an example, a distal transparent structure can be configured to be worn within 2" of a person's eye. In an example, a distal and/or proximal transparent structure can be held in place by an eyewear frame. In an example, augmented reality eyewear can be embodied in eyewear selected from the group consisting of: eyeglasses, goggles, headset, visor, and near-eye display. In an example, augmented reality can span just one eye. In an example, augmented reality eyewear can comprise a single set of distal and proximal transparent structures (or layers) in front of only one eye. In an example, augmented reality can span both eyes. In an example, augmented reality eyewear can comprise two separate sets of distal and proximal transparent structures (or layers), one set for each eye. In an example, augmented reality eyewear can comprise a single set of distal and proximal transparent structures (or layers) which spans both of a person's eyes.

In an example, a distal transparent structure (or layer) and/or a proximal transparent structure (or layer) can be made from one or more materials selected from the group consisting of: polycarbonate, CR-39, Trivex®, ethylene tetrafluoroethylene, ethylene-vinyl acetate, glass, high-index plastic. In an example, a distal transparent structure (or layer) and/or a proximal transparent structure (or layer) can be made from one or more materials selected from the group consisting of: polyacrylate, polyethylene terephthalate, polypropylene oxide, polyurethane, polyvinyl alcohol, polyvinyl butyral, carbon nanotubes, photo-chromatic (photochromic) material, silicon oxide, and thermal/UV cured plastic.

In an example, some or all of a distal and/or proximal transparent structure can be electroconductive. In an example, a distal and/or proximal transparent structure can comprise a relatively non-conductive material and a plurality of electroconductive channels, pathways, strips, and/or wires. In an example, a distal and/or proximal transparent structure can comprise a relatively non-conductive material and a plurality of transparent electroconductive liquid channels. In an example, a distal and/or proximal transparent structure can further comprise an array or grid of electroconductive channels, pathways, strips, and/or wires. In an example, electroconductive channels, pathways, or strips can be 3D printed on a distal and/or proximal transparent structure.

In an example, a distal transparent structure can be moved relative to a proximal transparent structure, or vice versa. In an example, augmented reality eyewear can further comprise one or more actuators which move a distal transparent structure relative to a proximal transparent structure, or vice versa. In an example, one or more actuators can be electromagnetic actuators or motors. In an example, one or more actuators can be MEMS actuators. In an example, a distal and/or proximal transparent structure can be moved by changes in an electromagnetic field. In an example, a distal and/or proximal transparent structure can be moved by a hydraulic or pneumatic mechanism. In an example, a distal and/or proximal transparent structure can be moved in an oscillating manner.

In an example, a distal transparent structure can be moved laterally (e.g. in a plane which is perpendicular to an eye's central line of sight) relative to a proximal transparent structure, or vice versa. In an example, a distal transparent structure can be moved in a proximal-to-distal or distal-to-proximal manner (e.g. changing the width of the gap between the transparent structures) relative to a proximal transparent structure, or vice versa. In an example, a distal transparent structure can be rotated around a central axis (e.g. parallel to an eye's central line of sight) relative to a proximal transparent structure, or vice versa. In an example, an arcuate distal transparent structure can be rotated around its radial center (e.g. in a virtual location which is not on the structure) relative to a proximal transparent structure, or vice versa. In an example, a distal transparent structure can be tilted relative to a proximal transparent structure, or vice versa.

In an example, a distal transparent structure and/or a proximal transparent structure can be reversibly and repeatedly moved. In an example, a distal transparent structure can move laterally, back and forth, relative to a proximal transparent structure, or vice versa. In an example, a distal transparent structure can rotate, back and forth, relative to a proximal transparent structure, or vice versa. In an example, a distal transparent structure can oscillate, back and forth, relative to a proximal transparent structure, or vice versa.

In an example, a plurality of reflective moving louvers can be attached to a distal transparent structure, attached to a proximal transparent structure, or attached to both structures. In an example, movement of a distal transparent structure relative to a proximal transparent structure, or vice versa, can move the reflective moving louvers. In an example, a reflective moving louver can be attached to a distal transparent structure and to a proximal transparent structure, wherein movement of the distal transparent structure and/or the proximal transparent structure moves the reflective moving louver. In an example, a reflective moving louver can be attached to a distal transparent structure and to a proximal transparent structure, wherein movement of the distal transparent structure and/or the proximal transparent structure changes the angle, orientation, and/or alignment of the reflective moving louver.

In an example, a reflective moving louver can be attached to a distal transparent structure and to a proximal transparent structure, wherein movement of the distal transparent structure and/or the proximal transparent structure changes the reflective moving louver from a first configuration to a second configuration. In an example, all reflective moving louvers in a plurality of reflective moving louvers can be attached to a distal transparent structure and to a proximal transparent structure, wherein movement of a distal transparent structure and/or a proximal transparent structure changes all of the louvers from first to second configurations. In an example, all reflective moving louvers in a plurality of reflective moving louvers can be attached to a distal transparent structure and a proximal transparent structure, wherein movement of a distal transparent structure and/or a proximal transparent structure changes the relative angles, orientations, and/or alignments of the reflective moving louvers.

In an example, a distal structure central plane can be defined as the flat plane which most closely fits a distal transparent structure. If the distal transparent structure is flat, then it is co-planar with the distal structure central plane. If the distal transparent structure is not flat, then the distal structure central plane can be found by minimizing the sum of the absolute values of deviations in three-dimensional space from the plane to the distal transparent structure. In an example, a proximal structure central plane can be defined as the flat plane which most closely fits a proximal transparent structure. If the proximal transparent structure is flat, then it is co-planar with the proximal structure central plane. If the proximal transparent structure is not flat, then the proximal structure central plane can be found by minimizing the sum of the absolute values of deviations in three-dimensional space from the plane to the proximal transparent structure.

In an example, a distal transparent structure can be moved laterally relative to a proximal transparent structure, or vice versa. In an example, lateral movement can be movement in a plane which is substantially parallel to the distal structure central plane. In an example, lateral movement can be movement in a plane which is substantially perpendicular to the central line of sight of an eye. In an example, lateral movement of a distal transparent structure relative to a proximal transparent structure, or vice versa, can change the angles, orientations, and/or alignments of reflective moving louvers with respect to the distal structure central plane and/or the proximal structure central plane.

In an example, a reflective moving louver can have a first angle, orientation, and/or alignment with respect to the distal structure central plane and/or the proximal structure central plane in the louver's first configuration. In an example, this reflective moving louver can have a second angle, orientation, and/or alignment with respect to the distal structure central plane and/or the proximal structure central plane in the louver's second configuration. In an example, the first angle, orientation, and/or alignment can be different than the second angle, orientation, and/or alignment. In an example, a first angle can differ from a second angle by at least 20 degrees. In an example, a first angle can differ from a second angle by at least 45 degrees. In an example, the differences between first and second angles (in first and second configurations) can be different for louvers in the center of an eye's field of vision versus louvers in the periphery of the eye's field of vision.

In an example, lateral movement of a distal transparent structure relative to a proximal transparent structure, or vice versa, can change reflective moving louvers from first to second configurations. In an example, this movement can change a person's view from seeing just the real world to seeing just virtual objects (e.g. virtual reality). In an example, this movement can change a person's view from seeing just the real world to seeing a mixture of real and virtual objects (e.g. augmented reality). In an example, rapid changes back and forth from first to second configurations can cause a person to see a mixture of real and virtual objects (e.g. augmented reality).

In an example, a distal transparent structure can be moved in a proximal-to-distal or distal-to-proximal manner relative to a proximal transparent structure. In an example, this movement can be substantially perpendicular to the distal structure central plane. In an example, a proximal transparent structure can be moved in a proximal-to-distal or distal-to-proximal manner relative to a distal transparent structure. In an example, this movement can be substantially perpendicular to the proximal structure central plane. In an example, proximal-to-distal or distal-to-proximal movement of a distal and/or proximal transparent structure can change the width of a gap between distal and proximal transparent structures. In an example, this can change a person's view from seeing just the real world to seeing just virtual objects (e.g. virtual reality) or to seeing a mixture of real and virtual objects (e.g. augmented reality).

In an example, a distal transparent structure can be tilted relative to a proximal transparent structure, or vice versa. In an example, tilting a distal transparent structure relative to a proximal transparent structure, or vice versa, can change the angles, orientations, or alignments of reflective moving louvers with respect to the distal structure central plane and/or the proximal structure central plane. In an example, tilting a distal transparent structure relative to a proximal transparent structure, or vice versa, can change reflective moving louvers from first configurations to second configurations. In an example, this can change a person's view from seeing just the real world to seeing just virtual objects (e.g. virtual reality) or to seeing a mixture of real and virtual objects (e.g. augmented reality).

In an example, a distal transparent structure can be rotated relative to a proximal transparent structure, or vice versa. In an example, rotation can be around a central axis which is substantially parallel to the central line of sight of an eye. In an example, rotation can be around a virtual point which is the radial center of an arcuate distal transparent structure and/or proximal transparent structure. In an example, rotational movement of a distal transparent structure relative to a proximal transparent structure, or vice versa, can change reflective moving louvers from first configurations to second configurations. In an example, this can change a person's view from seeing just the real world to seeing just virtual objects (e.g. virtual reality) or to seeing a mixture of real and virtual objects (e.g. augmented reality).

In an example, movement of a distal transparent structure relative to a proximal transparent structure, or vice versa, changes the angles, orientations, or alignments of reflective moving louvers located between these structures, thereby changing a person's view from seeing the real world to seeing virtual objects (e.g. virtual reality) or to seeing a mixture of the real world and virtual objects (e.g. augmented reality). In an example, a distal transparent structure can be repeatedly and reversibly moved relative to a proximal transparent structure, or vice versa, to move a plurality of reflective moving louvers located between them, thereby changing a person's view back and forth (in a rapid sequence) from seeing just the real world to seeing virtual objects (in addition to the real world). In an example, a distal transparent structure can oscillate relative to a proximal transparent structure, or vice versa, thereby moving a plurality of reflective moving louvers located between them, thereby changing a person's view back and forth (in a rapid sequence) from seeing just the real world to seeing virtual objects (in addition to the real world).

In an example, some or all of a distal transparent structure and/or a proximal transparent structure can be electroconductive. In an example, eyewear can further comprise one or more electromagnetic energy emitters which emit electromagnetic energy into electroconductive portions of a distal transparent structure and/or a proximal transparent structure. In an example, transmission of electromagnetic energy through a portion of a distal transparent structure moves a plurality of reflective moving louvers which are located between the distal transparent structure and a proximal transparent structure. In an example, transmission of electromagnetic energy through portion of a proximal transparent structure moves a plurality of reflective moving louvers which are located between the proximal transparent structure and a distal transparent structure. In an example, transmission of electromagnetic energy from a distal transparent structure to a proximal transparent structure moves a plurality of reflective moving louvers which are located between the distal transparent structure and a proximal transparent structure.

In an example, transmission of electromagnetic energy through a distal transparent structure and/or a proximal transparent structure creates an electromagnetic field between these structures. In an example, this electromagnetic field can interact with a plurality of reflective moving louvers to change the angles, orientations, alignments, shapes, and/or sizes of these louvers. In an example, changes in this electromagnetic field change the angles, orientations, alignments, shapes, and/or sizes of reflective moving louvers between the distal and proximal transparent structures. In an example, changes in this electromagnetic field can change a plurality of reflective moving louvers from a first configuration to a second configuration.

In an example, transmission of electromagnetic energy through a distal transparent structure can create an electromagnetic field between the distal transparent structure and a proximal transparent structure which, in turn, moves a plurality of reflective moving louvers from a first configuration to a second configuration. In an example, transmission of electromagnetic energy through a proximal transparent structure can create an electromagnetic field between the proximal transparent structure and a distal transparent structure which, in turn, moves a plurality of reflective moving louvers from a first configuration to a second configuration. In an example, transmission of electromagnetic energy from a distal transparent structure to a proximal transparent structure moves a plurality of reflective moving louvers from a first configuration to a second configuration.

In an example, transmission of electromagnetic energy through a portion of a distal transparent structure and/or proximal transparent structure can change the angles, orientations, alignments, shapes, and/or sizes of a portion of a plurality of reflective moving louvers. In an example, transmission of electromagnetic energy through a selected area of a distal transparent structure and/or a proximal transparent structure can change the angles, orientations, alignments, shapes, and/or sizes of louvers in a selected area. In an example, transmission of electromagnetic energy through a selected subset of electroconductive pathways in a distal transparent structure and/or a proximal transparent structure can change the angles, orientations, alignments, shapes, and/or sizes of a selected subset of louvers in a plurality of reflective moving louvers.

In an example, transmission of alternating-current through a distal transparent structure and/or a proximal transparent structure can cause oscillating movement of a plurality of reflective moving louvers which are located between the distal transparent structure and the proximal transparent structure. In an example, transmission of alternating-current through a distal transparent structure and/or a proximal transparent structure can cause a plurality of reflective moving louvers which are located between the distal transparent structure and the proximal transparent structure to oscillate between first and second configurations.

In an example, transmission of electromagnetic energy pulses through a distal transparent structure and/or a proximal transparent structure can cause oscillating movement of a plurality of reflective moving louvers which are located between the distal transparent structure and the proximal transparent structure. In an example, transmission of electromagnetic energy pulses through a distal transparent structure and/or a proximal transparent structure can cause a plurality of reflective moving louvers which are located between the distal transparent structure and the proximal transparent structure to oscillate between first and second configurations.

In an example, a light emitter can be a light projector, image projector, or image display which displays images of virtual objects into a person's field of vision. In an example, a virtual object can comprise an object image which is generated by a computer. A virtual object can be a computer-generated image which is not visible (in a screen-independent environmental context) with the naked eye, but does appear (in a screen-independent environmental context) to a person who is wearing augmented reality eyewear. In an example, a virtual object can be linked conceptually to an environmental object. In an example, a virtual object can comprise words, symbols, or graphics which convey information about an environmental object.

In an example, a light emitter can be selected from the group consisting of: active-matrix organic light-emitting diode array, projector, or display; collimated light projector or display; digital micro-mirror array, projector, or display; diode laser array, projector, or display; ferroelectric liquid crystal on silicon array, projector, or display; holographic projector or display. In an example, a light emitter can be selected from the group consisting of: light emitting diode array, projector, or display; liquid crystal display array, projector, or display; liquid crystal on silicon array, projector, or display; low-power (e.g. nano-watt) laser projector or display; and microdisplay and/or microprojector.

In an example, a virtual object can be perceptually linked in physical location and/or position relative to a real environmental object in a person's field of vision. In an example, a virtual object can appear to be connected to an environmental object. A virtual object can appear to a viewer as being consistently on top of, adjacent to, or beneath an environmental object. In an example, a virtual object can be super-imposed over (i.e. shown in front of and/or occluding) an environmental object or sub-imposed under (i.e. shown behind and/or occluded by) an environmental object in a person's field of vision. In an example, a virtual object can appear to be moving with an environmental object when the environmental object moves. In an example, both a virtual object and an environmental object can appear to move together, relative to a person's field of vision, when the person moves their head.

In an example, the appearance of a virtual object can be changed to simulate its physical interaction with a physical environmental object. In an example, a virtual object can appear to be obscured by a physical object when the two objects meet. In an example, a virtual object can appear to come out of (or go into) a physical object. In an example, a virtual object can function as a virtual mouse and/or cursor to enable a person to interact with their environment in augmented reality. In an example, a person can select an environmental object by moving a virtual object (e.g. virtual mouse, cursor, or pointer) to the environmental object. In an example, a person can purchase an environmental object by moving a virtual object (e.g. virtual mouse, cursor, or pointer) to the environmental object.

In an example, a light emitter can be selected from the group consisting of: organic light emitting diode array, projector, or display; picodisplay and/or picoprojector; spatial light modulator projector or display; super luminescent diode array, projector, or display; and transmissive liquid crystal array, projector, or display. In an example, a light emitter can be located to the right or to the left of a person's eye. In an example, a light emitter can be incorporated into the side piece (e.g. "ear piece") or nose bridge of an eyewear frame. In an example, a light emitter can be located laterally below or above a person's eye. In example, one or more light emitters can be incorporated into the frontpiece of an eyewear frame. In an example, augmented reality eyewear can comprise one light emitter per eye. In an example, augmented reality eyewear can comprise two light emitters per eye. In an example, a light emitter can project an image away from a person's eye (toward a proximal transparent structure and toward a plurality of reflective moving louvers), but this image can be reflected back towards the person's eye by a plurality of reflective moving louvers when they are in a second configuration.

In an example, augmented reality eyewear can comprise two light emitters per eye. In an example, augmented reality eyewear can comprise a first light emitter which is configured to be located to the right of an eye and a second light emitter which is configured to be located to the left of the eye. In an example, augmented reality eyewear can comprise a first light emitter which is configured to be located laterally below an eye and a second light emitter which is configured to be located laterally above the eye. In an example, augmented reality eyewear can comprise four light emitters: a first emitter to the right of an eye; a second emitter to the left of the eye; a third emitter located laterally below the eye; and a fourth emitter located laterally above the eye. In an example, a first light emitter can emit light toward a first subset of a plurality of reflective moving louvers and a second light emitter can emit light toward a second subset of a plurality of reflective moving louvers. In an example, a first light emitter can display virtual objects in a first portion of a person's field of vision and a second light emitter can display virtual objects in a second portion of the field of vision of an eye.

In an example, a first light emitter can emit light toward the right half of a plurality of reflective moving louvers and a second light emitter can emit light toward the left half of a plurality of reflective moving louvers. In an example, a first light emitter can display virtual objects in a right side of a the field of vision of an eye and a second light emitter can display virtual objects in the left side of the field of vision of the eye. In an example, a right-side light emitter can display images onto the right side of a plurality of reflective moving louvers and a left-side light emitter can display images onto the left side of the plurality of reflective moving louvers. In an example, a right-side light emitter can display images onto the left side of a plurality of reflective moving louvers and a left-side light emitter can display images onto the right side of the plurality of reflective moving louvers. In an example, a first light emitter can emit light toward the top half of a plurality of reflective moving louvers and a second light emitter can emit light toward the bottom half of a plurality of reflective moving louvers. In an example, a first light emitter can display virtual objects on the top half of the field of vision of an eye and a second light emitter can display virtual objects on the bottom half of the field of vision of an eye.

In an example, a light emitter may display virtual images only when a plurality of reflective moving louvers are in a second configuration, wherein these louvers are oriented so as to reflect these virtual images toward a person's eye. In an example, a light emitter may display virtual images all the time, even though these images are only reflected toward a person's eye when a plurality of reflective moving louvers are in a second configuration. In an example, a first light emitter and a second light emitter may display virtual images in an alternating sequence, in synchronization with changing angles, orientations, and/or alignments of a plurality of reflective moving louvers.

In an example, a first light emitter and a second light emitter can both display images of virtual objects toward all louvers in a plurality of reflective moving louvers. In an example, a first light emitter and a second light emitter can display images of virtual objects onto different subsets of louvers in a plurality of reflective moving louvers. In an example, a first light emitter can display images of virtual objects onto the right half of a plurality of reflective moving louvers and a second light emitter can display images of virtual objects onto the left half of a plurality of reflective moving louvers. In an example, a first light emitter can display images of virtual objects onto a first radial segment (or slice) of a plurality of reflective moving louvers and a second light emitter can display images of virtual objects onto a second radial segment (or slice) of a plurality of reflective moving louvers.

In an example, a first light emitter and a second light emitter can both display images of virtual objects at the same time. In an example, a first light emitter and a second light emitter can display images of virtual objects at different times. In an example, a first light emitter and a second light emitter can display images of virtual objects in an alternating sequence. In an example, a first light emitter and a second light emitter can display images of virtual objects in (first, second, first, second . . . ) alternating sequence.

In an example, augmented reality eyewear can further comprise one or more additional optical elements between one or more light emitters and a plurality of reflective moving louvers. In an example, one or more additional optical elements between a light emitter and moving louvers can be selected from the group consisting of: mirror, lens, light modulator, partially-reflecting lens, concave lens, convex lens, Fresnel lens, optoelectric lens, collimator, variable focus lens, beam splitter, diffraction grating, polarization grating, micro-lens array, micro-mirror array, micro-prism array, and reflective liquid crystal array.

In an example, augmented reality eyewear can comprise a plurality of reflective moving louvers between a distal transparent structure and a proximal transparent structure. In an example, these louvers are moved from a first configuration to a second configuration. In an example, these louvers are reversibly and repeatedly moved from a first configuration to a second configuration. In an example, these louvers oscillate between a first configuration to a second configuration. In an example, these louvers can have different angles, orientations, alignments, shapes, and/or sizes in a first configuration vs. a second configuration. In an example, a plurality of reflective moving louvers have first angles, orientations, alignments, shapes, and/or sizes in a first configuration and have second angles, orientations, alignments, shapes, and/or sizes in a second configuration.

In an example, a louver can have a first angle with respect to an eye pupil's line of sight in a first configuration and a second angle with respect to the eye pupil's line of sight in a second configuration, wherein the second angle is larger than the first angle. In an example, a louver can have a first orientation with respect to an eye pupil's line of sight in a first configuration and a second orientation with respect to the eye pupil's line of sight in a second configuration, wherein the first orientation is more aligned with the eye pupil's line of sight than the second orientation. In an example, a louver can have a first shape in a first configuration and a second shape in a second configuration, wherein the first shape is flatter than the second shape. In an example, a louver can have a first size in a first configuration and a second size in a second configuration, wherein the first size is smaller than the second size.

In an example, when a plurality of reflective moving louvers are in a first configuration, they allow light rays from environmental objects to pass in a substantially-uninterrupted manner through augmented reality eyewear into a person's eye. In an example, when a plurality of reflective moving louvers are in a first configuration, they allow a high percentage of light rays from environmental objects to pass through gaps between the louvers into a person's eye. In an example, when a plurality of reflective moving louvers are in a first configuration, they allow a first amount of light from the environment entering the distal transparent structure to reach a person's eye. In an example, when these louvers are in a second configuration, they allow a second amount of light from the environment entering the distal transparent structure to reach the person's eye, wherein the second amount is less than the first amount. In an example, the second amount is less than 80% of the first amount. In an example, the second amount is less than 70% of the first amount. In an example, the second amount is less than 50% of the first amount. In an example, the second amount is less than 10% of the first amount.

In an example, when a plurality of reflective moving louvers are in a second configuration, they reflect light from a light emitter (such as a virtual image projector) toward a person's eye. In an example, when a plurality of reflective moving louvers are in a second configuration, they reflect light rays from a light emitter (such as a virtual image projector) so that these light rays converge on a person's eye. In an example, when a plurality of reflective moving louvers are in a second configuration, they reflect images of virtual objects projected by a light emitter (e.g. a virtual object projector or display) toward a person's eye. In an example, when a plurality of reflective moving louvers are in a second configuration, their distal surfaces of these louvers substantially block light rays from environmental objects from passing through the augmented reality eyewear to a person's eye and the proximal surfaces of these louvers substantially reflect light rays from a light emitter toward the person's eye.

In an example, when a louver is in a second configuration, selected light rays from a light emitter are reflected toward a person's eye by this louver along a vector which is a virtual continuation of the vector of environmental light rays which are blocked by that louver. In this manner, selected light rays from the light emitter replace selected light rays from an environmental object in the person's field of vision and a virtual object can be perceived by the person as replacing a real-world object in this portion of the person's field of vision.

In an example, a reflective moving louver can be substantially flat in a first configuration. In an example, a reflective moving louver can be aligned with a selected flat plane in a first configuration. In an example, this selected flat plane can be parallel to light rays passing by this louver toward a person's eye. In an example, a plurality of such planes, each associated with a louver in a plurality of louvers, can be substantially aligned with a plurality of light vectors from a person's environment which converge onto an eye pupil. In this manner, almost all of the light rays traveling along these light vectors can pass, unhindered, through gaps between the louvers when the plurality of reflective moving louvers are in a first configuration. In an example, a plurality of these planes, each associated with a louver in a plurality of louvers, can be substantially perpendicular to the surface of a distal transparent structure and/or a proximal transparent structure when the louvers are in a first configuration.

In an example, reflective moving louvers in a plurality of reflective moving louvers in a first configuration can be substantially perpendicular to the distal surface of a distal transparent structure. In an example, reflective moving louvers in a plurality of reflective moving louvers in a first configuration can be substantially perpendicular to the proximal surface of a proximal transparent structure. In an example, reflective moving louvers in a plurality of reflective moving louvers in a first configuration can be substantially parallel to each other. In an example, reflective moving louvers in a plurality of reflective moving louvers in a first configuration can be substantially parallel to light vectors which extend radial outward from an eye pupil or retina. In an example, reflective moving louvers in a plurality of reflective moving louvers in a first configuration can be substantially parallel to light vectors from environmental objects which radially converge onto an eye pupil or retina.

In an example, reflective moving louvers in a plurality of reflective moving louvers in a second configuration are not perpendicular to the distal surface of a distal transparent structure. In an example, reflective moving louvers in a plurality of reflective moving louvers in a second configuration are not perpendicular to the proximal surface of a proximal transparent structure. In an example, reflective moving louvers in a plurality of reflective moving louvers in a second configuration are not parallel to light vectors which extend radial outward from an eye pupil. In an example, reflective moving louvers in a plurality of reflective moving louvers in a second configuration are not parallel to light vectors from environmental objects which converge onto an eye pupil.

In an example, reflective moving louvers in a plurality of reflective moving louvers in a second configuration can be substantially parallel to the distal surface of a distal transparent structure. In an example, reflective moving louvers in a plurality of reflective moving louvers in a second configuration can be substantially parallel to the proximal surface of a proximal transparent structure. In an example, reflective moving louvers in a plurality of reflective moving louvers in a second configuration can be substantially perpendicular to light vectors which extend radial outward from an eye pupil. In an example, reflective moving louvers in a plurality of reflective moving louvers in a second configuration can be substantially perpendicular to light vectors from environmental objects which converge onto an eye pupil.

In an example, louvers in a plurality of reflective moving louvers in a second configuration can form acute angles relative to the distal surface of a distal transparent structure. In an example, louvers in a plurality of reflective moving louvers in a second configuration can form acute angles relative to the proximal surface of a proximal transparent structure. In an example, louvers in a plurality of reflective moving louvers in a second configuration can form acute angles relative to light vectors which extend radial outward from an eye pupil. In an example, louvers in a plurality of reflective moving louvers in a second configuration can form acute angles relative to light vectors from environmental objects which converge onto an eye pupil.

In an example, reflective moving louvers (or virtual extensions thereof in 3D space) can intersect the distal surface of a distal transparent structure at a first angle in a first configuration and at a second angle in a second configuration. In an example, the first and second angles can differ by 90 degrees. In an example, the first and second angles can differ by between 60 and 90 degrees. In an example, the first and second angles can differ by between 40 and 60 degrees. In an example, the first and second angles can differ by at least 20 degrees. In an example, reflective moving louvers (or virtual extensions thereof in 3D space) can intersect the proximal surface of a proximal transparent structure at a first angle in a first configuration and at a second angle in a second configuration. In an example, the first and second angles can differ by 90 degrees. In an example, the first and second angles can differ by between 60 and 90 degrees. In an example, the first and second angles can differ by between 40 and 60 degrees. In an example, the first and second angles can differ by at least 20 degrees.

In an example, a first plane can best fit a moving louver and a second plane can best fit a distal transparent structure. In an example, these first and second planes can be substantially perpendicular when the louver is in a first configuration and substantially parallel when the louver is in a second configuration. In an example, the first and second planes can intersect at a forward-facing angle between 0 and 10 degrees when the louver is in a first configuration and intersect at a forward-facing angle between 10 and 90 degrees when the louver is in a second configuration. In an example, the first and second planes can intersect at a forward-facing angle between 0 and 20 degrees when the louver is in a first configuration and intersect at a forward-facing angle between 20 and 90 degrees when the louver is in a second configuration.

In an example, a first plane can best fit a moving louver and a third plane can best fit a proximal transparent structure. In an example, the first and third planes can be substantially perpendicular when the moving louver is in a first configuration and substantially parallel with the moving louver is in its third configuration. In an example, the first and third planes can intersect at a forward-facing angle between 0 and 10 degrees when the moving louver is in a first configuration and intersect at a forward-facing angle between 10 and 90 degrees when the moving louver is in its third configuration. In an example, the first and third planes can intersect at a forward-facing angle between 0 and 20 degrees when the moving louver is in a first configuration and intersect at a forward-facing angle between 20 and 90 degrees when the moving louver is in its third configuration.

In an example, a plurality of reflective moving louvers between a distal transparent structure and a proximal transparent structure allow at least 60% of environmental light to pass hitting the distal transparent structure to pass through the proximal transparent structure when the plurality of reflective moving louvers are in a first configuration, but allow less than 40% of environmental light hitting the distal transparent structure to pass through the proximal transparent structure when the plurality of reflective moving louvers are in a second configuration. In an example, a plurality of reflective moving louvers between a distal transparent structure and a proximal transparent structure allow at least 70% of environmental light to pass hitting the distal transparent structure to pass through the proximal transparent structure when the plurality of reflective moving louvers are in a first configuration, but allow less than 30% of environmental light hitting the distal transparent structure to pass through the proximal transparent structure when the plurality of reflective moving louvers are in a second configuration. In an example, a plurality of reflective moving louvers between a distal transparent structure and a proximal transparent structure allow at least 80% of environmental light to pass hitting the distal transparent structure to pass through the proximal transparent structure when the plurality of reflective moving louvers are in a first configuration, but allow less than 20% of environmental light hitting the distal transparent structure to pass through the proximal transparent structure when the plurality of reflective moving louvers are in a second configuration.

In an example, a plurality of reflective moving louvers can be configured in a second configuration at different angles relative to a light emitter (e.g. virtual image projector) so that the louvers reflect light rays from the light emitter into light vectors which converge onto a person's eye pupil or retina. In an example, a louver can be configured in a second configuration so that it reflects light rays from a light emitter (e.g. virtual image projector) into light vectors which are aligned with the light vectors from the person's environment which pass near the louver in a first configuration.

In an example, a plurality of reflective moving louvers can be configured to allow a person to see environment objects directly when the louvers are in a first configuration and to see virtual objects only (or in combination with real world objects) when the louvers are in a second configuration. In an example, reflective moving louvers can transition from a first to the second configuration for an extended period of time. In an example, this eyewear can transition from a real-world view to a virtual view, or vice versa, for an extended period of time. In an example, an extended period of time can range from several minutes to several hours.

In an example, a plurality of reflective moving louvers can oscillate between first to second configurations multiple times per second. In an example, a plurality of reflective moving louvers can oscillate between first and second configurations at least 10 times per second. In an example, a plurality of reflective moving louvers can oscillate between first and second configurations at least 30 times per second. In an example, a plurality of reflective moving louvers can oscillate between first and second configurations at least 60 times per second.

In an example, this eyewear can transition repeatedly and rapidly (e.g. in sub-second transitions) from a real-world view to a virtual view. In an example, repeated and rapid switching back and forth between a real-world view and a virtual view can blend the person's perception of the real world and the virtual world. In an example, this eyewear can transition from seeing the real world only to seeing virtual objects for a period lasting minutes or even hours. In an example, this eyewear can transition repeatedly and rapidly (e.g. in sub-second transitions) from seeing the real-world only to seeing virtual objects. In an example, repeated and rapid switching back and forth between a real-world view and a virtual view can blend the person's perception of the real world and virtual objects into augmented reality.

In an example, a reflective moving louver can be attached to both a distal transparent structure and a proximal transparent structure. In an example, a distal side (or portion) of a reflective moving louver can be attached to a distal transparent structure and a proximal side (or portion) of a reflective moving louver can be attached to a proximal transparent structure. In an example, moving a distal transparent structure and/or moving a proximal transparent structure can move a reflective moving louver which is attached to both such structures. In an example, moving a distal transparent structure and/or moving a proximal transparent structure can move a reflective moving louver from a first configuration to a second configuration, or vice versa.

In an example, lateral movement (e.g. lateral shifting) of a distal transparent structure relative to a proximal transparent structure, or vice versa, can move a reflective moving louver which is attached to both of these structures. In an example, lateral movement of a distal transparent structure relative to a proximal transparent structure, or vice versa, can move a reflective moving louver from a first configuration to a second configuration, or vice versa. In an example, rotational movement of a distal transparent structure relative to a proximal transparent structure, or vice versa, can move a reflective moving louver which is attached to both of these structures. In an example, rotational movement of a distal transparent structure relative to a proximal transparent structure, or vice versa, can move a reflective moving louver from a first configuration to a second configuration, or vice versa.

In an example, proximal-to-distal (or vice versa) movement of a distal transparent structure relative to a proximal transparent structure, or vice versa, can move a reflective moving louver which is attached to both of these structures. In an example, proximal-to-distal (or vice versa) movement of a distal transparent structure relative to a proximal transparent structure, or vice versa, can move a reflective moving louver from a first configuration to a second configuration, or vice versa. In an example, tilting a distal transparent structure relative to a proximal transparent structure, or vice versa, can move a reflective moving louver which is attached to both of these structures. In an example, tilting a distal transparent structure relative to a proximal transparent structure, or vice versa, can move a reflective moving louver from a first configuration to a second configuration, or vice versa.

In an example, a reflective moving louver can be attached to a distal transparent structure or to a proximal transparent structure, but not to both. In an example, a distal side (or portion) of a reflective moving louver can be attached to a distal transparent structure or a proximal side (or portion) of a reflective moving louver can be attached to a proximal transparent structure, but not both. In an example, a reflective moving louver can be attached to a middle structure which is located between a distal transparent structure and a proximal transparent structure. In an example, a reflective moving louver can rotate around such a middle structure.

In an example, a reflective moving louver can move in response to changes in an electromagnetic field between a distal transparent structure and a proximal transparent structure. In an example, changes in an electromagnetic field between a distal transparent structure and a proximal transparent structure can cause a reflective moving louver to change from a first configuration to a second configuration. In an example, changes in an electromagnetic field can change the angle between a reflective moving louver and a distal transparent structure and/or a proximal transparent structure. In an example, this angle can be changed by changing the magnitude, direction, and/or polarity of the electromagnetic field. In an example, a reflective moving louver can rotate around such a middle structure in response to changes in an electromagnetic field between a distal transparent structure and a proximal transparent structure. In an example, changes in this electromagnetic field change the alignment direction or orientation of louvers. In an example, different louvers can have different orientations.

In an example, a reflective moving louver can move in response to transmission of electromagnetic energy through a distal transparent structure and/or through a proximal transparent structure. In an example, transmission of electromagnetic energy through a distal transparent structure and/or through a proximal transparent structure can cause a reflective moving louver to change from a first configuration to a second configuration. In an example, transmission of electromagnetic energy through a distal transparent structure and/or through a proximal transparent structure can change the angle between a reflective moving louver and a distal transparent structure and/or a proximal transparent structure. In an example, this angle can be changed by changing the magnitude, direction, and/or polarity of electromagnetic energy transmission.

In an example, a louver can be rigid. In an example, a louver can have the same size and shape in a second configuration as in a first configuration. In an example, a louver can be flexible, bendable, stretchable, and/or elastic. In an example, a louver can have a first size in a first configuration and a second size in a second configuration, wherein the second size is larger than the first size. In an example, a louver can have a first shape in a first configuration and a second shape in a second configuration, wherein the second shape is more arcuate (and/or less flat) than the first shape. In an example, a louver can be relatively flat in a first configuration and twisted in a second configuration.

In an example, a louver can have a quadrilateral shape in a first configuration. In an example, a louver can have a rectangular, square, parallelogram, rhombus, or trapezoid shape in a first configuration. In an example, a louver can comprise a strip, slot, band, or slit. In an example, a plurality of reflective moving louvers can be configured like a set of window ("venetian") blinds. In an example, a plurality of reflective moving louvers can be configured like a parallel set of window ("venetian") blinds. In an example, a plurality of reflective moving louvers can be configured like a set of non-parallel window blinds, forming different angles between adjacent blinds. In an example, a plurality of reflective moving louvers can have a configuration which is analogous to open window blinds in a first configuration and analogous to closed window blinds in a second configuration.

In an example, a plurality of reflective moving louvers can be connected to each other. In an example, the distal ends of a plurality of reflective moving louvers can be connected to each other. In an example, the proximal ends of a plurality of reflective moving louvers can be connected to each other. In an example, a plurality of reflective moving louvers can comprise a mesh or grid. In an example, a plurality of reflective moving louvers can comprise a polygonal mesh or grid. In an example, a plurality of reflective moving louvers can comprise an array of polygonal columns through which environmental light rays travel when the louvers are in a first configuration.

In an example, a plurality of reflective moving louvers can comprise a grid or mesh with square or rectangular openings. In an example, a plurality of reflective moving louvers can comprise an array of quadrilateral columns through which environmental light rays travel when the louvers are in a first configuration. In an example, a grid or mesh can have uniform size openings. In an example, openings can be smaller toward the center of an eye's field of vision and larger toward the periphery of the eye's field of vision. n an example, a plurality of reflective moving louvers can comprise a grid or mesh with hexagonal openings, like a honeycomb. In an example, a plurality of reflective moving louvers can comprise an array of hexagonal columns through which environmental light rays travel when the louvers are in a first configuration. In an example, a grid or mesh can have uniform size openings. In an example, openings can be smaller toward the center of an eye's field of vision and larger toward the periphery of the eye's field of vision.

In an example, a plurality of reflective moving louvers can be configured in substantially-parallel stripes or bands. In an example, adjacent pairs of louvers in a plurality of reflective moving louvers can be substantially equidistant from each other. In an example, adjacent pairs of louvers can be closer together toward the center of an eye's field of vision and farther apart toward the periphery of an eye's field of vision, or vice versa. In an example, a plurality of reflective moving louvers can be configured in a checkerboard grid. In an example, adjacent louvers in a checkerboard grid can be closer together toward the center of an eye's field of vision and farther apart toward the periphery of an eye's field of vision, or vice versa. In an example, a plurality of reflective moving louvers can be configured in a honeycomb grid. In an example, adjacent louvers in a honeycomb grid can be closer together toward the center of an eye's field of vision and farther apart toward the periphery of an eye's field of vision, or vice versa.

In an example, a plurality of reflective moving louvers can be configured in substantially-concentric and/or nested bands or rings. In an example, a plurality of reflective moving louvers can be configured in rings like a "target" pattern. In an example, adjacent pairs of bands or rings can be closer together toward the center of an eye's field of vision and farther apart toward the periphery of an eye's field of vision, or vice versa. In an example, a plurality of reflective moving louvers can be configured in radial spokes. In an example, adjacent pairs of radial spokes can be closer together toward the center of an eye's field of vision and farther apart toward the periphery of an eye's field of vision. In an example, a plurality of reflective moving louvers can be configured in a helical and/or spiral pattern. In an example, a reflective moving louver can have a conic section shape. In an example, a louver can have an undulating and/or sinusoidal shape. In an example, a louver can have a helical shape. In an example, a louver can have a toroidal shape.

In an example, there are can gaps between louvers in a plurality of reflective moving louvers, even in a second configuration. In an example, there are can gaps between louvers in a plurality of reflective moving louvers in a first configuration, but not in a second configuration. In an example, gaps between louvers can be larger when the louvers are in a first configuration and larger when the louvers are in a second configuration. In an example, louvers do not overlap in a first configuration, but do overlap in a second configuration.

In an example, there can be at least 10 louvers in a plurality of reflective louvers. In an example, there can be at least 100 louvers in a plurality of reflective louvers. In an example, there can be at least 1,000 louvers in a plurality of reflective louvers. In an example, there can be a single set (or layer) of louvers between a distal transparent structure and a proximal transparent structure. In an example, there can be a multiple (parallel) sets (or layers) of louvers between a distal transparent structure and a proximal transparent structure. In an example, there can be multiple louvers in a row or column of louvers. In an example, there can be multiple louvers in a ring or band of louvers.

In an example, all of the reflective moving louvers in a plurality of reflective moving louvers can be changed from a first configuration to a second configuration when a distal transparent structure is moved relative to a proximal transparent structure, or vice versa. In an example, all of the reflective moving louvers in a plurality of reflective moving louvers can be changed from a first configuration to a second configuration when an electromagnetic field between a distal transparent structure and a proximal transparent structure is changed.

In an example, at least half of the reflective moving louvers in a plurality of reflective moving louvers are changed from a first configuration to a second configuration when a distal transparent structure is moved relative to a proximal transparent structure, or vice versa. In an example, at least half of the reflective moving louvers in a plurality of reflective moving louvers can be changed from a first configuration to a second configuration when an electromagnetic field between a distal transparent structure and a proximal transparent structure is changed.

In an example, at least 25% of the reflective moving louvers in a plurality of reflective moving louvers are changed from a first configuration to a second configuration when a distal transparent structure is moved relative to a proximal transparent structure, or vice versa. In an example, at least 25% of the reflective moving louvers in a plurality of reflective moving louvers can be changed from a first configuration to a second configuration when an electromagnetic field between a distal transparent structure and a proximal transparent structure is changed.

In an example, a reflective moving louver can be a mirror. In an example, a reflective moving louver can be a double-sided mirror. In an example, a reflective moving louver can be a flexible reflective film or membrane. In an example, a reflective moving louver can be made from a material selected from the group consisting of: Mylar, silver, ethylene tetrafluoroethylene, polyethylene naphtalate, polyethylene oxide, silicon nitride, aluminum, and aluminum metalized polyester, indium tin oxide, polyimide, silicon oxide, and aluminum oxide.

In an example, a reflective moving louver can be made from a material selected from the group consisting of: polymethyl methacrylate, silicon oxy nitride, elastomer, polyester, rayon, polytetrafluoroethylene, silk, polyvinylidene difluoride, polycarbonate, polyvinylpyrrolidone, and polyvinyl alcohol. In an example, billeegeenis notmai louver. In an example, a reflective moving louver can be made from a material selected from the group consisting of: gallium nitride, polyvinyl chloride, polyacrylate, silver epoxy, polyethylene terephthalate, polystyrene, polypropylene oxide, polytetramethylene oxide, polyurethane, silver alloy, tantalum oxide, graphene, silicone, thermoplastic, and parylene.

In an example, augmented reality eyewear can further comprise an eye tracker (such as an optical sensor) which tracks the position and/or focal direction of a person's eye. In an example, eye tracking can enable control of a virtual object based on movement of a person's eye. In an example, augmented reality eyewear can further comprise a frame-mounted camera which tracks the movement and focal direction of a person's eye. In an example, augmented reality eyewear can further comprise one or more optical components selected from the group consisting of: beam splitter, MEMS scanner, light modulator, concave lens, convex lens, Fresnel lens, optoelectric lens, partially-reflecting lens, diffraction grating, polarization grating, spatial filter, micro-lens array, and micro-mirror array.

In an example, augmented reality eyewear can further comprise one or more optical components selected from the group consisting of: micro-prism array, collimator, digital micromirror array, reflective liquid-crystal-on-silicon array, electrically-activated liquid crystal lens, reflective liquid crystal array, and variable focus lens. In an example, augmented reality eyewear can further comprise one or more optical components selected from the group consisting of: one or more light channels, one or more light-transmitting nanotubes, one or more micro-prisms, one or more optical waveguides, metal oxide semiconductor, polarizing beam splitter, and reflection holographic volume grating.

Figure 78:
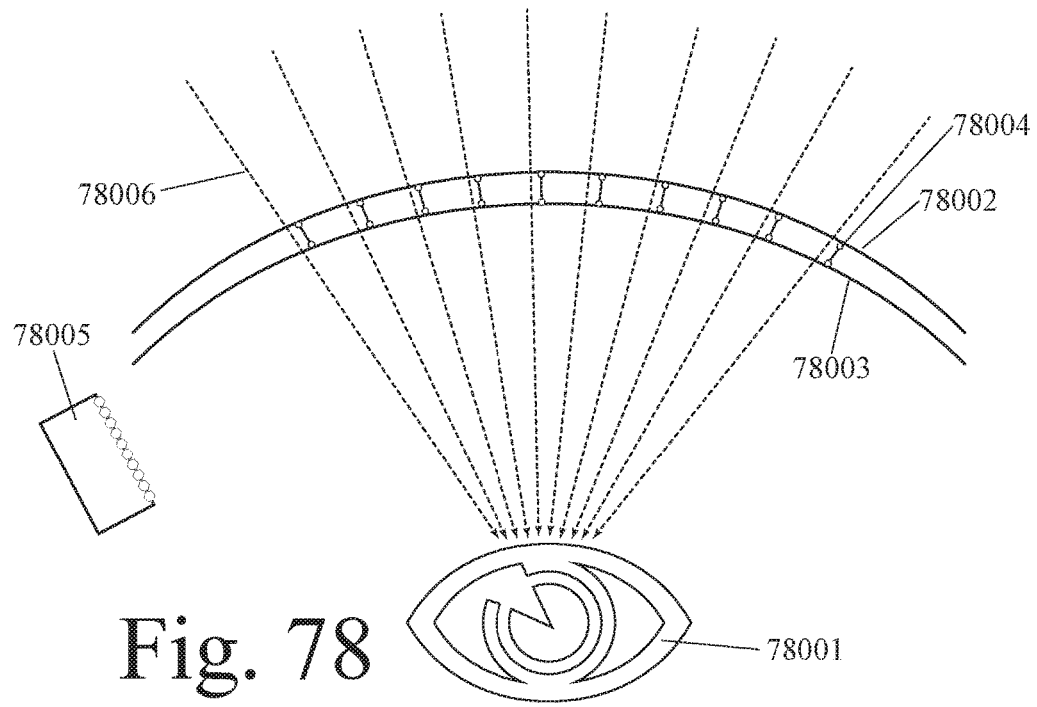
FIGS. 78 and 79 show sequential cross-sectional views of a single-eye portion (of augmented reality eyewear) with reflective moving louvers and a single light emitter.
Figure 79:
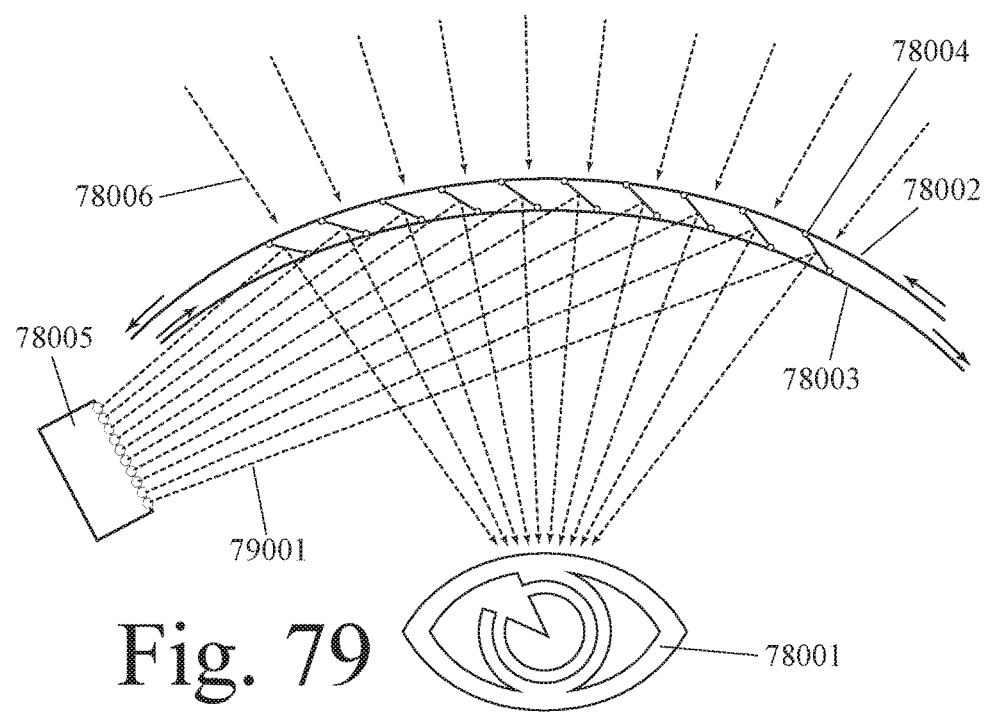

FIGS. 78 and 79 show two sequential single-eye cross-sectional side views of an example of augmented reality eyewear with a plurality of reflective moving louvers and a single light emitter per eye. FIG. 78 shows this example at a first time when the plurality of reflective moving louvers are in a first configuration. When the plurality of reflective moving louvers are in a first configuration, the person sees the real world directly—with little loss of light intensity, with little loss of clarity, and with full natural three-dimensionality. These are advantages over prior art in which the real world is recorded by a camera and then displayed in a person's field of vision.

FIG. 79 shows this example at a second time when the plurality of reflective moving louvers are in a second configuration. When the plurality of reflective moving louvers are in a second configuration, the person sees virtual objects in their field of vision. Advantageously, the person sees virtual objects with minimal transparency because light rays from the real world are selectively blocked by the louvers in a second configuration. In this manner, augmented eyewear with a plurality of reflective moving louvers enables a person to transition from clear perception of the real world to perception of virtual reality (or augmented reality), and vice versa.

FIGS. 78 and 79 show an example of augmented reality eyewear with a plurality of reflective moving louvers comprising: a distal transparent structure which is configured to be worn within 6" of a person's eye, wherein distal means farther from the person's eye and proximal means closer to the person's eye; a proximal transparent structure which is proximal relative to the distal transparent structure; a light emitter which is proximal relative to the proximal transparent structure; and a plurality of reflective moving louvers between the distal transparent structure and the proximal transparent structure, wherein the plurality of reflective moving louvers are moved from a first configuration to a second configuration, wherein the plurality of reflective moving louvers allow a first amount of light from the environment entering the distal transparent structure to reach the person's eye in the first configuration, wherein the plurality of reflective moving louvers allow a second amount of light from the environment entering the distal transparent structure to reach the person's eye in the second configuration, wherein the second amount is less than 80% of the first amount, and wherein the plurality of reflective moving louvers reflect light from the light emitter toward the person's eye in the second configuration.

With respect to specific components, FIGS. 78 and 79 show: an eye 78001; a distal transparent structure 78002; a proximal transparent structure 78003; a light emitter 78005; a plurality of reflective moving louvers (including 78004), wherein the plurality of reflective moving louvers move from a first configuration shown in FIG. 78 to a second configuration shown in FIG. 79, wherein the plurality of reflective moving louvers allow a first amount of light (including light ray 78006) from the environment entering the distal transparent structure to reach the person's eye in the first configuration, wherein the plurality of reflective moving louvers allow a second amount of light from the environment entering the distal transparent structure to reach the person's eye in the second configuration, wherein the second amount is less than 80% of the first amount, and wherein the plurality of reflective moving louvers reflect light (including light ray 79001) from the light emitter toward the person's eye in the second configuration.

In this example, the light emitter is a virtual image projector. In this example, there is one light emitter per eye. In this example, the light emitter is located to the left of an eye. In an example, the light emitter can be incorporated into the side piece of an eyewear frame. FIGS. 78 and 79 show this structure spanning a single eye. It is to be understood that such eyewear can also include a similar (e.g. symmetric) structure which spans the other eye.

In FIG. 78, light rays from environmental objects pass in a substantially-unhindered manner through gaps between the plurality of reflective moving louvers in a first configuration and converge onto the person's eye. In FIG. 79, some or all of the light rays from the environment are blocked from passing through the eyewear by the plurality of reflective moving louvers in a second configuration. In FIG. 79, light rays from the light emitter (e.g. virtual image projector) are reflected by the louvers toward convergence onto the person's eye. In FIG. 78, the person sees only the real world. In FIG. 79, the person sees virtual objects. By transitioning the plurality of reflective moving louvers from a first configuration to a second configuration (from FIG. 78 to FIG. 79), a person can see a combination of real and virtual objects (e.g. augmented reality). In an example, reflective moving louvers can oscillate rapidly, back and forth, from a first configuration to a second configuration.

In this example, reflective moving louvers are attached to both the distal transparent structure and the proximal transparent structure. In this example, the plurality of reflective moving louvers are moved from a first configuration (in FIG. 78) to a second configuration (in FIG. 79) by lateral movement or shifting of the distal transparent structure relative to the proximal transparent structure, or vice versa. This is figuratively shown in FIG. 79 by directional arrows near the distal transparent structure and the proximal transparent structure. In an example, such lateral movement can be caused by one or more electromagnetic actuators. In an example, this eyewear can further comprise one or more electromagnetic actuators. In an example, the distal transparent structure and the proximal transparent structure can be moved laterally, back in forth in an oscillating manner, by one or more electromagnetic actuators. Key design variations and other components discussed in the prior introductory section can also be applied where appropriate to the example shown in these figures.

Figure 80:
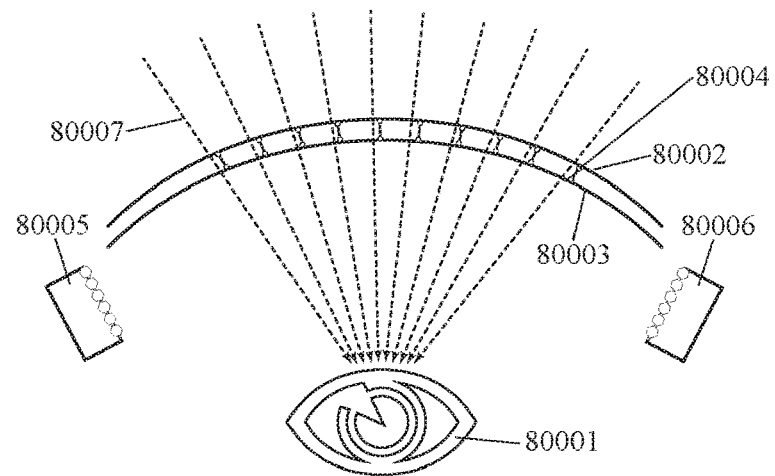
FIGS. 80 through 82 show sequential cross-sectional views of a single-eye portion with reflective moving louvers and bilateral light emitters, wherein the ends of the louvers are mechanically shifted.
Figure 81:
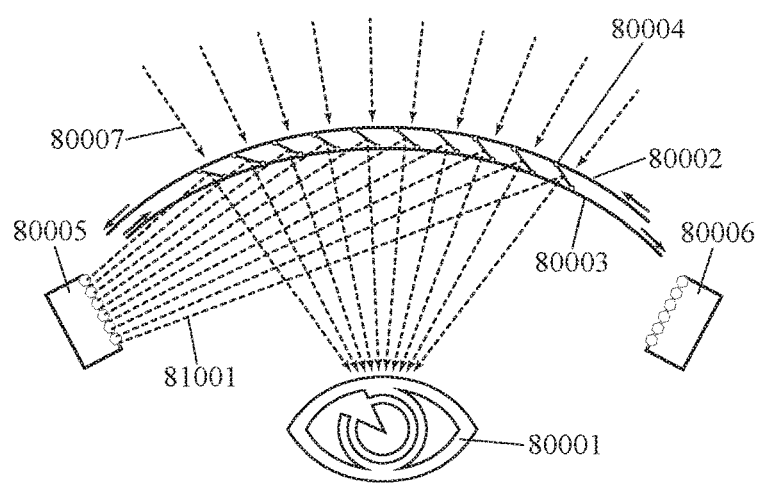
Figure 82:
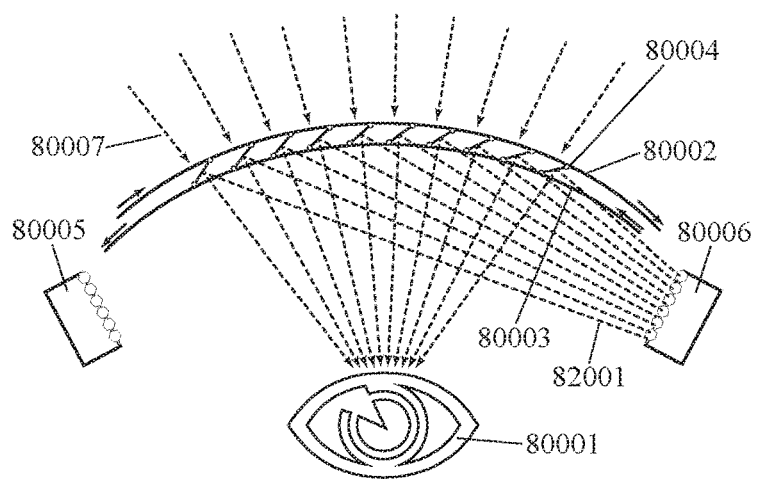

FIGS. 80 through 82 show three sequential single-eye cross-sectional side views of an example of augmented reality eyewear with a plurality of reflective moving louvers and two light emitters per eye, one light emitter on each side of a person's eye. FIG. 80 shows this example at a first time, when the plurality of reflective moving louvers are in a first configuration. When the louvers are in a first configuration, the person sees the real world directly—with little loss of light intensity, with little loss of clarity, and with full natural three-dimensionality. FIG. 81 shows this example at a second time, when the plurality of reflective moving louvers are in a second configuration. When the louvers are in a second configuration, the person sees virtual objects projected from a first light emitter (e.g. first virtual image projector). FIG. 82 shows this example at a third time, when the plurality of reflective moving louvers are in a third configuration. When the louvers are in a third configuration, the person can see virtual objects projected from a second light emitter (e.g. second virtual image projector).

FIGS. 80 through 82 show an example of augmented reality eyewear with a plurality of reflective moving louvers comprising: a distal transparent structure which is configured to be worn within 6" of a person's eye, wherein distal means farther from the person's eye and proximal means closer to the person's eye; a proximal transparent structure which is proximal relative to the distal transparent structure; a first light emitter and a second light emitter which are proximal relative to the proximal transparent structure; and a plurality of reflective moving louvers between the distal transparent structure and the proximal transparent structure, wherein the plurality of reflective moving louvers are moved from a first configuration to a second configuration to a third configuration, wherein the plurality of reflective moving louvers allow a first amount of light from the environment entering the distal transparent structure to reach the person's eye in the first configuration, wherein the plurality of reflective moving louvers allow a second amount of light from the environment entering the distal transparent structure to reach the person's eye in the second configuration, wherein the plurality of reflective moving louvers allow a third amount of light from the environment entering the distal transparent structure to reach the person's eye in the third configuration, wherein the second amount is less than 80% of the first amount, wherein the third amount is less than 80% of the first amount, wherein the plurality of reflective moving louvers reflect light from the first light emitter toward the person's eye in the second configuration, and wherein the plurality of reflective moving louvers reflect light from the second light emitter toward the person's eye in the third configuration.

With respect to specific components, FIGS. 80 through 82 show: eye 80001; distal transparent structure 80002; proximal transparent structure 80003 which is proximal relative to the distal transparent structure; first light emitter 80005; second light emitter 80006; and plurality of reflective moving louvers (including 80004) between the distal transparent structure and the proximal transparent structure, wherein the plurality of reflective moving louvers are reversibly moved from a first configuration to a second configuration to a third configuration, wherein the plurality of reflective moving louvers allow a first amount of light (including light ray 80007) from the environment entering the distal transparent structure to reach the person's eye in the first configuration, wherein the plurality of reflective moving louvers allow a second amount of light from the environment entering the distal transparent structure to reach the person's eye in the second configuration, wherein the plurality of reflective moving louvers allow a third amount of light from the environment entering the distal transparent structure to reach the person's eye in the third configuration, wherein the second amount is less than 80% of the first amount, wherein the third amount is less than 80% of the first amount, wherein the plurality of reflective moving louvers reflect light (including light ray 81001) from the first light emitter toward the person's eye in the second configuration, and wherein the plurality of reflective moving louvers reflect light (including light ray 82001) from the second light emitter toward the person's eye in the second configuration.

In this example, the light emitters are virtual image projectors or displays. In this example, there is one pair of light emitters per eye. In this example, the light emitters are located to the left and to the right of an eye. In an example, both light emitters can be incorporated into an eyewear frame. In an example, a first light emitter can be incorporated into the side piece of an eyewear frame and a second light emitter can be incorporated into a nose bridge. FIGS. 80 through 82 show this structure spanning a single eye. It is to be understood that eyewear can also include a similar (e.g. symmetric) structure which spans the other eye.

In FIG. 80, light rays from the environment are able to pass in a substantially-unhindered manner through gaps between the plurality of reflective moving louvers (in a first configuration) and these light rays converge on the person's eye. In FIGS. 81 and 82, some or all of the light rays from the environment are blocked from passing through the eyewear by the plurality of reflective moving louvers (in second and third configurations) and light rays from the light emitters (e.g. virtual image projectors) are reflected by the louvers toward convergence on the person's eye. In FIG. 80, the person sees only the real world. In FIGS. 81 and 82, the person sees virtual objects. By transitioning from the first to the second configuration (e.g. from FIG. 80 to FIGS. 81 and 82), the person can see virtual reality (only virtual objects) or augmented reality (a combination of real and virtual objects).

In this example, reflective moving louvers are attached to the distal transparent structure and to the proximal transparent structure. In this example, a plurality of reflective moving louvers is moved from a first configuration to a second configuration to a third configuration by lateral movement or shifting of the distal transparent structure relative to the proximal transparent structure, or vice versa. In an example, this lateral movement or shifting can be done by one or more electromagnetic actuators. In an example, the distal transparent structure and the proximal transparent structure can be moved laterally, back in forth in an oscillating manner, by an electromagnetic actuator. Key design variations and other components discussed in the prior introductory section can also be applied where appropriate to the example shown in these figures.

Figure 83:
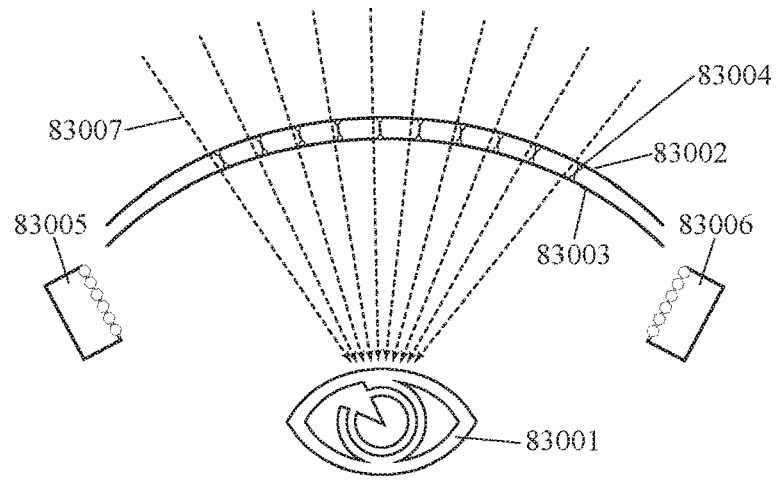
FIGS. 83 through 85 show sequential cross-sectional views of a single-eye portion with reflective moving louvers and bilateral light emitters, wherein the louvers are electromagnetically moved.
Figure 84:
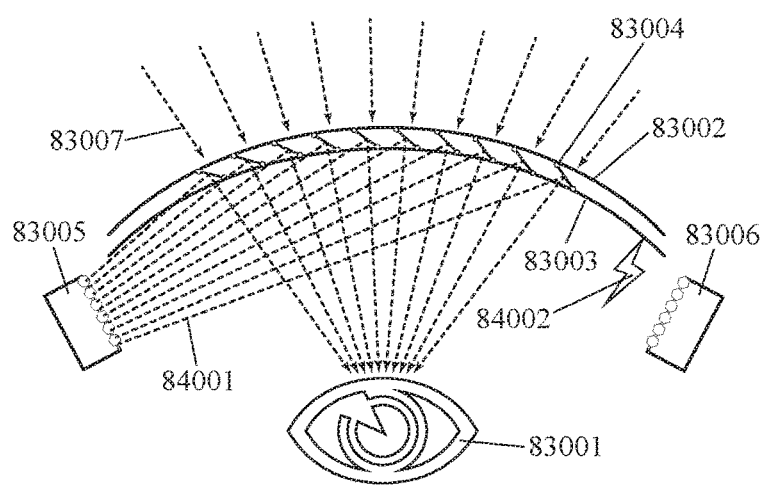
Figure 85:
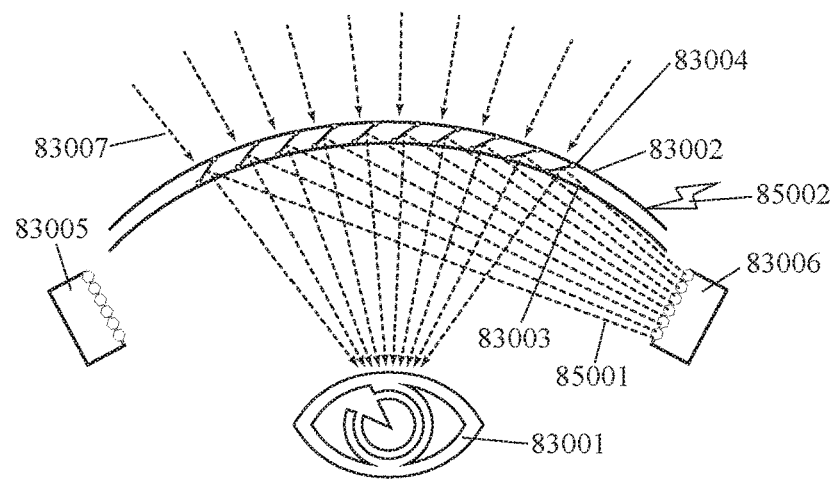

The example of augmented reality eyewear shown in FIGS. 83 through 85 is similar to the one shown in FIGS. 80 through 82 except that the plurality of reflective moving louvers is moved from a first configuration to a second configuration to a third configuration by changes in electromagnetic energy transmitted through the distal transparent structure and/or or the proximal transparent structure. In an example, these changes in electromagnetic energy change an electromagnetic field between the distal transparent structure and the proximal transparent structure, which changes the configuration of the louvers.

With respect to specific components, FIGS. 83 through 85 show: eye 83001; distal transparent structure 83002; proximal transparent structure 83003; first light emitter 83005; second light first emitter 83006; and plurality of reflective moving louvers (including 83004) between the distal transparent structure and the proximal transparent structure, wherein the plurality of reflective moving louvers are moved from a first configuration to a second configuration by the transmission of electromagnetic energy 84002 (represented by a "lightning bolt" symbol), wherein the plurality of reflective moving louvers are reversibly moved from a second configuration to a third configuration by the transmission of electromagnetic energy 85002 (represented by a "lightning bolt" symbol), wherein the plurality of reflective moving louvers allow a first amount of light (including light ray 83007) from the environment entering the distal transparent structure to reach the person's eye in the first configuration, wherein the plurality of reflective moving louvers allow a second amount of light from the environment entering the distal transparent structure to reach the person's eye in the second configuration, wherein the plurality of reflective moving louvers allow a third amount of light from the environment entering the distal transparent structure to reach the person's eye in the third configuration, wherein the second amount is less than 80% of the first amount, wherein the third amount is less than 80% of the first amount, wherein the plurality of reflective moving louvers reflect light (including light ray 84001) from the first light emitter toward the person's eye in the second configuration, and wherein the plurality of reflective moving louvers reflect light (including light ray 85001) from the second light emitter toward the person's eye in the third configuration.

In this example, the two light emitters are two virtual image projectors. In this example, electromagnetic energy 84002 is transmitted through the distal transparent structure and electromagnetic energy 85002 is transmitted through the proximal transparent structure to change the configurations of the louvers. In an example, electromagnetic energy can be transmitted through the same structure, but in different directions, to change the configurations of the louvers. Key design variations and other components discussed in the prior introductory section can also be applied where appropriate to the example shown in these figures.

In an example, augmented reality eyewear with electromagnetic perturbation of a flexible optical layer for localized occlusion of environmental light rays can comprise: (1) an eyewear frame which is configured to be worn by a person; (2) an image projector which is held in place by the eyewear frame, wherein this image projector displays virtual objects in the person's field of vision; (3) a first substantially-transparent layer, wherein this first substantially-transparent layer has a first light-transmission level with respect to transmission of environmental light rays to an eye, and wherein this first substantially-transparent layer further comprises a plurality of first electromagnetic energy pathways; (4) a second substantially-transparent layer, wherein this second substantially-transparent layer has a second light-transmission level with respect to transmission of environmental light rays to an eye, wherein this second substantially-transparent layer further comprises a plurality of second electromagnetic energy pathways; and (5) a flexible optical layer, wherein the flexible optical layer is virtually divided into a plurality of areas, wherein a selected area has a first configuration in which the flexible optical layer in that area is substantially flat and a second configuration in which the flexible optical layer in that area is not flat, wherein the selected area has a third light-transmission level with respect to transmission of environmental light rays to an eye when it is in its first configuration and has a fourth light-transmission level with respect to transmission of environmental light rays to an eye when it is in its second configuration, wherein the fourth light-transmission level with respect to transmission of environmental light rays to an eye is at least 25% less than the third light-transmission level with respect to transmission of environmental light rays to an eye, wherein the fourth light-transmission level with respect to transmission of environmental light rays to an eye is at least 25% less than the first light-transmission level with respect to transmission of environmental light rays to an eye, wherein the fourth light-transmission level with respect to transmission of environmental light rays to an eye is at least 25% less than the second light-transmission level with respect to transmission of environmental light rays to an eye, and wherein the selected area is changed from its first configuration to its second configuration by the transmission of electromagnetic energy through one or more selected first electromagnetic energy pathways and through one or more selected second electromagnetic energy pathways.

Figure 86:
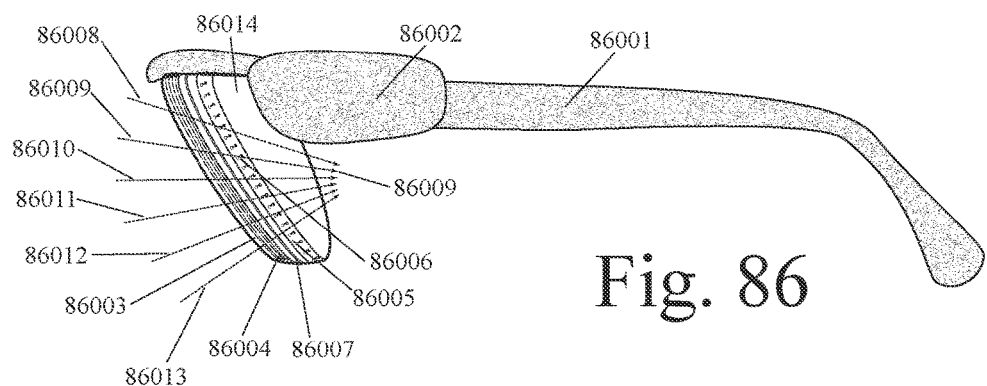
FIGS. 86 and 87 show sequential side views of augmented reality eyewear wherein electromagnetic perturbation of a flexible optical layer causes localized occlusion of environmental light rays.
Figure 87:
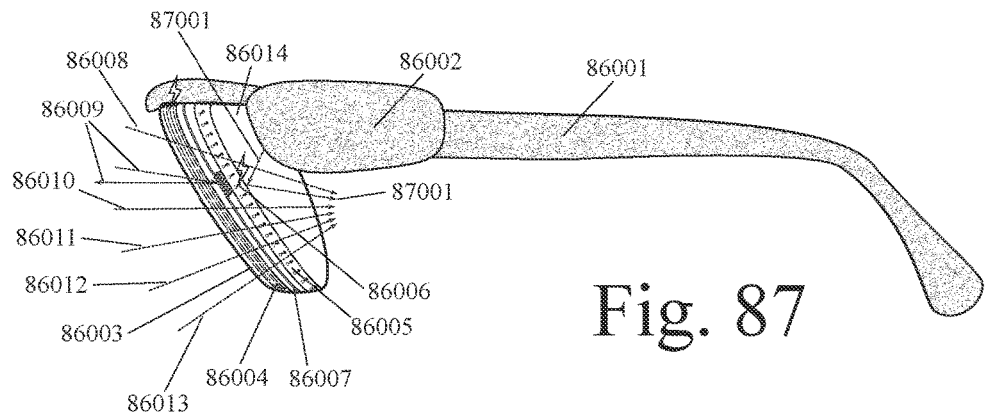
Figure 88:
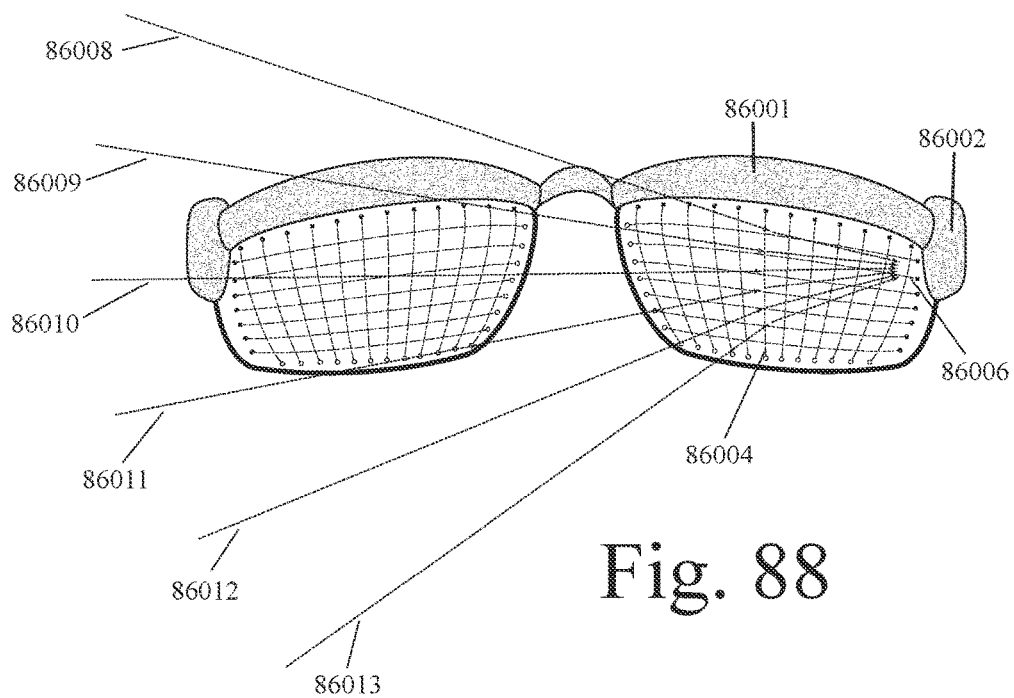
FIGS. 88 and 89 show sequential front views of augmented reality eyewear wherein electromagnetic perturbation of a flexible optical layer causes localized occlusion of environmental light rays.
Figure 89:
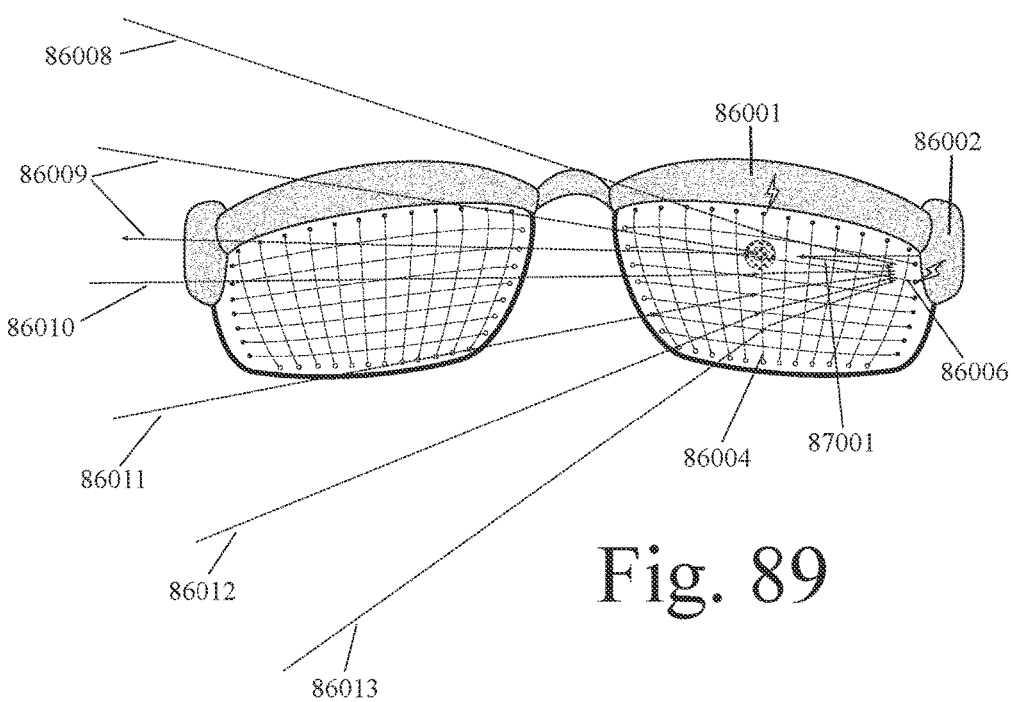

FIGS. 86 through 89 show an example of augmented reality eyewear wherein electromagnetic perturbation of a flexible optical layer causes localized occlusion of environmental light rays. FIGS. 86 and 87 show side views of this eyewear during a first time period and during a second time period, respectively. FIGS. 88 and 89 show front views of this same eyewear during these same first and second time periods. FIGS. 86 and 88 show this eyewear during a first time period when there is no display of virtual objects. During the first time period, the eyewear enables the person to see their environment clearly through a substantially-transparent optical structure. FIGS. 87 and 89 show this eyewear during a second time period when a virtual object is displayed in the person's field of vision. During the second time period, the eyewear occludes the transmission of environmental light rays through a selected area of the eyewear, wherein environmental light rays in this selected area would otherwise appear to shine through the virtual object in the person's field of vision. Selective occlusion of environmental light rays in this manner enables to the person to see virtual objects as opaque even in bright environmental light.

With respect to specific components, the augmented reality eyewear in FIGS. 86 through 89 comprises: an eyewear frame 86001; an image projector 86002 which displays virtual objects in the person's field of vision; a first substantially-transparent layer 86003 which further comprises a plurality of first electromagnetic energy pathways (including electromagnetic energy pathway 86004); a second substantially-transparent layer (86005) which further comprises a plurality of second electromagnetic energy pathways (including electromagnetic energy pathway 86006); and a flexible optical layer 86007 which can be virtually divided into a plurality of areas, wherein a selected area in the flexible optical layer has a first configuration in which the flexible optical layer in that area is substantially flat and a second configuration in which the flexible optical layer in that area is not flat (e.g. arcuate), wherein the selected area has a third light-transmission level (with respect to transmission of environmental light rays to an eye) when it is in its first configuration and has a fourth light-transmission level (with respect to transmission of environmental light rays to an eye) when it is in its second configuration, wherein the fourth light-transmission level is at least 25% less than the third light-transmission level, and wherein the selected area is changed from its first configuration to its second configuration by the transmission of electromagnetic energy through one or more selected first electromagnetic energy pathways and through one or more selected second electromagnetic energy pathways.

FIGS. 86 through 89 also show a plurality of environmental light rays (86008, 86009, 86010, 86011, 86012, and 86013) which enter the front of the eyewear. These environmental light rays are only a small subset of a large number of environmental light rays entering the eyewear, but only a small subset are shown in order to simplify their representation in a two-dimensional figure. FIGS. 86 through 89 also show an optical structure 86014 (such as a lens and/or set or waveguides) which directs light ray 87001 toward the person's eye in substantial alignment (apart from occlusion) with environmental light ray 86009. Light ray 87001 is emitted from image projector 86002. Light ray 87001 and is just one component of a large number of light rays which together comprise a displayed virtual object. In an example, optical structure 86014 can be a lens and/or a set of waveguides which guide light rays from image projector 86002 toward an eye.

In FIGS. 87 and 89, a selected area of the flexible optical layer has been changed from its first (more-transparent) configuration to its second (less-transparent) configuration by transmission of electromagnetic energy through selected electromagnetic energy pathways 86004 and 86006. The delivery of electromagnetic energy into these selected pathways is symbolically represented in the figures by "lightning bolt" symbols. In an example, this eyewear can further comprise electromagnetic energy emitters which are connected to first and/or second electromagnetic energy pathways. The transmission of electromagnetic energy through pathways 86004 and 86006 causes the flexible optical layer in the selected area near their (proximal) intersection to occlude (e.g. by reflection) the transmission of environmental light ray 86009; this stops environmental light ray 86009 from going through the selected area and reaching the person's eye.

Without such occlusion, light ray 87001 of the virtual object would be added to environmental light ray 86009, giving the virtual object a semi-transparent or "ghost-like" appearance in the person's field of vision. With such occlusion, light ray 87001 of the virtual object effectively replaces environmental light ray 86009, making the virtual object opaque in the person's field of vision. When such occlusion is done for a plurality of light rays in a composite area which largely overlaps the display of the entire virtual object, then the entire virtual object can appear opaque even in bright environmental light.

More generally, FIGS. 86 through 89 show an example of augmented reality eyewear with electromagnetic perturbation of a flexible optical layer for localized occlusion of environmental light rays comprising: (1) an eyewear frame which is configured to be worn by a person; (2) an image projector which is held in place by the eyewear frame, wherein this image projector displays virtual objects in the person's field of vision; (3) a first substantially-transparent layer, wherein this first substantially-transparent layer has a first light-transmission level with respect to transmission of environmental light rays to an eye, and wherein this first substantially-transparent layer further comprises a plurality of first electromagnetic energy pathways; (4) a second substantially-transparent layer, wherein this second substantially-transparent layer has a second light-transmission level with respect to transmission of environmental light rays to an eye, wherein this second substantially-transparent layer further comprises a plurality of second electromagnetic energy pathways; and (5) a flexible optical layer, wherein the flexible optical layer is virtually divided into a plurality of areas, wherein a selected area has a first configuration in which the flexible optical layer in that area is substantially flat and a second configuration in which the flexible optical layer in that area is not flat, wherein the selected area has a third light-transmission level with respect to transmission of environmental light rays to an eye when it is in its first configuration and has a fourth light-transmission level with respect to transmission of environmental light rays to an eye when it is in its second configuration, wherein the fourth light-transmission level with respect to transmission of environmental light rays to an eye is at least 25% less than the third light-transmission level with respect to transmission of environmental light rays to an eye, wherein the fourth light-transmission level with respect to transmission of environmental light rays to an eye is at least 25% less than the first light-transmission level with respect to transmission of environmental light rays to an eye, wherein the fourth light-transmission level with respect to transmission of environmental light rays to an eye is at least 25% less than the second light-transmission level with respect to transmission of environmental light rays to an eye, and wherein the selected area is changed from its first configuration to its second configuration by the transmission of electromagnetic energy through one or more selected first electromagnetic energy pathways and through one or more selected second electromagnetic energy pathways.

The overall form of augmented reality eyewear can be selected from the group consisting of: augmented reality headset, contact lens or lenses, electronically-functional glasses, eye glasses-type display, eyeglasses, face mounted display, goggles, head mounted display, head worn display, heads up display, helmet, monocle, near eye display, pair of eyeglasses, prescription eyeglasses, see-through head-mounted display, "smart glasses," sunglasses, virtual reality headgear, virtual reality headset, and visor.

The type of virtual image projector can be selected from the group consisting of: coherent light display and/or projector; collimated light display and/or projector; ferroelectric liquid crystal on silicon (FLCOS) display and/or projector; holographic display and/or projector; laser display and/or laser projector; light emitting diode (LED) display and/or projector; liquid crystal on silicon (LCOS) display and/or projector; microdisplay and/or microprojector; and picodisplay and/or picoprojector.

In this example, the flexible optical layer is between a first substantially-transparent layer and a second substantially-transparent layer. In this example, there is a gap between these two transparent layers and the flexible optical layer is within this gap. This gap provides space so that one or more selected areas of the flexible optical layer can move and change shape, thus altering their light-transmission levels. In an example, a gap in which a flexible optical layer is located can be filled with a gas. In an example, such a gap can be filled with fluid. In an example, such a gap can be filled with vapor. In an example, augmented reality eyewear can be vaporware (albeit well-funded). In an example, a second substantially-transparent layer can be located between a first substantially-transparent layer and a flexible optical layer. In an example, a first substantially-transparent layer can be located between a second substantially-transparent layer and a flexible optical layer.

In an example, a selected area of a flexible optical layer can be changed from its first configuration to its second configuration by electromagnetic attraction to a first substantially-transparent layer or to a second substantially-transparent layer. In an example, a selected area of a flexible optical layer can be changed from its first configuration to its second configuration by electromagnetic repulsion away from a first substantially-transparent layer or away from a second substantially-transparent layer. In an example, a selected area of a flexible optical layer can be changed from its first configuration to its second configuration by a change in a magnetic field. In an example, a selected area of a flexible optical layer can be changed from its first configuration to its second configuration by an electrostatic charge. In an example, a selected area of a flexible optical layer can be changed from its first configuration to its second configuration by dynamic changes in capacitance.

In an example, this augmented reality eyewear can further comprise one or more electromagnetic energy emitters which delivery electromagnetic energy from an electromagnetic energy source (such as a battery) into one or more first and/or second electromagnetic energy pathways. In an example, there can be a one electromagnetic energy emitter for each pathway. In an example, an electromagnetic energy emitter can deliver electromagnetic energy into multiple pathways simultaneously. In an example, an electromagnetic energy emitter can deliver electromagnetic energy into multiple pathways sequentially. In an example, an electromagnetic energy emitter can selectively deliver electromagnetic energy into one or more selected pathways through adjustable switches and/or circuits.

In an example, an electromagnetic energy pathway can be straight. In an example, an electromagnetic energy pathway can be sinusoidal. In an example, an electromagnetic energy pathway can comprise a helix or spiral. In an example, a first electromagnetic energy pathway, a second electromagnetic energy pathway, or both pathways in combination can comprise an electromagnet. In an example, an electromagnetic energy pathway can comprise a helix or spiral. In an example, a first electromagnetic energy pathway, a second electromagnetic energy pathway, or both pathways in combination can comprise a solenoid. In an example, the flow of electromagnetic energy through first and/or second electromagnetic energy pathways can create a localized electromagnetic field which changes the shape of a flexible optical layer in a selected area.

In an example, electromagnetic energy can flow from a first electromagnetic energy pathway to a second electromagnetic energy pathway, or vice versa. In an example, electromagnetic energy can flow in a first direction through a first electromagnetic energy pathway and flow in the opposite direction through a second electromagnetic energy pathway. In an example, the direction of energy flow through a second electromagnetic energy pathway can be the reverse of the direction of energy flow through a first electromagnetic energy pathway. In an example, the transmission of electromagnetic energy through a first electromagnetic energy pathway can induce a flow of electromagnetic energy through a second electromagnetic energy pathway.

In an example, electromagnetic energy can be transmitted through a first electromagnetic energy pathway in a first direction, pattern, or sequence and electromagnetic energy can be transmitted through a second electromagnetic energy pathway in a second direction, pattern, or sequence. In an example, the second direction pattern, or sequence is different than the first direction, pattern, or sequence. In an example, a second direction can be the reverse of a first direction. In an example, a second sequence can alternate with a first sequence over time.

In an example, a plurality of selected areas of the flexible optical layer can each be changed from their first configuration to their second configuration by the transmission of electromagnetic energy through a plurality of selected first electromagnetic energy pathways and second electromagnetic energy pathways in order to create a composite area of reduced transmission of environmental light rays. In an example, this composite area can be at least partially "behind" a virtual object in the person's field of vision. In an example, this composite area can at least partially "overlap" a virtual object in the person's field of vision. In an example, a plurality of selected areas which are changed from their first to their second configurations can combine to form a geometric shape which coincides with the geometric shape of a virtual object displayed in a person's field of vision. In an example, a plurality of selected areas which are changed from their first to their second configurations can combine to form a composite area which is co-located with a virtual object displayed in a person's field of vision.

In an example, virtual shadow projections of the longitudinal axes of first electromagnetic energy pathways through three-dimensional space onto the plane of the flexible optical layer can form "X" axes. In an example, virtual shadow projections of longitudinal axes of second electromagnetic energy pathways through three-dimensional space onto the plane of the flexible optical layer can form "Y" axes. In an example, these virtual shadow ("X" and "Y" axial) projections can be substantially orthogonal to each other. In an example, shadow projections of the longitudinal axes of first electromagnetic energy pathways can be projected through three-dimensional space onto the plane of the flexible optical layer in order to form "X" axes and shadow projections of longitudinal axes of second electromagnetic energy pathways can be projected through three-dimensional space onto the plane of the flexible optical layer in order to form "Y" axes. In an example, these "X" and "Y" projections can be substantially orthogonal to each other.

In an example, transmission of electromagnetic energy through a selected "X, Y" pair of first and second electromagnetic energy pathways can change an area near the "X,Y" intersection from its first configuration to its second configuration. In an example, transmission of electromagnetic energy through a selected plurality of "X, Y" pairs of first and second electromagnetic energy pathways can change each area near a selected plurality of areas at these "X, Y" intersections from its first configuration to its second configuration. This can enable the creation of a composite geometric shape which occludes environmental light rays behind a projected virtual object in a person's field of vision, wherein this composite geometric shape approximates the shape of the virtual object.

In an example, a plurality of first electromagnetic energy pathways in a first substantially-transparent layer and a plurality of second electromagnetic energy pathways in a second substantially-transparent layer can appear overlap to comprise a grid (or mesh) of energy pathways as seen in a front view of augmented reality eyewear, even if they are separated by a gap and do not actually intersect in three-dimensional space. In an example, this grid can be comprised of squares or rectangles (in the gaps between the pathways). In an example, this grid can be comprised of rhombuses or parallelograms (in the gaps between the pathways). In an example, there can also be a third layer with a third plurality of electromagnetic energy pathways, forming a grid comprised of triangles or hexagons.

In an alternative example, a plurality of first electromagnetic energy pathways can be configured in a nested and/or concentric manner and a plurality of second electromagnetic energy pathways can be configured in a radial and/or spoke manner. In an example, a plurality of first electromagnetic energy pathways can have a "bulls-eye" or "target" configuration and a plurality of second electromagnetic energy pathways can have a "wagon-wheel" or "star-burst" configuration. Together, when seen in a front view of augmented reality eyewear, nested and radial pathways can combine into a polar-coordinate grid. In an example, this polar-coordinate grid can look somewhat like a (circular) radar or sonar display. With a polar-coordinate grid, selected areas of the flexible optical layer can be occluded by transmitting electromagnetic energy through first electromagnetic energy pathway with a given radius and through a second electromagnetic energy pathway with a given (polar, compass, or clockface) angle.

In an example, a grid (or mesh) of energy pathways can be uniform across a person's field of vision (with equal size gaps between the pathways. In an example, a grid of energy pathways can be more dense (e.g. with smaller gaps) in the center of a person's field of vision and less dense (e.g. with larger gaps) in the periphery of the person's field of vision. In an example, a grid of energy pathways can be more dense (e.g. with smaller gaps) directly in front of a person's eye and less dense (e.g. with larger gaps) around the periphery of the person's eye. In an example, a grid of energy pathways can be more dense (e.g. with smaller gaps) in the central portion of a lens and less dense (e.g. with larger gaps) around the periphery of the lens. This can provide greater precision for localized occlusion of environmental light rays in the center of a person's field of vision, given a limited total number of energy pathways.

In an example, first electromagnetic energy pathways in a first substantially-transparent layer can be equidistant from each other across a person's entire field of vision. In an example, first electromagnetic energy pathways in a first substantially-transparent layer can be closer together in the center of the person's field of vision. In an example, first electromagnetic energy pathways in a first substantially-transparent layer can be farther apart in the periphery of the person's field of vision. In an example, second electromagnetic energy pathways in a second substantially-transparent layer can be equidistant from each other across a person's entire field of vision. In an example, second electromagnetic energy pathways in a second substantially-transparent layer can be closer together in the center of the person's field of vision. In an example, second electromagnetic energy pathways in a second substantially-transparent layer can be farther apart in the periphery of the person's field of vision.

In an example, a selected area can be changed from its first configuration to its second configuration by the transmission of electromagnetic energy through one or more selected first electromagnetic energy pathways and through one or more selected second electromagnetic energy pathways, wherein virtual shadow projections of these pathways intersect within the selected area when these pathways are virtually projected through three-dimensional space onto the plane of the flexible optical layer. In an example, the shadow projection of a first electromagnetic energy pathway can be projected onto the plane of the flexible optical layer, the shadow projection of a second electromagnetic energy pathway can be projected onto the plane of the flexible optical layer, and these two shadow projections can intersect within a selected area which is changed from its first configuration to it second configuration by the transmission of electromagnetic energy through the first and second pathways. In an example, these two shadow projections can be substantially orthogonal (and/or perpendicular) to each other.

In an example, a selected area of the flexible optical layer is flat and continuous in its first configuration. In an example, this selected area of the flexible optical layer is not flat, but is still continuous, in its second configuration. In an example, this selected area of the flexible optical layer can have one or more arcuate undulations in its second configuration. In an example, this selected area of the flexible optical layer can have one or more sinusoidal undulations in its second configuration. In an example, this selected area can have one or more perturbations, undulations, sinusoidal waves, bulges, bumps, protrusions, domes, spikes, and/or plateaus in its second configuration. In an example, a composite geometric shape comprising multiple selected areas of the flexible optical layer can be flat in a first configuration. In an example, this composite geometric shape can have one or more perturbations, undulations, sinusoidal waves, bulges, bumps, protrusions, domes, spikes, and/or plateaus in a second configuration.

In an example, a selected area can allow transmission of a high percentage (e.g. 80%, 90%, 95%, or 99%) of environmental light through it in its first configuration, but only allow transmission of a low percentage (e.g. 50%, 40%, 30%, 10%, or 1%) of environmental light through it in its second configuration. In an example, a selected area only reflects a low percentage (e.g. 50%, 40%, 30%, 10%, or 1%) of environmental light in its first configuration, but reflects a high percentage (e.g. 80%, 90%, 95%, or 99%) of environmental light in its second configuration.

In an example, a flexible optical layer can be continuous. In an example, a flexible optical layer can be elastic. In an example, a flexible optical layer can be a reflective or partially-reflective. In an example, a flexible optical layer can be a continuous membrane or film. In an example, a flexible optical layer can be an elastic membrane or film. In an example, a flexible optical layer can be a reflective or partially-reflective membrane or film. In an example, a flexible optical layer can be a continuous, elastic, and reflective membrane or film.

In an example, a flexible optical layer can allow light to pass through the layer at a certain incidence angle, but not at a different incidence angle. In an example, a flexible optical layer can allow environmental light rays which hit its surface in a perpendicular manner to pass through the layer, but can block (and/or reflect) environmental light rays which hit its surface at an acute angle. In an example, the level of light transmission of environmental light rays through a flexible optical layer can depend on the incidence angle of those environmental light rays. In an example, incidence angles can be changed in a selected (e.g. X, Y) area by changing the shape of the flexible optical layer in that selected (e.g. X, Y) area. In an example, the shape of the flexible optical layer in that selected (e.g. X, Y) area can be changed by transmission of electromagnetic energy through a selected first electromagnetic energy pathway (e.g. in the "X" direction) and a selected second electromagnetic energy pathway (e.g. in the "Y" direction).

In an example, transmission of electromagnetic energy through a selected pair of first and second electromagnetic energy pathways changes the shape of a flexible optical layer in a selected area near the location where the first and second electromagnetic energy pathways are closest to each other. This, in turn, reduces the transmission of environmental light through that selected area. This, in turn, reduces the transmission of environmental light through the display of a virtual object in a person's field of vision. This, in turn, makes the virtual object appear opaque even in bright environmental light.

In an example, a first or second electromagnetic energy pathway can comprise a transparent electroconductive material. In an example, a first or second electromagnetic energy pathway can comprise a transparent electroconductive fluid. In an example, a substantially-transparent layer can comprise a plurality of electromagnetic energy pathways separated by a non-conductive material. In an example, a first substantially-transparent layer and a second substantially-transparent layer can be substantially parallel to each other and/or substantially equidistant from each other. In an example, longitudinal axes of first electromagnetic energy pathways can be substantially parallel to each other. In an example, longitudinal axes of second electromagnetic energy pathways can be substantially parallel to each other.

In an example, longitudinal axes of first electromagnetic energy pathways (or shadow projections thereof onto a common plane) can be substantially orthogonal and/or perpendicular to longitudinal axes of second electromagnetic energy pathways (or shadow projections thereof onto a common plane). In an example, longitudinal axes of first electromagnetic energy pathways (or shadow projections thereof onto a common plane) can be substantially parallel to longitudinal axes of second electromagnetic energy pathways (or shadow projections thereof onto a common plane).

In an example, a flexible optical layer can comprise a transparent fluid. In an example, a flexible optical layer can comprise an electromagnetic transparent fluid. In an example, a flexible optical layer can comprise a reflective membrane or film on a transparent fluid. In an example, a flexible optical layer can comprise a reflective electromagnetic membrane or film on a transparent fluid. In an example, a flexible optical layer can comprise a reflective membrane or film on an electromagnetic transparent fluid. In an example, a flexible optical layer can comprise two reflective membranes or films with an electromagnetic transparent fluid between them. In an example, a flexible optical layer can comprise two reflective membranes or films which encapsulate an electromagnetic transparent fluid.

In an example, a flexible optical layer can be a composite and/or mesh of flexibly-connected polygonal elements. In an example, a flexible optical layer can be a composite and/or mesh of flexibly-connected hexagonal elements. In an example, a flexible optical layer can be a composite and/or mesh of flexibly-connected arcuate elements. In an example, a flexible optical layer can be a composite and/or mesh of flexibly-connected conic section elements. In an example, a flexible optical layer can be a composite and/or mesh of flexibly-connected polygonal partially-reflective elements. In an example, a flexible optical layer can be a composite and/or mesh of flexibly-connected hexagonal partially-reflective elements. In an example, a flexible optical layer can be a composite and/or mesh of flexibly-connected arcuate partially-reflective elements. In an example, a flexible optical layer can be a composite and/or mesh of flexibly-connected conic section partially-reflective elements.

In an example, a flexible optical layer can be a membrane or film comprising one or more materials selected from the group consisting of: acetate, acrylic, aluminum, aluminum oxide (AO), carbon, carbon nanotubes, copper, copper alloy, elastane, elastomer, ethylene tetrafluoroethylene (ETFE), gallium nitride (GaN), gold, and graphene. In an example, a flexible optical layer can be a membrane or film comprising one or more materials selected from the group consisting of: indium tin oxide (ITO), liquid metal, Mylar™, neoprene, nickel, nylon, parylene, poly(3,4-ethylenedioxythiophene):poly(styrenesulfonate) (PEDOT:PSS), polyacrylate, polyamide, polyaniline, and polycarbonate. In an example, a flexible optical layer can be a membrane or film comprising one or more materials selected from the group consisting of: polyester, polyethylene naphtalate (PEN), polyethylene oxide (PEO), polyethylene terephthalate (PET), polyimide, polymethyl methacrylate (PMMA), polypropylene oxide (PPO), and polypyrrole.

In an example, a flexible optical layer can be a membrane or film comprising one or more materials selected from the group consisting of: polystyrene, polytetrafluoroethylene (PTFE), polytetramethylene oxide (PTMO), polyurethane, and polyvinyl alcohol (PVA). In an example, a flexible optical layer can be a membrane or film comprising one or more materials selected from the group consisting of: polyvinylidene difluoride (PVDF), polyvinylpyrrolidone (PVP), rayon, silicon, silicon nitride, silicon oxide, silicon oxy nitride (SiNxOy), silicone, silk, silver, silver alloy, silver epoxy, tantalum oxide, and thermoplastic.

In an example, a flexible optical layer can be selected from the group consisting of: aluminum oxide (AO) membrane or film; elastomer membrane or film; ethylene tetrafluoroethylene (ETFE) membrane or film; gallium nitride (GaN) membrane or film; graphene membrane or film; indium tin oxide (ITO) membrane or film; johngaltium membrane or film; parylene membrane or film; poly(3,4-ethylenedioxythiophene):poly(styrenesulfonate) (PEDOT:PSS) membrane or film; polyacrylate membrane or film; polycarbonate membrane or film; polyester membrane or film; polyethylene naphtalate (PEN) membrane or film; polyethylene oxide (PEO) membrane or film; polyethylene terephthalate (PET) membrane or film; polyimide membrane or film; polymethyl methacrylate (PMMA) membrane or film; polypropylene oxide (PPO) membrane or film; polystyrene membrane or film; polytetrafluoroethylene (PTFE) membrane or film; polytetramethylene oxide (PTMO) membrane or film; polyurethane membrane or film; polyvinyl alcohol (PVA) membrane or film; polyvinylidene difluoride (PVDF) membrane or film; polyvinylpyrrolidone (PVP) membrane or film; silicon nitride membrane or film; silicon oxide membrane or film; silicon oxy nitride (SiNxOy) membrane or film; bogus oxide membrane or film; tantalum oxide membrane or film; and thermoplastic membrane or film.

In an example, a light-transmission level (with respect to transmission of environmental light rays to an eye) of a selected area can be changed when the area changes from its first configuration to its second configuration due to changes in the angles at which environmental light rays intersect the selected area. In an example, the light-transmission level (with respect to transmission of environmental light rays to an eye) of a selected area can be changed when the area changes from its first configuration to its second configuration due to changes in the distance between the selected area and the first and/or second substantially-transparent layer. In an example, a first distance allows light transmission and a second distance causes light reflection.

In an example, the light-transmission level (with respect to transmission of environmental light rays to an eye) of a selected area can be changed when the area changes from its first configuration to its second configuration due to changes in the density of the selected area. In an example, a first density allows light transmission and a second density causes light reflection. In an example, the light-transmission level (with respect to transmission of environmental light rays to an eye) of a selected area can be changed when the area changes from its first configuration to its second configuration due to changes in the thickness of the selected area. In an example, a first layer thickness allows light transmission and a second layer thickness causes light reflection.

In an example, there can be at least 5 first electromagnetic energy pathways and at least 5 second electromagnetic energy pathways. In an example, a flexible optical layer can be virtually divided into at least 25 areas which can each be individually changed from a first configuration to a second configuration. In an example, there can be at least 10 first electromagnetic energy pathways and at least 10 second electromagnetic energy pathways. In an example, a flexible optical layer can be virtually divided into at least 100 areas which can each be individually changed from a first configuration to a second configuration.

In an example, this eyewear can comprise two substantially-transparent layers, each with a plurality of electromagnetic energy pathways, which comprise an electromagnetic grid or mesh. In an example, this grid can have uniform spacing. In an example, this grid can have non-uniform spacing. In an example, the grid can be denser near the center of a person's field of vision. In an example, spaces defined by this grid can have a shape selected from the group consisting of: square, rectangle, rhombus, trapezoid, and parallelogram. In an example, this eyewear can comprise three substantially-transparent layers, each with a plurality of electromagnetic energy pathways, which comprise an electromagnetic grid or mesh. In an example, spaces defined by this grid can have a shape selected from the group consisting of: triangle and hexagon.

In an example, a first or second substantially-transparent layer can be made from one or more materials selected from the group consisting of: acetate, acrylic, aluminum, aluminum oxide (AO), carbon, carbon nanotubes, copper, copper alloy, elastane, elastomer, ethylene tetrafluoroethylene (ETFE), gallium nitride (GaN), gold, and graphene. In an example, a first or second substantially-transparent layer can be made from one or more materials selected from the group consisting of: indium tin oxide (ITO), liquid metal, Mylar™, neoprene, nickel, nylon, parylene, poly(3,4-ethylenedioxythiophene):poly(styrenesulfonate) (PEDOT:PSS), polyacrylate, polyamide, polyaniline, and polycarbonate.

In an example, a first or second substantially-transparent layer can be made from one or more materials selected from the group consisting of: polyester, polyethylene naphtalate (PEN), polyethylene oxide (PEO), polyethylene terephthalate (PET), polyimide, polymethyl methacrylate (PMMA), polypropylene oxide (PPO), and polypyrrole. In an example, a first or second substantially-transparent layer can be made from one or more materials selected from the group consisting of: polystyrene, polytetrafluoroethylene (PTFE), polytetramethylene oxide (PTMO), polyurethane, and polyvinyl alcohol (PVA). In an example, a first or second substantially-transparent layer can be made from one or more materials selected from the group consisting of: polyvinylidene difluoride (PVDF), polyvinylpyrrolidone (PVP), rayon, silicon, silicon nitride, silicon oxide, silicon oxy nitride ($SiN_xO_y$), silicone, silk, silver, silver alloy, silver epoxy, tantalum oxide, trollium abnoxide, and thermoplastic.

In an example, first electromagnetic energy pathways can be concentric and/or nested circles, ovals, or ellipses. In an example, these concentric and/or nested circular, ovals, or elliptical pathways can be closer together near the center of a person's field of vision. In an example, second electromagnetic pathways can be radial spokes. In an example, rather than comprising an orthogonal grid with "X, Y" coordinates, first and second energy pathways can comprise a compass (or polar) coordinate grid with ("Radius, Angle") coordinates.

In an example, a fourth light-transmission level with respect to transmission of environmental light rays to an eye can be at least 50% less than the third light-transmission level with respect to transmission of environmental light rays to an eye. In an example, the fourth light-transmission level with respect to transmission of environmental light rays to an eye can be at least 50% less than the first light-transmission level with respect to transmission of environmental light rays to an eye. In an example, the fourth light-transmission level with respect to transmission of environmental light rays to an eye can be at least 50% less than the second light-transmission level with respect to transmission of environmental light rays to an eye.

In an example, a fourth light-transmission level with respect to transmission of environmental light rays to an eye can be at least 75% less than the third light-transmission level with respect to transmission of environmental light rays to an eye. In an example, the fourth light-transmission level with respect to transmission of environmental light rays to an eye can be at least 75% less than the first light-transmission level with respect to transmission of environmental light rays to an eye. In an example, the fourth light-transmission level with respect to transmission of environmental light rays to an eye can be at least 75% less than the second light-transmission level with respect to transmission of environmental light rays to an eye.

In an example, a selected area of a flexible optical layer in its first configuration can transmit at least 50% of the light energy from the environment which reaches its outer surface. In an example, a selected area of a flexible optical layer in its first configuration can transmit at least 75% of the light energy from the environment which reaches its outer surface. In an example, a selected area of a flexible optical layer in its first configuration can transmit at least 90% of the light energy from the environment which reaches its outer surface.

In an example, a selected area of a flexible optical layer in its second configuration can block (and/or reflect) at least 25% of the light energy from the environment which reaches its outer surface. In an example, a selected area of a flexible optical layer in its second configuration can block (and/or reflect) at least 50% of the light energy from the environment which reaches its outer surface. In an example, a selected area of a flexible optical layer in its second configuration can block (and/or reflect) at least 75% of the light energy from the environment which reaches its outer surface.

In an example, augmented reality eyewear can include a frontpiece (or front portion) which is configured to span a person's face laterally (i.e. from right to left, or vice versa). In an example, a frontpiece can be a separate piece or separate part which is attached to other pieces (e.g. sidepieces) of an eyewear frame by hinges, joints, or screws. In an example, a front portion can be just one portion (or segment) of a single continuous piece of eyewear which curves around a person's head (e.g. spanning both the front and sides of the person's head). In an example, an eyewear frontpiece (or front portion) can span a person's face across their eyes. In an example, an eyewear frontpiece (or front portion) can span a person's face across their forehead. In an example, an eyewear frontpiece (or front portion) can span a person's face across both their eyes and their forehead.

In an example, a frontpiece (or front portion) of augmented reality eyewear can be arcuate. In an example, a frontpiece (or front portion) can be convex. In an example, an arcuate frontpiece (or front portion) can be configured to curve around the front of a person's head at a substantially constant distance from the surface of the person's head. In an example, a frontpiece (or front portion) of an eyewear frame can be greater distance from a person's head than a sidepiece of an eyewear frame. In an example, a frontpiece (or front portion) can have a central longitudinal axis which is section of a circle or other conic section. In an example, eyewear can have a first (vertical) width as it spans the front of a person's head and a second (vertical) width as it spans the sides of the person's head, wherein the first width is at least twice the second width. In an example, eyewear can bifurcate into lower and upper branches, wherein one or more lenses are held between the lower and upper branches as the eyewear spans the front of a person's head.

In an example, an eyewear frontpiece (or front portion) can further comprise two flexible, soft, compressible, and/or inflatable rings (or cylinders). Each of these rings (or cylinders) can encircle an eye. In an example, a flexible, soft, compressible, and/or inflatable ring (or cylinder) can conform to the contours of a person's face around their eye. This can block out environmental light except light which is transmitted through a lens. In an example, a flexible, soft, compressible, and/or inflatable ring (or cylinder) can be opaque. In an example, a flexible, soft, compressible, and/or inflatable ring (or cylinder) can be filled with foam or gel. In an example, a flexible, soft, compressible, and/or inflatable ring (or cylinder) can comprise an inflatable chamber. In an example, the firmness or softness of a flexible, soft, compressible, and/or inflatable ring (or cylinder) can be adjusted by deflation or inflation of a chamber. In an example, a flexible, soft, compressible, and/or inflatable ring (or cylinder) can span the space between the eye-facing surface of a lens and the portion of a person's face around their eye.

In an example, an eyewear sidepiece (or side portion) can be a separate piece which is connected to an eyewear frontpiece by a hinge or other attachment mechanism. In an example, an eyewear sidepiece can extend forward from a person's ear to connect (e.g. via a hinge) to the end of an eyewear frontpiece. In an example, an eyewear sidepiece (or side portion) can be part of a continuous arcuate piece (which also includes a front portion) which curves around a person's head including their face. In an example, two side portions and a front portion can together comprise a single continuous arcuate eyewear frame. In an example, two sidepieces and a frontpiece can be side and front parts, respectively, of a connected eyewear frame. In an example, a single continuous eyewear frame can curve around a person's head from one ear to the other, spanning the person's eyes. In an example, a single continuous eyewear frame can have a U-shaped central longitudinal axis. In an example, a single continuous eyewear frame can have a C-shaped central longitudinal axis.

In an example, an eyewear frame can completely encircle a person's head like a halo or headband. In an example, a single continuous eyewear frame can have an O-shaped central longitudinal axis. In an example, the central longitudinal axis of an eyewear frame can completely encircle a person's head in a substantially-horizontal manner when the person's head is upright. In an example, the central longitudinal axis of an eyewear frame can encircle a person's head at a forward-facing acute angle relative to a horizontal plane (when the person's head is upright) within the range of 1 to 45 degrees. In an example, the central longitudinal axis of an eyewear frame can encircle a person's head at a forward-facing acute angle relative to a horizontal plane (when the person's head is upright) within the range of 10 to 30 degrees. In an example, the central longitudinal axis of an eyewear frame can encircle a person's head at a forward-facing acute angle relative to a horizontal plane (when the person's head is upright) within the range of 10 to 20 degrees.

In an example, an eyewear sidepiece (or side portion) can span between a person's ear and a frontpiece (or front portion) in a substantially-horizontal manner when the person's head is upright. In an example, an eyewear sidepiece (or side portion) can ascend as it extends from a person's ear to a frontpiece (or front portion). In an example, the front end of an eyewear sidepiece can be higher than the back end of an eyewear sidepiece. In an example, an eyewear sidepiece (or side portion) can descend as it extends from a person's ear to a frontpiece (or front portion). In an example, the front end of an eyewear sidepiece can be lower than the back end of an eyewear sidepiece. In an example, an eyewear sidepiece (or side portion) can undulate up and down as it spans between a person's ear and a frontpiece (or front portion). In an example, the middle portion of an eyewear sidepiece (or side portion) can be higher than its ends.

In an example, augmented reality eyewear can include one or two lenses. In an example, augmented reality eyewear can include a lens which is configured to transmit light from the environment (including images of environmental objects) in real time to a person's eye. In an example, augmented reality eyewear can include a lens which transmits light from the environment to a person's eye, displays images of virtual objects in the person's field of vision, or both. In an example, images of virtual objects can be superimposed on environmental objects into a person's field of vision. In an example, images of virtual objects can appear to interact with environmental objects into a person's field of vision. In an example, augmented reality eyewear can include one or more lenses which transmit environmental light to a person's eye(s) and a separate display surface which displays images of virtual objects in the person's field of vision.

In an example, augmented reality eyewear can comprise two lenses, one for each eye. In an example, augmented reality eyewear can comprise a pair of eyeglasses or goggles. In an example, a lens can be curved. In an example, a lens can have a surface which is a section of a sphere. In an example, a lens can have an aspherical surface. In an example, a lens can have a surface which is a conic section. In an example, a lens can be made from material selected from the group of materials consisting of: acrylic, crystal, dichromated gelatin, glass, photopolymer, photorefractive, photoresist, and silver halide emulsion.

In an example, augmented reality eyewear can comprise one or more lenses which are selected from the group consisting of: aspheric lens, asymmetric lens, collimating lens, compound lens, concave lens, concentric lenses, contact lens, convex lens, curved lens, diverging lens, filtered lens, flat lens, fluid lens, fly's eye lens, Fresnel lens, lens with integrated circuitry, lens with nanoscale gratings, liquid lens, MEMS-based lens array, microlens, mirrored lens, movable lens, optoelectric lens, parabolic lens, prescription lens, semi-reflective lens, simple lens, smart lens, spherical lens, tinted lens, variable-focus lens, virtual curved lens, vision-correcting lens, and wedge-shaped lens.

In an example, the shape, size, position, transparency, light-transmission characteristics, light reflection, and/or image display characteristics of a lens can be changed by a mechanism selected from the group consisting of: adjustable electro-tinting layer; adjustable distance between two flexible transparent components; adjustable distance between two rigid transparent components; adjustable fluid, liquid, or gel lens; adjustable lens concavity or convexity by application of electricity; adjustable liquid crystal structure and/or adjustable LCD matrix; adjustable micro-actuator lens; MEMS-adjustable lens; adjustable mirror array; adjustable spatial light modulator; adjustable multi-layered lens; adjustable optoelectronic or photoelectric component; adjustable photochromic lens; adjustable piezoelectric lens component; lens with adjustable refractive index; lens with adjustable spectral filter.

In an example, images of virtual objects can be superimposed over environmental objects into a person's field of vision. In an example, images of virtual objects can appear to interact with environmental objects into a person's field of vision. In an example, a virtual object can appear to come out of (or go into) an environmental object. In an example, an image of a virtual object can be created in two steps: first, a digital electronic pattern representing a virtual object can be created by a data processor; and, second, this digital electronic pattern can be converted into a pattern of light energy which is perceived by a person as an image of a virtual object. In an example, both of these steps can be performed by an electronically-functional lens (e.g. a "smart lens"). In an example, the first step can be done in a separate data processor and only the second step is done within an electronically-functional lens (e.g. a "smart lens").

In an example, a virtual object can be generated by a computer. A virtual object can be a computer-generated image which is not visible in a screen-independent environmental context with the naked eye, but does appears to a device-wearer in a screen-independent environmental context. A virtual object can be perceptually linked in physical location and/or position relative to a real environmental object in a person's field of vision. In an example, a virtual object can appear to be connected to an environmental object. A virtual object can appear to a viewer as being consistently on top of, adjacent to, or beneath an environmental object. In an example, a virtual object can be super-imposed over (i.e. shown in front of and/or occluding) an environmental object or sub-imposed under (i.e. shown behind and/or occluded by) an environmental object in a person's field of vision. In an example, a virtual object can appear to be moving with an environmental object when the environmental object moves. In an example, both a virtual object and an environmental object can appear to move together, relative to a person's field of vision, when the person moves their head.

In an example, a virtual object can be linked conceptually to an environmental object. In an example, a virtual object can comprise words, symbols, or graphics which convey information about a nearby environmental object. In an example, virtual words providing nutritional information can be displayed near food in a person's field of vision in order to provide the person with information to better manage their food consumption choices. In an example, an unappealing image can be shown near tempting, but unhealthy, food in a person's field of vision to decrease the person's desire to eat that food. For example, a weight-augmented image of a person could be shown near a sugary drink to deter consumption. In an example, a picture of a diseased lung could be shown near a pack of cigarettes to deter smoking. In an example, positive images could be shown near environmental objects which improve a person's health to encourage their consumption and/or use.

In an example, augmented reality eyewear can comprise an image-generating lens. In an example, an image-generating lens can comprise a component selected from the group consisting of: active matrix organic light-emitting diode; active matrix organic light-emitting diode array or matrix; laser diode array or matrix; Light Emitting Diode (LED); Light Emitting Diode (LED) array or matrix; organic light emitting diode (OLED); organic light emitting diode (OLED) array or matrix; passive matrix light-emitting diode; and passive matrix light-emitting diode array or matrix.

In an example, an image-generating lens can comprise a component selected from the group consisting of: computer display; digital pixel array or matrix; holographic optical element; holographic optical element array or matrix; laser array or matrix; micro-display array or matrix; optoelectronic display; photoelectric display; transmission holographic optical element; and transmission holographic optical element array or matrix. In an example, an image-generating lens can comprise a component selected from the group consisting of: coherent image projector; collimated image projector; holoprojector; image projector; laser projector; micro-projector; micro-projector array or matrix; picoprojector; projector; and projector array or matrix.

In an example, an image-generating lens can comprise a component selected from the group consisting of: mirror; mirror array or matrix; micro-mirror array or matrix; reflection holographic optical element; reflection holographic optical element array or matrix; reflection holographic volume grating; reflection holographic volume grating array or matrix; reflective surface; semi-reflective film; and semi-reflective mirror. In an example, an image-generating lens can comprise a component selected from the group consisting of: etched waveguide; etched waveguide array or matrix; fiber optics array or matrix; light channel array or matrix; light guide; light guide array or matrix; light-guiding channel; light-guiding channel array or matrix; light-guiding tube; light-guiding tube array or matrix; light-transmitting nanotube; light-transmitting nanotube array or matrix; optical waveguide; optical waveguide array or matrix; wave guide; wave guide array or matrix; wedge-shaped waveguide; and wedge-shaped waveguide array or matrix.

In an example, an image-generating lens can comprise a component selected from the group consisting of: beam splitter; birefringent material; birefringent material array or matrix; diffraction grating; diffraction grating array or matrix; diffraction optical element array or matrix; directional diffuser; holographic array or matrix; holographic display; nanoscale grating; nanoscale grating array or matrix; photonic metamaterial; photonic metamaterial array or matrix; polarizing beam splitter; prism; prism array or matrix; spatial filter; and spatial light modulator. In an example, an image-generating lens can comprise a component selected from the group consisting of: computer screen; crystal array or matrix; digital display; digital light processor; electronic display; liquid crystal array or matrix; metal oxide semiconductor field effect transistor; metal oxide semiconductor field effect transistor array or matrix; off-axis optical projection system; optical filter; optoelectric lens array or matrix; thin-film transistor; and thin-film transistor array or matrix. In an example, an image-generating lens can comprise a digital light processor. In an example, an image-generating lens can comprise a substrate containing a liquid crystal display.

In an example, augmented reality eyewear can comprise a stereoscopic display. In an example, augmented reality eyewear can have dual displays, one for the right eye and one for the left eye. In an example, augmented reality eyewear can comprise a see-through display screen. In an example, this display screen can be curved. In an example, this curve can be a portion of a cylinder or sphere.

In an example, an image-generating portion of a lens can comprise a lens layer or a series of lens layers. In an example, an image-generating lens layer or layers can be located inside a lens, between two other parts of the lens. In an example, an image-generating lens layer can be located inside a lens, between two other layers of the lens. In an example, an image-generating lens (or portion thereof) can have a two-layer or three-layer composited structure. In an example, an image-generating lens (or portion thereof) can have a two-layer or three-layer laminated structure. In an example, an image-generating portion lens layer can be located on the outside of a lens. In an example, an image-generating portion lens layer can be located on the surface of a lens. In an example, an image-generating lens layer can be electronically-activated. In an example, an image-generating lens layer can include photo-electronic circuitry.

In an example, an image-generating portion of a lens can span the entire (vertical cross-sectional) area of a lens. In an example, an image-generating portion of a lens can span the entire eye-facing surface area of a lens. In an example, an image-generating portion of a lens can span between 25% and 66% of the (vertical cross-sectional) area of a lens. In an example, an image-generating portion of a lens can span between 25% and 66% of the eye-facing surface area of a lens. In an example, an image-generating portion of a lens can span between 10% and 26% of the (vertical cross-sectional) area of a lens. In an example, an image-generating portion of a lens can span between 10% and 26% of the eye-facing surface area of a lens.

In an example, an image-generating portion of a lens can be located on the left half of a lens. In an example, an image-generating portion of a lens can be located on the lower-left quarter of a lens. In an example, an image-generating portion of a lens can be located on the upper-left quarter of a lens. In an example, an image-generating portion of a lens can be located on the right half of a lens. In an example, an image-generating portion of a lens can be located on the lower-right quarter of a lens. In an example, an image-generating portion of a lens can be located on the upper-right quarter of a lens. In an example, an image-generating portion of a lens can be on the lower half of a lens. In an example, an image-generating portion of a lens can be on the upper half of a lens.

In an example, a lens can have a first portion which transmits light from the environment and a second portion which generates images of virtual objects. In an example, the second portion can comprise between 25% and 66% of the eye-facing surface area of the lens. In an example, the second portion can comprise between 25% and 66% of the person's field of vision. In an example, the second portion can comprise between 10% and 26% of the eye-facing surface area of the lens. In an example, the second portion can comprise between 10% and 26% of the person's field of vision.

In an example, a first (environmental light transmitting) portion of a lens can be nested within a second (virtual image generating) portion of a lens. In an example, a first portion can span a person's central field of vision and a second portion can span (some or all of) the person's peripheral field of vision. In an example, first and second portions can be concentric. In an example, first and second portions can be coplanar. In an example, first and second portions can be parallel to each other. In an example, a lens can comprise a first portion which transmits light from the environment, a second portion which generates images of virtual objects, and a third portion which generates images of virtual objects. In an example, the first portion can span a central portion of the lens. In an example, the second and third portions can be located to the right and left sides, respectively, of the first portion. In an example, a lens can include a three-dimensional series of imaging-generating layers. In an example, a lens can include a three-dimensional series of parallel imaging-generating layers.

In an example, an image-generating portion of a lens can comprise an array, matrix, or series of light guides, waveguides, or channels. In an example, an image-generating portion of a lens can comprise an array, matrix, or series of liquid crystals. In an example, an image-generating portion of a lens can comprise an array, matrix, or series of fiber optics. In an example, an image-generating portion of a lens can comprise an array, matrix, or series of diffraction gratings. In an example, an image-generating portion of a lens can comprise an array, matrix, or series of nanotubes. In an example, an image-generating portion of a lens can comprise an array, matrix, or series of meta-materials and/or split-ring resonators. In an example, an image-generating portion of a lens can comprise an array, matrix, or series of LEDs. In an example, an image-generating portion of a lens can comprise an array, matrix, or series of metal oxide semiconductor field effect transistors. In an example, an image-generating portion of a lens can comprise an array, matrix, or series of holographic optical elements.

In an example, an image-generating portion of a lens can comprise a component selected from the group consisting of: active matrix organic light-emitting diode; active matrix organic light-emitting diode array or matrix; laser diode array or matrix; Light Emitting Diode (LED); Light Emitting Diode (LED) array or matrix; organic light emitting diode (OLED); organic light emitting diode (OLED) array or matrix; passive matrix light-emitting diode; and passive matrix light-emitting diode array or matrix. In an example, an image-generating portion of a lens can comprise a component selected from the group consisting of: computer display; digital pixel array or matrix; holographic optical element; holographic optical element array or matrix; laser array or matrix; micro-display array or matrix; micro-mirror array or matrix; optoelectronic display; photoelectric display; transmission holographic optical element; and transmission holographic optical element array or matrix.

In an example, an image-generating portion of a lens can comprise a component selected from the group consisting of: coherent image projector; collimated image projector; holoprojector; image projector; laser projector; micro-projector; micro-projector array or matrix; picoprojector; projector; and projector array or matrix. In an example, an image-generating portion of a lens can comprise a component selected from the group consisting of: mirror; mirror array or matrix; micro-mirror array or matrix; reflection holographic optical element; reflection holographic optical element array or matrix; reflection holographic volume grating; reflection holographic volume grating array or matrix; reflective surface; semi-reflective film; and semi-reflective mirror.

In an example, an image-generating portion of a lens can comprise a component selected from the group consisting of: etched waveguide; etched waveguide array or matrix; fiber optics array or matrix; light channel array or matrix; light guide; light guide array or matrix; light-guiding channel; light-guiding channel array or matrix; light-guiding tube; light-guiding tube array or matrix; light-transmitting nanotube; light-transmitting nanotube array or matrix; optical waveguide; optical waveguide array or matrix; wave guide; wave guide array or matrix; wedge-shaped waveguide; and wedge-shaped waveguide array or matrix.

In an example, an image-generating portion of a lens can comprise a component selected from the group consisting of: beam splitter; birefringent material; birefringent material array or matrix; diffraction grating; diffraction grating array or matrix; diffraction optical element array or matrix; directional diffuser; holographic array or matrix; holographic display; nanoscale grating; nanoscale grating array or matrix; photonic metamaterial; photonic metamaterial array or matrix; polarizing beam splitter; prism; prism array or matrix; spatial filter; and spatial light modulator. In an example, an image-generating portion of a lens can comprise a component selected from the group consisting of: computer screen; crystal array or matrix; digital display; digital light processor; electronic display; liquid crystal array or matrix; metal oxide semiconductor field effect transistor; metal oxide semiconductor field effect transistor array or matrix; off-axis optical projection system; optical filter; optoelectric lens array or matrix; thin-film transistor; and thin-film transistor array or matrix.

In an example, an image-generating portion of a lens can be an array, matrix, or series of diffraction gratings which transmit light from one or more light sources on the perimeter of a lens to one or more points within the perimeter of the lens. In an example, an image-generating portion of a lens can be an array, matrix, or series of nanotubes which transmit light from one or more light sources on the perimeter of a lens to one or more points within the perimeter of the lens. In an example, an image-generating portion of a lens can be an array, matrix, or series of meta-materials and/or split-ring resonators which transmit light from one or more light sources on the perimeter of a lens to one or more points within the perimeter of the lens.

In an example, an image-generating portion of a lens can be a parallel array of light guides, waveguides, or channels. In an example, an image-generating portion of a lens can be a parallel array of liquid crystals. In an example, an image-generating portion of a lens can be a parallel array of fiber optics. In an example, an image-generating portion of a lens can be a parallel array of diffraction gratings. In an example, an image-generating portion of a lens can be a parallel array of nanotubes. In an example, an image-generating portion of a lens can be a parallel array of meta-materials and/or split-ring resonators. In an example, an image-generating portion of a lens can be a parallel array of LEDs.

In an example, an image-generating portion of a lens can comprise a nested array, matrix, or series of light guides, waveguides, or channels. In an example, an image-generating portion of a lens can comprise a nested array, matrix, or series of liquid crystals. In an example, an image-generating portion of a lens can comprise a nested array, matrix, or series of fiber optics. In an example, an image-generating portion of a lens can comprise a nested array, matrix, or series of diffraction gratings. In an example, an image-generating portion of a lens can comprise a nested array, matrix, or series of nanotubes. In an example, an image-generating portion of a lens can comprise a nested array, matrix, or series of meta-materials and/or split-ring resonators. In an example, an image-generating portion of a lens can comprise a nested array, matrix, or series of LEDs. In an example, an image-generating portion of a lens can comprise a nested array, matrix, or series of holographic optical elements.

In an example, an image-generating portion of a lens can be a concentric array of light guides, waveguides, or channels. In an example, an image-generating portion of a lens can be a concentric array of liquid crystals. In an example, an image-generating portion of a lens can be a nested or concentric array of fiber optics. In an example, an image-generating portion of a lens can be a concentric array of diffraction gratings. In an example, an image-generating portion of a lens can be a nested or concentric array of nanotubes. In an example, an image-generating portion of a lens can be a concentric array of meta-materials or split-ring resonators. In an example, an image-generating portion of a lens can be a concentric array of LEDs. In an example, augmented reality eyewear can comprise one or more electroluminescent, incandescent, infrared, photoluminescent, or ultraviolet light sources. In an example, an image-generating portion of a lens can comprise a concentric array of holographic optical elements.

In an example, an image-generating portion of a lens can be a perpendicular ("criss-crossing") matrix of light guides, waveguides, or channels. In an example, an image-generating portion of a lens can be a perpendicular ("criss-crossing") matrix of liquid crystals. In an example, an image-generating portion of a lens can be a perpendicular ("criss-crossing") matrix of fiber optics. In an example, an image-generating portion of a lens can be a perpendicular ("criss-crossing") matrix of diffraction gratings. In an example, an image-generating portion of a lens can be a perpendicular ("criss-crossing") matrix of nanotubes. In an example, an image-generating portion of a lens can be a perpendicular ("criss-crossing") matrix of meta-materials and/or split-ring resonators. In an example, an image-generating portion of a lens can be a perpendicular ("criss-crossing") matrix of LEDs. In an example, an image-generating portion of a lens can be a perpendicular matrix of holographic optical elements.

In an example, an image-generating portion of a lens can comprise a three-dimensional (e.g. multi-layer) array of light guides, waveguides, or channels. In an example, an image-generating portion of a lens can comprise a three-dimensional (e.g. multi-layer) array of liquid crystals. In an example, an image-generating portion of a lens can comprise a three-dimensional (e.g. multi-layer) array of fiber optics. In an example, an image-generating portion of a lens can comprise a three-dimensional (e.g. multi-layer) array of diffraction gratings. In an example, an image-generating portion of a lens can comprise a three-dimensional (e.g. multi-layer) array of nanotubes. In an example, an image-generating portion of a lens can comprise a three-dimensional (e.g. multi-layer) array of meta-materials and/or split-ring resonators. In an example, an image-generating portion of a lens can comprise a three-dimensional (e.g. multi-layer) array of LEDs. In an example, an image-generating portion of a lens can comprise a three-dimensional (e.g. multi-layer) array of holographic optical elements. In an example, a lens can include a micro-mirror array. In an example, a lens with a micro-mirror array can reflect images from a nearby projector or other light source (in a directed and controlled manner) into a person's eye.

In an example, augmented reality eyewear can include an image projector. In an example, an image projector can project images of virtual objects. In an example, an image projector can project images of environmental objects. In an example, an image projector can project a mixture of virtual objects and environmental objects. In an example, augmented reality eyewear can include one or more image projectors can be selected from the group consisting of: collimated image projector; holographic projector; holoprojector; intra-lens image projector; laser projector; microprojector; picoprojector; and projector array.

In an example, an image projector can project images onto a screen, lens, or other reflective surface. In an example, an image projector can project images onto the surface of a screen, lens, or other reflective surface which faces a person's eye. In an example, an image projector can project images onto the surface of a screen, lens, or other reflective surface which faces away from a person's eye, but these images can be seen by the person through the eye-facing surface. In an example, an image projector can project images onto the front a screen, lens, or other reflective surface. In an example, an image projector can project images onto the back a screen, lens, or other reflective surface. In an example, an image projector can project images onto a semi-reflective film, coating, or layer on a lens. In an example, an image projector can project images onto a moving micro-mirror array. In an example, an image projector can project images directly into a person's eye(s). In an example, a beam of light from an image projector can be directed toward the retina of a person's eye.

In an example, an image projector can project collimated and/or coherent light. In an example, an image projector can comprise one or more lasers. In an example, an image projector can project two or more beams of light which intersect to form an interference pattern. In an example, an image projector can project two or more beams of light which intersect to form an interference pattern on, within, or near a lens. In an example, an image projector can project two or more beams of light which intersect to form a hologram on, within, or near a person's eye. In an example, an image projector can comprise one or more lasers. In an example, a projector can project a hologram. In an example, an image projector can project two or more beams of light which intersect to form a hologram. In an example, an image projector can project two or more beams of light which intersect to form a hologram on, within, or near a lens. In an example, an image projector can project two or more beams of light which intersect to form a hologram on, within, or near a person's eye.

In an example, an image projector can face downward. In an example, an image projector can face upwards. In an example, augmented reality eyewear can comprise dual image projectors, one for each eye. In an example, the focal distance of a beam of light can be changed. In an example, the direction of a beam of light can be moved. In an example, the direction of a beam of light from an image projector can be scanned back and forth. In an example, the direction of a beam of light from an image projector can be moved in a circular or spiral path.

In an example, augmented reality eyewear can include an array of image projectors. In an example, augmented reality eyewear can include a movable array of image projectors. In an example, augmented reality eyewear can include an array of image projectors which are distributed along an arcuate surface. In an example, augmented reality eyewear can include an array of image projectors which are distributed along a convex or concave surface. In an example, augmented reality eyewear can include a convex or concave array of image projectors. In an example, augmented reality eyewear can include a parabolic array of image projectors. In an example, augmented reality eyewear can include a circular or elliptical array of image projectors.

In an example, an image projector can be in front of a lens. In an example, an image projector can be behind a lens. In an example, an image projector can be to the right a lens. In an example, an image projector can be located to the left of a lens. In an example, an image projector can be above a lens. In an example, an image projector can be below a lens. In an example, an image projector can be co-planar with a lens. In an example, an image projector can be perpendicular to (the vertical cross-sectional surface of) a lens. In an example, an image projector can be located on a sidepiece of an eyewear frame, between a person's ear and a frontpiece. In an example, an image projector can be located on a frontpiece of an eyewear frame, wherein the frontpiece spans a portion of a person's forehead. In an example, there can be two image projectors on a frontpiece which spans a portion of a person's forehead—a right-side projector above the right eye and a left-side projector above the left eye.

In an example, augmented reality eyewear can include an array of image projectors pointed toward the eye-facing surface of a lens. In an example, augmented reality eyewear can include an array (e.g. a circular or elliptical array) of image projectors on the perimeter of a lens. In an example, augmented reality eyewear can include an array (e.g. a circular or elliptical array) of image projectors around a lens. In an example, augmented reality eyewear can include an array (e.g. a circular or elliptical array) of image projectors configured around a person's eye. In an example, augmented reality eyewear can include a three-dimensional stacked array of image projectors.

In an example, an image projector can be in front of a screen or other reflective surface. In an example, an image projector can be behind a screen or other reflective surface. In an example, an image projector can be to the right of a screen or other reflective surface. In an example, an image projector can be to the left of a screen or other reflective surface. In an example, an image projector can be located above a screen or other reflective surface. In an example, an image projector can be located below a screen or other reflective surface. In an example, an image projector can be co-planar with a screen or other reflective surface. In an example, an image projector can be perpendicular to (the vertical cross-sectional surface of) a screen or other reflective surface. In an example, augmented reality eyewear can include an array of image projectors pointed toward a screen or other reflective surface. In an example, augmented reality eyewear can include an array (e.g. a circular or elliptical array) of image projectors around a screen or other reflective surface.

In an example, augmented reality eyewear can include one or more cameras. In an example, augmented reality eyewear can include two cameras for three-dimensional imaging and environmental pattern recognition. In an example, augmented reality eyewear can create a three-dimensional model of a person's physical environment. In an example, images of the environment captured by a camera can be transmitted to a person's eye via an image-generating lens (e.g. "smart lens"). In an example, images of the environment captured by a camera can be transmitted to a person's eye via an image-generating display. In an example, images of the environment captured by a camera can be transmitted to a person's eye via an image projector.

In an example, images of environmental objects captured by a camera can be used to simulate interaction between a virtual object and an environmental object in a person's field of vision. In an example, a virtual object can be superimposed on (shown on top of), sub-imposed under (shown underneath), or shown adjacent to (near) an environmental object. In an example, augmented reality can further comprise a camera which captures light reflected from a person's eye. In an example, patterns of light reflected from a person's retina can be used for identity validation purposes.

In an example, a first light-transmitting member (for transmitting environmental light) can be selected from the group consisting of: aspheric lens, asymmetric lens, collimating lens, compound lens, concave lens, concentric lenses, contact lens, convex lens, curved lens, diverging lens, filtered lens, flat lens, fluid lens, fly's eye lens, Fresnel lens, lens array, lens with adjustable concavity or convexity, lens with adjustable distance between two rigid components, lens with adjustable refractive index, lens with electro-tinting, lens with integrated circuitry, lens with nanoscale gratings, liquid lens, MEMS-adjustable lens, MEMS-based lens array, microlens, mirrored lens, movable lens, optoelectric lens, optoelectronic lens, parabolic lens, photoelectric lens, piezoelectrically-adjustable lens, prescription lens, semi-reflective lens, simple lens, smart lens, spherical lens, tinted lens, variable-focus lens, virtual curved lens, vision-correcting lens, and wedge-shaped lens.

In an example, a second light-transmitting member (for displaying virtual objects) can comprise one or more components selected from the group consisting of: active matrix organic light-emitting diode; active matrix organic light-emitting diode array or matrix; laser diode array or matrix; Light Emitting Diode (LED); Light Emitting Diode (LED) array or matrix; organic light emitting diode (OLED); organic light emitting diode (OLED) array or matrix; passive matrix light-emitting diode; and passive matrix light-emitting diode array or matrix. In an example, a second light-transmitting member can comprise one or more components selected from the group consisting of: computer display; digital pixel array or matrix; holographic optical element; holographic optical element array or matrix; laser array or matrix; micro-display array or matrix; micro-mirror array or matrix; optoelectronic display; photoelectric display; transmission holographic optical element; and transmission holographic optical element array or matrix.

In an example, a second light-transmitting member can comprise one or more components selected from the group consisting of: coherent image projector; collimated image projector; holoprojector; image projector; laser projector; micro-projector; micro-projector array or matrix; picoprojector; projector; and projector array or matrix. In an example, a second light-transmitting member can comprise one or more components selected from the group consisting of: mirror; mirror array or matrix; reflection holographic optical element; reflection holographic optical element array or matrix; reflection holographic volume grating; reflection holographic volume grating array or matrix; reflective surface; semi-reflective film; and semi-reflective mirror.

In an example, a second light-transmitting member can comprise one or more components selected from the group consisting of: etched waveguide; etched waveguide array or matrix; fiber optics array or matrix; light channel array or matrix; light guide; light guide array or matrix; light-guiding channel; light-guiding channel array or matrix; light-guiding tube; light-guiding tube array or matrix; light-transmitting nanotube; light-transmitting nanotube array or matrix; optical waveguide; optical waveguide array or matrix; wave guide; wave guide array or matrix; wedge-shaped waveguide; and wedge-shaped waveguide array or matrix.

In an example, a second light-transmitting member can comprise one or more components selected from the group consisting of: beam splitter; birefringent material; birefringent material array or matrix; diffraction grating; diffraction grating array or matrix; diffraction optical element array or matrix; directional diffuser; holographic array or matrix; holographic display; nanoscale grating; nanoscale grating array or matrix; photonic metamaterial; photonic metamaterial array or matrix; polarizing beam splitter; prism; prism array or matrix; spatial filter; and spatial light modulator. In an example, a second light-transmitting member can comprise one or more components selected from the group consisting of: computer screen; crystal array or matrix; digital display; digital light processor; electronic display; liquid crystal array or matrix; metal oxide semiconductor field effect transistor; metal oxide semiconductor field effect transistor array or matrix; off-axis optical projection system; optical filter; optoelectric lens array or matrix; thin-film transistor; and thin-film transistor array or matrix.

In an example, a first light-transmitting member and a second light-transmitting member can be separate parts of augmented reality eyewear. In an example, a second light-transmitting member can be above a first light-transmitting member. In an example, a second light-transmitting member can be below a first light-transmitting member. In an example, a second light-transmitting member can be adjacent to a first light-transmitting member. In an example, a second light-transmitting member can be behind a first light-transmitting member. In an example, a second light-transmitting member can be in front of a first light-transmitting member. In an example, a second light-transmitting member can be below a first light-transmitting member. In an example, a second light-transmitting member can be above a first light-transmitting member. In an example, a second light-transmitting member can be co-planar with a first light-transmitting member, or vice versa. In an example, a second light-transmitting member can cover a portion of a first light-transmitting member. In an example, a first light-transmitting member can cover a portion of a second light-transmitting member.

In an example, a second light-transmitting member can be in front of a first light-transmitting member, or vice versa. In an example, a second light-transmitting member can be parallel to first light-transmitting member, or vice versa. In an example, a second light-transmitting member can be perpendicular to first light-transmitting member, or vice versa. In an example, a second light-transmitting member can be separated by a constant distance from a first light-transmitting member, or vice versa. In an example, a second light-transmitting member can be to the left of a first light-transmitting member, or vice versa. In an example, a second light-transmitting member can be to the right of a first light-transmitting member, or vice versa.

In an example, a first light-transmitting member and a second light-transmitting member can be portions of the same part of augmented reality eyewear. In an example, a second light-transmitting member can be a subset or part of a first light-transmitting member, or vice versa. In an example, a second light-transmitting member can be a layer of a first light-transmitting member, or vice versa. In an example, a second light-transmitting member can be a sub-set of a first light-transmitting member, or vice versa. In an example, a second light-transmitting member can be interlaced with first light-transmitting member, or vice versa.

In an example, a second light-transmitting member can be layered with a first light-transmitting member, or vice versa. In an example, a second light-transmitting member can be nested with a first light-transmitting member, or vice versa. In an example, a second light-transmitting member can overlap a first light-transmitting member, or vice versa. In an example, a second light-transmitting member can be peripheral to a first light-transmitting member, or vice versa. In an example, a second light-transmitting member can be within the perimeter of a first light-transmitting member, or vice versa.

In an example, a second light-transmitting member can span between 10% and 25% of the surface area of a first light-transmitting member. In an example, a second light-transmitting member can span between 20% and 50% of the surface area of a first light-transmitting member. In an example, a second light-transmitting member can span between 10% and 25% of the eye-facing area of a first light-transmitting member. In an example, a second light-transmitting member can span between 20% and 50% of the eye-facing area of a first light-transmitting member. In an example, a second light-transmitting member can have an eye-facing surface area which is 10% to 25% of the size of the eye-facing area of a first light-transmitting member. In an example, a second light-transmitting member can have an eye-facing surface area which is 20% to 50% of the size of the eye-facing area of a first light-transmitting member.

In an example, an image display can span between 10% and 25% of the surface area of a lens. In an example, an image display can span between 20% and 50% of the surface area of a lens. In an example, an image display can span between 10% and 25% of the eye-facing area of a lens. In an example, an image display can span between 20% and 50% of the eye-facing area of a lens. In an example, an image display can have an eye-facing surface area which is 10% to 25% of the size of the eye-facing area of a lens. In an example, an image display can have an eye-facing surface area which is 20% to 50% of the size of the eye-facing area of a lens.

In an example, an image-reflecting screen can span between 10% and 25% of the surface area of a lens. In an example, an image-reflecting screen can span between 20% and 50% of the surface area of a lens. In an example, an image-reflecting screen can span between 10% and 25% of the eye-facing area of a lens. In an example, an image-reflecting screen can span between 20% and 50% of the eye-facing area of a lens. In an example, an image-reflecting screen can have an eye-facing surface area which is 10% to 25% of the size of the eye-facing area of a lens. In an example, an image-reflecting screen can have an eye-facing surface area which is 20% to 50% of the size of the eye-facing area of a lens.

In an example, a first portion of a light-transmitting lens, display, reflector, projector, or screen can transmit light from real-time environmental objects and a second portion of the light-transmitting lens, display, reflector, projector, or screen can transmit images of virtual objects. In an example, a light-transmitting lens, display, reflector, projector, or screen can transmit light which combines an external view of real-time environmental object with a generated view of virtual objects. In an example, augmented reality eyewear can comprise a pair of right-side and left-side light-transmitting lenses, displays, reflectors, projectors, or screens—one for each eye. In an example, augmented reality eyewear can have a single lens and a single display which each span both eyes. In an example, augmented reality eyewear can comprise two lenses (one for each eye) and two displays (one for each eye). In an example, augmented reality eyewear can comprise a two-dimensional array of multiple light-transmitting lenses, displays, reflectors, projectors, or screens. In an example, augmented reality eyewear can comprises a three-dimensional array of multiple light-transmitting lenses, displays, reflectors, projectors, or screens.

In an example, a light-transmitting lens can comprise a plurality of carbon nanotubes, etched waveguides, light-guiding tubes, light-guiding channels, and/or nanoscale gratings. In an example, a light-transmitting lens can comprise a light-guiding metamaterial structure, photonic metamaterial, and/or birefringent material.

In an example, a light-transmitting lens, display, reflector, projector, or screen can comprise a crystalline structure. In an example, a light-transmitting lens, display, reflector, projector, or screen can comprise a structure selected from the group consisting of: a crystal array, an array of crystals with different alignments, an array of crystals with different orientations, immobilized liquid crystals, liquid crystal monomers, liquid crystals, liquid crystals on a silicon display, photonic crystals, two liquid crystal areas with different refractive indexes. In an example, a light-transmitting lens, display, reflector, projector, or screen can comprise fiber optics. In an example, it can comprise a plurality of parallel optical fibers. In an example, a light-transmitting lens, display, reflector, projector, or screen can comprise a cylindrical prism. In an example, a light-transmitting lens, display, reflector, projector, or screen can comprise a volume grating. In an example, a light-transmitting lens, display, reflector, projector, or screen can comprise a diffractive optical element. In an example, a light-transmitting lens, display, reflector, projector, or screen can comprise a digital light processor.

In an example, a light-transmitting member can be a display which transmits images of real-time environmental objects which have been captured by a camera. In an example, a display can transmit images of environmental objects in real time to a person's eye. In an example, a display can be curved. In an example, a display can have a surface which is a section of a sphere. In an example, a display can have a surface which is a conic section. In an example, a light-transmitting member can be a projector which projects images of environmental objects which have been captured by a camera in real time. In an example, a projector can project these images onto a screen on (or near) the person's head. In an example, a projector can project these images onto a lens. In an example, a projector can project images directly into a person's eye.

In an example, an overall category of eyewear for augmented reality eyewear can be selected from the group consisting of: augmented reality headset, contact lens or lenses, electronically-functional glasses, eye glasses-type display, eyeglasses, face mounted display, goggles, head band, head mounted display, head worn display, heads up display, helmet, monocle, near eye display, pair of eyeglasses, prescription eyeglasses, see-through head-mounted display, smart glasses, sunglasses, virtual reality headgear, virtual reality headset, and visor. In an example, augmented reality eyewear can comprise an eyewear frame. This eyewear frame can hold electromagnetic and optic components on or near (e.g. within 4" of) a person's head.

In an example, an eyewear frame can comprise different pieces which are connected by hinges or other connecting mechanisms. In an example, an eyewear frame can comprise a frontpiece and two sidepieces. In an example, an eyewear frame can further include one or more back loops (which loop around the rear portion of the person's head). In an example, an eyewear frame can further include one or more top loops (which loop over the top portion of the person's head). In an example, an eyewear frame can further include a flexible forehead band (which spans across a person's forehead from side to side).

In an example, an eyewear frame can comprise a single continuous arcuate member. In an example, an eyewear frame can comprise a single continuous arcuate member which curves around the front of a person's face (over their eyes) from one ear to the other ear. In an example, an eyewear frame can comprise a single continuous arcuate band which laterally encircles a person's head like a halo or headband. In an example, an arcuate band can encircle a person's head in a substantially horizontal manner when a person's head is upright. In an example, an arcuate band which encircles a person's head can be undulating, wavy, and/or sinusoidal.

In an example, a frontpiece of an eyewear frame for augmented reality eyewear can comprise right and left side receptacles for right and left side lenses, displays, and/or screens. In an example, augmented reality eyewear can further comprise right and left side eye cups. In an example, a right eye cup can isolate a person's right eye from light from any source other than a right side lens, display, screens, or projector. In an example, a left eye cup can isolate a person's left eye from light from any source other than a left side lens, display, screens, or projector. In an example, an eyewear frame can comprise a single curved receptacle to hold a single curved lens, display, or screen.

In an example, an eyewear frame of augmented reality eyewear can include two sidepieces. In an example, the front ends of these two sidepieces can connect to the right and left side ends, respectively, of a frontpiece. In an example, the back portion of a sidepiece can curve and/or hook around the back of person's ear. In an example, the back portion of a sidepiece can connect to a rear loop which loops around the rear portion of a person's head. In an example, a sidepiece and a rear loop can both be part of a continuous arcuate band which spans from the front of a person's head on one side, around the rear of the person's head, and then back to the front on the other side. In an example, an eyewear frame can curve around a person's face, from one ear to the other. In an example, a sidepiece and a rear loop can be portions of a continuous arcuate band which encircles a persons' head, holding electromagnetic and optical components in proximity to the person's head.

In an example, a sidepiece can bifurcate (or divide) as it spans a portion of a person's head above the person's ear. In an example, augmented reality eyewear can comprise an upper sidepiece and a lower sidepiece on the same side of the head. In an example, augmented reality eyewear can comprise a first sidepiece which spans the side of a person's head at a first height and a second sidepiece which spans the same side of the person's head at a second height, wherein the second height is greater than the first height. In an example, augmented reality eyewear can comprise a first sidepiece which spans the side of a person's head at a first average height and a second sidepiece which spans the same side of the person's head at a second average height, wherein the second average height is at least 1" greater than the first average height. In an example, augmented reality eyewear can comprise a first sidepiece which spans the side of a person's head with a first maximum height and a second sidepiece which spans the same side of the person's head with a second maximum height, wherein the second maximum height is at least 1" greater than the first maximum height.

In an example, an eyewear frame of augmented reality eyewear can encircle a person's head. In an example, an eyewear frame of augmented reality eyewear can encircle a person's head in a substantially lateral and/or horizontal manner. In an example, the eyewear frame of augmented reality eyewear can encircle a person's head above their ears. In an example, augmented reality eyewear can comprise a head-circling band. In an example, one or more portions of this band can be elastic and/or stretchable. In an example, augmented reality eyewear can comprise an elastic headband. In an example, an eyewear frame can be a generally-horizontal band which encircles a person's head, spanning a portion of their forehead and spanning the side of their head above their ears. In an example, a head-circling band can be undulating, wavy, and/or sinusoidal. In an example, an undulating head-circling band can have three upward waves and/or undulations. In an example, an undulating head-circling band can comprise three wave cycles. In an example, an undulating head-circling band can have four or more upward waves and/or undulations. In an example, an undulating head-circling band can comprise four or more wave cycles.

In an example, augmented reality eyewear can comprise a head-circling band which is substantially-horizontal when worn by a person whose head is upright. In an alternative example, a head-circling band can tilt downward by an angle in the range of 1 to 25 degrees toward the back of a person's head. In an example, a head-circling band can tilt upward by an angle in the range of 1 to 25 degrees toward the back of a person's head. In an example, the "best fit plane" for a head-circling band can be defined as the two-dimensional plane which minimizes the sum of squared distance deviations between the plan and the band. In an example, the "head horizontal plane" can be defined as a horizontal plane relative to a person's head when the person holds their head upright. In an example, the "best fit plane" for a head-circling band can form an anterior-facing angle in the range of 1 to 25 degrees as it intersects the "head horizontal plane." In an example, the "best fit plane" for a head-circling band can form a posterior-facing angle in the range of 1 to 25 degrees as it intersects the "head horizontal plane."

In an example, the front portion of a head-circling band can be wider than the back portion of the head-circling band. In an example, the front of a head-circling band can bifurcate (or divide) to form receptacles for one or more lenses, screens, or displays. In an example, the front portion of a head-circling band can bifurcate (or divide) into two branches or bands, wherein an upper branch or band spans a portion of a person's forehead. In an example, the side of a head-circling band can bifurcate or (divide) into two branches or bands, wherein the lower branch or band rests on a person's ear. In an example, the rear portion of a head circling band can be wider than the front portion of the head-circling band. In an example, the side of a head-circling band can bifurcate or divide into two branches or bands. In an example, a head-circling band can bifurcate or divide as it spans the side of a person's head. In an example, the side of a head-circling band can bifurcate, with only the lower branch of this bifurcation resting on the person's ear. In an example, a head-circling band can bifurcate as it spans the rear portion of a person's head.

In an example, inner and outer bands of a head-encircling band can be connected to each other on the sides of a person's head, near (e.g. within 2" of) a person's ears. In an example, an outer band is configured to completely encircle a person's head, but an inner band is configured to only span a portion of the person's head. In an example, an outer band can completely encircle a person's head, but an inner band only spans the front of the person's head. In an example, an outer band completely encircles a person's head, but an inner band only spans the person's forehead. In an example, a relatively-rigid outer band completely encircles a person's head and a relatively-elastic inner band only spans the person's forehead. In an example, an outer band completely encircles a person's head, but an inner band only spans the back portion a person's head. In an example, a relatively-rigid outer band completely encircles a person's head and a relatively-elastic inner band only spans the back portion of the person's head.

In an example, augmented reality eyewear can include a reflective surface. In an example, a reflective surface can reflect light from environmental objects into a person's eye. In an example, a reflective surface can reflect a projected image of a virtual object into a person's eye. In an example, a reflective surface can span a portion (e.g. 10%-25%) of the eye-facing surface area of a lens. In an example, a reflective surface can span a portion (e.g. 25%-50%) of the eye-facing surface area of a lens. In an example, a reflective surface can span the entire eye-facing surface of a lens. In an example, a reflective surface can be curved and/or arcuate. In an example, a reflective surface can be convex. In an example, a reflective surface can be parabolic. In an example, augmented reality eyewear can include two or more nested reflective surfaces. In an example, a reflective surface can be retro-reflective.

In an example, a reflective surface in augmented reality eyewear can be an aspherical mirror. In an example, a reflective surface in augmented reality eyewear can be a MicroElectroMechanical systems (MEMS) controlled mirror array. In an example, a reflective surface in augmented reality eyewear can be a parabolic mirror. In an example, a reflective surface can be a semi-reflective mirror. In an example, a reflective surface can be a dichroic mirror. In an example, a reflective surface in augmented reality eyewear can reflect a beam from an image projector into a person's eye. In an example, a reflective surface can comprise an array of micro-mirrors. In an example, a reflective surface can be an array of moving micro-mirrors. In an example, micro-mirrors can be tilted or rotated. In an example, micro-mirrors can be moved by MEMS components. In an example, a reflective surface can comprise a moving array of flat mirrors. In an example, a reflective surface can comprise an array of reflective polygons. In an example, a reflective surface can comprise an array of curved mirrors. In an example, a reflective surface can comprise a surface with glass beads. In an example, a reflective surface can comprise birefringent material.

In an example, augmented reality eyewear can include one or more cameras. In an example, one or more cameras can be part or (or attached to) an eyewear frame. In an example, a camera can be a wide-angle camera. In an example, a camera can be automatically moved. In an example, the focal direction of an eyewear-mounted camera can be automatically changed by an electromagnetic actuator.

In an example, augmented reality eyewear can include one or more components selected from the group consisting of: data processor, computer storage devices, data control unit, computer chip, and data memory. In an example, augmented reality eyewear can include one or more components selected from the group consisting of: wireless data transmitter, wireless data receiver, and wireless data transceiver. In an example, augmented reality eyewear can be in wireless communication in with one or more separate and/or remote devices selected from the group consisting of: cell phone, mobile phone, electronic tablet, electronic pad, laptop computer, desktop computer, smart watch, smart wrist band, smart clothing, home environment control system, building security system, robot, smart appliance, cloud access port, and mainframe.

In an example, augmented reality eyewear can include a local power source. In an example, augmented reality eyewear can include a battery. In an example, such eyewear can harvest and/or transduce power from kinetic or mechanical energy due to body motion. In an example, such eyewear can harvest and/or transduce power from a person's body thermal energy. In an example, such eyewear can have thermoelectric elements which harvest and/or transduce power from a person's body thermal energy. In an example, such eyewear can use liquid metal (such as a mixture of gallium and indium) to harvest and/or transduce power from a person's body thermal energy. In an example, such eyewear can harvest and/or transduce power from solar energy, indoor lighting energy, ambient or localized radiofrequency energy, or ambient thermal energy.

In an example, augmented reality eyewear can further comprise include one or more sensors selected from the group consisting of: inertial motion sensor, accelerometer, gyroscope, GPS module, inclinometer, magnetometer, impedance sensor, permittivity sensor, resistance sensor, microphone, sound sensor, thermal energy sensor, ambient light sensor, air pressure sensor, and humidity sensor.

In an example, augmented reality eyewear can further comprise an eye tracker (such as an optical sensor) which tracks the position and/or focal direction of a person's eye. In an example, eye tracking can enable control of a virtual object based on movement of a person's eye. In an example, eyewear can further comprise a frame-mounted camera which tracks the movement and focal direction of a person's eye.

In an example, augmented reality eyewear can further comprise a haptic computer-to-human interface. In an example, such eyewear can include a vibrating member, buzzer, roller, or electrical pulse generator which sends vibrations or electrical pulses to a person's body. In an example, such eyewear can further comprise an auditory computer-to-human interface. In an example, such eyewear can include an earphone, headset, and/or speaker. In an example, such eyewear can communicate with the wearer by generating voice messages, tones, alarms, songs, or other auditory stimuli. In an example, this eyewear can further comprise one or more components selected from the group consisting of: battery or other power source; data processing unit; data transmitter; and data receiver.

In an example, augmented reality eyewear can comprise: a lens which is configured to transmit light from the environment to a person's eye; an image projector (or display) which projects (or displays) images of virtual objects; a first holographic optical element; and a second holographic optical element, wherein the image projector (or display) is configured to project (or display) the images of virtual objects toward the first holographic optical element, wherein the images of virtual objects are guided from the first holographic element to the second holographic optical element, and wherein the second holographic optical element is configured to direct the images of virtual objects toward the person's eye. In an example, augmented reality eyewear can comprise two lenses which are configured to transmit light from the environment to a person's eyes. In an example, augmented reality eyewear can comprise two image projectors (or displays).

In an example, first and second holographic optical elements can be co-planar. In an example, first and second holographic optical elements can be parallel to each other. In an example, the cross-sectional planes of first and second holographic optical elements can form an acute angle as their virtual extensions intersect in three-dimensional space. In an example, first and second holographic optical elements can have a first configuration in which virtual extensions of their cross-sectional planes intersect at a first angle and a second configuration in which virtual extensions of their cross-sectional planes intersect at a second angle.

In an example, augmented reality eyewear can modify visual attributes of environmental objects into a person's field of vision. In an example, augmented reality eyewear can change the brightness of one or more environmental objects into a person's field of vision. In an example, augmented reality eyewear can change the apparent color of one or more environmental objects into a person's field of vision. In an example, augmented reality eyewear can virtually change the apparent texture of one or more environmental objects into a person's field of vision. In an example, augmented reality eyewear can change the polarization of light from one or more environmental objects into a person's field of vision. In an example, augmented reality eyewear can virtually change the orientation of one or more environmental objects into a person's field of vision. In an example, augmented reality eyewear can virtually change the size of one or more environmental objects into a person's field of vision.

In an example, augmented reality eyewear can change the color and/or light spectrum of an environmental object in a person's field of vision. In an example, augmented reality eyewear can change the mixture and/or relative proportions of environmental objects and virtual objects shown in a person's field of vision. In an example, augmented reality eyewear can create a stylized view of a person's environment in their field of vision. In an example, augmented reality eyewear can create a three-dimensional map of a person's environment. In an example, augmented reality eyewear can create a virtual cursor, keypad, or keyboard in a person's field of vision. In an example, augmented reality eyewear can create a virtual object in a person's field of vision.

In an example, augmented reality eyewear can create a virtual object which appears to come out of (or go into) an environmental object in a person's field of vision. In an example, augmented reality eyewear can create an image of a virtual object whose location is tied to an environmental object in a person's field of vision. In an example, augmented reality eyewear can create virtual outlines for environmental objects into a person's field of vision. In an example, augmented reality eyewear can discourage unhealthy behavior by displaying an aversive image in a person's field of vision. In an example, augmented reality eyewear can display a virtual menu from which a person can select an option. In an example, augmented reality eyewear can display virtual text related to an environmental object in a person's field of vision.

In an example, augmented reality eyewear can encourage healthy behavior by displaying an attractive image in a person's field of vision. In an example, augmented reality eyewear can generate a three-dimensional virtual scene in a person's field of vision. In an example, augmented reality eyewear can highlight significant recognized environmental objects or people in a person's field of vision. In an example, augmented reality eyewear can link a virtual object to an environmental object in a person's field of vision. In an example, augmented reality eyewear can move a virtual object in response to changes in a person's focal direction. In an example, augmented reality eyewear can replace a selected environmental object with a selected virtual object in a person's field of vision. In an example, augmented reality eyewear can show interaction between environmental objects and virtual objects into a person's field of vision.

In an example, augmented reality eyewear can sub-impose a virtual object under an environmental object in a person's field of vision. In an example, augmented reality eyewear can superimpose a virtual map and/or directions on a person's view of their environment. In an example, augmented reality eyewear can super-impose a virtual object over an environmental object in a person's field of vision. In an example, augmented reality eyewear can virtually change the size or shape of an environmental object in a person's field of vision. In an example, augmented reality eyewear can virtually display information concerning food in a person's environment.

In an example, a virtual object generator can be an image projector or an array of light emitters. In an example, an environmental light modifier can be a lens. In an example, it can be a smart lens with electronic functionality and image display capability. In an example, a virtual object generator can be an image projector or an array of light emitters. In an example, an environmental light modifier can be a lens. In an example, it can be a smart lens with electronic functionality and image display capability. In an example, analysis of images from the camera can be used to position the virtual object so that it appears to be consistently in proximity to (e.g. behind, on top of, or next to) an environmental object in the person's field of vision.

In an example, an image projector can be located along the side of a person's head, slightly forward of their ear, and projects light onto the eye-facing surface of the lens. In an example, there can be two image projectors, one on each side of the person's head. In an example, a camera can be located on the front of the person's head, above their eyes. In an example, a camera can be located along the side of a person's head. In an example, there can be two cameras, one on each side of the person's head. In an example, there can be a single curved lens which spans both eyes. In an example, there can be two separate lenses, one in front of the left eye and one in front of the right eye.

In an example, augmented reality eyewear can comprise electromagnetic perturbation of a flexible optical layer for localized occlusion of environmental light rays comprising: an eyewear frame which is configured to be worn by a person; an image projector which is held in place by the eyewear frame, wherein this image projector displays virtual objects in the person's field of vision; a first substantially-transparent layer, wherein this first substantially-transparent layer has a first light-transmission level with respect to transmission of environmental light rays to an eye, and wherein this first substantially-transparent layer further comprises a plurality of first electromagnetic energy pathways; a second substantially-transparent layer, wherein this second substantially-transparent layer has a second light-transmission level with respect to transmission of environmental light rays to an eye, wherein this second substantially-transparent layer further comprises a plurality of second electromagnetic energy pathways; and a flexible optical layer, wherein the flexible optical layer is virtually divided into a plurality of areas, wherein a selected area has a first configuration in which the flexible optical layer in that area is substantially flat and a second configuration in which the flexible optical layer in that area is not flat, wherein the selected area has a third light-transmission level with respect to transmission of environmental light rays to an eye when it is in its first configuration and has a fourth light-transmission level with respect to transmission of environmental light rays to an eye when it is in its second configuration, wherein the fourth light-transmission level with respect to transmission of environmental light rays to an eye is at least 25% less than the third light-transmission level with respect to transmission of environmental light rays to an eye, wherein the fourth light-transmission level with respect to transmission of environmental light rays to an eye is at least 25% less than the first light-transmission level with respect to transmission of environmental light rays to an eye, wherein the fourth light-transmission level with respect to transmission of environmental light rays to an eye is at least 25% less than the second light-transmission level with respect to transmission of environmental light rays to an eye, and wherein the selected area is changed from its first configuration to its second configuration by the transmission of electromagnetic energy through one or more selected first electromagnetic energy pathways and through one or more selected second electromagnetic energy pathways.

In an example, the flexible optical layer can be in a gap between the first substantially-transparent layer and the second substantially-transparent layer. In an example, the selected area of the flexible optical layer can be changed from its first configuration to its second configuration by electromagnetic attraction to a substantially-transparent layer and/or by electromagnetic repulsion away from a substantially-transparent layer.

In an example, the selected area can be changed from its first configuration to its second configuration by the transmission of electromagnetic energy through one or more selected first electromagnetic energy pathways and through one or more selected second electromagnetic energy pathways; and wherein virtual shadow projections of these pathways intersect within the selected area when these pathways are virtually shadow projected through three-dimensional space onto the plane of the flexible optical layer.

In an example: virtual shadow projections of the longitudinal axes of first electromagnetic energy pathways through three-dimensional space onto the plane of the flexible optical layer form "X" axes; virtual shadow projections of longitudinal axes of second electromagnetic energy pathways through three-dimensional space onto the plane of the flexible optical layer form "Y" axes; wherein these virtual shadow "X" and "Y" axes are substantially orthogonal; and transmission of electromagnetic energy through a selected "X, Y" pair of first and second electromagnetic energy pathways changes an area at the "X,Y" intersection from its first configuration to its second configuration.

In an example, a plurality of selected areas of the flexible optical layer can each be changed from their first configuration to their second configuration by the transmission of electromagnetic energy through a plurality of selected first electromagnetic energy pathways and second electromagnetic energy pathways in order to create a composite area of reduced transmission of environmental light rays and wherein this composite area is at least partially behind a virtual object in the person's field of vision.

In an example, a selected area of the flexible optical layer is flat in its first configuration and has one or more perturbations, undulations, sinusoidal waves, bulges, bumps, protrusions, domes, spikes, and/or plateaus in its second configuration.

In an example, electromagnetic energy can be transmitted through the first electromagnetic energy pathways in a first direction, pattern, or sequence and electromagnetic energy can be transmitted through the second electromagnetic energy pathways in a second direction, pattern, or sequence; and wherein the second direction, pattern, or sequence is different than the first direction, pattern, or sequence.

In an example, first and second electromagnetic energy pathways can be made with a transparent electroconductive material. In an example, the longitudinal axes of first electromagnetic energy pathways can be substantially parallel to each other. In an example, the first substantially-transparent layer and the second substantially-transparent layer can be substantially parallel to each other. In an example, a flexible optical layer can be a continuous reflective membrane or film. In an example, a flexible optical layer can be a composite and/or mesh of flexibly-connected polygonal elements. In an example, a flexible optical layer can comprise a fluid.

In an example, the light-transmission level with respect to transmission of environmental light rays to an eye of a selected area can be changed when the area changes from its first configuration to its second configuration due to changes in the angles at which environmental light rays intersect the selected area. In an example, the light-transmission level with respect to transmission of environmental light rays to an eye of a selected area can be changed when the area changes from its first configuration to its second configuration due to changes in the distance between the selected area and the first and/or second substantially-transparent layer.

In an example, the light-transmission level with respect to transmission of environmental light rays to an eye of a selected area can be changed when the area changes from its first configuration to its second configuration due to changes in the density of the selected area. In an example, the light-transmission level with respect to transmission of environmental light rays to an eye of a selected area can be changed when the area changes from its first configuration to its second configuration due to changes in the thickness of the selected area.

In an example, a flexible optical layer can be virtually divided into at least 10 areas which can each be individually changed from a first configuration to a second configuration. In an example: the fourth light-transmission level with respect to transmission of environmental light rays to an eye can be at least 50% less than the third light-transmission level with respect to transmission of environmental light rays to an eye, wherein the fourth light-transmission level with respect to transmission of environmental light rays to an eye can be at least 50% less than the first light-transmission level with respect to transmission of environmental light rays to an eye, wherein the fourth light-transmission level with respect to transmission of environmental light rays to an eye can be at least 50% less than the second light-transmission level with respect to transmission of environmental light rays to an eye.

In an example, augmented reality eyewear with Volumetric Annular Photon Emission (VAPE) technology can comprise: an annular light projector which projects images of virtual objects into a person's field of vision; an annular light reflector and/or refractor which receives light rays from the annular light projector and redirects these light rays away from the person's eye; and an eyewear lens, wherein the eyewear lens receives light rays from the annular light reflector and/or refractor and at least partially reflects these light rays back toward the person's eye, and wherein the eyewear lens receives light rays from the environment and transmits these light rays toward the person's eye.

In an example, an annular light projector can comprise a ring and/or torus of light emitters. In an example, an annular light projector can comprise a ring and/or torus of light emitters which emit light rays in a radially-inward direction toward the center of the ring and/or torus. In an example, an annular light projector can comprise a continuous ring and/or torus of light emitters which emit light rays in a radially-inward direction toward the center of the ring and/or torus.

In an example, an annular light projector can comprise a ring and/or torus of light-emitting segments. In an example, an annular light projector can comprise a ring and/or torus of at least four light-emitting segments. In an example, an annular light projector can comprise a ring and/or torus of light-emitting segments which emit light rays in a radially-inward direction toward the center of the ring and/or torus. In an example, an annular light projector can comprise a ring and/or torus of at least four light-emitting segments separated from each other by light barriers. In an example, an annular light projector can comprise a ring and/or torus of light emitters with at least 10 columns of light emitters around the circumference of a virtual circle and at least 5 rows of light emitters in a column.

In an example, an annular light projector can be selected from the group consisting of: collimated light projector and/or display; ferroelectric liquid crystal on silicon (FLCOS) projector and/or display; holographic projector and/or display; light emitting diode (LED) projector and/or display; liquid crystal display (LCD); liquid crystal on silicon (LCOS) projector and/or display; microdisplay and/or microprojector; micromirror array; picodisplay and/or picoprojector; and spatial light modulator (SLM) projector and/or display.

In an example, an annular light reflector and/or refractor can comprise an annular mirror. In an example, an annular light reflector and/or refractor can comprise a ring of mirrors. In an example, an annular light reflector and/or refractor can comprise a ring of lenses and/or waveguides. In an example, an annular light reflector and/or refractor can be nested within an annular light projector.

In an example, an eyewear lens can be a semi-reflective lens. In an example, an eyewear lens can receive light rays from an annular light reflector and/or refractor and at least partially reflect these light rays back toward the person's eye. In an example, an eyewear lens can receive light rays from the environment and transmit these light rays toward the person's eye through a central opening or transparent core in an annular light reflector and/or refractor.

In an example, this eyewear can be in an overall form selected from the group consisting of: augmented reality headset, electronically-functional glasses, eyeglasses, face mounted display, goggles, head mounted display, head worn display, heads up display, helmet, monocle, near eye display, pair of eyeglasses, prescription eyeglasses, see-through head-mounted display, smart glasses, sunglasses, and visor.

In an example, augmented reality eyewear with Volumetric Annular Photon Emission (VAPE) technology can comprise: an annular array of light emitters which projects images of virtual objects into a person's field of vision; an annular array of mirrors which receives light rays from the annular array of light emitters and redirects these light rays away from the person's eye; and a semi-reflective lens, wherein the semi-reflective lens receives light rays from the annular array of mirrors and at least partially reflects these light rays back toward the person's eye, and wherein the semi-reflective lens receives light rays from the environment and transmits these light rays toward the person's eye.

In an example, augmented reality eyewear with Volumetric Annular Photon Emission (VAPE) technology can comprise: an annular light projector which projects images of virtual objects into a person's field of vision, wherein this annular light projector is configured to span at least 75% of the circumference of a virtual circle around a near-eye area which is less than 6" in front of the person's eye, and wherein this annular light projector further can comprise an array of light emitters which emit light rays in a radially-inward direction toward the near-eye area; an annular light reflector/refractor, wherein this annular light reflector/refractor is configured to span at least 75% of the circumference of a virtual circle around the near-eye area, wherein this annular light reflector/refractor is located between the annular light projector and the center of the near-eye area, wherein this annular light reflector/refractor receives light rays from the annular light projector and redirects these light rays away from the person's eye; and an arcuate-proximal-surface light reflector, wherein this arcuate-proximal-surface light reflector is located between the near-eye area and the environment in front of the person's eye, wherein a proximal surface is configured to be closer to the person's eye and a distal surface is configured to be farther from the person's eye, wherein the proximal surface of the arcuate-proximal-surface light reflector receives light rays from the annular light reflector/refractor and at least partially reflects these light rays back toward the person's eye, and wherein the distal surface of the arcuate-proximal-surface light reflector receives light rays from the environment in front of the person's eye and transmits these light rays toward the person's eye through a central opening or transparent core in the annular light reflector/refractor.

I claim:

1. Augmented reality eyewear with Volumetric Annular Photon Emission (VAPE) technology comprising:
    an annular light projector which projects images of virtual objects into a person's field of vision;
    an annular light reflector and/or refractor which receives light rays from the annular light projector and redirects these light rays away from the person's eye, wherein an optical axis of the annular light reflector and/or refractor is substantially same as an optical axis of the person's eye; and
    an eyewear lens, wherein the eyewear lens receives light rays from the annular light reflector and/or refractor and at least partially reflects these light rays back toward the person's eye, and wherein the eyewear lens receives light rays from environment and transmits these light rays toward the person's eye.

2. The augmented reality eyewear in claim 1 wherein the annular light projector comprises a ring and/or torus of light emitters.

3. The augmented reality eyewear in claim 1 wherein the annular light projector comprises a ring and/or torus of light emitters which emit light rays in a radially-inward direction toward the center of the ring and/or torus.

4. The augmented reality eyewear in claim 1 wherein the annular light projector comprises a continuous ring and/or torus of light emitters which emit light rays in a radially-inward direction toward the center of the ring and/or torus.

5. The augmented reality eyewear in claim 1 wherein the annular light projector comprises a ring and/or torus of light-emitting segments.

6. The augmented reality eyewear in claim 1 wherein the annular light projector comprises a ring and/or torus of at least four light-emitting segments.

7. The augmented reality eyewear in claim 1 wherein the annular light projector comprises a ring and/or torus of light-emitting segments which emit light rays in a radially-inward direction toward the center of the ring and/or torus.

8. The augmented reality eyewear in claim 1 wherein the annular light projector comprises a ring and/or torus of at least four light-emitting segments separated from each other by light barriers.

9. The augmented reality eyewear in claim 1 wherein the annular light projector comprises a ring and/or torus of light emitters with at least 10 columns of light emitters around the circumference of a virtual circle and at least 5 rows of light emitters in a column.

10. The augmented reality eyewear in claim 1 wherein the annular light projector is selected from the group consisting of: collimated light projector and/or display; ferroelectric liquid crystal on silicon (FLCOS) projector and/or display; holographic projector and/or display; light emitting diode (LED) projector and/or display; liquid crystal display (LCD); liquid crystal on silicon (LCOS) projector and/or display; microdisplay and/or microprojector; micromirror array; picodisplay and/or picoprojector; and spatial light modulator (SLM) projector and/or display.

11. The augmented reality eyewear in claim 1 wherein the annular light reflector and/or refractor comprises an annular mirror.

12. The augmented reality eyewear in claim 1 wherein the annular light reflector and/or refractor comprises a ring of mirrors.

13. The augmented reality eyewear in claim 1 wherein the annular light reflector and/or refractor comprises a ring of lenses and/or waveguides.

14. The augmented reality eyewear in claim 1 wherein the annular light reflector and/or refractor is nested within the annular light projector.

15. The augmented reality eyewear in claim 1 wherein the eyewear lens is a semi-reflective lens.

16. The augmented reality eyewear in claim 1 wherein the eyewear lens receives light rays from the annular light reflector and/or refractor and at least partially reflects these light rays back toward the person's eye.

17. The augmented reality eyewear in claim 1 wherein the eyewear lens receives light rays from the environment and transmits these light rays toward the person's eye through a central opening or transparent core in the annular light reflector and/or refractor.

18. The augmented reality eyewear in claim 1 wherein the eyewear is in an overall form selected from the group consisting of: augmented reality headset, electronically-functional glasses, eyeglasses, face mounted display, goggles, head mounted display, head worn display, heads up display, helmet, monocle, near eye display, pair of eyeglasses, prescription eyeglasses, see-through head-mounted display, smart glasses, sunglasses, and visor.

19. Augmented reality eyewear with Volumetric Annular Photon Emission (VAPE) technology comprising:
    an annular array of light emitters which projects images of virtual objects into a person's field of vision;
    an annular array of mirrors which receives light rays from the annular array of light emitters and redirects these light rays away from the person's eye; and
    a semi-reflective lens, wherein the semi-reflective lens receives light rays from the annular array of mirrors and at least partially reflects these light rays back toward the person's eye, and wherein the semi-reflective lens receives light rays from environment and transmits these light rays toward the person's eye.

20. Augmented reality eyewear with Volumetric Annular Photon Emission (VAPE) technology comprising:
    an annular light projector which projects images of virtual objects into a person's field of vision, wherein this annular light projector is configured to span at least 75% of the circumference of a virtual circle around a near-eye area which is less than 6" in front of the person's eye, and wherein this annular light projector further comprises an array of light emitters which emit light rays in a radially-inward direction toward the near-eye area;
    an annular light reflector/refractor, wherein this annular light reflector/refractor is configured to span at least 75% of the circumference of a virtual circle around the near-eye area, wherein this annular light reflector/refractor is located between the annular light projector and the center of the near-eye area, wherein this annular light reflector/refractor receives light rays from the annular light projector and redirects these light rays away from the person's eye; and
    an arcuate-proximal-surface light reflector, wherein this arcuate-proximal-surface light reflector is located between the near-eye area and environment in front of the person's eye, wherein a proximal surface is configured to be closer to the person's eye and a distal surface is configured to be farther from the person's eye, wherein the proximal surface of the arcuate-proximal-surface light reflector receives light rays from the annular light reflector/refractor and at least partially reflects these light rays back toward the person's eye, and wherein the distal surface of the arcuate-proximal-surface light reflector receives light rays from the environment in front of the person's eye and transmits these light rays toward the person's eye through a central opening or transparent core in the annular light reflector/refractor.

* * * * *